US005563722A

United States Patent [19]

Norris

[11] Patent Number: 5,563,722

[45] Date of Patent: Oct. 8, 1996

[54] METHOD AND APPARATUS FOR ASSEMBLING A PHOTOGRAPHIC ALBUM

[76] Inventor: Christopher Norris, 4861 Royalton Rd., N. Royalton, Ohio 44133

[21] Appl. No.: 842,893

[22] Filed: Feb. 26, 1992

[51] Int. Cl.[6] .......... H04N 1/00

[52] U.S. Cl. .......... 358/453; 358/450; 358/527

[58] Field of Search .......... 358/75, 76, 54, 358/214, 403, 302, 462, 450, 452, 453, 22, 183, 524, 527, 537, 538, 540, 500, 501, 504; 355/45, 38; 340/703, 734; 395/147–148; 348/598–600; 345/113; H04N 1/00

[56] References Cited

U.S. PATENT DOCUMENTS

| | | | |
|---|---|---|---|
| 4,823,303 | 4/1989 | Terasawa | 395/147 |
| 4,888,648 | 12/1989 | Takeuchi et al. | 379/96 |
| 4,992,781 | 2/1991 | Iwasaki et al. . | |
| 5,072,253 | 10/1991 | Patton | 358/529 |
| 5,086,497 | 2/1992 | Horikawa et al. | 395/147 |
| 5,146,548 | 9/1992 | Bijnagte | 395/147 |
| 5,170,467 | 12/1992 | Kubota et al. . | |
| 5,293,475 | 3/1994 | Hennigan et al. | 358/451 |

OTHER PUBLICATIONS

The Album Arranger, Christopher Norris, p. 204, Shutterbug, Oct. 1991.

Megalo Media Photo Album Fact Sheet, Jay Fenton, 2 pages.

The Digital Family Album, Seattle Film Works.

Picture Power; Picture Ware Division, The Norick Companies.

*Primary Examiner*—Kim Yen Vu

[57] ABSTRACT

A method and apparatus for arranging photographic images in a photographic album utilizing a database of photographs and a database of available album mats where each mat represents a particular available configuration for a page of the album. A video monitor displays the photographs in the database and selected album mats. The selected photographs are arranged on the selected album mats to establish pages for the album. The album pages can then be viewed on the video monitor.

64 Claims, 5 Drawing Sheets

METHOD AND APPARATUS FOR ASSEMBLING A PHOTOGRAPHIC ALBUM

DESCRIPTION—TECHNICAL FIELD

The present invention relates to a method and apparatus for assembling a photographic album from a database of photographic images and a database of available album mats, and allows a user to select a photographic image and a location on a selected page for the selected photographic images to establish pages for the album. Album mats are then chosen from the mat database to accommodate the selected photographs and page configurations. A video monitor is provided for sequentially viewing each page of the photographic album by viewing the selected photographic images proportionately sized for the selected location on the selected mat.

BACKGROUND OF THE INVENTION

Video imaging systems are known for digitizing images and establishing databases of photographic images. One known method of digitizing images to establish a database of photographs is to utilize a commercially available software imaging system such as PicturePower Image Software. Heretofore, this art has not been merged with the process and apparatus to assemble a photographic album.

Presently, photographic albums are designed utilizing a plurality of paper proofs which are printed for the client to view and choose the desired pictures from the various printed proofs. After the desired photographs are chosen, the photographer selects album mats to accommodate the selected photographs and form pages for the album. Printing the proofs is costly for the photographer and allowing clients to remove proofs from the office prevents the photographer from maintaining control over the paper proofs. In addition, the photographer is required to print a plurality of proofs which ultimately will not be chosen, thereby adding expense to the project.

The present invention attempts to overcome the disadvantage associated with the prior art systems for assembling photographic albums by eliminating the cost and the process of printing paper proofs and replacing the "paper proofs" with high quality video proofs which can be more readily controlled by the photographer.

SUMMARY OF THE INVENTION

The present invention provides a new and improved method and apparatus for arranging photographic images in a photographic album which replaces paper proofs with video images that are readily configurable to various available page configurations.

The present invention provides a new and improved apparatus for arranging photographic images in a photographic album, including means for establishing a signal indicative of a photographic image, first storage means for storing the signal indicative of a photographic image and establishing a database of photographic images, a video output for visually displaying the photographic images, second storage means for storing a database of available album mats wherein each mat represents a particular available configuration for a page in the album, means for selecting from the database of photographic images selected images and arranging the selected images on a desired page of the album, means for selecting a mat and a location on a selected mat for the selected images to thereby establish pages for the album and means for sequentially viewing each page of the photographic album on the video output by viewing the selected photographic images proportionately sized for the selected location in the selected mat.

A further provision of the present invention is to provide a new and improved apparatus for arranging photographic images in a photographic album, including video imaging means for establishing an image signal of a photographic negative image, a color corrector for receiving the image signal of the photograph negative from the video imaging means and establishing an image signal of a photographic positive image, a video digitizer for digitizing the photographic positive image and generating an output representative of a positive photographic image, storage means for storing the output representative of the images and establishing a database of photographic images therein, a video output connected to the output of the video digitizer for displaying the database of photographic images, second storage means for storing a database of available album mats where each mat represents a particular available configuration for a page of the album, means for selecting from the database of photographic images selected photographic images and establishing a selected photographic images database, means for selecting images from the selected image database and arranging the selected images on a desired page of the album, means for selecting an album mat and a location on a selected mat to accommodate the selected images as arranged on a desired page of the album to thereby establish pages for the album, and means for sequentially viewing each page of the photographic album on the video output by viewing the selected photographic images proportionately sized for the selected location in the selected mat.

Another provision of the present invention is to provide a new and improved method of assembling a photographic album from a database of photographs, including the steps of creating a database of pictures, creating a database of available album mats where each mat represents a particular available configuration for a page of the album, sequentially viewing each picture in the database, placing each sequentially viewed picture in a selected file or discarded file, sequentially viewing each of the pictures in the selected file, selecting desired pictures for each page of the album from the selected file, selecting a mat for each page in the album to accommodate selected pictures for each page of the album from the database of available mats, and storing the selected pictures, the selected mats, and the location on the selected mats of the selected pictures.

Still another provision of the present invention is to provide an interactive method of creating each page of a photographic album from a database of images and available album mats wherein each mat is representative of an available page configuration for the album, including the steps of sequentially viewing each image in the image database, selecting desired images for each page of the photographic album as images are sequentially viewed and locating the selected images on selected pages of the album to establish a page configuration for the album, selecting an available album mat from the database of album mats to accommodate the selected images and page configurations, and storing for each page the selected images to be mounted thereon, the placement of selected images, and the album mat required to accommodate the selections.

DESCRIPTION OF THE PREFERRED EMBODIMENT

Figure 1:
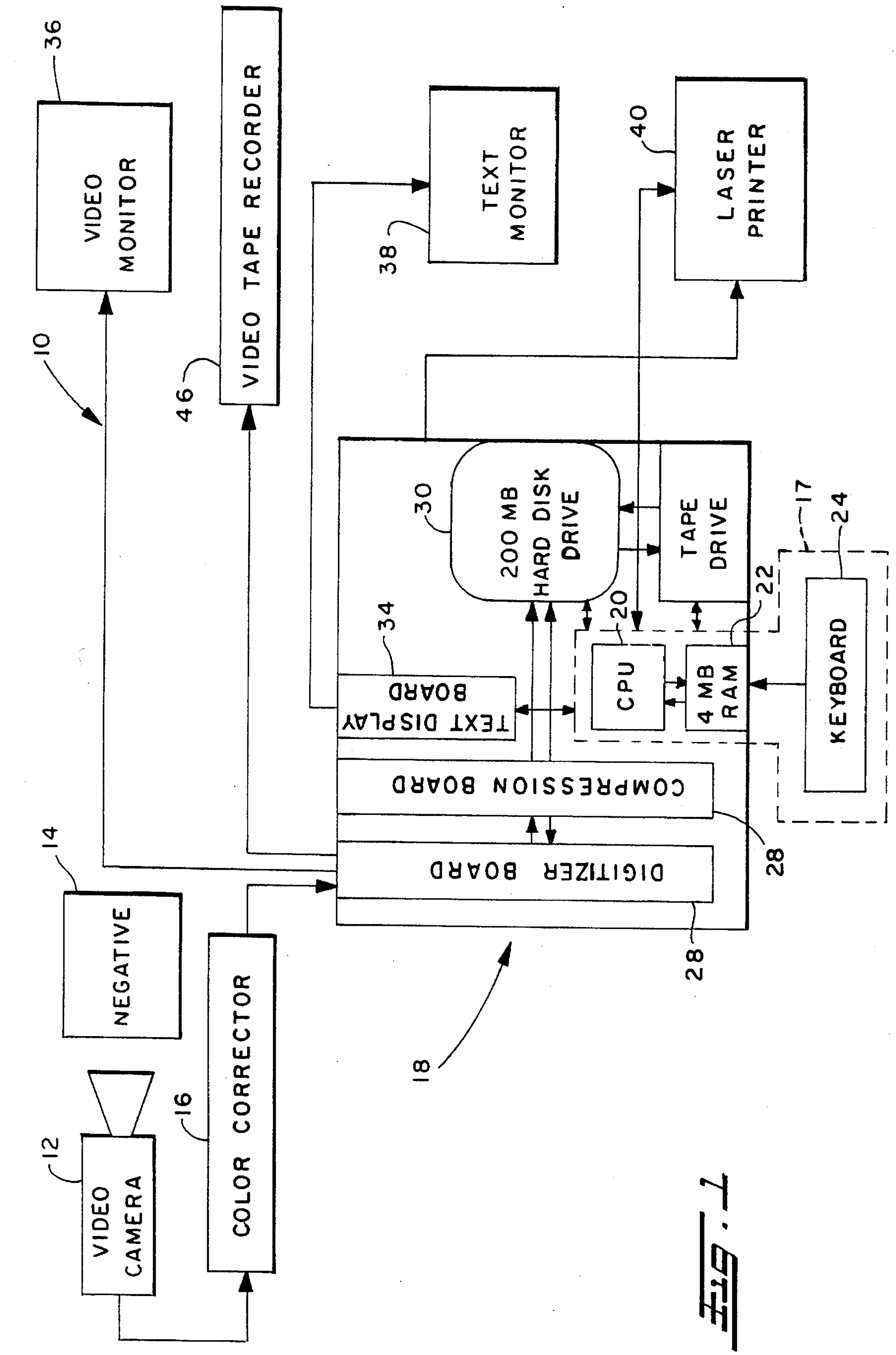
FIG. 1 is the schematic representation of the apparatus of the present invention for arranging photographic images in a photographic album.
Figure 2:
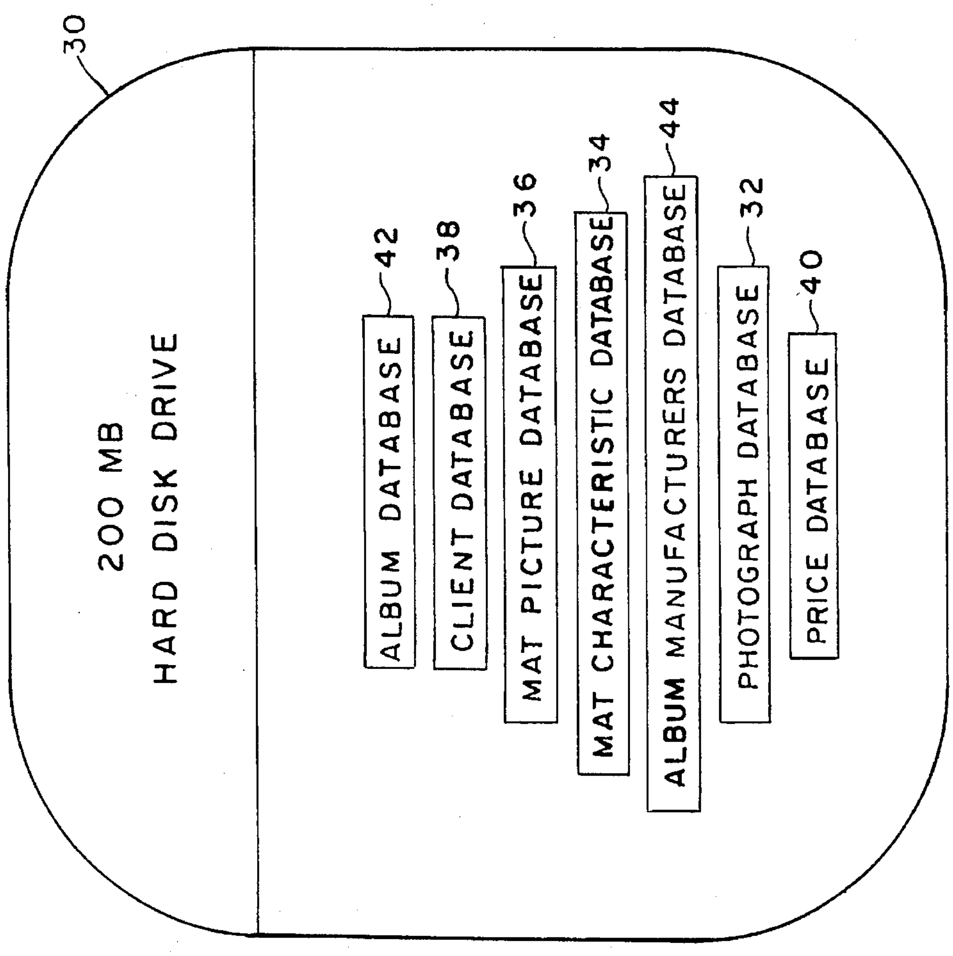
FIG. 2 is a schematic representation of the database layout for the database utilized in the present invention.

Referring to the figures, and more particularly to FIGS. 1 and 2, an apparatus 10 for arranging photographic images in a photographic album is more fully disclosed. While the preferred embodiment of the invention discloses the use of photographic images to assemble the album, any type of images, such as nonphotographic images, which can be electronically databased can be accommodated by the present invention and the terms "photographic image" or "picture" as used herein are meant to include such other types of images. The apparatus 10 includes a video camera 12 for capturing video images to be entered into a database of photographs. In the preferred embodiment of the invention, normal photographic means are utilized to expose film and capture images. The exposed film is processed normally but paper proofs are not made. The negatives are manually edited and a sequence is determined for the presentation of the photographic images. After the negatives 14 are edited, they are captured by the video camera 12 and directed to processing hardware 18.

The images captured by the video camera 12 are negative photographic images due to the fact that paper proofs are not printed. The negative photographic images captured by the video camera 12 are directed to a color corrector 16 which switches the negative images to positive images and provides color balance control before directing the image signals to the processing hardware 18. The video camera 12 can be one of a variety of commercially available video cameras such as manufactured by Tamron, JVC, or Sony. A commercially available color corrector such as that manufactured by Sony can be utilized. In some instances, the color corrector can be included in the video capture device or video camera 12.

While the present invention illustrates utilizing a video camera 12 and a color corrector 16 to establish photographic image signals which are directed to the processing hardware 18, other types of commercially available video capturing systems could be utilized, such as direct capture of the photographic images on CD-ROM or on photo CDs, which would then be directly input into the processing hardware 18. The term "video camera" as used herein is meant to encompass all types of video capture systems.

The processing hardware 18 includes a personal computer generally indicated at 17, which includes a central processing unit 20 such as an Intel i486DX which is connected to RAM storage 22. The personal computer including a keyboard 24 is provided for inputting data and instructions to the processing hardware 18, as is well known.

The processing hardware 18 includes a video digitizer board 26 such as that commercially available from TrueVision which digitizes the output of the color corrector 16. An output of the video digitizer 26 is directed to a compression board 28 such as that manufactured by Pictureware which is adapted to shrink the size and compress the digitized signals from the video digitizer 26 to enable the signals indicative of photographic images to be stored in a more efficient manner. The compression board 28 is connected to a hard disk drive 30 which is adapted to store the compressed information indicative of the captured photographic images and establish a photographic database 32 therein. The hard disk drive 30 as utilized in the present invention can be a commercially available Maxtor MXT-LXT 213A 200 MB hard disk drive. While the preferred embodiment is illustrated as including a compression board 28, the use of the compression board 28 could be eliminated by increasing the size of the storage on the hard disk 30.

A tape drive 31 such as that manufactured by Mountain is utilized as the permanent file storage device. However, it is within the scope of the present invention that other file storage devices, such as rewritable optical drives, WORM drives, or other hard drives could be utilized.

A video output 36 and a text monitor 38 are connected to outputs of the processing hardware 18. The color video monitor 36 is connected to an output of the video digitizer board 26 and is adapted to display the photographic images represented by the image signals processed by the video digitizer 26. The video digitizer 26 can output to the video monitor 36 the digitized output of the color corrector 16 or display stored images from the hard disk 30 after decompressing the stored images on the compression board 30. While a video monitor 36 has been illustrated, other types of video displays such as tape recorders or projectors could be utilized.

The text monitor 38 is preferably a monitor which is connected to a video graphics adapter board 34 but could be any type of textual monitor used with personal computers. The video graphics adapter board is adapted to display textual matter and indicate in a textual and graphical fashion selections made by the apparatus 10 for arranging the photographic images, as will be more fully disclosed herebelow. A printer 40 can be connected to the personal computer 17 to print data and images selected by the apparatus 10.

Figure 3:
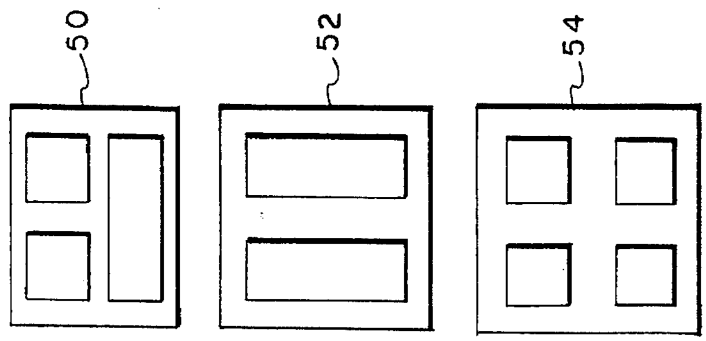
FIG. 3 is a schematic representation of various photographic mats stored in the mat database.

As is more fully disclosed in FIG. 2, the hard disk 30 is adapted to have a plurality of databases stored therein, each of which may be hereinafter referred to as a storage means for storing a particular database. Database as used herein shall mean any electronically stored collection of data. A first or photograph database 32 is located on the hard disk 30 and is established from images captured by video camera 12, the video digitizer 26 and compression board 28. A second or album mat characteristic database 34 is also disposed on the hard disk 30. The album mat characteristic database 34 stores the actual dimensions of each photographic image to be mounted on a particular album mat. When assembling an album, album mats which are available from various manufacturers are utilized to mount and frame the chosen photographs. These mats are available in certain predetermined configurations from each manufacturer wherein each mat indicates a particular available configuration for a page of the photographic album. FIG. 3 illustrates at 50, 52 and 54 three available mat configurations. For example, mat 50 is adapted to receive and mount three particular sized pictures, mat 52 is adapted to receive two pictures, and mat 54 is adapted to mount four pictures. Various other mat configurations are available and will be stored in the various mat databases.

A mat picture database 36 is stored on hard disk 30 and provides a database of visual representations of available mats which can be displayed on the text monitor 38. An album manufacturer's database 44 is provided to relate visual representations of the mats in the mat picture database 36 to order numbers for ordering the particular visually represented mat from a particular manufacturer.

A client database 38 and a price database are also disposed on hard disk 30. The client database includes various information relating to the particular client whose images are to be processed into a photographic album. The price database includes prices for various sized pictures and various mats. The price database is adapted to price the selected pictures, as will be more fully described hereinbelow.

When it is desired to assemble a photographic album of a particular event such as a wedding, the photographer exposes film to capture various images of the event in a normal fashion. The film is normally processed but paper proofs are not printed. The photographer manually edits the negatives to remove duplicates and undesirable images. A sequence for the negatives is determined for a presentation process which in many instances follows the sequence of events captured by the photographer. For example, in a wedding the sequence might be "Preparation", "Ceremony", "Reception", "The End". After the images are selected and the sequence is determined, the images are captured in sequence through the video camera 12 and are stored in the photographic database 32 on the hard disk 30. Image numbers for each image stored in the photographic database 32 are sequentially assigned by the central processing unit 20. Titles can be manually inserted in the photographic database via the keyboard 24 in appropriate sequence between the appropriate images. For example, these titles can be "Our Wedding", "Preparation", "Reception", "The End". Commercially available image processing software such as PicturePower Image Software can be utilized to process the images to establish database 32.

When entering the images from the negatives 14 in the video camera 12, oval and different shaped masks can be used over the negatives 14 to create a variety of borders and shapes resembling available mat choices. After the images are entered into the processing hardware 18, the processing hardware then sizes all of the images to provide various options, such as different available pictures sizes. The entire database of pictures 32 is then replayed sequentially for viewing over the video monitor 36 and can be transferred to a videotape recorder 46 for presentation purposes. Music may be added to this videotape for later presentation to enhance the presentation of the program. The created videotape of the picture database 32 can later be sold to a customer to enhance the profitability of the photographer. The entire set of databases for the particular photographic event can be then stored on tape drive 31 for temporary storage to free hard drive space.

The database of photographs 32 of the particular event which is stored in the hard disk 30 can be sequentially viewed through the color video monitor 36 and each photograph can be placed in a selected or a discarded file by entering the appropriate instructions in keyboard 24. After the images in the photographic database 32 are reviewed, the selected images are then sequentially re-reviewed and each image or selected images from the selected photographic database is assigned by keyboard 24 to a particular page of the photographic album to be created. The central processing unit 20 then confirms whether the selected picture formats are compatible and whether an album mat is available for the particular selected picture format. The format of the picture is the orientation of the picture, i.e. horizontal, vertical or square.

After confirmation, the central processing unit 20 can calculate a customer invoice from the price database 40 using the picture sizes selected by the central processing unit which accommodates the selected images on their selected page locations. If the final price is unsatisfactory to the customer, the created photographic album can be edited to add, modify or eliminate either entire pages and/or particular images. Upon final acceptance of the album layout, an itemized invoice can be printed and a printout can be made on the printer 40 of every page of the album showing the image numbers, photographic images and selected mats.

Figures 4A, 4B:
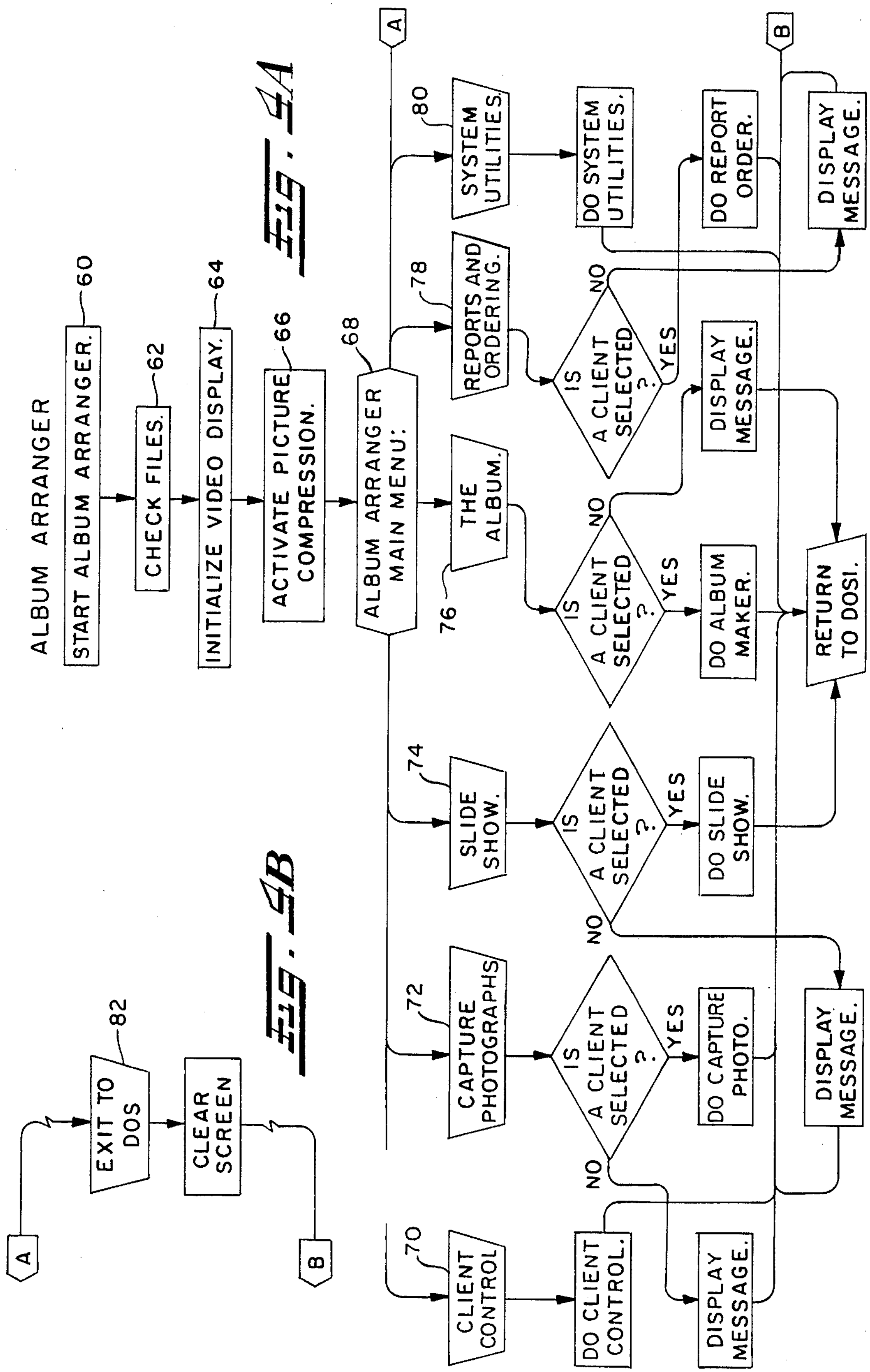
FIGS. 4*a* & 4*b* are schematic flow charts illustrating the overall method of operation of the present invention.

Referring more particularly to FIG. 4, a flow chart for the overall operation of the apparatus 10 is disclosed. During the sequence disclosed in the flow chart, various decisions and information can be inputted via the keyboard 24 and prompts for decisions will be displayed on the text monitor 38 as is well known. The initialization process of the apparatus 10 starts at 60 in FIG. 4 wherein the apparatus proceeds to check its files at 62 and initialize the video display 36 and text display 38 at 64. Picture compression is then activated at 66 and the user then has the option of entering the Album Arranger main menu at 68.

The main menu includes a plurality of distinct tasks which can be performed by the apparatus 10. These tasks include client control, indicated at 70; capture photographs at 72; slide show at 74; the album at 76; reports and ordering at 78; systems utilities, indicated at 80; and exit to DOS, indicated at 82.

The client control task at 70 enables the user to create the client database 38 and perform various functions, including selecting a client from the client database 38, adding a client to the client database 38, or maintaining a client whereby data concerning a particular client is updated. In addition, the client control also provides the option to transfer data from or to the tape drive 32 from the hard disk 30. Additional functions include the ability to delete a client, enter a client's address, and enter prices for a particular client. Additionally, a manufacturer of album mats can be selected to predetermine the mat characteristic database 34 to the particular mat manufacturer desired by the client.

The capture photograph function 72 provides for creation of the photographic database 32 on the hard disk 30 and in part is based on PicturePower Image Software. The capture photograph function 72 enables images received from the video camera 12 to be arranged and stored in the photographic database 32 on the hard disk 30. The particular image can be captured in a particular shape or a particular orientation and notes of the photographer for display on the text monitor 38 can be included in the photographic database 32. When the images are entered into the photographic database 32 the database automatically sizes each image to accommodate all sizes which are necessary for use with the particular mat manufacturer selected. For example, if a particular mat manufacturer utilizes five different sized pictures in the manufacturers' album mats, the database would then size each image to accommodate the particular sizes necessary for the album mat. In addition, common titles for a slide show or custom client titles for a particular slide show can be included in the capture photograph function 72 and inserted or deleted at various locations in the photographic database 32. Examples of common titles for inclusion in the photographic database would be "Our Wedding", "Reception", "The End", etc. Capture photograph 72 allows the photographer to capture a photograph from the video camera 12 and assign the orientation and shape stored in database 32 to a particular captured image. The orientation or format can be selected from a number of predetermined orientations allowed for the client, such as horizontal orientation, vertical orientation, etc. Also, various shapes can be selected from the shapes allowed for the client. The function additionally allows replacing or recapture of a photograph from the camera 12 into an existing assigned image number in the photographic database 32.

The slide show function 74 enables a user to view on the video monitor 36 the photographic images and titles stored in the photographic database 32. The slide show 74 sequentially shows the various images and titles in the photograph database 32 and allows the user to move between various images in various manners, including a timed user-selected sequence in which each image is viewed sequentially for a predetermined time period. The previous picture or the next picture can be viewed, or a particular number of a particular image could be entered by the keyboard 24 to recall that particular image on the video monitor 36. A videotape can be made by the video recorder 46 recording the sequential images displayed by the slide show function 74. This videotape can then be viewed on any VCR.

Figure 5:
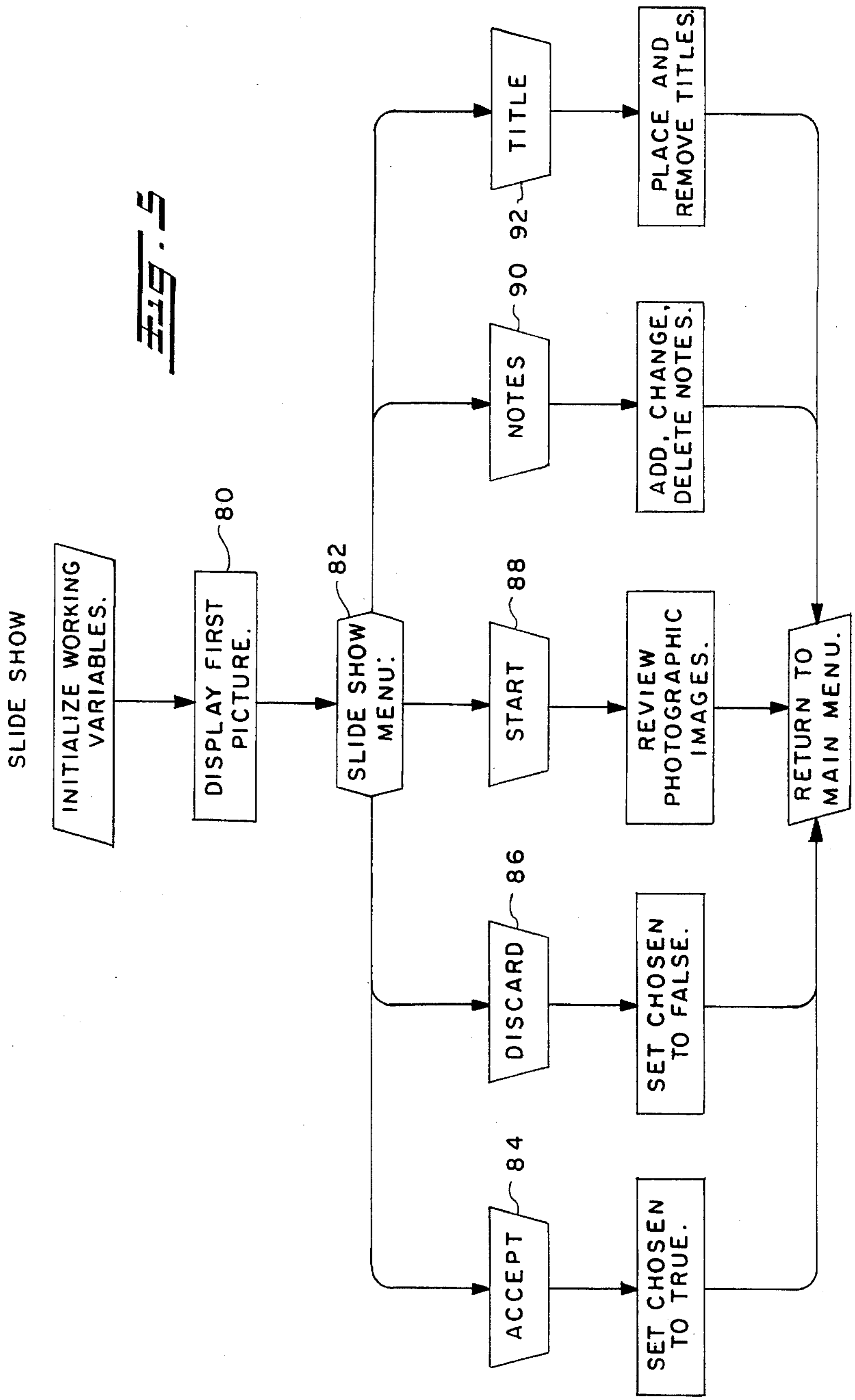
FIG. 5 is a schematic flow chart illustrating the method of operation of the slide show.

The user, as is more fully illustrated in FIG. 5, displays the pictures at 80 in the database 32 and has the ability to select pictures to be placed in a selected file at accept 84 or place pictures in a discarded file at 86. The pictures in both the selected file at 84 and the discarded file at 86 are both stored in database 32 for future use in creating the photographic album. The slide show also includes the ability to view photographic images at 88 by entering into keyboard 24 the image number and view particular notes or make notes on the text monitor at 90. Notes can be annotated to each image. The slide show can change the orientation and shape of a photograph by entering instructions into the keyboard 24 and can either add or delete or change titles associated with particular photographs. In addition, statistics can be included, in the database of how many images are chosen, discarded, used and unused in database 32.

Figure 6:
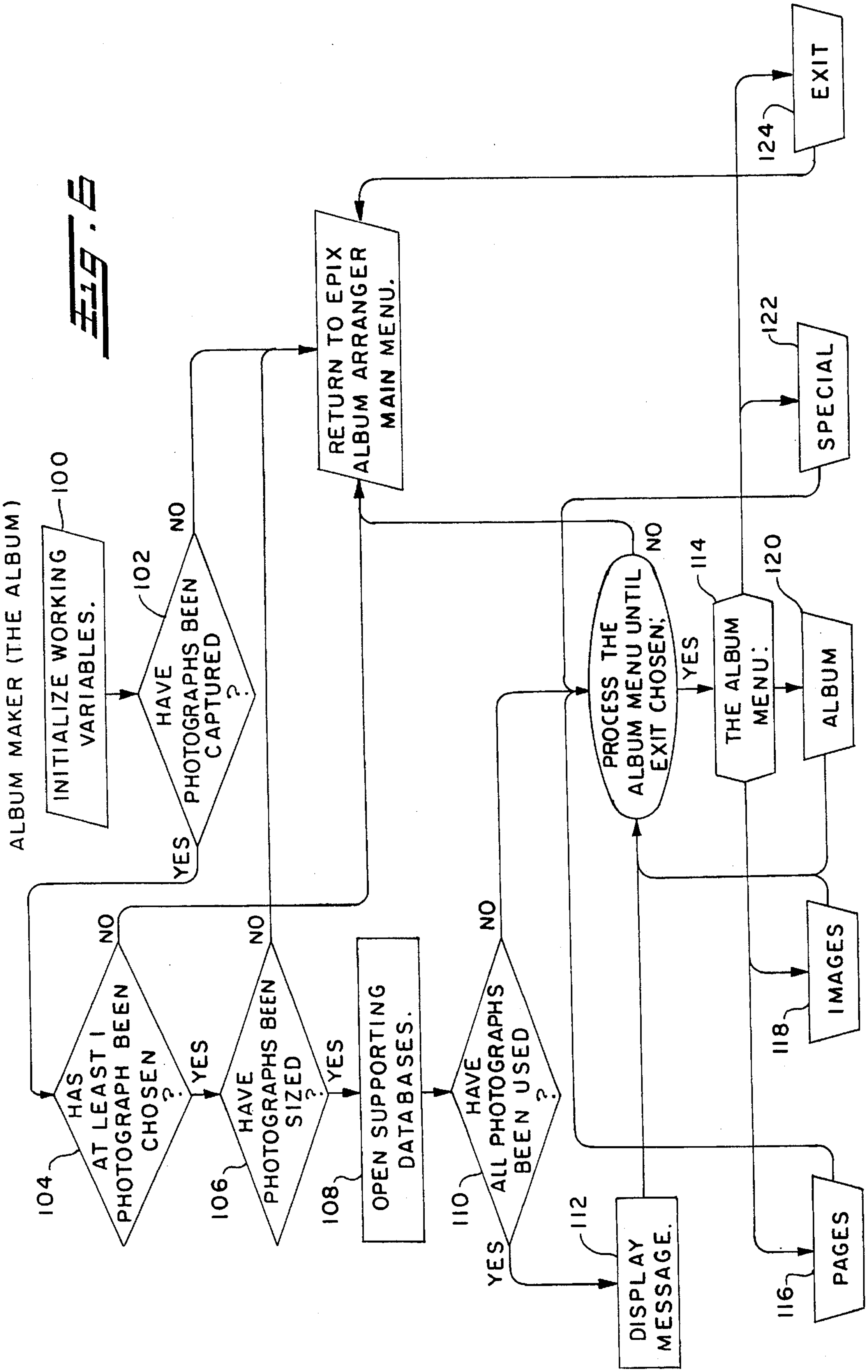
FIG. 6 is a schematic flow chart generally illustrating the method of assembling a photographic album from the database of photographic images and photographic mats.

The operation of the album function 76 is more fully disclosed in FIG. 6. When it is desired to create an album, a sequence at 100 is initiated to initialize the working variables. The system checks at 102 to determine if photographs have been captured and at 104 to determine that at least one photograph has been placed in the selected file at 84. The system then checks if the photographs have been properly sized at 106, and opens supporting databases at 108. The system then checks to determine if all photographs have been used at 110, and displays a message at 112 on the text monitor 38 indicating status of the photographs used. The album menu at 114 appears on the text monitor 38 to allow the user to determine the particular functions to be performed. The user can choose via keyboard 24 pages at 116, images at 118, album at 120, special at 122, or exit at 124 to exit from the album menu.

The image function 118 allows photographs to be put into album pages. The system will either automatically select the proper mats from the map characteristic database 34 after images are selected for each page or the operator may choose mats for an album page by inputting information on the keyboard 54. When albums are created, all of the mats in any particular album are from a single manufacturer so that the album mats match on each page. Images 118 enables the operator to select a photograph or a plurality of photographs for each particular page. The photograph can be selected by entering the photographs identification number or can be chosen from a sequence of displayed photographs such as the sequence of the slide show 74. Selected photographs for a particular page can be formatted by selecting a photographic mat from the mat characteristic database 34. Photographs can be deselected from the pages if desired and inputted into the discarded file. In addition, the selected photographs can be viewed on the video monitor 36 in their proper orientation. Notes associated with the displayed photographs can be added to, deleted or modified by inputting information on the keyboard 24 which is displayed on the text monitor 38. The image function 18 can also change the shape or orientation of a current photograph to accommodate a particular mat. A further function of images is to find a particular image and indicate the location of the image in the database or in the album.

Pages 116 allows the user to display a current page in the album, a previous page in the album, or go to a specific album page and display it after the pages have been assembled by the image function. Pages can rearrange photographs in a page by shuffling the position of the photographs in the mats utilized on a particular page, as illustrated in FIG. 3. In addition, pages allows for the reselection of a mat for a current album pages wherein the new mat required is determined by the number, orientation and shape of the photographs to be placed on the particular pages. New mats can be selected with smaller and/or less photographic images. Images can be removed from pages in break. Entire pages can be deleted from the album. All changes are reflected in the next invoice generated. Each time invoices are generated the number of each size print is counted and then multiplied out by the price per print. This allows a user to modify the price of the album, if desired.

Pages also joins album pages together to combine photographs on two pages into one album page or can be used to view a particular chosen album page. A function can also be included to identify panoramic views on two facing pages of the album and to identify one-half panel images, i.e. one full page in size. Photographs can be split from a current page and put on a new page or released into a free photographic pool. Photographs from the free photographic pool or the discarded file can be added to a particular page or pages can be moved in the album. In addition, notes to be displayed on the text monitor 38 can be added or changed for selected photographs.

The album function 120 is operable to display on the video monitor 36 pages in the album with the selected images. The album function is also adapted to print on the printer 40 a version of the entire album page by page, including the selected photographs and selected mats. The previous page or the next page can be displayed, or a particular numbered page can be recalled and displayed on the video monitor 36. In addition, a slide show can be prepared to sequentially show the various pages of the album with the selected photographs and selected mats on the video monitor 36. A data screen can be included on the text monitor 38 to display the number and size of each print used in the album and the total price of the album.

The special file 122 allows the operator to change mat manufacturers, delete all pages in the album, and display statistics of how many photographs are chosen, discarded, used and unused.

The report ordering file 78 in the album arranger main menu 68 is adapted to effect printing by printer 40 of invoices and order forms to order the particular mats chosen for the photographic album and the selected images properly sized to assemble the album. In addition, report ordering 78 can print assembly instructions for the photographic album, print assembly instructions by print, and print negative labels for use in processing the album.

The systems utilities file 80 allows the manufacturer of mats and print size to be changed for the system, and allows the price to be modified. In addition, the utilities file formats the tapes and reindexes the files.

From the foregoing, it should be apparent that a new and improved apparatus 10 for arranging images in a photographic album has been provided. The apparatus includes video imaging means 12 for establishing an image signal of a photographic negative 14, a color corrector 16 for receiving the image signal of the photographic negative from the video imaging means 12 and establishing an image signal of a photographic positive image. A video digitizer 26 is provided for digitizing the photographic positive image and generating an output representative of a positive photographic image. Compression means 28 compresses the output of the video digitizer 26 and directs an output of the video digitizer to the storage means 30 which stores therein at 32 the compressed output of the compression means 28 and establishes the database 32 of photographic images therein. The hard disk or storage means 30 includes a plurality of storage means therein for storing an album database 42, a client database 38, a mat picture database 36, a mat characteristic database 34, an album manufacturers' database 44, a photograph database 32, and a price database 40. A video monitor 36 or video output is connected to the output of the digitizer 26 for displaying the database 32 of photographic images. Second storage means 36 is provided on the hard disk 30 for storing a database of available album mats wherein each mat represents a particular available configuration for a page of the album which is available from a particular manufacturer. The keyboard 24 provides means for selecting from the database of photographic images selected photographic images and establishing a selected photographic image file at 84 and a discarded photographic image file at 86. The keyboard 24 is also adapted to select album mats at images 118 and a location on a selected album mat for images from the selected photograph file at 84, thereby establishing pages for the album. Pages 116 provides means for sequentially viewing each page of the photographic album on the video monitor 36 by viewing the selected photographic images proportioned for the size at the selected location on the selected mat.

In addition, a new and improved method of assembling a photographic album from a database of photographs 32 has been disclosed which includes the steps of creating a database of images at 32, establishing a database of available photographic mats 34 where each mat represents a particular available album page configuration from a particular manufacturer, sequentially viewing each picture in the database 34 via the slide show 74, and placing each sequentially viewed picture in a selected file at 84 or a discarded file at 86. The images in the selected file at 84 are then sequentially viewed and the keyboard 24 is utilized during images 118 to select a particular location on a page for either all or some of the images in the selected file. After the images are located in the appropriate location on an album page during image 118, images 118 selects a mat and a location on the selected mat to accommodate the chosen images thereby forming pages for the album. The microprocessor 20 checks the mat picture database 36 and the mat characteristic database 34 to determine the actual sizes of the chosen images as located on the mats selected to accommodate the chosen images. The selected images, the selected mats, the location on the selected mats, and the selected images and sizes of the selected images are then stored in the database for future use. The special file 122 allows the operator to change mat manufacturers and delete either entire pages or individual images or add entire pages or individual images to the album to modify the invoice price for the album depending upon the users' needs. It is noted that the invoice price is generally determined by the number and size of the selected images. After the album has been finalized, the printer 40 is adapted to print each page of the album with the selected images proportioned for the size at the selected location on the selected mat.

An appendix A (pages A-1 to A-379) has been attached hereto as an example of the code which will implement the method disclosed when used with the apparatus 10 of the present invention. The appendix further includes a flow chart for the code.

APPENDIX A

```
*.........................................................................
*
*   Program Name: ALBUM.PRG          Copyright: EPIX Corporation
*   Date Created: 03/06/91            Language: Clipper
*   Time Created: 14:57:02              Author: Glenn C. Holcomb
*
*.........................................................................

* SETCANCEL(.F.)
SET STATUS OFF
SET SCOREBOARD OFF
SET WRAP ON
SET TYPEAHEAD TO 50

PUBLIC color, hcolor, _choice, _screen, _dclient, _drive, _company, _copyright
PUBLIC _mtrap, _mousesen

IF (iscolor())
    color = 23
    hcolor = 31
ELSE
    color = 7
    hcolor = 15
ENDIF

csroff()
standard(color)
enhanced(roloc(color))
cls(color,'░')
print(24,0,'',color,80)

DO chk_fle
DO prm_chk

_mousesen = 6
mouse(ismouse())
m_trapfeed(_mousesen)
m_trapnew()
mousetrap(0,13)
mousetrap(1,27)
mousetrap(2,-1)
mousetrap(3,5,24,5,24)
m_trapset()
_mtrap = m_trapsave()

use control
_company    = IIF(.NOT. EMPTY(control->company),ALLTRIM(control->company),'EPIX Corporation')
_drive      = control->drive
_dclient    = control->lclient

SELECT 0
use client INDEX client
SEEK _dclient
IF .NOT. FOUND()
     _dclient = SPACE(8)
    REPLACE control->lclient WITH _dclient
ENDIF                                           && IF .NOT. FOUND()
USE

SELECT control
use

IF .NOT. pp_call('INIT NOFRAME')
    BEEP()
    @ 24, 0 SAY 'Display board not found program aborted...press any key'
    csron()
```

```
    QUIT
ENDIF                                        && IF .NOT. pp_call('INIT')

pp_call('CLR')
pp_call('SETCMPR HC')

_choice = 0

DO win WITH 2,13,20,67,.T.,("EPIX Album Arranger"),.F.
msg_24(CENTER('Album Arranger Copyright EPIX Corp. 1991',80),.f.,.f.,.f.)

DO WHILE _choice # 7

    @  6,26 PROMPT ' 1.  Client Control          '
    @  8,26 PROMPT ' 2.  Capture Photographs     '
    @ 10,26 PROMPT ' 3.  Slide Show              '
    @ 12,26 PROMPT ' 4.  The Album               '
    @ 14,26 PROMPT ' 5.  Reports & Ordering      '
    @ 16,26 PROMPT ' 6.  System Utilities        '
    @ 18,26 PROMPT ' E.  Exit to DOS             '

    MENU TO _choice
    @ 24, 0 CLEAR

    _screen = savescreen()

    IF lastkey() = 27
        _choice = 7
    ENDIF                                    && IF lastkey() = 27

    DO CASE
        case _choice = 1
            DO cli_ctr
        case _choice = 2
            IF EMPTY(_dclient)
                msg_24('Please select client before capture photographs, press any key',.t.,.t.)
            ELSE
                DO cap_pht
            ENDIF                            && IF EMPTY(_dclient)
        case _choice = 3
            IF EMPTY(_dclient)
                msg_24('Please select client before entering slide show, press any key',.t.,.t.)
            ELSE
                DO sld_shw
            ENDIF                            && IF EMPTY(_dclient)
        case _choice = 4
            IF EMPTY(_dclient)
                msg_24('Please select client before selecting album, press any key',.t.,.t.)
            ELSE
                DO alb_mkr
            ENDIF                            && IF EMPTY(_dclient)
        case _choice = 5
            IF EMPTY(_dclient)
                msg_24('Please select client before printing reports, press any key',.t.,.t.)
            ELSE
                DO rpt_ord
            ENDIF                            && IF EMPTY(_dclient)
        case _choice = 6
            DO sys_utl
        case _choice = 7
            m_trapfree()
            CLEAR
            csron()
            RETURN
    ENDCASE
```

```
    restscreen(_screen)
ENDDO
RETURN
```

```
*
*.........................................................................
*   Program Name: ALB_BEG.PRG       Copyright: EPIX Corporation
*   Date Created: 04/18/91           Language: Clipper
*   Time Created: 16:24:03             Author: Glenn Holcomb
*
*.........................................................................

PRIVATE _start, _stop

IF queryb('Begin Timed Album Show')
   msg_24('Press ESCAPE to interupt automated Album Show...',.F.,.F.)
   DO pag_sca
   DO WHILE .NOT. EOF() .AND. lastkey() # 27 .AND. VAL(ALLTRIM(_page)) # 0
      DO pag_dis WITH .T., _dis_id, _dis_sz
      _start = SECONDS()
      _stop  = _start + _length
      DO WHILE _stop >= SECONDS() .AND. lastkey() # 27
         @ 1,68 SAY _stop - SECONDS() PICTURE '99'
         INKEY()
      ENDDO                                  && DO WHILE _stop >= SECONDS()
      SKIP 1
      DO pag_sca
   ENDDO                                     && DO WHILE .NOT. EOF()
   IF lastkey() = 27
      KEYBOARD CHR(32)
   ENDIF                                     && IF lastkey() = 27
   msg_24('End of timed album show...press any key',.T.,.T.)
   @ 1,68 SAY _length PICTURE '99'
ENDIF

RETURN
```

```
*..........................................................................
*
*   Program Name: ALB_MKR.PRG       Copyright: EPIX Corporation
*   Date Created: 03/08/91           Language: Clipper
*   Time Created: 16:32:47             Author: Glenn C. Holcomb
*
*..........................................................................

PRIVATE _temp, _cchoice, _schoice, _lastform, _form, _cpage, _cphoto
PRIVATE _length, _dis_id, _lorient, _dis_sz, _tsel

 _tsel = SELECT()
SELECT 0
USE control
 _length = control->length
USE
SELECT (_tsel)

* Initialize variables *

store .F.              to _dis_id
store .F.              to _dis_sz
store ' '              to _lorient

store space(3)         to _page
store space(5)         to _mat_id
store space(1)         to _matched
store .f.              to _is_1224
store space(10)        to _dbp_a
store space(10)        to _dbp_b
store space(10)        to _dbp_c
store space(10)        to _dbp_d
store 0                to _id_a
store 0                to _id_b
store 0                to _id_c
store 0                to _id_d

store 0                to _photo_id
store space(1)         to _orient
store space(1)         to _shape
store .f.              to _chosen
store .f.              to _used
store space(10)        to _notes                && Memo Field
store space(10)        to _dbp_small
store space(10)        to _dbp_med
store space(10)        to _dbp_lge
store space(10)        to _dbp_1212
store space(10)        to _dbp_1224

store space(3)         to _cpage
store 0                to _cphoto

_lastform = SPACE(8)

box(0,1,22,79,"┌─┐│┘─└│ ",color,1,8)
print(1,2,strcenter('Album Arranger for ' + _dclient,77),hcolor)
print(2,1,"├" + REPLICATE("─",77) + "┤",color)
print(2,63,'┬',color)
FOR i = 3 TO 10
    print(i,63,'│',color)
NEXT
print(11,1,'├' + REPLICATE('─',61) + '┤',color)
FOR i = 12 TO 19
    print(i,63,'│',color)
NEXT
print(20,1,"├" + REPLICATE("─",77) + "┤",color)
```

```
print(20,63,'▲',color)

* Open all necessary files and do error checking for proper setup *

chdir(_dclient)
IF .NOT. FILE('PHOTO.DBP')
    msg_24('Photos must be input before using the Album Maker...press any key',.T.,.T.)
    chdir('..')
    RETURN
ENDIF                                       && IF .NOT. FILE('PHOTO.DBP')

pp_call('SETDBP PHOTO')

* Check that at least one photo has been chosen *

USE photo INDEX photo, photoc
SET FILTER TO chosen
GOTO TOP

DO WHILE .NOT. EMPTY(dbp_small) .AND. .NOT. EOF()
    SKIP 1
ENDDO                                       && DO WHILE .NOT. EMPTY(dbp_small) .AND. .NOT. EOF()

IF .NOT. EOF()
    msg_24('Please size pictures before assembling album, press any key',.t.,.f.,.f.)
    USE
    chdir('..')
    RETURN
ENDIF                                       && IF .NOT. EOF()

GOTO TOP
IF EOF()
    msg_24('No photos have be chosen, return to slide show...press any key',.T.,.T.)
    USE
    chdir('..')
    RETURN
ENDIF                                       && IF .NOT. FILE('PHOTO.DBP')

DO pht_sca

* Setup shape lookup arrays *

SELECT 0
USE ..\client INDEX ..\client
SEEK _dclient
_hv_shape  = client->hv_shape
_n_shape   = client->n_shape
_mfg_code  = client->mfg_code
_mat_color = client->mat_color
_s3x5      = client->s3x5
_s4x5      = client->s4x5
_s5x5      = client->s5x5
_s5x7      = client->s5x7
_s8x8      = client->s8x8
_s8x10     = client->s8x10
_s10x10    = client->s10x10
_s12x12    = client->s12x12
_s12x24    = client->s12x24
USE

_i = chrcount('/',_hv_shape)
DECLARE hv_shape[_I]
_temp = _hv_shape
FOR _j = 1 TO _i
    hv_shape[_j] = LEFT(_hv_shape,AT('/',_hv_shape)-1)
    _hv_shape = SUBSTR(_hv_shape,AT('/',_hv_shape)+1)
```

```
NEXT                                            && FOR _j = 1 TO _i
_hv_shape = _temp

_i = chrcount('/',_n_shape)
DECLARE n_shape[_i]
_temp = _n_shape
FOR _j = 1 TO _i
    n_shape[_j] = LEFT(_n_shape,AT('/',_n_shape)-1)
    _n_shape = SUBSTR(_n_shape,AT('/',_n_shape)+1)
NEXT                                            && FOR _j = 1 TO _i
_n_shape = _temp

RELEASE _temp

* Select and/or initialize book database *

USE book INDEX book, booko
GOTO TOP
DO pag_sca

* Select mat and matdiag databases *

SELECT 0
USE mats INDEX mats, matkey
GOTO TOP
SEEK _mat_id
_positions = mats->positions
_type      = mats->type
_ppf_name  = mats->ppf_name
_tsize_a   = mats->tsize_a
_tsize_b   = mats->tsize_b
_tsize_c   = mats->tsize_c
_tsize_d   = mats->tsize_d

SELECT 0
USE ..\matdiag INDEX ..\matdiag
SEEK _mat_id

SELECT book

IF VAL(_page) # 0
    DO pag_dis WITH .F., _dis_id, _dis_sz
    _cpage  = _page
    pag_ret(@_cpage)
ENDIF                                           && IF VAL(_page) # 0

SELECT photo
IF pht_ret(@_cphoto)
    DO pht_dis WITH .F.
ELSE
    msg_24('No photographs are unused...press any key',.T.,.T.,.F.)
ENDIF                                           && IF pht_ret(@_cphoto)

_cchoice = 6

DO WHILE _cchoice # 5

    @ 21,04 PROMPT 'PAGES'
    @ 21,11 PROMPT 'IMAGES'
    @ 21,19 PROMPT 'ALBUM'
    @ 21,26 PROMPT 'SPECIAL'
    @ 21,73 PROMPT 'EXIT'

    MENU TO _cchoice

    IF LASTKEY() = 27
```

```
        _cchoice = 5
    ENDIF                                   && IF LASTKEY() = 27

    _schoice = 99

    DO CASE
        CASE _cchoice = 1
            SELECT book
            IF pag_ret(@_cpage)
                DO pag_dis WITH .F., _dis_id, _dis_sz
                DO WHILE _schoice # 10
                    SET MESSAGE TO 24
                    print(21,2,'   PAGES' + CHR(26)  + SPACE(66),hcolor)
                    @ 21,14 PROMPT 'NEXT'    MESSAGE 'Display next Album Page'
                    @ 21,20 PROMPT 'PREV'    MESSAGE 'Display previous Album Page'
                    @ 21,26 PROMPT 'GOTO'    MESSAGE 'Go to a specific Album Page'
                    @ 21,32 PROMPT 'CHANGE'  MESSAGE 'Change the current Album Page - (Shuffle, Break, Join & Grab)'
                    @ 21,40 PROMPT 'DELETE'  MESSAGE 'Delete the current Album Page'
                    @ 21,48 PROMPT 'MOVE'    MESSAGE 'Move a page to a new location in the Album'
                    @ 21,54 PROMPT 'NOTE'    MESSAGE 'Add notes to photographs in the current page'
                    @ 21,60 PROMPT 'FIND'    MESSAGE 'Find Full Panels, Half Panels, and Empty Pages'
                    @ 21,66 PROMPT 'OTHER'   MESSAGE 'Match pages, toggle photo id display, toggle photo size'
                    @ 21,73 PROMPT 'EXIT'    MESSAGE 'Return to the Album Arranger Menu'

                    MENU TO _schoice

                    SET MESSAGE TO
                    @ 24,0 CLEAR

                    IF LASTKEY() = 27
                        _schoice = 10
                    ENDIF                       && IF LASTKEY() = 27

                    DO CASE
                        CASE _schoice = 1       && PAG - Next
                            DO pag_nxt
                        CASE _schoice = 2       && PAG - Prev
                            DO pag_prv
                        CASE _schoice = 3       && PAG - Goto
                            DO pag_got
                        CASE _schoice = 4       && PAG - Change
                            DO pag_mod
                        CASE _schoice = 5       && PAG - Delete
                            DO pag_del
                        CASE _schoice = 6       && PAG - Move
                            DO pag_mov
                            _cpage = _page
                        CASE _schoice = 7       && PAG - Notes
                            DO pag_nts
                        CASE _schoice = 8       && PAG - Find
                            DO pag_fnd
                        CASE _schoice = 9       && PAG - Other
                            DO pag_oth
                        CASE _schoice = 10      && PAG - Exit
                            _cpage = _page
                    ENDCASE                     && DO CASE
                ENDDO
                pp_call('CLR')
                _lastform = SPACE(1)
            ELSE
                msg_24('No pages are available, press any key...',.T.,.T.,.T.)
            ENDIF                               && IF pag_ret(@_cpage)
        CASE _cchoice = 2
            SELECT photo
            IF pht_ret(@_cphoto)
                DO pht_dis WITH .F.
```

```
            DO WHILE _schoice # 9
                SET MESSAGE TO 24
                print(21,2,'  IMAGES' + CHR(26)  + SPACE(66),hcolor)
                @ 21,14 PROMPT 'SELECT' MESSAGE 'Review multiple photographs/create pages'
                @ 21,22 PROMPT 'NEXT'   MESSAGE 'Display next photograph'
                @ 21,28 PROMPT 'PREV'   MESSAGE 'Display previous photograph'
                @ 21,34 PROMPT 'GOTO'   MESSAGE 'Go to a specific photograph'
                @ 21,40 PROMPT 'NOTES'  MESSAGE 'Add notes to the current photograph'
                @ 21,47 PROMPT 'ORIENT' MESSAGE 'Change orientation of the current photograph'
                @ 21,55 PROMPT 'SHAPE'  MESSAGE 'Change shape of the current photograph'
                @ 21,62 PROMPT 'FIND'   MESSAGE 'Find how a photograph is being used'
                @ 21,73 PROMPT 'EXIT'   MESSAGE 'Return to the Album Arranger Menu'

                MENU TO _schoice
                SET MESSAGE TO
                @ 24,0 CLEAR

                IF LASTKEY() = 27
                    _schoice = 9
                ENDIF                       && IF LASTKEY() = 27

                DO CASE
                    CASE _schoice = 1       && PHT - Select
                        DO pht_rev
                    CASE _schoice = 2       && PHT - Next
                        DO pht_nxt
                    CASE _schoice = 3       && PHT - Prev
                        DO pht_prv
                    CASE _schoice = 4       && PHT - Goto
                        DO pht_got
                    CASE _schoice = 5       && PHT - Notes
                        DO pht_nts
                    CASE _schoice = 6       && PHT - Orient
                        DO pht_ort WITH _orient
                    CASE _schoice = 7       && PHT - Shape
                        DO pht_shp WITH _orient, _shape
                    CASE _schoice = 8       && PHT - Find
                        DO pht_fnd
                    CASE _schoice = 9       && PHT - Exit
                        _cphoto = _photo_id
                ENDCASE                     && DO CASE
            ENDDO
            pp_call('CLR')
            _lastform = SPACE(1)
        ELSE
            msg_24('No photographs are unused, release from pages...press any key',.T.,.T.,.F.)
        ENDIF                               && IF pht_ret(@_cphoto)
    CASE _cchoice = 3
        SELECT book
        IF pag_ret(@_cpage)
            DO pag_dis WITH .F., _dis_id, _dis_sz
            @ 1,68 SAY _length PICTURE '99 seconds'
            DO WHILE _schoice # 8

                SET KEY -9 TO alb_tot

                SET MESSAGE TO 24
                print(21,2,'  ALBUM' + CHR(26)  + SPACE(66),hcolor)
                @ 21,14 PROMPT 'NEXT'       MESSAGE 'Display next album page'
                @ 21,20 PROMPT 'PREV'       MESSAGE 'Display previous album page'
                @ 21,26 PROMPT 'GOTO'       MESSAGE 'Go to a specific Album Page'
                @ 21,32 PROMPT 'LENGTH'     MESSAGE 'Change length of display time for album replay'
                @ 21,40 PROMPT 'BEGIN SHOW' MESSAGE 'Begin timed replay of entire album'
                @ 21,52 PROMPT 'TALLY'      MESSAGE 'Tally number of each sized print in album'
                @ 21,59 PROMPT 'PRINT'      MESSAGE 'Print album on laser printer'
                @ 21,73 PROMPT 'EXIT'       MESSAGE 'Return to the Album Arranger Menu'
```

```
MENU TO _schoice

SET MESSAGE TO
@ 24, 0 CLEAR

IF LASTKEY() = 27
     _schoice = 8
ENDIF                           && IF LASTKEY() = 27

DO CASE
     CASE _schoice = 1          && ALB - Next
          SET KEY -9 TO
          DO pag_nxt
          SET KEY -9 TO alb_tot
     CASE _schoice = 2          && ALB - Prev
          SET KEY -9 TO
          DO pag_prv
          SET KEY -9 TO alb_tot
     CASE _schoice = 3          && ALB - Goto
          SET KEY -9 TO
          DO pag_got
          SET KEY -9 TO alb_tot
     CASE _schoice = 4          && ALB - Length
          SET KEY -9 TO
          @ 1,68 GET _length PICTURE '99' RANGE 0, 99
          csron()
          READ
          csroff()
          @ 1,68 SAY _length PICTURE '99'
          SET KEY -9 TO alb_tot
     CASE _schoice = 5          && ALB - Begin Show
          SET KEY -9 TO
          DO alb_beg
          SET KEY -9 TO alb_tot
     CASE _schoice = 6          && ALB - Tally
          SET KEY -9 TO
          DO alb_tal
          SET KEY -9 TO alb_tot
     CASE _schoice = 7          && ALB - Print
          SET KEY -9 TO
          DO alb_prt
          SET KEY -9 TO alb_tot
     CASE _schoice = 8          && ALB - Exit
          SET KEY -9 TO
          print(1,68,SPACE(10))
     ENDCASE                    && DO CASE
ENDDO
SET KEY -9 TO
pp_call('CLR')
_lastform = SPACE(1)
ELSE
     msg_24('No pages are available in Album, press any key...',.T.,.T.,.T.)
ENDIF                           && IF pag_ret(@_cpage)
CASE _cchoice = 4
     SELECT book
     DO WHILE _schoice # 4
          SET MESSAGE TO 24
          print(21,2,' SPECIAL' + CHR(26)  + SPACE(66),hcolor)
          @ 21,14 PROMPT 'CHANGE ALBUM MFG' MESSAGE 'Change the Manufacturer of the Album'
          @ 21,33 PROMPT 'PHOTO STATS'      MESSAGE 'Display photo usage statistics'
          @ 21,46 PROMPT 'DELETE ALBUM'     MESSAGE 'Deletes all the pages in the current Album'
          @ 21,73 PROMPT 'EXIT'             MESSAGE 'Return to the Album Arranger Menu'

          MENU TO _schoice
```

```
            SET MESSAGE TO
            @ 24, 0 CLEAR

            IF LASTKEY() = 27
                _schoice = 4
            ENDIF                           && IF LASTKEY() = 27

            DO CASE
                CASE _schoice = 1           && SPC - Change Manufactures
                    DO spc_mfg
                CASE _schoice = 2           && SPC - Photo Stats
                    DO spc_sta
                CASE _schoice = 3           && SPC - Delete Album
                    DO spc_del
                CASE _schoice = 4           && SPC - Exit
            ENDCASE                         && DO CASE
        ENDDO

    CASE _cchoice = 5
        SELECT photo
        USE
        SELECT book
        USE
        SELECT mats
        USE
        SELECT matdiag
        USE
        pp_call('CLR')
        chdir('..')
        RETURN
  ENDCASE                                   && DO CASE
  print(21,2,SPACE(75))
ENDDO                                       && DO WHILE _cchoice # 5

RETURN

*
*       Author: Glenn Holcomb
*   Date Created: 04/18/91
*   Time Created: 12:42:07
*
*

FUNCTION pag_ret

    PARAMETERS _cpage

    PRIVATE _gpage

    _gpage = .F.

    IF .NOT. EMPTY(_cpage)
        SET ORDER TO 2
        SET SOFTSEEK ON
        SEEK VAL(_cpage)
        SET SOFTSEEK OFF
        SET ORDER TO 1
        IF VAL(page) # 0 .AND. .NOT. EOF()
            DO pag_sca
            _gpage = .T.
        ELSE
            GOTO TOP
            IF VAL(page) # 0
                DO pag_sca
                _gpage = .T.
                _cpage = _page
```

```
            ELSE
                _cpage = SPACE(3)
            ENDIF                                  && IF VAL(page) # 0 .OR. BOF()
        ENDIF                                      && IF VAL(page) # 0 .AND. .NOT. EOF()
    ELSE
        GOTO TOP
        IF VAL(page) # 0
            DO pag_sca
            _gpage = .T.
            _cpage = _page
        ELSE
            _cpage = SPACE(3)
        ENDIF                                      && IF VAL(page) # 0 .OR. BOF()
    ENDIF                                          && IF .NOT. EMPTY(_cpage)

RETURN(_gpage)                                     && FUNCTION pag_ret

*
*       Author: Glenn Holcomb
*   Date Created: 04/18/91
*   Time Created: 12:42:07
*
*

FUNCTION pht_ret

    PARAMETERS _cphoto

    PRIVATE _gphoto

    _gphoto = .F.

    IF .NOT. EMPTY(_cphoto)
        SET SOFTSEEK ON
        SEEK STR(_cphoto,5,0)
        SET SOFTSEEK OFF
        IF .NOT. EOF() .AND. .NOT. used
            DO pht_sca
            _gphoto = .T.
        ELSE
            GOTO TOP
            DO WHILE used .AND. .NOT. EOF()
                SKIP 1
                DO pht_sca
            ENDDO
            IF .NOT. EOF()
                _cphoto = _photo_id
                _gphoto = .T.
            ELSE
                _cphoto = 0
            ENDIF                                  && IF .NOT. EOF()
        ENDIF                                      && IF FOUND()
    ELSE
        GOTO TOP
        DO WHILE used .AND. .NOT. EOF()
            SKIP 1
            DO pht_sca
        ENDDO
        IF .NOT. EOF()
            _cphoto = _photo_id
            _gphoto = .T.
        ELSE
            _cphoto = 0
        ENDIF                                      && IF .NOT. EOF()
    ENDIF                                          && IF .NOT. EMPTY(_cphoto)
```

```
RETURN(_gphoto)                                && FUNCTION pht_ret

*
*          Author: Glenn Holcomb
*    Date Created: 05/07/91
*    Time Created: 17:38:17
*
*

FUNCTION nextpage

    PRIVATE _rec, _temp, _sel

    _sel = SELECT()
    SELECT book

    _rec = RECNO()

    GOTO BOTTOM
    IF .NOT. BOF()
        IF is_1224
            _temp = VAL(book->page) + 2
        ELSE
            _temp = VAL(book->page) + 1
        ENDIF                                  && IF is_1224
    ELSE
        _temp = 1
    ENDIF                                      && IF .NOT. BOF()
    GOTO _rec

    SELECT (_sel)

RETURN(_temp)                                  && FUNCTION lastpage
```

```
*.........................................................................
*
*   Program Name: CLI_ARC.PRG        Copyright: EPIX Corporation
*   Date Created: 04/10/91            Language: Clipper
*   Time Created: 15:41:35              Author: Glenn Holcomb
*
*.........................................................................

PRIVATE _sscreen, _path, _handle, _text, _tclient, _rec
DECLARE flds[2], head[2]

USE client INDEX client
flds[1] = 'CLIENT'
flds[2] = 'CLI_NAME'
head[1] = 'Client'
head[2] = 'Client Name'

* Query for client to be archived *

msg_24('Please select the client you wish to transfer to tape and press ENTER...',.F.,.F.)

GOTO TOP
IF .NOT. EOF()
    box(4,12,17,68,"┌─┐│┘─└│",color,1,8)
    DBEDIT(5,13,16,67,flds,'','',head)

    @ 24, 0 CLEAR

    IF lastkey() # 27
        IF queryb('Transfer client ' + ALLTRIM(client) + ' ')

            * Write out client.txt file for reload from different machine *
            msg_24('Writing client image file...',.f.,.f.,.f.)
            _rec = RECNO()
            _tclient = client
            chdir(_tclient)
            COPY TO CLIENT.TXT FOR _tclient = client SDF
            chdir('..')
            GOTO _rec
            @ 24, 0 CLEAR

            msg_24('Insert formatted tape labeled ' + ALLTRIM(CLIENT) + ' ' + DTOC(DATE()) + ', press any key to begin',.T.,.T.)
            _handle = FCREATE('arch.bat')
            _text   = '@ECHO OFF'
            FWRITELINE(_handle,_text)
            _text   = 'C:\MTN_TAPE\TAPE SBK ' + _drive + ':.\' + ALLTRIM(client) + '\*.* /L' + ALLTRIM(client) + '/V/E/D'
            FWRITELINE(_handle,_text)
            _text   = 'IF ERRORLEVEL 5 GOTO ERROR5'
            FWRITELINE(_handle,_text)
            _text   = 'IF ERRORLEVEL 4 GOTO ERROR4'
            FWRITELINE(_handle,_text)
            _text   = 'IF ERRORLEVEL 3 GOTO ERROR3'
            FWRITELINE(_handle,_text)
            _text   = 'IF ERRORLEVEL 2 GOTO ERROR2'
            FWRITELINE(_handle,_text)
            _text   = 'IF ERRORLEVEL 1 GOTO ERROR1'
            FWRITELINE(_handle,_text)
            _text   = 'GOTO OKAY'
            FWRITELINE(_handle,_text)
            _text   = ':ERROR5'
            FWRITELINE(_handle,_text)
            _text   = 'AMENU ERROR ARCHIVE 5 ' + ALLTRIM(client)
            FWRITELINE(_handle,_text)
            _text   = ':ERROR4'
            FWRITELINE(_handle,_text)
            _text   = 'AMENU ERROR ARCHIVE 4 ' + ALLTRIM(client)
```

```
            FWRITELINE(_handle,_text)
             _text   = ':ERROR3'
            FWRITELINE(_handle,_text)
             _text   = 'AMENU ERROR ARCHIVE 3 ' + ALLTRIM(client)
            FWRITELINE(_handle,_text)
             _text   = ':ERROR2'
            FWRITELINE(_handle,_text)
             _text   = 'AMENU ERROR ARCHIVE 2 ' + ALLTRIM(client)
            FWRITELINE(_handle,_text)
             _text   = ':ERROR1'
            FWRITELINE(_handle,_text)
             _text   = 'AMENU ERROR ARCHIVE 1 ' + ALLTRIM(client)
            FWRITELINE(_handle,_text)
             _text   = ':OKAY'
            FWRITELINE(_handle,_text)
             _text   = 'AMENU ARCHIVE ' + ALLTRIM(client)
            FWRITELINE(_handle,_text)
            FCLOSE(_handle)
            KEYBOARD 'EE'
        ENDIF                                   && IF queryb('Archive client ' + ALLTRIM(client) + ' ')
    ENDIF                                       && IF lastkey() # 27
ELSE
    msg_24('No clients available to archive...press any key',.T.,.T.)
ENDIF                                           && IF .NOT. EOF()
USE
RETURN
```

```
*.........................................................................
*
*   Program Name: ALB_PRT.PRG       Copyright: EPIX Corporation
*   Date Created: 06/24/91           Language: Clipper
*   Time Created: 15:39:51             Author: Glenn Holcomb
*
*.........................................................................

PRIVATE _side

IF queryb('Print Album?')
    _cmd = 'INIPRT'
    pp_call(@_cmd)
    _cmd = 'PRTLIN Y=1500 C=0 H=2300'
    pp_call(@_cmd)
    msg_24('Press ESCAPE to interupt printing Album...',.F.,.F.)
    GOTO TOP
    DO pag_sca
    DO WHILE .NOT. EOF() .AND. lastkey() # 27 .AND. VAL(ALLTRIM(_page)) # 0
        DO pag_dis WITH .T., _dis_id, _dis_sz
        INKEY(1)
        IF _is_1224
            _side = ' L/R '
        ELSE
            IF VAL(_page)/2 = INT(VAL(_page)/2)
                _side = 'Left '
            ELSE
                _side = 'Right'
            ENDIF                               && IF VAL(_page)/2 = INT(VAL(_page)/2)
        ENDIF                                   && IF _is_1224

        DO CASE
            CASE _side = 'Left '
                _cmd = 'INIPRT'
                pp_call(@_cmd)
                _cmd = 'PRTLIN Y=1500 C=0 H=2300'
                pp_call(@_cmd)
                _cmd = 'PRTREC B=1 Y=150 X=525'
                pp_call(@_cmd)
            CASE _side = 'Right'
                _cmd = 'PRTREC B=1 Y=1950 X=525'
                pp_call(@_cmd)
            CASE _side = ' L/R '
                _cmd = 'PRTREC B=1 Y=1000 X=525'
                pp_call(@_cmd)
        ENDCASE                                 && DO CASE

        _cmd = 'PRTFLD PAGE ' + _page
        pp_call(@_cmd)

        _cmd = 'PRTFLD SIDE ' + _side
        pp_call(@_cmd)

        IF .NOT. EMPTY(_dbp_a)
            _cmd = 'PRTFLD DBP_A ' + _dbp_a
            pp_call(@_cmd)
        ENDIF                                   && IF .NOT. EMPTY(_dbp_a)
        INKEY(1)

        IF .NOT. EMPTY(_dbp_b)
            _cmd = 'PRTFLD DBP_B ' + _dbp_b
            pp_call(@_cmd)
        ENDIF                                   && IF .NOT. EMPTY(_dbp_b)
        INKEY(1)

        IF .NOT. EMPTY(_dbp_c)
```

```
        _cmd = 'PRTFLD DBP_C ' + _dbp_c
        pp_call(@_cmd)
     ENDIF                                   && IF .NOT. EMPTY(_dbp_c)
     INKEY(1)

     IF .NOT. EMPTY(_dbp_d)
        _cmd = 'PRTFLD DBP_D ' + _dbp_d
        pp_call(@_cmd)
     ENDIF                                   && IF .NOT. EMPTY(_dbp_d)
     INKEY(1)

     IF .NOT. EMPTY(_id_a)
        _cmd = 'PRTFLD ID_A ' + STR(_id_a,5,0)
        pp_call(@_cmd)
     ENDIF                                   && IF .NOT. EMPTY(_id_a)

     IF .NOT. EMPTY(_id_b)
        _cmd = 'PRTFLD ID_B ' + STR(_id_b,5,0)
        pp_call(@_cmd)
     ENDIF                                   && IF .NOT. EMPTY(_id_b)

     IF .NOT. EMPTY(_id_c)
        _cmd = 'PRTFLD ID_C ' + STR(_id_c,5,0)
        pp_call(@_cmd)
     ENDIF                                   && IF .NOT. EMPTY(_id_c)

     IF .NOT. EMPTY(_id_d)
        _cmd = 'PRTFLD ID_D ' + STR(_id_d,5,0)
        pp_call(@_cmd)
     ENDIF                                   && IF .NOT. EMPTY(_id_d)

     IF _side = 'Right' .OR. _side = ' L/R '
        _cmd = 'RSTPRT'
        pp_call(@_cmd)
     ENDIF                                   && IF .NOT. _top

     SKIP 1
     DO pag_sca
  ENDDO                                      && DO WHILE .NOT. EOF()
  _cmd = 'RSTPRT'
  pp_call(@_cmd)
  IF lastkey() = 27
     KEYBOARD CHR(32)
  ENDIF                                      && IF lastkey() = 27
  GOTO TOP
ENDIF                                        && IF queryb('Print Album?')
DO pag_sca
DO pag_dis WITH .T., _dis_id, _dis_sz

RETURN


*       pp_call('PRTFLD SIZE_A ' + SPACE(5 - LEN(ALLTRIM(RIGHT(MATS->TSIZE_A,5)))) + ALLTRIM(RIGHT(MATS->TSIZE_A,5)))
*       pp_call('PRTFLD SIZE_B ' + SPACE(5 - LEN(ALLTRIM(RIGHT(MATS->TSIZE_B,5)))) + ALLTRIM(RIGHT(MATS->TSIZE_B,5)))
*       pp_call('PRTFLD SIZE_C ' + SPACE(5 - LEN(ALLTRIM(RIGHT(MATS->TSIZE_C,5)))) + ALLTRIM(RIGHT(MATS->TSIZE_C,5)))
*       pp_call('PRTFLD SIZE_D ' + SPACE(5 - LEN(ALLTRIM(RIGHT(MATS->TSIZE_D,5)))) + ALLTRIM(RIGHT(MATS->TSIZE_D,5)))
```

```
*........................................................................
*
*   Program Name: ALB_TAL.PRG       Copyright: EPIX Corporation
*   Date Created: 06/05/91           Language: Clipper
*   Time Created: 13:21:06             Author: Glenn Holcomb
*
*........................................................................

PRIVATE _rec, _i, _tsize, _mrec, _sscreen, _nopages

msg_24('Please wait while tallying...',.f.,.f.,.f.)

SELECT 0
USE ..\tots
ZAP
INDEX ON item TO ..\tots

SELECT mats
_mrec = RECNO()

SELECT book
_rec = RECNO()
GOTO TOP

DO WHILE .NOT. EOF() .AND. VAL(ALLTRIM(page)) # 0
    SELECT mats
    SEEK book->mat_id
    IF FOUND()
        FOR _i = 65 TO 68
            _tsize = 'mats->tsize_' + CHR(_i)
            IF .NOT. EMPTY(&_tsize)
                SELECT tots
                SEEK ALLTRIM(RIGHT(&_tsize,5))
                IF .NOT. FOUND()
                    APPEND BLANK
                    REPLACE item WITH ALLTRIM(RIGHT(&_tsize,5))
                ENDIF                               && IF .NOT. FOUND()
                REPLACE tots->quantity WITH tots->quantity + 1
            ENDIF                                   && IF .NOT. EMPTY(&_tsize)
        NEXT                                        && FOR _i = 65 TO 69
    ELSE
        msg_24('System error in ALB_TAL, mat ' + book->mat_id + ' not found, press any key',.t.,.t.,.t.)
    ENDIF                                           && IF FOUND()
    SELECT book
    SKIP 1
ENDDO                                               && DO WHILE .NOT. EOF() .AND. VAL(ALLTRIM(page)) # 0

SELECT book
_nopages = nextpage() - 1

SELECT tots
GOTO TOP
DECLARE flds[2], head[2]

@ 24, 0 CLEAR

_sscreen = savescreen()

IF _nopages = 1
    msg_24('Tally complete, there is 1 page in the album, press ESC to continue',.f.,.t.,.f.)
ELSE
    msg_24('Tally complete, there are ' + ALLTRIM(STR(_nopages)) + ' pages in the album, press ESC to continue',.f.,.t.,.f.)
ENDIF                                               && IF _nopages = 1

flds[1] = 'ITEM'
flds[2] = 'QUANTITY'
```

```
head[1] = 'Size'
head[2] = 'Quantity'

box(4,25,17,55,"┌─┐│┘─└│ ",color,1,8)
DBEDIT(5,26,16,54,flds,'','',head)

RELEASE flds, head
restscreen(_sscreen)

SELECT tots
USE

SELECT mats
GOTO _mrec
SELECT book
GOTO _rec

RETURN
```

```
*.........................................................................
*
*    Program Name: ALB_TOT.PRG       Copyright: EPIX Corporation
*    Date Created: 06/13/91           Language: Clipper
*    Time Created: 14:43:52             Author: Glenn Holcomb
*
*.........................................................................

PRIVATE _rec, _i, _tsize, _mrec, _sscreen, _nopages, _sunit, _cont, _deposit

SET KEY -9 TO

msg_24('Please wait while totaling...',.f.,.f.,.f.)

SELECT 0
USE ..\tots
ZAP
INDEX ON item TO ..\tots
INDEX ON order TO ..\toto
SET INDEX TO ..\tots, ..\toto

SELECT mats
_mrec = RECNO()

SELECT book
_rec = RECNO()
GOTO TOP

* Loop gets the totals for each size print *

DO WHILE .NOT. EOF() .AND. VAL(ALLTRIM(page)) # 0
    SELECT mats
    SEEK book->mat_id
    IF FOUND()
        FOR _i = 65 TO 68
            _tsize = 'mats->tsize_' + CHR(_i)
            IF .NOT. EMPTY(&_tsize)
                SELECT tots
                SEEK ALLTRIM(RIGHT(&_tsize,5))
                IF .NOT. FOUND()
                    APPEND BLANK
                    REPLACE item WITH ALLTRIM(RIGHT(&_tsize,5))
                ENDIF                                               && IF .NOT. FOUND()
                REPLACE tots->quantity WITH tots->quantity + 1
            ENDIF                                                   && IF .NOT. EMPTY(&_tsize)
        NEXT                                                        && FOR _i = 65 TO 69
    ELSE
        msg_24('System error in ALB_TOT, mat ' + book->mat_id + ' not found, press any key',.t.,.t.,.t.)
    ENDIF                                                           && IF FOUND()
    SELECT book
    SKIP 1
ENDDO                                                               && DO WHILE .NOT. EOF() .AND. VAL(ALLTRIM(page)) # 0

* Loop calculates price of each item *

_deposit = 0

SELECT 0
USE price INDEX price, pricet, priceo
SELECT tots
GOTO TOP
DO WHILE .NOT. EOF()
    SELECT price
    SET ORDER TO 1
    SEEK tots->item
    IF .NOT. FOUND()
```

```
     msg_24('Item ' + ALLTRIM(tots->item) + ' not found in price file, press any key',.t.,.t.,.t.)
  ELSE
     SET ORDER TO 2

     REPLACE tots->p_qty   WITH price->p_qty                              && ps
     REPLACE tots->p_price WITH price->p_price                            && ps

     REPLACE tots->uprice  WITH price->price
     REPLACE tots->desc    WITH price->desc
     REPLACE tots->order   WITH price->order
     _sunit = tots->quantity
     _cont = .T.
     DO WHILE _cont
        IF _sunit <= tots->p_qty                                          && ps
           REPLACE tots->stotal WITH (_sunit - tots->p_qty) * tots->p_price  && ps
           _cont = .F.
        ELSE                                                              && ps
           IF _sunit >= price->tier_high
              IF tots->p_qty = 0                                          && ps
                 REPLACE tots->stotal WITH tots->stotal + ((price->tier_high - price->tier_low) * price->price)
              ELSE                                                        && ps
                 DO CASE                                                  && ps
                    CASE tots->p_qty >= price->tier_high                  && ps
                       REPLACE tots->stotal WITH tots->stotal + 0         && ps
                    CASE tots->p_qty < price->tier_high .AND. tots->p_qty >= tier_low  && ps
                       REPLACE tots->stotal WITH tots->stotal + ((price->tier_high - price->tier_low - tots->p_qty) * price->price)  && ps
                    CASE tots->p_qty < tier_low                           && ps
                       REPLACE tots->stotal WITH tots->stotal + ((price->tier_high - price->tier_low) * price->price)  && ps
                 ENDCASE                                                  && DO CASE  && ps
              ENDIF                                                       && IF tots->p_qty = 0 && ps
           ELSEIF _sunit >= price->tier_low
              IF tots->p_qty = 0                                          && ps
                 REPLACE tots->stotal WITH tots->stotal + ((_sunit - price->tier_low) * price->price)
                 _cont = .F.
              ELSE                                                        && ps
                 DO CASE                                                  && ps
                    CASE tots->p_qty >= price->tier_low                   && ps
                       REPLACE tots->stotal WITH tots->stotal + ((_sunit - tots->p_qty) * price->price)  && ps
                    CASE tots->p_qty < tier_low                           && ps
                       REPLACE tots->stotal WITH tots->stotal + ((_sunit - price->tier_low) * price->price)  && ps
                 ENDCASE                                                  && DO CASE  && ps
                 _cont = .T.
              ENDIF                                                       && IF tots->p_qty = 0 && ps
           ENDIF                                                          && IF _sunit >= price->tier_high
           IF tier_high = 99999
              _cont = .F.
           ELSE
              SKIP 1
           ENDIF                                                          && IF tier_high = 99999
        ENDIF                                                             && IF _sunit <= tots->p_qty && ps
     ENDDO                                                                && DO WHILE _cont
     SEEK tots->item
     DO CASE
        CASE disc_typ = 'D'
           REPLACE tots->dtotal WITH disc
        CASE disc_typ = 'P'
           REPLACE tots->dtotal WITH tots->stotal * (disc / 100)
        OTHERWISE
           REPLACE tots->dtotal WITH 0
     ENDCASE                                                              && DO CASE
     REPLACE tots->etotal WITH tots->stotal - tots->dtotal
  ENDIF                                                                   && IF .NOT. FOUND()
  SELECT tots
  SKIP 1
ENDDO                                                                     && DO WHILE .NOT. EOF()
```

```
@ 24, 0 CLEAR

* Add constant line items *

SELECT price
SET ORDER TO 3

SET SOFTSEEK ON
SEEK '20'
SET SOFTSEEK OFF

DO WHILE price->order < 90
    SELECT tots
    APPEND BLANK
    replace tots->order      with price->order
    replace tots->quantity   with price->quantity
    replace tots->item       with price->item
    replace tots->desc       with price->desc
    replace tots->uprice     with price->price
    replace tots->etotal     with price->price * price->quantity
    SELECT price
    SKIP 1
ENDDO                                                       && DO WHILE price->order < 90

* Calculate all the totals *

PRIVATE _stot1, _stot2, _stot3, _disc, _stax, _ship, _tot, _bal
_stot1 = 0
_stot2 = 0
_stot3 = 0
_disc  = 0
_stax  = 0
_ship  = 0
_tot   = 0
_bal   = 0

SELECT tots
GOTO TOP
DO WHILE .NOT. EOF()
    _stot1 = _stot1 + tots->etotal
    SKIP 1
ENDDO                                                       && DO WHILE .NOT. EOF()

APPEND BLANK
replace tots->order      with 90
replace tots->quantity   with 1
replace tots->item       with 'SUBTOTAL1'
replace tots->desc       with 'Subtotal'
replace tots->etotal     with _stot1

SELECT price
SET ORDER TO 1
SEEK 'DISCOUNT'
DO CASE
    CASE disc_typ = 'D'
        _disc = price->disc
    CASE disc_typ = 'P'
        _disc = ROUND(_stot1 * (price->disc / 100),2)
    OTHERWISE
        _disc = 0
ENDCASE                                                     && DO CASE

SELECT tots

IF .NOT. EMPTY(_disc)
    APPEND BLANK
```

```
    replace tots->quantity   with 1
    replace tots->order      with 91
    replace tots->item       with 'DISCOUNT'
    replace tots->desc       with 'Discount'
    replace tots->etotal     with _disc
ENDIF                                                                && IF .NOT. EMPTY(_disc)

_stot2 = _stot1 - _disc

SELECT price
SEEK 'SALESTAX'
_stax = ROUND(_stot2 * (price->disc / 100),2)

SELECT tots

IF .NOT. EMPTY(_stax)
    APPEND BLANK
    replace tots->quantity   with 1
    replace tots->order      with 92
    replace tots->item       with 'SALESTAX'
    replace tots->desc       with 'Sales Tax'
    replace tots->etotal     with _stax
ENDIF                                                                && IF .NOT. EMPTY(_stax)

_stot3 = _stot2 + _stax

SELECT price
SEEK 'SHIPPING'
_ship = price->price

SELECT tots

IF .NOT. EMPTY(_ship)
    APPEND BLANK
    replace tots->quantity   with 1
    replace tots->order      with 93
    replace tots->item       with 'SHIPPING'
    replace tots->desc       with 'Shipping & Handling'
    replace tots->etotal     with _ship
ENDIF                                                                && IF .NOT. EMPTY(_stax)

APPEND BLANK
_tot = _stot3 + _ship
replace tots->quantity   with 1
replace tots->order      with 94
replace tots->item       with 'TOTAL'
replace tots->desc       with 'Total'
replace tots->etotal     with _tot

SELECT price
SEEK 'DEPOSIT'
_deposit = price->price

SELECT tots

APPEND BLANK
replace tots->quantity   with 1
replace tots->order      with 95
replace tots->item       with 'DEPOSIT'
replace tots->desc       with 'Deposit'
replace tots->etotal     with _deposit

APPEND BLANK
_bal = _tot - _deposit
replace tots->quantity   with 1
replace tots->order      with 96
```

```
replace tots->item       with 'BALANCE'
replace tots->desc       with 'Balance'
replace tots->etotal     with _bal

SELECT price
USE

IF queryb('Display totals? ')

    SELECT tots
    SET ORDER TO 2
    GOTO TOP
    DECLARE flds[3], head[3]

    _sscreen = savescreen()

    msg_24('Use the arrows to scroll, ESC to exit',.f.,.f.,.t.)

    flds[1] = 'LEFT(DESC,30)'
    flds[2] = 'QUANTITY'
    flds[3] = 'ETOTAL'
    head[1] = 'Description'
    head[2] = 'Quantity'
    head[3] = 'Extended;  Price'

    box(4,10,17,69,"┌┐│┘─└│ ",color,1,8)
    DBEDIT(5,11,16,68,flds,'','',head)

    RELEASE flds, head
    restscreen(_sscreen)

ENDIF                                                && IF queryb('Display totals? ')

SELECT tots
USE

SELECT mats
GOTO _mrec
SELECT book
GOTO _rec

SET KEY -9 TO alb_tot

RETURN
```

```
*..........................................................................
*
*    Program Name: BRK_FRE.PRG       Copyright: EPIX Corporation
*    Date Created: 07/03/91           Language: Clipper
*    Time Created: 12:07:36             Author: Glenn Holcomb
*
*..........................................................................

PARAMETER _noqueue, hold, _added, _exqueue, exhold
PRIVATE _newpage, _no_pics, _i, _j, _temp, _tval, _prec, _matkey, _rec, _mrec

_added = .T.

SELECT photo
_prec = RECNO()

msg_24('Please wait while breaking images...',.f.,.f.,.f.)

* Construct matkey for existing pages minus the broken pictures *

_matkey = STR(_exqueue,1,0)
DECLARE _type[_exqueue]
_j = 1
FOR _i = 1 TO _exqueue
    SEEK STR(exhold[_i],5,0)
    IF FOUND()
        _type[_j] = photo->orient + photo->shape
        _j = _j + 1
    ELSE
        msg_24('System error in BRK_PAG...unable to find photo ' + ALLTRIM(STR(_tval,5,0)) + ', press any key',.t.,.t.,.t.)
    ENDIF
NEXT                                                  && FOR _i = 1 TO _exqueue
GOTO _prec
ASORT(_type)
FOR _i = 1 TO _exqueue
    _matkey = _matkey + _type[_i]
NEXT                                                  && FOR _i = 1 TO _exqueue

RELEASE _type

store space(5)         to _mat_id
store .f.              to _is_T224
store space(1)         to _matched
store space(10)        to _dbp_a
store space(10)        to _dbp_b
store space(10)        to _dbp_c
store space(10)        to _dbp_d
store 0                to _id_a
store 0                to _id_b
store 0                to _id_c
store 0                to _id_d

* Create array of valid mats *

SELECT mats
_mrec = RECNO()
SET FILTER TO prime
GOTO TOP
SET ORDER TO 2
SEEK _matkey
SET ORDER TO 1

IF .NOT. FOUND()
    msg_24('No mats are available for this photo combination...press any key',.t.,.t.,.f.)
    _added = .F.
ELSE
```

```
_mat_id = mats->mat_id
DECLARE photo_id_[_exqueue],type_[_exqueue]

SELECT photo
_prec = RECNO()
_j = 1
FOR _i = 1 to _exqueue
    IF .NOT. EMPTY(exhold[_i])
        photo_id_[_j] = exhold[_i]
        SEEK STR(photo_id_[_j],5,0)
        type_[_j] = photo->orient + photo->shape
        _j = _j + 1
    ENDIF                                      && IF .NOT. EMPTY(exhold[_i])
NEXT                                           && FOR _i = 1 to 4

FOR _i = 1 TO _exqueue
    FOR _j = 65 TO 68
        id_   = '_id_' + CHR(_j)
        dbp_  = '_dbp_' + CHR(_j)
        tsize_ = 'mats->tsize_' + CHR(_j)
        size_ = ALLTRIM(RIGHT(&tsize_,5))
        IF type_[_i] = LEFT(&tsize_,2) .AND. EMPTY(&id_) .AND. .NOT. EMPTY(photo_id_[_i])
            SEEK STR(photo_id_[_i],5,0)
            REPLACE used WITH .T.
            &id_ = photo_id_[_i]
            DO CASE
                CASE size_ = '3X5' .OR. size_ = '4X5' .OR. size_ = '5X5'
                    &dbp_ = photo->dbp_small
                CASE size_ = '5X7' .OR. size_ = '8X8'
                    &dbp_ = photo->dbp_med
                CASE size_ = '8X10' .OR. size_ = '10X10'
                    &dbp_ = photo->dbp_lge
                CASE size_ = '12X12'
                    &dbp_ = photo->dbp_1212
                CASE size_ = '12X24'
                    &dbp_ = photo->dbp_1224
                    is_1224_ = .T.
            ENDCASE                            && DO CASE
            photo_id_[_i] = 0
        ENDIF                                  && IF type_[_i] = LEFT(&tsize_,2) .AND. EMPTY(&id_)
    NEXT                                       && FOR _j = 65 TO 68
NEXT                                           && FOR _i = 1 TO _exqueue
ENDIF                                          && IF .NOT. FOUND()

SELECT mats
SET FILTER TO
GOTO _mrec
SELECT book

IF _added
    SELECT book
    replace book->mat_id     with _mat_id
    replace book->is_1224    with _is_1224
    replace book->matched    with _matched
    replace book->dbp_a      with _dbp_a
    replace book->dbp_b      with _dbp_b
    replace book->dbp_c      with _dbp_c
    replace book->dbp_d      with _dbp_d
    replace book->id_a       with _id_a
    replace book->id_b       with _id_b
    replace book->id_c       with _id_c
    replace book->id_d       with _id_d
    DO pag_sca
    SELECT photo
    FOR _i = 1 TO _noqueue
        SEEK STR(hold[_i],5,0)
```

```
        IF FOUND()
            REPLACE used WITH .F.
        ELSE
            msg_24('System error in BRK_PAG...unable to find photo ' + ALLTRIM(STR(_tval,5,0)) + ', press any key',.t.,.t.,.t.)
        ENDIF
    NEXT                                        && FOR _i = 1 TO _exqueue
    GOTO _prec
    SELECT book
ENDIF                                           && IF _added

SELECT mats
SET FILTER TO
GOTO _mrec
SELECT book

RETURN
```

```
*............................................................................
*
*   Program Name: BRK_PAG.PRG       Copyright: EPIX Corporation
*   Date Created: 07/03/91           Language: Clipper
*   Time Created: 12:07:26             Author: Glenn Holcomb
*
*............................................................................

PARAMETER _noqueue, hold, _added, _exqueue, exhold
PRIVATE _newpage, _no_pics, _i, _j, _temp, _tval, _prec, _matkey, _rec, _mrec

_added = .T.

store space(3)         to page_
store space(3)         to newpage_
store space(5)         to mat_id_
store .f.              to is_1224_
store space(1)         to matched_
store space(10)        to dbp_a_
store space(10)        to dbp_b_
store space(10)        to dbp_c_
store space(10)        to dbp_d_
store 0                to id_a_
store 0                to id_b_
store 0                to id_c_
store 0                to id_d_

SELECT photo

msg_24('Please wait while breaking images...',.f.,.f.,.f.)

* Construct matkey for current group *

_matkey = STR(_noqueue,1,0)
DECLARE _type[_noqueue]
_prec = RECNO()
_j = 1
FOR _i = 1 TO _noqueue
    SEEK STR(hold[_i],5,0)
    IF FOUND()
        _type[_j] = photo->orient + photo->shape
        _j = _j + 1
    ELSE
        msg_24('System error in BRK_PAG...unable to find photo ' + ALLTRIM(STR(_tval,5,0)) + ', press any key',.t.,.t.,.t.)
    ENDIF
NEXT                                            && FOR _i = 1 TO _noqueue
GOTO _prec
ASORT(_type)
FOR _i = 1 TO _noqueue
    _matkey = _matkey + _type[_i]
NEXT                                            && FOR _i = 1 TO _noqueue

RELEASE _type

* Create array of valid mats *
SELECT mats
_mrec = RECNO()
SET FILTER TO prime
GOTO TOP
SET ORDER TO 2
SEEK _matkey
SET ORDER TO 1

IF .NOT. FOUND()
    msg_24('No mats are available for this photo combination...press any key',.t.,.t.,.f.)
    _added = .F.
```

```
ELSE
    mat_id_ = mats->mat_id
    DECLARE photo_id_[_noqueue],type_[_noqueue]
    PRIVATE id_, dbp_, tsize_, size_

    SELECT photo
    _prec = RECNO()
    _j = 1
    FOR _i = 1 to _noqueue
        IF .NOT. EMPTY(hold[_i])
            photo_id_[_j] = hold[_i]
            SEEK STR(photo_id_[_j],5,0)
            type_[_j] = photo->orient + photo->shape
            _j = _j + 1
        ENDIF                                   && IF .NOT. EMPTY(hold[_i])
    NEXT                                        && FOR _i = 1 to 4

    FOR _i = 1 TO _noqueue
        FOR _j = 65 TO 68
            id_    = 'id_' + CHR(_j) + '_'
            dbp_   = 'dbp_' + CHR(_j) + '_'
            tsize_ = 'mats->tsize_' + CHR(_j)
            size_  = ALLTRIM(RIGHT(&tsize_,5))
            IF type_[_i] = LEFT(&tsize_,2) .AND. EMPTY(&id_) .AND. .NOT. EMPTY(photo_id_[_i])
                SEEK STR(photo_id_[_i],5,0)
                REPLACE used WITH .T.
                &id_ = photo_id_[_i]
                DO CASE
                    CASE size_ = '3X5' .OR. size_ = '4X5' .OR. size_ = '5X5'
                        &dbp_ = photo->dbp_small
                    CASE size_ = '5X7' .OR. size_ = '8X8'
                        &dbp_ = photo->dbp_med
                    CASE size_ = '8X10' .OR. size_ = '10X10'
                        &dbp_ = photo->dbp_lge
                    CASE size_ = '12X12'
                        &dbp_ = photo->dbp_1212
                    CASE size_ = '12X24'
                        &dbp_ = photo->dbp_1224
                        is_1224_ = .T.
                ENDCASE                         && DO CASE
                photo_id_[_i] = 0
            ENDIF                               && IF type_[_i] = LEFT(&tsize_,2) .AND. EMPTY(&id_)
        NEXT                                    && FOR _j = 65 TO 68
    NEXT                                        && FOR _i = 1 TO _noqueue

    SELECT photo

    RELEASE photo_id_,type_

    * Construct matkey for existing pages minus the broken pictures *

    _matkey = STR(_exqueue,1,0)
    DECLARE _type[_exqueue]
    _j = 1
    FOR _i = 1 TO _exqueue
        SEEK STR(exhold[_i],5,0)
        IF FOUND()
            _type[_j] = photo->orient + photo->shape
            _j = _j + 1
        ELSE
            msg_24('System error in BRK_PAG...unable to find photo ' + ALLTRIM(STR(_tval,5,0)) + ', press any key',.t.,.t.,.t.)
        ENDIF
    NEXT                                        && FOR _i = 1 TO _exqueue
    GOTO _prec
    ASORT(_type)
    FOR _i = 1 TO _exqueue
```

```
    _matkey = _matkey + _type[_i]
NEXT                                              && FOR _i = 1 TO _exqueue

RELEASE _type

store space(5)          to _mat_id
store .f.               to _is_1224
store space(1)          to _matched
store space(10)         to _dbp_a
store space(10)         to _dbp_b
store space(10)         to _dbp_c
store space(10)         to _dbp_d
store 0                 to _id_a
store 0                 to _id_b
store 0                 to _id_c
store 0                 to _id_d

* Create array of valid mats *

SELECT mats
SET ORDER TO 2
SEEK _matkey
SET ORDER TO 1

IF .NOT. FOUND()
    msg_24('No mats are available for this photo combination...press any key',.t.,.t.,.f.)
    _added = .F.
ELSE
    _mat_id = mats->mat_id
    DECLARE photo_id_[_exqueue],type_[_exqueue]

    SELECT photo
    _prec = RECNO()
    _j = 1
    FOR _i = 1 to _exqueue
        IF .NOT. EMPTY(exhold[_i])
            photo_id_[_j] = exhold[_i]
            SEEK STR(photo_id_[_j],5,0)
            type_[_j] = photo->orient + photo->shape
            _j = _j + 1
        ENDIF                                     && IF .NOT. EMPTY(exhold[_i])
    NEXT                                          && FOR _i = 1 to 4

    FOR _i = 1 TO _exqueue
        FOR _j = 65 TO 68
            id_    = '_id_' + CHR(_j)
            dbp_   = '_dbp_' + CHR(_j)
            tsize_ = 'mats->tsize_' + CHR(_j)
            size_  = ALLTRIM(RIGHT(&tsize_,5))
            IF type_[_i] = LEFT(&tsize_,2) .AND. EMPTY(&id_) .AND. .NOT. EMPTY(photo_id_[_i])
                SEEK STR(photo_id_[_i],5,0)
                REPLACE used WITH .T.
                &id_ = photo_id_[_i]
                DO CASE
                    CASE size_ = '3X5' .OR. size_ = '4X5' .OR. size_ = '5X5'
                        &dbp_ = photo->dbp_small
                    CASE size_ = '5X7' .OR. size_ = '8X8'
                        &dbp_ = photo->dbp_med
                    CASE size_ = '8X10' .OR. size_ = '10X10'
                        &dbp_ = photo->dbp_lge
                    CASE size_ = '12X12'
                        &dbp_ = photo->dbp_1212
                    CASE size_ = '12X24'
                        &dbp_ = photo->dbp_1224
                        _is_1224_ = .T.
                ENDCASE                           && DO CASE
```

```
                  photo_id_[_i] = 0
               ENDIF                            && IF type_[_i] = LEFT(&tsize_,2) .AND. EMPTY(&id_)
            NEXT                                && FOR _j = 65 TO 68
         NEXT                                   && FOR _i = 1 TO _exqueue
      ENDIF                                     && IF .NOT. FOUND()

      SELECT mats
      SET FILTER TO
      GOTO _mrec
      SELECT book

      IF _added
         SELECT book
         _newpage = nextpage()
         _rec = RECNO()
         APPEND BLANK
         replace book->page       with STR(_newpage,3,0)
         replace book->mat_id     with mat_id_
         replace book->is_1224    with is_1224_
         replace book->matched    with matched_
         replace book->dbp_a      with dbp_a_
         replace book->dbp_b      with dbp_b_
         replace book->dbp_c      with dbp_c_
         replace book->dbp_d      with dbp_d_
         replace book->id_a       with id_a_
         replace book->id_b       with id_b_
         replace book->id_c       with id_c_
         replace book->id_d       with id_d_
         GOTO _rec
         replace book->mat_id     with _mat_id
         replace book->is_1224    with _is_1224
         replace book->matched    with _matched
         replace book->dbp_a      with _dbp_a
         replace book->dbp_b      with _dbp_b
         replace book->dbp_c      with _dbp_c
         replace book->dbp_d      with _dbp_d
         replace book->id_a       with _id_a
         replace book->id_b       with _id_b
         replace book->id_c       with _id_c
         replace book->id_d       with _id_d
         DO pag_sca
         SELECT photo
         GOTO _prec
         SELECT book
      ENDIF                                     && IF _added
   ENDIF                                        && IF .NOT. FOUND()

   SELECT mats
   SET FILTER TO
   GOTO _mrec
   SELECT book

   RETURN
```

```
*.............................................................................
*
*   Program Name: BRK_PHT.PRG       Copyright: EPIX Corporation
*   Date Created: 07/02/91           Language: Clipper
*   Time Created: 17:54:45             Author: Glenn Holcomb
*
*.............................................................................

PARAMETER _select

PRIVATE _letter, _i, _done, _id

_letter = CHR(64 + _select)
_fid    =  '_id_' + _letter
_done = .F.

IF EMPTY(&_fid)
    msg_24('No photo to break in position ' + _letter + ', press any key',.t.,.t.,.f.)
ELSE
    FOR _i = 1 TO LEN(queued)
        IF queued[_i] = _letter
            done = .T.
        ELSEIF .NOT. _done .AND. EMPTY(queued[_i])
            queued[_i] = _letter
            _done = .T.
        ENDIF                                   && IF queued[_i] = _letter
    NEXT                                        && FOR _i = 1 TO LEN(queued)
ENDIF                                           && IF EMPTY(&_fid)

RETURN
```

```
*.........................................................................
*
*   Program Name: CAP_AGN.PRG        Copyright: EPIX Corporation
*   Date Created: 08/01/91            Language: Clipper
*   Time Created: 12:49:52              Author: Glenn Holcomb
*
*.........................................................................

PRIVATE _tscreen, _continue, _cmd, _oscreen
PRIVATE  _photo_id, _orient, _shape, _chosen, _used, _notes, _dbp_small, _dbp_med, _dbp_lge, _dbp_1212, _dbp_1224

store 0              to _photo_id
store space(1)       to _orient
store space(1)       to _shape
store .f.            to _chosen
store .f.            to _used
store space(10)      to _notes              && Memo Field
store space(10)      to _dbp_small
store space(10)      to _dbp_med
store space(10)      to _dbp_lge
store space(10)      to _dbp_1212
store space(10)      to _dbp_1224

_tscreen = SAVESCREEN()

SELECT 0

USE ..\client INDEX ..\client
SEEK _dclient
_hv_shape  = client->hv_shape
_n_shape   = client->n_shape
_client    = client->client
_s3x5      = client->s3x5
_s4x5      = client->s4x5
_s5x5      = client->s5x5

USE

_i = chrcount('/',_hv_shape)
DECLARE hv_shape[_i]
FOR _j = 1 TO _i
    hv_shape[_j] = LEFT(_hv_shape,AT('/',_hv_shape)-1)
    _hv_shape = SUBSTR(_hv_shape,AT('/',_hv_shape)+1)
NEXT                                       && FOR _j = 1 TO _i

_i = chrcount('/',_n_shape)
DECLARE n_shape[_i]
FOR _j = 1 TO _i
    n_shape[_j] = LEFT(_n_shape,AT('/',_n_shape)-1)
    _n_shape = SUBSTR(_n_shape,AT('/',_n_shape)+1)
NEXT                                       && FOR _j = 1 TO _i

SELECT photo
GOTO BOTTOM
_photo_id = photo->photo_id

csron()
@ 24, 0 SAY 'Enter Photo ID Number: '
@ 24,23 GET _photo_id PICTURE [@K#####] VALID agn_chk(@_photo_id)
READ
csroff()
@ 24, 0 CLEAR
SEEK STR(_photo_id,5,0)
IF .NOT. FOUND()
    msg_24('Requested photo not available, press any key',.T.,.T.)
ELSE
```

```
IF photo->used
   msg_24('Photo in use in a page, release photo then recapture, press any key',.t.,.t.,.f.)
ELSE
   _photo_id  = photo->photo_id
   _orient    = photo->orient
   _shape     = photo->shape
   _chosen    = photo->chosen
   _used      = photo->used
   _notes     = photo->notes                 && Memo Field
   _dbp_small = photo->dbp_small
   _dbp_med   = photo->dbp_med
   _dbp_lge   = photo->dbp_lge
   _dbp_1212  = photo->dbp_1212
   _dbp_1224  = photo->dbp_1224

   DO win WITH 2,09,14,71,.T.,"Recapture Photo for " + ALLTRIM(_dclient),.t.

   @  6,20 SAY '   Photo ID: '
   @  8,20 SAY 'Orientation: '
   @ 10,20 SAY '  Mat Shape: '

   @  6,34 SAY _photo_id
   @  8,34 SAY orient(_orient)
   @ 10,34 SAY SPACE(13)
   @ 10,34 SAY shape(_shape,_orient)

   msg_24('Please wait while displaying photo...',.F.,.F.,.F.)
   DO CASE
      CASE _orient = 'H'
           _form = 'SLDSHWH'
      CASE _orient = 'V'
           _form = 'SLDSHWV'
      CASE _orient = 'N'
           _form = 'SLDSHWN'
      OTHERWISE
           _form = 'SLDSHWH'
   ENDCASE                                   && DO CASE
   IF _form # _lastform
      pp_call('FORM ..\'+_form)
       _lastform = _form
   ENDIF                                     && IF _form # _lastform
   pp_call('PUTF DBP_A ' + _dbp_1224)
   pp_call('PUTF ID_A ' + STR(_photo_id,5,0))
   @ 24, 0 CLEAR

   DO WHILE _schoice # 5

      @  8,34 SAY SPACE(13)
      @  8,34 SAY orient(_orient)
      @ 10,34 SAY SPACE(13)
      @ 10,34 SAY shape(_shape,_orient)

      @ 13,12 PROMPT 'RECAPTURE'
      @ 13,23 PROMPT 'ORIENTATION'
      @ 13,36 PROMPT 'SHAPE'
      @ 13,43 PROMPT 'NOTES'
      @ 13,65 PROMPT 'EXIT'

      MENU TO _schoice

      IF lastkey() = 27
         _schoice = 5
      ENDIF                                  && IF lastkey() = 27

      DO CASE
```

```
CASE _schoice = 1              && CAP - Capture

    store .T.                                   to _chosen
    store space(10)                             to _dbp_small
    store space(10)                             to _dbp_med
    store space(10)                             to _dbp_lge
    store space(10)                             to _dbp_1212
    store space(10)                             to _dbp_1224

    _oscreen = savescreen(18,8,23,70,_tscreen)
    restscreen(18,8,23,70,_oscreen)
    _continue = .T.

    DO CASE
        CASE _orient = 'H'
            _form = 'CAPH.PPF'
        CASE _orient = 'V'
            _form = 'CAPV.PPF'
        CASE _orient = 'N'
            _form = 'CAPN.PPF'
    ENDCASE                    && DO CASE

    IF _form # _lastform
        pp_call('FORM ..\'+_form)
        _lastform = _form
    ELSE
        pp_call('CLRF')
    ENDIF                      && IF _form # _lastform

    msg_24('Place image inside box and press enter to capture, ESC to abort',.f.,.f.,.t.)
    pp_call('CLR')
    pp_call('CLRW')

    DO WHILE _continue
        m_trapfree()
        mousetrap(0,13)
        mousetrap(1,27)
        mousetrap(2,-1)
        m_trapset()
        NSTUFF(" ")
        INKEY()
        DO WHILE .NOT. (lastkey() = 27 .OR. lastkey() = 13)
            pp_call('VIEW')
            pp_call('DEFWIN DBP_A')
            pp_call('DISWIN')
            INKEY(0)
            DO CASE
                CASE lastkey() = -1 .OR. UPPER(CHR(lastkey())) = 'C'
                    DO ort_cyc
                CASE lastkey() = -4 .OR. UPPER(CHR(lastkey())) = 'V'
                    DO ort_ver
                CASE lastkey() = -5 .OR. UPPER(CHR(lastkey())) = 'H'
                    DO ort_hor
                CASE lastkey() = -6 .OR. UPPER(CHR(lastkey())) = 'N'
                    DO ort_na
            ENDCASE            && DO CASE
        ENDDO                  && DO WHILE .NOT. (lastkey() = 27 .OR. lastkey() = 13)
        pp_call('SNAP')
        pp_call('DEFWIN DBP_A')
        pp_call('DISWIN')
        m_traprest(_mtrap)
        IF lastkey() = 27
            _continue = .F.
        ELSE
            _continue = queryb('Recapture photo?')
        ENDIF                  && IF lastkey() = 27
```

```
ENDDO                          && DO WHILE _continue

IF lastkey() # 27
    IF queryb('Save recaptured photo?',.T.)
        @ 24, 0 CLEAR
        msg_24('Please wait while saving image to system...',.f.,.f.,.f.)
        _cmd = 'SAVEDB DBP_A ' + SPACE(10)
        pp_call(@_cmd)
        _dbp_1224 = RIGHT(_cmd,10)
        replace photo->orient     with _orient
        replace photo->shape      with _shape
        replace photo->chosen     with _chosen
        replace photo->notes      with _notes  && Memo Field
        replace photo->dbp_1224   with _dbp_1224
        replace photo->dbp_small  with _dbp_small
        replace photo->dbp_med    with _dbp_med
        replace photo->dbp_lge    with _dbp_lge
        replace photo->dbp_1212   with _dbp_1212
        KEYBOARD "E"
    ELSE
        _photo_id  = photo->photo_id
        _orient    = photo->orient
        _shape     = photo->shape
        _chosen    = photo->chosen
        _used      = photo->used
        _notes     = photo->notes  && Memo Field
        _dbp_small = photo->dbp_small
        _dbp_med   = photo->dbp_med
        _dbp_lge   = photo->dbp_lge
        _dbp_1212  = photo->dbp_1212
        _dbp_1224  = photo->dbp_1224
        @  6,34 SAY _photo_id
        @  8,34 SAY orient(_orient)
        @ 10,34 SAY SPACE(13)
        @ 10,34 SAY shape(_shape,_orient)

        msg_24('Please wait while displaying photo...',.F.,.F.,.F.)
        DO CASE
            CASE _orient = 'H'
                _form = 'SLDSHWH'
            CASE _orient = 'V'
                _form = 'SLDSHWV'
            CASE _orient = 'N'
                _form = 'SLDSHWN'
            OTHERWISE
                _form = 'SLDSHWH'
        ENDCASE                  && DO CASE
        IF _form # _lastform
            pp_call('FORM ..\'+_form)
            _lastform = _form
        ENDIF                    && IF _form # _lastform
        pp_call('PUTF DBP_A ' + _dbp_1224)
        pp_call('PUTF ID_A ' + STR(_photo_id,5,0))
        @ 24, 0 CLEAR
    ENDIF                        && IF queryb('Save recaptured photo?',.T.)
ELSE
    _photo_id  = photo->photo_id
    _orient    = photo->orient
    _shape     = photo->shape
    _chosen    = photo->chosen
    _used      = photo->used
    _notes     = photo->notes  && Memo Field
    _dbp_small = photo->dbp_small
    _dbp_med   = photo->dbp_med
    _dbp_lge   = photo->dbp_lge
    _dbp_1212  = photo->dbp_1212
```

```
        _dbp_1224  = photo->dbp_1224
        @  6,34 SAY _photo_id
        @  8,34 SAY orient[_orient)
        @ 10,34 SAY SPACE(13)
        @ 10,34 SAY shape(_shape,_orient)

        msg_24('Please wait while displaying photo...',.F.,.F.,.F.)
        DO CASE
           CASE _orient = 'H'
                _form = 'SLDSHWH'
           CASE _orient = 'V'
                _form = 'SLDSHWV'
           CASE _orient = 'N'
                _form = 'SLDSHWN'
           OTHERWISE
                _form = 'SLDSHWH'
        ENDCASE                     && DO CASE
        IF _form # _lastform
           pp_call('FORM ..\'+_form)
           _lastform = _form
        ENDIF                       && IF _form # _lastform
        pp_call('PUTF DBP_A ' + _dbp_1224)
        pp_call('PUTF ID_A ' + STR(_photo_id,5,0))
        @ 24, 0 CLEAR
     ENDIF                          && IF lastkey() # 27

     @ 24, 0 CLEAR

  CASE _schoice = 2                 && CAP - Orientation

     DO CASE
        CASE (_s3x5 .OR. _s4x5) .AND. _s5x5
           DECLARE aorient[3]
           aorient[1] = 'Horizontal'
           aorient[2] = 'Vertical'
           aorient[3] = 'N/A'
        CASE (_s3x5 .OR. _s4x5) .AND. .NOT. _s5x5
           DECLARE aorient[2]
           aorient[1] = 'Horizontal'
           aorient[2] = 'Vertical'
        CASE .NOT. (_s3x5 .OR. _s4x5) .AND. _s5x5
           DECLARE aorient[1]
           aorient[1] = 'N/A'
     ENDCASE                        && DO CASE

     _oscreen = savescreen()

     _ochoice = 1

     box(7,40,13,54,"┌─┐│┘─└│ ",color,1,8)
     print(8,42,'Orientation',color)
     print(9,40,"├" + REPLICATE("─",13) + "┤",color)
     _ochoice = ACHOICE(10,42,12,52,aorient,'','',_ochoice)

     IF lastkey() # 13
        _ochoice = 1
     ENDIF                          && IF lastkey() # 13

     IF _orient # LEFT(aorient[_ochoice],1)
        _orient = LEFT(aorient[_ochoice],1)
        store IIF(_orient$'HV',hv_shape[1],n_shape[1]) to _shape
     ENDIF                          && IF _orient # LEFT(aorient[_ochoice],1)

     restscreen(_oscreen)

  CASE _schoice = 3                 && CAP - Shape
```

```
                _oscreen = savescreen()

                box(7,40,13,54,"┌┐│┘─└│ ",color,1,8)
                print(8,42,'   Shape    ',color)
                print(9,40,"├" + REPLICATE("─",13) + "┤",color)

                IF _orient = 'H' .OR. _orient = 'V'
                    _ochoice = ACHOICE(10,42,12,52,hv_shape)
                    IF lastkey() # 13
                        _ochoice = 1
                    ENDIF                  && IF lastkey() = 27
                    _shape = LEFT(hv_shape[_ochoice],1)
                ELSE
                    _ochoice = ACHOICE(10,42,12,52,n_shape)
                    IF lastkey() # 13
                        _ochoice = 1
                    ENDIF                  && IF lastkey() = 27
                    _shape = LEFT(n_shape[_ochoice],1)
                ENDIF                      && IF _orient = 'H' .OR. _orient = 'V'

                restscreen(_oscreen)

            CASE _schoice = 4              && CAP - Notes

                box(18,09,22,70,"┌┐│┘─└│ ",color,1,8)
                csron()
                _notes = MEMOEDIT(_notes,19,11,21,68,.T.)
                csroff()

                IF queryb('Save changes to notes?')
                    REPLACE notes WITH _notes
                ELSE
                    _notes = notes
                ENDIF                      && IF queryb('Save changes to notes?')

                IF .NOT. EMPTY(_notes)
                    box(18,09,22,70,"┌┐│┘─└│ ",color,1,8)
                    KEYBOARD CHR(23)
                    MEMOEDIT(_notes,19,11,21,68,.F.)
                ELSE
                    _oscreen = savescreen(18,8,23,70,_tscreen)
                    restscreen(18,8,23,70,_oscreen)
                ENDIF                      && IF .NOT. EMPTY(_notes)

            CASE _schoice = 5              && CAP - Exit
                restscreen(_tscreen)
                pp_call('CLR')
                pp_call('CLRW')
                _lastform = SPACE(1)
        ENDCASE                            && DO CASE

    ENDDO                                  && DO WHILE _schoice # 5
  ENDIF                                    && IF photo->used
ENDIF                                      && IF .NOT. FOUND()

RETURN

*
*        Author: Glenn Holcomb
*  Date Created: 04/18/91
*  Time Created: 11:50:04
*
*

FUNCTION agn_chk
```

```
PARAMETER _photo_id

PRIVATE _sscreen
DECLARE flds[1], head[1]

IF EMPTY(_photo_id)
     _sscreen = savescreen()
    flds[1] = 'PHOTO_ID'
    head[1] = 'Photo ID #'
    box(13,19,21,32,"┌─┐│┘─└│",color,1,8)
    DBEDIT(14,20,20,31,flds,'','',head)
     _photo_id = photo_id
    RESTSCREEN(_sscreen)
ENDIF                                           && IF EMPTY(_page)
RETURN(.T.)
```

```
*
*.........................................................................
*   Program Name: CAP_IMG.PRG        Copyright: EPIX Corporation
*   Date Created: 06/03/91            Language: Clipper
*   Time Created: 11:55:22              Author: Glenn Holcomb
*
*.........................................................................

PRIVATE _schoice, _tscreen, _continue, _cmd, _oscreen

_schoice = 99
_tscreen = SAVESCREEN()

SELECT 0

USE ..\client INDEX ..\client
SEEK _dclient
_hv_shape  = client->hv_shape
_n_shape   = client->n_shape
_client    = client->client
_s3x5      = client->s3x5
_s4x5      = client->s4x5
_s5x5      = client->s5x5

USE

_i = chrcount('/',_hv_shape)
DECLARE hv_shape[_i]
FOR _j = 1 TO _i
    hv_shape[_j] = LEFT(_hv_shape,AT('/',_hv_shape)-1)
    _hv_shape = SUBSTR(_hv_shape,AT('/',_hv_shape)+1)
NEXT                                              && FOR _j = 1 TO _i

_i = chrcount('/',_n_shape)
DECLARE n_shape[_i]
FOR _j = 1 TO _i
    n_shape[_j] = LEFT(_n_shape,AT('/',_n_shape)-1)
    _n_shape = SUBSTR(_n_shape,AT('/',_n_shape)+1)
NEXT                                              && FOR _j = 1 TO _i

SELECT photo

store lastrec() + 1                               to _photo_id
store IIF(LEN(hv_shape)#0,'H','N')                to _orient
store IIF(_orient$'HV',hv_shape[1],n_shape[1])    to _shape
store .T.                                         to _chosen
store .f.                                         to _used
store space(10)                                   to _notes  && Memo Field
store space(10)                                   to _dbp_small
store space(10)                                   to _dbp_med
store space(10)                                   to _dbp_lge
store space(10)                                   to _dbp_1212
store space(10)                                   to _dbp_1224

DO win WITH 2,09,14,71,.T.,"Capture Photos for " + ALLTRIM(_dclient),.T.

@  6,20 SAY '   Photo ID: '
@  8,20 SAY 'Orientation: '
@ 10,20 SAY '  Mat Shape: '

DO WHILE _schoice # 5

    @  6,34 SAY _photo_id
    @  8,34 SAY orient(_orient)
    @ 10,34 SAY SPACE(13)
    @ 10,34 SAY shape(_shape,_orient)
```

```
@ 13,12 PROMPT 'CAPTURE'
@ 13,21 PROMPT 'ORIENTATION'
@ 13,34 PROMPT 'SHAPE'
@ 13,41 PROMPT 'NOTES'
@ 13,65 PROMPT 'EXIT'

MENU TO _schoice

IF lastkey() = 27
    _schoice = 5
ENDIF                              && IF lastkey() = 27

DO CASE
    CASE _schoice = 1              && CAP - Capture

        store lastrec() + 1                  to _photo_id
        store .T.                            to _chosen
        store .f.                            to _used
        store space(10)                      to _notes  && Memo Field
        store space(10)                      to _dbp_small
        store space(10)                      to _dbp_med
        store space(10)                      to _dbp_lge
        store space(10)                      to _dbp_1212
        store space(10)                      to _dbp_1224

        @  6,34 SAY _photo_id

        _oscreen = savescreen(18,8,23,70,_tscreen)
        restscreen(18,8,23,70,_oscreen)
        _continue = .T.

        DO CASE
            CASE _orient = 'H'
                _form = 'CAPH.PPF'
            CASE _orient = 'V'
                _form = 'CAPV.PPF'
            CASE _orient = 'N'
                _form = 'CAPN.PPF'
        ENDCASE                    && DO CASE

        IF _form # _lastform
            pp_call('FORM ..\'+_form)
            _lastform = _form
        ELSE
            pp_call('CLRF')
        ENDIF                      && IF _form # _lastform

        msg_24('Place image inside box and press enter to capture, ESC to abort',.f.,.f.,.t.)
        pp_call('CLR')
        pp_call('CLRW')

        DO WHILE _continue
            m_trapfree()
            mousetrap(0,13)
            mousetrap(1,27)
            mousetrap(2,-1)
            m_trapset()
            KSTUFF(" ")
            INKEY()
            DO WHILE .NOT. (lastkey() = 27 .OR. lastkey() = 13)
                pp_call('VIEW')
                pp_call('DEFWIN DBP_A')
                pp_call('DISWIN')
                INKEY(0)
                DO CASE
```

```
                CASE lastkey() = -1 .OR. UPPER(CHR(lastkey())) = 'C'
                    DO ort_cyc
                CASE lastkey() = -4 .OR. UPPER(CHR(lastkey())) = 'V'
                    DO ort_ver
                CASE lastkey() = -5 .OR. UPPER(CHR(lastkey())) = 'H'
                    DO ort_hor
                CASE lastkey() = -6 .OR. UPPER(CHR(lastkey())) = 'N'
                    DO ort_na
            ENDCASE                     && DO CASE
        ENDDO                           && DO WHILE .NOT. (lastkey() = 27 .OR. lastkey() = 13)
        pp_call('SNAP')
        pp_call('DEFWIN DBP_A')
        pp_call('DISWIN')
        m_traprest(_mtrap)
        IF lastkey() = 27
            _continue = .F.
        ELSE
            _continue = queryb('Recapture photo?')
        ENDIF                           && IF lastkey() = 27
    ENDDO                               && DO WHILE _continue

    IF lastkey() # 27
        IF queryb('Add photo to system?',.T.)
            @ 24, 0 CLEAR
            msg_24('Please wait while saving image to system...',.f.,.f.,.f.)
            APPEND BLANK
            _cmd = 'SAVEDB DBP_A ' + SPACE(10)
            pp_call(@_cmd)
            _dbp_1224 = RIGHT(_cmd,10)
            replace photo->photo_id   with _photo_id
            replace photo->orient     with _orient
            replace photo->shape      with _shape
            replace photo->chosen     with _chosen
            replace photo->used       with _used
            replace photo->notes      with _notes  && Memo Field
            replace photo->dbp_1224   with _dbp_1224
        ENDIF                           && IF queryb('Add photo to system?')
    ENDIF                               && IF lastkey() # 27

    @ 24, 0 CLEAR

CASE _schoice = 2                       && CAP - Orientation

    DO CASE
        CASE (_s3x5 .OR. _s4x5) .AND. _s5x5
            DECLARE aorient[3]
            aorient[1] = 'Horizontal'
            aorient[2] = 'Vertical'
            aorient[3] = 'N/A'
        CASE (_s3x5 .OR. _s4x5) .AND. .NOT. _s5x5
            DECLARE aorient[2]
            aorient[1] = 'Horizontal'
            aorient[2] = 'Vertical'
        CASE .NOT. (_s3x5 .OR. _s4x5) .AND. _s5x5
            DECLARE aorient[1]
            aorient[1] = 'N/A'
    ENDCASE                             && DO CASE

    _oscreen = savescreen()

    _ochoice = 1

    box(7,40,13,54,"┌─┐│┘─└│ ",color,1,8)
    print(8,42,'Orientation',color)
    print(9,40,"├" + REPLICATE("─",13) + "┤",color)
    _ochoice = ACHOICE(10,42,12,52,aorient,'','',_ochoice)
```

```
      IF lastkey() # 13
         _ochoice = 1
      ENDIF                                   && IF lastkey() = 27

      IF _orient # LEFT(aorient[_ochoice],1)
         _orient = LEFT(aorient[_ochoice],1)
         store IIF(_orient$'HV',hv_shape[1],n_shape[1]) to _shape
      ENDIF                                   && IF _orient # LEFT(aorient[_ochoice],1)

      restscreen(_oscreen)

   CASE _schoice = 3                          && CAP - Shape

      _oscreen = savescreen()

      box(7,40,13,54,"┌─┐│┘─└│ ",color,1,8)
      print(8,42,'  Shape   ',color)
      print(9,40,"├" + REPLICATE("─",13) + "┤",color)

      IF _orient = 'H' .OR. _orient = 'V'
         _ochoice = ACHOICE(10,42,12,52,hv_shape)
         IF lastkey() # 13
            _ochoice = 1
         ENDIF                                && IF lastkey() = 27
         _shape = LEFT(hv_shape[_ochoice],1)
      ELSE
         _ochoice = ACHOICE(10,42,12,52,n_shape)
         IF lastkey() # 13
            _ochoice = 1
         ENDIF                                && IF lastkey() = 27
         _shape = LEFT(n_shape[_ochoice],1)
      ENDIF                                   && IF _orient = 'H' .OR. _orient = 'V'

      restscreen(_oscreen)

   CASE _schoice = 4                          && CAP - Notes
      IF _photo_id = lastrec() + 1
         msg_24('Photo must be captured before adding notes, press any key',.t.,.f.,.f.)
      ELSE

         box(18,09,22,70,"┌─┐│┘─└│ ",color,1,8)
         csron()
         _notes = MEMOEDIT(_notes,19,11,21,68,.T.)
         csroff()

         IF queryb('Save changes to notes?')
            REPLACE notes WITH _notes
         ELSE
            _notes = notes
         ENDIF                                && IF queryb('Save changes to notes?')

         IF .NOT. EMPTY(_notes)
            box(18,09,22,70,"┌─┐│┘─└│ ",color,1,8)
            KEYBOARD CHR(23)
            MEMOEDIT(_notes,19,11,21,68,.F.)
         ELSE
            _oscreen = savescreen(18,8,23,70,_tscreen)
            restscreen(18,8,23,70,_oscreen)
         ENDIF                                && IF .NOT. EMPTY(_notes)
      ENDIF
   CASE _schoice = 5                          && CAP - Exit
      restscreen(_tscreen)
      pp_call('CLR')
      pp_call('CLRW')
      _lastform = SPACE(0)
```

```
    ENDCASE                                && DO CASE
ENDDO                                      && DO WHILE _schoice # 5

RETURN
```

```
*.........................................................................
*
*   Program Name: CAP_PHT.PRG       Copyright: EPIX Corporation
*   Date Created: 04/04/91           Language: Clipper
*   Time Created: 17:48:43             Author: Glenn Holcomb
*
*.........................................................................

PRIVATE _cchoice, _lastform, _common
_lastform = ' '

_cchoice = 9

DO win WITH 5,8,18,52,.T.,"Capture Photographs",.F.

DO WHILE _cchoice # 7

    @ 09,11 PROMPT ' 1.  Capture Photographs for Album    '
    @ 10,11 PROMPT ' 2.  Recapture a Photograph           '
    @ 11,11 PROMPT ' 3.  Size Images for Album Maker      '
    @ 12,11 PROMPT ' 4.  Common Titles for Slide Show     '
    @ 13,11 PROMPT ' 5.  Client Titles for Slide Show     '
    @ 14,11 PROMPT ' 6.  Update Client Titles             '
    @ 16,11 PROMPT ' E.  Return to Main Menu              '

    MENU TO _cchoice

    _cscreen = savescreen()
    _schoice = 99

    IF lastkey() = 27
        _cchoice = 7
    ENDIF                                   && IF lastkey() = 27

    DO CASE
        case _cchoice = 1
            pp_call('SETCMPR NONE')
            chdir(_dclient)
            USE photo INDEX photo, photoc
            IF .NOT. FILE('photo.dbp')
                pp_call('MKDBP PHOTO')
            ELSE
                pp_call('SETDBP PHOTO')
            ENDIF
            DO cap_img
            USE
            chdir('..')
            pp_call('SETCMPR HC')
        case _cchoice = 2
            pp_call('SETCMPR NONE')
            chdir(_dclient)
            USE photo INDEX photo, photoc
            IF .NOT. FILE('photo.dbp')
                msg_24('No photographs have been captured, cannot recapture, press any key',.t.,.f.,.f.)
            ELSE
                pp_call('SETDBP PHOTO')
                DO cap_agn
            ENDIF
            USE
            chdir('..')
            pp_call('SETCMPR HC')
        case _cchoice = 3
            chdir(_dclient)
            IF .NOT. FILE('photo.dbp')
                msg_24('No photos to be sized, press any key',.t.,.f.,.f.)
            ELSE
```

```
        IF queryb('Size all photos?')
            USE photo INDEX photo, photoc
            pp_call('SETDBP PHOTO')
            DO cap_siz
            USE
        ENDIF                              && IF queryb('Size all photos?')
    ENDIF
    chdir('..')
case _cchoice = 4
    pp_call('SETCMPR NONE')
    _common = .T.
    USE title INDEX tit_id, tit_plc, tit_dbp
    IF .NOT. FILE('TITLE.DBP')
        pp_call('MKDBP TITLE')
    ELSE
        pp_call('SETDBP TITLE')
    ENDIF                                  && IF .NOT. FILE('TITLE.DBP)
    _form = 'F00001'
    IF _form # _lastform
        pp_call('FORM '+_form)
        _lastform = _form
    ELSE
        pp_call('CLRF DBP_A')
    ENDIF                                  && IF _form # _lastform

    GOTO TOP
    DO win WITH 4,09,16,70,.T.,"Common Slide Show Titles" ,.T.
    DO tit_dis WITH .T.,_common
    DO WHILE _schoice # 5
        @ 15,16 PROMPT 'NEXT'
        @ 15,27 PROMPT 'PREV'
        @ 15,37 PROMPT 'CAPTURE'
        @ 15,51 PROMPT 'DELETE'
        @ 15,63 PROMPT 'EXIT'

        MENU TO _schoice

        IF LASTKEY() = 27
            _schoice = 5
        ENDIF                              && IF LASTKEY() = 27

        DO CASE
            CASE _schoice = 1              && TIT - Next
                DO tit_nxt WITH _common
            CASE _schoice = 2              && TIT - Prev
                DO tit_prv WITH _common
            CASE _schoice = 3              && TIT - Capture
                DO tit_cap WITH _common
                REPLACE tit_com WITH .T.
            CASE _schoice = 4              && TIT - Delete
                DO tit_del WITH _common
            CASE _schoice = 5              && TIT - Exit
                pp_call('CLR')
                _lastform = SPACE(1)
        ENDCASE                            && DO CASE
    ENDDO
    IF EOF()
        ferase('TITLE.DBP')
    ENDIF                                  && IF EOF()
    USE
    pp_call('SETCMPR HC')
case _cchoice = 5
    pp_call('SETCMPR NONE')
    _common = .F.
    chdir(_dclient)
    USE title INDEX tit_id, tit_plc, tit_dbp
```

```
SET FILTER TO .NOT. tit_com
GOTO TOP
IF .NOT. FILE('TITLE.DBP')
    pp_call('MKDBP TITLE')
ELSE
    pp_call('SETDBP TITLE')
ENDIF                              && IF .NOT. FILE('TITLE.DBP)
_form = 'F00001'
IF _form # _lastform
    pp_call('FORM ..\'+_form)
    _lastform = _form
ELSE
    pp_call('CLRF DBP_A')
ENDIF                              && IF _form # _lastform

GOTO TOP
DO win WITH 4,09,16,70,.T.,"Slide Show Titles for " + ALLTRIM(_dclient),.T.
DO tit_dis WITH .T., _common
DO WHILE _schoice # 5
    @ 15,16 PROMPT 'NEXT'
    @ 15,27 PROMPT 'PREV'
    @ 15,37 PROMPT 'CAPTURE'
    @ 15,51 PROMPT 'DELETE'
    @ 15,63 PROMPT 'EXIT'

    MENU TO _schoice

    IF LASTKEY() = 27
        _schoice = 5
    ENDIF                          && IF LASTKEY() = 27

    DO CASE
        CASE _schoice = 1          && TIT - Next
            DO tit_nxt WITH _common
        CASE _schoice = 2          && TIT - Prev
            DO tit_prv WITH _common
        CASE _schoice = 3          && TIT - Capture
            DO tit_cap WITH _common
        CASE _schoice = 4          && TIT - Delete
            DO tit_del WITH _common
        CASE _schoice = 5          && TIT - Exit
            pp_call('CLR')
            _lastform = SPACE(1)
    ENDCASE                        && DO CASE
ENDDO
IF EOF()
    ferase('TITLE.DBP')
ENDIF                              && IF EOF()
SET FILTER TO
GOTO TOP
USE
chdir('..')
pp_call('SETCMPR HC')
case _cchoice = 6
msg_24('Please wait while updating client title file...',.f.,.f.,.f.)
USE title INDEX tit_dbp ALIAS master
GOTO TOP
SELECT 0
chdir(_dclient)
USE title  ALIAS slave
SET INDEX TO tit_id, tit_plc, tit_dbp
SET ORDER TO 3
SET FILTER TO tit_com
GOTO TOP
chdir('..')
DO WHILE .NOT. EOF()
```

```
            SELECT master
            SEEK slave->dbp_tit
            IF .NOT. FOUND()
                SELECT slave
                DELETE
            ELSE
                SELECT slave
                replace slave->tit_id     with master->tit_id
                replace slave->tit_desc   with master->tit_desc
            ENDIF                            && IF .NOT. FOUND()
            SKIP 1
        ENDDO                                && DO WHILE .NOT. EOF()
        PACK
        SELECT master
        GOTO TOP
        DO WHILE .NOT. EOF()
            SELECT slave
            SEEK master->dbp_tit
            IF .NOT. FOUND()
                APPEND BLANK
                replace slave->tit_id     with master->tit_id
                replace slave->tit_desc   with master->tit_desc
                replace slave->tit_com    with master->tit_com
                replace slave->dbp_tit    with master->dbp_tit
            ENDIF                            && IF .NOT. FOUND()
            SELECT master
            SKIP 1
        ENDDO                                && DO WHILE .NOT. EOF()
        SELECT master
        USE
        SELECT slave
        USE
        msg_24()
    case _cchoice = 7
        pp_call('INIT NOFRAME')
        RETURN
  ENDCASE

  restscreen(_cscreen)

ENDDO

RETURN

*.........................................................................
*
*   Program Name: ORT_VER.PRG       Copyright: EPIX Corporation
*   Date Created: 07/23/91           Language: Clipper
*   Time Created: 18:15:05             Author: Glenn Holcomb
*
*.........................................................................

PROCEDURE ort_ver

  IF _orient # 'V'
    IF (_s3x5 .OR. _s4x5)
        _orient = 'V'
        store IIF(_orient$'HV',hv_shape[1],n_shape[1]) to _shape
        @  8,34 SAY orient(_orient)
        @ 10,34 SAY SPACE(13)
        @ 10,34 SAY shape(_shape,_orient)
        _form = 'CAPV.PPF'
        IF _form # _lastform
            pp_call('FORM ..\'+_form)
            _lastform = _form
        ELSE
```

```
            pp_call('CLRF')
        ENDIF                               && IF _form # _lastform

        msg_24('Place image inside box and press enter to capture, ESC to abort',.f.,.f.,.t.)
        pp_call('CLR')
        pp_call('CLRW')
      ENDIF                                 && IF (_s3x5 .OR. _s4x5)
    ENDIF                                   && IF _orient # 'V'

RETURN


*.............................................................................
*
*   Program Name: ORT_HOR.PRG        Copyright: EPIX Corporation
*   Date Created: 07/23/91            Language: Clipper
*   Time Created: 18:22:01              Author: Glenn Holcomb
*
*.............................................................................

PROCEDURE ort_hor

    IF _orient # 'H'
      IF (_s3x5 .OR. _s4x5)
        _orient = 'H'
        store IIF(_orient$'HV',hv_shape[1],n_shape[1]) to _shape
        @  8,34 SAY orient(_orient)
        @ 10,34 SAY SPACE(13)
        @ 10,34 SAY shape(_shape,_orient)
        _form = 'CAPH.PPF'
        IF _form # _lastform
            pp_call('FORM ..\'+_form)
            _lastform = _form
        ELSE
            pp_call('CLRF')
        ENDIF                               && IF _form # _lastform

        msg_24('Place image inside box and press enter to capture, ESC to abort',.f.,.f.,.t.)
        pp_call('CLR')
        pp_call('CLRW')
      ENDIF                                 && IF (_s3x5 .OR. _s4x5)
    ENDIF                                   && IF _orient # 'V'

RETURN
*.............................................................................
*
*   Program Name: ORT_NA.PRG         Copyright: EPIX Corporation
*   Date Created: 07/23/91            Language: Clipper
*   Time Created: 18:22:41              Author: Glenn Holcomb
*
*.............................................................................

PROCEDURE ort_na

    IF _orient # 'N'
      IF .NOT. (_s3x5 .OR. _s4x5)
        _orient = 'N'
        store IIF(_orient$'HV',hv_shape[1],n_shape[1]) to _shape
        @  8,34 SAY orient(_orient)
        @ 10,34 SAY SPACE(13)
        @ 10,34 SAY shape(_shape,_orient)
        _form = 'CAPN.PPF'
        IF _form # _lastform
            pp_call('FORM ..\'+_form)
```

```
            _lastform = _form
        ELSE
            pp_call('CLRF')
        ENDIF                                   && IF _form # _lastform

        msg_24('Place image inside box and press enter to capture, ESC to abort',.f.,.f.,.t.)
        pp_call('CLR')
        pp_call('CLRW')
      ENDIF                                     && IF (_s3x5 .OR. _s4x5)
    ENDIF                                       && IF _orient # 'V'

RETURN

*
*       Author: Glenn Holcomb
*   Date Created: 07/24/91
*   Time Created: 13:44:04
*

PROCEDURE ort_cyc

    DO CASE
      CASE (_s3x5 .OR. _s4x5) .AND. _s5x5
        DO CASE
          CASE _orient = 'H'
              _orient = 'V'
              _form = 'CAPV.PPF'
          CASE _orient = 'V'
              _orient = 'N'
              _form = 'CAPN.PPF'
          CASE _orient = 'N'
              _orient = 'H'
              _form = 'CAPH.PPF'
        ENDCASE                                 && DO CASE
      CASE (_s3x5 .OR. _s4x5) .AND. .NOT. _s5x5
        DO CASE
          CASE _orient = 'H'
              _orient = 'V'
              _form = 'CAPV.PPF'
          CASE _orient = 'V'
              _orient = 'H'
              _form = 'CAPH.PPF'
        ENDCASE                                 && DO CASE
      CASE .NOT. (_s3x5 .OR. _s4x5) .AND. _s5x5
        _orient = 'N'
        _form = 'CAPN.PPF'
    ENDCASE                                     && DO CASE

    store IIF(_orient$'HV',hv_shape[1],n_shape[1]) to _shape
    @  8,34 SAY orient(_orient)
    @ 10,34 SAY SPACE(13)
    @ 10,34 SAY shape(_shape,_orient)
    IF _form # _lastform
      pp_call('FORM ..\'+_form)
      _lastform = _form
    ELSE
      pp_call('CLRF')
    ENDIF                               && IF _form # _lastform

    msg_24('Place image inside box and press enter to capture, ESC to abort',.f.,.f.,.t.)
    pp_call('CLR')
    pp_call('CLRW')
RETURN                                          && PROCEDURE ort_cyc
```

```
*...........................................................................
*
*   Program Name: CAP_SIZ.PRG       Copyright: EPIX Corporation
*   Date Created: 06/07/91           Language: Clipper
*   Time Created: 13:10:15             Author: Glenn Holcomb
*
*...........................................................................

PRIVATE _cmd

pp_call('CLR')

GOTO TOP

SET ORDER TO 0

DO WHILE .NOT. EOF()

    IF EMPTY(dbp_small)
        msg_24('Sizing photo id ' + ALLTRIM(STR(photo_id,5,0)) + '...',.f.,.f.,.f.)

        store space(10)        to _dbp_small
        store space(10)        to _dbp_med
        store space(10)        to _dbp_lge
        store space(10)        to _dbp_1212
        store dbp_1224         to _dbp_1224

        DO CASE
            CASE orient = 'H'
                _small = 'F00008'
                _med   = 'F00007'
                _lge   = 'F00006'
                _1212  = 'F00079'
                _1224  = 'CAPH'
            CASE orient = 'V'
                _small = 'F00011'
                _med   = 'F00010'
                _lge   = 'F00009'
                _1212  = 'CAPV'
                _1224  = 'CAPV'
            CASE orient = 'N'
                _small = 'F00005'
                _med   = 'F00004'
                _lge   = 'F00003'
                _1212  = 'CAPN'
                _1224  = 'CAPN'
        ENDCASE                                 && DO CASE

        _form = _1224
        pp_call('LOADFORM ..\' + _form)
        pp_call('PUTF DBP_A ' + _dbp_1224)
        pp_call('DEFWIN DBP_A')

        IF .NOT. (orient = 'V' .OR. orient = 'N')
            _form = _1212
            pp_call('LOADFORM ..\' + _form)
            _cmd = 'SAVEDB DBP_A          '
            pp_call(@_cmd)
            _dbp_1212 = RIGHT(_cmd,10)
        ELSE
            _dbp_1212 = _dbp_1224
        ENDIF                                   && IF .NOT. (orient = 'V' .OR. orient = 'N')
        pp_call('CLR')
        pp_call('PUTF DBP_A ' + _dbp_1212)
        pp_call('DEFWIN DBP_A')
```

```
        _form = _lge
        pp_call('LOADFORM ..\' + _form)
        _cmd = 'SAVEDB DBP_A          '
        pp_call(@_cmd)
        _dbp_lge = RIGHT(_cmd,10)
        pp_call('CLR')
        pp_call('PUTF DBP_A ' + _dbp_lge)
        pp_call('DEFWIN DBP_A')

        _form = _med
        pp_call('LOADFORM ..\' + _form)
        _cmd = 'SAVEDB DBP_A          '
        pp_call(@_cmd)
        _dbp_med = RIGHT(_cmd,10)
        pp_call('CLR')
        pp_call('PUTF DBP_A ' + _dbp_med)
        pp_call('DEFWIN DBP_A')

        _form = _small
        pp_call('LOADFORM ..\' + _form)
        _cmd = 'SAVEDB DBP_A          '
        pp_call(@_cmd)
        _dbp_small = RIGHT(_cmd,10)
        pp_call('CLR')

        replace photo->dbp_small  with _dbp_small
        replace photo->dbp_med    with _dbp_med
        replace photo->dbp_lge    with _dbp_lge
        replace photo->dbp_1212   with _dbp_1212

        pp_call('CLR')

    ENDIF                                        && IF EMPTY(dbp_small)

    SKIP 1

ENDDO                                            && DO WHILE .NOT. EOF()

SET ORDER TO 1

RETURN
```

```
*.......................................................................
*
*   Program Name: CHK_FLE.PRG        Copyright: EPIX Corporation
*   Date Created: 03/06/91            Language: Clipper
*   Time Created: 14:48:27              Author: Glenn C. Holcomb
*
*.......................................................................

CLOSE DATABASES
IF .NOT. FILE('photo.dbf')
    print(24,0,'Photo database not found...program aborted',color)
    csron()
    QUIT
ENDIF
IF .NOT. FILE('book.dbf')
    print(24,0,'Book database not found...program aborted',color)
    csron()
    QUIT
ENDIF
IF .NOT. FILE('mats.dbf')
    print(24,0,'Mats database not found...program aborted',color)
    csron()
    QUIT
ENDIF
IF .NOT. FILE('matdiag.dbf')
    print(24,0,'Pictures database not found...program aborted',color)
    csron()
    QUIT
ENDIF
IF .NOT. FILE('mfg.dbf')
    print(24,0,'Mfg database not found...program aborted',color)
    csron()
    QUIT
ENDIF
IF .NOT. FILE('mfga.dbf')
    print(24,0,'Mfga database not found...program aborted',color)
    csron()
    QUIT
ENDIF
IF .NOT. FILE('mfgb.dbf')
    print(24,0,'Mfgb database not found...program aborted',color)
    csron()
    QUIT
ENDIF
IF .NOT. FILE('control.dbf')
    print(24,0,'Control database not found...program aborted',color)
    csron()
    QUIT
ENDIF
IF .NOT. FILE('client.dbf')
    print(24,0,'Client database not found...program aborted',color)
    csron()
    QUIT
ENDIF
IF .NOT. FILE('title.dbf')
    print(24,0,'Title database not found...program aborted',color)
    csron()
    QUIT
ENDIF
IF .NOT. FILE('price.dbf')
    print(24,0,'Price database not found...program aborted',color)
    csron()
    QUIT
ENDIF
IF .NOT. FILE('tots.dbf')
    print(24,0,'Tots database not found...program aborted',color)
```

```
    csron()
    QUIT
ENDIF

IF .NOT. FILE('photo.ntx')
    print(24,0,'Creating index file photo.ntx',color)
    USE photo
    INDEX ON STR(photo_id,5,0) TO photo
    USE
    print(24,0,'',color,80)
ENDIF
IF .NOT. FILE('photoc.ntx')
    print(24,0,'Creating index file photoc.ntx',color)
    USE photo
    INDEX ON IIF(chosen,' ','Y') + STR(photo_id,5,0) TO photoc
    USE
    print(24,0,'',color,80)
ENDIF
IF .NOT. FILE('book.ntx')
    print(24,0,'Creating index file book.ntx',color)
    USE book
    INDEX ON page TO book
    USE
    print(24,0,'',color,80)
ENDIF
IF .NOT. FILE('booko.ntx')
    print(24,0,'Creating index file booko.ntx',color)
    USE book
    INDEX ON IIF(VAL(RTRIM(LTRIM(page)))#0,VAL(page),999) TO booko
    USE
    print(24,0,'',color,80)
ENDIF
IF .NOT. FILE('mats.ntx')
    print(24,0,'Creating index file mats.ntx',color)
    USE mats
    INDEX ON mat_id TO mats
    USE
    print(24,0,'',color,80)
ENDIF
IF .NOT. FILE('matkey.ntx')
    print(24,0,'Creating index file matkey.ntx',color)
    USE mats
    INDEX ON positions + type TO matkey
    USE
    print(24,0,'',color,80)
ENDIF
IF .NOT. FILE('matdiag.ntx')
    print(24,0,'Creating index file matdiag.ntx',color)
    USE matdiag
    INDEX ON mat_id + STR(RECNO(),5,0) TO matdiag
    USE
    print(24,0,'',color,80)
ENDIF
IF .NOT. FILE('mfga.ntx')
    print(24,0,'Creating index file mfga.ntx',color)
    USE mfga
    INDEX ON mat_id TO mfga
    USE
    print(24,0,'',color,80)
ENDIF
IF .NOT. FILE('mfgb.ntx')
    print(24,0,'Creating index file mfgb.ntx',color)
    USE mfgb
    INDEX ON mat_id TO mfgb
    USE
    print(24,0,'',color,80)
```

```
ENDIF
IF .NOT. FILE('client.ntx')
    print(24,0,'Creating index file client.ntx',color)
    USE client
    INDEX ON client TO client
    USE
    print(24,0,'',color,80)
ENDIF
IF .NOT. FILE('tit_id.ntx')
    print(24,0,'Creating index file tit_id.ntx',color)
    USE title
    INDEX ON STR(tit_id,2,0) TO tit_id
    USE
    print(24,0,'',color,80)
ENDIF
IF .NOT. FILE('tit_plc.ntx')
    print(24,0,'Creating index file tit_plc.ntx',color)
    USE title
    INDEX ON STR(tit_plc,5,0) + STR(tit_id,2,0) TO tit_plc
    USE
    print(24,0,'',color,80)
ENDIF
IF .NOT. FILE('tit_dbp.ntx')
    print(24,0,'Creating index file tit_dbp.ntx',color)
    USE title
    INDEX ON dbp_tit TO tit_dbp
    USE
    print(24,0,'',color,80)
ENDIF
IF .NOT. FILE('price.ntx')
    print(24,0,'Creating index file price.ntx',color)
    USE price
    INDEX ON item TO price
    USE
    print(24,0,'',color,80)
ENDIF
IF .NOT. FILE('pricet.ntx')
    print(24,0,'Creating index file pricet.ntx',color)
    USE price
    INDEX ON str(order,2,0) + item + str(tier_high,5,0) TO pricet
    USE
    print(24,0,'',color,80)
ENDIF
IF .NOT. FILE('priceo.ntx')
    print(24,0,'Creating index file priceo.ntx',color)
    USE price
    INDEX ON str(order,2,0) TO priceo
    USE
    print(24,0,'',color,80)
ENDIF

RETURN
```

```
*.......................................................................
*
*    Program Name: CLI_ADD.PRG        Copyright: EPIX Corporation
*    Date Created: 04/05/91            Language: Clipper
*    Time Created: 18:31:33              Author: Glenn Holcomb
*
*.......................................................................

PRIVATE _i, _j, _sscreen, _c_shapes
DECLARE temp[1]
_i = 13

DO win WITH 1,9,22,73,.T.,"Add Client",.F.

store space(8)        to _client
store space(40)       to _cli_name
store space(1)        to _mfg_code
store space(6)        to _mat_color
store space(40)       to _hv_shape
store space(80)       to _n_shape
store .f.             to _s3x5
store .f.             to _s4x5
store .f.             to _s5x5
store .f.             to _s5x7
store .f.             to _s8x8
store .f.             to _s8x10
store .f.             to _s10x10
store .f.             to _s12x12
store .f.             to _s12x24
store .f.             to _archive

USE control
_mfg_code  = control->mfg_code
_mat_color = control->mat_color
_hv_shape  = control->hv_shape
_n_shape   = control->n_shape
_s3x5      = control->s3x5
_s4x5      = control->s4x5
_s5x5      = control->s5x5
_s5x7      = control->s5x7
_s8x8      = control->s8x8
_s8x10     = control->s8x10
_s10x10    = control->s10x10
_s12x12    = control->s12x12
_s12x24    = control->s12x24

USE mfg
LOCATE FOR _mfg_code = mfg->mfg_code
_mfg_name  = mfg->mfg_name
USE

@  5,11 SAY '        Client Code: '
@  7,11 SAY '        Client Name: '
@  9,11 SAY ' Album Manufacturer: '
@ 11,11 SAY '         Page Color: '
@ 13,11 SAY 'Print Sizes Offered: '
@ 13,42 SAY 'Shapes Offered: '

@  5,32 SAY _client
@  7,32 SAY _cli_name
@  9,32 SAY _mfg_name
@ 11,32 SAY _mat_color

IF _s3x5
   @ _i,32 SAY '  3x5'
   _i = _i + 1
```

```
ENDIF
IF _s4x5
   @ _i,32 SAY '  4x5'
    _i = _i + 1
ENDIF
IF _s5x5
   @ _i,32 SAY '  5x5'
    _i = _i + 1
ENDIF
IF _s5x7
   @ _i,32 SAY '  5x7'
    _i = _i + 1
ENDIF
IF _s8x8
   @ _i,32 SAY '  8x8'
    _i = _i + 1
ENDIF
IF _s8x10
   @ _i,32 SAY ' 8x10'
    _i = _i + 1
ENDIF
IF _s10x10
   @ _i,32 SAY '10x10'
    _i = _i + 1
ENDIF
IF _s12x12
   @ _i,32 SAY '12x12'
    _i = _i + 1
ENDIF
IF _s12x24
   @ _i,32 SAY '12x24'
    _i = _i + 1
ENDIF

_c_shapes = ALLTRIM(_hv_shape) + ALLTRIM(_n_shape)
_i = chrcount('/',_c_shapes)
DECLARE cshape[_i]
FOR _j = 1 TO _i
    cshape[_j] = LEFT(_c_shapes,AT('/',_c_shapes)-1)
    _c_shapes = SUBSTR(_c_shapes,AT('/',_c_shapes)+1)
NEXT                                        && FOR _j = 1 TO _i
FOR _j = 13 TO (12 + _i)
    @ _j, 58 SAY cshape[_j-12]
NEXT                                        && FOR _j = 10 TO (10 + _i)

* Get client code & name *

@  5,32 GET _client PICTURE '@!@A' VALID cli_chk(_client) .AND. .NOT. EMPTY(_client)
@  7,32 GET _cli_name VALID .NOT. EMPTY(_cli_name)

csron()
READ
csroff()

IF lastkey() = 27                           && Escape from read add aborted
    msg_24('Escape key pressed...client add aborted...press any key',.T.,.T.)
ELSE

    IF queryb('Do you want to change the client defaults?')

        * Get new manufacturer *

        sscreen = savescreen()
        USE mfg
        temp[1] = 'MFG_NAME'
        box(9,32,17,77,"┌─┐│┘─└│ ",color,1,8)
```

```
DBEDIT(10,33,16,76,temp,'','',"Manufacturer's Name")
_mfg_code  = mfg->mfg_code
_mfg_name  = mfg->mfg_name
_mat_color = mfg->mat_color
_hv_shape  = mfg->hv_shape
_n_shape   = mfg->n_shape
use
restscreen(_sscreen)
@  9,32 SAY SPACE(40)
@  9,32 SAY _mfg_name

* Get new mat color *
_sscreen = savescreen()
_i = chrcount('/',_mat_color)
DECLARE mcolor[15]
FOR _j = 1 TO _i
    mcolor[_j] = LEFT(_mat_color,AT('/',_mat_color)-1)
    _mat_color = SUBSTR(_mat_color,AT('/',_mat_color)+1)
NEXT                                        && FOR _j = 1 TO _i
box(11,32,14+_i,44,"┌─┐│┘─└│ ",color,1,8)
print(12,34,'Mat Color',color)
print(13,32,"├" + REPLICATE("─",11) + "┤",color)
_i = ACHOICE(14,34,14+_i-1,42,mcolor)
IF lastkey() # 13
    _i = 1
ENDIF                                       && IF lastkey() = 27
_mat_color = mcolor[_i]
restscreen(_sscreen)
@  11,32 SAY SPACE(20)
@  11,32 SAY _mat_color

* Get base print size *
_sscreen = savescreen()
DO CASE
    CASE _s3x5
        _i = 1
    CASE _s4x5
        _i = 2
    OTHERWISE
        _i = 3
ENDCASE                                     && DO CASE
box(10,18,14,66,"┌─┐│┘─└│ ",color,1,8)
@ 12, 21 SAY 'Select default base print size: '
@ 12, 53 PROMPT '3x5'
@ 12, 57 PROMPT '4x5'
@ 12, 61 PROMPT '5x5'
MENU TO _i
IF _i = 3                                   && Base size is 5x5
    _s3x5      = .F.
    _s4x5      = .F.
    _s5x5      = .T.
    _s5x7      = .F.
    _s8x8      = queryb('Offer 8x8 prints?')
    _s8x10     = .F.
    _s10x10    = queryb('Offer 10x10 prints?')
    _s12x12    = queryb('Offer 12x12 prints?')
    _s12x24    = .F.
ELSE
    IF _i = 1                               && Base size is 3x5
        _s3x5      = .T.
        _s4x5      = .F.
        _s5x5      = .F.
        _s5x7      = queryb('Offer 5x7 prints?')
        _s8x8      = .F.
        _s8x10     = queryb('Offer 8x10 prints?')
        _s10x10    = .F.
```

```
            _s12x12     = queryb('Offer 12x12 prints?')
            _s12x24     = queryb('Offer 12x24 prints?')
        ELSE                                  && Base size is 4x5
            _s3x5       = .F.
            _s4x5       = .T.
            _s5x5       = .F.
            _s5x7       = queryb('Offer 5x7 prints?')
            _s8x8       = .F.
            _s8x10      = queryb('Offer 8x10 prints?')
            _s10x10     = .F.
            _s12x12     = queryb('Offer 12x12 prints?')
            _s12x24     = queryb('Offer 12x24 prints?')
        ENDIF                                 && IF _i = 1                          && Base size is 3x5
        IF queryb('Also offer 5x5 base print size?')
            _s5x5       = .T.
            _s8x8       = queryb('Offer 8x8 prints?')
            _s10x10     = queryb('Offer 10x10 prints?')
            IF .NOT. _s12x12
                _s12x12     = queryb('Offer 12x12 prints?')
            ENDIF                             && IF .NOT. _s12x12
        ENDIF                                 && IF queryb('Also offer 5x5 base print size?')
    ENDIF                                     && IF _i = 3                          && Base size is 5x5
    restscreen(_sscreen)
    box(13,32,21,72,"        ",color)
    _i = 13
    IF _s3x5
        @ _i,32 SAY '  3x5'
        _i = _i + 1
    ENDIF
    IF _s4x5
        @ _i,32 SAY '  4x5'
        _i = _i + 1
    ENDIF
    IF _s5x5
        @ _i,32 SAY '  5x5'
        _i = _i + 1
    ENDIF
    IF _s5x7
        @ _i,32 SAY '  5x7'
        _i = _i + 1
    ENDIF
    IF _s8x8
        @ _i,32 SAY '  8x8'
        _i = _i + 1
    ENDIF
    IF _s8x10
        @ _i,32 SAY ' 8x10'
        _i = _i + 1
    ENDIF
    IF _s10x10
        @ _i,32 SAY '10x10'
        _i = _i + 1
    ENDIF
    IF _s12x12
        @ _i,32 SAY '12x12'
        _i = _i + 1
    ENDIF
    IF _s12x24
        @ _i,32 SAY '12x24'
        _i = _i + 1
    ENDIF

    @ 13,42 SAY 'Shapes Offered: '

    * Get valid shapes for rectangles *
```

```
    IF _s3x5 .OR. _s4x5
        _c_shapes = ALLTRIM(_hv_shape)
        _i = chrcount('/',_c_shapes)
        DECLARE cshape[_i]
        FOR _j = 1 TO _i
            cshape[_j] = LEFT(_c_shapes,AT('/',_c_shapes)-1)
            _c_shapes = SUBSTR(_c_shapes,AT('/',_c_shapes)+1)
        NEXT                                  && FOR _j = 1 TO _i
        _hv_shape = cshape[1] + '/'
        FOR _j = 2 TO _i
            IF queryb('Offer ' + cshape[_j] + ' prints?')
                _hv_shape = _hv_shape + cshape[_j] + '/'
            ENDIF                             && IF queryb('Offer ' + cshape[_j] + ' prints?')
        NEXT                                  && FOR _j = 2 TO _i
    ELSE
        _hv_shape = SPACE(0)
    ENDIF

    * Get valid shapes for squares *

    IF _s5x5
        _c_shapes = ALLTRIM(_n_shape)
        _i = chrcount('/',_c_shapes)
        DECLARE cshape[_i]
        FOR _j = 1 TO _i
            cshape[_j] = LEFT(_c_shapes,AT('/',_c_shapes)-1)
            _c_shapes = SUBSTR(_c_shapes,AT('/',_c_shapes)+1)
        NEXT                                  && FOR _j = 1 TO _i
        _n_shape = cshape[1] + '/'
        FOR _j = 2 TO _i
            IF queryb('Offer ' + cshape[_j] + ' prints?')
                _n_shape = _n_shape + cshape[_j] + '/'
            ENDIF                             && IF queryb('Offer ' + cshape[_j] + ' prints?')
        NEXT                                  && FOR _j = 2 TO _i
    ELSE
        _n_shape = SPACE(0)
    ENDIF

    * Display all available shapes *

    _c_shapes = ALLTRIM(_hv_shape) + ALLTRIM(_n_shape)
    _i = chrcount('/',_c_shapes)
    DECLARE cshape[_i]
    FOR _j = 1 TO _i
        cshape[_j] = LEFT(_c_shapes,AT('/',_c_shapes)-1)
        _c_shapes = SUBSTR(_c_shapes,AT('/',_c_shapes)+1)
    NEXT                                      && FOR _j = 1 TO _i
    FOR _j = 13 TO (12 + _i)
        @ _j, 58 SAY cshape[_j-12]
    NEXT                                      && FOR _j = 10 TO (10 + _i)
ENDIF                                         && IF queryb('Do you want to change the client defaults?')

IF query24('Add new client?')
    USE client INDEX client
    APPEND BLANK
    replace client->client     with _client
    replace client->cli_name   with _cli_name
    replace client->mfg_code   with _mfg_code
    replace client->mat_color  with _mat_color
    replace client->hv_shape   with _hv_shape
    replace client->n_shape    with _n_shape
    replace client->s3x5       with _s3x5
    replace client->s4x5       with _s4x5
    replace client->s5x5       with _s5x5
    replace client->s5x7       with _s5x7
    replace client->s8x8       with _s8x8
```

```
        replace client->s8x10      with _s8x10
        replace client->s10x10     with _s10x10
        replace client->s12x12     with _s12x12
        replace client->s12x24     with _s12x24
        replace client->archive    with _archive
        USE
        IF .NOT. mkdir(_client)
            BEEP(3)
            @ 24, 0 SAY 'System error...failed to create client directory during add...press any key'
            INKEY(0)
        ENDIF                                   && IF .NOT. mkdir(_client)
        fcopy('book.dbf',_client+'\book.dbf')
        fcopy('photo.dbf',_client+'\photo.dbf')
        fcopy('photo.dbt',_client+'\photo.dbt')
        fcopy('book.ntx',_client+'\book.ntx')
        fcopy('booko.ntx',_client+'\booko.ntx')
        fcopy('photo.ntx',_client+'\photo.ntx')
        fcopy('photoc.ntx',_client+'\photoc.ntx')
        fcopy('mats.dbf',_client+'\mats.dbf')
        fcopy('mats.ntx',_client+'\mats.ntx')
        fcopy('matkey.ntx',_client+'\matkey.ntx')
        fcopy('title.dbf',_client+'\title.dbf')
        fcopy('tit_id.ntx',_client+'\tit_id.ntx')
        fcopy('tit_plc.ntx',_client+'\tit_plc.ntx')
        fcopy('tit_dbp.ntx',_client+'\tit_dbp.ntx')
        fcopy('price.dbf',_client+'\price.dbf')
        fcopy('price.ntx',_client+'\price.ntx')
        fcopy('pricet.ntx',_client+'\pricet.ntx')
        fcopy('priceo.ntx',_client+'\priceo.ntx')
        chdir(_client)
        USE book INDEX book, booko
        ZAP
        USE photo INDEX photo, photoc
        ZAP
        USE
        chdir('..')
        USE client INDEX client
        DO cli_mat
        USE
    ENDIF                                       && IF query24('Add new client?')
ENDIF                                           && IF lastkey() = 27                    && Escape from read add aborted

RETURN


*
*        Author: Glenn Holcomb
*   Date Created: 04/05/91
*   Time Created: 18:47:39
*
*

FUNCTION cli_chk

    PARAMETER _cli

    PRIVATE _r

    _r = .F.

    USE client INDEX client
    SEEK _cli
    IF FOUND()
        msg_24('Client code already on file, please enter new code...press any key',.T.,.T.)
        _r = .F.
    ELSE
```

```
       _r = .T.
    ENDIF                                  && IF FOUND()
RETURN(_r)
```

LC14PRINT

```
*.........................................................................
*
*   Program Name: CLI_ADR.PRG        Copyright: EPIX Corporation
*   Date Created: 06/05/91            Language: Clipper
*   Time Created: 15:42:29              Author: Glenn Holcomb
*
*.........................................................................

PRIVATE _i, _j, _sscreen, _path
DECLARE temp[1], flds[2], head[2]

_sscreen = savescreen()
USE client INDEX client
flds[1] = 'CLIENT'
flds[2] = 'CLI_NAME'
head[1] = 'Client'
head[2] = 'Client Name'

* Query for client to be modified *

msg_24('Please select client and press ENTER...',.F.,.F.)

box(4,12,17,68,"┌─┐│┘─└│",color,1,8)
DBEDIT(5,13,16,67,flds,'','',head)

@ 24, 0 CLEAR

RESTSCREEN(_sscreen)

IF LASTKEY() = 27
    msg_24('Client Address aborted...press any key to continue',.F.,.F.)
ELSE

    DO win WITH 1,7,20,73,.T.,"Client Address",.F.

    _client    = client->client
    _cli_name  = client->cli_name
    _address1  = client->address1
    _address2  = client->address2
    _city      = client->city
    _state     = client->state
    _zip       = client->zip
    _hphone    = client->hphone
    _wphone    = client->wphone
    _eventdate = client->eventdate

    @  5,11 SAY 'Client Code: '
    @  5,49 SAY 'Event Date: '
    @  7,11 SAY 'Client Name: '
    @  9,11 SAY '    Address: '
    @ 12,11 SAY '       City: '
    @ 12,57 SAY 'State: '
    @ 14,11 SAY '   Zip Code: '
    @ 16,11 SAY ' Home Phone: '
    @ 18,11 SAY ' Work Phone: '

    @  5,24 SAY _client
    @  7,24 SAY _cli_name
    @  5,61 GET _eventdate
    @  9,24 GET _address1
    @ 10,24 GET _address2
    @ 12,24 GET _city
    @ 12,64 GET _state PICTURE '!!'
    @ 14,24 GET _zip
    @ 16,24 GET _hphone
    @ 18,24 GET _wphone
```

```
    csron()
    READ
    csroff()

    IF lastkey() # 27
        replace client->address1   with _address1
        replace client->address2   with _address2
        replace client->city       with _city
        replace client->state      with _state
        replace client->zip        with _zip
        replace client->hphone     with _hphone
        replace client->wphone     with _wphone
        replace client->eventdate  with _eventdate
    ENDIF                                       && IF lastkey() # 27

ENDIF                                           && IF LASTKEY() = 27

SELECT client
USE

RETURN
```

```
*.........................................................................
*
*   Program Name: CLI_CTR.PRG       Copyright: EPIX Corporation
*   Date Created: 04/04/91           Language: Clipper
*   Time Created: 17:27:29             Author: Glenn Holcomb
*
*.........................................................................

PRIVATE _cchoice

_cchoice = 0

DO win WITH 3,10,20,44,.T.,"Client Control",.T.

DO WHILE _cchoice # 9

    @  7,16 PROMPT ' 1.  Select Client       '
    @  8,16 PROMPT ' 2.  Add Client          '
    @  9,16 PROMPT ' 3.  Maintain Clients    '
    @ 10,16 PROMPT ' 4.  Delete Client       '
    @ 11,16 PROMPT ' 5.  Transfer from Tape  '
    @ 12,16 PROMPT ' 6.  Transfer to Tape    '
    @ 13,16 PROMPT ' 7.  Client Address      '
    @ 14,16 PROMPT ' 8.  Client Prices       '
    @ 16,16 PROMPT ' E.  Return to Main Menu '
    @ 19,11 SAY CENTER('Client-> ' + _dclient,33)

    MENU TO _cchoice

    _cscreen = savescreen()

    IF lastkey() = 27
         _cchoice = 9
    ENDIF                                      && IF lastkey() = 27

    DO CASE
        case _cchoice = 1
            DO cli_sel
        case _cchoice = 2
            DO cli_add
        case _cchoice = 3
            DO cli_mnt
        case _cchoice = 4
            DO cli_del
        case _cchoice = 5
            DO cli_tpe
        case _cchoice = 6
            DO cli_arc
        case _cchoice = 7
            DO cli_adr
        case _cchoice = 8
            DO cli_prc
        case _cchoice = 9
            RETURN
    ENDCASE

    restscreen(_cscreen)

ENDDO

RETURN

*
*         Author: Glenn Holcomb
*   Date Created: 05/08/91
```

```
*   Time Created: 12:17:26
*

PROCEDURE cli_mat

    PRIVATE _mfg, _size, _i, _field, _sel

    msg_24('Please wait while preparing mat selection...',.f.,.f.,.f.)

    _sel = SELECT()
    _size = SPACE(0)

    SELECT client

    SEEK _client

    _mfg_code  = client->mfg_code
    _s3x5      = client->s3x5
    _s4x5      = client->s4x5
    _s5x5      = client->s5x5
    _s5x7      = client->s5x7
    _s8x8      = client->s8x8
    _s8x10     = client->s8x10
    _s10x10    = client->s10x10
    _s12x12    = client->s12x12
    _s12x24    = client->s12x24

    _mfg = 'MFG_' + _mfg_code

    SELECT 0

    chdir(_client)
    USE mats INDEX mats, matkey
    chdir('..')

    GOTO TOP

    DO WHILE .NOT. EOF()
        IF VAL(mat_id) # 0
            IF .NOT. &_mfg
                DELETE
            ELSE
                FOR _i = 1 TO 4
                    _field = 'TSIZE_' + CHR(_i + 64)
                    IF .NOT. EMPTY(&_field)
                        _size = IIF(_i = 1, '_s', _size + '.AND. _s')
                        _size = _size + ALLTRIM(RIGHT(&_field,5))
                    ENDIF                         && IF .NOT. EMPTY(&_field)
                NEXT                              && FOR _i = 1 TO 4
                IF .NOT. &_size
                    DELETE
                ENDIF                             && IF .NOT. &_size
            ENDIF                                 && IF .NOT. &_mfg
        ENDIF                                     && IF VAL(mat_id) # 0
        SKIP 1
    ENDDO                                         && DO WHILE .NOT. EOF()

    PACK

    USE

    SELECT (_sel)

    @ 24, 0 CLEAR

RETURN                                            && PROCEDURE cli_mat
```

```
*..............................................................................
*
*    Program Name: CLI_DEL.PRG        Copyright: EPIX Corporation
*    Date Created: 04/09/91            Language: Clipper
*    Time Created: 15:21:02              Author: Glenn Holcomb
*
*..............................................................................

PRIVATE _i, _j, _sscreen, _path, _c_shapes
DECLARE temp[1], flds[2], head[2]
_i = 13

USE mfg

_sscreen = savescreen()
SELECT 2
USE client INDEX client
flds[1] = 'CLIENT'
flds[2] = 'CLI_NAME'
head[1] = 'Client'
head[2] = 'Client Name'

* Query for client to be modified *

msg_24('Please select the client you wish to delete and press ENTER...',.F.,.F.)

GOTO TOP
IF .NOT. EOF()
    box(4,12,17,68,"┌─┐│┘─└│",color,1,8)
    DBEDIT(5,13,16,67,flds,'','',head)
    SET FILTER TO

    @ 24, 0 CLEAR

    RESTSCREEN(_sscreen)

    IF LASTKEY() = 27
        msg_24('Deletion aborted...press any key to continue',.F.,.F.)
    ELSE

        * Display selected client record *

        DO win WITH 1,9,22,73,.T.,"Delete Client",.F.

        _client    = client->client
        _cli_name  = client->cli_name
        _mfg_code  = client->mfg_code
        _mat_color = client->mat_color
        _hv_shape  = client->hv_shape
        _n_shape   = client->n_shape
        _s3x5      = client->s3x5
        _s4x5      = client->s4x5
        _s5x5      = client->s5x5
        _s5x7      = client->s5x7
        _s8x8      = client->s8x8
        _s8x10     = client->s8x10
        _s10x10    = client->s10x10
        _s12x12    = client->s12x12
        _s12x24    = client->s12x24

        SELECT mfg
        LOCATE FOR _mfg_code = mfg->mfg_code
        _mfg_name  = mfg->mfg_name
        SELECT client

        @ 5,11 SAY '       Client Code: '
```

```
@ 7,11 SAY '        Client Name: '
@ 9,11 SAY ' Album Manufacturer: '
@ 11,11 SAY '         Page Color: '
@ 13,11 SAY 'Print Sizes Offered: '
@ 13,42 SAY 'Shapes Offered: '

@ 5,32 SAY _client
@ 7,32 SAY _cli_name
@ 9,32 SAY _mfg_name
@ 11,32 SAY _mat_color

IF _s3x5
   @ _i,32 SAY '  3x5'
   _i = _i + 1
ENDIF
IF _s4x5
   @ _i,32 SAY '  4x5'
   _i = _i + 1
ENDIF
IF _s5x5
   @ _i,32 SAY '  5x5'
   _i = _i + 1
ENDIF
IF _s5x7
   @ _i,32 SAY '  5x7'
   _i = _i + 1
ENDIF
IF _s8x8
   @ _i,32 SAY '  8x8'
   _i = _i + 1
ENDIF
IF _s8x10
   @ _i,32 SAY ' 8x10'
   _i = _i + 1
ENDIF
IF _s10x10
   @ _i,32 SAY '10x10'
   _i = _i + 1
ENDIF
IF _s12x12
   @ _i,32 SAY '12x12'
   _i = _i + 1
ENDIF
IF _s12x24
   @ _i,32 SAY '12x24'
   _i = _i + 1
ENDIF

_c_shapes = ALLTRIM(_hv_shape) + ALLTRIM(_n_shape)
_i = chrcount('/',_c_shapes)
DECLARE cshape[_i]
FOR _j = 1 TO _i
   cshape[_j] = LEFT(_c_shapes,AT('/',_c_shapes)-1)
   _c_shapes = SUBSTR(_c_shapes,AT('/',_c_shapes)+1)
NEXT                                                  && FOR _j = 1 TO _i
FOR _j = 13 TO (12 + _i)
   @ _j, 58 SAY cshape[_j-12]
NEXT                                                  && FOR _j = 10 TO (10 + _i)

* Check to see if client can be deleted *

IF queryb('Confirm client deletion')

   * Check to see if pictures have been sized, if sized no deletion is allowed *

   chdir(_client)
```

```
SELECT 0
USE book INDEX book, booko
chdir('..')
IF LASTREC() # 0
    IF queryb('Pictures have already been sized...confirm client deletion')
        USE
        SELECT client
        DELETE
        msg_24('Please wait while deleting client...',.F.,.F.)
        PACK
        chdir(_client)
        ferase('book.dbf')
        ferase('photo.dbf')
        ferase('photo.dbt')
        ferase('book.ntx')
        ferase('booko.ntx')
        ferase('photo.ntx')
        ferase('photoc.ntx')
        ferase('photo.dbp')
        ferase('mats.dbf')
        ferase('mats.ntx')
        ferase('matkey.ntx')
        ferase('title.dbf')
        ferase('tit_id.ntx')
        ferase('tit_plc.ntx')
        ferase('tit_dbp.ntx')
        ferase('title.dbp')
        ferase('price.dbf')
        ferase('price.ntx')
        ferase('pricet.ntx')
        ferase('priceo.ntx')
        chdir('..')
        IF .NOT. rmdir(_client)
            BEEP(3)
            @ 24, 0 SAY 'System error...failed to remove client directory during delete...press any key'
            INKEY(0)
        ENDIF                                                   && IF .NOT. rmdir(_client)
        IF _client = _dclient
            SELECT 0
            USE CONTROL
            REPLACE control->lclient WITH SPACE(8)
            _dclient = SPACE(8)
            USE
            SELECT CLIENT
        ENDIF                                                   && IF _client = _dclient
        @ 24, 0 CLEAR
    ELSE
        SELECT client
        msg_24('Client deletion aborted...press any key',.T.,.T.)
    ENDIF                                                       && IF queryb('Pictures have already been sized...confirm client deletion')
ELSE
    USE
    SELECT client
    DELETE
    msg_24('Please wait while deleting client...',.F.,.F.)
    PACK
    chdir(_client)
    ferase('book.dbf')
    ferase('photo.dbf')
    ferase('photo.dbt')
    ferase('book.ntx')
    ferase('booko.ntx')
    ferase('photo.ntx')
    ferase('photoc.ntx')
    ferase('photo.dbp')
    ferase('mats.dbf')
```

```
            ferase('mats.ntx')
            ferase('matkey.ntx')
            ferase('title.dbf')
            ferase('tit_id.ntx')
            ferase('tit_plc.ntx')
            ferase('tit_dbp.ntx')
            ferase('title.dbp')
            ferase('price.dbf')
            ferase('price.ntx')
            ferase('pricet.ntx')
            ferase('priceo.ntx')
            chdir('..')
            IF .NOT. rmdir(_client)
               BEEP(3)
               @ 24, 0 SAY 'System error...failed to remove client directory during delete...press any key'
               INKEY(0)
            ENDIF                                                   && IF .NOT. rmdir(_client)
            @ 24, 0 CLEAR
            IF _client = _dclient
               SELECT 0
               USE CONTROL
               REPLACE control->lclient WITH SPACE(8)
                dclient = SPACE(8)
               USE
               SELECT CLIENT
            ENDIF                                                   && IF _client = _dclient
         ENDIF                                                      && IF LASTREC() # 0
      ELSE
         msg_24('Client deletion aborted...press any key',.T.,.T.)
      ENDIF                                                         && IF queryb('Confirm client deletion')
   ENDIF                                                            && IF LASTKEY() = 27
ELSE
   msg_24('No clients available for deletion...press any key',.T.,.T.)
ENDIF                                                               && IF .NOT. EOF()

USE
SELECT mfg
USE

RETURN
```

```
*.........................................................................
*
*   Program Name: CLI_MNT.PRG       Copyright: EPIX Corporation
*   Date Created: 04/08/91           Language: Clipper
*   Time Created: 13:05:43             Author: Glenn Holcomb
*
*.........................................................................

PRIVATE _i, _j, _sscreen, _path
DECLARE temp[1], flds[2], head[2]
_i = 13

USE mfg

_sscreen = savescreen()
SELECT 2
USE client INDEX client
flds[1] = 'CLIENT'
flds[2] = 'CLI_NAME'
head[1] = 'Client'
head[2] = 'Client Name'

* Query for client to be modified *

msg_24('Please select the client you wish to maintain and press ENTER...',.F.,.F.)

box(4,12,17,68,"┌─┐│┘─└│ ",color,1,8)
DBEDIT(5,13,16,67,flds,'','',head)

@ 24, 0 CLEAR

RESTSCREEN(_sscreen)

IF LASTKEY() = 27
   msg_24('Maintain aborted...press any key to continue',.F.,.F.)
ELSE

   * Display selected client record *

   DO win WITH 1,9,22,73,.T.,"Maintain Client",.F.

   _client    = client->client
   _cli_name  = client->cli_name
   _mfg_code  = client->mfg_code
   _mat_color = client->mat_color
   _hv_shape  = client->hv_shape
   _n_shape   = client->n_shape
   _s3x5      = client->s3x5
   _s4x5      = client->s4x5
   _s5x5      = client->s5x5
   _s5x7      = client->s5x7
   _s8x8      = client->s8x8
   _s8x10     = client->s8x10
   _s10x10    = client->s10x10
   _s12x12    = client->s12x12
   _s12x24    = client->s12x24
   _archive   = client->archive

   SELECT mfg
   LOCATE FOR _mfg_code = mfg->mfg_code
   _mfg_name  = mfg->mfg_name
   SELECT client

   @  5,11 SAY '       Client Code: '
   @  7,11 SAY '       Client Name: '
   @  9,11 SAY ' Album Manufacturer: '
```

```
@ 11,11 SAY '        Page Color: '
@ 13,11 SAY 'Print Sizes Offered: '
@ 13,42 SAY 'Shapes Offered: '

@  5,32 SAY _client
@  7,32 SAY _cli_name
@  9,32 SAY _mfg_name
@ 11,32 SAY _mat_color

IF _s3x5
    @ _i,32 SAY '  3x5'
     _i = _i + 1
ENDIF
IF _s4x5
    @ _i,32 SAY '  4x5'
     _i = _i + 1
ENDIF
IF _s5x5
    @ _i,32 SAY '  5x5'
     _i = _i + 1
ENDIF
IF _s5x7
    @ _i,32 SAY '  5x7'
     _i = _i + 1
ENDIF
IF _s8x8
    @ _i,32 SAY '  8x8'
     _i = _i + 1
ENDIF
IF _s8x10
    @ _i,32 SAY ' 8x10'
     _i = _i + 1
ENDIF
IF _s10x10
    @ _i,32 SAY '10x10'
     _i = _i + 1
ENDIF
IF _s12x12
    @ _i,32 SAY '12x12'
     _i = _i + 1
ENDIF
IF _s12x24
    @ _i,32 SAY '12x24'
     _i = _i + 1
ENDIF

_c_shapes = ALLTRIM(_hv_shape) + ALLTRIM(_n_shape)
_i = chrcount('/',_c_shapes)
DECLARE cshape[_i]
FOR _j = 1 TO _i
    cshape[_j] = LEFT(_c_shapes,AT('/',_c_shapes)-1)
    _c_shapes = SUBSTR(_c_shapes,AT('/',_c_shapes)+1)
NEXT                                    && FOR _j = 1 TO _i
FOR _j = 13 TO (12 + _i)
    @ _j, 58 SAY cshape[_j-12]
NEXT                                    && FOR _j = 10 TO (10 + _i)

* Get changes to client code & name *

@  7,32 GET _cli_name VALID .NOT. EMPTY(_cli_name)

csron()
READ
csroff()

IF lastkey() = 27                       && Escape from read add aborted
```

```
    msg_24('Escape key pressed...client maintain aborted...press any key',.T.,.T.)
ELSE
    IF queryb('Do you want to change the client defaults?')

        * Check to see if archive client, if archived no changes allowed to default *

        IF _archive
            msg_24('Client archived, reload client from tape first, then maintain',.F.,.F.)
            IF query24('Save client name change?')
                SELECT client
                replace client->cli_name   with _cli_name
            ENDIF                           && IF query24('Save client changes?')
        ELSE

            * Check to see if pictures have been sized, if sized no changes allowed to default *

            _path = _drive + ':.\' + client
            SET DEFAULT TO &_path
            SELECT 0
            USE book INDEX book, booko
            IF LASTREC() # 0
                msg_24('Pictures have already been sized...client defaults cannot be changed...press any key',.T.,.T.)
                USE
                _path = _drive + ':.'
                SET DEFAULT TO &_path
                SELECT client
            ELSE
                USE
                _path = _drive + ':.'
                SET DEFAULT TO &_path
                SELECT client
                * Get new manufacturer *

                _sscreen = savescreen()
                SELECT mfg
                temp[1] = 'MFG_NAME'
                box(9,32,17,77,"┌─┐│┘─└│ ",color,1,8)
                DBEDIT(10,33,16,76,temp,'','',"Manufacturer's Name")
                _mfg_code  = mfg->mfg_code
                _mfg_name  = mfg->mfg_name
                _hv_shape  = mfg->hv_shape
                _n_shape   = mfg->n_shape
                _mat_color = mfg->mat_color
                restscreen(_sscreen)
                @  9,32 SAY SPACE(40)
                @  9,32 SAY _mfg_name

                * Get new mat color *
                _sscreen = savescreen()
                _i = chrcount('/',_mat_color)
                DECLARE mcolor[15]
                FOR _j = 1 TO _i
                    mcolor[_j] = LEFT(_mat_color,AT('/',_mat_color)-1)
                    _mat_color = SUBSTR(_mat_color,AT('/',_mat_color)+1)
                NEXT                         && FOR _j = 1 TO _i
                IF lastkey() = 27
                    _i = 1
                ENDIF                        && IF lastkey() = 27
                box(11,32,14+_i,44,"┌─┐│┘─└│ ",color,1,8)
                print(12,34,'Mat Color',color)
                print(13,32,"├" + REPLICATE("─",11) + "┤",color)
                _i = ACHOICE(14,34,14+_i-1,42,mcolor)
                IF lastkey() # 13
                    _i = 1
                ENDIF                        && IF lastkey() # 13
                _mat_color = mcolor[_i]
```

```
restscreen(_sscreen)
@  11,32 SAY SPACE(20)
@  11,32 SAY _mat_color

* Get base print size *
_sscreen = savescreen()
DO CASE
    CASE _s3x5
        _i = 1
    CASE _s4x5
        _i = 2
    OTHERWISE
        _i = 3
ENDCASE                          && DO CASE
box(10,18,14,66,"┌─┐│┘─└│ ",color,1,8)
@ 12, 21 SAY 'Select default base print size: '
@ 12, 53 PROMPT '3x5'
@ 12, 57 PROMPT '4x5'
@ 12, 61 PROMPT '5x5'
MENU TO _i
IF _i = 3                        && Base size is 5x5
    _s3x5      = .F.
    _s4x5      = .F.
    _s5x5      = .T.
    _s5x7      = .F.
    _s8x8      = queryb('Offer 8x8 prints?')
    _s8x10     = .F.
    _s10x10    = queryb('Offer 10x10 prints?')
    _s12x12    = queryb('Offer 12x12 prints?')
    _s12x24    = .F.
ELSE
    IF _i = 1                    && Base size is 3x5
        _s3x5      = .T.
        _s4x5      = .F.
        _s5x5      = .F.
        _s5x7      = queryb('Offer 5x7 prints?')
        _s8x8      = .F.
        _s8x10     = queryb('Offer 8x10 prints?')
        _s10x10    = .F.
        _s12x12    = queryb('Offer 12x12 prints?')
        _s12x24    = queryb('Offer 12x24 prints?')
    ELSE                         && Base size is 4x5
        _s3x5      = .F.
        _s4x5      = .T.
        _s5x5      = .F.
        _s5x7      = queryb('Offer 5x7 prints?')
        _s8x8      = .F.
        _s8x10     = queryb('Offer 8x10 prints?')
        _s10x10    = .F.
        _s12x12    = queryb('Offer 12x12 prints?')
        _s12x24    = queryb('Offer 12x24 prints?')
    ENDIF                        && IF _i = 1                    && Base size is 3x5
    IF queryb('Also offer 5x5 base print size?')
        _s5x5      = .T.
        _s8x8      = queryb('Offer 8x8 prints?')
        _s10x10    = queryb('Offer 10x10 prints?')
        IF .NOT. _s12x12
            _s12x12    = queryb('Offer 12x12 prints?')
        ENDIF                    && IF .NOT. _s12x12
    ENDIF                        && IF queryb('Also offer 5x5 base print size?')
ENDIF                            && IF _i = 3                    && Base size is 5x5
restscreen(_sscreen)
box(13,32,21,72,"         ",color)
_i = 13
IF _s3x5
    @ _i,32 SAY '  3x5'
```

```
        _i = _i + 1
ENDIF
IF _s4x5
    @ _i,32 SAY '  4x5'
        _i = _i + 1
ENDIF
IF _s5x5
    @ _i,32 SAY '  5x5'
        _i = _i + 1
ENDIF
IF _s5x7
    @ _i,32 SAY '  5x7'
        _i = _i + 1
ENDIF
IF _s8x8
    @ _i,32 SAY '  8x8'
        _i = _i + 1
ENDIF
IF _s8x10
    @ _i,32 SAY ' 8x10'
        _i = _i + 1
ENDIF
IF _s10x10
    @ _i,32 SAY '10x10'
        _i = _i + 1
ENDIF
IF _s12x12
    @ _i,32 SAY '12x12'
        _i = _i + 1
ENDIF
IF _s12x24
    @ _i,32 SAY '12x24'
        _i = _i + 1
ENDIF
@ 13,42 SAY 'Shapes Offered: '

* Get valid shapes for rectangles *

IF _s3x5 .OR. _s4x5
    _c_shapes = ALLTRIM(_hv_shape)
    _i = chrcount('/',_c_shapes)
    DECLARE cshape[_i]
    FOR _j = 1 TO _i
        cshape[_j] = LEFT(_c_shapes,AT('/',_c_shapes)-1)
        _c_shapes = SUBSTR(_c_shapes,AT('/',_c_shapes)+1)
    NEXT                 && FOR _j = 1 TO _i
    _hv_shape = cshape[1] + '/'
    FOR _j = 2 TO _i
        IF queryb('Offer ' + cshape[_j] + ' prints?')
            _hv_shape = _hv_shape + cshape[_j] + '/'
        ENDIF            && IF queryb('Offer ' + cshape[_j] + ' prints?')
    NEXT                 && FOR _j = 2 TO _i
ELSE
    _hv_shape = SPACE(0)
ENDIF

* Get valid shapes for squares *

IF _s5x5
    _c_shapes = ALLTRIM(_n_shape)
    _i = chrcount('/',_c_shapes)
    DECLARE cshape[_i]
    FOR _j = 1 TO _i
        cshape[_j] = LEFT(_c_shapes,AT('/',_c_shapes)-1)
        _c_shapes = SUBSTR(_c_shapes,AT('/',_c_shapes)+1)
    NEXT                 && FOR _j = 1 TO _i
```

```
                    _n_shape = cshape[1] + '/'
                    FOR _j = 2 TO _i
                        IF queryb('Offer ' + cshape[_j] + ' prints?')
                            _n_shape = _n_shape + cshape[_j] + '/'
                        ENDIF                  && IF queryb('Offer ' + cshape[_j] + ' prints?')
                    NEXT                       && FOR _j = 2 TO _i
                ELSE
                    _n_shape = SPACE(0)
                ENDIF

                * Display all available shapes *

                _c_shapes = ALLTRIM(_hv_shape) + ALLTRIM(_n_shape)
                _i = chrcount('/',_c_shapes)
                DECLARE cshape[_i]
                FOR _j = 1 TO _i
                    cshape[_j] = LEFT(_c_shapes,AT('/',_c_shapes)-1)
                    _c_shapes = SUBSTR(_c_shapes,AT('/',_c_shapes)+1)
                NEXT                           && FOR _j = 1 TO _i
                FOR _j = 13 TO (12 + _i)
                    @ _j, 58 SAY cshape[_j-12]
                NEXT                           && FOR _j = 10 TO (10 + _i)
            ENDIF                              && IF queryb('Do you want to change the client defaults?')

            * Query to save client changes *

            IF query24('Save client changes?')
                SELECT client
                replace client->cli_name   with _cli_name
                replace client->mfg_code   with _mfg_code
                replace client->mat_color  with _mat_color
                replace client->hv_shape   with _hv_shape
                replace client->n_shape    with _n_shape
                replace client->s3x5       with _s3x5
                replace client->s4x5       with _s4x5
                replace client->s5x5       with _s5x5
                replace client->s5x7       with _s5x7
                replace client->s8x8       with _s8x8
                replace client->s8x10      with _s8x10
                replace client->s10x10     with _s10x10
                replace client->s12x12     with _s12x12
                replace client->s12x24     with _s12x24
                fcopy('mats.dbf',_client+'\mats.dbf')
                fcopy('mats.ntx',_client+'\mats.ntx')
                fcopy('matkey.ntx',_client+'\matkey.ntx')
                DO cli_mat
            ENDIF                              && IF query24('Save client changes?')
        ENDIF                                  && IF _archive
    ELSE
        IF query24('Save client changes?')
            SELECT client
            replace client->cli_name   with _cli_name
        ENDIF                                  && IF query24('Save client changes?')
    ENDIF                                      && IF queryb('Do you want to change the client defaults?')
  ENDIF                                        && IF lastkey() = 27                  && Escape from read add aborted
ENDIF                                          && IF LASTKEY() = 27

SELECT client
USE
SELECT mfg
USE

RETURN
```

```
*.......................................................................
*
*    Program Name: CLI_PRC.PRG       Copyright: EPIX Corporation
*    Date Created: 06/05/91           Language: Clipper
*    Time Created: 15:43:31             Author: Glenn Holcomb
*
*.......................................................................

DECLARE flds[2], head[2], flds2[4], head2[4]
PRIVATE _pscreen, _pchoice, _dchoice, _dscreen, _client

_pscreen = savescreen()
USE client INDEX client
flds[1] = 'CLIENT'
flds[2] = 'CLI_NAME'
head[1] = 'Client'
head[2] = 'Client Name'

* Query for client to be modified *

msg_24('Please select client and press ENTER...',.F.,.F.)

box(4,12,17,68,"┌─┐│┘─└│",color,1,8)
DBEDIT(5,13,16,67,flds,'','',head)

@ 24, 0 CLEAR

RESTSCREEN(_pscreen)

IF LASTKEY() # 13
   msg_24('Client Address aborted...press any key to continue',.F.,.F.)
ELSE
   _client = client
   USE

   flds[1] = 'ITEM'
   flds[2] = 'DESC'
   head[1] = 'Item ID'
   head[2] = 'Description'

   flds2[1] = 'ITEM'
   flds2[2] = 'PRICE'
   flds2[3] = 'TIER_LOW'
   flds2[4] = 'TIER_HIGH'
   head2[1] = 'Item ID'
   head2[2] = 'Price'
   head2[3] = 'Low;Tier'
   head2[4] = 'High;Tier'

   store 0              to _order
   store space(10)      to _item
   store space(45)      to _desc
   store 0              to _price
   store 0              to _disc
   store space(1)       to _disc_typ
   store 0              to _tier_low
   store 0              to _tier_high
   store 0              to _quantity
   store 0              to _p_qty
   store 0              to _p_price

   chdir(_client)
   USE price INDEX price, pricet, priceo
   chdir('..')

   DO win WITH 3,9,19,71,.T.,"Client Price File for " + _client,.T.
```

```
_pchoice = 99

DO WHILE _pchoice # 9

    SET MESSAGE TO 24

    @ 18,12 PROMPT 'PRINT $' MESSAGE 'Modify Per Print Pricing'
    @ 18,21 PROMPT 'ADD'     MESSAGE 'Add a Line Item'
    @ 18,26 PROMPT 'CHANGE'  MESSAGE 'Change a Line Item'
    @ 18,34 PROMPT 'DEL'     MESSAGE 'Delete a Line Item'
    @ 18,39 PROMPT 'DISC'    MESSAGE 'Change the Total Discount'
    @ 18,45 PROMPT 'SHIP'    MESSAGE 'Change the Shipping & Handling'
    @ 18,51 PROMPT 'TAX'     MESSAGE 'Change the Sales Tax Rate'
    @ 18,56 PROMPT 'DEPOSIT' MESSAGE 'Change the Deposit Amount'
    @ 18,65 PROMPT 'EXIT'    MESSAGE 'Return to the System Utilities Menu'

    MENU TO _pchoice

    SET MESSAGE TO
    @ 24,0 CLEAR

    IF LASTKEY() = 27
        _pchoice = 9
    ENDIF                             && IF LASTKEY() = 27

    DO CASE
        CASE _pchoice = 1             && PRC - PRINT $
            _dscreen = savescreen()
            _dchoice = 99
            scroll(18,12,18,70,0)

            DO WHILE _dchoice # 6

                SET MESSAGE TO 24

                @ 18,12 PROMPT 'CHANGE PRICE' MESSAGE 'Modify Per Print Pricing'
                @ 18,26 PROMPT 'ADD'          MESSAGE 'Add a Pricing Tier'
                @ 18,31 PROMPT 'DELETE'       MESSAGE 'Delete a Pricing Tier'
                @ 18,39 PROMPT 'DISCOUNT'     MESSAGE 'Change Print Discount'
                @ 18,49 PROMPT 'PRESOLD'      MESSAGE 'Change Print Discount'
                @ 18,65 PROMPT 'EXIT'         MESSAGE 'Return to the System Price Menu'

                MENU TO _dchoice

                SET MESSAGE TO
                @ 24,0 CLEAR

                IF LASTKEY() = 27
                    _dchoice = 6
                ENDIF                 && IF LASTKEY() = 27

                DO CASE
                    CASE _dchoice = 1         && P $ - Change Price
                        _pscreen = savescreen()

                        @ 24, 0 SAY 'Please select the item to change price and press ENTER...'
                        SET ORDER TO 2
                        SET FILTER TO order <= 10
                        GOTO TOP
                        box(4,17,17,63,"┌─┐│┘─└│ ",color,1,8)
                        DBEDIT(5,18,16,62,f_ds2,'','',head2)
                        restscreen(_pscreen)
                        IF lastkey() = 13
                            DO prc_sca
                            @  7,12 SAY '    Item ID:  ' + _item
```

```
        @  9,12 SAY 'Description:  ' + _desc
        @ 11,12 SAY '       Price: ' GET _price PICTURE '#####.##'
        @ 13,12 SAY '    Low Tier:  ' + STR(_tier_low,5,0)
        @ 15,12 SAY '   High Tier:  ' + STR(_tier_high,5,0)

        msg_24('Enter new price and press enter, escape to abort',.f.,.f.,.f.)
        csron()
        READ
        csroff()
        msg_24()
        SET ORDER TO 1
        IF lastkey() = 13
           replace price->price      with _price
        ENDIF            && IF lastkey() =13
        scroll(6,12,16,70,0)
    ENDIF                && IF lastkey() = 13
    @ 24, 0 CLEAR

    SET FILTER TO
    scroll(6,12,16,70,0)
CASE _dchoice = 2        && P $ - Add
    _pscreen = savescreen()

    SET ORDER TO 3
    SET FILTER TO order <=10 .AND. tier_low = 0
    GOTO TOP
    msg_24('Please select the print size to add a tier after and press ENTER...',.f.,.f.,.f.)
    box(4,7,17,73,"┌─┐│┘─└│ ",color,1,8)
    DBEDIT(5,8,16,72,flds,'','',head)
    restscreen(_pscreen)

    IF lastkey() = 13
        _item = item
        SET ORDER TO 2
        SET FILTER TO _item = item .AND. tier_high = 99999
        GOTO TOP
        DO prc_sca
        _tier_low = _tier_low + 1
        @  7,12 SAY '    Item ID:  ' + _item
        @  9,12 SAY 'Description:  ' + _desc
        @ 11,12 SAY '       Price: ' GET _price PICTURE '#####.##'
        @ 13,12 SAY '    Low Tier: ' GET _tier_low PICTURE '#####' RANGE (tier_low + 1), _tier_high - 1
        @ 15,12 SAY '   High Tier:  ' + STR(_tier_high,5,0)

        msg_24('Enter price & low tier value and press enter, escape to abort',.f.,.f.,.f.)
        csron()
        READ
        csroff()
        msg_24()
        SET ORDER TO 1
        IF lastkey() = 13
           replace price->tier_high  with _tier_low
           APPEND BLANK
           replace price->order      with _order
           replace price->item       with _item
           replace price->desc       with _desc
           replace price->price      with _price
           replace price->tier_low   with _tier_low
           replace price->tier_high  with _tier_high
        ENDIF            && IF lastkey() =13
        scroll(6,12,16,70,0)
    ENDIF                && IF lastkey() = 13

    SET ORDER TO 0

    @ 24, 0 CLEAR
```

```
    SET FILTER TO
    scroll(6,12,16,70,0)
CASE _dchoice = 3        && P $ - Del
    _pscreen = savescreen()

    SET ORDER TO 3
    SET FILTER TO order <=10 .AND. tier_low # 0
    GOTO TOP
    IF EOF()
        msg_24('No tiers to delete, press any key',.t.,.f.,.f.)
    ELSE
        _pscreen = savescreen()
        @ 24, 0 SAY 'Please select the tier to deleted and press ENTER...'
        SET ORDER TO 2
        box(4,17,17,63,"┌─┐│┘─└│ ",color,1,8)
        DBEDIT(5,18,16,62,flds2,'','',head2)
        restscreen(_pscreen)
        SET FILTER TO
        IF lastkey() = 13
            IF queryb('Delete selected tier?')
                DO prc_sca
                DELETE
                SKIP -1
                REPLACE tier_high WITH _tier_high
                PACK
            ENDIF        && IF queryb('Delete selected tier?')
        ENDIF            && IF lastkey() = 13
        @ 24, 0 CLEAR

        SET FILTER TO
        scroll(6,12,16,70,0)
    ENDIF                && IF EOF()

    @ 24, 0 CLEAR

    SET FILTER TO
    scroll(6,12,16,70,0)
CASE _dchoice = 4        && P $ - Discount
    _pscreen = savescreen()

    @ 24, 0 SAY 'Please select the print size to change discount for and press ENTER...'

    SET ORDER TO 3
    SET FILTER TO order <=10 .AND. tier_low = 0
    GOTO TOP
    box(4,7,17,73,"┌─┐│┘─└│ ",color,1,8)
    DBEDIT(5,8,16,72,flds,'','',head)
    restscreen(_pscreen)
    SET ORDER TO 0

    @ 24, 0 CLEAR

    IF LASTKEY() = 13
        DO prc_sca
        @  7,12 SAY '    Item ID:  ' + _item
        @  9,12 SAY 'Description:  ' + _desc
        IF queryb('Discount as a Percentage?')
            _disc_typ = 'P'
            @ 11,12 SAY '   Discount: ' GET _disc PICTURE '#####.##%' RANGE 0,100
        ELSE
            _disc_typ = 'D'
            @ 11,12 SAY '   Discount: ' GET _disc PICTURE '#####.##'
        ENDIF        && IF queryb('Discount as a Percentage?')
        msg_24('Enter discount amount and press enter, escape to abort',.f.,.f.,.f.)
        csron()
```

```
                READ
                csroff()
                msg_24()
                IF lastkey() # 27
                    REPLACE disc WITH _disc, disc_typ WITH _disc_typ
                ENDIF               && IF lastkey() # 27
            ENDIF                   && IF LASTKEY() = 13
            SET FILTER TO
            scroll(6,12,16,70,0)
        CASE _dchoice = 5           && P $ - PRESOLD
            _pscreen = savescreen()

            @ 24, 0 SAY 'Please select the item to change presold information and press ENTER...'
            SET ORDER TO 3
            SET FILTER TO order <=10 .AND. tier_low = 0
            GOTO TOP
            box(4,7,17,73,"┌─┐│┘─└│",color,1,8)
            DBEDIT(5,8,16,72,flds,'','',head)
            restscreen(_pscreen)
            SET ORDER TO 0

            IF lastkey() = 13
                DO prc_sca
                @  7,12 SAY '       Item ID:  ' + _item
                @  9,12 SAY '   Description:  ' + _desc
                @ 11,12 SAY 'Presold Price: ' GET _p_price PICTURE '#####.##'
                @ 13,12 SAY '   Presold Qty: ' GET _p_qty   PICTURE '#####'

                msg_24('Enter new presold information and press enter, escape to abort',.f.,.f.,.f.)
                csron()
                READ
                csroff()
                msg_24()
                SET ORDER TO 1
                IF lastkey() = 13
                    replace price->p_qty      with _p_qty
                    replace price->p_price    with _p_price
                ENDIF               && IF lastkey() =13
                scroll(6,12,16,70,0)
            ENDIF                   && IF lastkey() = 13
            @ 24, 0 CLEAR

            SET FILTER TO
            scroll(6,12,16,70,0)
        CASE _dchoice = 6           && P $ - EXIT
    ENDCASE                         && DO CASE
ENDDO                               && DO WHILE _dchoice # 6
restscreen(_dscreen)
CASE _pchoice = 2                   && PRC - ADD
store 20              to _order
store space(10)       to _item
store space(45)       to _desc
store 0               to _price
store 1               to _quantity

@  7,12 SAY '     Sort #: ' GET _order PICTURE '##' RANGE 20, 89
@  7,40 SAY 'Item ID: '     GET _item PICTURE '!!!!!!!!!!' VALID .NOT. EMPTY(_item)
@  9,12 SAY 'Description: ' GET _desc VALID .NOT. EMPTY(_desc)
@ 11,12 SAY '       Price: ' GET _price PICTURE '#####.##'
@ 11,40 SAY '    Qty: '     GET _quantity PICTURE '#####' VALID _quantity >= 1

msg_24('Enter data for all fields and press enter, escape to abort',.f.,.f.,.f.)
csron()
READ
csroff()
msg_24()
```

```
    IF lastkey() =13
        APPEND BLANK
        replace price->order      with _order
        replace price->item       with _item
        replace price->desc       with _desc
        replace price->price      with _price
        replace price->quantity   with _quantity
    ENDIF                            && IF lastkey() =13

    scroll(6,12,16,70,0)
CASE _pchoice = 3                    && PRC - CHANGE
    _pscreen = savescreen()

    @ 24, 0 SAY 'Please select the line item to change and press ENTER...'

    SET FILTER TO order >= 11 .AND. order <= 89
    GOTO TOP
    IF EOF()
        msg_24('No line items to change, press any key',.t.,.f.,.f.)
    ELSE
        box(4,7,17,73,"┌─┐│┘─└│ ",color,1,8)
        DBEDIT(5,8,16,72,flds,'','',head)
        restscreen(_pscreen)

        @ 24, 0 CLEAR

        IF LASTKEY() = 13
            DO prc_sca

            @  7,12 SAY '     Sort #: ' GET _order PICTURE '##' RANGE 20, 89
            @  7,40 SAY 'Item ID: '     GET _item PICTURE '!!!!!!!!!!' VALID .NOT. EMPTY(_item)
            @  9,12 SAY 'Description: ' GET _desc VALID .NOT. EMPTY(_desc)
            @ 11,12 SAY '      Price: ' GET _price PICTURE '#####.##T
            @ 11,40 SAY '    Qty: '     GET _quantity PICTURE '#####' VALID _quantity >= 1

            msg_24('Change data for all fields and press enter, escape to abort',.f.,.f.,.f.)
            csron()
            READ
            csroff()
            msg_24()
            IF lastkey() = 13
                replace price->order      with _order
                replace price->item       with _item
                replace price->desc       with _desc
                replace price->price      with _price
                replace price->quantity   with _quantity
            ENDIF                         && IF lastkey() =13
        ENDIF                             && IF LASTKEY() = 13
    ENDIF                                 && IF EOF()

    SET FILTER TO

    scroll(6,12,16,70,0)

CASE _pchoice = 4                    && PRC - DEL

    _pscreen = savescreen()

    @ 24, 0 SAY 'Please select the line item to delete and press ENTER...'

    SET FILTER TO order >= 11 .AND. order <= 89
    GOTO TOP
    IF EOF()
        msg_24('No line items to delete, press any key',.t.,.f.,.f.)
    ELSE
        box(4,7,17,73,"┌─┐│┘─└│ ",color,1,8)
```

```
            DBEDIT(5,8,16,72,flds,'','',head)
            restscreen(_pscreen)

            @ 24, 0 CLEAR

            IF LASTKEY() = 13
                IF queryb('Delete item ' + ALLTRIM(item) + '?')
                    DELETE
                    PACK
                ENDIF                   && IF queryb('Delete item ' + ALLTRIM(item) + '?')
            ENDIF                       && IF LASTKEY() = 13
        ENDIF                           && IF EOF()

        SET FILTER TO

        scroll(6,12,16,70,0)

    CASE _pchoice = 5                   && PRC - DISC
        SEEK 'DISCOUNT'
        DO prc_sca
        @  7,12 SAY '     Item ID:  ' + _item
        @  9,12 SAY 'Description:  ' + _desc
        IF queryb('Discount as a Percentage?')
             _disc_typ = 'P'
            @ 11,12 SAY '    Discount: ' GET _disc PICTURE '#####.##%' RANGE 0,100
        ELSE
             _disc_typ = 'D'
            @ 11,12 SAY '    Discount: ' GET _disc PICTURE '#####.##'
        ENDIF                           && IF queryb('Discount as a Percentage?')
        msg_24('Enter discount amount and press enter, escape to abort',.f.,.f.,.f.)
        csron()
        READ
        csroff()
        msg_24()
        IF lastkey() # 27
            REPLACE disc WITH _disc, disc_typ WITH _disc_typ
        ENDIF                           && IF lastkey() # 27
        scroll(6,12,16,70,0)
    CASE _pchoice = 6                   && PRC - SHIP
        SEEK 'SHIPPING'
        DO prc_sca
        @  7,12 SAY '     Item ID:  ' + _item
        @  9,12 SAY 'Description:  ' + _desc
        @ 11,12 SAY '    Shipping: ' GET _price PICTURE '#####.##'
        msg_24('Enter shipping & handling amount and press enter, escape to abort',.f.,.f.,.f.)
        csron()
        READ
        csroff()
        msg_24()
        IF lastkey() # 27
            REPLACE price WITH _price
        ENDIF                           && IF lastkey() # 27
        scroll(6,12,16,70,0)
    CASE _pchoice = 7                   && PRC - TAX
        SEEK 'SALESTAX'
        DO prc_sca
        @  7,12 SAY '     Item ID:  ' + _item
        @  9,12 SAY 'Description:  ' + _desc
        @ 11,12 SAY '    Tax Rate: ' GET _disc PICTURE '#####.##%' RANGE 0,100
        msg_24('Enter tax rate and press enter, escape to abort',.f.,.f.,.f.)
        csron()
        READ
        csroff()
        msg_24()
        IF lastkey() # 27
            REPLACE disc WITH _disc
```

```
            ENDIF                               && IF lastkey() # 27
            scroll(6,12,16,70,0)
         CASE _pchoice = 8                      && PRC - DEPOSIT
            SEEK 'DEPOSIT'
            DO prc_sca
            @  7,12 SAY '     Item ID:  ' + _item
            @  9,12 SAY 'Description:  ' + _desc
            @ 11,12 SAY '     Deposit: ' GET _price PICTURE '#####.##'
            msg_24('Enter deposit amount and press enter, escape to abort',.f.,.f.,.f.)
            csron()
            READ
            csroff()
            msg_24()
            IF lastkey() # 27
               REPLACE price WITH _price
            ENDIF                               && IF lastkey() # 27
            scroll(6,12,16,70,0)
         CASE _pchoice = 9                      && PRC - EXIT
            RELEASE flds, head, flds2, head2
      ENDCASE                                   && DO CASE

   ENDDO                                        && DO WHILE _pchoice # 9
ENDIF                                           && IF LASTKEY() # 13

RETURN
```

```
*.........................................................................
*
*   Program Name: CLI_SEL.PRG       Copyright: EPIX Corporation
*   Date Created: 04/08/91           Language: Clipper
*   Time Created: 11:27:13             Author: Glenn Holcomb
*
*.........................................................................

PRIVATE _sscreen
DECLARE flds[2], head[2]

_sscreen = savescreen()
USE client INDEX client
flds[1] = 'CLIENT'
flds[2] = 'CLI_NAME'
head[1] = 'Client'
head[2] = 'Client Name'

@ 24, 0 SAY 'Please select the client you wish to work with and press ENTER...'

box(4,12,17,68,"┌┐│┘─└│ ",color,1,8)
DBEDIT(5,13,16,67,flds,'','',head)

@ 24, 0 CLEAR

IF LASTKEY() = 27
    msg_24('Selection aborted...press any key to continue',.T.,.T.)
ELSE
    IF archive
        msg_24('Client archived, reload client from tape first, then select...press any key',.T.,.T.)
    ELSE
        IF cli_fck(client->client)
            _dclient = client->client
            USE control
            REPLACE lclient WITH _dclient
        ENDIF                                   && IF cli_fck(client->client)
    ENDIF                                       && IF archive
ENDIF                                           && IF LASTKEY() = 27

USE
RESTSCREEN(_sscreen)
RETURN

*
*        Author: Glenn Holcomb
*  Date Created: 05/20/91
*  Time Created: 17:08:39
*
*

FUNCTION cli_fck

    PARAMETER _cclient
    PRIVATE _good

    _good = .T.

    chdir(_cclient)

    IF .NOT. FILE('photo.dbf')
        msg_24('Photo database not found for client ' + ALLTRIM(_cclient) + ', client deselected...press any key',.t.,.t.,.t.)
        _good = .F.
    ENDIF
    IF .NOT. FILE('book.dbf')
        msg_24('Book database not found for client ' + ALLTRIM(_cclient) + ', client deselected...press any key',.t.,.t.,.t.)
        _good = .F.
```

```
ENDIF
IF .NOT. FILE('mats.dbf')
    msg_24('Mats database not found for client ' + ALLTRIM(_cclient) + ', client deselected...press any key',.t.,.t.,.t.)
    _good = .F.
ENDIF
IF .NOT. FILE('title.dbf')
    msg_24('Title database not found for client ' + ALLTRIM(_cclient) + ', client deselected...press any key',.t.,.t.,.t.)
    _good = .F.
ENDIF
IF .NOT. FILE('price.dbf')
    msg_24('Price database not found for client ' + ALLTRIM(_cclient) + ', client deselected...press any key',.t.,.t.,.t.)
    _good = .F.
ENDIF

IF _good
    SELECT 0
    IF .NOT. FILE('photo.ntx')
        print(24,0,'Creating index file photo.ntx',color)
        USE photo
        INDEX ON STR(photo_id,5,0) TO photo
        USE
        print(24,0,'',color,80)
    ENDIF
    IF .NOT. FILE('photoc.ntx')
        print(24,0,'Creating index file photoc.ntx',color)
        USE photo
        INDEX ON IIF(chosen,' ','Y') + STR(photo_id,5,0) TO photoc
        USE
        print(24,0,'',color,80)
    ENDIF
    IF .NOT. FILE('book.ntx')
        print(24,0,'Creating index file book.ntx',color)
        USE book
        INDEX ON page TO book
        USE
        print(24,0,'',color,80)
    ENDIF
    IF .NOT. FILE('booko.ntx')
        print(24,0,'Creating index file booko.ntx',color)
        USE book
        INDEX ON IIF(VAL(RTRIM(LTRIM(page)))#0,VAL(page),999) TO booko
        USE
        print(24,0,'',color,80)
    ENDIF
    IF .NOT. FILE('mats.ntx')
        print(24,0,'Creating index file mats.ntx',color)
        USE mats
        INDEX ON mat_id TO mats
        USE
        print(24,0,'',color,80)
    ENDIF
    IF .NOT. FILE('matkey.ntx')
        print(24,0,'Creating index file matkey.ntx',color)
        USE mats
        INDEX ON positions + type TO matkey
        USE
        print(24,0,'',color,80)
    ENDIF
    IF .NOT. FILE('tit_id.ntx')
        print(24,0,'Creating index file tit_id.ntx',color)
        USE title
        INDEX ON STR(tit_id,2,0) TO tit_id
        USE
        print(24,0,'',color,80)
    ENDIF
    IF .NOT. FILE('tit_plc.ntx')
```

```
            print(24,0,'Creating index file tit_plc.ntx',color)
            USE title
            INDEX ON STR(tit_plc,5,0) TO tit_plc
            USE
            print(24,0,'',color,80)
        ENDIF
        IF .NOT. FILE('tit_dbp.ntx')
            print(24,0,'Creating index file tit_dbp.ntx',color)
            USE title
            INDEX ON dbp_tit TO tit_dbp
            USE
            print(24,0,'',color,80)
        ENDIF
        IF .NOT. FILE('price.ntx')
            print(24,0,'Creating index file price.ntx',color)
            USE price
            INDEX ON item TO price
            USE
            print(24,0,'',color,80)
        ENDIF
        IF .NOT. FILE('pricet.ntx')
            print(24,0,'Creating index file pricet.ntx',color)
            USE price
            INDEX ON str(order,2) + item + str(tier_high,5,0) TO pricet
            USE
            print(24,0,'',color,80)
        ENDIF
        IF .NOT. FILE('priceo.ntx')
            print(24,0,'Creating index file priceo.ntx',color)
            USE price
            INDEX ON str(order,2,0) TO priceo
            USE
            print(24,0,'',color,80)
        ENDIF
        SELECT client
    ENDIF
    chdir('..')

RETURN(_good)
```

```
*.........................................................................
*
*   Program Name: CLI_TPE.PRG        Copyright: EPIX Corporation
*   Date Created: 05/20/91            Language: Clipper
*   Time Created: 17:23:32              Author: Glenn Holcomb
*
*.........................................................................

PRIVATE _sscreen, _path, _handle, _text, _client, _lastback
DECLARE flds[2], head[2]

_client = SPACE(8)
_lastback = DATE()

USE client INDEX client

* Query for client to be reloaded *

csron()
@ 24,0 SAY 'Enter client name to transfer from tape: ' GET _client PICTURE '@!@A' VALID .NOT. EMPTY(_client)
READ
@ 24,0 CLEAR
csroff()

IF lastkey() # 27

    * Check for pre-existing client *
    SEEK _client
    IF found()
        msg_24('Client already on file, cannot be transfered from tape, press any key',.t.,.t.)
    ELSE
        IF queryb('Transfer client ' + ALLTRIM(_client) + ' from tape')
            IF .NOT. mkdir(_client)
                BEEP(3)
                @ 24, 0 SAY 'System error...failed to create client directory during transfer...press any key'
                INKEY(0)
            ELSE
                msg_24('Insert tape labeled ' + ALLTRIM(_client) + ', press any key to begin',.T.,.T.)
                _handle = FCREATE('addt.bat')
                _text   = '@ECHO OFF'
                FWRITELINE(_handle,_text)
                _text   = 'C:\MTN_TAPE\TAPE SRS ' + _drive + ':.\' + ALLTRIM(_client) + ' /L' + ALLTRIM(_client) + '/V/C'
                FWRITELINE(_handle,_text)
                _text   = 'IF ERRORLEVEL 5 GOTO ERROR5'
                FWRITELINE(_handle,_text)
                _text   = 'IF ERRORLEVEL 4 GOTO ERROR4'
                FWRITELINE(_handle,_text)
                _text   = 'IF ERRORLEVEL 3 GOTO ERROR3'
                FWRITELINE(_handle,_text)
                _text   = 'IF ERRORLEVEL 2 GOTO ERROR2'
                FWRITELINE(_handle,_text)
                _text   = 'IF ERRORLEVEL 1 GOTO ERROR1'
                FWRITELINE(_handle,_text)
                _text   = 'GOTO OKAY'
                FWRITELINE(_handle,_text)
                _text   = ':ERROR5'
                FWRITELINE(_handle,_text)
                _text   = 'AMENU ERROR ADDTPE 5 ' + ALLTRIM(_client)
                FWRITELINE(_handle,_text)
                _text   = ':ERROR4'
                FWRITELINE(_handle,_text)
                _text   = 'AMENU ERROR ADDTPE 4 ' + ALLTRIM(_client)
                FWRITELINE(_handle,_text)
                _text   = ':ERROR3'
                FWRITELINE(_handle,_text)
                _text   = 'AMENU ERROR ADDTPE 3 ' + ALLTRIM(_client)
```

```
                FWRITELINE(_handle,_text)
                 _text    = ':ERROR2'
                FWRITELINE(_handle,_text)
                 _text    = 'AMENU ERROR ADDTPE 2 ' + ALLTRIM(_client)
                FWRITELINE(_handle,_text)
                 _text    = ':ERROR1'
                FWRITELINE(_handle,_text)
                 _text    = 'AMENU ERROR ADDTPE 1 ' + ALLTRIM(_client)
                FWRITELINE(_handle,_text)
                 _text    = ':OKAY'
                FWRITELINE(_handle,_text)
                 _text    = 'AMENU ADDTPE ' + ALLTRIM(_client)
                FWRITELINE(_handle,_text)
                FCLOSE(_handle)
                KEYBOARD 'EE'
            ENDIF                               && IF .NOT. mkdir(_client)
        ENDIF                                   && IF queryb('Add client ' + ALLTRIM(_client) + ' from tape')
    ENDIF                                       && IF found()
ENDIF                                           && IF lastkey() # 27
USE
RETURN
```

```
*.........................................................................
*
*   Program Name: FQUERY.PRG        Copyright: EPIX Corporation
*   Date Created: 04/05/91           Language: Clipper
*   Time Created: 15:53:48             Author: Glenn Holcomb
*
*.........................................................................

*
*         Author: Glenn Holcomb
*   Date Created: 04/05/91
*   Time Created: 15:53:59
*
*

FUNCTION query24

    PARAMETERS _text, _default, _beep

    PRIVATE _o, _i, _r

    _text = ALLTRIM(_text)
    _o = LEN(_text)

    DO CASE
        CASE pcount() = 2
            IF _default
                _i = 1
            ELSE
                _i = 2
            ENDIF                                   && IF _default
            _beep = .F.
        CASE pcount() = 1
            _i = 2
            _beep = .F.
    ENDCASE                                     && DO CASE

    IF _beep
        BEEP()
    ENDIF                                       && IF _beep

    @ 24, 0 SAY _text + ' (Yes/No)'

    @ 24, _o + 2 PROMPT 'Yes'
    @ 24, _o + 6 PROMPT 'No'

    MENU TO _i

    @ 24, 0 CLEAR

    IF lastkey() = 27
        _i = 2
    ENDIF                                       && IF lastkey() = 27

    IF _i = 1
        _r = .T.
    ELSE
        _r = .F.
    ENDIF                                       && IF _i = 1

RETURN(_r)


*
*         Author: Glenn Holcomb
*   Date Created: 04/05/91
```

```
*   Time Created: 17:40:12
*
*

FUNCTION queryb

    PARAMETERS _text, _default, _beep

    PRIVATE _o, _p, _i, _r, _s

    _s = savescreen()

    DO CASE
        CASE pcount() = 2
            IF _default
                _i = 1
            ELSE
                _i = 2
            ENDIF                               && IF _default
            _beep = .F.
        CASE pcount() = 1
            _i = 2
            _beep = .F.
    ENDCASE                                 && DO CASE

    _text = ALLTRIM(_text)
    _o = LEN(_text)
    _p = INT((71 - _o)/2) - 1

    box(11,_p - 2,13,_p + _o + 11,"┌─┐│┘─└│ ",color,1,8)

    IF _beep
        BEEP()
    ENDIF                                   && IF _beep

    @ 12, _p SAY _text + ' (Yes/No)'

    @ 12, _p + _o + 2 PROMPT 'Yes'
    @ 12, _p + _o + 6 PROMPT 'No'

    MENU TO _i

    IF lastkey() = 27
        _i = 2
    ENDIF                                   && IF lastkey() = 27

    @ 24, 0 CLEAR

    IF _i = 1
        _r = .T.
    ELSE
        _r = .F.
    ENDIF                                   && IF _i = 1

    restscreen(_s)

RETURN(_r)

*
*        Author: Glenn Holcomb
*  Date Created: 04/08/91
*  Time Created: 12:40:47
*
*

FUNCTION msg_24
```

```
    PARAMETERS _text, _wait, _beep, _bright

    DO CASE
        CASE pcount() = 0
            _text = SPACE(78)
            _wait = .F.
            _beep = .F.
            _bright = .F.
        CASE pcount() = 1
            _wait = .F.
            _beep = .F.
            _bright = .F.
        CASE pcount() = 2
            _beep = .F.
            _bright = .F.
        CASE pcount() = 3
            _bright = .F.
    ENDCASE                                     && DO CASE

    IF _beep
        BEEP()
    ENDIF

    @ 24, 0 CLEAR
    print(24,0,_text,IIF(_bright,hcolor,color))

    IF _wait
        INKEY(0)
        @ 24, 0 CLEAR
    ENDIF                                       && IF _wait

RETURN(lastkey())                                   && FUNCTION msg_24

*
*        Author: Glenn Holcomb
*   Date Created: 04/12/91
*   Time Created: 16:32:31
*
*

FUNCTION orient

    PARAMETER _orient
    PRIVATE _name

    DO CASE
        CASE _orient = 'H'
            _name = 'Horizontal'
        CASE _orient = 'V'
            _name = 'Vertical  '
        CASE _orient = 'N'
            _name = 'N/A       '
        OTHERWISE
            _name = 'Unknown   '
    ENDCASE                                     && DO CASE

RETURN(_name)

*
*        Author: Glenn Holcomb
*   Date Created: 04/12/91
*   Time Created: 16:32:31
*
*
```

```
FUNCTION shape

    PARAMETER _shape, _orient
    PRIVATE _name, _i

    IF _orient = 'H' .OR. _orient = 'V'
        FOR _i = 1 TO LEN(hv_shape)
            IF _shape = LEFT(hv_shape[_i],1)
                _name = hv_shape[_i]
            ENDIF                               && IF _shape = LEFT(hv_shape[_i],1)
        NEXT                                    && FOR _i = 1 TO LEN(hv_shape)
    ELSE
        FOR _i = 1 TO LEN(n_shape)
            IF _shape = LEFT(n_shape[_i],1)
                _name = n_shape[_i]
            ENDIF                               && IF _shape = LEFT(n_shape[_i],1)
        NEXT                                    && FOR _i = 1 TO LEN(n_shape)
    ENDIF                                       && IF _orient = 'H' .OR. _orient = 'V'

RETURN(CAPFIRST(_name))

*
*        Author: Glenn Holcomb
*   Date Created: 05/06/91
*   Time Created: 18:04:17
*
*

FUNCTION odd

    PARAMETER _number

    PRIVATE _is_odd

    IF (_number % 2) = 1
        _is_odd = .T.
    ELSE
        _is_odd = .F.
    ENDIF                                       && IF (_number % 2) = 1

RETURN(_is_odd)
```

```
*.........................................................................
*
*   Program Name: GRB_PAG.PRG       Copyright: EPIX Corporation
*   Date Created: 08/01/91           Language: Clipper
*   Time Created: 16:50:14             Author: Glenn Holcomb
*
*.........................................................................

PRIVATE _rec, _pid, _new, _noqueue, _j, _i, _id, _added, _prec, _matkey
PRIVATE id_, dbp_, tsize_, size_, _tpage

_new = .f.

SELECT photo

STORE recno() TO _rec
csron()
_pid = _cphoto
@ 24, 0 SAY 'Enter Photo ID Number: ' GET _pid PICTURE '@K#####' VALID grb_chk(@_pid)
READ
csroff()
@ 24, 0 CLEAR
SEEK STR(_pid,5,0)
IF .NOT. FOUND() .OR. USED
    msg_24('Requested photo not available for grab, press any key',.T.,.T.)
    SELECT book
    _page      = book->page
    _newpage   = book->newpage
    _mat_id    = book->mat_id
    _is_T224   = book->is_T224
    _matched   = book->matched
    _dbp_a     = book->dbp_a
    _dbp_b     = book->dbp_b
    _dbp_c     = book->dbp_c
    _dbp_d     = book->dbp_d
    _id_a      = book->id_a
    _id_b      = book->id_b
    _id_c      = book->id_c
    _id_d      = book->id_d
ELSE
    SELECT book
    IF EMPTY(_id_a)
        _new = .t.
    ENDIF                                           && IF EMPTY(_id_a)
    IF EMPTY(_mat_id)
        _noqueue = 1
    ELSE
        SELECT mats
        SEEK _mat_id
        _noqueue = VAL(mats->positions) + 1
        SELECT book
    ENDIF                                           && IF EMPTY(_mat_id)
    DECLARE hold[_noqueue]
    _j = 1
    FOR _i = 1 TO 4
        _id = '_id_' + CHR(_i + 64)
        IF .NOT. EMPTY(&_id)
            hold[_j] = &_id
            _j = _j + 1
        ENDIF                                       && IF .NOT. EMPTY(&_id)
    NEXT                                            && FOR _i = 1 TO 4

    hold[_noqueue] = photo->photo_id

    _added = .T.
```

```
* Construct matkey for existing pages minus the broken pictures *

SELECT photo
_prec = RECNO()

_matkey = STR(_noqueue,1,0)
DECLARE _type[_noqueue]
_j = 1
FOR _i = 1 TO _noqueue
    SEEK STR(hold[_i],5,0)
    IF FOUND()
        _type[_j] = photo->orient + photo->shape
        _j = _j + 1
    ELSE
        msg_24('System error in GRB_PAG...unable to find photo ' + ALLTRIM(STR(_tval,5,0)) + ', press any key',.t.,.t.,.t.)
    ENDIF
NEXT                                  && FOR _i = 1 TO _noqueue
GOTO _prec
ASORT(_type)
FOR _i = 1 TO _noqueue
    _matkey = _matkey + _type[_i]
NEXT                                  && FOR _i = 1 TO _noqueue

RELEASE _type

store space(5)          to _mat_id
store .f.               to _is_1224
store space(1)          to _matched
store space(10)         to _dbp_a
store space(10)         to _dbp_b
store space(10)         to _dbp_c
store space(10)         to _dbp_d
store 0                 to _id_a
store 0                 to _id_b
store 0                 to _id_c
store 0                 to _id_d

SELECT mats
SET FILTER TO prime
GOTO TOP
SET ORDER TO 2
SEEK _matkey
SET ORDER TO 1

IF .NOT. FOUND()
    msg_24('No mats are available for this photo combination...press any key',.t.,.t.,.f.)
    _added = .F.
ELSE
    _mat_id = mats->mat_id
    DECLARE photo_id_[_noqueue],type_[_noqueue]

    SELECT photo
    _prec = RECNO()
    _j = 1
    FOR _i = 1 to _noqueue
        IF .NOT. EMPTY(hold[_i])
            photo_id_[_j] = hold[_i]
            SEEK STR(photo_id_[_j],5,0)
            type_[_j] = photo->orient + photo->shape
            _j = _j + 1
        ENDIF                         && IF .NOT. EMPTY(hold[_i])
    NEXT                              && FOR _i = 1 to 4

    FOR _i = 1 TO _noqueue
        FOR _j = 65 TO 68
            _id_    = '_id_' + CHR(_j)
```

```
            dbp_    = '_dbp_' + CHR(_j)
            tsize_  = 'mats->tsize_' + CHR(_j)
            size_   = ALLTRIM(RIGHT(&tsize_,5))
            IF type_[_i] = LEFT(&tsize_,2) .AND. EMPTY(&id_) .AND. .NOT. EMPTY(photo_id_[_i])
               SEEK STR(photo_id_[_i],5,0)
               REPLACE used WITH .T.
               &id_ = photo_id_[_i]
               DO CASE
                  CASE size_ = '3X5' .OR. size_ = '4X5' .OR. size_ = '5X5'
                     &dbp_ = photo->dbp_small
                  CASE size_ = '5X7' .OR. size_ = '8X8'
                     &dbp_ = photo->dbp_med
                  CASE size_ = '8X10' .OR. size_ = '10X10'
                     &dbp_ = photo->dbp_lge
                  CASE size_ = '12X12'
                     &dbp_ = photo->dbp_1212
                  CASE size_ = '12X24'
                     &dbp_ = photo->dbp_1224
                     is_1224_ = .T.
               ENDCASE                       && DO CASE
               photo_id_[_i] = 0
            ENDIF                            && IF type_[_i] = LEFT(&tsize_,2) .AND. EMPTY(&id_)
         NEXT                                && FOR _j = 65 TO 68
      NEXT                                   && FOR _i = 1 TO _noqueue
   ENDIF                                     && IF .NOT. FOUND()

   SELECT mats
   SET FILTER TO
   GOTO TOP
   SELECT book

   IF _added
      IF _new
         APPEND BLANK
         replace book->page        with _page
      ENDIF                                  && IF _new
      replace book->mat_id      with _mat_id
      replace book->is_1224     with _is_1224
      replace book->matched     with _matched
      replace book->dbp_a       with _dbp_a
      replace book->dbp_b       with _dbp_b
      replace book->dbp_c       with _dbp_c
      replace book->dbp_d       with _dbp_d
      replace book->id_a        with _id_a
      replace book->id_b        with _id_b
      replace book->id_c        with _id_c
      replace book->id_d        with _id_d
      IF _new
         IF VAL(_page) # VAL(_cpage) + 1
            SEEK _cpage
            IF book->is_1224 .OR. book->matched = 'N'
               _tpage = STR(VAL(book->page) + 2,3,0)
            ELSE
               _tpage = STR(VAL(book->page) + 1,3,0)
            ENDIF                            && IF is_1224 .OR. matched = 'N'
            DO pag_rnm WITH .T., _page, _tpage
            _cpage = _tpage
         ELSE
            _cpage = _page
         ENDIF                               && IF reccount() # 2
      ENDIF                                  && IF _new
   ELSE
      _page       = book->page
      _newpage    = book->newpage
      _mat_id     = book->mat_id
      _is_1224    = book->is_1224
```

A-98

```
        _matched     = book->matched
        _dbp_a       = book->dbp_a
        _dbp_b       = book->dbp_b
        _dbp_c       = book->dbp_c
        _dbp_d       = book->dbp_d
        _id_a        = book->id_a
        _id_b        = book->id_b
        _id_c        = book->id_c
        _id_d        = book->id_d
    ENDIF                                   && IF _added
    SELECT mats
    SET FILTER TO
    SELECT book
    SEEK _cpage
    DO pag_dis WITH _added, _dis_id, _dis_sz
ENDIF                                       && IF .NOT. FOUND() .OR. USED

SELECT photo
GOTO _rec
pht_ret(@_cphoto)
DO pht_dis WITH .F.
SELECT book

RETURN

*
*        Author: Glenn Holcomb
*   Date Created: 04/18/91
*   Time Created: 11:50:04
*
*

FUNCTION grb_chk

PARAMETER _photo_id

PRIVATE _sscreen
DECLARE flds[1], head[1]

IF EMPTY(_photo_id)
SET FILTER TO chosen .AND. .NOT. used
GOTO TOP
_sscreen = savescreen()
flds[1] = 'PHOTO_ID'
head[1] = 'Photo ID #'
box(13,19,21,32,"┌┐┘└",color,1,8)
DBEDIT(14,20,20,31,flds,'','',head)
_photo_id = photo_id
SET FILTER TO chosen
RESTSCREEN(_sscreen)
ENDIF                                       && IF EMPTY(_page)
RETURN(.T.)
```

```
*.........................................................................
*
*    Program Name: JOI_PAG.PRG        Copyright: EPIX Corporation
*    Date Created: 07/03/91            Language: Clipper
*    Time Created: 18:36:08              Author: Glenn Holcomb
*
*.........................................................................

PRIVATE _tpage, _rec, _npage, _noqueue, _i, _j, _id
PRIVATE _newpage, _no_pics, _temp, _tval, _prec, _matkey, _mrec

_tpage = _page

csron()
@ 24, 0 SAY 'Please enter first page number to be joined? ' GET _tpage PICTURE '@K###'
READ
csroff()
@ 24, 0 CLEAR
_npage = _tpage

_rec = RECNO()
SET ORDER TO 2
SEEK VAL(_tpage)
SET ORDER TO 1

IF LASTKEY() = 27
    msg_24('Join aborted...',.f.,.t.,.f.)
    GOTO _rec
ELSEIF .NOT. FOUND() .OR. VAL(_tpage) <= 0
    msg_24('Page not found...',.f.,.t.,.f.)
    GOTO _rec
ELSEIF .NOT. EMPTY(book->matched)
    msg_24('This page is matched, unmatch to join, press any key',.t.,.t.,.f.)
ELSE
    csron()
    @ 24, 0 SAY 'Please enter page number to be joined to page ' + ALLTRIM(_tpage) + ': ' GET _npage PICTURE '@K###'
    READ
    csroff()

    SET ORDER TO 2
    SEEK VAL(_npage)
    SET ORDER TO 1

    IF LASTKEY() = 27
        msg_24('Join aborted, press any key',.t.,.t.,.f.)
        GOTO _rec
    ELSEIF .NOT. FOUND() .OR. VAL(_npage) <= 0 .OR. VAL(_npage) >= nextpage()
        msg_24('Invalid second page, press any key',.t.,.t.,.f.)
        GOTO _rec
    ELSEIF .NOT. EMPTY(book->matched)
        msg_24('Second page is matched, unmatch to join, press any key',.t.,.t.,.f.)
        GOTO _rec
    ELSE
        IF VAL(_tpage) > VAL(_npage)
            _temp = _tpage
            _tpage = _npage
            _npage = _temp
        ENDIF                                  && IF _tpage > _npage
        SET ORDER TO 2
        SEEK VAL(_tpage)
        SELECT mats
        SEEK book->mat_id
        _noqueue = VAL(mats->positions)
        SELECT book
        SEEK VAL(_npage)
        SELECT mats
```

```
SEEK book->mat_id
_noqueue = VAL(mats->positions) + _noqueue
SELECT book
SET ORDER TO 1
GOTO _rec
IF _noqueue > 4
   _msg_24('New page exceeds 4 photos, join aborted, press any key',.t.,.t.,.f.)
ELSE
    DECLARE hold[_noqueue]
    SET ORDER TO 2
    SEEK VAL(_tpage)
    _j = 1
    FOR _i = 1 TO 4
        _id = 'book->id_' + CHR(_i + 64)
        IF .NOT. EMPTY(&_id)
            hold[_j] = &_id
            _j = _j + 1
        ENDIF                            && IF .NOT. EMPTY(&_id)
    NEXT                                 && FOR _i = 1 TO 4
    SEEK VAL(_npage)
    FOR _i = 1 TO 4
        _id = 'book->id_' + CHR(_i + 64)
        IF .NOT. EMPTY(&_id)
            hold[_j] = &_id
            _j = _j + 1
        ENDIF                            && IF .NOT. EMPTY(&_id)
    NEXT                                 && FOR _i = 1 TO 4

    SET ORDER TO 1
    _added = .T.

    * Construct matkey for existing pages minus the broken pictures *

    SELECT photo
    _prec = RECNO()

    _matkey = STR(_noqueue,1,0)
    DECLARE _type[_noqueue]
    _j = 1
    FOR _i = 1 TO _noqueue
        SEEK STR(hold[_i],5,0)
        IF FOUND()
            _type[_j] = photo->orient + photo->shape
            _j = _j + 1
        ELSE
            msg_24('System error in JOI_PAG...unable to find photo ' + ALLTRIM(STR(_tval,5,0)) + ', press any key',.t.,.t.,.t.)
        ENDIF
    NEXT                                 && FOR _i = 1 TO _noqueue
    GOTO _prec
    ASORT(_type)
    FOR _i = 1 TO _noqueue
        _matkey = _matkey + _type[_i]
    NEXT                                 && FOR _i = 1 TO _noqueue

    RELEASE _type

    store space(5)         to _mat_id
    store .f.              to _is_T224
    store space(1)         to _matched
    store space(10)        to _dbp_a
    store space(10)        to _dbp_b
    store space(10)        to _dbp_c
    store space(10)        to _dbp_d
    store 0                to _id_a
    store 0                to _id_b
    store 0                to _id_c
```

```
store 0              to _id_d

* Create array of valid mats *

SELECT mats
SET FILTER TO prime
GOTO TOP
SET ORDER TO 2
SEEK _matkey
SET ORDER TO 1

IF .NOT. FOUND()
    msg_24('No mats are available for this photo combination...press any key',.t.,.t.,.f.)
    _added = .F.
ELSE
    _mat_id = mats->mat_id
    DECLARE photo_id_[_noqueue],type_[_noqueue]

    SELECT photo
    _prec = RECNO()
    _j = 1
    FOR _i = 1 to _noqueue
        IF .NOT. EMPTY(hold[_i])
            photo_id_[_j] = hold[_i]
            SEEK STR(photo_id_[_j],5,0)
            type_[_j] = photo->orient + photo->shape
            _j = _j + 1
        ENDIF                       && IF .NOT. EMPTY(hold[_i])
    NEXT                            && FOR _i = 1 to 4

    FOR _i = 1 TO _noqueue
        FOR _j = 65 TO 68
            id_    = '_id_' + CHR(_j)
            dbp_   = '_dbp_' + CHR(_j)
            tsize_ = 'mats->tsize_' + CHR(_j)
            size_  = ALLTRIM(RIGHT(&tsize_,5))
            IF type_[_i] = LEFT(&tsize_,2) .AND. EMPTY(&id_) .AND. .NOT. EMPTY(photo_id_[_i])
                SEEK STR(photo_id_[_i],5,0)
                REPLACE used WITH .T.
                &id_ = photo_id_[_i]
                DO CASE
                    CASE size_ = '3X5' .OR. size_ = '4X5' .OR. size_ = '5X5'
                        &dbp_ = photo->dbp_small
                    CASE size_ = '5X7' .OR. size_ = '8X8'
                        &dbp_ = photo->dbp_med
                    CASE size_ = '8X10' .OR. size_ = '10X10'
                        &dbp_ = photo->dbp_lge
                    CASE size_ = '12X12'
                        &dbp_ = photo->dbp_1212
                    CASE size_ = '12X24'
                        &dbp_ = photo->dbp_1224
                        is_1224_ = .T.
                ENDCASE             && DO CASE
                photo_id_[_i] = 0
            ENDIF                   && IF type_[_i] = LEFT(&tsize_,2) .AND. EMPTY(&id_)
        NEXT                        && FOR _j = 65 TO 68
    NEXT                            && FOR _i = 1 TO _noqueue
ENDIF                               && IF .NOT. FOUND()

SELECT mats
SET FILTER TO
GOTO TOP
SELECT book

IF _added
    SELECT book
```

```
            SET ORDER TO 2
            SEEK VAL(_tpage)
            replace book->mat_id      with _mat_id
            replace book->is_T224     with _is_T224
            replace book->matched     with _matched
            replace book->dbp_a       with _dbp_a
            replace book->dbp_b       with _dbp_b
            replace book->dbp_c       with _dbp_c
            replace book->dbp_d       with _dbp_d
            replace book->id_a        with _id_a
            replace book->id_b        with _id_b
            replace book->id_c        with _id_c
            replace book->id_d        with _id_d
            SEEK VAL(_npage)
            DELETE
            PACK
            SET ORDER TO 1
            SELECT photo
            GOTO _prec
            SELECT book
            DO pag_rnm
         ENDIF                                  && IF _added
         SELECT mats
         SET FILTER TO
         SELECT book
         SET ORDER TO 2
         SEEK VAL(_tpage)
         SET ORDER TO 1
         DO pag_dis WITH _added, _dis_id, _dis_sz
      ENDIF                                     && IF _noqueue > 4
   ENDIF                                        && IF LASTKEY() = 27
ENDIF                                           && IF LASTKEY() = 27

RETURN
```

```
*.........................................................................
*
*   Program Name: ORD_MGA.PRG       Copyright: EPIX Corporation
*   Date Created: 08/13/91           Language: Clipper
*   Time Created: 18:08:31             Author: Glenn Holcomb
*
*.........................................................................

PRIVATE _rec, _i, _tsize, _mrec, _sscreen, _noprints, _top, _ok, _lastpan
PRIVATE _n_full, _n_half, _n_oval, _n_circ, _n_oct
PRIVATE _seq_full, _seq_half, _seq_oval, _seq_circ, _seq_oct
PRIVATE _text, _code, _uon, _uoff, _bon, _boff, _hdl, _line
PRIVATE _j, _across

_ok      = .T.
_lastpan = .F.

_n_full   = 0
_n_half   = 0
_n_oval   = 0
_n_circ   = 0
_n_oct    = 0
_seq_full = SPACE(0)
_seq_half = SPACE(0)
_seq_oval = SPACE(0)
_seq_circ = SPACE(0)
_seq_oct  = SPACE(0)

_noprints = 0

msg_24('Please wait while compiling figures...',.f.,.f.,.f.)

SELECT book

DO WHILE .NOT. EOF() .AND. _ok
    IF book->mat_id = 'EMPTY'
        msg_24('There are empty pages in the album, order cannot be generated, press a key',.t.,.t.,.f.)
        _ok = .F.
    ENDIF                                   && IF book->mat_id = 'EMPTY'
    IF _lastpan .AND. book->is_1224
        msg_24('There are back-to-back full panels, order cannot be generated, press a key',.t.,.t.,.f.)
        _ok = .F.
    ENDIF                                   && IF _lastpan .AND. book->is_1224
    IF book->is_1224
        _lastpan = .T.
    ELSE
        _lastpan = .F.
    ENDIF                                   && IF book->is_1224
    SKIP 1
ENDDO                                       && DO WHILE .NOT. EOF() .AND. _ok

GOTO TOP
IF _ok
    SELECT 0
    USE ..\tots
    ZAP
    INDEX ON item TO ..\tots

    SELECT mats
    _mrec = RECNO()

    SELECT book
    _rec = RECNO()
    GOTO TOP

    DO WHILE .NOT. EOF() .AND. VAL(ALLTRIM(page)) # 0
```

1C/14PRINT

```
    SELECT mats
    SEEK book->mat_id
    IF FOUND()
        FOR _i = 65 TO 68
            _tsize = 'mats->tsize_' + CHR(_i)
            IF .NOT. EMPTY(&_tsize)
                SELECT tots
                SEEK ALLTRIM(RIGHT(&_tsize,5))
                IF .NOT. FOUND()
                    APPEND BLANK
                    REPLACE item WITH ALLTRIM(RIGHT(&_tsize,5))
                ENDIF                           && IF .NOT. FOUND()
                REPLACE tots->quantity WITH tots->quantity + 1
                IF RIGHT(&_tsize,5) = '12X24'
                    _noprints = _noprints + 2
                ELSE
                    _noprints = _noprints + 1
                ENDIF                           && IF RIGHT(&_tsize,5) = '12X24'
            ENDIF                               && IF .NOT. EMPTY(&_tsize)
        NEXT                                    && FOR _i = 65 TO 69
    ELSE
        msg_24('System error in ORD_MGA, mat ' + book->mat_id + ' not found, press any key',.t.,.t.,.t.)
    ENDIF                                       && IF FOUND()
    SELECT book
    SKIP 1
ENDDO                                           && DO WHILE .NOT. EOF() .AND. VAL(ALLTRIM(page)) # 0

SELECT book
GOTO TOP

DECLARE side[lastrec()], frame[lastrec()]
_top = 0

DO WHILE .NOT. EOF()
    SELECT mats
    SEEK book->mat_id
    SELECT mfg
    SEEK book->mat_id
    IF .NOT. FOUND()
        msg_24('System error in ORD_MGA, custom frame not found for side ' + ALLTRIM(book->page) + ', press any key',.t.,.t.,.t.)
    ENDIF                                       && IF .NOT. FOUND()
    SELECT book
    DO CASE
        CASE .NOT. mfg->standard
            _top = _top + 1
            side[_top]  = book->page
            frame[_top] = mfg->mfg_id
        CASE book->is_1224
            _n_full   = _n_full + 1
            _seq_full = _seq_full + ALLTRIM(book->page) + ' & ' + ALLTRIM(STR(VAL(book->page) + 1,3)) + ', '
        CASE RIGHT(mats->tsize_a,5) = '12X12'
            _n_half   = _n_half + 1
            _seq_half = _seq_half + ALLTRIM(book->page) + ', '
        OTHERWISE
            IF .NOT. EMPTY(mats->tsize_a)
                IF LEFT(mats->tsize_a,1) $ 'HV'
                    IF SUBSTR(mats->tsize_a,2,1) = 'O'
                        _n_oval   = _n_oval + 1
                        _seq_oval = _seq_oval + ALLTRIM(book->page) + mfg->pos_a + ', '
                    ENDIF               && IF SUBSTR(mats->tsize_a,2,1) = 'O'
                ELSEIF LEFT(mats->tsize_a,1) $ 'N'
                    DO CASE
                        CASE SUBSTR(mats->tsize_a,2,1) = 'C'
                            _n_circ   = _n_circ + 1
                            _seq_circ = _seq_circ + ALLTRIM(book->page) + mfg->pos_a + ', '
                        CASE SUBSTR(mats->tsize_a,2,1) = 'O'
```

```
                    _n_oct   = _n_oct + 1
                    _seq_oct = _seq_oct + ALLTRIM(book->page) + mfg->pos_a + ', '
                ENDCASE                   && DO CASE
            ENDIF                         && IF LEFT(mats->tsize_a,1) $ 'HV'
        ENDIF                             && IF .NOT. EMPTY(mats->tsize_a)
        IF .NOT. EMPTY(mats->tsize_b)
            IF LEFT(mats->tsize_b,1) $ 'HV'
                IF SUBSTR(mats->tsize_b,2,1) = 'O'
                    _n_oval   = _n_oval + 1
                    _seq_oval = _seq_oval + ALLTRIM(book->page) + mfg->pos_b + ', '
                ENDIF                     && IF SUBSTR(mats->tsize_b,2,1) = 'O'
            ELSEIF LEFT(mats->tsize_b,1) $ 'N'
                DO CASE
                    CASE SUBSTR(mats->tsize_b,2,1) = 'C'
                        _n_circ   = _n_circ + 1
                        _seq_circ = _seq_circ + ALLTRIM(book->page) + mfg->pos_b + ', '
                    CASE SUBSTR(mats->tsize_b,2,1) = 'O'
                        _n_oct   = _n_oct + 1
                        _seq_oct = _seq_oct + ALLTRIM(book->page) + mfg->pos_b + ', '
                ENDCASE                   && DO CASE
            ENDIF                         && IF LEFT(mats->tsize_b,1) $ 'HV'
        ENDIF                             && IF .NOT. EMPTY(mats->tsize_b)
        IF .NOT. EMPTY(mats->tsize_c)
            IF LEFT(mats->tsize_c,1) $ 'HV'
                IF SUBSTR(mats->tsize_c,2,1) = 'O'
                    _n_oval   = _n_oval + 1
                    _seq_oval = _seq_oval + ALLTRIM(book->page) + mfg->pos_c + ', '
                ENDIF                     && IF SUBSTR(mats->tsize_c,2,1) = 'O'
            ELSEIF LEFT(mats->tsize_c,1) $ 'N'
                DO CASE
                    CASE SUBSTR(mats->tsize_c,2,1) = 'C'
                        _n_circ   = _n_circ + 1
                        _seq_circ = _seq_circ + ALLTRIM(book->page) + mfg->pos_c + ', '
                    CASE SUBSTR(mats->tsize_c,2,1) = 'O'
                        _n_oct   = _n_oct + 1
                        _seq_oct = _seq_oct + ALLTRIM(book->page) + mfg->pos_c + ', '
                ENDCASE                   && DO CASE
            ENDIF                         && IF LEFT(mats->tsize_c,1) $ 'HV'
        ENDIF                             && IF .NOT. EMPTY(mats->tsize_c)
        IF .NOT. EMPTY(mats->tsize_d)
            IF LEFT(mats->tsize_d,1) $ 'HV'
                IF SUBSTR(mats->tsize_d,2,1) = 'O'
                    _n_oval   = _n_oval + 1
                    _seq_oval = _seq_oval + ALLTRIM(book->page) + mfg->pos_d + ', '
                ENDIF                     && IF SUBSTR(mats->tsize_d,2,1) = 'O'
            ELSEIF LEFT(mats->tsize_d,1) $ 'N'
                DO CASE
                    CASE SUBSTR(mats->tsize_d,2,1) = 'C'
                        _n_circ   = _n_circ + 1
                        _seq_circ = _seq_circ + ALLTRIM(book->page) + mfg->pos_d + ', '
                    CASE SUBSTR(mats->tsize_d,2,1) = 'O'
                        _n_oct   = _n_oct + 1
                        _seq_oct = _seq_oct + ALLTRIM(book->page) + mfg->pos_d + ', '
                ENDCASE                   && DO CASE
            ENDIF                         && IF LEFT(mats->tsize_d,1) $ 'HV'
        ENDIF                             && IF .NOT. EMPTY(mats->tsize_d)
    ENDCASE                               && DO CASE
    SKIP 1
ENDDO                                     && DO WHILE .NOT. EOF()


SELECT 0
USE ..\printers
DECLARE flds[1], head[1]
_sscreen = savescreen()
msg_24('Use the arrows to scroll, ENTER to Select',.f.,.f.,.t.)
```

```
flds[1] = 'NAME'
head[1] = 'Printer'
box(4,10,14,44,"┌─┐│┘─└│ ",color,1,8)
DBEDIT(5,11,13,43,flds,'','',head)
RELEASE flds, head
restscreen(_sscreen)

_uon = ""
_code = ALLTRIM(printers->undl_on)
DO WHILE .NOT. EMPTY(_code)
    _uon = _uon + CHR(VAL(LEFT(_code,3)))
    _code = SUBSTR(_code,4)
ENDDO                                   && DO WHILE .NOT. EMPTY(_code)

_uoff = ""
_code = ALLTRIM(printers->undl_off)
DO WHILE .NOT. EMPTY(_code)
    _uoff = _uoff + CHR(VAL(LEFT(_code,3)))
    _code = SUBSTR(_code,4)
ENDDO                                   && DO WHILE .NOT. EMPTY(_code)

_bon = ""
_code = ALLTRIM(printers->bold_on)
DO WHILE .NOT. EMPTY(_code)
    _bon = _bon + CHR(VAL(LEFT(_code,3)))
    _code = SUBSTR(_code,4)
ENDDO                                   && DO WHILE .NOT. EMPTY(_code)

_boff = ""
_code = ALLTRIM(printers->bold_off)
DO WHILE .NOT. EMPTY(_code)
    _boff = _boff + CHR(VAL(LEFT(_code,3)))
    _code = SUBSTR(_code,4)
ENDDO                                   && DO WHILE .NOT. EMPTY(_code)

_hdl = FCREATE('ORDERA.PRN')
_line = 0
_text = ""
_code = ALLTRIM(printers->reset) + ALLTRIM(printers->ort_port) + ALLTRIM(printers->pri_fix) + ALLTRIM(printers->pitch_10)
_code = _code + ALLTRIM(printers->fnt_cour) + ALLTRIM(printers->lpi_6)
DO WHILE .NOT. EMPTY(_code)
    IF LEFT(_code,1) = '"'
        _text = _text + SUBSTR(_code,2)
        _code = ""
    ELSE
        _text = _text + CHR(VAL(LEFT(_code,3)))
        _code = SUBSTR(_code,4)
    ENDIF                               && IF LEFT(_code,1) = '"'
ENDDO                                   && DO WHILE .NOT. EMPTY(_code)
_text = _text + _bon + center('CAPRI ORDER FORM',80) + _boff
fwriteline(_hdl, _text)
_line = _line + 1

FOR _i = 1 TO 3
    DO rpt_blk WITH _hdl, _line
NEXT                                    && FOR _i = 1 TO 3

SELECT 0
USE ..\client INDEX ..\client
SEEK _dclient

_text = " 2.  CUSTOMER REFERENCE:  " + ALLTRIM(client->client) + ' ' + DTOC(client->eventdate)
fwriteline(_hdl, _text)
_line = _line + 1

USE
```

```
DO rpt_blk WITH _hdl, _line

_text = " 3.  DATE:  " + DTOC(date())
Fwriteline(_hdl, _text)
_line = _line + 1

DO rpt_blk WITH _hdl, _line

_text = ' 8.  REVERSIBLE FRAME COLOR:  ' + _mat_color
Fwriteline(_hdl, _text)
_line = _line + 1

DO rpt_blk WITH _hdl, _line

_text = '12.  TOTAL # OF PRINTS ' + ALLTRIM(STR(_noprints))
Fwriteline(_hdl, _text)
_line = _line + 1

DO rpt_blk WITH _hdl, _line

_text = '28.  MULTI MOUNTING & CUSTOM FRAMES'
Fwriteline(_hdl, _text)
_line = _line + 1

SELECT TOTS

SEEK '8X10'
IF FOUND()
    _text = SPACE(5) + 'TOTAL # OF 8x10 PRINTS          ' + STR(quantity,3,0)
    Fwriteline(_hdl, _text)
    _line = _line + 1
ENDIF                                  && IF FOUND()

SEEK '10X10'
IF FOUND()
    _text = SPACE(5) + 'TOTAL # OF 10x10 PRINTS         ' + STR(quantity,3,0)
    Fwriteline(_hdl, _text)
    _line = _line + 1
ENDIF                                  && IF FOUND()
SEEK '8X8'
IF FOUND()
    _text = SPACE(5) + 'TOTAL # OF 8x8 PRINTS           ' + STR(quantity,3,0)
    Fwriteline(_hdl, _text)
    _line = _line + 1
ENDIF                                  && IF FOUND()
SEEK '5X7'
IF FOUND()
    _text = SPACE(5) + 'TOTAL # OF 5x7 PRINTS           ' + STR(quantity,3,0)
    Fwriteline(_hdl, _text)
    _line = _line + 1
ENDIF                                  && IF FOUND()

_i = 0
SEEK '4X5'
IF FOUND()
    _i = _i + quantity
ENDIF                                  && IF FOUND()
SEEK '3X5'
IF FOUND()
    _i = _i + quantity
ENDIF                                  && IF FOUND()
IF _i # 0
    _text = SPACE(5) + 'TOTAL # OF 4x5 & 3 1/2x5 PRINTS ' + STR(_i,3,0)
    Fwriteline(_hdl, _text)
    _line = _line + 1
```

```
ENDIF                                        && IF _i # 0

SEEK '5X5'
IF FOUND()
    _text = SPACE(5) + 'TOTAL # OF 5x5 PRINTS           ' + STR(quantity,3,0)
    fwriteline(_hdl, _text)
    _line = _line + 1
ENDIF                                        && IF FOUND()

DO rpt_blk WITH _hdl, _line

IF .NOT. EMPTY(_n_full)
    _text = '29.  # OF PANORAMAS ' + STR(_n_full)
    fwriteline(_hdl, _text)
    _line = _line + 1
    _text = SPACE(5) + 'PRINT SEQUENCE ' + LEFT(_seq_full,LEN(_seq_full)-2)
    fwriteline(_hdl, _text)
    _line = _line + 1
    DO rpt_blk WITH _hdl, _line
ENDIF                                        && IF .NOT. EMPTY(_n_full)

IF .NOT. EMPTY(_n_half)
    _text = '30.  # OF 1/2 PANOS ' + STR(_n_half)
    fwriteline(_hdl, _text)
    _line = _line + 1
    _text = SPACE(5) + 'PRINT SEQUENCE ' + LEFT(_seq_half,LEN(_seq_half)-2)
    fwriteline(_hdl, _text)
    _line = _line + 1
    DO rpt_blk WITH _hdl, _line
ENDIF                                        && IF .NOT. EMPTY(_n_half)

IF .NOT. EMPTY(_n_oval)
    _text = '31.  # OF OVALS     ' + STR(_n_oval)
    fwriteline(_hdl, _text)
    _line = _line + 1
    _text = SPACE(5) + 'PRINT SEQUENCE ' + LEFT(_seq_oval,LEN(_seq_oval)-2)
    fwriteline(_hdl, _text)
    _line = _line + 1
    DO rpt_blk WITH _hdl, _line
ENDIF                                        && IF .NOT. EMPTY(_n_oval)

IF .NOT. EMPTY(_n_circ)
    _text = '32.  # OF CIRCLES   ' + STR(_n_circ)
    fwriteline(_hdl, _text)
    _line = _line + 1
    _text = SPACE(5) + 'PRINT SEQUENCE ' + LEFT(_seq_circ,LEN(_seq_circ)-2)
    fwriteline(_hdl, _text)
    _line = _line + 1
    DO rpt_blk WITH _hdl, _line
ENDIF                                        && IF .NOT. EMPTY(_n_circ)

IF .NOT. EMPTY(_n_oct)
    _text = '33.  # OF OCTAGONS  ' + STR(_n_oct)
    fwriteline(_hdl, _text)
    _line = _line + 1
    _text = SPACE(5) + 'PRINT SEQUENCE ' + LEFT(_seq_oct,LEN(_seq_oct)-2)
    fwriteline(_hdl, _text)
    _line = _line + 1
    DO rpt_blk WITH _hdl, _line
ENDIF                                        && IF .NOT. EMPTY(_n_oct)

IF _top > 0
    _text = SPACE(0)
    FOR _i = 1 TO IIF(_top >= 4, 4, _top)
        _text = _text + SPACE(9) + 'CUSTOM' + SPACE(5)
    NEXT                                     && FOR _i = 1 TO IIF(_top >= 4, 4, _top)
```

```
    fwriteline(_hdl, _text)
    _line = _line + 1

    _text = SPACE(0)
    FOR _i = 1 TO IIF(_top >= 4, 4, _top)
        _text = _text + _uon + 'SIDE #' + _uoff + SPACE(2) + _uon + 'FRAME #' + _uoff + SPACE(5)
    NEXT                                        && FOR _i = 1 TO IIF(_top >= 4, 4, _top)
    fwriteline(_hdl, _text)
    _line = _line + 1

    _j      = 1
    _across = 1
    DO WHILE _j <= _top
        _text = SPACE(1)
        DO WHILE _across <= 4 .AND. _j <= _top
            _text = _text + side[_j] + SPACE(6) + frame[_j] + SPACE(8)
            _j      = _j + 1
            _across = _across + 1
        ENDDO                                   && DO WHILE _across <= 4 .AND. _j <= _top
        fwriteline(_hdl, _text)
        _line = _line + 1
        _across = 1
        IF _line > 60 .AND. _j <= _top
            _text = CHR(12)
            fwriteline(_hdl,_text)
            _line = 1

            _text = SPACE(0)
            FOR _i = 1 TO IIF(_top >= 4, 4, _top)
                _text = _text + SPACE(9) + 'CUSTOM' + SPACE(5)
            NEXT                                && FOR _i = 1 TO IIF(_top >= 4, 4, _top)
            fwriteline(_hdl, _text)
            _line = _line + 1

            _text = SPACE(0)
            FOR _i = 1 TO IIF(_top >= 4, 4, _top)
                _text = _text + _uon + 'SIDE #' + _uoff + SPACE(2) + _uon + 'FRAME #' + _uoff + SPACE(5)
            NEXT                                && FOR _i = 1 TO IIF(_top >= 4, 4, _top)
            fwriteline(_hdl, _text)
            _line = _line + 1
        ENDIF                                   && IF _line < 60
    ENDDO                                       && DO WHILE _j <= _top
ENDIF                                           && IF _top > 0

_text = CHR(12)
fwriteline(_hdl,_text)
FCLOSE(_hdl)

IF UPPER(ALLTRIM(printers->name)) # 'SCREEN'
    _ok = .F.
    DO WHILE .NOT. _ok .AND. lastkey() # 27
        IF prnstatus() = 0
            _ok = .T.
        ELSE
            msg_24('Printer error, fix printer and press enter, esc to abort',.t.,.t.)
        ENDIF                                   && IF prnstatus() = 0
    ENDDO                                       && DO WHILE .NOT. _ok .AND. lastkey() # 27
    IF _ok .AND. lastkey() # 27
        _hdl = fopen('ORDERA.PRN')
        DO WHILE .NOT. FEOF(_hdl)
            lprintline(freadline(_hdl))
        ENDDO                                   && DO WHILE .NOT. FEOF(_hdl)
        fclose(_hdl)
    ELSE
        msg_24('Order print aborted, press any key',.t.,.t.,.f.)
    ENDIF                                       && IF _ok .AND. lastkey() # 27
```

```
    ELSE
        msg_24('Use arrow keys to move, ESC to exit',.f.,.f.,.t.)
        box(1,1,22,78,"┌┐│┘─└│ ",color,1,8)
        csron()
        memoedit(memoread('ORDERA.PRN'),2,2,21,77,.f.,'DUMMY',132)
        msg_24()
        csroff()
    ENDIF                                   && IF printer->name # 'SCREEN'

    SELECT printers
    USE

    SELECT tots
    USE

    ferase('ORDERA.PRN')

    @ 24, 0 CLEAR

ENDIF                                       && IF _ok

RETURN
```

```
*.........................................................................
*
*    Program Name: ORD_MGB.PRG       Copyright: EPIX Corporation
*    Date Created: 08/13/91           Language: Clipper
*    Time Created: 18:08:39             Author: Glenn Holcomb
*
*.........................................................................

PRIVATE _ins2, _ins1, _ins0, _ok, _front, _back, _mfg_id, _size, _quantity
PRIVATE _text, _code, _uon, _uoff, _bon, _boff, _ndl, _line, _insp
PRIVATE _badpanel, _lastpanel

_insp = 0
_ins2 = 0
_ins1 = 0
_ins0 = 0
_ok = .T.
_badpanel  = 0
_lastpanel = .F.

SELECT 0
USE ..\order
INDEX ON mat_id TO ..\order
ZAP

msg_24('Please wait while compiling figures...',.f.,.f.,.f.)

SELECT book

DO WHILE .NOT. EOF() .AND. _ok
    IF book->mat_id = 'EMPTY'
        msg_24('There are empty pages in the album, order cannot be generated, press a key',.t.,.t.,.f.)
         _ok = .F.
    ENDIF                                   && IF book->mat_id = 'EMPTY'
    SKIP 1
ENDDO                                       && DO WHILE .NOT. EOF() .AND. _ok

GOTO TOP
IF _ok
    DO WHILE .NOT. EOF()
        SELECT order
        SEEK book->mat_id
        IF .NOT. FOUND()
            APPEND BLANK
            REPLACE order->mat_id WITH book->mat_id
            IF book->is_1224
                REPLACE order->quantity WITH order->quantity + 2
            ELSE
                REPLACE order->quantity WITH order->quantity + 1
            ENDIF                           && IF book->is_1224
        ELSE
            IF book->is_1224
                REPLACE order->quantity WITH order->quantity + 2
            ELSE
                REPLACE order->quantity WITH order->quantity + 1
            ENDIF                           && IF book->is_1224
        ENDIF                               && IF .NOT. FOUND()
        SELECT book
        SKIP 1
    ENDDO                                   && DO WHILE .NOT. EOF()

    GOTO TOP

    SELECT mats
    SEEK book->mat_id
    _lastpanel = .F.
```

```
IF RIGHT(mats->tsize_a,5) = '12X12'
     _front = .F.
ELSE
     _front = .T.
ENDIF                                              && IF RIGHT(tsize_a,5) = '12X12'

SELECT book
SKIP 1

DO WHILE .NOT. EOF()
    SELECT mats
    SEEK book->mat_id
    IF RIGHT(mats->tsize_a,5) = '12X12'
        _back = .F.
        DO CASE
            CASE _front .AND. _back
                _ins2 = _ins2 + 1
            CASE (_front .AND. .NOT. _back) .OR. (.NOT. _front .AND. _back)
                _ins1 = _ins1 + 1
            CASE .NOT. _front .AND. .NOT. _back
                IF _lastpanel
                    _badpanel = _badpanel + 1
                ENDIF                              && IF _lastpanel
                _ins0 = _ins0 + 1
        ENDCASE                                    && DO CASE
        _back = .F.
        SELECT BOOK
        SKIP 1
        SELECT mats
        SEEK book->mat_id
        _lastpanel = .F.
        IF RIGHT(mats->tsize_a,5) = '12X12'
            _front = .F.
        ELSE
            _front = .T.
        ENDIF                                      && IF RIGHT(tsize_a,5) = '12X12'
        SELECT book
        SKIP 1
    ELSEIF RIGHT(mats->tsize_a,5) = '12X24'
        _back = .F.
        DO CASE
            CASE _front .AND. .NOT. _back
                _insp = _insp + 1
            CASE .NOT. _front .AND. .NOT. _back
                _badpanel = _badpanel + 1
        ENDCASE                                    && DO CASE
        _back = .F.
        _front = .F.
        _lastpanel = .T.
        SELECT book
        SKIP 1
    ELSE
        _back = .T.
        DO CASE
            CASE _front .AND. _back
                _ins2 = _ins2 + 1
            CASE (_front .AND. .NOT. _back) .OR. (.NOT. _front .AND. _back)
                IF _lastpanel
                    _insp = _insp + 1
                ELSE
                    _ins1 = _ins1 + 1
                ENDIF                              && IF _lastpanel
        ENDCASE                                    && DO CASE
        _back = .F.
        SELECT BOOK
        SKIP 1
```

```
        SELECT mats
        SEEK book->mat_id
        _lastpanel = .F.
        IF RIGHT(mats->tsize_a,5) = '12X12'
            _front = .F.
        ELSE
            _front = .T.
        ENDIF                                && IF RIGHT(tsize_a,5) = '12X12'
        SELECT book
        SKIP 1
    ENDIF                                    && IF RIGHT(tsize_a,5) = '12X12'
ENDDO                                        && DO WHILE .NOT. EOF()
IF EOF()
    SKIP -1
    IF odd(VAL(book->page))
        DO CASE
            CASE _front .AND. _back
                _ins2 = _ins2 + 1
            CASE (_front .AND. .NOT. _back) .OR. (.NOT. _front .AND. _back)
                IF _lastpanel
                    _insp = _insp + 1
                ELSE
                    _ins1 = _ins1 + 1
                ENDIF                        && IF _lastpanel
            CASE .NOT. _front .AND. .NOT. _back
                IF _lastpanel
                    _badpanel = _badpanel + 1
                ENDIF                        && IF _lastpanel
                _ins0 = _ins0 + 1
        ENDCASE                              && DO CASE
    ELSE
        IF _lastpanel
            _insp = _insp + 1
        ENDIF                            && IF _lastpanel
    ENDIF                                    && IF odd(VAL(book->page))
ENDIF                                        && IF EOF()

IF _badpanel > 0
    _msg_24('There ' + IIF(_badpanel = 1,'is ' + ALLTRIM(STR(_badpanel,5)) + ' instance','are ' + ALLTRIM(STR(_badpanel,5)) + ' instances') + ' of full/half panel
=> s back-to-back, press any key',.t.,.t.,.t.)
    msg_24('Order generation cancelled, press any key',.t.,.t.,.f.)
ELSE
    SELECT 0
    USE ..\printers
    DECLARE flds[1], head[1]
    _sscreen = savescreen()
    msg_24('Use the arrows to scroll, ENTER to Select',.f.,.f.,.t.)
    flds[1] = 'NAME'
    head[1] = 'Printer'
    box(4,10,14,44,"┌─┐│┘─└│",color,1,8)
    DBEDIT(5,11,13,43,flds,'','',head)
    RELEASE flds, head
    restscreen(_sscreen)

    _uon = ""
    _code = ALLTRIM(printers->undl_on)
    DO WHILE .NOT. EMPTY(_code)
        _uon = _uon + CHR(VAL(LEFT(_code,3)))
        _code = SUBSTR(_code,4)
    ENDDO                                    && DO WHILE .NOT. EMPTY(_code)

    _uoff = ""
    _code = ALLTRIM(printers->undl_off)
    DO WHILE .NOT. EMPTY(_code)
        _uoff = _uoff + CHR(VAL(LEFT(_code,3)))
        _code = SUBSTR(_code,4)
```

```
ENDDO                                   && DO WHILE .NOT. EMPTY(_code)

_bon = ""
_code = ALLTRIM(printers->bold_on)
DO WHILE .NOT. EMPTY(_code)
    _bon = _bon + CHR(VAL(LEFT(_code,3)))
    _code = SUBSTR(_code,4)
ENDDO                                   && DO WHILE .NOT. EMPTY(_code)

_boff = ""
_code = ALLTRIM(printers->bold_off)
DO WHILE .NOT. EMPTY(_code)
    _boff = _boff + CHR(VAL(LEFT(_code,3)))
    _code = SUBSTR(_code,4)
ENDDO                                   && DO WHILE .NOT. EMPTY(_code)

_hdl = FCREATE('ORDERB.PRN')
_line = 0
_text = ""
_code = ALLTRIM(printers->reset) + ALLTRIM(printers->ort_port) + ALLTRIM(printers->pri_fix) + ALLTRIM(printers->pitch_10)
_code = _code + ALLTRIM(printers->fnt_cour) + ALLTRIM(printers->lpi_6)
DO WHILE .NOT. EMPTY(_code)
    IF LEFT(_code,1) = '"'
        _text = _text + SUBSTR(_code,2)
        _code = ""
    ELSE
        _text = _text + CHR(VAL(LEFT(_code,3)))
        _code = SUBSTR(_code,4)
    ENDIF                               && IF LEFT(_code,1) = '"'
ENDDO                                   && DO WHILE .NOT. EMPTY(_code)
_text = _text + _bon + center('FUTURA ORDER FORM',80) + _boff
fwriteline(_hdl, _text)
_line = _line + 1

FOR _i = 1 TO 2
    DO rpt_blk WITH _hdl, _line
NEXT                                    && FOR _i = 1 TO 2

SELECT 0
USE ..\client INDEX ..\client
SEEK _dclient

_text = ALLTRIM(client->cli_name) + '     Wedding Date: ' + DTOC(client->eventdate)
fwriteline(_hdl, _text)
_line = _line + 1

USE
SELECT order

FOR _i = 1 TO 2
    DO rpt_blk WITH _hdl, _line
NEXT                                    && FOR _i = 1 TO 3

_text = 'COLOR:  ' + _mat_color
fwriteline(_hdl, _text)
_line = _line + 1

DO rpt_blk WITH _hdl, _line

_text = 'STANDARD INSERTS:  ' + STR(_ins2,3,0) + '  Each insert accepts 2 mats'
fwriteline(_hdl, _text)
_line = _line + 1

_text = '                   ' + STR(_ins1,3,0) + '  Blank one side - mat opening on other side'
fwriteline(_hdl, _text)
_line = _line + 1
```

```
_text = '                    ' + STR(_ins0,3,0) + '  Blank both sides - no mat openings'
fwriteline(_hdl, _text)
_line = _line + 1

_text = '                    ' + STR(_insp/2,3,0) + '  Panoramas'
fwriteline(_hdl, _text)
_line = _line + 1

FOR _i = 1 TO 2
    DO rpt_blk WITH _hdl, _line
NEXT                                        && FOR _i = 1 TO 3

_text = SPACE(10) + _uon + 'MAT ID #' + _uoff + SPACE(15) + _uon + 'MAT SIZE' + _uoff + SPACE(15) + _uon + 'QUANTITY' + _uoff
fwriteline(_hdl, _text)
_line = _line + 1

DO rpt_blk WITH _hdl, _line

_mfg_id = SPACE(3)
_size   = SPACE(5)
_quantity = 0

SELECT mfg
INDEX ON mfg_id + size TO TEMP
SET INDEX TO TEMP
SET FILTER TO mfg_id # '001' .OR. ALLTRIMLEN(mat_id) # 5
GOTO TOP
DO WHILE .NOT. EOF()
    SELECT order
    SEEK mfg->mat_id
    IF FOUND()
        IF _mfg_id = mfg->mfg_id .AND. _size = mfg->size
            _quantity = _quantity + order->quantity
        ELSE
            IF .NOT. EMPTY(_mfg_id)
                _text = SPACE(10) + SPACE(3) + _mfg_id + SPACE(19) + _size + SPACE(19) + STR(_quantity,3,0)
                fwriteline(_hdl, _text)
                _line = _line + 1
            ENDIF                           && IF .NOT. EMPTY(_mfg_id)

            _mfg_id = mfg->mfg_id
            _size   = mfg->size
            _quantity = order->quantity
        ENDIF                               && IF _mfg_id = mfg->mfg_id .AND. _size = mfg->size
    ENDIF                                   && IF FOUND()
    SELECT mfg
    SKIP 1
    IF .NOT. EOF() .AND. _line >= 60
        _text = CHR(12)
        fwriteline(_hdl,_text)
        _line = 1

        _text = SPACE(10) + _uon + 'MAT ID #' + _uoff + SPACE(15) + _uon + 'MAT SIZE' + _uoff + SPACE(15) + _uon + 'QUANTITY' + _uoff
        fwriteline(_hdl, _text)
        _line = _line + 1

        DO rpt_blk WITH _hdl, _line
    ENDIF                                   && IF .NOT. EOF() .AND. _line >= 60
ENDDO                                       && DO WHILE .NOT. EOF()

_text = SPACE(10) + SPACE(3) + _mfg_id + SPACE(19) + _size + SPACE(19) + STR(_quantity,3,0)
fwriteline(_hdl, _text)
_line = _line + 1

_text = CHR(12)
```

```
        fwriteline(_hdl,_text)
        FCLOSE(_hdl)

        IF UPPER(ALLTRIM(printers->name)) # 'SCREEN'
            _ok = .F.
            DO WHILE .NOT. _ok .AND. lastkey() # 27
                IF prnstatus() = 0
                    _ok = .T.
                ELSE
                    msg_24('Printer error, fix printer and press enter, esc to abort',.t.,.t.)
                ENDIF                            && IF prnstatus() = 0
            ENDDO                                && DO WHILE .NOT. _ok .AND. lastkey() # 27
            IF _ok .AND. lastkey() # 27
                _hdl = fopen('ORDERB.PRN')
                DO WHILE .NOT. FEOF(_hdl)
                    lprintline(freadline(_hdl))
                ENDDO                            && DO WHILE .NOT. FEOF(_hdl)
                fclose(_hdl)
            ELSE
                msg_24('Order print aborted, press any key',.t.,.t.,.f.)
            ENDIF                                && IF _ok .AND. lastkey() # 27
        ELSE
            msg_24('Use arrow keys to move, ESC to exit',.f.,.f.,.t.)
            box(1,1,22,78,"┌─┐│┘─└│ ",color,1,8)
            csron()
            memoedit(memoread('ORDERB.PRN'),2,2,21,77,.f.,'DUMMY',132)
            msg_24()
            csroff()
        ENDIF                                    && IF printer->name # 'SCREEN'

        SELECT printers
        USE

        ferase('ORDERB.PRN')

    ENDIF                                        && IF _badpanel > 0

    SELECT order
    USE

ENDIF                                            && IF _ok

ferase('TEMP.NTX')

RETURN
```

```
*.........................................................................
*
*   Program Name: PAG_DEL.PRG       Copyright: EPIX Corporation
*   Date Created: 04/26/91           Language: Clipper
*   Time Created: 15:53:44             Author: Glenn Holcomb
*
*.........................................................................

PRIVATE _chgimg, _npage, _rec, _cont, _rec2

_cont   = .T.
_chgimg = .T.

IF .NOT. EMPTY( matched)
    IF queryb('Release matched paired?')
        IF _matched = 'N'
            SKIP 1
            REPLACE matched WITH ' '
            SKIP -1
            _matched = ' '
            REPLACE matched WITH ' '
        ELSE
            SKIP -1
            REPLACE matched WITH ' '
            SKIP 1
            _matched = ' '
            REPLACE matched WITH ' '
        ENDIF                                  && IF _matched = 'N'
    ELSE
        msg_24('Deletion not allowed on matched page, press any key',.t.,.t.,.f.)
        _cont = .F.
    ENDIF                                      && IF queryb('Release matched paired?')
ENDIF                                          && IF .NOT. EMPTY(_matched)

IF _cont
    IF queryb('Delete current page?')

        SELECT photo

        IF .NOT. EMPTY(_id_a)
            SEEK STR(_id_a)
            REPLACE used WITH .F.
        ENDIF                                  && IF .NOT. EMPTY(_id_a)

        IF .NOT. EMPTY(_id_b)
            SEEK STR(_id_b)
            REPLACE used WITH .F.
        ENDIF                                  && IF .NOT. EMPTY(_id_b)

        IF .NOT. EMPTY(_id_c)
            SEEK STR(_id_c)
            REPLACE used WITH .F.
        ENDIF                                  && IF .NOT. EMPTY(_id_c)

        IF .NOT. EMPTY(_id_d)
            SEEK STR(_id_d)
            REPLACE used WITH .F.
        ENDIF                                  && IF .NOT. EMPTY(_id_d)

        SELECT book

        DELETE
        msg_24('Please wait while cleaning up pages...',.F.,.F.)
        PACK
        @ 24, 0 CLEAR
```

```
        DO pag_rnm

        IF val(_cpage) <= 1
            _cpage = SPACE(3)
        ENDIF                                   && IF val(_cpage) <= 1

        IF .NOT. pag_ret(@_cpage)
            msg_24('No pages are available, press any key...',.T.,.T.,.T.)
            KEYBOARD "E"
            DO pag_sca
            SCROLL(3,2,10,62,0)
        ELSE
            DO pag_sca
            SELECT photo
            pht_ret(@_cphoto)
            DO pht_dis WITH .F.
            SELECT book
            DO pag_dis WITH _chgimg, _dis_id, _dis_sz
        ENDIF                                   && IF .NOT. pag_ret(@_cpage)

    ELSE
        _chgimg = .F.
        SELECT photo
        pht_ret(@_cphoto)
        DO pht_dis WITH .F.
        SELECT book
        DO pag_dis WITH _chgimg, _dis_id, _dis_sz
    ENDIF                                       && IF queryb('Delete current page?')
ENDIF                                           && IF _cont

RETURN
```

```
*........................................................................
*
*   Program Name: PAG_DIS.PRG        Copyright: EPIX Corporation
*   Date Created: 04/16/91            Language: Clipper
*   Time Created: 18:17:45              Author: Glenn Holcomb
*
*........................................................................

PARAMETER _shw_pge, _shw_id, _shw_sz
PRIVATE _i, _side

DO pag_sca

do case
    case pcount() = 0
        _shw_pge = .T.
        _shw_id  = .T.
        _shw_sz  = .F.
    case pcount() = 1
        _shw_id  = .T.
        _shw_sz  = .F.
    case pcount() = 2
        _shw_sz  = .F.
endcase

SCROLL(04,04,09,61,0)

@ 04,04 SAY 'Page #    :'
@ 06,04 SAY 'Mat ID #  :'
@ 08,04 SAY 'Photo A ID:'
@ 08,25 SAY 'Photo B ID:'
@ 09,04 SAY 'Photo C ID:'
@ 09,25 SAY 'Photo D ID:'

@ 04,16 SAY _page
DO CASE
    CASE _matched = 'N'
        @ 04,25 SAY 'Matched to Next'
    CASE _matched = 'P'
        @ 04,25 SAY 'Matched to Prev'
    OTHERWISE
        @ 04,25 SAY '               '
ENDCASE                                         && DO CASE
@ 06,16 SAY _mat_id
@ 08,16 SAY _id_a
@ 08,37 SAY _id_b
@ 09,16 SAY _id_c
@ 09,37 SAY _id_d

SELECT matdiag
SEEK _mat_id
_i = 4
DO WHILE _mat_id = mat_id .AND. .NOT. EOF()
    @ _i,48 SAY picture
    _i = _i + 1
    SKIP 1
ENDDO                                           && DO WHILE _mat_id = mat_id

SELECT mats
SET ORDER TO 1
SEEK _mat_id
IF .NOT. FOUND()
    msg_24('Mat ID ' + _mat_id + ' not found, press any key',.t.,.t.,.t.)
ENDIF                                           && IF .NOT. FOUND()

IF _shw_pge
```

```
msg_24('Please wait while displaying images...',.F.,.F.,.F.)

_form = ALLTRIM(ppf_name)

IF _form # _lastform
    pp_call('FORM ..\'+_form)
    _lastform = _form
ELSE
    pp_call('CLRF')
ENDIF                                   && IF _form # _lastform

IF _is_1224
    _side = ' L/R '
ELSE
    IF VAL(_page)/2 = INT(VAL(_page)/2)
        _side = 'Left '
    ELSE
        _side = 'Right'
    ENDIF                               && IF VAL(_page)/2 = INT(VAL(_page)/2)
ENDIF                                   && IF _is_1224

pp_call('PUTF DBP_A ' + _dbp_a)
pp_call('PUTF DBP_B ' + _dbp_b)
pp_call('PUTF DBP_C ' + _dbp_c)
pp_call('PUTF DBP_D ' + _dbp_d)

IF _shw_id
    pp_call('PUTF ID_A ' + STR(_id_a,5,0))
    pp_call('PUTF ID_B ' + STR(_id_b,5,0))
    pp_call('PUTF ID_C ' + STR(_id_c,5,0))
    pp_call('PUTF ID_D ' + STR(_id_d,5,0))
ENDIF                                   && IF _shw_id

IF _shw_sz
    pp_call('PUTF SIZE_A ' + SPACE(5 - LEN(ALLTRIM(RIGHT(MATS->TSIZE_A,5)))) + ALLTRIM(RIGHT(MATS->TSIZE_A,5)))
    pp_call('PUTF SIZE_B ' + SPACE(5 - LEN(ALLTRIM(RIGHT(MATS->TSIZE_B,5)))) + ALLTRIM(RIGHT(MATS->TSIZE_B,5)))
    pp_call('PUTF SIZE_C ' + SPACE(5 - LEN(ALLTRIM(RIGHT(MATS->TSIZE_C,5)))) + ALLTRIM(RIGHT(MATS->TSIZE_C,5)))
    pp_call('PUTF SIZE_D ' + SPACE(5 - LEN(ALLTRIM(RIGHT(MATS->TSIZE_D,5)))) + ALLTRIM(RIGHT(MATS->TSIZE_D,5)))
ENDIF                                   && IF _shw_sz

pp_call('PUTF PAGE ' + _page)
pp_call('PUTF SIDE ' + _side)
@ 24,0 CLEAR
ENDIF                                   && IF _shw_pge

SELECT book

RETURN
```

```
*.........................................................................
*
*   Program Name: PAG_FND.PRG       Copyright: EPIX Corporation
*   Date Created: 08/22/91           Language: Clipper
*   Time Created: 13:29:53             Author: Glenn Holcomb
*
*.........................................................................

PRIVATE _fchoice, _rec, _sscreen, _filt
DECLARE flds[1], head[1]

flds[1] = 'PAGE'
head[1] = '  Page; Number'

_fchoice = 99

DO WHILE _fchoice # 5
    SET MESSAGE TO 24
    print(21,2,'   FIND' + CHR(26)  + SPACE(66),hcolor)
    @ 21,14 PROMPT 'EMPTY'      MESSAGE 'Find Empty Pages in the Album'
    @ 21,21 PROMPT 'FULL PANEL' MESSAGE 'Find Full Panels in the Album'
    @ 21,33 PROMPT 'HALF PANEL' MESSAGE 'Find Half Panels in the Album'
    @ 21,45 PROMPT 'GROUP'      MESSAGE 'Find Pages that are groups in the Album'
    @ 21,73 PROMPT 'EXIT'       MESSAGE 'Return to Page Menu'

    MENU TO _fchoice

    SET MESSAGE TO
    @ 24, 0 CLEAR

    IF LASTKEY() = 27
         _fchoice = 5
    ENDIF                                   && IF LASTKEY() = 27

    _sscreen = savescreen()

    DO CASE
        CASE _fchoice = 1                   && FND - Emtpy
            _rec = RECNO()
            SET FILTER TO book->mat_id = 'EMPTY'
            GOTO TOP
            IF EOF()
                msg_24('No empty pages in album, press any key',.t.,.t.,.f.)
                SET FILTER TO
                GOTO _rec
            ELSE
                @ 24, 0 SAY 'Please select the empty page you wish to goto and press ENTER, ESC to abort'
                box(4,12,17,22,"┌┐│┘└│ ",color,1,8)
                DBEDIT(5,13,16,21,flds,'','',head)
                restscreen(_sscreen)
                SET FILTER TO
                @ 24, 0 CLEAR
                IF lastkey() = 13
                    cpage = _page
                    DO pag_dis WITH .T., _dis_id, _dis_sz
                ELSE
                    GOTO _rec
                ENDIF                       && IF lastkey() = 13
            ENDIF                           && IF EOF()
        CASE _fchoice = 2                   && FND - Full Panel
            _rec = RECNO()
            SET FILTER TO book->is_1224
            GOTO TOP
            IF EOF()
                msg_24('No full panels in album, press any key',.t.,.t.,.f.)
                SET FILTER TO
```

```
            GOTO _rec
        ELSE
            @ 24, 0 SAY 'Please select the full panel you wish to goto and press ENTER, ESC to abort'
            box(4,12,17,22,"┌┐│┘─└│ ",color,1,8)
            DBEDIT(5,13,16,21,flds,'','',head)
            restscreen(_sscreen)
            SET FILTER TO
            @ 24, 0 CLEAR
            IF lastkey() = 13
                _cpage = _page
                DO pag_dis WITH .T., _dis_id, _dis_sz
            ELSE
                GOTO _rec
            ENDIF                              && IF lastkey() = 13
        ENDIF                                  && IF EOF()
    CASE _fchoice = 3                          && FND - Half Panel
        SELECT mats
        SET FILTER TO RIGHT(tsize_a,5) = '12X12'
        GOTO TOP
        IF EOF()
            msg_24('No half panels in album, press any key',.t.,.t.,.f.)
            SET FILTER TO
            GOTO _rec
        ELSE
            _filt = 'book->mat_id = "' + mats->mat_id + '"'
            SKIP 1
            DO WHILE .NOT. EOF()
                _filt = _filt + ' .OR. book->mat_id = "' + mats->mat_id + '"'
                SKIP 1
            ENDDO                              && DO WHILE .NOT. EOF()
            SET FILTER TO
            SELECT book
            _rec = RECNO()
            SET FILTER TO &_filt
            GOTO TOP
            IF EOF()
                msg_24('No half panels in album, press any key',.t.,.t.,.f.)
                SET FILTER TO
                GOTO _rec
            ELSE
                @ 24, 0 SAY 'Please select the half panel you wish to goto and press ENTER, ESC to abort'
                box(4,12,17,22,"┌┐│┘─└│ ",color,1,8)
                DBEDIT(5,13,16,21,flds,'','',head)
                restscreen(_sscreen)
                SET FILTER TO
                @ 24, 0 CLEAR
                IF lastkey() = 13
                    _cpage = _page
                    DO pag_dis WITH .T., _dis_id, _dis_sz
                ELSE
                    GOTO _rec
                ENDIF                          && IF lastkey() = 13
            ENDIF                              && IF EOF()
        ENDIF                                  && IF EOF()
    CASE _fchoice = 4                          && FND - Group
        _rec = RECNO()
        SET FILTER TO book->mat_id = 'GROUP'
        GOTO TOP
        IF EOF()
            msg_24('No groups in album, press any key',.t.,.t.,.f.)
            SET FILTER TO
            GOTO _rec
        ELSE
            @ 24, 0 SAY 'Please select the group you wish to goto and press ENTER, ESC to abort'
            box(4,12,17,22,"┌┐│┘─└│ ",color,1,8)
            DBEDIT(5,13,16,21,flds,'','',head)
```

```
restscreen(_sscreen)
SET FILTER TO
@ 24, 0 CLEAR
IF lastkey() = 13
     cpage = _page
    DO pag_dis WITH .T., _dis_id, _dis_sz
ELSE
    GOTO _rec
ENDIF                                && IF lastkey() = 13
    ENDIF                                && IF EOF()
        CASE _fchoice = 5                        && FND - Exit
            RETURN
    ENDCASE                              && DO CASE
ENDDO                                    && DO WHILE _fchoice # 4
```

```
*.........................................................................
*
*   Program Name: PAG_GOT.PRG       Copyright: EPIX Corporation
*   Date Created: 04/18/91           Language: Clipper
*   Time Created: 11:37:37             Author: Glenn Holcomb
*
*.........................................................................

PRIVATE _rec, _chgimg

_chgimg = .T.

STORE recno() TO _rec
csron()
@ 24, 0 SAY 'Enter Page Number: ' GET _page PICTURE '@K###' VALID pag_chk(@_page)
READ
csroff()
@ 24, 0 CLEAR
SEEK _page
IF .NOT. FOUND()
    msg_24('Requested page not on file...press any key',.T.,.T.,.F.)
    GOTO _rec
    _chgimg = .F.
ELSE
    IF _rec = RECNO()
        _chgimg = .F.
    ENDIF                                       && IF _rec = RECNO()
ENDIF                                           && IF .NOT. FOUND()
IF EMPTY(_lastform)
    _chgimg = .T.
ENDIF                                       && IF EMPTY(_lastform)
DO pag_sca
_cpage = _page
DO pag_dis WITH _chgimg, _dis_id, _dis_sz

RETURN


*
*         Author: Glenn Holcomb
*    Date Created: 04/18/91
*    Time Created: 11:50:04
*
*

FUNCTION pag_chk

    PARAMETER _page

    PRIVATE _sscreen
    DECLARE flds[1], head[1]

    IF EMPTY(_page)
        SET FILTER TO VAL(page) # 0
        GOTO TOP
        _sscreen = savescreen()
        flds[1] = 'PAGE'
        head[1] = 'Page #'
        box(13,19,21,32,"┌─┐│┘─└│ ",color,1,8)
        DBEDIT(14,20,20,31,flds,'','',head)
        _page = page
        SET FILTER TO
        RESTSCREEN(_sscreen)
    ELSE
        _page = STR(VAL(_page),3)
    ENDIF                                       && IF EMPTY(_page)
```

```
RETURN(.T.)
```

```
*.............................................................................
*
*   Program Name: PAG_MOD.PRG       Copyright: EPIX Corporation
*   Date Created: 05/30/91           Language: Clipper
*   Time Created: 17:44:34             Author: Glenn Holcomb
*
*.............................................................................

PRIVATE _mchoice, _schoice, _i, _j, _count, _id, _success, _grab

_mchoice = 99

DO WHILE _mchoice # 6
    SET MESSAGE TO 24
    print(21,2,'  CHANGE' + CHR(26)  + SPACE(66),hcolor)
    @ 21,14 PROMPT 'SHUFFLE'    MESSAGE 'Rearrange photos within a mat'
    @ 21,23 PROMPT 'REMAT'      MESSAGE 'Select a different mat'
    @ 21,30 PROMPT 'JOIN'       MESSAGE 'Join to pages together'
    @ 21,36 PROMPT 'BREAK'      MESSAGE 'Break photographs from one page to many pages'
    @ 21,43 PROMPT 'GRAB'       MESSAGE 'Add photos to current/new page'
    @ 21,73 PROMPT 'EXIT'       MESSAGE 'Return to Page Menu'

    MENU TO _mchoice

    SET MESSAGE TO
    @ 24, 0 CLEAR

    IF LASTKEY() = 27
        _mchoice = 6
    ENDIF                                   && IF LASTKEY() = 27

    _schoice = 99

    DO CASE
        CASE _mchoice = 1                   && MOD - Shuffle
            IF _mat_id # 'EMPTY'
                DO WHILE _schoice # 5
                    print(21,2,' SHUFFLE' + CHR(26)  + SPACE(66),hcolor)
                    @ 21,14 PROMPT ' A '
                    @ 21,19 PROMPT ' B '
                    @ 21,24 PROMPT ' C '
                    @ 21,29 PROMPT ' D '
                    @ 21,73 PROMPT 'EXIT'

                    MENU TO _schoice

                    IF lastkey() = 27
                        _schoice = 5
                    ENDIF                   && IF lastkey() = 27
                    IF _schoice # 5
                        DO shu_pht WITH _schoice
                    ENDIF                   && IF _schoice # 5

                ENDDO                       && DO WHILE _schoice # 5
                msg_24()
            ELSE
                msg_24('Empty pages cannot be shuffled, press any key',.t.,.t.,.f.)
            ENDIF                           && IF _mat_id # 'EMPTY'
        CASE _mchoice = 2                   && MOD - Remat
            IF _mat_id # 'EMPTY'
                DO shu_mat
            ELSE
                msg_24('Cannot change mats on empty pages, press any key',.t.,.t.,.f.)
            ENDIF                           && IF _mat_id # 'EMPTY'
        CASE _mchoice = 3                   && MOD - Join
            DO joi_pag
```

```
        _cpage = _page
    CASE _mchoice = 4                       && MOD - Break
        IF .NOT. EMPTY(_matched)
            msg_24('Matched page cannot be broken, press any key',.t.,.t.,.f.)
        ELSE
            IF .NOT. (_mat_id = 'EMPTY' .OR. (EMPTY(_id_b) .AND. EMPTY(_id_c) .AND. EMPTY(_id_d)))
                DECLARE queued[VAL(mats->positions)]
                AFILL(queued,SPACE(1))

                DO WHILE _schoice # 7
                    print(21,2,'   BREAK' + CHR(26)  + SPACE(66),hcolor)
                    @ 21,14 PROMPT ' A '
                    @ 21,19 PROMPT ' B '
                    @ 21,24 PROMPT ' C '
                    @ 21,29 PROMPT ' D '
                    @ 21,34 PROMPT 'PAGE'
                    @ 21,40 PROMPT 'FREE'
                    @ 21,73 PROMPT 'EXIT'

                    MENU TO _schoice

                    IF lastkey() = 27
                        _schoice = 7
                    ENDIF                   && IF lastkey() = 27

                    DO CASE
                        CASE _schoice >= 1 .AND. _schoice <= 4  && BRK - A, B, C & D
                            DO brk_pht WITH _schoice
                        CASE _schoice >= 5 .AND. _schoice <= 6  && BRK - Page & Free
                            _count = 0
                            FOR _i = 1 TO LEN(queued)
                                IF .NOT. EMPTY(queued[_i])
                                    _count = _count + 1
                                ENDIF       && IF .NOT. EMPTY(queued[_i])
                            NEXT            && FOR _i = 1 TO LEN(queued)
                            IF _count = LEN(queued)
                                msg_24('All photos are selected page/free are not available, press any key',.t.,.t.,.f.)
                                AFILL(queued,SPACE(1))
                            ELSE
                                IF _schoice = 5
                                    DECLARE ids[_count]
                                    FOR _i = 1 TO _count
                                        _id = '_id' + queued[_i]
                                        ids[_i] = &_id
                                        &_id = SPACE(5)
                                    NEXT    && FOR _i = 1 TO _count
                                    _newcount = VAL(mats->positions) - _count
                                    DECLARE old_ids[_newcount]
                                    _j = 1
                                    FOR _i = 1 TO 4
                                        _id = '_id' + CHR(64 + _i)
                                        IF .NOT. EMPTY(&_id)
                                            old_ids[_j] = &_id
                                            _j = _j + 1
                                        ENDIF  && IF .NOT. EMPTY(&_id)
                                    NEXT    && FOR _i = 1 TO 4
                                    _success = .F.
                                    DO brk_pag WITH _count, ids, _success, _newcount, old_ids
                                    IF _success
                                        DO pag_rnm WITH IIF((nextpage() - 1) = (VAL(_page) + 1),.F.,.T.), STR(nextpage() - 1,5,0), STR(VAL(_page) + 1,5,0)
                                        pag_ret(@_cpage)
                                        DO pag_dis WITH .T., _dis_id, _dis_sz
                                    ELSE
                                        DO pag_sca
                                    ENDIF   && IF _success
                                    RELEASE ids, old_ids
```

```
                    ELSE
                        DECLARE ids[_count]
                        FOR _i = 1 TO _count
                            _id = '_id_' + queued[_i]
                            ids[_i] = &_id
                            &_id = SPACE(5)
                        NEXT        && FOR _i = 1 TO _count
                        _newcount = VAL(mats->positions) - _count
                        DECLARE old_ids[_newcount]
                        _j = 1
                        FOR _i = 1 TO 4
                            _id = '_id_' + CHR(64 + _i)
                            IF .NOT. EMPTY(&_id)
                                old_ids[_j] = &_id
                                _j = _j + 1
                            ENDIF  && IF .NOT. EMPTY(&_id)
                        NEXT      && FOR _i = 1 TO 4
                        _success = .F.
                        DO brk_fre WITH _count, ids, _success, _newcount, old_ids
                        IF _success
                            pag_ret(@_cpage)
                            DO pag_dis WITH .T., _dis_id, _dis_sz
                            KEYBOARD 'E'
                        ELSE
                            DO pag_sca
                        ENDIF      && IF _success
                        RELEASE ids, old_ids
                    ENDIF          && IF _schoice = 5
                ENDIF              && IF _count = LEN(queued)
                AFILL(queued,SPACE(1))
            ENDCASE                && DO CASE
            FOR _i = 1 TO LEN(queued)
                IF .NOT. EMPTY(queued[_i])
                    IF _i = 1
                        @ 24, 0 SAY 'Photos selected:  '
                    ENDIF          && IF _i = 1
                    ?? queued[_i] + ' '
                ENDIF              && IF .NOT. EMPTY(queued[_i])
            NEXT                   && FOR _i = 1 TO LEN(queued)
        ENDDO                      && DO WHILE _schoice # 7
        RELEASE queued
    ELSE
        msg_24('Empty pages & single photos cannot be broken, press any key',.t.,.t.,.f.)
    ENDIF                          && IF .NOT. (_mat_id = 'EMPTY' .OR. (EMPTY(_id_b) .AND. EMPTY(_id_c) .AND. EMPTY(_id_d)))
  ENDIF                            && IF .NOT. EMPTY(_matched)
  @ 24,0 CLEAR
CASE _mchoice = 5                  && MOD - Grab
  _grab = .F.
  IF queryb('Add photo to current page?',.t.)
    IF .NOT. EMPTY(_id_a) .AND. .NOT. EMPTY(_id_b) .AND. .NOT. EMPTY(_id_c) .AND. .NOT. EMPTY(_id_d)
        msg_24('Page full no room to add photograph, press any key',.t.,.t.,.f.)
    ELSE
        _grab = .T.
    ENDIF                          && IF .NOT. EMPTY(_id_a) .AND. .NOT. EMPTY(_id_b) .AND. .NOT. EMPTY(_id_c) .AND. .NOT. EMPTY(_id_d)
  ELSEIF queryb('Add photo to new page?',.t.)
    _grab = .T.
    store STR(nextpage(),3,0) to _page
    store space(3)            to _newpage
    store space(5)            to _mat_id
    store .f.                 to _is_T224
    store space(1)            to _matched
    store space(10)           to _dbp_a
    store space(10)           to _dbp_b
    store space(10)           to _dbp_c
    store space(10)           to _dbp_d
    store 0                   to _id_a
```

```
            store 0                 to _id_b
            store 0                 to _id_c
            store 0                 to _id_d
        ENDIF                             && IF queryb('Add photo to current page?')
        IF _grab
            DO grb_pag
        ENDIF                             && IF _grab
      CASE _mchoice = 6                   && MOD - Exit
        print(21,2,SPACE(75))
    ENDCASE                               && DO CASE
ENDDO

RETURN
```

```
*..........................................................................
*
*   Program Name: PAG_MOV.PRG       Copyright: EPIX Corporation
*   Date Created: 06/04/91           Language: Clipper
*   Time Created: 11:32:36             Author: Glenn Holcomb
*
*..........................................................................

PRIVATE _tpage, _rec, _npage

_tpage = _page

csron()
@ 24, 0 SAY 'Please enter page number to be moved? ' GET _tpage PICTURE '@K###'
READ
csroff()
@ 24, 0 CLEAR
_npage = _tpage

_rec = RECNO()
SET ORDER TO 2
SEEK VAL(_tpage)
SET ORDER TO 1

IF LASTKEY() = 27
    msg_24('Move aborted...',.f.,.t.,.f.)
    GOTO _rec
ELSEIF .NOT. FOUND() .OR. VAL(_tpage) <= 0
    msg_24('Page not found...',.f.,.t.,.f.)
    GOTO _rec
ELSEIF book->matched = 'P'
    msg_24('This page is matched to the previous page, unmatch to move, press any key',.t.,.t.,.f.)
ELSE
    csron()
    @ 24, 0 SAY 'Please enter the new page number for page ' + ALLTRIM(_tpage) + ': ' GET _npage PICTURE '@K###'
    READ
    csroff()

    SET ORDER TO 2
    SEEK VAL(_npage)
    SET ORDER TO 1

    IF LASTKEY() = 27
        msg_24('Move aborted, press any key',.t.,.t.,.f.)
        GOTO _rec
    ELSEIF VAL(_npage) = VAL(_tpage)
        msg_24('Invalid move, press any key',.t.,.t.,.f.)
        GOTO _rec
    ELSEIF .NOT. FOUND() .OR. VAL(_npage) <= 0
        msg_24('Invalid destination page, press any key',.t.,.t.,.f.)
        GOTO _rec
    ELSEIF book->matched = 'P'
        msg_24('Destination page is matched to the previous page, move invalid, press any key',.t.,.t.,.f.)
        GOTO _rec
    ELSE
        DO pag_rnm WITH .T., _tpage, _npage
        GOTO _rec
        IF EOF()
            pag_ret(@_npage)
        ENDIF                               && IF EOF()
        DO pag_dis WITH .T., _dis_id, _dis_sz
    ENDIF                                   && IF LASTKEY() = 27
ENDIF                                       && IF LASTKEY() = 27

RETURN
```

```
*.........................................................................
*
*   Program Name: PAG_NTS.PRG       Copyright: EPIX Corporation
*   Date Created: 05/20/91           Language: Clipper
*   Time Created: 15:54:05             Author: Glenn Holcomb
*
*.........................................................................

PRIVATE _i, _j, _temp, _rec, _temp2, _nscreen
DECLARE avail[4]

_i = 22
_j = 1

IF EMPTY(_id_a) .AND. EMPTY(_id_b) .AND. EMPTY(_id_c) .AND. EMPTY(_id_d)
    msg_24('No photographs to annotate, press any key',.T.,.T.)
ELSE
    @ 24, 0 SAY 'Annotate which photo? '
    IF .NOT. EMPTY(_id_a)
        @ 24, _i PROMPT ' A '
        _i = _i + 4
        avail[_j] = 'A'
        _j = _j + 1
    ENDIF                                   && IF .NOT. EMPTY(_id_a)
    IF .NOT. EMPTY(_id_b)
        @ 24, _i PROMPT ' B '
        _i = _i + 4
        avail[_j] = 'B'
        _j = _j + 1
    ENDIF                                   && IF .NOT. EMPTY(_id_b)
    IF .NOT. EMPTY(_id_c)
        @ 24, _i PROMPT ' C '
        _i = _i + 4
        avail[_j] = 'C'
        _j = _j + 1
    ENDIF                                   && IF .NOT. EMPTY(_id_c)
    IF .NOT. EMPTY(_id_d)
        @ 24, _i PROMPT ' D '
        _i = _i + 4
        avail[_j] = 'D'
        _j = _j + 1
    ENDIF                                   && IF .NOT. EMPTY(_id_d)

    MENU TO _j

    IF lastkey() # 27
        _temp = '_id_' + avail[_j]
        SELECT photo
        _rec = RECNO()
        SEEK STR(&_temp,5,0)
        IF FOUND()
            _temp2 = notes
            _nscreen = savescreen()
            msg_24('Press CTRL-W to save changes, ESC to abort',.f.,.f.,.t.)
            box(8,09,12,70,"┌─┐│┘─└│ ",color,1,8)
            csron()
            _temp2 = MEMOEDIT(_temp2,9,11,11,68,.T.)
            csroff()
            @ 24, 0 CLEAR
            IF lastkey() = 27
                msg_24('Annotation aborted...press any key',.t.,.t.,.f.)
            ELSE
                IF queryb('Save annotation?')
                    REPLACE notes WITH _temp2
                ENDIF                       && IF queryb('Save changes to notes?')
            ENDIF                           && IF lastkey() = 27
```

```
        restscreen(_nscreen)
      ELSE
        msg_24('System error, PAG_NTS, photo not found, press any key',.T.,.T.,.T.)
      ENDIF                               && IF FOUND()
      GOTO _rec
    ELSE
      msg_24('Annotation aborted, press any key',.T.,.T.)
    ENDIF                                 && IF lastkey() # 27
    @ 24, 0 CLEAR

  ENDIF                                   && IF EMPTY(_id_a) .AND. EMPTY(_id_b) .AND. EMPTY(_id_c) .AND. EMPTY(_id_d)

  RETURN
```

```
*.........................................................................
*
*   Program Name: PAG_NXT.PRG       Copyright: EPIX Corporation
*   Date Created: 04/17/91           Language: Clipper
*   Time Created: 19:32:40             Author: Glenn Holcomb
*
*.........................................................................

PRIVATE _rec, _chgimg

_chgimg = .T.

STORE recno() TO _rec
SET ORDER TO 2
SKIP 1
SET ORDER TO 1
DO pag_sca
IF EOF() .OR. VAL(_page) = 0
    GOTO _rec
    msg_24('Last page encountered...press any key',.T.,.T.,.F.)
    DO pag_sca
    _chgimg = .F.
    IF EMPTY(_lastform)
        _chgimg = .T.
    ENDIF                                   && IF EMPTY(_lastform)
ENDIF
_cpage = _page
DO pag_dis WITH _chgimg, _dis_id, _dis_sz

RETURN
```

```
*.........................................................................
*
*   Program Name: PAG_OTH.PRG       Copyright: EPIX Corporation
*   Date Created: 05/22/91           Language: Clipper
*   Time Created: 11:48:25             Author: Glenn Holcomb
*
*.........................................................................

PRIVATE _mchoice

_mchoice = 99

DO WHILE _mchoice # 4
    print(21,2,'   OTHER' + CHR(26)  + SPACE(66),hcolor)
    @ 21,14 PROMPT 'MATCH'
    @ 21,21 PROMPT 'DISP ID'
    @ 21,30 PROMPT 'DISP SIZE'
    @ 21,73 PROMPT 'EXIT'

    MENU TO _mchoice

    IF LASTKEY() = 27
        _mchoice = 4
    ENDIF                                   && IF LASTKEY() = 27

    DO CASE
        CASE _mchoice = 1                   && MSC - Match
            DO pag_mch
        CASE _mchoice = 2                   && MSC - Disp ID
            IF queryb('Display photo id when display pages?',_dis_id)
                IF .NOT. _dis_id
                    _dis_id = .T.
                    DO pag_dis WITH .t.,_dis_id,_dis_sz
                ENDIF                       && IF .NOT. _dis_id
            ELSE
                IF _dis_id
                    _dis_id = .F.
                    DO pag_dis WITH .t.,_dis_id,_dis_sz
                ENDIF                       && IF _dis_id
            ENDIF                           && IF queryb('Display photo id when display pages?',_dis_id)
        CASE _mchoice = 3                   && MSC - Disp Size
            IF queryb('Display photo size when display pages?',_dis_sz)
                IF .NOT. _dis_sz
                    _dis_sz = .T.
                    DO pag_dis WITH .t.,_dis_id,_dis_sz
                ENDIF                       && IF .NOT. _dis_sz
            ELSE
                IF _dis_sz
                    _dis_sz = .F.
                    DO pag_dis WITH .t.,_dis_id,_dis_sz
                ENDIF                       && IF _dis_sz
            ENDIF                           && IF queryb('Display photo size when display pages?',_dis_sz)
        CASE _mchoice = 4                   && MSC - Exit
            print(21,2,SPACE(75))
    ENDCASE                                 && DO CASE
ENDDO

RETURN

*
*         Author: Glenn Holcomb
*   Date Created: 05/22/91
*   Time Created: 12:35:54
*

PROCEDURE pag_mch
```

```
* Check that the current page is an even page *
IF .NOT. odd(VAL(ALLTRIM(page)))
    * Check that current page is not a 12 x 24 *
    IF .NOT. is_1224
        SKIP 1
        * Check that the next page is not a 12 x 24 *
        IF .NOT. is_1224 .AND. VAL(ALLTRIM(page)) # 0
            IF  queryb('Match pages ' + ALLTRIM(STR(VAL(ALLTRIM(page)) - 1,5,0)) +  ' & ' + ALLTRIM(page) + '?')
                SKIP -1
                _matched = 'N'
                REPLACE matched WITH _matched
                SKIP 1
                REPLACE matched WITH 'P'
            ELSE
                IF _matched = 'N'
                    SKIP -1
                    _matched = ' '
                    REPLACE matched WITH _matched
                    SKIP 1
                    REPLACE matched WITH ' '
                ENDIF                   && IF _matched = 'N'
            ENDIF                       && IF  queryb('Match pages ' + ALLTRIM(page) + ' & ' + ALLTRIM(STR(VAL(ALLTRIM(page)) + 1,5,0)) + '?')
        ELSE
            DO CASE
                CASE is_1224
                    msg_24('Following Page is a 12x24 and cannot be matched, press any key',.t.,.t.)
                CASE VAL(ALLTRIM(page)) = 0
                    msg_24('Last page of album reached.  Nothing to match, press any key',.t.,.t.)
            ENDCASE                     && DO CASE
        ENDIF                           && IF .NOT. is_1224
    ELSE
        msg_24('Current Page is a 12x24 and cannot be matched, press any key',.t.,.t.)
    ENDIF                               && IF .NOT. is_1224
    SKIP -1
ELSE
    msg_24('Current Page is odd, must be even to be matched, press any key',.t.,.t.)
ENDIF                                   && IF .NOT. odd(VAL(ALLTRIM(page)))

DO pag_dis WITH .F., _dis_id, _dis_sz

RETURN                                  && PROCEDURE pag_mch
```

```
*.........................................................................
*
*   Program Name: PAG_PRV.PRG       Copyright: EPIX Corporation
*   Date Created: 04/17/91           Language: Clipper
*   Time Created: 19:44:55             Author: Glenn Holcomb
*
*.........................................................................

PRIVATE _rec, _chgimg

_chgimg = .T.

STORE recno() TO _rec
SET ORDER TO 2
SKIP -1
SET ORDER TO 1
DO pag_sca
IF BOF()
    GOTO _rec
    msg_24('First page encountered...press any key',.T.,.T.,.F.)
    DO pag_sca
     _chgimg = .F.
ENDIF
IF EMPTY(_lastform)
     _chgimg = .T.
ENDIF                                        && IF EMPTY(_lastform)
_cpage = _page
DO pag_dis WITH _chgimg, _dis_id, _dis_sz

RETURN
```

```
*.........................................................................
*
*   Program Name: PAG_RNM.PRG       Copyright: EPIX Corporation
*   Date Created: 06/04/91           Language: Clipper
*   Time Created: 12:35:13             Author: Glenn Holcomb
*
*.........................................................................

*************************************************************************
*
*   _ins is a flag if a page is to be moved within the album.  If false the
*   album is renumbered in order, if true then the page at _spage is moved to
*   after _dpage
*
*************************************************************************

PARAMETERS _ins, _spage, _dpage

*************************************************************************
*
*   _drec     = the record number for the destination page if a move is to take
*               place
*   _epage    = is used to hold the page number of a deleted blank page to
*               be used by a moved paged
*   _prvrec   = the record number of the page before the current page
*   _currec   = the record number of the current page
*   _nxtrec   = the record number of the page after the current page
*   _newpage  = contains the new page numbers as the album is renumbered
*   _del      = flag if a blank page is deleted, true means a pack will be run
*
*************************************************************************

PRIVATE _drec, _epage
PRIVATE _prvrec, _currec, _nxtrec, _newpage, _del

msg_24('Please wait while renumbering album pages...',.f.,.f.,.f.)

_del = .F.
SET DELETED ON

*************************************************************************
*
*   If no parameters are passed, program assumes a simple renumber.
*
*************************************************************************

IF pcount() = 0
   _ins = .F.
   _drec = 0
ENDIF                                                     && IF pcount = 0

*************************************************************************
*
*   For all the pages in album the current page value is placed in the oldpage
*   field.  This is for error checking.  The values in new page are cleared.
*
*************************************************************************

GOTO TOP
DO WHILE .NOT. EOF()
   REPLACE book->newpage WITH SPACE(3)
   SKIP 1
ENDDO                                                     && DO WHILE .NOT. EOF()
GOTO TOP

*************************************************************************
```

```
*
*   If there is a page to be moved, (_ins = true), then the record number for
*   the page to be moved is place in movpage.  If it is a matched page the
*   complementary page record number is also placed in movpag.  Then the moved
*   pages page number is replaced with *** so that it will be placed at the
*   end of the album out of the way until needed.  Then the destination pages
*   record number is placed in _drec.
*
******************************************************************************

IF _ins
    SET ORDER TO 2
    SEEK VAL(_spage)
    SET ORDER TO 1
    DECLARE movpag[IIF(book->matched='N',2,1)]
    movpag[1] = RECNO()
    IF book->matched = 'N'
        SKIP 1
        movpag[2] = RECNO()
        REPLACE page WITH CHR(254)+CHR(254)+CHR(254)
        GOTO movpag[1]
    ENDIF                                                       && IF book->matched
    REPLACE page WITH CHR(254)+CHR(254)+CHR(254)
    SET ORDER TO 2
    SEEK VAL(_dpage)
    SET ORDER TO 1
    _drec = RECNO()
ENDIF                                                           && IF _ins

_prvrec  = 0

******************************************************************************
*
*   The record pointer is positioned at the top of the file.  If there is no
*   page then _currec is set to 999999 (exit condition) else _currec is set
*   to the record number of the first page in the album.
*
******************************************************************************

GOTO TOP
IF VAL(ALLTRIM(page)) = 0
    _currec = 999999
ELSE
    _currec  = RECNO()
ENDIF                                                           && IF VAL(ALLTRIM(page)) = 0

_newpage = 1

******************************************************************************
*
*   The record pointer is moved to the next valid page in the album.  If there
*   isn't a next page _nxtrec is set to 999999 (exit condition) else _nxtrec
*   is set to the record number of the next page in the album.
*
******************************************************************************

SKIP 1

IF EOF() .OR. VAL(ALLTRIM(page)) = 0
    _nxtrec = 99999
ELSE
    _nxtrec = RECNO()
ENDIF                                                           && IF EOF() .OR. VAL(page) = 0

******************************************************************************
*
```

```
*   Position the record pointer at the first page in the album and enter the
*   renumbering loop which is terminated by _currec = 999999
*
******************************************************************************

GOTO _currec

DO WHILE _currec # 999999

    ******************************************************************************
    *
    *   If there is a page to be moved and the _currec is equal to _drec then
    *   the pages to be moved are inserted here.
    *
    ******************************************************************************

    IF _ins .AND. _currec = _drec

        GOTO movpag[1]                                      && Goto the page to be moved

        IF .NOT. (book->is_1224 .OR. book->matched = 'N')   && If the page is not 12x24 or matched
            IF book->mat_id = 'EMPTY'                       && If the page is empty delete it
                DELETE
                _del = .t.                                  && Set the _del flag to true
                _currec = _prvrec                           && Set the currec to prvrec so this record goes away
            ELSE                                            && ELSE If the page is not empty
                REPLACE newpage WITH STR(_newpage,3,0)      && Replace the page number with _newpage
                _newpage = _newpage + 1                     && Increment _newpage by 1
            ENDIF                                           && IF book->mat_id = 'EMPTY'

            _prvrec  = RECNO()                              && Set the previous record to the inserted page
            GOTO _currec                                    && Go back to the _currec (_drec)

        ELSE                                                && ELSE If the page is 12x24 or matched
            IF odd(_newpage)                                && If the page to be used is odd
                IF _prvrec # 0                              && If there is a page before this one
                    GOTO _prvrec                            && Goto the previous page
                    IF book->mat_id = 'EMPTY'               && If the previouse page is a blank delete it
                        _epage = book->newpage              && Store the newpage of this page to _epage
                        DELETE                              && Delete the blank page
                        _del = .t.                          && Set the _del flag to true
                        GOTO movpag[1]                      && Goto the page to be moved
                        REPLACE newpage WITH _epage         && Set the paged to be moved newpage to epage
                        IF book->is_1224                    && If the page is 12x24
                            _newpage = VAL(ALLTRIM(_epage)) + 2   && Set _newpage to _epage + 2

                        ELSE                                && ELSE If the page is not 12x24
                            _newpage = VAL(ALLTRIM(_epage)) + 1   && Set _newpage to _epage + 1
                        ENDIF                               && IF book->is_1224

                        IF LEN(movpag) > 1                  && IF there is a secondary matched page
                            GOTO movpag[2]                  && Goto the matched page
                            REPLACE newpage WITH STR(_newpage,3,0)   && Set the paged to be moved newpage to epage
                            _newpage = _newpage + 1         && Increment _newpage + 1
                        ENDIF                               && IF LEN(movpag) > 1
                        _prvrec  = RECNO()                  && Set the previous record to the inserted page

                    ELSE                                    && ELSE if the preiouse page is not blank
                        APPEND BLANK                        && Add a new blank page for numbering integrity
                        REPLACE newpage   WITH STR(_newpage,3,0)   && Replace book->newpage WITH _newpage
                        REPLACE mat_id WITH 'EMPTY'         && Set the mat to EMPTY
                        _newpage = _newpage + 1             && Increment _newpage + 1

                        GOTO movpag[1]                      && Goto to the page to be moved
                        REPLACE newpage WITH STR(_newpage,3,0)   && Replace book->newpage with _newpage
                        IF book->is_1224                    && If the page is 12x24
```

```
                    _newpage = _newpage + 2                      && Set _newpage to _newpage + 2

                ELSE                                             && ELSE If the page is not 12x24
                    _newpage = _newpage + 1                      && Set _newpage to _newpage + 1
                ENDIF                                            && IF book->is_1224

                IF LEN(movpag) > 1                               && IF there is a secondary matched page
                    GOTO movpag[2]                               && Goto the matched page
                    REPLACE newpage WITH STR(_newpage,3,0)       && Set the paged to be moved newpage to epage
                    _newpage = _newpage + 1                      && Increment _newpage + 1
                ENDIF                                            && IF LEN(movpag) > 1
                _prvrec  = RECNO()                               && Set the previous record to the inserted page
            ENDIF                                                && IF book->mat_id = 'EMPTY'

        ELSE                                                     && ELSE if there was no previous page
            APPEND BLANK                                         && Add a new blank page for numbering integrity
            REPLACE newpage   WITH STR(_newpage,3,0)             && Replace book->newpage WITH _newpage
            REPLACE mat_id WITH 'EMPTY'                          && Set the mat to EMPTY
            _newpage = _newpage + 1                              && Increment _newpage + 1

            GOTO movpag[1]                                       && Goto to the page to be moved
            REPLACE newpage WITH STR(_newpage,3,0)               && Replace book->newpage with _newpage
            IF book->is_1224                                     && If the page is 12x24
                _newpage = _newpage + 2                          && Increment _newpage + 2

            ELSE                                                 && ELSE If the page is not 12x24
                _newpage = _newpage + 1                          && Increment _newpage + 1
            ENDIF                                                && IF book->is_1224

            IF LEN(movpag) > 1                                   && IF there is a secondary matched page
                GOTO movpag[2]                                   && Goto the matched page
                REPLACE newpage WITH STR(_newpage,3,0)           && Set the paged to be moved newpage to _newpage
                _newpage = _newpage + 1                          && Increment _newpage + 1
            ENDIF                                                && IF LEN(movpag) > 1
            _prvrec  = RECNO()                                   && Set the previous record to the inserted page
        ENDIF                                                    && IF _prvrec # 0

    ELSE                                                         && ELSE if the page is not odd
        GOTO movpag[1]                                           && Goto to the page to be moved
        REPLACE newpage WITH STR(_newpage,3,0)                   && Replace book->newpage with _newpage
        IF book->is_1224                                         && If the page is 12x24
            _newpage = _newpage + 2                              && Set _newpage to _epage + 2

        ELSE                                                     && ELSE If the page is not 12x24
            _newpage = _newpage + 1                              && Increment _newpage + 1
        ENDIF                                                    && IF book->is_1224

        IF LEN(movpag) > 1                                       && IF there is a secondary matched page
            GOTO movpag[2]                                       && Goto the matched page
            REPLACE newpage WITH STR(_newpage,3,0)               && Set the paged to be moved newpage to _newpage
            _newpage = _newpage + 1                              && Increment _newpage + 1
        ENDIF                                                    && IF LEN(movpag) > 1
        _prvrec  = RECNO()                                       && Set the previous record to the inserted page
    ENDIF                                                        && IF odd(_newpage)
    GOTO _currec
  ENDIF                                                          && IF .NOT. (book->is_1224 .AND. book->matched = ' ')
ENDIF                                                            && IF _ins .AND. _currec = _drec

IF .NOT. (book->is_1224 .OR. book->matched = 'N')                && IF the page is not 12x24 or matched
    IF book->mat_id = 'EMPTY'                                    && If its an empty page delete it
        DELETE
        _del = .t.                                               && Set the _del flag to true
            _currec = _prvrec                                    && Set the currec to prvrec so this record goes away

    ELSE
        REPLACE newpage WITH STR(_newpage,3,0)                   && Set the book->newpage to _newpage
```

```
            _newpage = _newpage + 1                              && Increment _newpage + 1
        ENDIF                                                    && IF book->mat_id = 'EMPTY'

    ELSE                                                         && ELSE If the page is 12x24 or matched
        IF odd(_newpage)                                         && If the page to be used is odd
            IF _prvrec # 0                                       && If there is a page before this one
                GOTO _prvrec                                     && Goto the previous page
                IF book->mat_id = 'EMPTY'                        && If the previouse page is a blank delete it
                    _epage = newpage                             && Store the newpage of this page to _epage
                    DELETE                                       && Delete the blank page
                    _del = .T.                                   && Set the _del flag to true
                    GOTO _currec                                 && Go back to the current record
                    REPLACE newpage WITH _epage                  && Set the paged to be moved newpage to epage
                    IF book->is_1224                             && If the page is 12x24
                        _newpage = VAL(ALLTRIM(_epage)) + 2      && Set _newpage to _epage + 2

                    ELSE                                         && ELSE If the page is not 12x24
                        _newpage = VAL(ALLTRIM(_epage)) + 1      && Set _newpage to _epage + 1
                    ENDIF                                        && IF book->is_1224

                ELSE                                             && ELSE if there was no previous page
                    APPEND BLANK                                 && Add a new blank page for numbering integrity
                    REPLACE newpage   WITH STR(_newpage,3,0)     && Replace book->newpage WITH _newpage
                    REPLACE mat_id WITH 'EMPTY'                  && Set the mat to EMPTY
                    _newpage = _newpage + 1                      && Increment _newpage + 1

                    GOTO _currec                                 && Go back to the current record
                    REPLACE newpage WITH STR(_newpage,3,0)       && Replace book->newpage with _newpage
                    IF book->is_1224                             && If the page is 12x24
                        _newpage = _newpage + 2                  && Set _newpage to _epage + 2

                    ELSE                                         && ELSE If the page is not 12x24
                        _newpage = _newpage + 1                  && Increment _newpage + 1
                    ENDIF                                        && IF book->is_1224
                ENDIF                                            && IF book->mat_id = 'EMPTY'

            ELSE                                                 && ELSE if no previous pages
                APPEND BLANK                                     && Add a new blank page for numbering integrity
                REPLACE newpage   WITH STR(_newpage,3,0)         && Replace book->newpage WITH _newpage
                REPLACE mat_id WITH 'EMPTY'                      && Set the mat to EMPTY
                _newpage = _newpage + 1                          && Increment _newpage + 1

                GOTO _currec                                     && Go back to the current record
                REPLACE newpage WITH STR(_newpage,3,0)           && Replace book->newpage with _newpage
                IF book->is_1224                                 && If the page is 12x24
                    _newpage = _newpage + 2                      && Set _newpage to _epage + 2

                ELSE                                             && ELSE If the page is not 12x24
                    _newpage = _newpage + 1                      && Increment _newpage + 1
                ENDIF                                            && IF book->is_1224
            ENDIF                                                && IF _prvrec # 0

        ELSE                                                     && ELSE if page not odd
            GOTO _currec                                         && Go back to the current record
            REPLACE newpage WITH STR(_newpage,3,0)               && Replace book->newpage with _newpage
            IF book->is_1224                                     && If the page is 12x24
                _newpage = _newpage + 2                          && Set _newpage to _epage + 2

            ELSE                                                 && ELSE If the page is not 12x24
                _newpage = _newpage + 1                          && Increment _newpage + 1
            ENDIF                                                && IF book->is_1224
        ENDIF                                                    && IF odd(_newpage)
        GOTO _currec
    ENDIF                                                        && IF .NOT. (book->is_1224 .AND. book->matched = ' ')

    GOTO _currec
```

```
    _prvrec  = _currec                                                  && The previous page recno is set to the current page recno
    _currec  = _nxtrec                                                  && The current page recno is set to the next page recno
    GOTO _nxtrec                                                        && Goto the new currect page record

    SKIP 1                                                              && SKIP 1 to the next page

    IF EOF() .OR. VAL(page) = 0                                         && If no more pages
        _nxtrec  = 999999                                               && set _nxtrec to 999999

    ELSE                                                                && ELSE if more pages
        _nxtrec = RECNO()                                               && _nxtrec = recno of page
    ENDIF                                                               && IF EOF() .OR. VAL(page) = 0
    GOTO _currec                                                        && GOTO to the _currec

ENDDO                                                                   && DO WHILE _currec # 999999

*******************************************************************************
*
*   If the _del flag is true pack the album database
*
*******************************************************************************

SET DELETED OFF
IF _del
    PACK
ENDIF                                                                   && IF _del

*******************************************************************************
*
*   go through the entire album replace page with newpage
*
*******************************************************************************

SET ORDER TO 0
GOTO TOP

DO WHILE .NOT. EOF()
    IF VAL(ALLTRIM(newpage)) # 0
        REPLACE page WITH newpage
    ENDIF                                                               && IF VAL(ALLTRIM(newpage)) # 0
    SKIP 1
ENDDO                                                                   && DO WHILE .NOT. EOF() .AND. VAL(page) # 0
SET ORDER TO 1

@ 24, 0 CLEAR

RETURN
```

```
*......................................................................
*
*   Program Name: PAG_SCA.PRG       Copyright: EPIX Corporation
*   Date Created: 04/17/91           Language: Clipper
*   Time Created: 12:00:45             Author: Glenn Holcomb
*
*......................................................................

_page       = book->page
_mat_id     = book->mat_id
_is_T224    = book->is_T224
_matched    = book->matched
_dbp_a      = book->dbp_a
_dbp_b      = book->dbp_b
_dbp_c      = book->dbp_c
_dbp_d      = book->dbp_d
_id_a       = book->id_a
_id_b       = book->id_b
_id_c       = book->id_c
_id_d       = book->id_d

RETURN
```

```
*.........................................................................
*
*   Program Name: PHR_DIS.PRG       Copyright: EPIX Corporation
*   Date Created: 05/31/91           Language: Clipper
*   Time Created: 16:30:06             Author: Glenn Holcomb
*
*.........................................................................

    msg_24('Please wait while displaying images...',.F.,.F.,.F.)
     _form = 'REVIEW'
    IF _form # _lastform
        pp_call('FORM ..\'+_form)
         _lastform = _form
    ELSE
        pp_call('CLRF')
    ENDIF                                    && IF _form # _lastform

    pp_call('PUTF YES_A  ')
    pp_call('PUTF YES_B  ')
    pp_call('PUTF YES_C  ')
    pp_call('PUTF YES_D  ')

    IF .NOT. EMPTY(photo[1])
        pp_call('PUTF DBP_A ' + photo[1])
        pp_call('PUTF ID_A ' + STR(choice[1],5,0))
    ELSE
        pp_call('CLRF DBP_A')
        pp_call('PUTF ID_A ' + SPACE(5))
    ENDIF                                    && IF .NOT. EMPTY(photo[1])

    IF .NOT. EMPTY(photo[2])
        pp_call('PUTF DBP_B ' + photo[2])
        pp_call('PUTF ID_B ' + STR(choice[2],5,0))
    ELSE
        pp_call('CLRF DBP_B')
        pp_call('PUTF ID_B ' + SPACE(5))
    ENDIF                                    && IF .NOT. EMPTY(photo[2])

    IF .NOT. EMPTY(photo[3])
        pp_call('PUTF DBP_C ' + photo[3])
        pp_call('PUTF ID_C ' + STR(choice[3],5,0))
    ELSE
        pp_call('CLRF DBP_C')
        pp_call('PUTF ID_C ' + SPACE(5))
    ENDIF                                    && IF .NOT. EMPTY(photo[3])

    IF .NOT. EMPTY(photo[4])
        pp_call('PUTF DBP_D ' + photo[4])
        pp_call('PUTF ID_D ' + STR(choice[4],5,0))
    ELSE
        pp_call('CLRF DBP_D')
        pp_call('PUTF ID_D ' + SPACE(5))
    ENDIF                                    && IF .NOT. EMPTY(photo[4])

    @ 24, 0 CLEAR

RETURN
```

```
*......................................................................
*
*   Program Name: PHR_FGT.PRG        Copyright: EPIX Corporation
*   Date Created: 05/31/91            Language: Clipper
*   Time Created: 16:29:38              Author: Glenn Holcomb
*
*......................................................................

FUNCTION phr_get

    PARAMETERS _s_id, _direct

    PRIVATE _ret, _count

    _ret = .T.
    _count = 1

    DO CASE
        CASE pcount() = 0
            _s_id = 1
            _direct = 'L'
        CASE pcount() = 1
            _direct = 'L'
    ENDCASE                                 && DO CASE

    DO CASE
        CASE _direct = 'L'
            SET SOFTSEEK ON
            SEEK STR(_s_id,5,0)
            SET SOFTSEEK OFF

            DO WHILE used .AND. .NOT. EOF()
                SKIP 1
            ENDDO                           && DO WHILE used .AND. .NOT. EOF()

            IF EOF()
                _s_id = 1
                SET SOFTSEEK ON
                SEEK STR(_s_id,5,0)
                SET SOFTSEEK OFF

                DO WHILE used .AND. .NOT. EOF()
                    SKIP 1
                ENDDO                           && DO WHILE used .AND. .NOT. EOF()
            ENDIF                           && IF EOF()

            IF EOF()
                _ret = .F.
            ELSE
                choice[_count] = photo_id
                photo[_count]  = dbp_small
                letter[_count] = CHR(_count + 64)
                _count = 2
                _last = photo_id
                DO WHILE _count <= 4
                    SKIP 1
                    DO WHILE used .AND. .NOT. EOF()
                        SKIP 1
                    ENDDO                   && DO WHILE used .AND. .NOT. EOF()
                    IF .NOT. EOF()
                        choice[_count] = photo_id
                        photo[_count]  = dbp_small
                        letter[_count] = CHR(_count + 64)
                        _count = _count + 1
                        _last = photo_id
                    ELSE
```

```
                _count = 5
            ENDIF                       && IF .NOT. EOF()
        ENDDO                           && DO WHILE _count <= 4
    ENDIF                               && IF EOF()
CASE _direct = 'N'
    AFILL(choice,0)
    AFILL(photo,'')
    AFILL(letter,'')

    SEEK STR(_s_id,5,0)
    SKIP 1

    DO WHILE used .AND. .NOT. EOF()
        SKIP 1
    ENDDO                               && DO WHILE used .AND. .NOT. EOF()

    IF EOF()
        _ret = .F.
    ELSE
        choice[_count] = photo_id
        photo[_count]  = dbp_small
        letter[_count] = CHR(_count + 64)
        _count = 2
        _last = photo_id
        DO WHILE _count <= 4
            SKIP 1
            DO WHILE used .AND. .NOT. EOF()
                SKIP 1
            ENDDO                       && DO WHILE used .AND. .NOT. EOF()
            IF .NOT. EOF()
                choice[_count] = photo_id
                photo[_count]  = dbp_small
                letter[_count] = CHR(_count + 64)
                _count = _count + 1
                _last = photo_id
            ELSE
                _ret = .F.
                _count = 5
            ENDIF                       && IF .NOT. EOF()
        ENDDO                           && DO WHILE _count <= 4
    ENDIF                               && IF EOF()
CASE _direct = 'B'
    AFILL(choice,0)
    AFILL(photo,'')
    AFILL(letter,'')
    _count = 4

    SEEK STR(_s_id,5,0)
    SKIP -1

    DO WHILE used .AND. .NOT. BOF()
        SKIP -1
    ENDDO                               && DO WHILE used .AND. .NOT. BOF()

    IF BOF()
        _ret = .F.
    ELSE
        choice[_count] = photo_id
        photo[_count]  = dbp_small
        letter[_count] = CHR(_count + 64)
        _count = 3
        _last = photo_id
        DO WHILE _count >= 1
            SKIP -1
            DO WHILE used .AND. .NOT. BOF()
                SKIP -1
```

```
            ENDDO                           && DO WHILE used .AND. .NOT. BOF()
            IF .NOT. BOF()
                choice[_count] = photo_id
                photo[_count]  = dbp_small
                letter[_count] = CHR(_count + 64)
                _count = _count - 1
                _s_id = photo_id
                _last = photo_id
            ELSE
                _ret = .F.
                _count = 0
            ENDIF                           && IF .NOT. BOF()
        ENDDO                               && DO WHILE _count >= 1
    ENDIF                                   && IF BOF()
    IF .NOT. _ret
        AFILL(choice,0)
        AFILL(photo,'')
        AFILL(letter,'')
        _count = 1
        GOTO TOP

        DO WHILE used .AND. .NOT. EOF()
            SKIP 1
        ENDDO                               && DO WHILE used .AND. .NOT. EOF()

        IF EOF()
            _ret = .F.
        ELSE
            choice[_count] = photo_id
            photo[_count]  = dbp_small
            letter[_count] = CHR(_count + 64)
            _count = 2
            _last = photo_id
            DO WHILE _count <= 4
                SKIP 1
                DO WHILE used .AND. .NOT. EOF()
                    SKIP 1
                ENDDO                       && DO WHILE used .AND. .NOT. EOF()
                IF .NOT. EOF()
                    choice[_count] = photo_id
                    photo[_count]  = dbp_small
                    letter[_count] = CHR(_count + 64)
                    _count = _count + 1
                    _last = photo_id
                ELSE
                    _count = 5
                ENDIF                       && IF .NOT. EOF()
            ENDDO                           && DO WHILE _count <= 4
        ENDIF                               && IF EOF()
    ENDIF
ENDCASE                                     && DO CASE

RETURN(_ret)                                && FUNCTION phr_get
```

```
*...........................................................................
*
*   Program Name: PHR_MAT.PRG        Copyright: EPIX Corporation
*   Date Created: 07/15/91            Language: Clipper
*   Time Created: 16:45:26              Author: Glenn Holcomb
*
*...........................................................................

PARAMETER _noqueue, hold, _added
PRIVATE _newpage, _no_pics, _i, _j, _temp, _tval, _prec, _matkey, _rec
PRIVATE _temp2, _temp3, _mchoice

DECLARE photo_id_[4]

FOR _i = 1 TO 4
    photo_id_[_i] = hold[_i]
NEXT                                        && FOR _i = 1 TO 4

store space(3)          to _page
store space(5)          to _mat_id
store .f.               to _is_1224
store space(1)          to _matched
store space(10)         to _dbp_a
store space(10)         to _dbp_b
store space(10)         to _dbp_c
store space(10)         to _dbp_d
store 0                 to _id_a
store 0                 to _id_b
store 0                 to _id_c
store 0                 to _id_d

SELECT book
_newpage = nextpage()
SELECT photo

* Construct matkey for current group *

_matkey = STR(_noqueue,1,0)
DECLARE _type[_noqueue]
SELECT photo
_prec = RECNO()
_j = 1
FOR _i = 1 TO _noqueue
    SEEK STR(photo_id_[_i],5,0)
    IF FOUND()
        _type[_j] = photo->orient + photo->shape
        _j = _j + 1
    ELSE
        msg_24('System error in PHR_MAT...unable to find photo ' + ALLTRIM(STR(_tval,5,0)) + ', press any key',.t.,.t.,.t.)
    ENDIF                                   && IF FOUND()
NEXT                                        && FOR _i = 65 to 68
GOTO _prec
SELECT book
ASORT(_type)
FOR _i = 1 TO _noqueue
    _matkey = _matkey + _type[_i]
NEXT                                        && FOR _i = 1 TO _noqueue

RELEASE _type

* Create array of valid mats *
SELECT mats
SET FILTER TO
GOTO TOP
SET ORDER TO 2
```

```
SEEK _matkey

IF .NOT. FOUND()
    msg_24('No mats are available for this photo combination...press any key',.t.,.t.,.f.)
ELSE
    * Count number of matching mats *
    _i = 0
    DO WHILE _matkey = ALLTRIM(positions + type)
        _i = _i + 1
        SKIP 1
    ENDDO                                   && DO WHILE _matkey = ALLTRIM(positions + type)

    * Automatically process for just one matching mat *
    IF _i = 1
        KEYBOARD CHR(13)
    ENDIF                                   && IF _i = 1

    * Create array of available mats *
    DECLARE mat_ids[_i]
    SEEK _matkey
    FOR _j = 1 TO _i
        mat_ids[_j] = mat_id
        SKIP 1
    NEXT                                    && FOR _j = 1 TO _i
    SET ORDER TO 1

    * Create and load array of correct pictures *
    DECLARE mat_pic[(_i * 6)]
    SELECT matdiag
    FOR _i = 1 TO LEN(mat_ids)
        SEEK mat_ids[_i]
        FOR _j = (6 * (_i-1) + 1) TO (6 * (_i-1) + 6)
            mat_pic[_j] = picture
            SKIP 1
        NEXT                                && FOR _j = (6 * (_i-1) + 1) TO (6 * (_i-1) + 6)
    NEXT                                    && FOR _i = 1 TO LEN(mat_ids)

    * Display choice of available mats *

    m_trapfeed(1)
    m_trapfree()
    m_traprest(_mtrap)
    m_trapset()
    _mchoice = ACHOICE(3,65,19,77,mat_pic)
    m_trapfeed(_mousesen)
    m_trapfree()
    m_traprest(_mtrap)
    m_trapset()

    * Process mat choice *
    IF _mchoice = 0
        msg_24('Page creation aborted, press any key',.t.,.t.,.f.)
    ELSE
        _i = IIF(INT(_mchoice/6)=_mchoice/6,_mchoice/6,INT(_mchoice/6) + 1)
        _mat_id = mat_ids[_i]
        SELECT mats
        SEEK _mat_id

        RELEASE mat_pic, mat_ids            && Recover memory from mat_pic & mat_ids array

        * Get detail of all photo's and types *

        DECLARE type_[_noqueue]
        PRIVATE id_, dbp_, tsize_, size_

        SELECT photo
```

```
_prec = RECNO()
FOR _i = 1 to 4
    IF .NOT. EMPTY(photo_id_[_i])
        SEEK STR(photo_id_[_i],5,0)
        type_[_i] = photo->orient + photo->shape
    ENDIF                                  && IF .NOT. EMPTY(&_temp)
NEXT                                       && FOR _i = 65 to 68

FOR _i = 1 TO _noqueue
    FOR _j = 65 TO 68
        id_    = '_id_' + CHR(_j)
        dbp_   = '_dbp_' + CHR(_j)
        tsize_ = 'mats->tsize_' + CHR(_j)
        size_  = ALLTRIM(RIGHT(&tsize_,5))
        IF type_[_i] = LEFT(&tsize_,2) .AND. EMPTY(&id_) .AND. .NOT. EMPTY(photo_id_[_i])
            SEEK STR(photo_id_[_i],5,0)
            REPLACE used WITH .T.
            &id_ = photo_id_[_i]
            DO CASE
                CASE size_ = '3X5' .OR. size_ = '4X5' .OR. size_ = '5X5'
                    &dbp_ = photo->dbp_small
                CASE size_ = '5X7' .OR. size_ = '8X8'
                    &dbp_ = photo->dbp_med
                CASE size_ = '8X10' .OR. size_ = '10X10'
                    &dbp_ = photo->dbp_lge
                CASE size_ = '12X12'
                    &dbp_ = photo->dbp_1212
                CASE size_ = '12X24'
                    &dbp_ = photo->dbp_1224
                    _is_T224 = .T.
            ENDCASE                        && DO CASE
            photo_id_[_i] = 0
        ENDIF                              && IF type_[_i] = LEFT(&tsize_,2) .AND. EMPTY(&id_)
    NEXT                                   && FOR _j = 65 TO 68
NEXT                                       && FOR _i = 1 TO _noqueue

SELECT book
IF _is_1224 .AND. odd(_newpage)
    msg_24('Adding empty page for page numbering consistency...',.f.,.t.,.f.)
    APPEND BLANK
    replace page       with STR(_newpage,3,0)
    replace mat_id     with 'EMPTY'
    _newpage = _newpage + 1
ENDIF                                      && IF _is_1224 .AND. odd(_newpage)
APPEND BLANK
replace book->page       with STR(_newpage,3,0)
replace book->mat_id     with _mat_id
replace book->is_T224    with _is_T224
replace book->matched    with _matched
replace book->dbp_a      with _dbp_a
replace book->dbp_b      with _dbp_b
replace book->dbp_c      with _dbp_c
replace book->dbp_d      with _dbp_d
replace book->id_a       with _id_a
replace book->id_b       with _id_b
replace book->id_c       with _id_c
replace book->id_d       with _id_d

_added = .T.
_cpage = book->page
DO pag_dis WITH .F.
SELECT photo
GOTO _prec
    ENDIF                                  && IF _mchoice = 0
ENDIF                                      && IF .NOT. FOUND()
```

```
SCROLL(3,65,19,77,0)

SELECT mats
SET FILTER TO prime
GOTO TOP
SELECT photo

RETURN
```

```
*.........................................................................
*
*   Program Name: PHR_PAG.PRG       Copyright: EPIX Corporation
*   Date Created: 05/31/91           Language: Clipper
*   Time Created: 16:31:33             Author: Glenn Holcomb
*
*.........................................................................

    PARAMETER _noqueue, hold, _added
    PRIVATE _newpage, _no_pics, _i, _j, _temp, _tval, _prec, _matkey, _rec

    store space(3)          to _page
    store space(5)          to _mat_id
    store .f.               to _is_T224
    store space(1)          to _matched
    store space(10)         to _dbp_a
    store space(10)         to _dbp_b
    store space(10)         to _dbp_c
    store space(10)         to _dbp_d
    store 0                 to _id_a
    store 0                 to _id_b
    store 0                 to _id_c
    store 0                 to _id_d

    SELECT book
    _newpage = nextpage()
    SELECT photo

    * Construct matkey for current group *

    _matkey = STR(_noqueue,1,0)
    DECLARE _type[_noqueue]
    _prec = RECNO()
    _j = 1
    FOR _i = 1 TO 4
        IF .NOT. EMPTY(hold[_i])
            SEEK STR(hold[_i],5,0)
            IF FOUND()
                _type[_j] = photo->orient + photo->shape
                _j = _j + 1
            ELSE
                msg_24('System error in PHR_PAG...unable to find photo ' + ALLTRIM(STR(_tval,5,0)) + ', press any key',.t.,.t.,.t.)
            ENDIF                               && IF FOUND()
        ENDIF                                   && IF .NOT. EMPTY(hold[_i])
    NEXT                                        && FOR _i = 1 TO 4
    GOTO _prec
    ASORT(_type)
    FOR _i = 1 TO _noqueue
        _matkey = _matkey + _type[_i]
    NEXT                                        && FOR _i = 1 TO _noqueue

    RELEASE _type

    * Create array of valid mats *
    SELECT mats
    SET ORDER TO 2
    SEEK _matkey
    SET ORDER TO 1

    IF .NOT. FOUND()
        msg_24('No mats are available for this photo combination...press any key',.t.,.t.,.f.)
    ELSE
        _mat_id = mats->mat_id
        DECLARE photo_id_[_noqueue],type_[_noqueue]
        PRIVATE id_, dbp_, tsize_, size_
```

```
SELECT photo
_prec = RECNO()
_j = 1
FOR _i = 1 to 4
    IF .NOT. EMPTY(hold[_i])
        photo_id_[_j] = hold[_i]
        SEEK STR(photo_id_[_j],5,0)
        type_[_j] = photo->orient + photo->shape
        _j = _j + 1
    ENDIF                                   && IF .NOT. EMPTY(hold[_i])
NEXT                                        && FOR _i = 1 to 4

FOR _i = 1 TO _noqueue
    FOR _j = 65 TO 68
        id_    = '_id_' + CHR(_j)
        dbp_   = '_dbp_' + CHR(_j)
        tsize_ = 'mats->tsize_' + CHR(_j)
        size_  = ALLTRIM(RIGHT(&tsize_,5))
        IF type_[_i] = LEFT(&tsize_,2) .AND. EMPTY(&id_) .AND. .NOT. EMPTY(photo_id_[_i])
            SEEK STR(photo_id_[_i],5,0)
            REPLACE used WITH .T.
            &id_ = photo_id_[_i]
            DO CASE
                CASE size_ = '3X5' .OR. size_ = '4X5' .OR. size_ = '5X5'
                    &dbp_ = photo->dbp_small
                CASE size_ = '5X7' .OR. size_ = '8X8'
                    &dbp_ = photo->dbp_med
                CASE size_ = '8X10' .OR. size_ = '10X10'
                    &dbp_ = photo->dbp_lge
                CASE size_ = '12X12'
                    &dbp_ = photo->dbp_1212
                CASE size_ = '12X24'
                    &dbp_ = photo->dbp_1224
                    _is_1224 = .T.
            ENDCASE                         && DO CASE
            photo_id_[_i] = 0
        ENDIF                               && IF type_[_i] = LEFT(&tsize_,2) .AND. EMPTY(&id_)
    NEXT                                    && FOR _j = 65 TO 68
NEXT                                        && FOR _i = 1 TO _noqueue

SELECT book
IF _is_1224 .AND. odd(_newpage)
    msg_24('Adding empty page for page numbering consistency...',.f.,.t.,.f.)
    APPEND BLANK
    replace page        with STR(_newpage,3,0)
    replace mat_id      with 'EMPTY'
    _newpage = _newpage + 1
ENDIF                                   && IF _is_1224 .AND. odd(_newpage)
APPEND BLANK
replace book->page      with STR(_newpage,3,0)
replace book->mat_id    with _mat_id
replace book->is_1224   with _is_1224
replace book->matched   with _matched
replace book->dbp_a     with _dbp_a
replace book->dbp_b     with _dbp_b
replace book->dbp_c     with _dbp_c
replace book->dbp_d     with _dbp_d
replace book->id_a      with _id_a
replace book->id_b      with _id_b
replace book->id_c      with _id_c
replace book->id_d      with _id_d
_added = .T.
_cpage = book->page
DO pag_dis WITH .F.
SELECT photo
GOTO _prec
```

```
    ENDIF                                  && IF .NOT. FOUND()
    SELECT photo
RETURN                                     && PROCEDURE phr_pag
```

```
*.........................................................................
*
*   Program Name: PHR_SHW.PRG       Copyright: EPIX Corporation
*   Date Created: 07/15/91           Language: Clipper
*   Time Created: 16:26:30             Author: Glenn Holcomb
*
*.........................................................................

msg_24('Please wait while displaying images...',.F.,.F.,.F.)
_form = 'COMPARE'
IF _form # _lastform
    pp_call('FORM ..\'+_form)
    _lastform = _form
ELSE
    pp_call('CLRF')
ENDIF                                         && IF _form # _lastform

pp_call('PUTF YES_A  ')
pp_call('PUTF YES_B  ')
pp_call('PUTF YES_C  ')
pp_call('PUTF YES_D  ')

IF .NOT. EMPTY(hold[1])
    SEEK STR(hold[1],5,0)
    pp_call('PUTF DBP_A ' + photo->dbp_small)
    pp_call('PUTF ID_A ' + STR(hold[1],5,0))
ELSE
    pp_call('CLRF DBP_A')
    pp_call('PUTF ID_A ' + SPACE(5))
ENDIF                                         && IF .NOT. EMPTY(hold[1])

IF .NOT. EMPTY(hold[2])
    SEEK STR(hold[2],5,0)
    pp_call('PUTF DBP_B ' + photo->dbp_small)
    pp_call('PUTF ID_B ' + STR(hold[2],5,0))
ELSE
    pp_call('CLRF DBP_B')
    pp_call('PUTF ID_B ' + SPACE(5))
ENDIF                                         && IF .NOT. EMPTY(hold[2])

IF .NOT. EMPTY(hold[3])
    SEEK STR(hold[3],5,0)
    pp_call('PUTF DBP_C ' + photo->dbp_small)
    pp_call('PUTF ID_C ' + STR(hold[3],5,0))
ELSE
    pp_call('CLRF DBP_C')
    pp_call('PUTF ID_C ' + SPACE(5))
ENDIF                                         && IF .NOT. EMPTY(hold[3])

IF .NOT. EMPTY(hold[4])
    SEEK STR(hold[4],5,0)
    pp_call('PUTF DBP_D ' + photo->dbp_small)
    pp_call('PUTF ID_D ' + STR(hold[4],5,0))
ELSE
    pp_call('CLRF DBP_D')
    pp_call('PUTF ID_D ' + SPACE(5))
ENDIF                                         && IF .NOT. EMPTY(hold[4])

RETURN
```

```
*.........................................................................
*
*   Program Name: PHR_TOS.PRG       Copyright: EPIX Corporation
*   Date Created: 07/15/91           Language: Clipper
*   Time Created: 15:54:02             Author: Glenn Holcomb
*
*.........................................................................

PARAMETER _noqueue, hold
PRIVATE _i, _prec

SELECT photo
_prec = RECNO()
FOR _i = 1 to 4
    IF .NOT. EMPTY(hold[_i])
        SEEK STR(hold[_i],5,0)
        IF FOUND()
            REPLACE photo->chosen WITH .F.
        ELSE
            msg_24('Photo ' + ALLTRIM(STR(hold[_i])) + ' not found during toss, press any key',.t.,.t.,.t.)
        ENDIF                                   && IF FOUND()
    ENDIF                                       && IF .NOT. EMPTY(hold[_i])
NEXT                                            && FOR _i = 1 to 4
GOTO _prec

RETURN
```

```
*.........................................................................
*
*   Program Name: PHT_DIS.PRG       Copyright: EPIX Corporation
*   Date Created: 04/16/91           Language: Clipper
*   Time Created: 18:01:17             Author: Glenn Holcomb
*
*.........................................................................

PARAMETER _shw_img

DO pht_sca

IF pcount() = 0
    _shw_img = .T.
ENDIF                                        && IF pcount() = 0

IF _photo_id # 0

    @ 13,04 SAY 'Photo ID    : '
    @ 15,04 SAY 'Orientation: '
    @ 15,32 SAY 'Shape: '

    @ 13,17 SAY _photo_id
    @ 15,17 SAY orient(_orient)
    @ 15,39 SAY SPACE(12)
    @ 15,39 SAY shape(_shape,_orient)

    IF .NOT. EMPTY(_notes)
        @ 17,04 SAY 'Notes: '
        KEYBOARD CHR(23)
        MEMOEDIT(_notes,17,11,19,59,.F.)
    ELSE
        SCROLL(17,04,19,59,0)
    ENDIF                                    && IF .NOT. EMPTY(_notes)

    IF _shw_img .AND. .NOT. EMPTY(_dbp_1224)
        msg_24('Please wait while displaying photo...',.F.,.F.,.F.)
        DO CASE
            CASE _orient = 'H'
                _form = 'SLDSHWH'
            CASE _orient = 'V'
                _form = 'SLDSHWV'
            CASE _orient = 'N'
                _form = 'SLDSHWN'
            OTHERWISE
                _form = 'SLDSHWH'
        ENDCASE                           && DO CASE
        _lorient = _orient
        IF _form # _lastform
            pp_call('FORM ..\'+_form)
            _lastform = _form
        ENDIF                                && IF _form # _lastform
        pp_call('PUTF DBP_A ' + _dbp_1224)
        pp_call('PUTF ID_A ' + STR(_photo_id,5,0))
        @ 24, 0 CLEAR
    ENDIF                                    && IF _shw_img

    SELECT photo

ELSE

    SCROLL(13,04,19,59,0)

ENDIF

RETURN
```

```
*
*...........................................................................
*
*    Program Name: PHT_FND.PRG       Copyright: EPIX Corporation
*    Date Created: 07/31/91           Language: Clipper
*    Time Created: 16:23:37             Author: Glenn Holcomb
*
*...........................................................................

PRIVATE _rec, _prec, _pid, _onpage

SET FILTER TO

_pid = _photo_id
_onpage = SPACE(1)

STORE recno() TO _rec
csron()
@ 24, 0 SAY 'Enter Photo ID Number: ' GET _pid PICTURE '@K#####' VALID fnd_chk(@_pid)
READ
csroff()
@ 24, 0 CLEAR
SEEK STR(_pid,5,0)
IF .NOT. FOUND()
    msg_24('Requested photo not on file, press any key',.T.,.T.)
ELSE
    IF .NOT. photo->chosen
        msg_24('Photo ' + ALLTRIM(STR(_pid,5,0)) + ' has been discarded, press any key',.t.,.f.,.f.)
    ELSEIF .NOT. photo->used
        msg_24('Photo ' + ALLTRIM(STR(_pid,5,0)) + ' is available, press any key',.t.,.f.,.f.)
    ELSE
        msg_24('Please wait while searching for photo...',.f.,.f.,.f.)
        SELECT book
        _prec = recno()
        GOTO TOP
        DO WHILE .NOT. EOF() .AND. EMPTY(_onpage)
            IF book->id_a = _pid .OR. book->id_b = _pid .OR. book->id_c = _pid .OR. book->id_d = _pid
                _onpage = book->page
            ENDIF                                && IF book->id_a = _pid .OR. book->id_b = _pid .OR. book->id_c = _pid .OR. book->id_d = _pid
            SKIP 1
        ENDDO                                    && DO WHILE .NOT. EOF() .AND. EMPTY(_onpage)
        GOTO _prec
        SELECT photo
        msg_24()
        msg_24('Photo ' + ALLTRIM(STR(_pid,5,0)) + ' is used on page ' + ALLTRIM(_onpage) + ', press any key',.t.,.f.,.f.)
    ENDIF                                        && IF .NOT. photo->chosen
ENDIF                                            && IF .NOT. FOUND()

SET FILTER TO chosen
GOTO _rec

RETURN

*
*        Author: Glenn Holcomb
*   Date Created: 04/18/91
*   Time Created: 11:50:04
*
*

FUNCTION fnd_chk

    PARAMETER _photo_id

    PRIVATE _sscreen
    DECLARE flds[1], head[1]
```

```
    IF EMPTY(_photo_id)
        GOTO TOP
        _sscreen = savescreen()
        flds[1] = 'PHOTO_ID'
        head[1] = 'Photo ID #'
        box(13,19,21,32,"┌─┐│┘─└│",color,1,8)
        DBEDIT(14,20,20,31,flds,'','',head)
        _photo_id = photo_id
        RESTSCREEN(_sscreen)
    ENDIF                                   && IF EMPTY(_page)
RETURN(.T.)
```

```
*.............................................................................
*
*   Program Name: PHT_GOT.PRG       Copyright: EPIX Corporation
*   Date Created: 04/17/91           Language: Clipper
*   Time Created: 17:46:15             Author: Glenn Holcomb
*
*.............................................................................

PRIVATE _rec, _chgimg

_chgimg = .T.

STORE recno() TO _rec
csron()
@ 24, 0 SAY 'Enter Photo ID Number: ' GET _photo_id PICTURE '@K#####' VALID pht_chk(@_photo_id)
READ
csroff()
@ 24, 0 CLEAR
SEEK STR(_photo_id,5,0)
IF .NOT. FOUND() .OR. USED
    msg_24('Requested photo not available, press any key',.T.,.T.)
    GOTO _rec
    _chgimg = .F.
ELSE
    IF _rec = RECNO()
        _chgimg = .F.
    ENDIF                                      && IF _rec = RECNO()
ENDIF                                          && IF .NOT. FOUND()
IF EMPTY(_lastform)
    _chgimg = .T.
ENDIF                                      && IF EMPTY(_lastform)
DO pht_sca
 cphoto = _photo_id
DO pht_dis WITH _chgimg

RETURN

*
*         Author: Glenn Holcomb
*   Date Created: 04/18/91
*   Time Created: 11:50:04
*
*

FUNCTION pht_chk

    PARAMETER _photo_id

    PRIVATE _sscreen
    DECLARE flds[1], head[1]

    IF EMPTY(_photo_id)
        SET FILTER TO chosen .AND. .NOT. used
        GOTO TOP
        _sscreen = savescreen()
        flds[1] = 'PHOTO_ID'
        head[1] = 'Photo ID #'
        box(13,19,21,32,"┌─┐│┘─└│ ",color,1,8)
        DBEDIT(14,20,20,31,flds,'','',head)
        _photo_id = photo_id
        SET FILTER TO chosen
        RESTSCREEN(_sscreen)
    ENDIF                                      && IF EMPTY(_page)
RETURN(.T.)
```

```
*.........................................................................
*
*   Program Name: PHT_NTS.PRG       Copyright: EPIX Corporation
*   Date Created: 04/17/91           Language: Clipper
*   Time Created: 18:18:35             Author: Glenn Holcomb
*
*.........................................................................

@ 17,04 SAY 'Notes: '
msg_24('Press CTRL-W to save changes...',.F.,.F.,.T.)

csron()
standard(roloc(color))
_notes = MEMOEDIT(_notes,17,11,19,59,.T.)
standard(color)
csroff()

@ 24, 0 CLEAR

IF lastkey() # 27
    IF queryb('Save changes to notes?')
        REPLACE notes WITH _notes
    ELSE
        _notes = notes
    ENDIF                                  && IF queryb('Save changes to notes?')
ENDIF                                      && IF lastkey() # 27

IF .NOT. EMPTY(_notes)
    @ 17,04 SAY 'Notes: '
    KEYBOARD CHR(23)
    MEMOEDIT(_notes,17,11,19,59,.F.)
ELSE
    SCROLL(17,04,19,59,0)
ENDIF                                      && IF .NOT. EMPTY(_notes)

RETURN
```

```
*.......................................................................
*
*   Program Name: PHT_NXT.PRG       Copyright: EPIX Corporation
*   Date Created: 04/17/91           Language: Clipper
*   Time Created: 11:54:11             Author: Glenn Holcomb
*
*.......................................................................

PRIVATE _rec, _chgimg

_chgimg = .T.

STORE recno() TO _rec
SKIP 1
DO pht_sca
DO WHILE _used .AND. .NOT. EOF()
    SKIP 1
    DO pht_sca
ENDDO
IF EOF()
    GOTO _rec
    msg_24('End of photo file encountered...press any key',.T.,.T.)
    DO pht_sca
     _chgimg = .F.
    IF EMPTY(_lastform)
         _chgimg = .T.
    ENDIF                                       && IF EMPTY(_lastform)
ENDIF
 _cphoto = _photo_id
DO pht_dis WITH _chgimg

RETURN
```

```
*.......................................................................
*
*   Program Name: PHT_ORT.PRG       Copyright: EPIX Corporation
*   Date Created: 07/24/91           Language: Clipper
*   Time Created: 16:11:19             Author: Glenn Holcomb
*
*.......................................................................

PARAMETER _orient

PRIVATE _sscreen, _ochoice

DO CASE
    CASE (_s3x5 .OR. _s4x5) .AND. _s5x5
        DECLARE aorient[3]
        aorient[1] = 'Horizontal'
        aorient[2] = 'Vertical'
        aorient[3] = 'N/A'
    CASE (_s3x5 .OR. _s4x5) .AND. .NOT. _s5x5
        DECLARE aorient[2]
        aorient[1] = 'Horizontal'
        aorient[2] = 'Vertical'
    CASE .NOT. (_s3x5 .OR. _s4x5) .AND. _s5x5
        DECLARE aorient[1]
        aorient[1] = 'N/A'
ENDCASE                                          && DO CASE

_sscreen = savescreen()

_ochoice = 1

box(7,40,13,54,"┌─┐│┘─└│ ",color,1,8)
print(8,42,'Orientation',color)
print(9,40,"├" + REPLICATE("─",13) + "┤",color)
_ochoice = ACHOICE(10,42,12,52,aorient,'','',_ochoice)

restscreen(_sscreen)

IF lastkey() # 13
    _ochoice = 1
ENDIF                                            && IF lastkey() = 27

IF lastkey() # 27
    _orient = LEFT(aorient[_ochoice],1)
    _temp  = "** Orientation changed to " + aorient[_ochoice] + " **" + CHR(13) + CHR(10)
    _notes = _temp + LEFT(_notes,(65535 - LEN(_temp)))
    _shape  = IIF(_orient$'HV',hv_shape[1],n_shape[1])
    REPLACE orient WITH _orient, notes WITH _notes, shape WITH _shape
    DO pht_dis WITH .T.
ENDIF                                            && IF lastkey() # 27

RETURN
```

```
*.........................................................................
*
*    Program Name: PHT_PRV.PRG        Copyright: EPIX Corporation
*    Date Created: 04/17/91            Language: Clipper
*    Time Created: 12:31:29              Author: Glenn Holcomb
*
*.........................................................................

PRIVATE _rec, _chgimg

_chgimg = .T.

STORE recno() TO _rec
SKIP -1
DO pht_sca
DO WHILE _used .AND. .NOT. BOF()
    SKIP -1
    DO pht_sca
ENDDO
IF BOF()
    GOTO _rec
    msg_24('Beginning of photo file encountered...press any key',.T.,.T.)
    DO pht_sca
    _chgimg = .F.
    IF EMPTY(_lastform)
        _chgimg = .T.
    ENDIF                                     && IF EMPTY(_lastform)
ENDIF
_cphoto = _photo_id
DO pht_dis WITH _chgimg

RETURN
```

```
*.........................................................................
*
*   Program Name: PHT_REV.PRG        Copyright: EPIX Corporation
*   Date Created: 05/28/91            Language: Clipper
*   Time Created: 17:40:04              Author: Glenn Holcomb
*
*.........................................................................

PRIVATE _rchoice, _exit, _noqueue, _cmd, _i, _j, _k, _added, _last, _aempty, _pid
DECLARE choice[4], photo[4], letter[4], hold[4]

AFILL(choice,0)
AFILL(photo,'')
AFILL(letter,'')
AFILL(hold,0)
_noqueue = 0

SELECT mats
SET FILTER TO prime
GOTO TOP
SELECT photo

IF .NOT. phr_get(_cphoto,'L')
   msg_24('No photos available for review, press any key',.t.,.t.,.f.)
ELSE

   DO phr_dis

   _rchoice = 99

   DO WHILE _rchoice # 14
      print(21,2,'  SELECT' + CHR(26)  + SPACE(66),hcolor)

      SET MESSAGE TO 24

      @ 21,12 PROMPT 'A'      MESSAGE 'Select Image A'
      @ 21,14 PROMPT 'B'      MESSAGE 'Select Image B'
      @ 21,16 PROMPT 'C'      MESSAGE 'Select Image C'
      @ 21,18 PROMPT 'D'      MESSAGE 'Select Image D'
      @ 21,20 PROMPT 'OTHER'  MESSAGE 'Key in Image Number'
      @ 21,27 PROMPT 'PAGE'   MESSAGE 'Automatically Change Selected Images to a Page'
      @ 21,33 PROMPT 'MATS'   MESSAGE 'Manually Change Selected Images to a Page'
      @ 21,39 PROMPT 'FREE'   MESSAGE 'Release Selected Images'
      @ 21,45 PROMPT 'TOSS'   MESSAGE 'Discard Selected Images'
      @ 21,51 PROMPT 'NXT'    MESSAGE 'Show Next 4 Images'
      @ 21,56 PROMPT 'REV'    MESSAGE 'Show Previous 4 Images (Reverse)'
      @ 21,61 PROMPT 'UPDT'   MESSAGE 'Fill Any Image Holes'
      @ 21,67 PROMPT 'SHOW'   MESSAGE 'Show Selected Images'
      @ 21,73 PROMPT 'EXIT'   MESSAGE 'Exit Image Review'

      MENU TO _rchoice

      SET MESSAGE TO
      @ 24, 0 CLEAR

      IF LASTKEY() = 27
         _rchoice = 14
      ENDIF                               && IF LASTKEY() = 27

      DO CASE
         CASE _rchoice = 1                && PHT_REV - A
            IF EMPTY(choice[1])
               msg_24('No photo avaibable at position A',.f.,.t.,.f.)
            ELSEIF _noqueue = 4
               msg_24('4 photos marked, further select prohibited, press any key',.t.,.t.,.f.)
            ELSE
```

```
            IF ASCAN(hold,choice[1]) = 0
                _noqueue = _noqueue + 1
                hold[_noqueue] = choice[1]
                pp_call('PUTF YES_A *')
            ELSE
                msg_24('Photo already selected',.f.,.t.,.f.)
            ENDIF                           && IF ASCAN(hold,choice[1]) = 0
        ENDIF                               && IF EMPTY(choice[1])
        @ 24, 0 CLEAR
    CASE _rchoice = 2                       && PHT_REV - B
        IF EMPTY(choice[2])
            msg_24('No photo avaibable at position B',.f.,.t.,.f.)
        ELSEIF _noqueue = 4
            msg_24('4 photos marked, further select prohibited, press any key',.t.,.t.,.f.)
        ELSE
            IF ASCAN(hold,choice[2]) = 0
                _noqueue = _noqueue + 1
                hold[_noqueue] = choice[2]
                pp_call('PUTF YES_B *')
            ELSE
                msg_24('Photo already selected',.f.,.t.,.f.)
            ENDIF                           && IF ASCAN(hold,choice[2]) = 0
        ENDIF                               && IF EMPTY(choice[2])
        @ 24, 0 CLEAR
    CASE _rchoice = 3                       && PHT_REV - C
        IF EMPTY(choice[3])
            msg_24('No photo avaibable at position C',.f.,.t.,.f.)
        ELSEIF _noqueue = 4
            msg_24('4 photos marked, further select prohibited, press any key',.t.,.t.,.f.)
        ELSE
            IF ASCAN(hold,choice[3]) = 0
                _noqueue = _noqueue + 1
                hold[_noqueue] = choice[3]
                pp_call('PUTF YES_C *')
            ELSE
                msg_24('Photo already selected',.f.,.t.,.f.)
            ENDIF                           && IF ASCAN(hold,choice[3]) = 0
        ENDIF                               && IF EMPTY(choice[3])
        @ 24, 0 CLEAR
    CASE _rchoice = 4                       && PHT_REV - D
        IF EMPTY(choice[4])
            msg_24('No photo avaibable at position D',.f.,.t.,.f.)
        ELSEIF _noqueue = 4
            msg_24('4 photos marked, further select prohibited, press any key',.t.,.t.,.f.)
        ELSE
            IF ASCAN(hold,choice[4]) = 0
                _noqueue = _noqueue + 1
                hold[_noqueue] = choice[4]
                pp_call('PUTF YES_D *')
            ELSE
                msg_24('Photo already selected',.f.,.t.,.f.)
            ENDIF                           && IF ASCAN(hold,choice[1]) = 0
        ENDIF                               && IF EMPTY(choice[1])
        @ 24, 0 CLEAR
    CASE _rchoice = 5                       && PHT_REV - Other
        _pid = 0
        csron()
        @ 24, 0 SAY 'Enter Photo ID Number: ' GET _pid PICTURE '#####'
        READ
        csroff()
        @ 24, 0 CLEAR
        IF EMPTY(_pid) .OR. lastkey() = 27
            msg_24('Other photo aborted, press any key',.t.,.t.,.f.)
        ELSE
            SEEK STR(_pid,5,0)
            IF .NOT. FOUND() .OR. USED
```

```
            msg_24('Requested photo not available...press any key',.T.,.T.)
        ELSEIF _noqueue = 4
            msg_24('4 photos marked, further select prohibited, press any key',.t.,.t.,.f.)
        ELSE
            IF ASCAN(hold,photo_id) = 0
                _noqueue = _noqueue + 1
                hold[_noqueue] = photo_id
                IF ASCAN(choice,photo_id) # 0
                    _cmd = 'PUTF YES_' + letter[ASCAN(choice,photo_id)] + ' *'
                    pp_call(_cmd)
                ENDIF                   && IF ASCAN(choice,photo_id) # 0
            ELSE
                msg_24('Photo already selected',.f.,.t.,.f.)
            ENDIF                       && IF ASCAN(hold,choice[1]) = 0
        ENDIF                           && IF .NOT. FOUND() .OR. USED
    ENDIF                               && IF EMPTY(_pid) .OR. lastkey() = 27
CASE _rchoice = 6                       && PHT_REV - Page
    IF _noqueue = 0
        msg_24('No photos selected to make a page, press any key',.t.,.t.,.f.)
    ELSE
        _added = .F.
        DO phr_pag WITH _noqueue, hold, _added
        IF _added
            FOR _i = 1 TO 4
                IF ASCAN(hold,choice[_i]) # 0
                    choice[_i] = 0
                    photo[_i] = SPACE(10)
                    _cmd = 'CLRF DBP_' + letter[_i]
                    pp_call(_cmd)
                    _cmd = 'PUTF ID_' + letter[_i] + SPACE(6)
                    pp_call(_cmd)
                    _cmd = 'PUTF YES_' + letter[_i] + '  '
                    pp_call(_cmd)
                ENDIF                   && IF ASCAN(hold,choice[_i]) # 0
            NEXT                        && FOR _i = 1 TO 4
            _noqueue = 0
            AFILL(hold,0)
            pp_call('PUTF YES_A  ')
            pp_call('PUTF YES_B  ')
            pp_call('PUTF YES_C  ')
            pp_call('PUTF YES_D  ')
        ENDIF                           && IF _added
    ENDIF                               && IF _noqueue = 0
CASE _rchoice = 7                       && PHT_REV - Mats
    IF _noqueue = 0
        msg_24('No photos selected to make a page, press any key',.t.,.t.,.f.)
    ELSE
        _added = .F.
        DO phr_mat WITH _noqueue, hold, _added
        IF _added
            FOR _i = 1 TO 4
                IF ASCAN(hold,choice[_i]) # 0
                    choice[_i] = 0
                    photo[_i] = SPACE(10)
                    _cmd = 'CLRF DBP_' + letter[_i]
                    pp_call(_cmd)
                    _cmd = 'PUTF ID_' + letter[_i] + SPACE(6)
                    pp_call(_cmd)
                    _cmd = 'PUTF YES_' + letter[_i] + '  '
                    pp_call(_cmd)
                ENDIF                   && IF ASCAN(hold,choice[_i]) # 0
            NEXT                        && FOR _i = 1 TO 4
            _noqueue = 0
            AFILL(hold,0)
            pp_call('PUTF YES_A  ')
            pp_call('PUTF YES_B  ')
```

```
            pp_call('PUTF YES_C  ')
            pp_call('PUTF YES_D  ')
        ENDIF                           && IF _added
    ENDIF                               && IF _noqueue = 0
CASE _rchoice = 8                       && PHT_REV - Free
    _noqueue = 0
    AFILL(hold,0)
    pp_call('PUTF YES_A  ')
    pp_call('PUTF YES_B  ')
    pp_call('PUTF YES_C  ')
    pp_call('PUTF YES_D  ')
CASE _rchoice = 9                       && PHT_REV - Toss
    IF _noqueue = 0
        msg_24('No photos selected to toss, press any key',.t.,.t.,.f.)
    ELSE
        DO phr_tos WITH _noqueue, hold
        FOR _i = 1 TO 4
            IF ASCAN(hold,choice[_i]) # 0
                choice[_i] = 0
                photo[_i] = SPACE(10)
                _cmd = 'CLRF DBP_' + letter[_i]
                pp_call(_cmd)
                _cmd = 'PUTF ID_' + letter[_i] + SPACE(6)
                pp_call(_cmd)
                _cmd = 'PUTF YES_' + letter[_i] + '  '
                pp_call(_cmd)
            ENDIF                       && IF ASCAN(hold,choice[_i]) # 0
        NEXT                            && FOR _i = 1 TO 4
        _noqueue = 0
        AFILL(hold,0)
        pp_call('PUTF YES_A  ')
        pp_call('PUTF YES_B  ')
        pp_call('PUTF YES_C  ')
        pp_call('PUTF YES_D  ')
    ENDIF                               && IF _noqueue = 0
CASE _rchoice = 10                      && PHT_REV - Next
    _j = 0
    _k = 0
    FOR _i = 1 TO 4
        IF .NOT. EMPTY(choice[_i])
            _j = choice[_i]
            _k = _k + 1
        ENDIF                           && IF .NOT. EMPTY(choice[_i])
    NEXT                                && FOR _i = 1 TO 4
    IF .NOT. phr_get(_j,'N')
        DO phr_dis
        DO que_dis
        msg_24('End of photos reached, press any key',.t.,.t.,.f.)
    ELSE
        DO phr_dis
        DO que_dis
    ENDIF                               && IF .NOT. phr_get(_j,'N')
CASE _rchoice = 11                      && PHT_REV - Previous
    _j = 0
    _k = 0
    FOR _i = 4 TO 1 STEP -1
        IF .NOT. EMPTY(choice[_i])
            _j = choice[_i]
            _k = _k + 1
        ENDIF                           && IF .NOT. EMPTY(choice[_i])
    NEXT                                && FOR _i = 1 TO 4
    IF .NOT. phr_get(_j,'B')
        DO phr_dis
        DO que_dis
        msg_24('Beginning of photos reached, press any key',.t.,.t.,.f.)
    ELSE
```

```
          DO phr_dis
          DO que_dis
       ENDIF                                && IF .NOT. phr_get(_j,'B')
    CASE _rchoice = 12                      && PHT_REV - Update
       _j = 0
       _k = 0
       FOR _i = 4 TO 1 STEP -1
          IF .NOT. EMPTY(choice[_i])
             _j = choice[_i]
             _k = _k + 1
          ENDIF                             && IF .NOT. EMPTY(choice[_i])
       NEXT                                 && FOR _i = 1 TO 4
       IF .NOT. phr_get(_j,'L')
          DO phr_dis
          DO que_dis
          msg_24('End of photos reached, press any key',.t.,.t.,.f.)
       ELSE
          DO phr_dis
          DO que_dis
       ENDIF                                && IF .NOT. phr_get(_j,'L')
    CASE _rchoice = 13                      && PHT_REV - Show
       FOR _i = LEN(choice) TO 1 STEP -1
          IF .NOT. EMPTY(choice[_i])
             _cphoto = choice[_i]
          ENDIF                             && IF .NOT. EMPTY(choice[_i])
       NEXT                                 && FOR _i = LEN(choice) TO 1 STEP -1
       DO phr_shw
       msg_24('Press any key to return to normal display...',.t.,.f.,.t.)
       phr_get(_cphoto,'L')
       DO phr_dis
       DO que_dis
    CASE _rchoice = 14                      && PHT_REV - Exit
       print(21,2,SPACE(75))
       FOR _i = LEN(choice) TO 1 STEP -1
          IF .NOT. EMPTY(choice[_i])
             _cphoto = choice[_i]
          ENDIF                             && IF .NOT. EMPTY(choice[_i])
       NEXT                                 && FOR _i = LEN(choice) TO 1 STEP -1
       IF pht_ret(@_cphoto)
          pp_call('TCLR')
          DO pht_dis WITH .F.
          _lastform = SPACE(1)
       ENDIF                                && IF pht_ret(@_cphoto)
ENDCASE                                     && DO CASE

IF _rchoice # 14

   _aempty = .T.

   FOR _i = 1 TO LEN(choice)
      IF .NOT. EMPTY(choice[_i])
         _aempty = .F.
      ENDIF                                 && IF .NOT. EMPTY(choice[_i])
   NEXT                                     && FOR _i = 1 TO LEN(choice)

   IF _aempty
      IF phr_get(_last,'L')
         DO phr_dis
      ELSE
         msg_24('No more photos available for review, press any key',.t.,.t.,.f.)
         print(21,2,SPACE(75))
         nstuff(27)
         nstuff(27)
         scroll(12,2,19,62,0)
      ENDIF                                 && IF .NOT. phr_get()
   ENDIF                                    && IF _aempty
```

```
        ENDIF                                      && IF _rchoice # 14
     ENDDO                                         && DO WHILE _rchoice # 14
  ENDIF                                            && IF .NOT. phr_get(_cphoto,'L')

  SELECT mats
  SET FILTER TO
  GOTO TOP
  SELECT photo

  RETURN
```

```
*.........................................................................
*
*   Program Name: PHT_SCA.PRG       Copyright: EPIX Corporation
*   Date Created: 04/17/91           Language: Clipper
*   Time Created: 11:59:56             Author: Glenn Holcomb
*
*.........................................................................

_photo_id  = photo->photo_id
_orient    = photo->orient
_shape     = photo->shape
_used      = photo->used
_notes     = photo->notes                    && Memo Field
_dbp_small = photo->dbp_small
_dbp_med   = photo->dbp_med
_dbp_lge   = photo->dbp_lge
_dbp_1212  = photo->dbp_1212
_dbp_1224  = photo->dbp_1224

RETURN
```

```
*........................................................................
*
*   Program Name: PHT_SHP.PRG       Copyright: EPIX Corporation
*   Date Created: 07/30/91           Language: Clipper
*   Time Created: 18:14:58             Author: Glenn Holcomb
*
*........................................................................

PARAMETER _orient, _shape
PRIVATE _sscreen, _ochoice

_sscreen = savescreen()

box(7,40,13,54,"┌─┐│┘─└│ ",color,1,8)
print(8,42,'   Shape    ',color)
print(9,40,"├" + REPLICATE("─",13) + "┤",color)

IF _orient = 'H' .OR. _orient = 'V'
    _ochoice = ACHOICE(10,42,12,52,hv_shape)
    IF lastkey() = 13
        _shape = LEFT(hv_shape[_ochoice],1)
    ENDIF                                    && IF lastkey() = 13
ELSE
    _ochoice = ACHOICE(10,42,12,52,n_shape)
    IF lastkey() = 13
        _shape = LEFT(n_shape[_ochoice],1)
    ENDIF                                    && IF lastkey() = 13
ENDIF                                        && IF _orient = 'H' .OR. _orient = 'V'

REPLACE shape WITH _shape
restscreen(_sscreen)
DO pht_dis WITH .F.

RETURN
```

```
*.............................................................................
*
*   Program Name: PP.PRG          Copyright: EPIX Corporation
*   Date Created: 03/06/91         Language: Clipper
*   Time Created: 15:49:11           Author: Glenn C. Holcomb
*
*.............................................................................

FUNCTION pp_call

    PARAMETER pp_cmd

    CALL ppaccess WITH pp_cmd

RETURN(IIF(LEFT(pp_cmd,1)=' ',.T., .F.))
```

```
*.......................................................................
*
*   Program Name: PRC_SCA.PRG       Copyright: EPIX Corporation
*   Date Created: 08/06/91           Language: Clipper
*   Time Created: 14:03:00             Author: Glenn Holcomb
*
*.......................................................................

_order     = price->order
_quantity  = price->quantity
_item      = price->item
_desc      = LEFT(price->desc,LEN(price->desc)-3)
_price     = price->price
_disc      = price->disc
_disc_typ  = price->disc_typ
_tier_low  = price->tier_low
_tier_high = price->tier_high
_p_qty     = price->p_qty
_p_price   = price->p_price

RETURN
```

```
*..........................................................................
*
*   Program Name: PRM_CHK.PRG       Copyright: EPIX Corporation
*   Date Created: 04/10/91           Language: Clipper
*   Time Created: 13:05:38             Author: Glenn Holcomb
*
*..........................................................................

DECLARE _arg[argc()]
PRIVATE _i

IF argc() # 0
    FOR _i = 1 TO argc()
        _arg[_i] = ALLTRIM(argv(_i))
    NEXT                                    && FOR _i = 1 TO argc()
    DO CASE
        CASE _arg[1] = 'ARCHIVE'
            FERASE('ARCH.BAT')
            USE client INDEX client
            SEEK UPPER(_arg[2])
            IF FOUND()
                chdir(client)
                ferase('book.dbf')
                ferase('photo.dbf')
                ferase('photo.dbt')
                ferase('book.ntx')
                ferase('booko.ntx')
                ferase('photo.ntx')
                ferase('photoc.ntx')
                ferase('photo.dbp')
                ferase('mats.dbf')
                ferase('mats.ntx')
                ferase('matkey.ntx')
                ferase('title.dbf')
                ferase('tit_id.ntx')
                ferase('tit_plc.ntx')
                ferase('tit_dbp.ntx')
                ferase('title.dbp')
                ferase('client.txt')
                ferase('price.dbf')
                ferase('price.ntx')
                ferase('pricet.ntx')
                ferase('priceo.ntx')
                chdir('..')
                IF .NOT. rmdir(client)
                    BEEP(3)
                    @ 24, 0 SAY 'System error...failed to remove client directory during delete...press any key'
                    INKEY(0)
                ENDIF                       && IF .NOT. rmdir(client)
                SELECT 0
                USE control
                IF client->client = control->lclient
                    REPLACE control->lclient WITH SPACE(8)
                    _dclient = SPACE(8)
                ENDIF                       && IF client = control->lclient
                USE
                SELECT client
                DELETE
                PACK
                @ 24, 0 CLEAR
                msg_24('Successful transfer of client ' + _arg[2] + ', press any key to continue...',.T.,.T.)
            ELSE
                msg_24('Successful backup of client ' + _arg[2] + ', unable to update/archive client',.T.,.T.)
            ENDIF                           && IF FOUND()
            USE
            KEYBOARD '1'
```

```
CASE _arg[1] = 'ADDTPE'
    FERASE('ADDT.BAT')
    USE client INDEX client
    chdir(_arg[2])
    IF .NOT. FILE('client.txt')
        msg_24('Client information for ' + _arg[2] + ' not on tape, transfer aborted...press any key',.t.,.t.)
        ferase('book.dbf')
        ferase('photo.dbf')
        ferase('photo.dbt')
        ferase('book.ntx')
        ferase('booko.ntx')
        ferase('photo.ntx')
        ferase('photoc.ntx')
        ferase('photo.dbp')
        ferase('mats.dbf')
        ferase('mats.ntx')
        ferase('matkey.ntx')
        ferase('title.dbf')
        ferase('tit_id.ntx')
        ferase('tit_plc.ntx')
        ferase('tit_dbp.ntx')
        ferase('title.dbp')
        ferase('price.dbf')
        ferase('price.ntx')
        ferase('pricet.ntx')
        ferase('priceo.ntx')
        chdir('..')
        IF .NOT. rmdir(_arg[2])
            BEEP(3)
            @ 24, 0 SAY 'System error...failed to remove client directory during transfers to disk...press any key'
            INKEY(0)
        ENDIF                               && IF .NOT. rmdir(_arg[2])
    ELSE
        APPEND FROM client.txt SDF
        ferase('client.txt')
        chdir('..')
        SEEK _arg[2]
        IF FOUND()
            REPLACE archive WITH .F.
            msg_24('Successful transfer of client ' + _arg[2] + ', press any key to continue...',.T.,.T.)
        ELSE
            msg_24('Successful transfer of client ' + _arg[2] + ', unable to update client...press any key',.T.,.T.)
        ENDIF                                   && IF FOUND()
    ENDIF                               && IF .NOT. FILE('client.txt')
    USE
    KEYBOARD '1'
CASE _arg[1] = 'FORMAT'
    FERASE('FMT.BAT')
CASE _arg[1] = 'ERROR'
    DO CASE
        CASE _arg[2] = 'ARCHIVE'
            FERASE('ARCH.BAT')
            msg_24('Error ' + _arg[3] + ' transfer client ' + _arg[4] + ' to tape, please archive again, press any key',.T.,.T.)
            KEYBOARD '1'
        CASE _arg[2] = 'ADDTPE'
            FERASE('ADDT.BAT')
            IF .NOT. rmdir(_arg[4])
                BEEP(3)
                @ 24, 0 SAY 'System error...failed to remove client directory during transfer from tape, press any key'
                INKEY(0)
            ENDIF                       && IF .NOT. rmdir(_client)
            @ 24, 0 CLEAR
            msg_24('Error ' + _arg[3] + ' transfering client ' + _arg[4] + ' from tape, please try again, press any key',.T.,.T.)
            KEYBOARD '1'
        CASE _arg[2] = 'FORMAT'
            FERASE('FMT.BAT')
```

```
                msg_24('Error ' + _arg[3] + ' during format, please try to format tape again...press any key',.T.,.T.)
            ENDCASE                             && DO CASE
    ENDCASE                                     && DO CASE
ENDIF                                           && IF argc() # 0

RETURN
```

```
*.......................................................................
*
*   Program Name: QUE_DIS.PRG       Copyright: EPIX Corporation
*   Date Created: 05/31/91           Language: Clipper
*   Time Created: 16:31:09             Author: Glenn Holcomb
*
*.......................................................................

   FOR _i = 1 TO 4
      IF ASCAN(hold,choice[_i]) # 0
         _cmd = 'PUTF YES_' + letter[_i] + ' *'
      ELSE
         _cmd = 'PUTF YES_' + letter[_i] + '  '
      ENDIF                                  && IF ASCAN(hold,choice[_i]) # 0
      pp_call(_cmd)
   NEXT                                      && FOR _i = 1 TO 4

RETURN                                       && PROCEDURE que_dis
```

```
*...........................................................................
*
*    Program Name: REC_NDX.PRG       Copyright: EPIX Corporation
*    Date Created: 04/22/91           Language: Clipper
*    Time Created: 11:32:05             Author: Glenn Holcomb
*
*...........................................................................

print(24,0,'Recreating index file photo.ntx',color)
USE photo
INDEX ON STR(photo_id,5,0) TO photo
USE
print(24,0,'',color,80)
print(24,0,'Recreating index file photoc.ntx',color)
USE photo
INDEX ON IIF(chosen,' ','Y') + STR(photo_id,5,0) TO photoc
USE
print(24,0,'',color,80)
print(24,0,'Recreating index file book.ntx',color)
USE book
INDEX ON page TO book
USE
print(24,0,'',color,80)
print(24,0,'Recreating index file booko.ntx',color)
USE book
INDEX ON IIF(VAL(RTRIM(LTRIM(page)))#0,VAL(page),999) TO booko
USE
print(24,0,'',color,80)
print(24,0,'Recreating index file mats.ntx',color)
USE mats
INDEX ON mat_id TO mats
USE
print(24,0,'',color,80)
print(24,0,'Recreating index file matkey.ntx',color)
USE mats
INDEX ON positions + type TO matkey
USE
print(24,0,'',color,80)
print(24,0,'Recreating index file matdiag.ntx',color)
USE matdiag
INDEX ON mat_id + STR(RECNO(),5,0) TO matdiag
USE
print(24,0,'',color,80)
print(24,0,'Recreating index file mfga.ntx',color)
USE mfga
INDEX ON mat_id TO mfga
USE
print(24,0,'',color,80)
print(24,0,'Recreating index file mfgb.ntx',color)
USE mfgb
INDEX ON mat_id TO mfgb
USE
print(24,0,'',color,80)
print(24,0,'Recreating index file client.ntx',color)
USE client
INDEX ON client TO client
USE
print(24,0,'',color,80)
print(24,0,'Recreating index file tit_id.ntx',color)
USE title
INDEX ON STR(tit_id,2,0) TO tit_id
USE
print(24,0,'',color,80)
print(24,0,'Recreating index file tit_plc.ntx',color)
USE title
INDEX ON STR(tit_plc,5,0) + STR(tit_id,2,0) TO tit_plc
```

```
USE
print(24,0,'',color,80)
print(24,0,'Creating index file tit_dbp.ntx',color)
USE title
INDEX ON dbp_tit TO tit_dbp
USE
print(24,0,'',color,80)
print(24,0,'Recreating index file price.ntx',color)
USE price
INDEX ON item TO price
USE
print(24,0,'',color,80)
print(24,0,'Recreating index file pricet.ntx',color)
USE price
INDEX ON str(order,2) + item + str(tier_high,5,0) TO pricet
USE
print(24,0,'',color,80)
print(24,0,'Recreating index file priceo.ntx',color)
USE price
INDEX ON str(order,2,0) TO priceo
USE
print(24,0,'',color,80)

chdir(_dclient)
print(24,0,'Recreating index file photo.ntx for ' + _dclient,color)
USE photo
INDEX ON STR(photo_id,5,0) TO photo
USE
print(24,0,'',color,80)
print(24,0,'Recreating index file photoc.ntx for ' + _dclient,color)
USE photo
INDEX ON IIF(chosen,' ','Y') + STR(photo_id,5,0) TO photoc
USE
print(24,0,'',color,80)
print(24,0,'Recreating index file book.ntx for ' + _dclient,color)
USE book
INDEX ON page TO book
USE
print(24,0,'',color,80)
print(24,0,'Recreating index file booko.ntx for ' + _dclient,color)
USE book
INDEX ON IIF(VAL(RTRIM(LTRIM(page)))#0,VAL(page),999) TO booko
USE
print(24,0,'',color,80)
print(24,0,'Recreating index file mats.ntx for ' + _dclient,color)
USE mats
INDEX ON mat_id TO mats
USE
print(24,0,'',color,80)
print(24,0,'Recreating index file matkey.ntx for ' + _dclient,color)
USE mats
INDEX ON positions + type TO matkey
USE
print(24,0,'',color,80)
print(24,0,'Recreating index file tit_id.ntx for ' + _dclient,color)
USE title
INDEX ON STR(tit_id,2,0) TO tit_id
USE
print(24,0,'',color,80)
print(24,0,'Recreating index file tit_plc.ntx for ' + _dclient,color)
USE title
INDEX ON STR(tit_plc,5,0)  + STR(tit_id,2,0) TO tit_plc
USE
print(24,0,'',color,80)
print(24,0,'Creating index file tit_dbp.ntx for ' + _dclient,color)
USE title
```

```
INDEX ON dbp_tit TO tit_dbp
USE
print(24,0,'',color,80)
print(24,0,'Recreating index file price.ntx for ' + _dclient,color)
USE price
INDEX ON item TO price
USE
print(24,0,'',color,80)
print(24,0,'Recreating index file pricet.ntx for ' + _dclient,color)
USE price
INDEX ON str(order,2) + item + str(tier_high,5,0) TO pricet
USE
print(24,0,'',color,80)
print(24,0,'Recreating index file priceo.ntx for ' + _dclient,color)
USE price
INDEX ON str(order,2,0) TO priceo
USE
print(24,0,'',color,80)
chdir('..')

RETURN
```

```
*..........................................................................
*
*   Program Name: RPG_HED.PRG       Copyright: EPIX Corporation
*   Date Created: 08/26/91           Language: Clipper
*   Time Created: 16:34:44             Author: Glenn Holcomb
*
*..........................................................................

PARAMETER _handle, _lines, _mfg_code
PRIVATE _text1, _text2

DO CASE
    CASE _mfg_code = 'A'
        _text1 = SPACE(48) + 'PRINT'
        _text2 = _uon+'PAGE'+_uoff+SPACE(2)+_uon+'  FRAME   '+_uoff+SPACE(2)+_uon+'POSITION'+_uoff+SPACE(2)+_uon+'  SHAPE  '+_uoff+SPACE(2)+_uon+'PHOTO ID'+_uoff+SPAC
  => E(2)+_uon+' SIZE'+_uoff+SPACE(2)+_uon+'NOTES'+SPACE(37)+_uoff
    CASE _mfg_code = 'B'
        _text1 = SPACE(17) + 'INSERT' + SPACE(25) + 'PRINT'
        _text2 = _uon+'PAGE'+_uoff+SPACE(2)+_uon+' INSERT  '+_uoff+SPACE(2)+_uon+' SIZE '+_uoff+SPACE(2)+_uon+'ROTATE'+_uoff+SPACE(2)+_uon+'POS'+_uoff+SPACE(2)+_uon+
  => 'PHOTO ID'+_uoff+SPACE(2)+_uon+' SIZE'+_uoff+SPACE(2)+_uon+'NOTES'+SPACE(37)+_uoff
ENDCASE                                         && DO CASE

fwriteline(_handle,_text1)
_lines = _lines + 1

fwriteline(_handle,_text2)
_lines = _lines + 1

RETURN
```

```
*
*..........................................................................
*
*   Program Name: RPG_LIN.PRG       Copyright: EPIX Corporation
*   Date Created: 08/26/91           Language: Clipper
*   Time Created: 16:51:57             Author: Glenn Holcomb
*
*..........................................................................

PARAMETER _handle, _lines, _mfg_code, _ppage

PRIVATE _textline, _i, _j, _text

DO CASE
    CASE _mfg_code = 'A'
         _textline = SPACE(1) + book->page
        IF mfg->standard
            DO CASE
                CASE RIGHT(mats->tsize_a,5) = '12X24'
                     _textline = _textline + SPACE(2) + 'PANORAMA '
                CASE RIGHT(mats->tsize_a,5) = '12X12'
                     _textline = _textline + SPACE(2) + 'HALF PANO'
                OTHERWISE
                     _textline = _textline + SPACE(2) + 'STANDARD '
            ENDCASE                             && DO CASE
        ELSE
             _textline = _textline + SPACE(5) + mfg->mfg_id + SPACE(3)
        ENDIF                                   && IF mfg->standard
    CASE _mfg_code = 'B'
         _textline = SPACE(1) + book->page
        DO CASE
            CASE RIGHT(mats->tsize_a,5) = '12X24'
                 _textline = _textline + SPACE(2) + 'PANORAMA ' + SPACE(16)
            CASE RIGHT(mats->tsize_a,5) = '12X12'
                 _textline = _textline + SPACE(2) + 'BLANK    ' + SPACE(16)
            OTHERWISE
                 _textline = _textline + SPACE(5) + mfg->mfg_id + SPACE(3)
                 _textline = _textline + SPACE(3) + mfg->size + SPACE(4) + IIF(mfg->rotation=0,SPACE(3),STR(mfg->rotation)) + SPACE(1)
        ENDCASE                                 && DO CASE
ENDCASE                                         && DO CASE

SELECT photo
SEEK STR(book->id_a,5,0)

IF .NOT. FOUND()
    msg_24('System error in RPG_LIN - A, cannot find photo ' + ALLTRIM(STR(book->id_a)) + ', press any key',.t.,.t.,.t.)
ELSE
    DO CASE
        CASE _mfg_code = 'A'
             _textline = _textline + SPACE(5) + mfg->pos_a + SPACE(3)

            IF photo->orient = 'H' .OR. photo->orient = 'V'
                FOR _i = 1 TO LEN(hv_shape)
                    IF photo->shape = LEFT(hv_shape[_i],1)
                         _textline = _textline + SPACE(2) + untrim(hv_shape[_i],9)
                    ENDIF                       && IF photo->shape = LEFT(hv_shape[_i],1)
                NEXT                            && FOR _i = 1 TO LEN(hv_shape)
            ELSE
                FOR _i = 1 TO LEN(n_shape)
                    IF photo->shape = LEFT(n_shape[_i],1)
                         _textline = _textline + SPACE(2) + untrim(n_shape[_i],9)
                    ENDIF                       && IF photo->shape = LEFT(n_shape[_i],1)
                NEXT                            && FOR _i = 1 TO LEN(n_shape)
            ENDIF                               && IF photo->orient = 'H' .OR. photo->orient = 'V'

             _textline = _textline + SPACE(4) + STR(photo->photo_id,5,0) + SPACE(1)
             _textline = _textline + SPACE(2) + RIGHT(mats->tsize_a,5) + SPACE(2)
```

```
    CASE _mfg_code = 'B'
        _textline = _textline + SPACE(3) + 'A' + SPACE(1)
        _textline = _textline + SPACE(4) + STR(photo->photo_id,5,0) + SPACE(1)
        _textline = _textline + SPACE(2) + RIGHT(mats->tsize_a,5) + SPACE(2)
ENDCASE                                  && DO CASE

_j = mlcount(photo->notes,42,4,.T.)

IF (_j + _line) >= 59
    _text = CHR(12)
    Fwriteline(_handle,_text)
    _line = 1
    _ppage = _ppage + 1

    _text = CENTER('ASSEMBLY INSTRUCTIONS BY PAGE FOR ' + ALLTRIM(UPPER(_client)) + ' ' + DTOC(_eventdate) + ' - PAGE ' + ALLTRIM(STR(_ppage)),96)
    Fwriteline(_handle,_text)
    _line = _line + 1

    DO rpt_blk WITH _handle, _line

    DO rpg_hed WITH _handle, _line, _mfg_code

ENDIF                                    && IF _j + _line > 60

_textline = _textline + memoline(photo->notes,42,1,4,.T.)
Fwriteline(_handle,_textline)
_line = _line + 1

FOR _i = 2 TO _j
    _textline = SPACE(55) + memoline(photo->notes,42,_i,4,.T.)
    Fwriteline(_handle,_textline)
    _line = _line + 1
NEXT                                     && FOR _i = 2 TO _j

IF .NOT. EMPTY(book->id_b)

    SELECT photo
    SEEK STR(book->id_b,5,0)

    IF .NOT. FOUND()
        msg_24('System error in RPG_LIN - B, cannot find photo ' + ALLTRIM(STR(book->id_b)) + ', press any key',.t.,.t.,.t.)
    ELSE
        DO CASE
            CASE _mfg_code = 'A'
                _textline = SPACE(15) + SPACE(5) + mfg->pos_b + SPACE(3)

                IF photo->orient = 'H' .OR. photo->orient = 'V'
                    FOR _i = 1 TO LEN(hv_shape)
                        IF photo->shape = LEFT(hv_shape[_i],1)
                            _textline = _textline + SPACE(2) + untrim(hv_shape[_i],9)
                        ENDIF                && IF photo->shape = LEFT(hv_shape[_i],1)
                    NEXT                     && FOR _i = 1 TO LEN(hv_shape)
                ELSE
                    FOR _i = 1 TO LEN(n_shape)
                        IF photo->shape = LEFT(n_shape[_i],1)
                            _textline = _textline + SPACE(2) + untrim(n_shape[_i],9)
                        ENDIF                && IF photo->shape = LEFT(n_shape[_i],1)
                    NEXT                     && FOR _i = 1 TO LEN(n_shape)
                ENDIF                        && IF photo->orient = 'H' .OR. photo->orient = 'V'

                _textline = _textline + SPACE(4) + STR(photo->photo_id,5,0) + SPACE(1)
                _textline = _textline + SPACE(2) + RIGHT(mats->tsize_b,5) + SPACE(2)

            CASE _mfg_code = 'B'
                _textline = SPACE(31) + SPACE(3) + 'B' + SPACE(1)
```

```
            _textline = _textline + SPACE(4) + STR(photo->photo_id,5,0) + SPACE(1)
            _textline = _textline + SPACE(2) + RIGHT(mats->tsize_b,5) + SPACE(2)
      ENDCASE                                && DO CASE

      _j = mlcount(photo->notes,42,4,.T.)

      IF (_j + _line) >= 59
         _text = CHR(12)
         fwriteline(_handle,_text)
         _line = 1
         _ppage = _ppage + 1

         _text = CENTER('ASSEMBLY INSTRUCTIONS BY PAGE FOR ' + ALLTRIM(UPPER(_client)) + ' ' + DTOC(_eventdate) + ' - PAGE ' + ALLTRIM(STR(_ppage)),96)
         fwriteline(_handle,_text)
         _line = _line + 1

         DO rpt_blk WITH _handle, _line

         DO rpg_hed WITH _handle, _line, _mfg_code

      ENDIF                                  && IF _j + _line > 60

      _textline = _textline + memoline(photo->notes,42,1,4,.T.)
      fwriteline(_handle,_textline)
      _line = _line + 1

      FOR _i = 2 TO _j
         _textline = SPACE(55) + memoline(photo->notes,42,_i,4,.T.)
         fwriteline(_handle,_textline)
         _line = _line + 1
      NEXT                                   && FOR _i = 2 TO _j

   ENDIF                                     && IF .NOT. FOUND()
ENDIF                                        && IF .NOT. EMPTY(book->id_b)

IF .NOT. EMPTY(book->id_c)

   SELECT photo
   SEEK STR(book->id_c,5,0)

   IF .NOT. FOUND()
      msg_24('System error in RPG_LIN - C, cannot find photo ' + ALLTRIM(STR(book->id_c)) + ', press any key',.t.,.t.,.t.)
   ELSE
      DO CASE
         CASE _mfg_code = 'A'
            _textline = SPACE(15) + SPACE(5) + mfg->pos_c + SPACE(3)

            IF photo->orient = 'H' .OR. photo->orient = 'V'
               FOR _i = 1 TO LEN(hv_shape)
                  IF photo->shape = LEFT(hv_shape[_i],1)
                     _textline = _textline + SPACE(2) + untrim(hv_shape[_i],9)
                  ENDIF                      && IF photo->shape = LEFT(hv_shape[_i],1)
               NEXT                          && FOR _i = 1 TO LEN(hv_shape)
            ELSE
               FOR _i = 1 TO LEN(n_shape)
                  IF photo->shape = LEFT(n_shape[_i],1)
                     _textline = _textline + SPACE(2) + untrim(n_shape[_i],9)
                  ENDIF                      && IF photo->shape = LEFT(n_shape[_i],1)
               NEXT                          && FOR _i = 1 TO LEN(n_shape)
            ENDIF                            && IF photo->orient = 'H' .OR. photo->orient = 'V'

            _textline = _textline + SPACE(4) + STR(photo->photo_id,5,0) + SPACE(1)
            _textline = _textline + SPACE(2) + RIGHT(mats->tsize_c,5) + SPACE(2)

         CASE _mfg_code = 'B'
            _textline = SPACE(31) + SPACE(3) + 'C' + SPACE(1)
```

```
            _textline = _textline + SPACE(4) + STR(photo->photo_id,5,0) + SPACE(1)
            _textline = _textline + SPACE(2) + RIGHT(mats->tsize_c,5) + SPACE(2)
      ENDCASE                                   && DO CASE

      _j = mlcount(photo->notes,42,4,.T.)

      IF (_j + _line) >= 59
         _text = CHR(12)
         fwriteline(_handle,_text)
         _line = 1
         _ppage = _ppage + 1

         _text = CENTER('ASSEMBLY INSTRUCTIONS BY PAGE FOR ' + ALLTRIM(UPPER(_client)) + ' ' + DTOC(_eventdate) + ' - PAGE ' + ALLTRIM(STR(_ppage)),96)
         fwriteline(_handle,_text)
         _line = _line + 1

         DO rpt_blk WITH _handle, _line

         DO rpg_hed WITH _handle, _line, _mfg_code

      ENDIF                                     && IF _j + _line > 60

      _textline = _textline + memoline(photo->notes,42,1,4,.T.)
      fwriteline(_handle,_textline)
      _line = _line + 1

      FOR _i = 2 TO _j
         _textline = SPACE(55) + memoline(photo->notes,42,_i,4,.T.)
         fwriteline(_handle,_textline)
         _line = _line + 1
      NEXT                                      && FOR _i = 2 TO _j

   ENDIF                                        && IF .NOT. FOUND()
ENDIF                                           && IF .NOT. EMPTY(book->id_c)

IF .NOT. EMPTY(book->id_d)

   SELECT photo
   SEEK STR(book->id_d,5,0)

   IF .NOT. FOUND()
      msg_24('System error in RPG_LIN - D, cannot find photo ' + ALLTRIM(STR(book->id_d)) + ', press any key',.t.,.t.,.t.)
   ELSE
      DO CASE
         CASE _mfg_code = 'A'
            _textline = SPACE(15) + SPACE(5) + mfg->pos_d + SPACE(3)

            IF photo->orient = 'H' .OR. photo->orient = 'V'
               FOR _i = 1 TO LEN(hv_shape)
                  IF photo->shape = LEFT(hv_shape[_i],1)
                     _textline = _textline + SPACE(2) + untrim(hv_shape[_i],9)
                  ENDIF                         && IF photo->shape = LEFT(hv_shape[_i],1)
               NEXT                             && FOR _i = 1 TO LEN(hv_shape)
            ELSE
               FOR _i = 1 TO LEN(n_shape)
                  IF photo->shape = LEFT(n_shape[_i],1)
                     _textline = _textline + SPACE(2) + untrim(n_shape[_i],9)
                  ENDIF                         && IF photo->shape = LEFT(n_shape[_i],1)
               NEXT                             && FOR _i = 1 TO LEN(n_shape)
            ENDIF                               && IF photo->orient = 'H' .OR. photo->orient = 'V'

            _textline = _textline + SPACE(4) + STR(photo->photo_id,5,0) + SPACE(1)
            _textline = _textline + SPACE(2) + RIGHT(mats->tsize_d,5) + SPACE(2)

         CASE _mfg_code = 'B'
            _textline = SPACE(31) + SPACE(3) + 'D' + SPACE(1)
```

```
                _textline = _textline + SPACE(4) + STR(photo->photo_id,5,0) + SPACE(1)
                _textline = _textline + SPACE(2) + RIGHT(mats->tsize_d,5) + SPACE(2)
            ENDCASE                                   && DO CASE

            _j = mlcount(photo->notes,42,4,.T.)

            IF (_j + _line) >= 59
                _text = CHR(12)
                fwriteline(_handle,_text)
                _line = 1
                _ppage = _ppage + 1

                _text = CENTER('ASSEMBLY INSTRUCTIONS BY PAGE FOR ' + ALLTRIM(UPPER(_client)) + ' ' + DTOC(_eventdate) + ' - PAGE ' + ALLTRIM(STR(_ppage)),96)
                fwriteline(_handle,_text)
                _line = _line + 1

                DO rpt_blk WITH _handle, _line

                DO rpg_hed WITH _handle, _line, _mfg_code

            ENDIF                                     && IF _j + _line > 60

            _textline = _textline + memoline(photo->notes,42,1,4,.T.)
            fwriteline(_handle,_textline)
            _line = _line + 1

            FOR _i = 2 TO _j
                _textline = SPACE(55) + memoline(photo->notes,42,_i,4,.T.)
                fwriteline(_handle,_textline)
                _line = _line + 1
            NEXT                                      && FOR _i = 2 TO _j
        ENDIF                                         && IF .NOT. FOUND()
    ENDIF                                             && IF .NOT. EMPTY(book->id_d)
ENDIF                                             && IF .NOT. FOUND()

SELECT book

RETURN
```

```
*.........................................................................
*
*   Program Name: RPT_BLK.PRG       Copyright: EPIX Corporation
*   Date Created: 08/26/91           Language: Clipper
*   Time Created: 14:22:15             Author: Glenn Holcomb
*
*.........................................................................

PARAMETERS _handle, _lines

DO CASE
    CASE pcount() = 0
        msg_24('System error in RPT_BLK, no file handle specified, press any key',.t.,.t.,.t.)
        RETURN
    CASE pcount() = 1
        _lines = 0
ENDCASE                                  && DO CASE

fwriteline(_handle,SPACE(1))
_lines = _lines + 1

RETURN
```

```
*.........................................................................
*
*   Program Name: RPT_FRM.PRG       Copyright: EPIX Corporation
*   Date Created: 08/08/91           Language: Clipper
*   Time Created: 16:14:23             Author: Glenn Holcomb
*
*.........................................................................

PRIVATE _mfg_code, _mat_color

USE client INDEX client
SEEK _dclient
_mfg_code = client->mfg_code
_mat_color = client->mat_color

chdir(_dclient)

USE mats INDEX mats
SELECT 0

USE book INDEX book, booko
GOTO TOP

IF EOF()
    msg_24('Must create an album before printing order form, press any key',.t.,.f.,.f.)
    USE
ELSE
    SELECT book
    GOTO TOP

    SELECT 0
    DO CASE
        CASE _mfg_code = 'A'
            USE ..\mfga INDEX ..\mfga ALIAS mfg
            DO ord_mga
        CASE _mfg_code = 'B'
            USE ..\mfgb INDEX ..\mfgb ALIAS mfg
            DO ord_mgb
    ENDCASE                                 && DO CASE

    SELECT mats
    USE
    SELECT book
    USE
    SELECT mfg
    USE

ENDIF                                       && IF EOF()

chdir('..')

RETURN
```

```
*.......................................................................
*
*   Program Name: RPT_LAB.PRG       Copyright: EPIX Corporation
*   Date Created: 08/23/91           Language: Clipper
*   Time Created: 14:18:25             Author: Glenn Holcomb
*
*.......................................................................

PRIVATE _mfg_code, _client, _eventdate
PRIVATE _text, _code, _uon, _uoff, _bon, _boff, _hdl, _label
PRIVATE _i, _j
DECLARE label_1[6], label_2[6], label_3[6]

USE control
_company   = ALLTRIM(control->company)

USE client INDEX client
SEEK _dclient
_client    = client->client
_eventdate = client->eventdate
_mfg_code  = client->mfg_code
USE

chdir(_dclient)

USE mats INDEX mats

SELECT 0
USE ..\assemble
ZAP
INDEX ON photo_id TO ..\assemble

SELECT 0
USE book INDEX book, booko
GOTO TOP

IF EOF()
    msg_24('Must create an album before printing order form, press any key',.t.,.f.,.f.)
    USE
ELSE
    msg_24('Please wait while compiling data...',.f.,.f.,.f.)

    IF _mfg_code = 'A'
        SELECT 0
        USE ..\mfga INDEX ..\mfga ALIAS mfg
    ENDIF                                         && IF _mfg_code = 'A'

    SELECT assemble
    APPEND FROM photo FOR used

    SELECT book

    DO WHILE .NOT. EOF()
        SELECT mats
        SEEK book->mat_id
        SELECT assemble
        IF .NOT. EMPTY(book->id_a)
            SEEK book->id_a
            IF FOUND()
                REPLACE assemble->page WITH book->page
                REPLACE assemble->size WITH RIGHT(mats->tsize_a,5)
                IF _mfg_code = 'A'
                    SELECT mfg
                    SEEK book->mat_id
                    SELECT assemble
                    REPLACE assemble->position WITH mfg->pos_a
```

```
            ELSE
                REPLACE assemble->position WITH 'A'
            ENDIF                           && IF _mfg_code = 'A'
        ELSE
            msg_24('System error in RPT_LAB, photo ' + ALLTRIM(STR(book->id_a)) + ' not found, press any key',.t.,.t.,.t.)
        ENDIF                               && IF FOUND()
    ENDIF                                   && IF .NOT. EMPTY(book->id_a)

    IF .NOT. EMPTY(book->id_b)
        SEEK book->id_b
        IF FOUND()
            REPLACE assemble->page WITH book->page
            REPLACE assemble->size WITH RIGHT(mats->tsize_b,5)
            IF _mfg_code = 'A'
                SELECT mfg
                SEEK book->mat_id
                SELECT assemble
                REPLACE assemble->position WITH mfg->pos_b
            ELSE
                REPLACE assemble->position WITH 'B'
            ENDIF                           && IF _mfg_code = 'A'
        ELSE
            msg_24('System error in RPT_LAB, photo ' + ALLTRIM(STR(book->id_b)) + ' not found, press any key',.t.,.t.,.t.)
        ENDIF                               && IF FOUND()
    ENDIF                                   && IF .NOT. EMPTY(book->id_b)

    IF .NOT. EMPTY(book->id_c)
        SEEK book->id_c
        IF FOUND()
            REPLACE assemble->page WITH book->page
            REPLACE assemble->size WITH RIGHT(mats->tsize_c,5)
            IF _mfg_code = 'A'
                SELECT mfg
                SEEK book->mat_id
                SELECT assemble
                REPLACE assemble->position WITH mfg->pos_c
            ELSE
                REPLACE assemble->position WITH 'C'
            ENDIF                           && IF _mfg_code = 'A'
        ELSE
            msg_24('System error in RPT_LAB, photo ' + ALLTRIM(STR(book->id_c)) + ' not found, press any key',.t.,.t.,.t.)
        ENDIF                               && IF FOUND()
    ENDIF                                   && IF .NOT. EMPTY(book->id_c)

    IF .NOT. EMPTY(book->id_d)
        SEEK book->id_d
        IF FOUND()
            REPLACE assemble->page WITH book->page
            REPLACE assemble->size WITH RIGHT(mats->tsize_d,5)
            IF _mfg_code = 'A'
                SELECT mfg
                SEEK book->mat_id
                SELECT assemble
                REPLACE assemble->position WITH mfg->pos_d
            ELSE
                REPLACE assemble->position WITH 'D'
            ENDIF                           && IF _mfg_code = 'A'
        ELSE
            msg_24('System error in RPT_LAB, photo ' + ALLTRIM(STR(book->id_d)) + ' not found, press any key',.t.,.t.,.t.)
        ENDIF                               && IF FOUND()
    ENDIF                                   && IF .NOT. EMPTY(book->id_a)

    SELECT book
    SKIP 1
ENDDO                                       && DO WHILE .NOT. EOF()
```

```
SELECT mats
USE
SELECT book
USE
IF _mfg_code = 'A'
   SELECT mfg
   USE
ENDIF                                     && IF _mfg_code = 'A'

SELECT 0
USE photo INDEX photo, photoc

SELECT 0
USE ..\printers
SET FILTER TO UPPER(printers->name) # 'SCREEN'
GOTO TOP
DECLARE flds[1], head[1]
_sscreen = savescreen()
msg_24('Use the arrows to scroll, ENTER to Select',.f.,.f.,.t.)
flds[1] = 'NAME'
head[1] = 'Printer'
box(4,10,14,44,"┌─┐│┘─└│",color,1,8)
DBEDIT(5,11,13,43,flds,'','',head)
RELEASE flds, head
restscreen(_sscreen)

_uon = ""
_code = ALLTRIM(printers->undl_on)
DO WHILE .NOT. EMPTY(_code)
   _uon = _uon + CHR(VAL(LEFT(_code,3)))
   _code = SUBSTR(_code,4)
ENDDO                                     && DO WHILE .NOT. EMPTY(_code)

_uoff = ""
_code = ALLTRIM(printers->undl_off)
DO WHILE .NOT. EMPTY(_code)
   _uoff = _uoff + CHR(VAL(LEFT(_code,3)))
   _code = SUBSTR(_code,4)
ENDDO                                     && DO WHILE .NOT. EMPTY(_code)

_bon = ""
_code = ALLTRIM(printers->bold_on)
DO WHILE .NOT. EMPTY(_code)
   _bon = _bon + CHR(VAL(LEFT(_code,3)))
   _code = SUBSTR(_code,4)
ENDDO                                     && DO WHILE .NOT. EMPTY(_code)

_boff = ""
_code = ALLTRIM(printers->bold_off)
DO WHILE .NOT. EMPTY(_code)
   _boff = _boff + CHR(VAL(LEFT(_code,3)))
   _code = SUBSTR(_code,4)
ENDDO                                     && DO WHILE .NOT. EMPTY(_code)

_pitch_10 = ""
_code = ALLTRIM(printers->pitch_10)
DO WHILE .NOT. EMPTY(_code)
   _pitch_10 = _pitch_10 + CHR(VAL(LEFT(_code,3)))
   _code = SUBSTR(_code,4)
ENDDO                                     && DO WHILE .NOT. EMPTY(_code)

_pitch_comp = ""
_code = ALLTRIM(printers->pitch_comp)
DO WHILE .NOT. EMPTY(_code)
   _pitch_comp = _pitch_comp + CHR(VAL(LEFT(_code,3)))
   _code = SUBSTR(_code,4)
```

```
ENDDO                                        && DO WHILE .NOT. EMPTY(_code)

_hdl = FCREATE('NEG_LAB.PRN')
_label = 1
_text = ""
_code = ALLTRIM(printers->reset) + ALLTRIM(printers->ort_port) + ALLTRIM(printers->pri_fix) + ALLTRIM(printers->pitch_10)
_code = _code + ALLTRIM(printers->fnt_lp) + ALLTRIM(printers->lpi_8)
DO WHILE .NOT. EMPTY(_code)
    IF LEFT(_code,1) = '"'
        _text = _text + SUBSTR(_code,2)
        _code = ""
    ELSE
        _text = _text + CHR(VAL(LEFT(_code,3)))
        _code = SUBSTR(_code,4)
    ENDIF                                    && IF LEFT(_code,1) = '"'
ENDDO                                        && DO WHILE .NOT. EMPTY(_code)

fwriteline(_hdl,_text)

SELECT assemble
GOTO TOP

DO WHILE .NOT. EOF()

    AFILL(label_1,SPACE(1))
    AFILL(label_2,SPACE(1))
    AFILL(label_3,SPACE(1))

    SELECT photo
    SEEK STR(assemble->photo_id,5,0)
    IF FOUND()
        SELECT assemble
        label_1[1] = CENTER(assemble->size,25)
        label_1[2] = 'ID#:' + STR(assemble->photo_id,3,0) + SPACE(3) + 'POS: ' + ALLTRIM(assemble->page) + ALLTRIM(assemble->position) + SPACE(3) + _client + SPA
=> CE(1) + IIF(.NOT.EMPTY(DTOC(_eventdate)),DTOC(_eventdate),'')
        _j = mlcount(photo->notes,40,4,.T.)
        FOR _i = 1 TO IIF(_j > 3,3,_j)
            label_1[_i+2] = memoline(photo->notes,40,_i,4,.T.)
        NEXT                                 && FOR _i = 1 TO IIF(_j > 5,5,_j)
        label_1[6] = CENTER(_company,41)
    ELSE
        msg_24('System error in RPT_LAB - 1, photo ' + ALLTRIM(STR(assemble->photo_id)) + ' not found in photo file, press any key',.t.,.t.,.t.)
        SELECT assemble
    ENDIF                                    && IF FOUND()

    SKIP 1
    IF .NOT. EOF()
        SELECT photo
        SEEK STR(assemble->photo_id,5,0)
        IF FOUND()
            SELECT assemble
            label_2[1] = CENTER(assemble->size,25)
            label_2[2] = 'ID#:' + STR(assemble->photo_id,3,0) + SPACE(3) + 'POS: ' + ALLTRIM(assemble->page) + ALLTRIM(assemble->position) + SPACE(3) + _client +
=>  SPACE(1) + IIF(.NOT.EMPTY(DTOC(_eventdate)),DTOC(_eventdate),'')
            _j = mlcount(photo->notes,40,4,.T.)
            FOR _i = 1 TO IIF(_j > 3,3,_j)
                label_2[_i+2] = memoline(photo->notes,40,_i,4,.T.)
            NEXT                             && FOR _i = 1 TO IIF(_j > 5,5,_j)
            label_2[6] = CENTER(_company,41)
        ELSE
            msg_24('System error in RPT_LAB - 2, photo ' + ALLTRIM(STR(assemble->photo_id)) + ' not found in photo file, press any key',.t.,.t.,.t.)
            SELECT assemble
        ENDIF                                && IF FOUND()

        SKIP 1
```

```
        IF .NOT. EOF()
            SELECT photo
            SEEK STR(assemble->photo_id,5,0)
            IF FOUND()
                SELECT assemble
                label_3[1] = CENTER(assemble->size,25)
                label_3[2] = 'ID#:' + STR(assemble->photo_id,3,0) + SPACE(3) + 'POS: ' + ALLTRIM(assemble->page) + ALLTRIM(assemble->position) + SPACE(3) + _clie
=> nt + SPACE(1) + IIF(.NOT.EMPTY(DTOC(_eventdate)),DTOC(_eventdate),'')
                _j = mlcount(photo->notes,40,4,.T.)
                FOR _i = 1 TO IIF(_j > 3,3,_j)
                    label_3[_i+2] = memoline(photo->notes,40,_i,4,.T.)
                NEXT                        && FOR _i = 1 TO IIF(_j > 5,5,_j)
                label_3[6] = CENTER(_company,41)
            ELSE
                msg_24('System error in RPT_LAB - 3, photo ' + ALLTRIM(STR(assemble->photo_id)) + ' not found in photo file, press any key',.t.,.t.,.t.)
                SELECT assemble
            ENDIF                           && IF FOUND()

        ENDIF                               && IF .NOT. EOF()
    ENDIF                                   && IF .NOT. EOF()

    FOR _j = 1 TO 2
        FOR _i = 1 TO 6
            IF _i = 1
                _text = _pitch_10 + _uon + untrim(label_1[_i],25) + _uoff + SPACE(2) + _uon + untrim(label_2[_i],25) + _uoff + SPACE(3) + _uon + untrim(label_3[_
=> i],25) + _uoff
            ELSE
                _text = _pitch_comp + untrim(label_1[_i],41) + SPACE(5) + untrim(label_2[_i],41) + SPACE(5) + untrim(label_3[_i],41)
            ENDIF                               && IF _i = 1 .OR. _i = 2
            fwriteline(_hdl,_text)
        NEXT                                    && FOR _i = 1 TO 6
        _label = _label + 1

        IF _label > 10 .AND. .NOT. EOF()
            _text = CHR(12)
            fwriteline(_hdl,_text)
            _label = 1
        ELSE
            FOR _i = 1 TO 2
                DO rpt_blk WITH _hdl
            NEXT                                    && FOR _i = 1 TO 3
        ENDIF                                   && IF _label > 10 .AND. .NOT. EOF()
    NEXT                                    && FOR _j = 1 TO 2

    SKIP 1
ENDDO                                       && DO WHILE .NOT. EOF()

_text = CHR(12)
fwriteline(_hdl,_text)
FCLOSE(_hdl)

_ok = .F.
DO WHILE .NOT. _ok .AND. lastkey() # 27
    IF prnstatus() = 0
        _ok = .T.
    ELSE
        msg_24('Printer error, fix printer and press enter, esc to abort',.t.,.t.)
    ENDIF                                   && IF prnstatus() = 0
ENDDO                                       && DO WHILE .NOT. _ok .AND. lastkey() # 27
IF _ok .AND. lastkey() # 27
    _hdl = fopen('NEG_LAB.PRN')
    DO WHILE .NOT. FEOF(_hdl)
        lprintline(freadline(_hdl))
    ENDDO                               && DO WHILE .NOT. FEOF(_hdl)
    fclose(_hdl)
ELSE
```

```
        msg_24('Order print aborted, press any key',.t.,.t.,.f.)
    ENDIF                                   && IF _ok .AND. lastkey() # 27

    SELECT printers
    USE

    SELECT assemble
    USE

    SELECT photo
    USE

    ferase('NEG_LAB.PRN')

ENDIF                                       && IF EOF()

@ 24, 0 CLEAR
chdir('..')

RETURN
```

```
*.........................................................................
*
*   Program Name: RPT_ORD.PRG       Copyright: EPIX Corporation
*   Date Created: 08/08/91           Language: Clipper
*   Time Created: 16:00:55             Author: Glenn Holcomb
*
*.........................................................................

PRIVATE _cchoice

_cchoice = 0

DO win WITH 5,28,18,70,.T.,("Reports & Ordering for " + ALLTRIM(_dclient)),.F.

DO WHILE _cchoice # 7

    @  9,32 PROMPT ' 1.  Print Invoice                '
    @ 10,32 PROMPT ' 2.  Print Order Forms            '
    @ 11,32 PROMPT ' 3.  Assembly Instructions By Print '
    @ 12,32 PROMPT ' 4.  Assembly Instructions By Page  '
    @ 13,32 PROMPT ' 5.  Print Negative Labels        '
    @ 14,32 PROMPT ' 6.  Change Invoice Terms         '
    @ 16,32 PROMPT ' E.  Return to Main Menu          '

    MENU TO _cchoice

    _cscreen = savescreen()

    IF lastkey() = 27
        _cchoice = 7
    ENDIF                                   && IF lastkey() = 27

    DO CASE
        case _cchoice = 1
            DO rpt_inv
        case _cchoice = 2
            DO rpt_frm
        case _cchoice = 3
            DO rpt_pht
        case _cchoice = 4
            DO rpt_pag
        case _cchoice = 5
            DO rpt_lab
        case _cchoice = 6
            DO rpt_trm
        case _cchoice = 7
            RETURN
    ENDCASE

    restscreen(_cscreen)

ENDDO

RETURN
```

```
*.........................................................................
*
*   Program Name: RPT_PAG.PRG       Copyright: EPIX Corporation
*   Date Created: 08/26/91           Language: Clipper
*   Time Created: 14:08:04             Author: Glenn Holcomb
*
*.........................................................................

PRIVATE _mfg_code, _client, _eventdate, _hv_shape, _n_shape
PRIVATE _text, _code, _uon, _uoff, _bon, _boff, _hdl, _line, _ppage
PRIVATE _i, _j

USE client INDEX client
SEEK _dclient
_client    = client->client
_eventdate = client->eventdate
_mfg_code  = client->mfg_code
_hv_shape  = client->hv_shape
_n_shape   = client->n_shape
USE

_i = chrcount('/',_hv_shape)
DECLARE hv_shape[_i]
_temp = _hv_shape
FOR _j = 1 TO _i
    hv_shape[_j] = LEFT(_hv_shape,AT('/',_hv_shape)-1)
    _hv_shape = SUBSTR(_hv_shape,AT('/',_hv_shape)+1)
NEXT                                           && FOR _j = 1 TO _i
_hv_shape = _temp

_i = chrcount('/',_n_shape)
DECLARE n_shape[_i]
_temp = _n_shape
FOR _j = 1 TO _i
    n_shape[_j] = LEFT(_n_shape,AT('/',_n_shape)-1)
    _n_shape = SUBSTR(_n_shape,AT('/',_n_shape)+1)
NEXT                                           && FOR _j = 1 TO _i
_n_shape = _temp

RELEASE _temp

USE

chdir(_dclient)

USE mats INDEX mats

SELECT 0
USE book INDEX book, booko
GOTO TOP

IF EOF()
    msg_24('Must create an album before assembly instructions, press any key',.t.,.f.,.f.)
    USE
ELSE
    msg_24('Please wait while compiling data...',.f.,.f.,.f.)

    SELECT 0
    DO CASE
        CASE _mfg_code = 'A'
            USE ..\mfga INDEX ..\mfga ALIAS mfg
        CASE _mfg_code = 'B'
            USE ..\mfgb INDEX ..\mfgb ALIAS mfg
    ENDCASE                                    && DO CASE

    SELECT 0
```

```
USE photo INDEX photo, photoc

SELECT 0
USE ..\printers
SET FILTER TO UPPER(printers->name) # 'SCREEN'
GOTO TOP
DECLARE flds[1], head[1]
_sscreen = savescreen()
msg_24('Use the arrows to scroll, ENTER to Select',.f.,.f.,.t.)
flds[1] = 'NAME'
head[1] = 'Printer'
box(4,10,14,44,"┌┐│┘─└│",color,1,8)
DBEDIT(5,11,13,43,flds,'','',head)
RELEASE flds, head
restscreen(_sscreen)

_uon = ""
_code = ALLTRIM(printers->undl_on)
DO WHILE .NOT. EMPTY(_code)
    _uon = _uon + CHR(VAL(LEFT(_code,3)))
    _code = SUBSTR(_code,4)
ENDDO                                   && DO WHILE .NOT. EMPTY(_code)

_uoff = ""
_code = ALLTRIM(printers->undl_off)
DO WHILE .NOT. EMPTY(_code)
    _uoff = _uoff + CHR(VAL(LEFT(_code,3)))
    _code = SUBSTR(_code,4)
ENDDO                                   && DO WHILE .NOT. EMPTY(_code)

_bon = ""
_code = ALLTRIM(printers->bold_on)
DO WHILE .NOT. EMPTY(_code)
    _bon = _bon + CHR(VAL(LEFT(_code,3)))
    _code = SUBSTR(_code,4)
ENDDO                                   && DO WHILE .NOT. EMPTY(_code)

_boff = ""
_code = ALLTRIM(printers->bold_off)
DO WHILE .NOT. EMPTY(_code)
    _boff = _boff + CHR(VAL(LEFT(_code,3)))
    _code = SUBSTR(_code,4)
ENDDO                                   && DO WHILE .NOT. EMPTY(_code)

_hdl = FCREATE('RPT_PAG.PRN')
_line = 1
_ppage = 1
_text = ""
_code = ALLTRIM(printers->reset) + ALLTRIM(printers->ort_port) + ALLTRIM(printers->pri_fix) + ALLTRIM(printers->pitch_12)
_code = _code + ALLTRIM(printers->fnt_lp) + ALLTRIM(printers->lpi_6)
DO WHILE .NOT. EMPTY(_code)
    IF LEFT(_code,1) = '"'
        _text = _text + SUBSTR(_code,2)
        _code = ""
    ELSE
        _text = _text + CHR(VAL(LEFT(_code,3)))
        _code = SUBSTR(_code,4)
    ENDIF                               && IF LEFT(_code,1) = '"'
ENDDO                                   && DO WHILE .NOT. EMPTY(_code)

SELECT 0
use ..\control
_text = _text + CENTER(ALLTRIM(control->full_name),96)
fwriteline(_hdl, _text)
_line = _line + 1
USE
```

```
DO rpt_blk WITH _hdl, _line

_text = CENTER('ASSEMBLY INSTRUCTIONS BY PAGE FOR ' + ALLTRIM(UPPER(_client)) + ' ' + DTOC(_eventdate),96)
fwriteline(_hdl, text)
_line = _line + 1

FOR _i = 1 TO 2
    DO rpt_blk WITH _hdl, _line
NEXT                                    && FOR _i = 1 TO 2

DO rpg_hed WITH _hdl, _line, _mfg_code

SELECT book
GOTO TOP
SELECT mats
SEEK book->mat_id
SELECT mfg
SEEK book->mat_id
SELECT book

DO WHILE .NOT. EOF()

    DO rpg_lin WITH _hdl, _line, _mfg_code, _ppage

    SELECT book
    SKIP 1
    SELECT mats
    SEEK book->mat_id
    SELECT mfg
    SEEK book->mat_id
    SELECT book

    IF _line >= 59 .AND. .NOT. EOF()
        _text = CHR(12)
        fwriteline(_hdl,_text)
        _line = 1
        _ppage = _ppage + 1

        _text = CENTER('ASSEMBLY INSTRUCTIONS BY PAGE FOR ' + ALLTRIM(UPPER(_client)) + ' ' + DTOC(_eventdate) + ' - PAGE ' + ALLTRIM(STR(_ppage)),96)
        fwriteline(_hdl, text)
        _line = _line + 1

        DO rpt_blk WITH _hdl, _line

        DO rpg_hed WITH _hdl, _line, _mfg_code
    ENDIF                                   && IF _line > 60 .AND. .NOT. EOF()
ENDDO                                       && DO WHILE .NOT. EOF()

_text = CHR(12)
fwriteline(_hdl,_text)
FCLOSE(_hdl)

_ok = .F.
DO WHILE .NOT. _ok .AND. lastkey() # 27
    IF prnstatus() = 0
        _ok = .T.
    ELSE
        msg_24('Printer error, fix printer and press enter, esc to abort',.t.,.t.)
    ENDIF                                   && IF prnstatus() = 0
ENDDO                                       && DO WHILE .NOT. _ok .AND. lastkey() # 27
IF _ok .AND. lastkey() # 27
    _hdl = fopen('RPT_PAG.PRN')
    DO WHILE .NOT. FEOF(_hdl)
        lprintline(freadline(_hdl))
    ENDDO                               && DO WHILE .NOT. FEOF(_hdl)
```

```
        fclose(_hdl)
    ELSE
        msg_24('Assembly by print aborted, press any key',.t.,.t.,.f.)
    ENDIF                                   && IF _ok .AND. lastkey() # 27

    SELECT printers
    USE

    SELECT photo
    USE

    ferase('RPT_PAG.PRN')

ENDIF                                       && IF EOF()

@ 24, 0 CLEAR
chdir('..')

RETURN
```

```
*.........................................................................
*
*    Program Name: RPT_PHT.PRG       Copyright: EPIX Corporation
*    Date Created: 08/26/91           Language: Clipper
*    Time Created: 14:07:53             Author: Glenn Holcomb
*
*.........................................................................

PRIVATE _mfg_code, _client, _eventdate
PRIVATE _text, _code, _uon, _uoff, _bon, _boff, _hdl, _line, _ppage
PRIVATE _i, _j

USE client INDEX client
SEEK _dclient
_client    = client->client
_eventdate = client->eventdate
_mfg_code  = client->mfg_code
USE

chdir(_dclient)

USE mats INDEX mats

SELECT 0
USE ..\assemble
ZAP
INDEX ON photo_id TO ..\assemble

SELECT 0
USE book INDEX book, booko
GOTO TOP

IF EOF()
    msg_24('Must create an album before assembly instructions, press any key',.t.,.f.,.f.)
    USE
ELSE
    msg_24('Please wait while compiling data...',.f.,.f.,.f.)

    IF _mfg_code = 'A'
        SELECT 0
        USE ..\mfga INDEX ..\mfga ALIAS mfg
    ENDIF                                         && IF _mfg_code = 'A'

    SELECT assemble
    APPEND FROM photo FOR used

    SELECT book

    DO WHILE .NOT. EOF()
        SELECT mats
        SEEK book->mat_id
        SELECT assemble
        IF .NOT. EMPTY(book->id_a)
            SEEK book->id_a
            IF FOUND()
                REPLACE assemble->page WITH book->page
                REPLACE assemble->size WITH RIGHT(mats->tsize_a,5)
                IF _mfg_code = 'A'
                    SELECT mfg
                    SEEK book->mat_id
                    SELECT assemble
                    REPLACE assemble->position WITH mfg->pos_a
                ELSE
                    REPLACE assemble->position WITH 'A'
                ENDIF                             && IF _mfg_code = 'A'
            ELSE
```

```
            msg_24('System error in RPT_LAB, photo ' + ALLTRIM(STR(book->id_a)) + ' not found, press any key',.t.,.t.,.t.)
        ENDIF                               && IF FOUND()
    ENDIF                                   && IF .NOT. EMPTY(book->id_a)

    IF .NOT. EMPTY(book->id_b)
        SEEK book->id_b
        IF FOUND()
            REPLACE assemble->page WITH book->page
            REPLACE assemble->size WITH RIGHT(mats->tsize_b,5)
            IF _mfg_code = 'A'
                SELECT mfg
                SEEK book->mat_id
                SELECT assemble
                REPLACE assemble->position WITH mfg->pos_b
            ELSE
                REPLACE assemble->position WITH 'B'
            ENDIF                           && IF _mfg_code = 'A'
        ELSE
            msg_24('System error in RPT_LAB, photo ' + ALLTRIM(STR(book->id_b)) + ' not found, press any key',.t.,.t.,.t.)
        ENDIF                               && IF FOUND()
    ENDIF                                   && IF .NOT. EMPTY(book->id_b)

    IF .NOT. EMPTY(book->id_c)
        SEEK book->id_c
        IF FOUND()
            REPLACE assemble->page WITH book->page
            REPLACE assemble->size WITH RIGHT(mats->tsize_c,5)
            IF _mfg_code = 'A'
                SELECT mfg
                SEEK book->mat_id
                SELECT assemble
                REPLACE assemble->position WITH mfg->pos_c
            ELSE
                REPLACE assemble->position WITH 'C'
            ENDIF                           && IF _mfg_code = 'A'
        ELSE
            msg_24('System error in RPT_LAB, photo ' + ALLTRIM(STR(book->id_c)) + ' not found, press any key',.t.,.t.,.t.)
        ENDIF                               && IF FOUND()
    ENDIF                                   && IF .NOT. EMPTY(book->id_c)

    IF .NOT. EMPTY(book->id_d)
        SEEK book->id_d
        IF FOUND()
            REPLACE assemble->page WITH book->page
            REPLACE assemble->size WITH RIGHT(mats->tsize_d,5)
            IF _mfg_code = 'A'
                SELECT mfg
                SEEK book->mat_id
                SELECT assemble
                REPLACE assemble->position WITH mfg->pos_d
            ELSE
                REPLACE assemble->position WITH 'D'
            ENDIF                           && IF _mfg_code = 'A'
        ELSE
            msg_24('System error in RPT_LAB, photo ' + ALLTRIM(STR(book->id_d)) + ' not found, press any key',.t.,.t.,.t.)
        ENDIF                               && IF FOUND()
    ENDIF                                   && IF .NOT. EMPTY(book->id_a)

    SELECT book
    SKIP 1
ENDDO                                       && DO WHILE .NOT. EOF()

SELECT mats
USE
SELECT book
USE
```

```
IF _mfg_code = 'A'
    SELECT mfg
    USE
ENDIF                                        && IF _mfg_code = 'A'

SELECT 0
USE photo INDEX photo, photoc

SELECT 0
USE ..\printers
SET FILTER TO UPPER(printers->name) # 'SCREEN'
GOTO TOP
DECLARE flds[1], head[1]
_sscreen = savescreen()
msg_24('Use the arrows to scroll, ENTER to Select',.f.,.f.,.t.)
flds[1] = 'NAME'
head[1] = 'Printer'
box(4,10,14,44,"┌─┐│┘─└│",color,1,8)
DBEDIT(5,11,13,43,flds,'','',head)
RELEASE flds, head
restscreen(_sscreen)

_uon = ""
_code = ALLTRIM(printers->undl_on)
DO WHILE .NOT. EMPTY(_code)
    _uon = _uon + CHR(VAL(LEFT(_code,3)))
    _code = SUBSTR(_code,4)
ENDDO                                        && DO WHILE .NOT. EMPTY(_code)

_uoff = ""
_code = ALLTRIM(printers->undl_off)
DO WHILE .NOT. EMPTY(_code)
    _uoff = _uoff + CHR(VAL(LEFT(_code,3)))
    _code = SUBSTR(_code,4)
ENDDO                                        && DO WHILE .NOT. EMPTY(_code)

_bon = ""
_code = ALLTRIM(printers->bold_on)
DO WHILE .NOT. EMPTY(_code)
    _bon = _bon + CHR(VAL(LEFT(_code,3)))
    _code = SUBSTR(_code,4)
ENDDO                                        && DO WHILE .NOT. EMPTY(_code)

_boff = ""
_code = ALLTRIM(printers->bold_off)
DO WHILE .NOT. EMPTY(_code)
    _boff = _boff + CHR(VAL(LEFT(_code,3)))
    _code = SUBSTR(_code,4)
ENDDO                                        && DO WHILE .NOT. EMPTY(_code)

_hdl = FCREATE('RPT_PHT.PRN')
_line = 1
_ppage = 1
_text = ""
_code = ALLTRIM(printers->reset) + ALLTRIM(printers->ort_port) + ALLTRIM(printers->pri_fix) + ALLTRIM(printers->pitch_12)
_code = _code + ALLTRIM(printers->fnt_lp) + ALLTRIM(printers->lpi_6)
DO WHILE .NOT. EMPTY(_code)
    IF LEFT(_code,1) = '"'
        _text = _text + SUBSTR(_code,2)
        _code = ""
    ELSE
        _text = _text + CHR(VAL(LEFT(_code,3)))
        _code = SUBSTR(_code,4)
    ENDIF                                    && IF LEFT(_code,1) = '"'
ENDDO                                        && DO WHILE .NOT. EMPTY(_code)
```

```
SELECT 0
use ..\control
_text = _text + CENTER(ALLTRIM(control->full_name),96)
fwriteline(_hdl,_text)
_line = _line + 1
USE

DO rpt_blk WITH _hdl, _line

_text = CENTER('ASSEMBLY INSTRUCTIONS BY PRINT FOR ' + ALLTRIM(UPPER(_client)) + ' ' + DTOC(_eventdate),96)
fwriteline(_hdl,_text)
_line = _line + 1

FOR _i = 1 TO 2
    DO rpt_blk WITH _hdl, _line
NEXT                                        && FOR _i = 1 TO 2

_text = _uon + ' ID #' + _uoff + SPACE(5) + _uon + ' SIZE' + _uoff  + SPACE(5) + _uon + 'PAGE' + _uoff  + SPACE(5) + _uon + 'POSITION' + _uoff  + SPACE(5) + _uon
=> + 'NOTES' + SPACE(49) + _uoff
fwriteline(_hdl,_text)
_line = _line + 1

SELECT assemble
GOTO TOP

DO WHILE .NOT. EOF()

    SELECT photo
    SEEK STR(assemble->photo_id,5,0)
    IF FOUND()
        SELECT assemble
        _j = mlcount(photo->notes,54,4,.T.)

        IF (_j + _line) >= 59
            _text = CHR(12)
            fwriteline(_hdl,_text)
            _line = 1
            _ppage = _ppage + 1

            _text = CENTER('ASSEMBLY INSTRUCTIONS BY PRINT FOR ' + ALLTRIM(UPPER(_client)) + ' ' + DTOC(_eventdate) + ' - PAGE ' + ALLTRIM(STR(_ppage)),96)
            fwriteline(_hdl,_text)
            _line = _line + 1

            FOR _i = 1 TO 2
                DO rpt_blk WITH _hdl, _line
            NEXT                                && FOR _i = 1 TO 2

            _text = _uon + ' ID #' + _uoff + SPACE(5) + _uon + 'SIZE ' + _uoff  + SPACE(5) + _uon + 'PAGE' + _uoff  + SPACE(5) + _uon + 'POSITION' + _uoff  + SPA
=> CE(5) + _uon + 'NOTES' + SPACE(49) + _uoff
            fwriteline(_hdl,_text)
            _line = _line + 1
        ENDIF                                   && IF _j + _line > 60

        _text = STR(assemble->photo_id,5,0) + SPACE(5) + UNTRIM(assemble->size,5) + SPACE(5) + assemble->page + SPACE(9) + assemble->position + SPACE(8) + memoli
=> ne(photo->notes,54,1,4,.T.)
        fwriteline(_hdl,_text)
        _line = _line + 1

        FOR _i = 2 TO _j
            _text = SPACE(42) + memoline(photo->notes,54,_i,4,.T.)
            fwriteline(_hdl,_text)
            _line = _line + 1
        NEXT                                    && FOR _i = 2 TO _j

    ELSE
        msg_24('System error in RPT_PNT, photo ' + ALLTRIM(STR(assemble->photo_id)) + ' not found in photo file, press any key',.t.,.t.,.t.)
```

```
        SELECT assemble
    ENDIF                                   && IF FOUND()

    SKIP 1

    IF _line >= 59 .AND. .NOT. EOF()
        _text = CHR(12)
        fwriteline(_hdl,_text)
        _line = 1
        _ppage = _ppage + 1

        _text = CENTER('ASSEMBLY INSTRUCTIONS BY PRINT FOR ' + ALLTRIM(UPPER(_client)) + ' ' + DTOC(_eventdate) + ' - PAGE ' + ALLTRIM(STR(_ppage)),96)
        fwriteline(_hdl,_text)
        _line = _line + 1

        DO rpt_blk WITH _hdl, _line

        _text = _uon + ' ID #' + _uoff + SPACE(5) + _uon + ' SIZE' + _uoff  + SPACE(5) + _uon + 'PAGE' + _uoff  + SPACE(5) + _uon + 'POSITION' + _uoff  + SPACE(5
=> ) + _uon + 'NOTES' + SPACE(49) + _uoff
        fwriteline(_hdl,_text)
        _line = _line + 1
    ENDIF                                   && IF _line > 60 .AND. .NOT. EOF()

ENDDO                                       && DO WHILE .NOT. EOF()

_text = CHR(12)
fwriteline(_hdl,_text)
FCLOSE(_hdl)

_ok = .F.
DO WHILE .NOT. _ok .AND. lastkey() # 27
    IF prnstatus() = 0
        _ok = .T.
    ELSE
        msg_24('Printer error, fix printer and press enter, esc to abort',.t.,.t.)
    ENDIF                                   && IF prnstatus() = 0
ENDDO                                       && DO WHILE .NOT. _ok .AND. lastkey() # 27
IF _ok .AND. lastkey() # 27
    _hdl = fopen('RPT_PHT.PRN')
    DO WHILE .NOT. FEOF(_hdl)
        lprintline(freadline(_hdl))
    ENDDO                               && DO WHILE .NOT. FEOF(_hdl)
    fclose(_hdl)
ELSE
    msg_24('Assembly by print aborted, press any key',.t.,.t.,.f.)
ENDIF                                   && IF _ok .AND. lastkey() # 27

SELECT printers
USE

SELECT assemble
USE

SELECT photo
USE

ferase('RPT_PHT.PRN')

ENDIF                                       && IF EOF()

@ 24, 0 CLEAR
chdir('..')

RETURN
```

```
*.......................................................................
*
*   Program Name: RPT_TRM.PRG       Copyright: EPIX Corporation
*   Date Created: 08/13/91           Language: Clipper
*   Time Created: 20:44:45             Author: Glenn Holcomb
*
*.......................................................................

USE control

msg_24('Press CTRL-W to save changes, ESC to abort',.f.,.f.,.t.)
box(03,09,15,70,"┌─┐│┘─└│ ",color,1,8)
csron()
REPLACE control->terms WITH MEMOEDIT(control->terms,04,11,14,68,.T.)
csroff()
msg_24()

USE

RETURN
```

```
*.............................................................................
*
*   Program Name: SHU_MAT.PRG        Copyright: EPIX Corporation
*   Date Created: 06/03/91            Language: Clipper
*   Time Created: 16:33:44              Author: Glenn Holcomb
*
*.............................................................................

PRIVATE _newpage, _no_pics, _i, _j, _temp, _temp2, _temp3, _tval, _prec, _matkey, _mchoice
PRIVATE _rec, _chgpag

_chgpag = .F.

_no_pics = 0
FOR _i = 65 TO 68
    _temp = '_ID_' + CHR(_i)
    _tval = &_temp
    IF .NOT. EMPTY(_tval)
        _no_pics = _no_pics + 1
    ENDIF                                      && IF .NOT. EMPTY(&_temp)
NEXT                                           && FOR _i = 65 TO 68

* Construct matkey for current group *

_matkey = STR(_no_pics,1,0)
DECLARE _type[_no_pics]
SELECT photo
_prec = RECNO()
_j = 1
FOR _i = 65 to 68
    _temp = '_ID_' + CHR(_i)
    _tval = &_temp
    IF .NOT. EMPTY(_tval)
        SEEK STR(_tval,5,0)
        IF FOUND()
            _type[_j] = photo->orient + photo->shape
            _j = _j + 1
        ELSE
            msg_24('System error in SHU_MAT...unable to find photo ' + ALLTRIM(STR(_tval,5,0)) + ', press any key',.t.,.t.,.t.)
        ENDIF                                  && IF FOUND()
    ENDIF                                      && IF .NOT. EMPTY(_tval)
NEXT                                           && FOR _i = 65 to 68
GOTO _prec
SELECT book
ASORT(_type)
FOR _i = 1 TO _no_pics
    _matkey = _matkey + _type[_i]
NEXT                                           && FOR _i = 1 TO _no_pics

RELEASE _type

* Create array of valid mats *
SELECT mats
SET ORDER TO 2

SEEK _matkey

* Count number of matching mats *
_i = 0
DO WHILE _matkey = ALLTRIM(positions + type) .AND. .NOT. EOF()
    _i = _i + 1
    SKIP 1
ENDDO                                          && DO WHILE _matkey = ALLTRIM(positions + type)

* Automatically process for just one matching mat *
IF _i = 1
```

```
    KEYBOARD CHR(13)
ENDIF                                             && IF _i = 1

* Create array of available mats *
DECLARE mat_ids[_i]
SEEK _matkey
FOR _j = 1 TO _i
    mat_ids[_j] = mat_id
    SKIP 1
NEXT                                              && FOR _j = 1 TO _i
SET ORDER TO 1

* Create and load array of correct pictures *
DECLARE mat_pic[(_i * 6)]
SELECT matdiag
FOR _i = 1 TO LEN(mat_ids)
    SEEK mat_ids[_i]
    FOR _j = (6 * (_i-1) + 1) TO (6 * (_i-1) + 6)
        mat_pic[_j] = picture
        SKIP 1
    NEXT                                          && FOR _j = (6 * (_i-1) + 1) TO (6 * (_i-1) + 6)
NEXT                                              && FOR _i = 1 TO LEN(mat_ids)

* Display choice of available mats *

m_trapfeed(1)
m_trapfree()
m_traprest(_mtrap)
m_trapset()
_mchoice = ACHOICE(3,65,19,77,mat_pic)
m_trapfeed(_mousesen)
m_trapfree()
m_traprest(_mtrap)
m_trapset()

* Process mat choice *
IF _mchoice = 0
    msg_24('Mat shuffle aborted...press any key',.t.,.t.,.f.)
ELSE
    _i = IIF(INT(_mchoice/6)=_mchoice/6,_mchoice/6,INT(_mchoice/6) + 1)
    _mat_id = mat_ids[_i]
    SELECT mats
    SEEK _mat_id

    RELEASE mat_pic, mat_ids                      && Recover memory from mat_pic & mat_ids array

    * Get detail of all photo's and types *

    DECLARE photo_id_[_no_pics],type_[_no_pics]
    PRIVATE id_, dbp_, tsize_, size_

    SELECT photo
    _prec = RECNO()
    _j = 1
    FOR _i = 65 to 68
        id_  = '_ID_' + CHR(_i)
        dbp_ = '_DBP_' + CHR(_i)
        IF .NOT. EMPTY(&id_)
            photo_id_[_j] = &id_
            SEEK STR(photo_id_[_j],5,0)
            type_[_j] = photo->orient + photo->shape
            _j = _j + 1
        ENDIF                                     && IF .NOT. EMPTY(&_temp)
        &id_  = 0
        &dbp_ = SPACE(10)
    NEXT                                          && FOR _i = 65 to 68
```

```
FOR _i = 1 TO _no_pics
    FOR _j = 65 TO 68
        id_    = '_id_' + CHR(_j)
        dbp_   = '_dbp_' + CHR(_j)
        tsize_ = 'mats->tsize_' + CHR(_j)
        size_  = ALLTRIM(RIGHT(&tsize_,5))
        IF type_[_i] = LEFT(&tsize_,2) .AND. EMPTY(&id_) .AND. .NOT. EMPTY(photo_id_[_i])
            SEEK STR(photo_id_[_i],5,0)
            &id_ = photo_id_[_i]
            DO CASE
                CASE size_ = '3X5' .OR. size_ = '4X5' .OR. size_ = '5X5'
                    &dbp_ = photo->dbp_small
                    _is_1224 = .F.
                CASE size_ = '5X7' .OR. size_ = '8X8'
                    &dbp_ = photo->dbp_med
                    _is_1224 = .F.
                CASE size_ = '8X10' .OR. size_ = '10X10'
                    &dbp_ = photo->dbp_lge
                    _is_1224 = .F.
                CASE size_ = '12X12'
                    &dbp_ = photo->dbp_1212
                    _is_1224 = .F.
                CASE size_ = '12X24'
                    &dbp_ = photo->dbp_1224
                    _is_1224 = .T.
            ENDCASE                           && DO CASE
            photo_id_[_i] = 0
        ENDIF                                 && IF type_[_i] = LEFT(&tsize_,2) .AND. EMPTY(&id_)
    NEXT                                      && FOR _j = 65 TO 68
NEXT                                          && FOR _i = 1 TO _no_pics

SELECT book

_chgpag = IIF(is_1224 = _is_1224,.F.,.T.)

replace book->mat_id     with _mat_id
replace book->is_1224    with _is_1224
replace book->dbp_a      with _dbp_a
replace book->dbp_b      with _dbp_b
replace book->dbp_c      with _dbp_c
replace book->dbp_d      with _dbp_d
replace book->id_a       with _id_a
replace book->id_b       with _id_b
replace book->id_c       with _id_c
replace book->id_d       with _id_d

_rec = RECNO()
IF _chgpag
    DO pag_rnm
ENDIF                                         && IF _chgpag
GOTO _rec

DO pag_dis WITH .T., _dis_id, _dis_sz

SELECT photo
GOTO _prec
SELECT book

ENDIF                                         && IF _mchoice = 0

SELECT book
SCROLL(3,65,19,77,0)

RETURN
```

```
*..........................................................................
*
*   Program Name: SHU_PHT.PRG        Copyright: EPIX Corporation
*   Date Created: 06/03/91            Language: Clipper
*   Time Created: 15:18:12              Author: Glenn Holcomb
*
*..........................................................................

PARAMETER _select

PRIVATE _fid, _letter, _i, _max, _tid, _tsize, _temp, _rec, _dbp, _size
DECLARE choice_[3]

_letter = CHR(64 + _select)
_fid    =  '_id_' + _letter
_fsize  = 'mats->tsize_' + _letter

IF EMPTY(&_fid)
    msg_24('No photo to shuffle in position ' + _letter + ', press any key',.t.,.t.,.f.)
ELSEIF VAL(mats->positions) = 1
    msg_24('No other photos to shuffle, press any key',.t.,.t.,.f.)
ELSEIF at(LEFT(&_fsize,2),mats->type) = rat(LEFT(&_fsize,2),mats->type)
    msg_24('No other photos of the same orientation & shape to shuffle with, press any key',.t.,.t.,.f.)
ELSE
     _max = 0
    FOR _i = 1 TO 4
        _tid = '_id_' + CHR(64 + _i)
        _tsize = 'mats->tsize_' + CHR(64 + _i)
        IF _i # _select .AND. LEFT(&_fsize,2) = LEFT(&_tsize,2)
            _max = _max + 1
            choice_[_max] = CHR(64 + _i)
        ENDIF                                   && IF _i # _select .AND. LEFT(&_fsize,2) = LEFT(&_tsize,2)
    NEXT                                        && FOR _i = 1 TO 4
    IF _max # 1
        msg_24('Switch ' + _letter + ' with' + CHR(26),.f.,.f.,.t.)
        FOR _i = 1 TO _max
            @ 24, (16 + (5*(_i-1))) PROMPT ' ' + choice_[_i] + ' '
        NEXT                                    && FOR _i = 1 TO _max
        _max = 1
        MENU TO _max
    ENDIF                                       && IF _max = 1
    IF lastkey() # 27
        _tid   = '_id_' + choice_[_max]
        _tsize = 'mats->tsize_' + choice_[_max]
        _temp  = &_tid
        &_tid  = &_fid
        &_fid  = _temp
        SELECT photo
        _rec = RECNO()
        SEEK STR(&_tid,5,0)
        _dbp = '_dbp_' + RIGHT(_tid,1)
        _tsize = 'mats->tsize_' + RIGHT(_tid,1)
        _size  = ALLTRIM(RIGHT(&_tsize,5))
        DO CASE
            CASE _size = '3X5' .OR. _size = '4X5' .OR. _size = '5X5'
                &_dbp = photo->dbp_small
            CASE _size = '5X7' .OR. _size = '8X8'
                &_dbp = photo->dbp_med
        ENDCASE                                 && DO CASE
        SEEK STR(&_fid,5,0)
        _dbp = '_dbp_' + RIGHT(_fid,1)
        _tsize = 'mats->tsize_' + RIGHT(_fid,1)
        _size  = ALLTRIM(RIGHT(&_fsize,5))
        DO CASE
            CASE _size = '3X5' .OR. _size = '4X5' .OR. _size = '5X5'
                &_dbp = photo->dbp_small
```

```
            CASE _size = '5X7' .OR. _size = '8X8'
                 &_dbp = photo->dbp_med
          ENDCASE                                     && DO CASE
          GOTO _rec
          SELECT book
          replace book->dbp_a      with _dbp_a
          replace book->dbp_b      with _dbp_b
          replace book->dbp_c      with _dbp_c
          replace book->dbp_d      with _dbp_d
          replace book->id_a       with _id_a
          replace book->id_b       with _id_b
          replace book->id_c       with _id_c
          replace book->id_d       with _id_d

          DO pag_dis WITH .T., _dis_id, _dis_sz
     ENDIF                                            && IF lastkey() # 27

ENDIF                                                 && IF EMPTY(&_fid)

RETURN
```

```
*.........................................................................
*
*  Program Name: SLD_GOT.PRG       Copyright: EPIX Corporation
*  Date Created: 07/30/91           Language: Clipper
*  Time Created: 18:37:14             Author: Glenn Holcomb
*
*.........................................................................


PRIVATE _rec, _chgimg

_chgimg = .T.

STORE recno() TO _rec
csron()
@ 24, 0 SAY 'Enter Photo ID Number: ' GET _photo_id PICTURE '@K#####' VALID sld_chk(@_photo_id)
READ
csroff()
@ 24, 0 CLEAR
SEEK STR(_photo_id,5,0)
IF .NOT. FOUND()
   msg_24('Requested photo not found, press any key',.T.,.T.)
   GOTO _rec
   _chgimg = .F.
ELSE
   IF _rec = RECNO()
      _chgimg = .F.
   ENDIF                                   && IF _rec = RECNO()
ENDIF                                      && IF .NOT. FOUND()
IF EMPTY(_lorient)
   _chgimg = .T.
ENDIF                                      && IF EMPTY(_lorient)


_photo_id  = photo->photo_id
_orient    = photo->orient
_shape     = photo->shape
_chosen    = photo->chosen
_used      = photo->used
_notes     = photo->notes                  && Memo Field
_dbp_small = photo->dbp_small
_dbp_med   = photo->dbp_med
_dbp_lge   = photo->dbp_lge
_dbp_1212  = photo->dbp_1212
_dbp_1224  = photo->dbp_1224

DO sld_dis WITH _chgimg

RETURN

RETURN

*
*        Author: Glenn Holcomb
*  Date Created: 04/18/91
*  Time Created: 11:50:04
*
*

FUNCTION sld_chk

   PARAMETER _photo_id

   PRIVATE _sscreen
   DECLARE flds[1], head[1]
```

```
IF EMPTY( photo_id)
     SET FILTER TO chosen .AND. .NOT. used
     GOTO TOP
      _sscreen = savescreen()
     flds[1] = 'PHOTO_ID'
     head[1] = 'Photo ID #'
     box(13,19,21,32,"┌─┐│┘─└│",color,1,8)
     DBEDIT(14,20,20,31,flds,'','',head)
      photo_id = photo_id
     SET FILTER TO chosen
     RESTSCREEN(_sscreen)
    ENDIF                                      && IF EMPTY(_page)
RETURN(.T.)
```

```
*.........................................................................
*
*   Program Name: SLD_MOD.PRG       Copyright: EPIX Corporation
*   Date Created: 04/12/91           Language: Clipper
*   Time Created: 17:56:16             Author: Glenn Holcomb
*
*.........................................................................

DO ori_get WITH _orient
@  7,34 SAY SPACE(15)
@  7,34 SAY orient(_orient)

DO sha_get WITH _shape, _orient
@  9,34 SAY SPACE(15)
@  9,34 SAY shape(_shape,_orient)

csron()
READ
csroff()

IF queryb('Save changes to photograph?')
    replace photo->orient     with _orient
    replace photo->shape      with _shape
ELSE
    _orient = photo->orient
    _shape  = photo->shape
ENDIF                                          && IF queryb('Save changes to photograph?')

DO sld_dis WITH .F.

RETURN

*
*         Author: Glenn Holcomb
*   Date Created: 04/12/91
*   Time Created: 17:59:43
*
*

PROCEDURE ori_get

    PARAMETER _orient

    PRIVATE _sscreen, _ochoice

    DO CASE
        CASE (_s3x5 .OR. _s4x5) .AND. _s5x5
            DECLARE aorient[3]
            aorient[1] = 'Horizontal'
            aorient[2] = 'Vertical'
            aorient[3] = 'N/A'
        CASE (_s3x5 .OR. _s4x5) .AND. .NOT. _s5x5
            DECLARE aorient[2]
            aorient[1] = 'Horizontal'
            aorient[2] = 'Vertical'
        CASE .NOT. (_s3x5 .OR. _s4x5) .AND. _s5x5
            DECLARE aorient[1]
            aorient[1] = 'N/A'
    ENDCASE                                    && DO CASE

    _sscreen = savescreen()

    _ochoice = 1

    box(7,40,13,54,"┌─┐│┘─└│ ",color,1,8)
    print(8,42,'Orientation',color)
```

```
print(9,40,"╟" + REPLICATE("─",13) + "╢",color)
_ochoice = ACHOICE(10,42,12,52,aorient,'','',_ochoice)

IF lastkey() # 13
    _ochoice = 1
ENDIF                                          && IF lastkey() = 27

IF lastkey() # 27
    _orient = LEFT(aorient[_ochoice],1)
    _temp  = "** Orientation changed to " + aorient[_ochoice] + " **" + CHR(13) + CHR(10)
    _notes = _temp + LEFT(_notes,(65535 - LEN(_temp)))
    REPLACE notes WITH _notes
ENDIF                                          && IF lastkey() # 27

restscreen(_sscreen)

RETURN

*
*       Author: Glenn Holcomb
*  Date Created: 05/17/91
*  Time Created: 13:27:51
*
*

PROCEDURE sha_get

    PARAMETER _shape, _orient
    PRIVATE _sscreen, _ochoice

    _sscreen = savescreen()

    box(7,40,13,54,"┌─┐│┘─└│ ",color,1,8)
    print(8,42,'   Shape    ',color)
    print(9,40,"╟" + REPLICATE("─",13) + "╢",color)

    IF _orient = 'H' .OR. _orient = 'V'
        _ochoice = ACHOICE(10,42,12,52,hv_shape)
        IF lastkey() # 13
            _ochoice = 1
        ENDIF                                  && IF lastkey() = 27
        _shape = LEFT(hv_shape[_ochoice],1)
    ELSE
        _ochoice = ACHOICE(10,42,12,52,n_shape)
        IF lastkey() # 13
            _ochoice = 1
        ENDIF                                  && IF lastkey() = 27
        _shape = LEFT(n_shape[_ochoice],1)
    ENDIF                                      && IF _orient = 'H' .OR. _orient = 'V'

    restscreen(_sscreen)

RETURN
```

```
*.........................................................................
*
*   Program Name: SLD_NTS.PRG       Copyright: EPIX Corporation
*   Date Created: 04/12/91           Language: Clipper
*   Time Created: 17:37:04             Author: Glenn Holcomb
*
*.........................................................................

box(18,09,22,70,"┌┐│┘─└│ ",color,1,8)
csron()
_notes = MEMOEDIT(_notes,19,11,21,68,.T.)
csroff()

IF queryb('Save changes to notes?')
    REPLACE notes WITH _notes
ELSE
    _notes = notes
ENDIF                                             && IF queryb('Save changes to notes?')

IF .NOT. EMPTY(_notes)
    box(18,09,22,70,"┌┐│┘─└│ ",color,1,8)
    KEYBOARD CHR(23)
    MEMOEDIT(_notes,19,11,21,68,.F.)
ELSE
    _tscreen = savescreen(18,8,23,70,_screen)
    restscreen(18,8,23,70,_tscreen)
ENDIF                                             && IF .NOT. EMPTY(_notes)

RETURN
```

ECV34PRINT

```
*.......................................................................
*
*   Program Name: SLD_NXT.PRG       Copyright: EPIX Corporation
*   Date Created: 04/12/91           Language: Clipper
*   Time Created: 17:13:01             Author: Glenn Holcomb
*
*.......................................................................

PRIVATE _rec, _newrec

_newrec = .T.

STORE recno() TO _rec
SKIP 1
IF EOF()
    GOTO _rec
    msg_24('End of file encountered...press any key',.T.,.F.)
     _newrec = .F.
ENDIF
IF EMPTY(_lorient)
     _newrec = .T.
ENDIF                                           && IF EMPTY(_lorient)

_photo_id  = photo->photo_id
_orient    = photo->orient
_shape     = photo->shape
_chosen    = photo->chosen
_used      = photo->used
_notes     = photo->notes                       && Memo Field
_dbp_1224  = photo->dbp_1224

DO sld_dis WITH _newrec

RETURN
```

```
*.........................................................................
*
*   Program Name: SLD_PRV.PRG       Copyright: EPIX Corporation
*   Date Created: 04/12/91           Language: Clipper
*   Time Created: 17:13:01             Author: Glenn Holcomb
*
*.........................................................................

PRIVATE _rec, _newrec

_newrec = .T.

STORE recno() TO _rec
SKIP -1
IF BOF()
    GOTO _rec
    msg_24('Beginning of file encountered...press any key',.T.,.F.)
     _newrec = .F.
ENDIF
IF EMPTY(_lorient)
     _newrec = .T.
ENDIF                                        && IF EMPTY(_lorient)

_photo_id  = photo->photo_id
_orient    = photo->orient
_shape     = photo->shape
_chosen    = photo->chosen
_used      = photo->used
_notes     = photo->notes                    && Memo Field
_dbp_1224  = photo->dbp_1224

DO sld_dis WITH _newrec

RETURN
```

ICV14PRINT

```
*.........................................................................
*
*   Program Name: SLD_REV.PRG       Copyright: EPIX Corporation
*   Date Created: 04/12/91           Language: Clipper
*   Time Created: 19:13:44             Author: Glenn Holcomb
*
*.........................................................................

PRIVATE _rchoice, _length, _rscreen, _i, _start, _stop, _temprec, _tselect

_tselect = SELECT()
SELECT 0
use ..\control
_length = control->length
use
SELECT (_tselect)

_rscreen = savescreen()

box(15,06,17,74,"┌─┐│┘─└│ ",color,1,8)
@ 2,11 SAY 'All'
@ 2,59 SAY _length PICTURE '99'
@ 2,62 SAY 'seconds'

_rchoice = 8

DO WHILE _rchoice # 7

    SET MESSAGE TO 24

    @ 16,08 PROMPT 'NEXT'          MESSAGE 'Display next image'
    @ 16,14 PROMPT 'PREV'          MESSAGE 'Display previous image'
    @ 16,20 PROMPT 'GOTO'          MESSAGE 'Goto a specific image'
    @ 16,26 PROMPT 'LENGTH'        MESSAGE 'Select length of slide show'
    @ 16,34 PROMPT 'SELECTION'     MESSAGE 'Select which images to display (Chosen, Discarded or Both)'
    @ 16,45 PROMPT 'BEGIN SHOW'    MESSAGE 'Begin timed playback of selected images'
    @ 16,68 PROMPT 'EXIT'          MESSAGE 'Return to Normal Slide Show'

    MENU TO _rchoice
    SET MESSAGE TO
    @ 24,0 CLEAR

    IF lastkey() = 27
        _rchoice = 7
    ENDIF                                 && IF lastkey() = 27

    DO CASE
        CASE _rchoice = 1                 && Next
            DO sld_nxt
        CASE _rchoice = 2                 && Prev
            DO sld_prv
        CASE _rchoice = 3                 && Goto
            DO sld_got
        CASE _rchoice = 4                 && Length
            @ 2,59 GET _length PICTURE '99' RANGE 0, 99
            csron()
            READ
            csroff()
            @ 2,59 SAY _length PICTURE '99'
        CASE _rchoice = 5                 && Selection
            _temprec = RECNO()
            _i = 3
            @ 24, 0 SAY 'Select photos for show: '
            @ 24,31 SAY '/'
            @ 24,41 SAY '/'
            @ 24,25 PROMPT 'Chosen'
```

```
@ 24,32 PROMPT 'Discarded'
@ 24,42 PROMPT 'All'
MENU TO _i
@ 24, 0 CLEAR
IF lastkey() = 27
     i = 3
ENDIF                                 && IF lastkey() = 27
DO CASE
    CASE _i = 1
        SET FILTER TO chosen
        GOTO TOP
        IF EOF()
            msg_24('End of file encountered...selection changed to all...press any key',.T.,.T.)
            SET FILTER TO
            GOTO TOP
            @ 2,11 SAY 'All      '
        ELSE
            @ 2,11 SAY 'Chosen   '
        ENDIF                         && IF EOF()
    CASE _i = 2
        SET FILTER TO .NOT. chosen
        GOTO TOP
        IF EOF()
            msg_24('End of file encountered...selection changed to all...press any key',.T.,.T.)
            SET FILTER TO
            GOTO TOP
            @ 2,11 SAY 'All      '
        ELSE
            @ 2,11 SAY 'Discarded'
        ENDIF                         && IF EOF()
    OTHERWISE
        SET FILTER TO
        GOTO TOP
        @ 2,11 SAY 'All      '
ENDCASE                               && DO CASE
IF _temprec # RECNO()
    _photo_id  = photo->photo_id
    _orient    = photo->orient
    _shape     = photo->shape
    _chosen    = photo->chosen
    _notes     = photo->notes         && Memo Field
    _dbp_1224  = photo->dbp_1224
    DO sld_dis WITH .T.
ELSE
    DO sld_dis WITH .F.
ENDIF                                 && IF _temprec # RECNO()
CASE _rchoice = 6                     && Begin Show
    IF queryb('Begin Timed Slide Show')
        msg_24('Press ESCAPE to interupt automated Slide Show...',.F.,.F.)
        SELECT title
        SET ORDER TO 2
        REPLACE ALL tit_shwn WITH .F.
        SET FILTER TO tit_used
        GOTO TOP
        SELECT photo
        GOTO TOP
        IF title->tit_plc = 0
            SELECT title
            DO WHILE .NOT. tit_shwn .AND. tit_plc < photo->photo_id .AND. .NOT. EOF()
                IF tit_com
                    pp_call('SETDBP ..\TITLE')
                ELSE
                    pp_call('SETDBP TITLE')
                ENDIF                 && IF tit_com
                pp_call('LOADFORM ..\SLDSHWH')
                _lorient = 'T'
```

```
            pp_call('PUTF DBP_A ' + dbp_tit)
            pp_call('SETDBP PHOTO')
            REPLACE tit_shwn WITH .T.
            _start = SECONDS()
            _stop  = _start + _length
            DO WHILE _stop >= SECONDS()
                @ 2,59 SAY _stop - SECONDS() PICTURE '99'
            ENDDO                         && DO WHILE _stop >= SECONDS()
            SKIP 1
        ENDDO                             && DO WHILE .NOT. tit_shwn .AND. tit_plc < _photo_id
        SELECT photo
    ENDIF                                 && IF title->tit_plc = 0

    DO WHILE .NOT. EOF() .AND. lastkey() # 27
        _photo_id  = photo->photo_id
        _orient    = photo->orient
        _shape     = photo->shape
        _chosen    = photo->chosen
        _notes     = photo->notes      && Memo Field
        _dbp_1224  = photo->dbp_1224
        DO sld_dis WITH .T., .T.
        _start = SECONDS()
        _stop  = _start + _length
        DO WHILE _stop >= SECONDS() .AND. lastkey() # 27
            @ 2,59 SAY _stop - SECONDS() PICTURE '99'
            INKEY()
        ENDDO                             && DO WHILE _stop >= SECONDS()
        SKIP 1
        SELECT title
        DO WHILE .NOT. tit_shwn .AND. tit_plc <= _photo_id .AND. .NOT. EOF()
            IF tit_com
                pp_call('SETDBP ..\TITLE')
            ELSE
                pp_call('SETDBP TITLE')
            ENDIF                         && IF tit_com
            pp_call('LOADFORM ..\SLDSHWH')
            _orient = 'T'
            pp_call('PUTF DBP_A ' + dbp_tit)
            pp_call('SETDBP PHOTO')
            REPLACE tit_shwn WITH .T.
            _start = SECONDS()
            _stop  = _start + _length
            DO WHILE _stop >= SECONDS()
                @ 2,59 SAY _stop - SECONDS() PICTURE '99'
            ENDDO                         && DO WHILE _stop >= SECONDS()
            SKIP 1
        ENDDO                             && DO WHILE .NOT. tit_shwn .AND. tit_plc < _photo_id
        SELECT photo
    ENDDO                                 && DO WHILE .NOT. EOF()
    IF lastkey() = 27
        SKIP -1
        KEYBOARD CHR(32)
    ENDIF                                 && IF lastkey() = 27
    msg_24('End of timed slide show...press any key',.T.,.T.)
    @ 2,59 SAY _length PICTURE '99'
    IF EOF()
        GOTO BOTTOM
    ENDIF                                                           && IF EOF()
    _photo_id  = photo->photo_id
    _orient    = photo->orient
    _shape     = photo->shape
    _chosen    = photo->chosen
    _notes     = photo->notes         && Memo Field
    _dbp_1224  = photo->dbp_1224
    DO sld_dis WITH .T., .F.
    SELECT title
```

```
                SET ORDER TO 1
                SET FILTER TO
                GOTO TOP
                SELECT photo
            ENDIF
        CASE _rchoice = 7                    && Return
            SET FILTER TO
            restscreen(_rscreen)
            RETURN
    ENDCASE
ENDDO
```

```
*
*............................................................................
*
*   Program Name: SLD_SHW.PRG        Copyright: EPIX Corporation
*   Date Created: 04/12/91            Language: Clipper
*   Time Created: 15:57:51              Author: Glenn Holcomb
*
*
*............................................................................

PRIVATE _cchoice, _temp, _lorient

DO win WITH 1,06,15,74,.T.,"Slide Show for " + ALLTRIM(_dclient),.T.

* Check for photo dbp file...if it doesn't exist return to main menu *

chdir(_dclient)
IF .NOT. FILE('PHOTO.DBP')
    msg_24('Photos must be input before using Slide Show...press any key',.T.,.T.)
    chdir('..')
    RETURN
ENDIF                                          && IF .NOT. FILE('PHOTO.DBP')

pp_call('SETDBP PHOTO')

USE ..\client INDEX ..\client
SEEK _dclient
_hv_shape  = client->hv_shape
_n_shape   = client->n_shape
_s3x5      = client->s3x5
_s4x5      = client->s4x5
_s5x5      = client->s5x5

_lorient = SPACE(1)

USE

_i = chrcount('/', _hv_shape)
DECLARE hv_shape[_i]
FOR _j = 1 TO _i
    hv_shape[_j] = LEFT(_hv_shape,AT('/', _hv_shape)-1)
    _hv_shape = SUBSTR(_hv_shape,AT('/',_hv_shape)+1)
NEXT                                          && FOR _j = 1 TO _i

_i = chrcount('/', _n_shape)
DECLARE n_shape[_i]
FOR _j = 1 TO _i
    n_shape[_j] = LEFT(_n_shape,AT('/',_n_shape)-1)
    _n_shape = SUBSTR(_n_shape,AT('/',_n_shape)+1)
NEXT                                          && FOR _j = 1 TO _i

USE title INDEX tit_id, tit_plc, tit_dbp
SELECT 0

USE photo INDEX photo, photoc
GOTO TOP
_photo_id  = photo->photo_id
_orient    = photo->orient
_shape     = photo->shape
_chosen    = photo->chosen
_used      = photo->used
_notes     = photo->notes                     && Memo Field
_dbp_1224  = photo->dbp_1224

_cchoice = 99

DO sld_dis WITH .F.
```

```
SET KEY -1 TO toggle
SET KEY -9 TO sld_sta

mousetrap(0,ASC('N'))
mousetrap(1,ASC('P'))

DO WHILE _cchoice # 10

    SET MESSAGE TO 24

    @ 14,08 PROMPT 'NEXT'      MESSAGE 'Display next image'
    @ 14,14 PROMPT 'PREV'      MESSAGE 'Display previous image'
    @ 14,20 PROMPT 'GOTO'      MESSAGE 'Goto a specific image'
    @ 14,26 PROMPT 'MOD'       MESSAGE 'Change orientation and shape of current image'
    @ 14,31 PROMPT 'ACCEPT'    MESSAGE 'Keep picture for use in the Album'
    @ 14,39 PROMPT 'DISCARD'   MESSAGE 'Discard picture for use in the Album'
    @ 14,48 PROMPT 'START'     MESSAGE 'Start timed slide show'
    @ 14,55 PROMPT 'NOTES'     MESSAGE 'Add notes to the current image'
    @ 14,62 PROMPT 'TITLE'     MESSAGE 'Insert a title for use in the slide show'
    @ 14,69 PROMPT 'EXIT'      MESSAGE 'Return to Album Arrange Main Menu'

    MENU TO _cchoice
    SET MESSAGE TO
    @ 24,0 CLEAR

    IF lastkey() = 27
        _cchoice = 10
    ENDIF                               && IF lastkey() = 27

    DO CASE
        CASE _cchoice = 1               && Next
            DO sld_nxt
        CASE _cchoice = 2               && Prev
            DO sld_prv
        CASE _cchoice = 3               && Goto
            DO sld_got
        CASE _cchoice = 4               && Modify
            SET KEY -1 TO
            SET KEY -9 TO
            IF _used
                msg_24('Photo in album page or group, cannot be modified, press any key',.t.,.f.,.f.)
            ELSE
                DO sld_mod
            ENDIF                       && IF _used
            SET KEY -1 TO toggle
            SET KEY -9 TO sld_sta
        CASE _cchoice = 5               && Accept
            _chosen    = .T.
            REPLACE photo->chosen WITH _chosen
            DO sld_dis WITH .F.
        CASE _cchoice = 6               && Discard
            IF .NOT. _used
                _chosen    = .F.
                REPLACE photo->chosen WITH _chosen
                DO sld_dis WITH .F.
            ELSE
                BEEP()
            ENDIF                       && IF .NOT. _used
        CASE _cchoice = 7               && Start
            SET KEY -1 TO
            SET KEY -9 TO
            m_traprest(_mtrap)
            DO sld_rev
            DO sld_dis WITH .F.
            mousetrap(0,ASC('N'))
            mousetrap(1,ASC('P'))
```

```
            SET KEY -1 TO toggle
            SET KEY -9 TO sld_sta
        CASE _cchoice = 8                           && Notes
            SET KEY -1 TO
            SET KEY -9 TO
            DO sld_nts
            SET KEY -1 TO toggle
            SET KEY -9 TO sld_sta
        CASE _cchoice = 9                           && Titles
            SET KEY -1 TO
            SET KEY -9 TO
            m_traprest(_mtrap)
            DO sld_tit
            SET KEY -1 TO toggle
            SET KEY -9 TO sld_sta
            mousetrap(0,ASC('N'))
            mousetrap(1,ASC('P'))
            mousetrap(2,-1)
        CASE _cchoice = 10
            SET KEY -1 TO
            SET KEY -9 TO
            m_traprest(_mtrap)
            USE
            SELECT title
            USE
            pp_call('CLR')
            chdir('..')
            RETURN
    ENDCASE
ENDDO

*
*      Author: Glenn Holcomb
*   Date Created: 04/12/91
*   Time Created: 17:08:15
*

PROCEDURE sld_dis

    PARAMETER _shw_img, _cr

    DO CASE
        CASE pcount() = 1
            _cr = .F.
        CASE pcount() = 0
            _shw_img = .T.
            _cr = .F.
    ENDCASE                                         && DO CASE

    @  5,20 SAY '   Photo ID: '
    @  7,20 SAY 'Orientation: '
    @  9,20 SAY '  Mat Shape: '
    @ 11,20 SAY '     Chosen? '

    @  5,34 SAY _photo_id
    @  7,34 SAY orient(_orient)
    @  9,34 SAY SPACE(12)
    @  9,34 SAY shape(_shape,_orient)
    @ 11,34 SAY IIF(_chosen,'Yes','No ')

    IF .NOT. EMPTY(_notes)
        box(18,09,22,70,"┌┐│┘─└│ ",color,1,8)
        KEYBOARD CHR(23)
        MEMOEDIT(_notes,19,11,21,68,.F.)
    ELSE
        _tscreen = savescreen(18,8,23,70,_screen)
```

```
        restscreen(18,8,23,70,_tscreen)
    ENDIF                                       && IF .NOT. EMPTY(_notes)

    IF _shw_img .AND. .NOT. EMPTY(_dbp_1224)
        msg_24('Please wait while displaying photo...',.F.,.F.,.F.)
        IF _lorient # _orient
            pp_call('CLRF DBP_A')
            DO CASE
                CASE _orient = 'H'
                    pp_call('LOADFORM ..\SLDSHWH')
                CASE _orient = 'V'
                    pp_call('LOADFORM ..\SLDSHWV')
                CASE _orient = 'N'
                    pp_call('LOADFORM ..\SLDSHWN')
                OTHERWISE
                    pp_call('LOADFORM ..\SLDSHWH')
            ENDCASE                             && DO CASE
             lorient = _orient
        ENDIF                                   && IF _lorient # _orient
        pp_call('PUTF DBP_A ' + _dbp_1224)
        pp_call('PUTF ID_A ' + STR(_photo_id,5,0))
        @ 24, 0 CLEAR
    ENDIF                                       && IF _shw_img

RETURN                                          && PROCEDURE sld_dis
```

```
*.........................................................................
*
*   Program Name: SLD_STA.PRG       Copyright: EPIX Corporation
*   Date Created: 07/31/91           Language: Clipper
*   Time Created: 15:09:08             Author: Glenn Holcomb
*
*.........................................................................

PRIVATE used_, unused_, chosen_, unchosen_, _tscreen, _rec

used_ = 0
unused_ = 0
chosen_ = 0
unchosen_ = 0

_rec = RECNO()
_tscreen = savescreen()

msg_24('Please wait while calculating statistics...',.f.,.f.,.f.)

GOTO TOP
DO WHILE .NOT. EOF()
    IF chosen
        chosen_ = chosen_ + 1
        IF used
            used_ = used_ + 1
        ELSE
            unused_ = unused_ + 1
        ENDIF                               && IF used
    ELSE
        unchosen_ = unchosen_ + 1
    ENDIF                                   && IF chosen
    SKIP 1
ENDDO                                       && DO WHILE .NOT. EOF()

GOTO _rec

DO win WITH 08,28,17,52,.T.,("Photo Statistics"),.F.

@ 12,31 SAY '# CHOSEN   :'
@ 13,31 SAY '# DISCARDED:'
@ 14,31 SAY '# USED     :'
@ 15,31 SAY '# REMAINING:'

@ 12,44 SAY STR(chosen_,5,0)
@ 13,44 SAY STR(unchosen_,5,0)
@ 14,44 SAY STR(used_,5,0)
@ 15,44 SAY STR(unused_,5,0)

@ 24, 0 CLEAR
msg_24('Press any key to continue',.t.,.f.,.f.)

restscreen(_tscreen)
KEYBOARD " "

RETURN
```

```
*.........................................................................
*
*    Program Name: SLD_TIT.PRG        Copyright: EPIX Corporation
*    Date Created: 05/28/91            Language: Clipper
*    Time Created: 13:48:16              Author: Glenn Holcomb
*
*.........................................................................

PRIVATE _tchoice, _tscreen1, _tscreen2

IF .NOT. FILE('TITLE.DBP') .AND. .NOT. FILE('..\TITLE.DBP')
    msg_24('No titles screens are available, press any key',.t.,.t.,.t.)
ELSE

    _tscreen1 = savescreen()

    DECLARE flds[3], head[3]

    SELECT title
    flds[1] = 'TIT_ID'
    flds[2] = 'TIT_DESC'
    flds[3] = 'TIT_PLC'
    head[1] = 'ID'
    head[2] = 'Description'
    head[3] = 'Page'

    box(15,09,17,71,"┌─┐│┘─└│ ",color,1,8)

    _tchoice = 5

    DO WHILE _tchoice # 4

        @ 16,12 PROMPT 'VIEW'
        @ 16,18 PROMPT 'PLACE'
        @ 16,25 PROMPT 'REMOVE'
        @ 16,65 PROMPT 'EXIT'

        MENU TO _tchoice

        IF lastkey() = 27
            _tchoice = 4
        ENDIF                              && IF lastkey() = 27

        _tscreen2 = savescreen()
        DO CASE
            CASE _tchoice = 1                 && View
                GOTO TOP
                msg_24('Please select title to view...',.f.,.f.,.f.)
                box(4,12,17,68,"┌─┐│┘─└│ ",color,1,8)
                DBEDIT(5,13,16,67,flds,'','',head)
                @ 24, 0 CLEAR
                IF LASTKEY() = 13
                    IF tit_com
                        pp_call('SETDBP ..\TITLE')
                    ELSE
                        pp_call('SETDBP TITLE')
                    ENDIF                      && IF tit_com
                    pp_call('LOADFORM ..\SLDSHWH')
                    msg_24('Please wait while displaying title...',.F.,.F.,.F.)
                    pp_call('PUTF DBP_A ' + dbp_tit)
                    msg_24('Press any key to clear title...',.t.,.f.,.f.)
                    restscreen(_tscreen2)
                    pp_call('SETDBP PHOTO')
                    DO sld_dis WITH .T.
                    pp_call('SETDBP TITLE')
                ENDIF                          && IF LASTKEY() = 27
```

```
CASE _tchoice = 2                        && Place
    SET FILTER TO .NOT. tit_used
    GOTO TOP
    IF EOF()
        msg_24('All titles are used, press any key',.t.,.f.,.f.)
    ELSE
        msg_24('Please select title to place...',.f.,.f.,.f.)
        box(4,12,17,68,"┌┐│┘─└│ ",color,1,8)
        DBEDIT(5,13,16,67,flds,'','',head)
        @ 24, 0 CLEAR
        IF lastkey() # 13
            msg_24('Title placement has been aborted, press any key',.t.,.t.,.f.)
        ELSE
            IF _photo_id = 1
                IF queryb('Place this title before 1st photo?')
                    REPLACE tit_plc WITH 0
                ELSE
                    REPLACE tit_plc WITH _photo_id
                ENDIF                    && IF queryb('Place this title before 1st page?')
            ELSE
                REPLACE tit_plc WITH _photo_id
            ENDIF                        && IF _photo_id = 1 .AND. queryb('Place this title before 1st page?')
            REPLACE tit_used WITH .T.
        ENDIF                            && IF lastkey() = 27
    ENDIF                                && IF EOF()
    SET FILTER TO
CASE _tchoice = 3                        && Remove
    SET FILTER TO tit_used
    GOTO TOP
    IF EOF()
        msg_24('All titles are removed, press any key',.t.,.f.,.f.)
    ELSE
        msg_24('Please select title to remove...',.f.,.f.,.f.)
        box(4,12,17,68,"┌┐│┘─└│ ",color,1,8)
        DBEDIT(5,13,16,67,flds,'','',head)
        @ 24, 0 CLEAR
        IF lastkey() # 13
        msg_24('Remove title has been aborted, press any key',.t.,.t.,.f.)
        ELSE
            REPLACE tit_plc WITH 0
            REPLACE tit_used WITH .F.
        ENDIF                            && IF lastkey() = 27
    ENDIF                                && IF EOF()
    SET FILTER TO
CASE _tchoice = 4                        && Selection
    restscreen(_tscreen1)
    pp_call('SETDBP PHOTO')
    SELECT photo
    RETURN
ENDCASE
restscreen(_tscreen2)
ENDDO
ENDIF                                    && IF .NOT. FILE('TITLE.DBP')
```

```
*.........................................................................
*
*   Program Name: SPC_ASS.PRG       Copyright: EPIX Corporation
*   Date Created: 07/16/91           Language: Clipper
*   Time Created: 18:57:03             Author: Glenn Holcomb
*
*.........................................................................

PARAMETER _new_id

PRIVATE _newpage, _no_pics, _i, _j, _temp, _temp2, _temp3, _tval, _prec, _matkey, _mchoice
PRIVATE _rec, _chgpag

_page      = book->page
_mat_id    = book->mat_id
_is_T224   = book->is_T224
_matched   = book->matched
_dbp_a     = book->dbp_a
_dbp_b     = book->dbp_b
_dbp_c     = book->dbp_c
_dbp_d     = book->dbp_d
_id_a      = book->id_a
_id_b      = book->id_b
_id_c      = book->id_c
_id_d      = book->id_d

_chgpag = .F.

_no_pics = 0
FOR _i = 65 TO 68
    _temp = '_ID_' + CHR(_i)
    _tval = &_temp
    IF .NOT. EMPTY(_tval)
        _no_pics = _no_pics + 1
    ENDIF                                  && IF .NOT. EMPTY(&_temp)
NEXT                                       && FOR _i = 65 TO 68

* Construct matkey for current group *

_matkey = STR(_no_pics,1,0)
DECLARE _type[_no_pics]
SELECT photo
_prec = RECNO()
_j = 1
FOR _i = 65 to 68
    _temp = '_ID_' + CHR(_i)
    _tval = &_temp
    IF .NOT. EMPTY(_tval)
        SEEK STR(_tval,5,0)
        IF FOUND()
            _type[_j] = photo->orient + photo->shape
            _j = _j + 1
        ELSE
            msg_24('System error in SPC_ASS...unable to find photo ' + ALLTRIM(STR(_tval,5,0)) + ', press any key',.t.,.t.,.t.)
        ENDIF                              && IF FOUND()
    ENDIF                                  && IF .NOT. EMPTY(_tval)
NEXT                                       && FOR _i = 65 to 68
GOTO _prec
SELECT book
ASORT(_type)
FOR _i = 1 TO _no_pics
    _matkey = _matkey + _type[_i]
NEXT                                       && FOR _i = 1 TO _no_pics

RELEASE _type
```

```
SELECT nmats
SET FILTER TO nmats->prime
SET ORDER TO 2
SEEK _matkey
SET ORDER TO 1

IF .NOT. FOUND()
    _new_id = 'GROUP'
ELSE
    _mat_id = nmats->mat_id
    _new_id = nmats->mat_id

    * Get detail of all photo's and types *

    DECLARE photo_id_[_no_pics],type_[_no_pics]
    PRIVATE id_, dbp_, tsize_, size_

    SELECT photo
    _prec = RECNO()
    _j = 1
    FOR _i = 65 to 68
        id_  = '_ID_' + CHR(_i)
        dbp_ = '_DBP_' + CHR(_i)
        IF .NOT. EMPTY(&id_)
            photo_id_[_j] = &id_
            SEEK STR(photo_id_[_j],5,0)
            type_[_j] = photo->orient + photo->shape
            _j = _j + 1
        ENDIF                                   && IF .NOT. EMPTY(&_temp)
        &id_  = 0
        &dbp_ = SPACE(10)
    NEXT                                        && FOR _i = 65 to 68

    FOR _i = 1 TO _no_pics
        FOR _j = 65 TO 68
            id_    = '_id_' + CHR(_j)
            dbp_   = '_dbp_' + CHR(_j)
            tsize_ = 'nmats->tsize_' + CHR(_j)
            size_  = ALLTRIM(RIGHT(&tsize_,5))
            IF type_[_i] = LEFT(&tsize_,2) .AND. EMPTY(&id_) .AND. .NOT. EMPTY(photo_id_[_i])
                SEEK STR(photo_id_[_i],5,0)
                &id_ = photo_id_[_i]
                DO CASE
                    CASE size_ = '3X5' .OR. size_ = '4X5' .OR. size_ = '5X5'
                        &dbp_ = photo->dbp_small
                        _is_T224 = .F.
                    CASE size_ = '5X7' .OR. size_ = '8X8'
                        &dbp_ = photo->dbp_med
                        _is_T224 = .F.
                    CASE size_ = '8X10' .OR. size_ = '10X10'
                        &dbp_ = photo->dbp_lge
                        _is_T224 = .F.
                    CASE size_ = '12X12'
                        &dbp_ = photo->dbp_1212
                        _is_T224 = .F.
                    CASE size_ = '12X24'
                        &dbp_ = photo->dbp_1224
                        _is_T224 = .T.
                ENDCASE                         && DO CASE
                photo_id_[_i] = 0
            ENDIF                               && IF type_[_i] = LEFT(&tsize_,2) .AND. EMPTY(&id_)
        NEXT                                    && FOR _j = 65 TO 68
    NEXT                                        && FOR _i = 1 TO _no_pics

    SELECT book
```

```
    _chgpag = IIF(is_1224 = _is_1224,.F.,.T.)

    replace book->mat_id      with _mat_id
    replace book->is_1224     with _is_1224
    replace book->dbp_a       with _dbp_a
    replace book->dbp_b       with _dbp_b
    replace book->dbp_c       with _dbp_c
    replace book->dbp_d       with _dbp_d
    replace book->id_a        with _id_a
    replace book->id_b        with _id_b
    replace book->id_c        with _id_c
    replace book->id_d        with _id_d

    IF _chgpag
       _rec = RECNO()
       DO pag_rnm
       GOTO _rec
    ENDIF                                      && IF _chgpag

    SELECT photo
    GOTO _prec
    SELECT book

ENDIF                                          && IF .NOT. FOUND()

SELECT nmats
SET FILTER TO
GOTO TOP

SELECT book

RETURN
```

```
*.........................................................................
*
*   Program Name: SPC_COL.PRG        Copyright: EPIX Corporation
*   Date Created: 07/16/91            Language: Clipper
*   Time Created: 17:35:56              Author: Glenn Holcomb
*
*.........................................................................

IF .NOT. (ALLTRIM(_mat_color) $ mfg->mat_color)
   msg_24('Current mat color is not offered for new manufacturer, select new color',.f.,.f.,.f.)
   * Get new mat color *
   _sscreen = savescreen()
   _new_color = mfg->mat_color
   _i = chrcount('/',_new_color)
   DECLARE mcolor[15]
   FOR _j = 1 TO _i
      mcolor[_j] = LEFT(_new_color,AT('/',_new_color)-1)
      _new_color = SUBSTR(_new_color,AT('/',_new_color)+1)
   NEXT                                         && FOR _j = 1 TO _i
   box(11,32,14+_i,44,"┌─┐│┘─└│ ",color,1,8)
   print(12,34,'Mat Color',color)
   print(13,32,"├" + REPLICATE("─",11) + "┤",color)
   _i = ACHOICE(14,34,14+_i-1,42,mcolor)
   IF lastkey() # 13
      _i = 1
   ENDIF                                        && IF lastkey() = 27
   _new_color = mcolor[_i]
   RELEASE mcolor
   restscreen(_sscreen)
ELSE
   _new_color = _mat_color
ENDIF                                           && IF .NOT. (ALLTRIM(_mat_color) $ mfg->mat_color)

RETURN
```

```
*.....................................................................
*
*    Program Name: SPC_DEL.PRG       Copyright: EPIX Corporation
*    Date Created: 09/06/91           Language: Clipper
*    Time Created: 14:14:05             Author: Glenn Holcomb
*
*.....................................................................

IF queryb('Are you sure you want delete the entire album?',.f.,.t.)
    IF queryb('Deletion album, are you sure??',.f.,.t.)
        SELECT photo
        GOTO TOP
        DO WHILE .NOT. EOF()
            REPLACE photo->used WITH .F.
            SKIP 1
        ENDDO                                && DO WHILE .NOT. EOF()
        GOTO TOP
        _cphoto = photo->photo_id
        DO pht_dis WITH .F.

        SELECT book
        ZAP
        DO pag_sca
        SCROLL(3,2,10,62,0)
        _cpage = _page
    ENDIF                                    && IF queryb('Deletion album, are you sure??',.f.,.t.)
ENDIF                                        && IF queryb('Are you sure you want delete the entire album?',.f.,.t.)
```

```
*.............................................................................
*
*   Program Name: SPC_HVS.PRG       Copyright: EPIX Corporation
*   Date Created: 07/16/91           Language: Clipper
*   Time Created: 17:37:56             Author: Glenn Holcomb
*
*.............................................................................

PARAMETER _change, _nhv_shape
PRIVATE _rec, _ok, _fail, _i

_ok = .T.

IF .NOT. EMPTY(ALLTRIM(_hv_shape))
    FOR _i = 1 TO LEN(m->hv_shape)
        IF .NOT. (ALLTRIM(hv_shape[_i]) $ mfg->hv_shape)
            msg_24(ALLTRIM(hv_shape[_i]) + ' not offered by new manufacturer, checking photos',.f.,.f.,.f.)
            SELECT photo
            SET FILTER TO
            _rec = RECNO()
            GOTO TOP
            DO WHILE .NOT. EOF() .AND. _ok
                IF photo->shape = LEFT(hv_shape[_i],1)
                    _ok = .F.
                    _fail = ALLTRIM(STR(photo->photo_id,5,0))
                ENDIF                        && IF photo->shape = LEFT(hv_shape[_i],1)
                SKIP 1
            ENDDO                            && DO WHILE .NOT. EOF() .AND. _ok
            SET FILTER TO photo->chosen
            GOTO _rec
            SELECT mfg
            msg_24()
            IF .NOT. _ok
                _change = .F.
                msg_24('Photo number ' + _fail + ' is ' + hv_shape[_i],.t.,.t.,.f.)
            ENDIF                            && IF .NOT. _ok
        ELSE
            _nhv_shape = _nhv_shape + ALLTRIM(hv_shape[_i]) + '/'
        ENDIF                                && IF .NOT. (ALLTRIM(hv_shape[_i]) $ mfg->hv_shape)
    NEXT                                     && FOR _i = 1 TO LEN(hv_shape)
ENDIF                                        && IF LEN(hv_shape) >= T

RETURN
```

```
*.........................................................................
*
*   Program Name: SPC_MAT.PRG       Copyright: EPIX Corporation
*   Date Created: 07/16/91           Language: Clipper
*   Time Created: 18:12:57             Author: Glenn Holcomb
*
*.........................................................................

PARAMETER _new_mfg
PRIVATE _mfg, _size, _i, _field, _sel

msg_24('Please wait while preparing mat selection...',.f.,.f.,.f.)

_sel = SELECT()
_size = SPACE(0)

_mfg = 'MFG_' + _new_mfg

fcopy('..\mats.dbf','nmats.dbf')
fcopy('..\mats.ntx','nmats.ntx')
fcopy('..\matkey.ntx','nmatkey.ntx')

SELECT 0
USE nmats INDEX nmats, nmatkey

DO WHILE .NOT. EOF()
    IF VAL(mat_id) # 0
        IF .NOT. &_mfg
            DELETE
        ELSE
            FOR _i = 1 TO 4
                _field = 'TSIZE_' + CHR(_i + 64)
                IF .NOT. EMPTY(&_field)
                    _size = IIF(_i = 1, '_s', _size + '.AND. _s')
                    _size = _size + ALLTRIM(RIGHT(&_field,5))
                ENDIF                           && IF .NOT. EMPTY(&_field)
            NEXT                                && FOR _i = 1 TO 4
            IF .NOT. &_size
                DELETE
            ENDIF                               && IF .NOT. &_size
        ENDIF                                   && IF .NOT. &_mfg
    ENDIF                                       && IF VAL(mat_id) # 0
    SKIP 1
ENDDO                                           && DO WHILE .NOT. EOF()

PACK

USE

SELECT (_sel)

@ 24, 0 CLEAR

RETURN
```

```
*.............................................................................
*
*   Program Name: SPC_MFG.PRG        Copyright: EPIX Corporation
*   Date Created: 07/16/91            Language: Clipper
*   Time Created: 13:00:21              Author: Glenn Holcomb
*
*.............................................................................

PRIVATE _sscreen, _tsel, _new_mfg, _text, _i, _j, _change, _new_color
PRIVATE _nhv_shape, _nn_shape, _rec, _old_id, _new_id
DECLARE temp[1]

_change = .T.
_nhv_shape = SPACE(0)
_nn_shape  = SPACE(0)
_old_id    = SPACE(5)
_new_id    = SPACE(5)

_tsel = SELECT()
SELECT 0

_sscreen = savescreen()
msg_24('Select new album manufacturer and press enter, press ESC to cancel',.f.,.f.,.f.)
USE ..\mfg
SET FILTER TO .NOT. (mfg->mfg_code = _mfg_code)
GOTO TOP
temp[1] = 'MFG_NAME'
box(9,32,17,77,"┌─┐│┘─└│ ",color,1,8)
DBEDIT(10,33,16,76,temp,'','',"Manufacturer's Name")
_new_mfg = mfg->mfg_code
RELEASE temp
use
msg_24()
SELECT (_tsel)
restscreen(_sscreen)

IF lastkey() = 27
    msg_24('Album Manufacturer Change aborted, press any key',.T.,.T.)
ELSE
    SELECT 0
    USE ..\mfg
    LOCATE FOR mfg->mfg_code = _mfg_code
    _text = 'Changing ' + ALLTRIM(mfg->mfg_name) + ' to '
    GOTO TOP
    LOCATE FOR mfg->mfg_code = _new_mfg
    _text = _text + ALLTRIM(mfg->mfg_name)
    msg_24(_text,.f.,.f.,.t.)
    IF queryb('Confirm album manufacturer change?',.f.)
        @ 24, 0 CLEAR
        DO spc_col
        DO spc_hvs WITH _change, _nhv_shape
        DO spc_nsh WITH _change, _nn_shape
        SELECT (_tsel)
        IF _change
            DO spc_mat WITH _new_mfg
            SELECT 0
            USE nmats INDEX nmats, nmatkey
            SELECT book
            _rec = RECNO()
            GOTO TOP
            DO WHILE .NOT. EOF()
                msg_24('Please wait while changing page ' + ALLTRIM(book->page) + '...',.f.,.f.,.f.)
                _old_id = book->mat_id
                SELECT nmats
                SEEK _old_id
                IF FOUND()
```

```
                _new_id = _old_id
            ELSE
                DO spc_ass WITH _new_id
            ENDIF                              && IF FOUND()
            SELECT book
            REPLACE book->mat_id WITH _new_id
            SKIP 1
        ENDDO                                  && DO WHILE .NOT. EOF()
        GOTO _rec
        SELECT mats
        USE
        ferase('mats.dbf')
        ferase('mats.ntx')
        ferase('matkey.ntx')
        SELECT nmats
        USE
        frename('nmats.dbf','mats.dbf')
        frename('nmats.ntx','mats.ntx')
        frename('nmatkey.ntx','matkey.ntx')
        USE mats INDEX mats, matkey
        SELECT 0
        USE ..\client INDEX ..\client
        SEEK _dclient
        _hv_shape  = _nhv_shape
        _n_shape   = _nn_shape
        _mfg_code  = _new_mfg
        _mat_color = _new_color
        replace client->mfg_code   with _mfg_code
        replace client->mat_color  with _mat_color
        replace client->hv_shape   with _hv_shape
        replace client->n_shape    with _n_shape
        USE
        SELECT book
        DO pag_dis WITH .F.
        SELECT(_tsel)
        msg_24()
    ELSE
        msg_24([Manufacturers cannot be changed, press any key],.t.,.t.,.f.)
    ENDIF                                      && IF _change
  ELSE
    @ 24, 0 CLEAR
    msg_24('Album Manufacturer Change aborted, press any key',.T.,.T.)
  ENDIF                                        && IF queryb('Change album manufacturers?',.f.)
ENDIF                                          && IF lastkey() = 27

RETURN
```

IC/14PRINT

```
*.............................................................................
*
*   Program Name: SPC_NSH.PRG       Copyright: EPIX Corporation
*   Date Created: 07/16/91           Language: Clipper
*   Time Created: 18:10:26             Author: Glenn Holcomb
*
*.............................................................................

PARAMETER _change, _nn_shape
PRIVATE _rec, _ok, _fail, _i

_ok = .T.

IF .NOT. EMPTY(ALLTRIM(_n_shape))
    FOR _i = 1 TO LEN(m->n_shape)
        IF .NOT. (ALLTRIM(n_shape[_i]) $ mfg->n_shape)
            msg_24(ALLTRIM(n_shape[_i]) + ' not offered by new manufacturer, checking photos',.f.,.f.,.f.)
            SELECT photo
            SET FILTER TO
            _rec = RECNO()
            GOTO TOP
            DO WHILE .NOT. EOF() .AND. _ok
                IF photo->shape = LEFT(n_shape[_i],1)
                    _ok = .F.
                    _fail = ALLTRIM(STR(photo->photo_id,5,0))
                ENDIF                           && IF photo->shape = LEFT(n_shape[_i],1)
                SKIP 1
            ENDDO                               && DO WHILE .NOT. EOF() .AND. _ok
            SET FILTER TO photo->chosen
            GOTO _rec
            SELECT mfg
            msg_24()
            IF .NOT. _ok
                _change = .F.
                msg_24('Photo number ' + _fail + ' is ' + n_shape[_i],.t.,.t.,.f.)
            ENDIF                               && IF .NOT. _ok
        ELSE
            _nn_shape = _nn_shape + ALLTRIM(n_shape[_i]) + '/'
        ENDIF                                   && IF .NOT. (ALLTRIM(n_shape[_i]) $ mfg->n_shape)
    NEXT                                        && FOR _i = 1 TO LEN(n_shape)
ENDIF                                           && IF LEN(n_shape) >= 1

RETURN
```

```
*.............................................................................
*
*   Program Name: SPC_STA.PRG       Copyright: EPIX Corporation
*   Date Created: 07/31/91           Language: Clipper
*   Time Created: 16:03:59             Author: Glenn Holcomb
*
*.............................................................................

PRIVATE used_, unused_, chosen_, unchosen_, _tscreen, _rec, _sel

_sel = SELECT()

SELECT photo
SET FILTER TO

used_ = 0
unused_ = 0
chosen_ = 0
unchosen_ = 0

_rec = RECNO()
_tscreen = savescreen()

msg_24('Please wait while calculating statistics...',.f.,.f.,.f.)

GOTO TOP
DO WHILE .NOT. EOF()
    IF chosen
        chosen_ = chosen_ + 1
        IF used
            used_ = used_ + 1
        ELSE
            unused_ = unused_ + 1
        ENDIF                                  && IF used
    ELSE
        unchosen_ = unchosen_ + 1
    ENDIF                                      && IF chosen
    SKIP 1
ENDDO                                          && DO WHILE .NOT. EOF()

SET FILTER TO chosen
GOTO _rec

DO win WITH 08,28,17,52,.T.,("Photo Statistics"),.F.

@ 12,31 SAY '# CHOSEN   :'
@ 13,31 SAY '# DISCARDED:'
@ 14,31 SAY '# USED     :'
@ 15,31 SAY '# REMAINING:'

@ 12,44 SAY STR(chosen_,5,0)
@ 13,44 SAY STR(unchosen_,5,0)
@ 14,44 SAY STR(used_,5,0)
@ 15,44 SAY STR(unused_,5,0)

@ 24, 0 CLEAR
msg_24('Press any key to continue',.t.,.f.,.f.)

restscreen(_tscreen)
KEYBOARD " "

SELECT (_sel)

RETURN
```

```
*.........................................................................
*
*   Program Name: SYS_DEF.PRG        Copyright: EPIX Corporation
*   Date Created: 04/05/91            Language: Clipper
*   Time Created: 14:44:00              Author: Glenn Holcomb
*
*.........................................................................

PRIVATE _i, _j, _sscreen, _hv_shapes, _n_shapes, _c_shapes
DECLARE temp[1]
_i = 10

DO win WITH 2,9,19,73,.T.,"System Defaults",.F.

USE control
_mfg_code  = control->mfg_code
_mat_color = control->mat_color
_hv_shape  = control->hv_shape
_n_shape   = control->n_shape
_s3x5      = control->s3x5
_s4x5      = control->s4x5
_s5x5      = control->s5x5
_s5x7      = control->s5x7
_s8x8      = control->s8x8
_s8x10     = control->s8x10
_s10x10    = control->s10x10
_s12x12    = control->s12x12
_s12x24    = control->s12x24

USE mfg
LOCATE FOR _mfg_code = mfg->mfg_code
_mfg_name  = mfg->mfg_name
USE

@  6,11 SAY ' Album Manufacturer: '
@  8,11 SAY '         Page Color: '
@ 10,11 SAY 'Print Sizes Offered: '
@ 10,42 SAY 'Shapes Offered: '

@  6,32 SAY _mfg_name
@  8,32 SAY _mat_color

IF _s3x5
   @ _i,32 SAY '  3x5'
     _i = _i + 1
ENDIF
IF _s4x5
   @ _i,32 SAY '  4x5'
     _i = _i + 1
ENDIF
IF _s5x5
   @ _i,32 SAY '  5x5'
     _i = _i + 1
ENDIF
IF _s5x7
   @ _i,32 SAY '  5x7'
     _i = _i + 1
ENDIF
IF _s8x8
   @ _i,32 SAY '  8x8'
     _i = _i + 1
ENDIF
IF _s8x10
   @ _i,32 SAY ' 8x10'
     _i = _i + 1
ENDIF
```

```
IF _s10x10
    @ _i,32 SAY '10x10'
    _i = _i + 1
ENDIF
IF _s12x12
    @ _i,32 SAY '12x12'
    _i = _i + 1
ENDIF
IF _s12x24
    @ _i,32 SAY '12x24'
    _i = _i + 1
ENDIF

_c_shapes = ALLTRIM(_hv_shape) + ALLTRIM(_n_shape)
_i = chrcount('/',_c_shapes)
DECLARE cshape[_i]
FOR _j = 1 TO _i
    cshape[_j] = LEFT(_c_shapes,AT('/',_c_shapes)-1)
    _c_shapes = SUBSTR(_c_shapes,AT('/',_c_shapes)+1)
NEXT                                            && FOR _j = 1 TO _i
FOR _j = 10 TO (9 + _i)
    @ _j, 58 SAY cshape[_j-9]
NEXT                                            && FOR _j = 10 TO (10 + _i)

IF query24('Make changes to system defaults')

    * Get new manufacturer *

    _sscreen = savescreen()
    USE mfg
    temp[1] = 'MFG_NAME'
    box(6,32,14,77,"┌─┐│┘─└│ ",color,1,8)
    DBEDIT(7,33,13,76,temp,'','',"Manufacturer's Name")
    _mfg_code = mfg->mfg_code
    _mfg_name = mfg->mfg_name
    _mat_color = mfg->mat_color
    _hv_shape  = mfg->hv_shape
    _n_shape   = mfg->n_shape
    restscreen(_sscreen)
    @  6,32 SAY SPACE(40)
    @  6,32 SAY _mfg_name

    * Get new mat color *
    _sscreen = savescreen()
    _i = chrcount('/',_mat_color)
    DECLARE mcolor[15]
    FOR _j = 1 TO _i
        mcolor[_j] = LEFT(_mat_color,AT('/',_mat_color)-1)
        _mat_color = SUBSTR(_mat_color,AT('/',_mat_color)+1)
    NEXT                                        && FOR _j = 1 TO _i
    box(8,32,11+_i,44,"┌─┐│┘─└│ ",color,1,8)
    print(9,34,'Mat Color',color)
    print(10,32,"├" + REPLICATE("─",11) + "┤",color)
    _i = ACHOICE(11,34,11+_i-1,42,mcolor)
    IF lastkey() # 13
        _i = 1
    ENDIF                                       && IF lastkey() = 27
    _mat_color = mcolor[_i]
    restscreen(_sscreen)
    @  8,32 SAY SPACE(20)
    @  8,32 SAY _mat_color

    * Get base print size *
    _sscreen = savescreen()
    _i = 1
    box(10,18,14,66,"┌─┐│┘─└│ ",color,1,8)
```

```
@ 12, 21 SAY 'Select default base print size: '
@ 12, 53 PROMPT '3x5'
@ 12, 57 PROMPT '4x5'
@ 12, 61 PROMPT '5x5'
MENU TO _i
IF _i = 3                                       && Base size is 5x5
    _s3x5      = .F.
    _s4x5      = .F.
    _s5x5      = .T.
    _s5x7      = .F.
    _s8x8      = queryb('Offer 8x8 prints?')
    _s8x10     = .F.
    _s10x10    = queryb('Offer 10x10 prints?')
    _s12x12    = queryb('Offer 12x12 prints?')
    _s12x24    = .F.
ELSE
    IF _i = 1                                   && Base size is 3x5
        _s3x5      = .T.
        _s4x5      = .F.
        _s5x5      = .F.
        _s5x7      = queryb('Offer 5x7 prints?')
        _s8x8      = .F.
        _s8x10     = queryb('Offer 8x10 prints?')
        _s10x10    = .F.
        _s12x12    = queryb('Offer 12x12 prints?')
        _s12x24    = queryb('Offer 12x24 prints?')
    ELSE                                        && Base size is 4x5
        _s3x5      = .F.
        _s4x5      = .T.
        _s5x5      = .F.
        _s5x7      = queryb('Offer 5x7 prints?')
        _s8x8      = .F.
        _s8x10     = queryb('Offer 8x10 prints?')
        _s10x10    = .F.
        _s12x12    = queryb('Offer 12x12 prints?')
        _s12x24    = queryb('Offer 12x24 prints?')
    ENDIF                                       && IF _i = 1                && Base size is 3x5
    IF queryb('Also offer 5x5 base print size?')
        _s5x5      = .T.
        _s8x8      = queryb('Offer 8x8 prints?')
        _s10x10    = queryb('Offer 10x10 prints?')
        IF .NOT. _s12x12
            _s12x12    = queryb('Offer 12x12 prints?')
        ENDIF                                   && IF .NOT. _s12x12
    ENDIF                                       && IF queryb('Also offer 5x5 base print size?')
ENDIF                                           && IF _i = 3                && Base size is 5x5
restscreen(_sscreen)
box(10,32,18,72,"        ",color)
_i = 10
IF _s3x5
    @ _i,32 SAY '  3x5'
    _i = _i + 1
ENDIF
IF _s4x5
    @ _i,32 SAY '  4x5'
    _i = _i + 1
ENDIF
IF _s5x5
    @ _i,32 SAY '  5x5'
    _i = _i + 1
ENDIF
IF _s5x7
    @ _i,32 SAY '  5x7'
    _i = _i + 1
ENDIF
IF _s8x8
```

```
        @ _i,32 SAY '  8x8'
          _i = _i + 1
    ENDIF
    IF _s8x10
        @ _i,32 SAY ' 8x10'
          _i = _i + 1
    ENDIF
    IF _s10x10
        @ _i,32 SAY '10x10'
          _i = _i + 1
    ENDIF
    IF _s12x12
        @ _i,32 SAY '12x12'
          _i = _i + 1
    ENDIF
    IF _s12x24
        @ _i,32 SAY '12x24'
          _i = _i + 1
    ENDIF

    @ 10,42 SAY 'Shapes Offered: '

    * Get valid shapes for rectangles *

    IF _s3x5 .OR. _s4x5
        _c_shapes = ALLTRIM(_hv_shape)
        _i = chrcount('/',_c_shapes)
        DECLARE cshape[_i]
        FOR _j = 1 TO _i
            cshape[_j] = LEFT(_c_shapes,AT('/',_c_shapes)-1)
            _c_shapes = SUBSTR(_c_shapes,AT('/',_c_shapes)+1)
        NEXT                                && FOR _j = 1 TO _i
        _hv_shape = cshape[1] + '/'
        FOR _j = 2 TO _i
            IF queryb('Offer ' + cshape[_j] + ' prints?')
                _hv_shape = _hv_shape + cshape[_j] + '/'
            ENDIF                           && IF queryb('Offer ' + cshape[_j] + ' prints?')
        NEXT                                && FOR _j = 2 TO _i
    ELSE
        _hv_shape = SPACE(0)
    ENDIF

    * Get valid shapes for squares *

    IF _s5x5
        _c_shapes = ALLTRIM(_n_shape)
        _i = chrcount('/',_c_shapes)
        DECLARE cshape[_i]
        FOR _j = 1 TO _i
            cshape[_j] = LEFT(_c_shapes,AT('/',_c_shapes)-1)
            _c_shapes = SUBSTR(_c_shapes,AT('/',_c_shapes)+1)
        NEXT                                && FOR _j = 1 TO _i
        _n_shape = cshape[1] + '/'
        FOR _j = 2 TO _i
            IF queryb('Offer ' + cshape[_j] + ' prints?')
                _n_shape = _n_shape + cshape[_j] + '/'
            ENDIF                           && IF queryb('Offer ' + cshape[_j] + ' prints?')
        NEXT                                && FOR _j = 2 TO _i
    ELSE
        _n_shape = SPACE(0)
    ENDIF

    * Display all available shapes *

    _c_shapes = ALLTRIM(_hv_shape) + ALLTRIM(_n_shape)
    _i = chrcount('/',_c_shapes)
```

```
    DECLARE cshape[_i]
    FOR _j = 1 TO _i
        cshape[_j] = LEFT(_c_shapes,AT('/',_c_shapes)-1)
        _c_shapes = SUBSTR(_c_shapes,AT('/',_c_shapes)+1)
    NEXT                                      && FOR _j = 1 TO _i
    FOR _j = 10 TO (9 + _i)
        @ _j, 58 SAY cshape[_j-9]
    NEXT                                      && FOR _j = 10 TO (10 + _i)

    IF query24('Accept changes to system defaults')
        USE control
        replace control->mfg_code   with _mfg_code
        replace control->mat_color  with _mat_color
        replace control->hv_shape   with _hv_shape
        replace control->n_shape    with _n_shape
        replace control->s3x5       with _s3x5
        replace control->s4x5       with _s4x5
        replace control->s5x5       with _s5x5
        replace control->s5x7       with _s5x7
        replace control->s8x8       with _s8x8
        replace control->s8x10      with _s8x10
        replace control->s10x10     with _s10x10
        replace control->s12x12     with _s12x12
        replace control->s12x24     with _s12x24
    ENDIF                                     && IF query24('Accept changes to system defaults')

ENDIF

RETURN
```

IC/14PRINT

```
*.........................................................................
*
*    Program Name: SYS_PRC.PRG        Copyright: EPIX Corporation
*    Date Created: 08/06/91            Language: Clipper
*    Time Created: 12:38:22              Author: Glenn Holcomb
*
*.........................................................................

DECLARE flds[2], head[2], flds2[4], head2[4]
PRIVATE _pscreen, _pchoice, _dchoice, _dscreen

flds[1] = 'ITEM'
flds[2] = 'DESC'
head[1] = 'Item ID'
head[2] = 'Description'

flds2[1] = 'ITEM'
flds2[2] = 'PRICE'
flds2[3] = 'TIER_LOW'
flds2[4] = 'TIER_HIGH'
head2[1] = 'Item ID'
head2[2] = 'Price'
head2[3] = 'Low;Tier'
head2[4] = 'High;Tier'

store 0                to _order
store space(10)        to _item
store space(45)        to _desc
store 0                to _price
store 0                to _disc
store space(1)         to _disc_typ
store 0                to _tier_low
store 0                to _tier_high
store 0                to _quantity
store 0                to _p_qty
store 0                to _p_price

USE price INDEX price, pricet, priceo

DO win WITH 3,9,19,71,.T.,"System Price File",.T.

_pchoice = 99

DO WHILE _pchoice # 9

    SET MESSAGE TO 24

    @ 18,12 PROMPT 'PRINT $' MESSAGE 'Modify Per Print Pricing'
    @ 18,21 PROMPT 'ADD'     MESSAGE 'Add a Line Item'
    @ 18,26 PROMPT 'CHANGE'  MESSAGE 'Change a Line Item'
    @ 18,34 PROMPT 'DEL'     MESSAGE 'Delete a Line Item'
    @ 18,39 PROMPT 'DISC'    MESSAGE 'Change the Total Discount'
    @ 18,45 PROMPT 'SHIP'    MESSAGE 'Change the Shipping & Handling'
    @ 18,51 PROMPT 'TAX'     MESSAGE 'Change the Sales Tax Rate'
    @ 18,56 PROMPT 'DEPOSIT' MESSAGE 'Change the Deposit Amount'
    @ 18,65 PROMPT 'EXIT'    MESSAGE 'Return to the System Utilities Menu'

    MENU TO _pchoice

    SET MESSAGE TO
    @ 24,0 CLEAR

    IF LASTKEY() = 27
        _pchoice = 9
    ENDIF                                                 && IF LASTKEY() = 27
```

```
DO CASE
    CASE _pchoice = 1                                          && PRC - PRINT $
        _dscreen = savescreen()
        _dchoice = 99
        scroll(18,12,18,70,0)

        DO WHILE _dchoice # 6

            SET MESSAGE TO 24

            @ 18,12 PROMPT 'CHANGE PRICE' MESSAGE 'Modify Per Print Pricing'
            @ 18,26 PROMPT 'ADD'          MESSAGE 'Add a Pricing Tier'
            @ 18,31 PROMPT 'DELETE'       MESSAGE 'Delete a Pricing Tier'
            @ 18,39 PROMPT 'DISCOUNT'     MESSAGE 'Change Print Discount'
            @ 18,49 PROMPT 'PRESOLD'      MESSAGE 'Change Print Discount'
            @ 18,65 PROMPT 'EXIT'         MESSAGE 'Return to the System Price Menu'

            MENU TO _dchoice

            SET MESSAGE TO
            @ 24,0 CLEAR

            IF LASTKEY() = 27
                _dchoice = 6
            ENDIF                                              && IF LASTKEY() = 27

            DO CASE
                CASE _dchoice = 1                              && P $ - Change Price
                    _pscreen = savescreen()

                    @ 24, 0 SAY 'Please select the item to change price and press ENTER...'
                    SET ORDER TO 2
                    SET FILTER TO order <= 10
                    GOTO TOP
                    box(4,17,17,63,"┌┐│┘─└│ ",color,1,8)
                    DBEDIT(5,18,16,62,flds2,'','',head2)
                    restscreen(_pscreen)
                    IF lastkey() = 13
                        DO prc_sca
                        @  7,12 SAY '     Item ID:  ' + _item
                        @  9,12 SAY 'Description:  ' + _desc
                        @ 11,12 SAY '       Price: ' GET _price PICTURE '#####.##'
                        @ 13,12 SAY '    Low Tier:  ' + STR(_tier_low,5,0)
                        @ 15,12 SAY '   High Tier:  ' + STR(_tier_high,5,0)

                        msg_24('Enter new price and press enter, escape to abort',.f.,.f.,.f.)
                        csron()
                        READ
                        csroff()
                        msg_24()
                        SET ORDER TO 1
                        IF lastkey() = 13
                            replace price->price      with _price
                        ENDIF                                  && IF lastkey() =13
                        scroll(6,12,16,70,0)
                    ENDIF                                      && IF lastkey() = 13
                    @ 24, 0 CLEAR

                    SET FILTER TO
                    scroll(6,12,16,70,0)
                CASE _dchoice = 2                              && P $ - Add
                    _pscreen = savescreen()

                    SET ORDER TO 3
                    SET FILTER TO order <=10 .AND. tier_low = 0
                    GOTO TOP
```

```
msg_24('Please select the print size to add a tier after and press ENTER...',.f.,.f.,.f.)
box(4,7,17,73,"┌─┐│┘─└│ ",color,1,8)
DBEDIT(5,8,16,72,!ds,'','',head)
restscreen(_pscreen)

IF lastkey() = 13
     _item = item
     SET ORDER TO 2
     SET FILTER TO _item = item .AND. tier_high = 99999
     GOTO TOP
     DO prc_sca
     _tier_low = _tier_low + 1
     @  7,12 SAY '     Item ID:  ' + _item
     @  9,12 SAY 'Description:  ' + _desc
     @ 11,12 SAY '      Price: ' GET _price PICTURE '#####.##'
     @ 13,12 SAY '   Low Tier: ' GET _tier_low PICTURE '#####' RANGE (tier_low + 1), _tier_high - 1
     @ 15,12 SAY '  High Tier:  ' + STR(_tier_high,5,0)

     msg_24('Enter price & low tier value and press enter, escape to abort',.f.,.f.,.f.)
     csron()
     READ
     csroff()
     msg_24()
     SET ORDER TO 1
     IF lastkey() = 13
          replace price->tier_high  with _tier_low
          APPEND BLANK
          replace price->order      with _order
          replace price->item       with _item
          replace price->desc       with _desc
          replace price->price      with _price
          replace price->tier_low   with _tier_low
          replace price->tier_high  with _tier_high
     ENDIF                                                    && IF lastkey() =13
     scroll(6,12,16,70,0)
ENDIF                                                         && IF lastkey() = 13

SET ORDER TO 0

@ 24, 0 CLEAR

SET FILTER TO
scroll(6,12,16,70,0)
CASE _dchoice = 3                                             && P $ - Del
_pscreen = savescreen()

SET ORDER TO 3
SET FILTER TO order <=10 .AND. tier_low # 0
GOTO TOP
IF EOF()
     msg_24('No tiers to delete, press any key',.t.,.f.,.f.)
ELSE
     _pscreen = savescreen()
     @ 24, 0 SAY 'Please select the tier to deleted and press ENTER...'
     SET ORDER TO 2
     box(4,17,17,63,"┌─┐│┘─└│ ",color,1,8)
     DBEDIT(5,18,16,62,!ds2,'','',head2)
     restscreen(_pscreen)
     SET FILTER TO
     IF lastkey() = 13
          IF queryb('Delete selected tier?')
               DO prc_sca
               DELETE
               SKIP -1
               REPLACE tier_high WITH _tier_high
               PACK
```

```
            ENDIF                                          && IF queryb('Delete selected tier?')
        ENDIF                                              && IF lastkey() = 13
        @ 24, 0 CLEAR

        SET FILTER TO
        scroll(6,12,16,70,0)
    ENDIF                                                  && IF EOF()

    @ 24, 0 CLEAR

    SET FILTER TO
    scroll(6,12,16,70,0)
CASE _dchoice = 4                                          && P $ - Discount
    _pscreen = savescreen()

    @ 24, 0 SAY 'Please select the print size to change discount for and press ENTER...'

    SET ORDER TO 3
    SET FILTER TO order <=10 .AND. tier_low = 0
    GOTO TOP
    box(4,7,17,73,"┌─┐│┘─└│",color,1,8)
    DBEDIT(5,8,16,72,flds,'','',head)
    restscreen(_pscreen)
    SET ORDER TO 0

    @ 24, 0 CLEAR

    IF LASTKEY() = 13
        DO prc_sca
        @  7,12 SAY '     Item ID:  ' + _item
        @  9,12 SAY 'Description:   ' + _desc
        IF queryb('Discount as a Percentage?')
            _disc_typ = 'P'
            @ 11,12 SAY '    Discount: ' GET _disc PICTURE '#####.##%' RANGE 0,100
        ELSE
            _disc_typ = 'D'
            @ 11,12 SAY '    Discount: ' GET _disc PICTURE '#####.##'
        ENDIF                                              && IF queryb('Discount as a Percentage?')
        msg_24('Enter discount amount and press enter, escape to abort',.f.,.f.,.f.)
        csron()
        READ
        csroff()
        msg_24()
        IF lastkey() # 27
            REPLACE disc WITH _disc, disc_typ WITH _disc_typ
        ENDIF                                              && IF lastkey() # 27
    ENDIF                                                  && IF LASTKEY() = 13
    SET FILTER TO
    scroll(6,12,16,70,0)
CASE _dchoice = 5                                          && P $ - PRESOLD
    _pscreen = savescreen()

    @ 24, 0 SAY 'Please select the item to change presold information and press ENTER...'
    SET ORDER TO 3
    SET FILTER TO order <=10 .AND. tier_low = 0
    GOTO TOP
    box(4,7,17,73,"┌─┐│┘─└│",color,1,8)
    DBEDIT(5,8,16,72,flds,'','',head)
    restscreen(_pscreen)
    SET ORDER TO 0
    IF lastkey() = 13
        DO prc_sca
        @  7,12 SAY '      Item ID:  ' + _item
        @  9,12 SAY '  Description:  ' + _desc
        @ 11,12 SAY 'Presold Price: ' GET _p_price PICTURE '#####.##'
        @ 13,12 SAY '  Presold Qty: ' GET _p_qty   PICTURE '#####'
```

```
                    msg_24('Enter new presold information and press enter, escape to abort',.f.,.f.,.f.)
                    csron()
                    READ
                    csroff()
                    msg_24()
                    SET ORDER TO 1
                    IF lastkey() = 13
                        replace price->p_qty      with _p_qty
                        replace price->p_price    with _p_price
                    ENDIF                                         && IF lastkey() =13
                    scroll(6,12,16,70,0)
                ENDIF                                             && IF lastkey() = 13
                @ 24, 0 CLEAR

                SET FILTER TO
                scroll(6,12,16,70,0)
            CASE _dchoice = 6                                     && P $ - EXIT
        ENDCASE                                                   && DO CASE
    ENDDO                                                         && DO WHILE _dchoice # 6
    restscreen(_dscreen)
CASE _pchoice = 2                                                 && PRC - ADD
    store 20              to _order
    store space(10)       to _item
    store space(45)       to _desc
    store 0               to _price
    store 1               to _quantity
    @  7,12 SAY '     Sort #: ' GET _order PICTURE '##' RANGE 20, 89
    @  7,40 SAY 'Item ID: '     GET _item PICTURE '!!!!!!!!!!' VALID .NOT. EMPTY(_item)
    @  9,12 SAY 'Description: ' GET _desc VALID .NOT. EMPTY(_desc)
    @ 11,12 SAY '      Price: ' GET _price PICTURE '#####.##'
    @ 11,40 SAY '    Qty: '     GET _quantity PICTURE '#####' VALID _quantity >= 1

    msg_24('Enter data for all fields and press enter, escape to abort',.f.,.f.,.f.)
    csron()
    READ
    csroff()
    msg_24()
    IF lastkey() =13
        APPEND BLANK
        replace price->order      with _order
        replace price->item       with _item
        replace price->desc       with _desc
        replace price->price      with _price
        replace price->quantity   with _quantity
    ENDIF                                                         && IF lastkey() =13

    scroll(6,12,16,70,0)
CASE _pchoice = 3                                                 && PRC - CHANGE
    _pscreen = savescreen()

    @ 24, 0 SAY 'Please select the line item to change and press ENTER...'

    SET FILTER TO order >= 11 .AND. order <= 89
    GOTO TOP
    IF EOF()
        msg_24('No line items to change, press any key',.t.,.f.,.f.)
    ELSE
        box(4,7,17,73,"┌─┐│┘─└│ ",color,1,8)
        DBEDIT(5,8,16,72,flds,'','',head)
        restscreen(_pscreen)

        @ 24, 0 CLEAR

        IF LASTKEY() = 13
            DO prc_sca
```

```
        @  7,12 SAY '     Sort #: ' GET _order PICTURE '##' RANGE 20, 89
        @  7,40 SAY 'Item ID: '     GET _item PICTURE '!!!!!!!!!!' VALID .NOT. EMPTY(_item)
        @  9,12 SAY 'Description: ' GET _desc VALID .NOT. EMPTY(_desc)
        @ 11,12 SAY '       Price: ' GET _price PICTURE '#####.##'
        @ 11,40 SAY '    Qty: '     GET _quantity PICTURE '#####' VALID _quantity >= 1

        msg_24('Change data for all fields and press enter, escape to abort',.f.,.f.,.f.)
        csron()
        READ
        csroff()
        msg_24()
        IF lastkey() = 13
            replace price->order      with _order
            replace price->item       with _item
            replace price->desc       with _desc
            replace price->price      with _price
            replace price->quantity   with _quantity
        ENDIF                                                  && IF lastkey() =13
      ENDIF                                                    && IF LASTKEY() = 13
    ENDIF                                                      && IF EOF()

    SET FILTER TO

    scroll(6,12,16,70,0)

CASE _pchoice = 4                                              && PRC - DEL

    _pscreen = savescreen()

    @ 24, 0 SAY 'Please select the line item to delete and press ENTER...'

    SET FILTER TO order >= 11 .AND. order <= 89
    GOTO TOP
    IF EOF()
        msg_24('No line items to delete, press any key',.t.,.f.,.f.)
    ELSE
        box(4,7,17,73,"┌┐│┘─└│ ",color,1,8)
        DBEDIT(5,8,16,72,flds,'','',head)
        restscreen(_pscreen)

        @ 24, 0 CLEAR

        IF LASTKEY() = 13
            IF queryb('Delete item ' + ALLTRIM(item) + '?')
                DELETE
                PACK
            ENDIF                                              && IF queryb('Delete item ' + ALLTRIM(item) + '?')
        ENDIF                                                  && IF LASTKEY() = 13
    ENDIF                                                      && IF EOF()

    SET FILTER TO

    scroll(6,12,16,70,0)

CASE _pchoice = 5                                              && PRC - DISC
    SEEK 'DISCOUNT'
    DO prc_sca
    @  7,12 SAY '     Item ID:  ' + _item
    @  9,12 SAY 'Description:  ' + _desc
    IF queryb('Discount as a Percentage?')
        disc_typ = 'P'
        @ 11,12 SAY '    Discount: ' GET _disc PICTURE '#####.##%' RANGE 0,100
    ELSE
        disc_typ = 'D'
        @ 11,12 SAY '    Discount: ' GET _disc PICTURE '#####.##'
```

```
            ENDIF                                                      && IF queryb('Discount as a Percentage?')
            msg_24('Enter discount amount and press enter, escape to abort',.f.,.f.,.f.)
            csron()
            READ
            csroff()
            msg_24()
            IF lastkey() # 27
                REPLACE disc WITH _disc, disc_typ WITH _disc_typ
            ENDIF                                                      && IF lastkey() # 27
            scroll(6,12,16,70,0)
        CASE _pchoice = 6                                              && PRC - SHIP
            SEEK 'SHIPPING'
            DO prc_sca
            @  7,12 SAY '     Item ID:  ' + _item
            @  9,12 SAY 'Description:  ' + _desc
            @ 11,12 SAY '    Shipping: ' GET _price PICTURE '#####.##'
            msg_24('Enter shipping & handling amount and press enter, escape to abort',.f.,.f.,.f.)
            csron()
            READ
            csroff()
            msg_24()
            IF lastkey() # 27
                REPLACE price WITH _price
            ENDIF                                                      && IF lastkey() # 27
            scroll(6,12,16,70,0)
        CASE _pchoice = 7                                              && PRC - TAX
            SEEK 'SALESTAX'
            DO prc_sca
            @  7,12 SAY '     Item ID:  ' + _item
            @  9,12 SAY 'Description:  ' + _desc
            @ 11,12 SAY '    Tax Rate: ' GET _disc PICTURE '#####.##%' RANGE 0,100
            msg_24('Enter tax rate and press enter, escape to abort',.f.,.f.,.f.)
            csron()
            READ
            csroff()
            msg_24()
            IF lastkey() # 27
                REPLACE disc WITH _disc
            ENDIF                                                      && IF lastkey() # 27
            scroll(6,12,16,70,0)
        CASE _pchoice = 8                                              && PRC - DEPOSIT
            SEEK 'DEPOSIT'
            DO prc_sca
            @  7,12 SAY '     Item ID:  ' + _item
            @  9,12 SAY 'Description:  ' + _desc
            @ 11,12 SAY '     Deposit: ' GET _price PICTURE '#####.##'
            msg_24('Enter deposit amount and press enter, escape to abort',.f.,.f.,.f.)
            csron()
            READ
            csroff()
            msg_24()
            IF lastkey() # 27
                REPLACE price WITH _price
            ENDIF                                                      && IF lastkey() # 27
            scroll(6,12,16,70,0)
        CASE _pchoice = 9                                              && PRC - EXIT
            RELEASE flds, head, flds2, head2
    ENDCASE                                                            && DO CASE
ENDDO                                                                  && DO WHILE _pchoice # 9
RETURN
```

```
*.........................................................................
*
*   Program Name: SYS_UTL.PRG       Copyright: EPIX Corporation
*   Date Created: 04/05/91           Language: Clipper
*   Time Created: 13:46:12             Author: Glenn Holcomb
*
*.........................................................................

PRIVATE _cchoice

_cchoice = 0

DO win WITH 6,8,17,52,.T.,"System Utilities",.F.

DO WHILE _cchoice # 5

    @ 10,11 PROMPT ' 1.  System Defaults                 '
    @ 11,11 PROMPT ' 2.  System Price File Maintenance   '
    @ 12,11 PROMPT ' 3.  Format a Tape                   '
    @ 13,11 PROMPT ' 4.  Reindex Files (Selected Client) '
    @ 15,11 PROMPT ' E.  Return to Main Menu             '

    MENU TO _cchoice

    _cscreen = savescreen()

    IF lastkey() = 27
        _cchoice = 5
    ENDIF                                  && IF lastkey() = 27

    DO CASE
        case _cchoice = 1
            DO sys_def
        case _cchoice = 2
            DO sys_prc
        case _cchoice = 3
            DO tpe_fmt
        case _cchoice = 4
            DO rec_ndx
        case _cchoice = 5
            RETURN
    ENDCASE

    restscreen(_cscreen)

ENDDO

RETURN
```

```
*...........................................................................
*
*   Program Name: TIT_CAP.PRG        Copyright: EPIX Corporation
*   Date Created: 05/23/91            Language: Clipper
*   Time Created: 17:05:50              Author: Glenn Holcomb
*
*...........................................................................

PARAMETER _common

IF pcount() = 0
     _common = .F.
ENDIF                                          && IF pcount() = 0

PRIVATE _tit_id, _tit_desc, _tit_plc, _dbp_tit, _continue, _cmd

_continue = .T.

store 0                  to _tit_id
store space(40)          to _tit_desc
store 0                  to _tit_plc
store space(10)          to _dbp_tit

@  8,27 GET _tit_id PICTURE '##'
@ 10,27 GET _tit_desc PICTURE '@!'
@ 12,27 SAY SPACE(40)

csron()
READ
csroff()

pp_call('DEFWIN DBP_A')

DO WHILE _continue
    msg_24('Press enter to capture image, ESC to abort',.f.,.f.,.t.)
    pp_call('VIEW')
    INKEY(0)
    DO CASE
        CASE lastkey() = 13
            pp_call('SNAP')
            _continue = queryb('Recapture image?',.f.)
        CASE lastkey() = 27
            pp_call('SNAP')
            _continue = .F.
    ENDCASE                                    && DO CASE
ENDDO                                          && DO WHILE _continue

@ 24, 0 CLEAR

IF lastkey() # 27
    IF queryb('Save title image?',.T.)
        msg_24('Please wait while saving title image...',.f.,.f.,.f.)
        _cmd = 'SAVEDB DBP_A ' + SPACE(10)
        pp_call(@_cmd)
        _dbp_tit = RIGHT(_cmd,10)
        APPEND BLANK
        replace title->tit_id     with _tit_id
        replace title->tit_desc   with _tit_desc
        replace title->tit_plc    with _tit_plc
        replace title->dbp_tit    with _dbp_tit
        @ 24,0 CLEAR
    ENDIF                                      && IF queryb('Save title image?')
ENDIF                                          && IF lastkey() # 27

DO tit_dis WITH .F., _common
```

IC/14PRINT

Page 2 of 2

TIT_CAP.PRG 10-17-91 2:53p

```
RETURN
```

```
*.........................................................................
*
*   Program Name: TIT_DEL.PRG       Copyright: EPIX Corporation
*   Date Created: 05/23/91           Language: Clipper
*   Time Created: 17:27:07             Author: Glenn Holcomb
*
*.........................................................................

PARAMETER _common

IF pcount() = 0
     _common = .F.
ENDIF                                           && IF pcount() = 0

IF .NOT. EOF() .AND. queryb('Delete current title?')
    msg_24('Please wait while deleting title...',.f.,.f.,.f.)
    _current = tit_id
    DELETE
    PACK
    REPLACE ALL tit_id WITH RECNO()
    SET SOFTSEEK ON
    SEEK STR(_current,2)
    SET SOFTSEEK OFF
    IF EOF()
        GOTO TOP
    ENDIF                                       && IF EOF()
    DO tit_dis WITH .T., _common
    @ 24, 0 CLEAR
ENDIF                                           && IF .NOT. EOF() .AND. queryb('Delete current title?')

RETURN
```

```
*.............................................................................
*
*   Program Name: TIT_DIS.PRG       Copyright: EPIX Corporation
*   Date Created: 05/23/91           Language: Clipper
*   Time Created: 16:23:36             Author: Glenn Holcomb
*
*.............................................................................

PARAMETER _shw_tit, _common

DO CASE
    CASE pcount() = 0
        _shw_tit = .T.
        _common = .F.
    CASE pcount() = 1
        _common = .F.
ENDCASE                                         && DO CASE

@  8,14 SAY '   Title ID: '
@ 10,14 SAY 'Description: '
IF .NOT. _common
    @ 12,14 SAY '  Placement: '
ENDIF                                           && IF .NOT. _common


IF EOF()
    @  8,27 SAY SPACE(40)
    @ 10,27 SAY SPACE(40)
    @ 12,27 SAY SPACE(40)
ELSE
    @  8,27 SAY tit_id PICTURE '##'
    @ 10,27 SAY tit_desc
    IF .NOT. _common
        IF EMPTY(tit_plc)
            IF tit_used
                @ 12,27 SAY 'Before 1st photo'
            ELSE
                @ 12,27 SAY SPACE(40)
            ENDIF                               && IF tit_used
        ELSE
            @ 12,27 SAY SPACE(40)
            @ 12,27 SAY tit_plc PICTURE '#####'
        ENDIF                                   && IF EMPTY(tit_plc)
    ENDIF                                       && IF .NOT. _common
    IF _shw_tit
        msg_24('Please wait while displaying images...',.F.,.F.,.F.)
        pp_call('PUTF DBP_A ' + dbp_tit)
        @ 24,0 CLEAR
    ENDIF                                       && IF _shw_tit
ENDIF                                           && IF EOF()
RETURN                                          && PROCEDURE tit_dis
```

```
*.......................................................................
*
*   Program Name: TIT_NXT.PRG       Copyright: EPIX Corporation
*   Date Created: 05/23/91           Language: Clipper
*   Time Created: 16:29:50             Author: Glenn Holcomb
*
*.......................................................................

PARAMETER _common

IF pcount() = 0
     _common = .F.
ENDIF                                      && IF pcount() = 0

PRIVATE _rec, _newrec

_newrec = .T.

STORE recno() TO _rec
SKIP 1
IF EOF()
    GOTO _rec
    msg_24('End of file encountered...press any key',.T.,.F.)
    _newrec = .F.
ENDIF

DO tit_dis WITH _newrec, _common

RETURN
```

```
*.........................................................................
*
*   Program Name: TIT_PRV.PRG       Copyright: EPIX Corporation
*   Date Created: 05/23/91           Language: Clipper
*   Time Created: 16:37:12             Author: Glenn Holcomb
*
*.........................................................................

PARAMETER _common

IF pcount() = 0
    _common = .F.
ENDIF                                          && IF pcount() = 0

PRIVATE _rec, _newrec

_newrec = .T.

STORE recno() TO _rec
SKIP -1
IF BOF()
    GOTO _rec
    msg_24('Beginning of file encountered...press any key',.T.,.F.)
    _newrec = .F.
ENDIF

DO tit_dis WITH _newrec, _common

RETURN
```

```
*.....................................................................
*
*   Program Name: TOGGLE.PRG        Copyright: EPIX Corporation
*   Date Created: 06/04/91           Language: Clipper
*   Time Created: 19:03:14             Author: Glenn Holcomb
*
*.....................................................................

    IF _chosen
        IF .NOT. _used
            _chosen     = .F.
            REPLACE photo->chosen WITH _chosen
        ELSE
            BEEP()
        ENDIF                                       && IF .NOT. _used
    ELSE
        _chosen     = .T.
        REPLACE photo->chosen WITH _chosen
    ENDIF                                       && IF _chosen

    DO sld_dis WITH .F.

RETURN
```

```
*.........................................................................
*
*   Program Name: TPE_FMT.PRG       Copyright: EPIX Corporation
*   Date Created: 04/10/91           Language: Clipper
*   Time Created: 11:53:28             Author: Glenn Holcomb
*
*.........................................................................
PRIVATE _handle, _text

IF queryb('Format tape in tape drive ')
    _handle = FCREATE('fmt.bat')
    _text    = '@ECHO OFF'
    FWRITELINE(_handle,_text)
    _text    = 'C:\MTN_TAPE\TAPE FMT'
    FWRITELINE(_handle,_text)
    _text    = 'IF ERRORLEVEL 5 GOTO ERROR5'
    FWRITELINE(_handle,_text)
    _text    = 'IF ERRORLEVEL 4 GOTO ERROR4'
    FWRITELINE(_handle,_text)
    _text    = 'IF ERRORLEVEL 3 GOTO ERROR3'
    FWRITELINE(_handle,_text)
    _text    = 'IF ERRORLEVEL 2 GOTO ERROR2'
    FWRITELINE(_handle,_text)
    _text    = 'IF ERRORLEVEL 1 GOTO ERROR1'
    FWRITELINE(_handle,_text)
    _text    = 'GOTO OKAY'
    FWRITELINE(_handle,_text)
    _text    = ':ERROR5'
    FWRITELINE(_handle,_text)
    _text    = 'AMENU ERROR FORMAT 5'
    FWRITELINE(_handle,_text)
    _text    = ':ERROR4'
    FWRITELINE(_handle,_text)
    _text    = 'AMENU ERROR FORMAT 4'
    FWRITELINE(_handle,_text)
    _text    = ':ERROR3'
    FWRITELINE(_handle,_text)
    _text    = 'AMENU ERROR FORMAT 3'
    FWRITELINE(_handle,_text)
    _text    = ':ERROR2'
    FWRITELINE(_handle,_text)
    _text    = 'AMENU ERROR FORMAT 2'
    FWRITELINE(_handle,_text)
    _text    = ':ERROR1'
    FWRITELINE(_handle,_text)
    _text    = 'AMENU ERROR FORMAT 1'
    FWRITELINE(_handle,_text)
    _text    = ':OKAY'
    FWRITELINE(_handle,_text)
    _text    = 'AMENU.BAT FORMAT'
    FWRITELINE(_handle,_text)
    FCLOSE(_handle)
    KEYBOARD 'EE'
ENDIF                                        && IF lastkey() # 27

RETURN
```

```
*.........................................................................
*
*    Program Name: WIN.PRG          Copyright: EPIX Corporation
*    Date Created: 03/06/91          Language: Clipper
*    Time Created: 15:00:21            Author: Glenn C. Holcomb
*
*.........................................................................
* Revision: 1.1 Last Revised: 04/16/91 at 14:51:36
* Description: Add support for hcolor
*.........................................................................

PARAMETERS top, left, bottom, right, double, title, lower

IF double
    box(top,left,bottom,right,"╔═╗║╝═╚║ ",color,1,8)
    print((top + 2),left,"╠" + REPLICATE("═",(right - left - 1)) + "╣",color)
    print((top + 1),(left + 1),strcenter(title,(right - left - 1)),hcolor)
    IF lower
        print((bottom - 2),left,"╠" + REPLICATE("═",(right - left - 1)) + "╣",color)
    ENDIF
ELSE
    box(top,left,bottom,right,"┌─┐│┘─└│ ",color,1,8)
    print((top + 2),left,"├" + REPLICATE("─",(right - left - 1)) + "┤",color)
    print((top + 1),(left + 1),strcenter(title,(right - left - 1)),hcolor)
    IF lower
        print((bottom - 2),left,"├" + REPLICATE("─",(right - left - 1)) + "┤",color)
    ENDIF
ENDIF

RETURN
```

```
*.............................................................................
*
*   Program Name: RPT_INV.PRG       Copyright: EPIX Corporation
*   Date Created: 08/08/91           Language: Clipper
*   Time Created: 16:11:04             Author: Glenn Holcomb
*
*.............................................................................

PRIVATE _rec, _i, _tsize, _mrec, _sscreen, _nopages, _sunit, _cont, _deposit, _ok
PRIVATE _text, _code, _uon, _uoff, _bon, _boff, _hdl

msg_24('Please wait while totaling...',.f.,.f.,.f.)
USE client INDEX client
SEEK _dclient
_mfg_code = client->mfg_code
USE

chdir(_dclient)

USE book INDEX book, booko
GOTO TOP

IF EOF()
    msg_24('Must create an album before printing order form, press any key',.t.,.f.,.f.)
    USE
ELSE
    SELECT 0
    USE mats INDEX mats, matkey

    SELECT book
    GOTO TOP

    SELECT 0
    USE ..\tots
    ZAP
    INDEX ON item TO ..\tots
    INDEX ON order TO ..\toto
    SET INDEX TO ..\tots, ..\toto

    SELECT book
    GOTO TOP

    * Loop gets the totals for each size print *

    DO WHILE .NOT. EOF() .AND. VAL(ALLTRIM(page)) # 0
        SELECT mats
        SEEK book->mat_id
        IF FOUND()
            FOR _i = 65 TO 68
                _tsize = 'mats->tsize_' + CHR(_i)
                IF .NOT. EMPTY(&_tsize)
                    SELECT tots
                    SEEK ALLTRIM(RIGHT(&_tsize,5))
                    IF .NOT. FOUND()
                        APPEND BLANK
                        REPLACE item WITH ALLTRIM(RIGHT(&_tsize,5))
                    ENDIF                                         && IF .NOT. FOUND()
                    REPLACE tots->quantity WITH tots->quantity + 1
                ENDIF                                             && IF .NOT. EMPTY(&_tsize)
            NEXT                                                  && FOR _i = 65 TO 69
        ELSE
            msg_24('System error in ALB_TOT, mat ' + book->mat_id + ' not found, press any key',.t.,.t.,.t.)
        ENDIF                                                     && IF FOUND()
        SELECT book
        SKIP 1
    ENDDO                                                         && DO WHILE .NOT. EOF() .AND. VAL(ALLTRIM(page)) # 0
```

```
* Loop calculates price of each item *

_deposit = 0

SELECT 0
USE price INDEX price, pricet, priceo
SELECT tots
GOTO TOP
DO WHILE .NOT. EOF()
    SELECT price
    SET ORDER TO 1
    SEEK tots->item
    IF .NOT. FOUND()
        msg_24('Item ' + ALLTRIM(tots->item) + ' not found in price file, press any key',.t.,.t.,.t.)
    ELSE
        SET ORDER TO 2
        REPLACE tots->p_qty   WITH price->p_qty                     && ps
        REPLACE tots->p_price WITH price->p_price                   && ps
        REPLACE tots->uprice WITH price->price
        REPLACE tots->desc   WITH price->desc
        REPLACE tots->order  WITH price->order
        _sunit = tots->quantity
        _cont = .T.
        DO WHILE _cont
            IF _sunit <= tots->p_qty                                && ps
                REPLACE tots->stotal WITH (_sunit - tots->p_qty) * tots->p_price  && ps
                _cont = .F.
            ELSE                                                    && ps
                IF _sunit >= price->tier_high
                    IF tots->p_qty = 0                              && ps
                        REPLACE tots->stotal WITH tots->stotal + ((price->tier_high - price->tier_low) * price->price)
                    ELSE                                            && ps
                        DO CASE                                     && ps
                            CASE tots->p_qty >= price->tier_high    && ps
                                REPLACE tots->stotal WITH tots->stotal + 0  && ps
                            CASE tots->p_qty < price->tier_high .AND. tots->p_qty >= tier_low  && ps
                                REPLACE tots->stotal WITH tots->stotal + ((price->tier_high - price->tier_low - tots->p_qty) * price->price)  && ps
                            CASE tots->p_qty < tier_low             && ps
                                REPLACE tots->stotal WITH tots->stotal + ((price->tier_high - price->tier_low) * price->price)  && ps
                        ENDCASE                                     && DO CASE  && ps
                    ENDIF                                           && IF tots->p_qty = 0 && ps
                ELSEIF _sunit >= price->tier_low
                    IF tots->p_qty = 0                              && ps
                        REPLACE tots->stotal WITH tots->stotal + ((_sunit - price->tier_low) * price->price)
                        _cont = .F.
                    ELSE                                            && ps
                        DO CASE                                     && ps
                            CASE tots->p_qty >= price->tier_low     && ps
                                REPLACE tots->stotal WITH tots->stotal + ((_sunit - tots->p_qty) * price->price)  && ps
                            CASE tots->p_qty < tier_low             && ps
                                REPLACE tots->stotal WITH tots->stotal + ((_sunit - price->tier_low) * price->price)  && ps
                        ENDCASE                                     && DO CASE  && ps
                        _cont = .T.
                    ENDIF                                           && IF tots->p_qty = 0 && ps
                ENDIF                                               && IF _sunit >= price->tier_high
                IF tier_high = 99999
                    _cont = .F.
                ELSE
                    SKIP 1
                ENDIF                                               && IF tier_high = 99999
            ENDIF                                                   && IF _sunit <= tots->p_qty                    && ps

        ENDDO                                                       && DO WHILE _cont
        SEEK tots->item
        DO CASE
```

```
            CASE disc_typ = 'D'
                REPLACE tots->dtotal WITH disc
            CASE disc_typ = 'P'
                REPLACE tots->dtotal WITH tots->stotal * (disc / 100)
            OTHERWISE
                REPLACE tots->dtotal WITH 0
        ENDCASE                                               && DO CASE
        REPLACE tots->etotal WITH tots->stotal - tots->dtotal
    ENDIF                                                     && IF .NOT. FOUND()
    SELECT tots
    SKIP 1

ENDDO                                                         && DO WHILE .NOT. EOF()

@ 24, 0 CLEAR

* Add constant line items *

SELECT price
SET ORDER TO 3

SET SOFTSEEK ON
SEEK '20'
SET SOFTSEEK OFF

DO WHILE price->order < 90
    SELECT tots
    APPEND BLANK
    replace tots->order      with price->order
    replace tots->quantity   with price->quantity
    replace tots->item       with price->item
    replace tots->desc       with price->desc
    replace tots->uprice     with price->price
    replace tots->etotal     with price->price * price->quantity
    SELECT price
    SKIP 1
ENDDO                                                         && DO WHILE price->order < 90

* Calculate all the totals *

PRIVATE _stot1, _stot2, _stot3, _disc, _stax, _ship, _tot, _bal
_stot1 = 0
_stot2 = 0
_stot3 = 0
_disc  = 0
_stax  = 0
_ship  = 0
_tot   = 0
_bal   = 0

SELECT tots
GOTO TOP
DO WHILE .NOT. EOF()
    _stot1 = _stot1 + tots->etotal
    SKIP 1
ENDDO                                                         && DO WHILE .NOT. EOF()

APPEND BLANK
replace tots->order      with 90
replace tots->quantity   with 1
replace tots->item       with 'SUBTOTAL1'
replace tots->desc       with 'Subtotal'
replace tots->etotal     with _stot1

SELECT price
SET ORDER TO 1
```

```
SEEK 'DISCOUNT'
DO CASE
    CASE disc_typ = 'D'
         _disc = price->disc
    CASE disc_typ = 'P'
         _disc = ROUND(_stot1 * (price->disc / 100),2)
    OTHERWISE
         _disc = 0
ENDCASE                                                    && DO CASE

SELECT tots

IF .NOT. EMPTY(_disc)
    APPEND BLANK
    replace tots->quantity   with 1
    replace tots->order      with 91
    replace tots->item       with 'DISCOUNT'
    replace tots->desc       with 'Discount'
    replace tots->etotal     with _disc
ENDIF                                                      && IF .NOT. EMPTY(_disc)

_stot2 = _stot1 - _disc

SELECT price
SEEK 'SALESTAX'
_stax = ROUND(_stot2 * (price->disc / 100),2)

SELECT tots

IF .NOT. EMPTY(_stax)
    APPEND BLANK
    replace tots->quantity   with 1
    replace tots->order      with 92
    replace tots->item       with 'SALESTAX'
    replace tots->desc       with 'Sales Tax'
    replace tots->etotal     with _stax
ENDIF                                                      && IF .NOT. EMPTY(_stax)

_stot3 = _stot2 + _stax

SELECT price
SEEK 'SHIPPING'
_ship = price->price

SELECT tots

IF .NOT. EMPTY(_ship)
    APPEND BLANK
    replace tots->quantity   with 1
    replace tots->order      with 93
    replace tots->item       with 'SHIPPING'
    replace tots->desc       with 'Shipping & Handling'
    replace tots->etotal     with _ship
ENDIF                                                      && IF .NOT. EMPTY(_stax)

APPEND BLANK
_tot = _stot3 + _ship
replace tots->quantity   with 1
replace tots->order      with 94
replace tots->item       with 'TOTAL'
replace tots->desc       with 'Total'
replace tots->etotal     with _tot

SELECT price
SEEK 'DEPOSIT'
_deposit = price->price
```

```
SELECT tots

APPEND BLANK
replace tots->quantity    with 1
replace tots->order       with 95
replace tots->item        with 'DEPOSIT'
replace tots->desc        with 'Deposit'
replace tots->etotal      with _deposit

APPEND BLANK
_bal = _tot - _deposit
replace tots->quantity    with 1
replace tots->order       with 96
replace tots->item        with 'BALANCE'
replace tots->desc        with 'Balance'
replace tots->etotal      with _bal

SELECT price
USE
SELECT mats
USE
SELECT book
USE


SELECT tots
SET ORDER TO 2
GOTO TOP
SELECT 0
USE ..\printers
DECLARE flds[1], head[1]
_sscreen = savescreen()
msg_24('Use the arrows to scroll, ENTER to Select',.f.,.f.,.t.)
flds[1] = 'NAME'
head[1] = 'Printer'
box(4,10,14,44,"┌─┐│┘─└│",color,1,8)
DBEDIT(5,11,13,43,flds,'','',head)
RELEASE flds, head
restscreen(_sscreen)

_uon = ""
_code = ALLTRIM(printers->undl_on)
DO WHILE .NOT. EMPTY(_code)
    _uon = _uon + CHR(VAL(LEFT(_code,3)))
    _code = SUBSTR(_code,4)
ENDDO                                                && DO WHILE .NOT. EMPTY(_code)

_uoff = ""
_code = ALLTRIM(printers->undl_off)
DO WHILE .NOT. EMPTY(_code)
    _uoff = _uoff + CHR(VAL(LEFT(_code,3)))
    _code = SUBSTR(_code,4)
ENDDO                                                && DO WHILE .NOT. EMPTY(_code)

_bon = ""
_code = ALLTRIM(printers->bold_on)
DO WHILE .NOT. EMPTY(_code)
    _bon = _bon + CHR(VAL(LEFT(_code,3)))
    _code = SUBSTR(_code,4)
ENDDO                                                && DO WHILE .NOT. EMPTY(_code)

_boff = ""
_code = ALLTRIM(printers->bold_off)
DO WHILE .NOT. EMPTY(_code)
    _boff = _boff + CHR(VAL(LEFT(_code,3)))
```

```
    _code = SUBSTR(_code,4)
ENDDO                                                    && DO WHILE .NOT. EMPTY(_code)

_hdl = FCREATE('INVOICE.PRN')
_text = ""
_code = ALLTRIM(printers->reset) + ALLTRIM(printers->ort_port) + ALLTRIM(printers->pri_fix) + ALLTRIM(printers->pitch_10)
_code = _code + ALLTRIM(printers->fnt_cour) + ALLTRIM(printers->lpi_6)
DO WHILE .NOT. EMPTY(_code)
    IF LEFT(_code,1) = '"'
        _text = _text + SUBSTR(_code,2)
        _code = ""
    ELSE
        _text = _text + CHR(VAL(LEFT(_code,3)))
        _code = SUBSTR(_code,4)
    ENDIF                                                && IF LEFT(_code,1) = '"'
ENDDO                                                    && DO WHILE .NOT. EMPTY(_code)
_text = _text  + _bon + center('WEDDING ALBUM PHOTOGRAPHY ORDER',80) + _boff
fwriteline(_hdl,_text)

DO rpt_blk WITH _hdl

SELECT 0
use ..\control
_text = CENTER(ALLTRIM(control->full_name),80)
fwriteline(_hdl,_text)

IF .NOT. EMPTY(control->address1)
    _text = CENTER(ALLTRIM(control->address1),80)
    fwriteline(_hdl,_text)
ENDIF                                                    && IF .NOT. EMPTY(control->address1)

IF .NOT. EMPTY(control->address2)
    _text = CENTER(ALLTRIM(control->address2),80)
    fwriteline(_hdl,_text)
ENDIF                                                    && IF .NOT. EMPTY(control->address2)

IF .NOT. EMPTY(control->city)
    _text = CENTER(ALLTRIM(control->city) + IIF(.NOT. EMPTY(control->state),', ' + control->state, '') + '  ' + ALLTRIM(control->zip),80)
    fwriteline(_hdl,_text)
ENDIF                                                    && IF .NOT. EMPTY(control->city)

IF .NOT. EMPTY(control->phone)
    _text = CENTER(control->phone,80)
    fwriteline(_hdl,_text)
ENDIF                                                    && IF .NOT. EMPTY(control->phone)

IF .NOT. EMPTY(control->fax)
    _text = CENTER('FAX:  ' + control->fax,80)
    fwriteline(_hdl,_text)
ENDIF                                                    && IF .NOT. EMPTY(client->wphone)

FOR _i = 1 TO 2
    DO rpt_blk WITH _hdl
NEXT                                                     && FOR _i = 1 TO 2

SELECT 0
USE ..\client INDEX ..\client
SEEK _dclient

_text = client->cli_name
fwriteline(_hdl,_text)

IF .NOT. EMPTY(client->address1)
    _text = client->address1
    fwriteline(_hdl,_text)
ENDIF                                                    && IF .NOT. EMPTY(client->address1)
```

```
IF .NOT. EMPTY(client->address2)
     _text = client->address2
     Fwriteline(_hdl,_text)
ENDIF                                                    && IF .NOT. EMPTY(client->address2)

IF .NOT. EMPTY(client->city)
     _text = ALLTRIM(client->city) + IIF(.NOT. EMPTY(client->state),', ' + client->state, '') + '  ' + client->zip
     Fwriteline(_hdl,_text)
ENDIF                                                    && IF .NOT. EMPTY(client->city)

IF .NOT. EMPTY(client->hphone)
     _text = 'Home:  ' + client->hphone
     Fwriteline(_hdl,_text)
ENDIF                                                    && IF .NOT. EMPTY(client->hphone)

IF .NOT. EMPTY(client->wphone)
     _text = 'Business:  ' + client->wphone
     Fwriteline(_hdl,_text)
ENDIF                                                    && IF .NOT. EMPTY(client->wphone)

FOR _i = 1 TO 3
     DO rpt_blk WITH _hdl
NEXT                                                     && FOR _i = 1 TO 3

_text = ""
_code = ALLTRIM(printers->pitch_12)
DO WHILE .NOT. EMPTY(_code)
     _text = _text + CHR(VAL(LEFT(_code,3)))
     _code = SUBSTR(_code,4)
ENDDO                                                    && DO WHILE .NOT. EMPTY(_code)

_text = _text + SPACE(5) + _uon + "QUANTITY" + _uoff + SPACE(5) + _uon + STRCENTER('SIZE/DESCRIPTION',45) + _uoff
_text = _text + SPACE(5) + _uon + STRCENTER('EACH',10) + _uoff + SPACE(5) + _uon + STRCENTER('EXTENSION',10) + _uoff
Fwriteline(_hdl,_text)

DO rpt_blk WITH _hdl

SELECT tots

_text = SPACE(5) + TRANSFORM(tots->quantity,' #####') + SPACE(7) + tots->desc + '     $' + TRANSFORM(tots->uprice,'##,###.##') + '     $' + TRANSFORM(tots->etota
=> l,'##,###.##')

DO WHILE tots->order < 90
     fwriteline(_hdl,_text)
     IF tots->p_qty <> 0
          _text = SPACE(18) + '# ' + ALLTRIM(TRANSFORM(tots->p_qty,'#####')) +  ' @ ' + ALLTRIM(TRANSFORM(tots->p_price,'##,###.##')) + ' included in package, prev
=> iously paid'
          fwriteline(_hdl,_text)
     ENDIF                                               && IF tots->p_qty <> 0
     SKIP 1
     _text = SPACE(5) + TRANSFORM(tots->quantity,' #####') + SPACE(7) + tots->desc + '      ' + TRANSFORM(tots->uprice,'##,###.##') + '      ' + TRANSFORM(tots->e
=> total,'##,###.##')
ENDDO                                                    && DO WHILE .NOT. tots->order >= 90

_text = SPACE(5) + _uon + SPACE(8) + _uoff + SPACE(5) + _uon + SPACE(45) + _uoff
_text = _text + SPACE(5) + _uon + SPACE(10) + _uoff + SPACE(5) + _uon + SPACE(10) + _uoff
Fwriteline(_hdl,_text)
DO rpt_blk WITH _hdl

_text = space(58) + RJUST(ALLTRIM(tots->desc),20) + space(5) +  '$' + TRANSFORM(tots->etotal,'##,###.##')
Fwriteline(_hdl,_text)
SKIP 1

IF tots->item = 'DISCOUNT'
     _text = space(58) + RJUST(ALLTRIM(tots->desc),20) + space(5) +  ' ' + TRANSFORM(tots->etotal,'##,###.##')
```

```
     SKIP 1
     fwriteline(_hdl,_text)
  ENDIF                                                              && IF tots->item = 'DISCOUNT'

  IF tots->item = 'SALESTAX'
     _text = SPACE(58) + RJUST(ALLTRIM(tots->desc),20) + space(5) +  ' ' + TRANSFORM(tots->etotal,'##,###.##')
     SKIP 1
  ELSE
     _text = SPACE(58) + RJUST('Sales Tax',20) + space(5) +  ' ' + TRANSFORM(0,'##,###.##')
  ENDIF                                                              && IF tots->item = 'SALESTAX'
  fwriteline(_hdl,_text)

  IF tots->item = 'SHIPPING'
     _text = space(58) + RJUST(ALLTRIM(tots->desc),20) + space(5) + _uon +  ' ' + TRANSFORM(tots->etotal,'##,###.##') + _uoff
     SKIP 1
  ELSE
     _text = space(58) + RJUST('Shipping',20) + space(5) +  ' ' + TRANSFORM(0,'##,###.##')
  ENDIF                                                              && IF tots->item = 'SHIPPING'
  fwriteline(_hdl,_text)

  _text =  SPACE(5) + 'ORDER DATE:  ' + DTOC(DATE()) + '    BY:  ' + _uon + SPACE(23) + _uoff + _bon + RJUST(ALLTRIM(tots->desc),20) + _boff + space(5) +  '$' + TR
=>ANSFORM(tots->etotal,'##,###.##')
  fwriteline(_hdl,_text)
  SKIP 1

  _text = space(58) + RJUST(ALLTRIM(tots->desc),20) + space(5) + _uon +  ' ' + TRANSFORM(tots->etotal,'##,###.##') + _uoff
  fwriteline(_hdl,_text)
  SKIP 1

  _text = SPACE(5) + 'APPROXIMATE DELIVERY ' + _uon + SPACE(7) + _uoff + ' WEEKS                 ' + _bon + RJUST(ALLTRIM(tots->desc),20) + _boff + space(5) +  '
=>$' + TRANSFORM(tots->etotal,'##,###.##')
  fwriteline(_hdl,_text)
  SKIP 1

  _text = SPACE(1)
  fwriteline(_hdl,_text)
  _text = SPACE(5) + 'MAIDEN NAME:  ' + _uon + SPACE(39) + _uoff + RJUST('Deposit',20) + space(5) + _uon + SPACE(10) + _uoff
  fwriteline(_hdl,_text)

  _text = SPACE(1)
  fwriteline(_hdl,_text)
  _text = SPACE(5) + 'PHOTOGRAPHER:  ' + _uon + SPACE(38) + _uoff + _bon + RJUST('Balance',20) + _boff + space(5) + _uon + SPACE(10) + _uoff
  fwriteline(_hdl,_text)

  _text = SPACE(1)
  fwriteline(_hdl,_text)
  _text = SPACE(5) + 'WEDDING DATE:  ' + DTOC(client->eventdate) + SPACE(30) + RJUST('Deposit',20) + space(5) + _uon + SPACE(10) + _uoff
  fwriteline(_hdl,_text)

  _text = SPACE(1)
  fwriteline(_hdl,_text)
  _text = SPACE(5) + 'ORDER WILL BE  (  ) PICKED UP   (  ) DELIVERED UPS    ' + _bon + RJUST('Balance',20) + _boff + space(5) + _uon + SPACE(10) + _uoff
  fwriteline(_hdl,_text)

  FOR _i = 1 TO 2
     DO rpt_blk WITH _hdl
  NEXT                                                               && FOR _i = 1 TO 2

  FOR _i = 1 TO mlcount(control->terms,80,4,.t.)
     _text = SPACE(5) + memoline(control->terms,80,_i,4,.t.)
     fwriteline(_hdl,_text)
  NEXT                                                               && FOR _i = 1 TO mlcount(control->terms,80,4,.t.)

  FOR _i = 1 TO 2
     DO rpt_blk WITH _hdl
  NEXT                                                               && FOR _i = 1 TO 2
```

```
     _text = SPACE(5) + 'APPROVED: ' + _uon + SPACE(45) + _uoff + SPACE(5) + 'DATE: ' + _uon + SPACE(16) + _uoff
     fwriteline(_hdl,_text)

     DO rpt_blk WITH _hdl

     _text = SPACE(5) + 'NOTIFIED ORDER IS READY: ' + _uon + SPACE(45) + _uoff
     fwriteline(_hdl,_text)

     _text = CHR(12)
     fwriteline(_hdl,_text)
     FCLOSE(_hdl)

     IF UPPER(ALLTRIM(printers->name)) # 'SCREEN'
          _ok = .F.
          DO WHILE .NOT. _ok .AND. lastkey() # 27
               IF prnstatus() = 0
                    _ok = .T.
               ELSE
                    msg_24('Printer error, fix printer and press enter, esc to abort',.t.,.t.)
               ENDIF                                                   && IF prnstatus() = 0
          ENDDO                                                        && DO WHILE .NOT. _ok .AND. lastkey() # 27
          IF _ok .AND. lastkey() # 27
               FOR _i = 1 TO 3
                    _hdl = fopen('INVOICE.PRN')
                    DO WHILE .NOT. FEOF(_hdl)
                         lprintline(freadline(_hdl))
                    ENDDO                                              && DO WHILE .NOT. FEOF(_hdl)
                    fclose(_hdl)
               NEXT                                                    && FOR _i = 1 TO 3
          ELSE
               msg_24('Invoice print aborted, press any key',.t.,.t.,.f.)
          ENDIF                                                        && IF _ok .AND. lastkey() # 27
     ELSE
          msg_24('Use arrow keys to move, ESC to exit',.f.,.f.,.t.)
          box(1,1,22,78,"┌┐│┘─└│ ",color,1,8)
          csron()
          memoedit(memoread('INVOICE.PRN'),2,2,21,77,.f.,'DUMMY',132)
          msg_24()
          csroff()
     ENDIF                                                             && IF printer->name # 'SCREEN'

     SELECT printers
     USE

     ferase('INVOICE.PRN')

     chdir('..')

     SELECT control
     USE

     SELECT client
     USE

     SELECT tots
     USE

ENDIF                                                                  && IF EOF()

RETURN

PROCEDURE DUMMY
```

```
RETURN
```

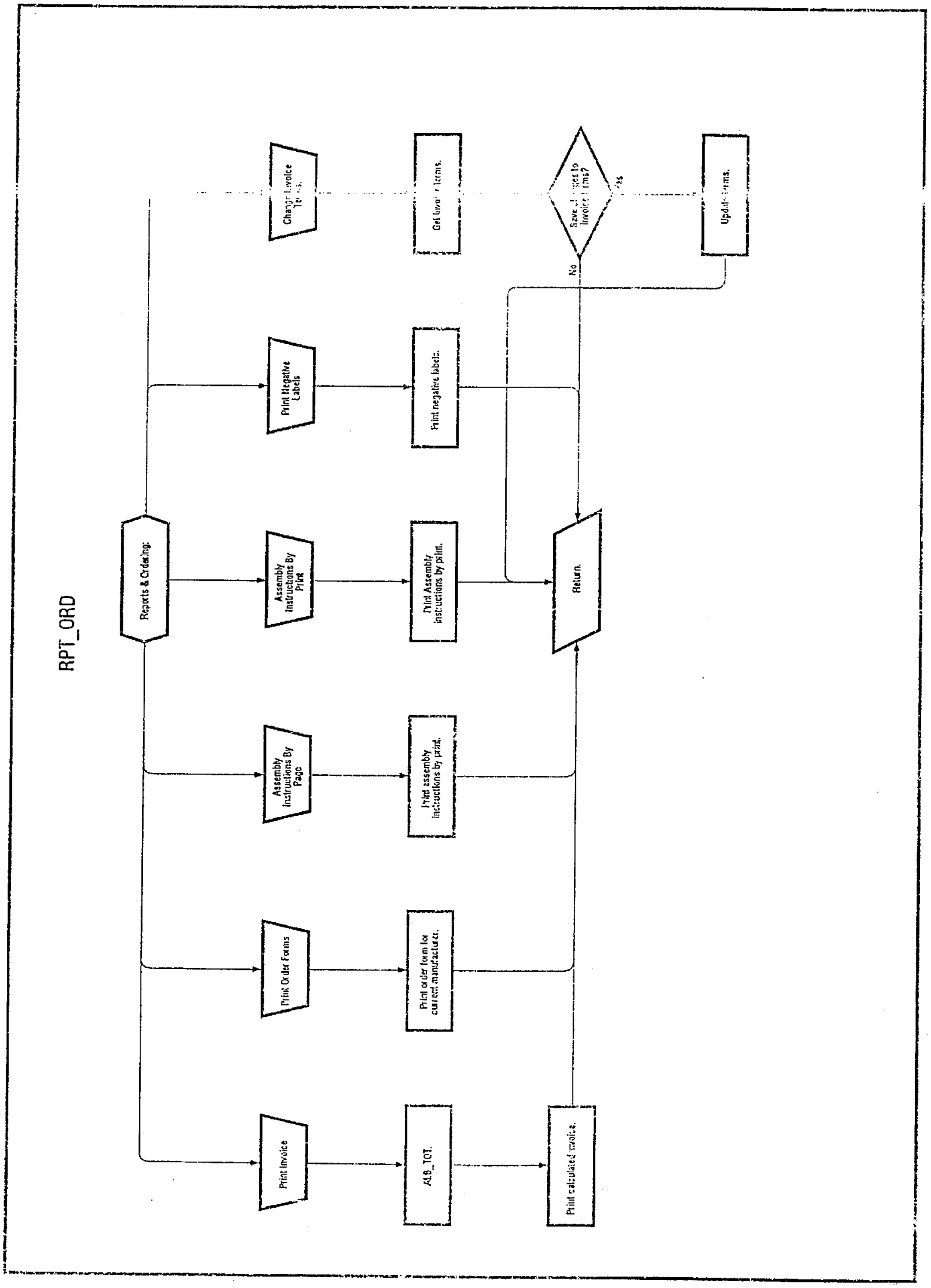
RPT_ORD
Reports & Ordering:
Print Invoice
ALB_TOT.
Print Order Forms
Print order form for current manufacturer.
Assembly Instructions By Page
Print assembly instructions by print.
Assembly Instructions By Print
Print Assembly instructions by print.
Print Negative Labels
Print negative labels.
Return.
No
Yes

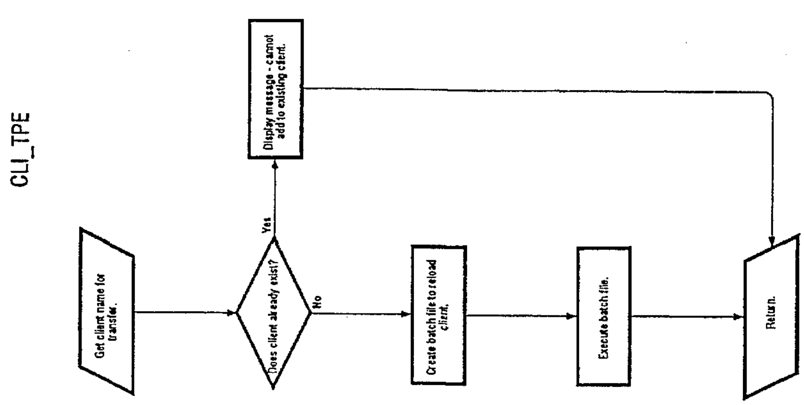
CLI_TPE
Get client name for transfer.
Does client already exist?
Yes
No
Display message - cannot add to existing client.
Create batch file to reload client.
Execute batch file.
Return.

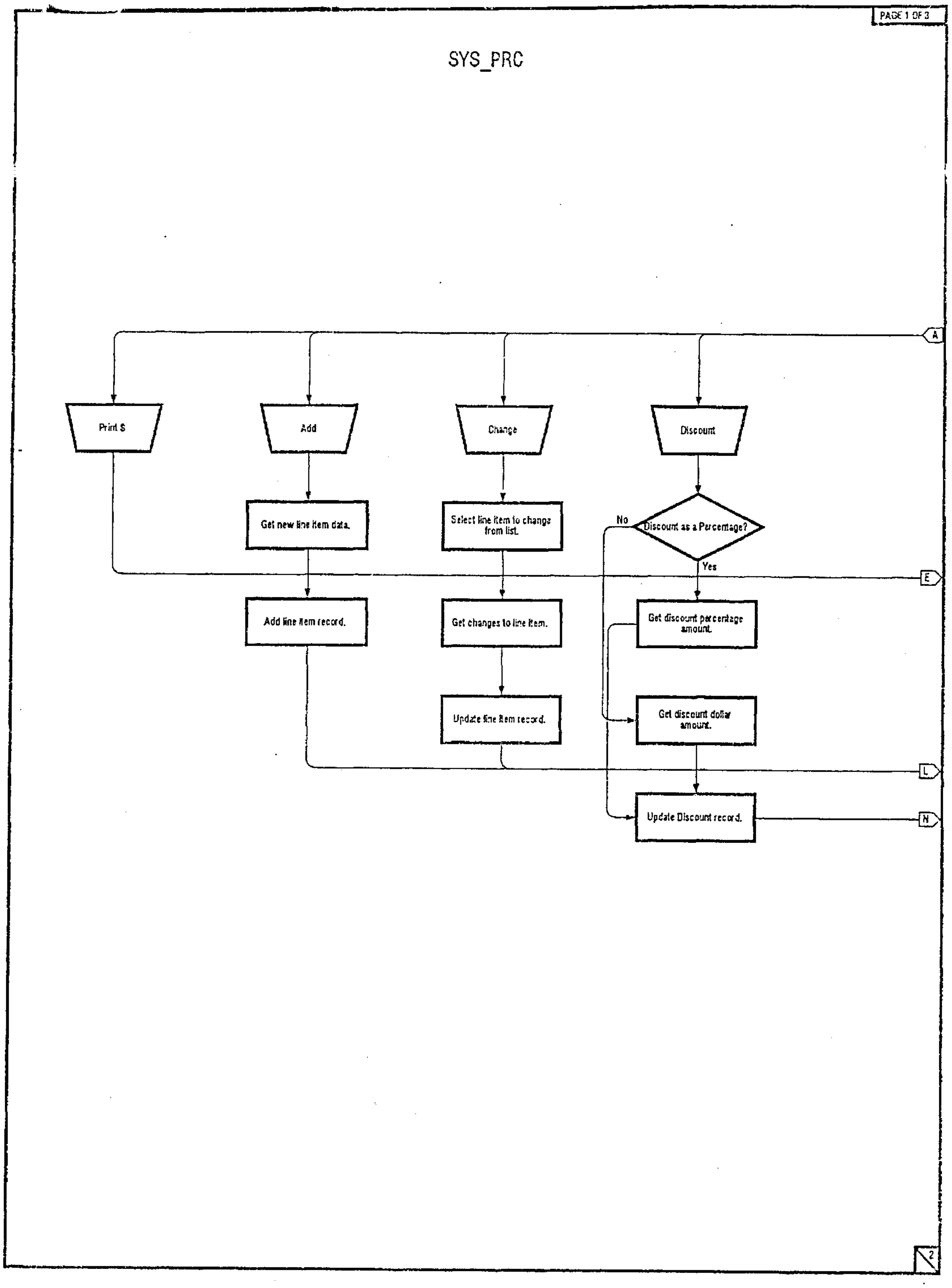
PAGE 1 OF 3
SYS_PRC
A
Print $
Add
Change
Discount
Get new line item data.
Select line item to change from list.
No
Discount as a Percentage?
Yes
E
Add line item record.
Get changes to line item.
Get discount percentage amount.
Update line item record.
Get discount dollar amount.
L
Update Discount record.
N
2

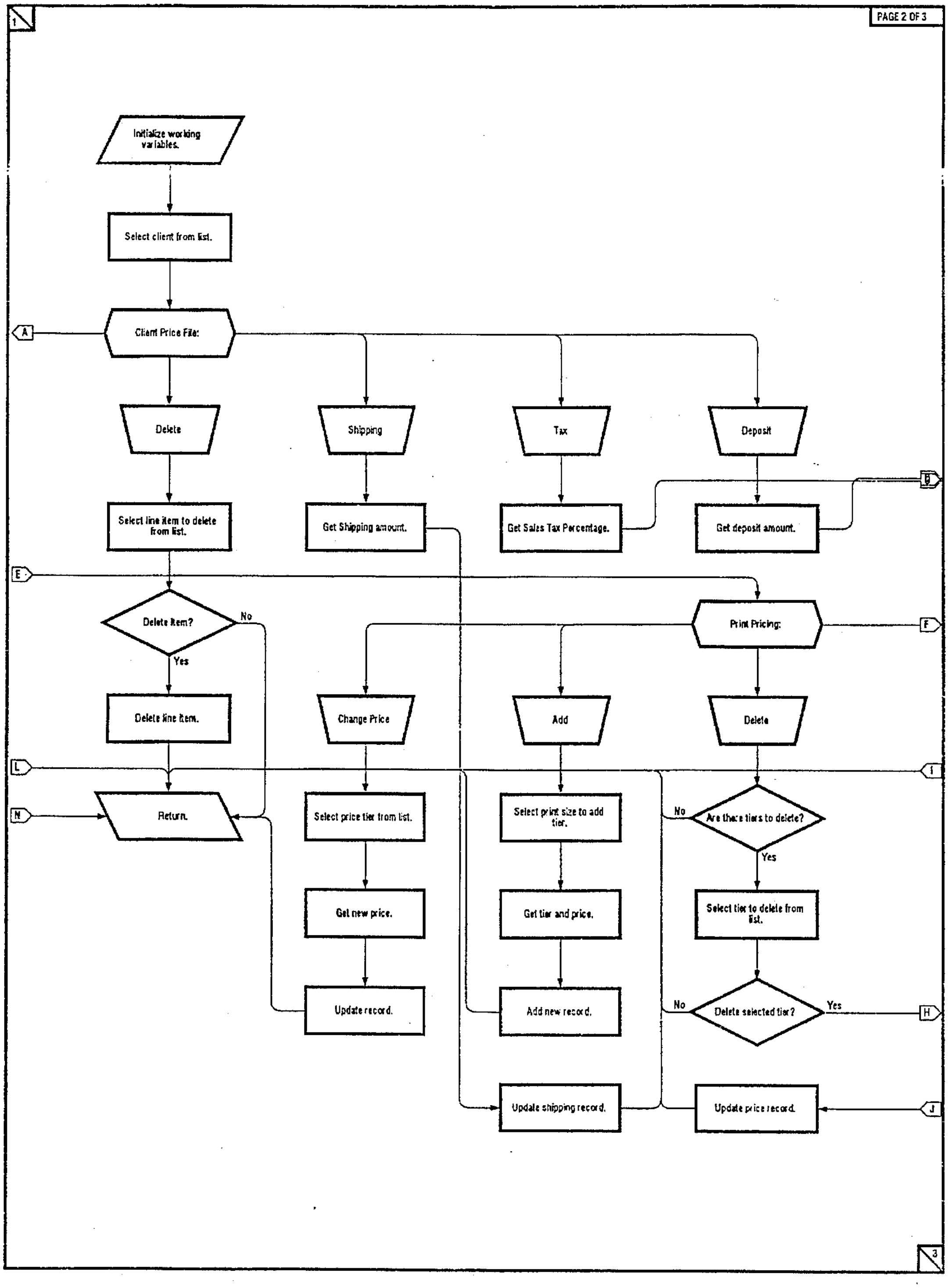
PAGE 2 OF 3
Initialize working variables.
Select client from list.
Client Price File:
A
Delete
Shipping
Tax
Deposit
Select line item to delete from list.
Get Shipping amount.
Get Sales Tax Percentage.
Get deposit amount.
G
E
Delete item?
No
Yes
Print Pricing:
F
Delete line item.
Change Price
Add
Delete
L
I
N
Return.
Select price tier from list.
Select print size to add tier.
Are there tiers to delete?
No
Yes
Get new price.
Get tier and price.
Select tier to delete from list.
Update record.
Add new record.
Delete selected tier?
No
Yes
H
Update shipping record.
Update price record.
J
1
3

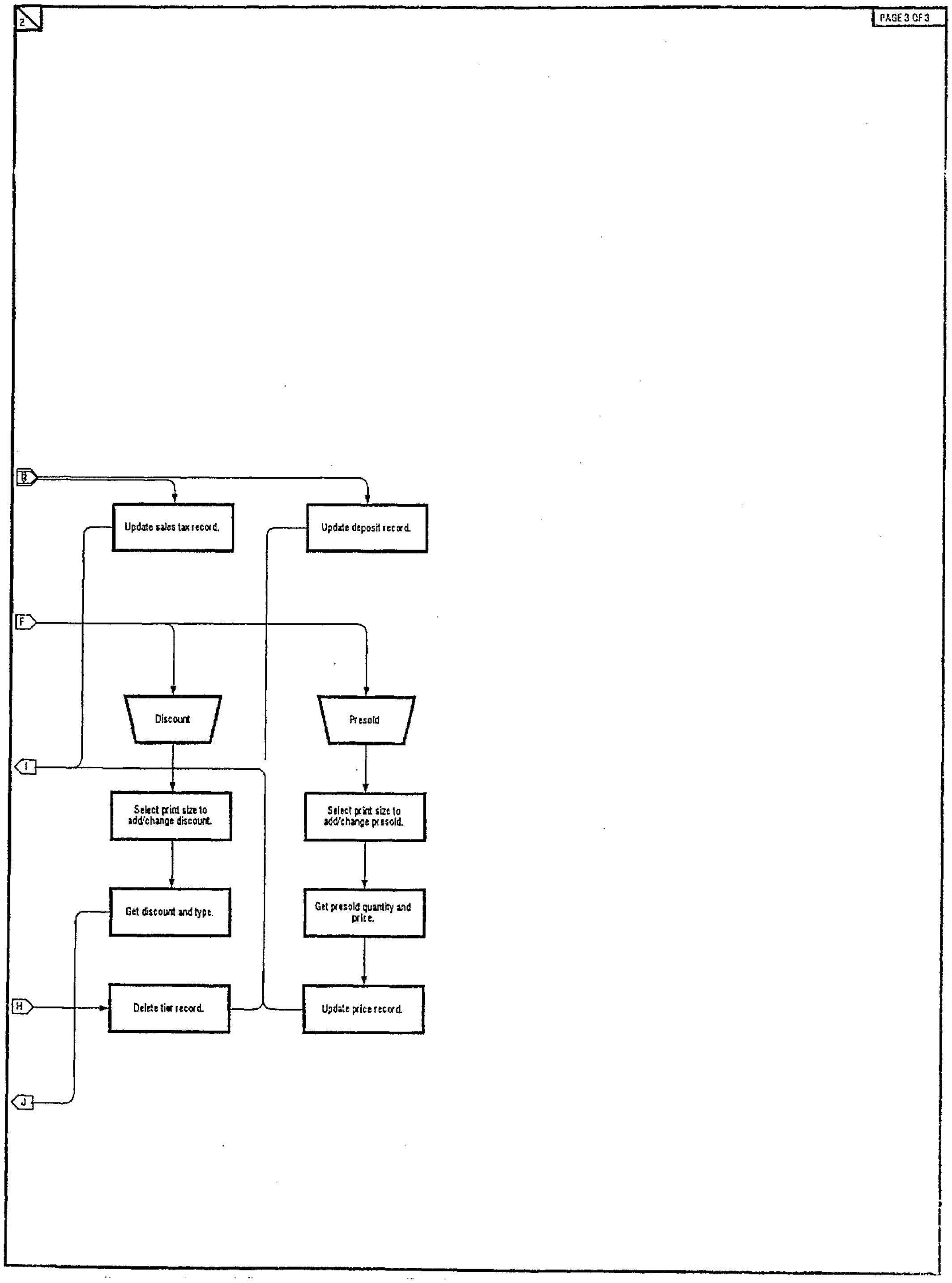
2
PAGE 3 OF 3
B
Update sales tax record.
Update deposit record.
F
Discount
Presold
I
Select print size to add/change discount.
Select print size to add/change presold.
Get discount and type.
Get presold quantity and price.
H
Delete tier record.
Update price record.
J

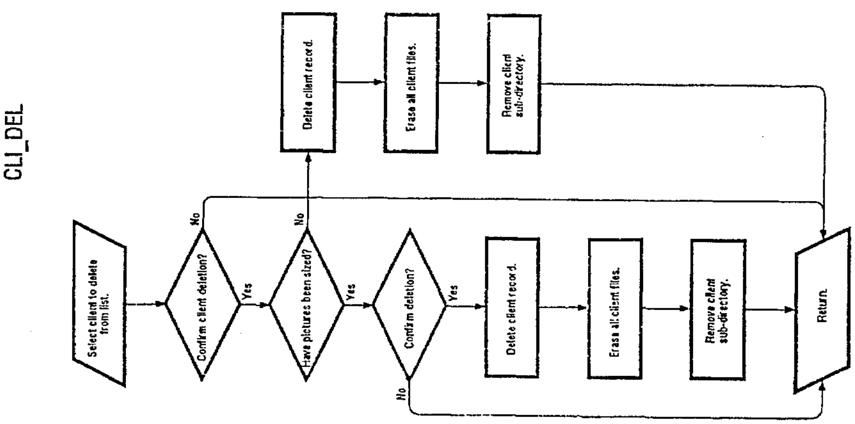
CLI_DEL
Select client to delete from list.
Confirm client deletion?
Yes
No
Have pictures been sized?
Yes
No
Confirm deletion?
Yes
No
Delete client record.
Erase all client files.
Remove client sub-directory.
Delete client record.
Erase all client files.
Remove client sub-directory.
Return.

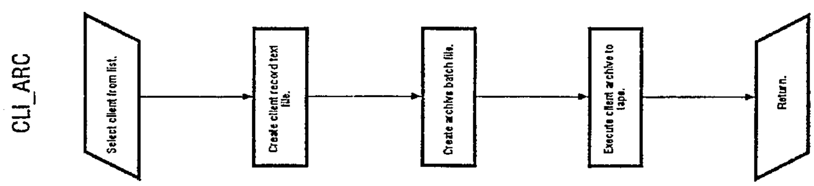
CLI_ARC
Select client from list.
Create client record text file.
Create archive batch file.
Execute client archive to tape.
Return.

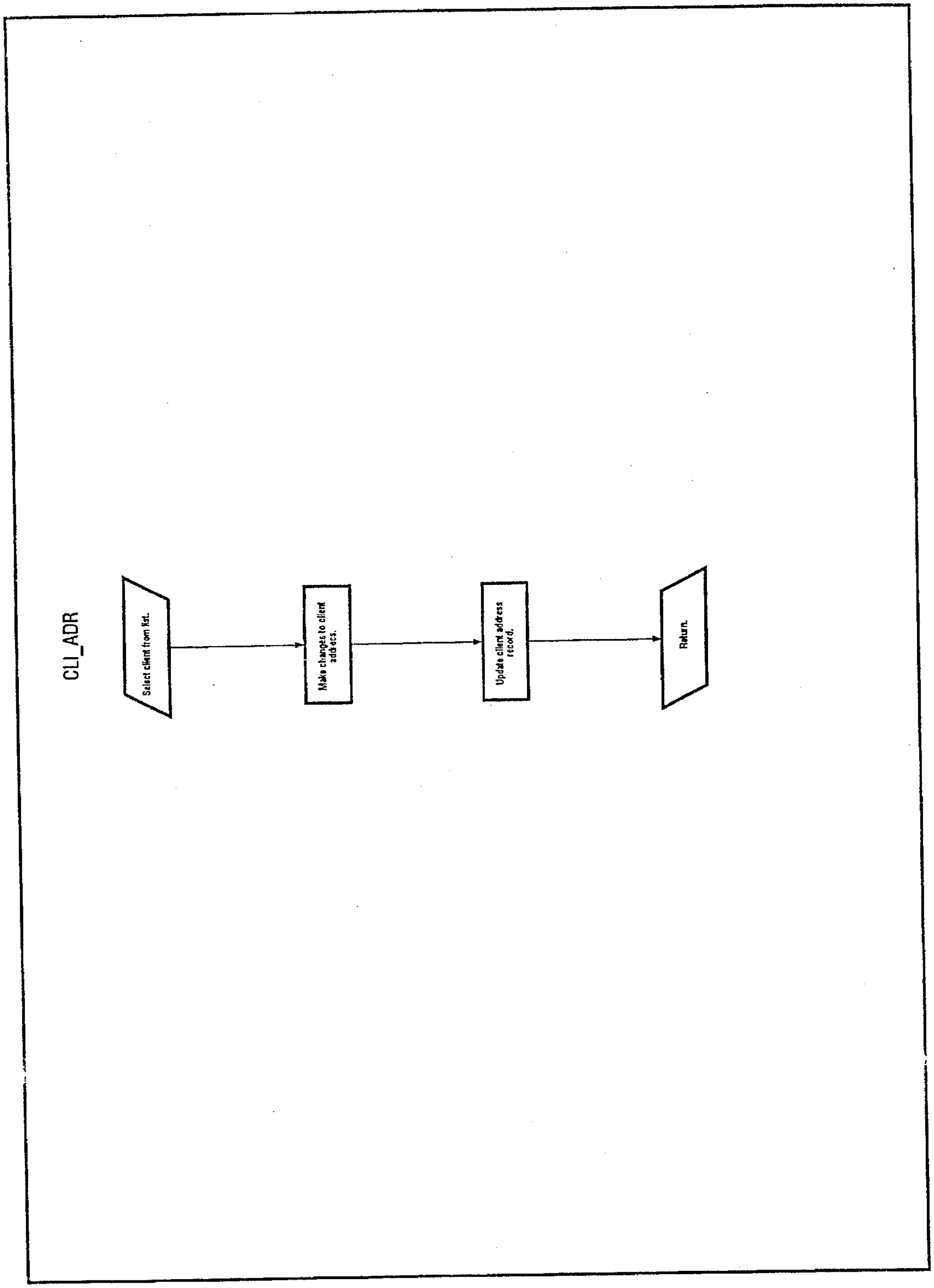
CLI_ADR
Select client from list.
Make changes to client address.
Update client address record.
Return.

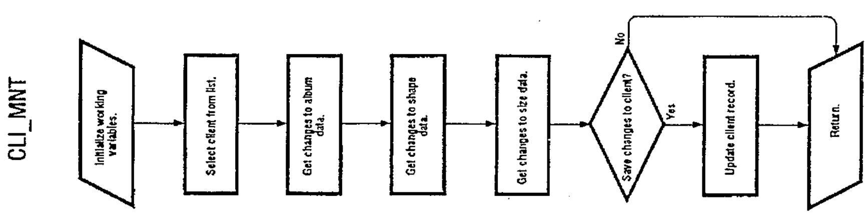
CLI_MNT
Initialize working variables.
Select client from list.
Get changes to album data.
Get changes to shape data.
Get changes to size data.
Save changes to client?
No
Yes
Update client record.
Return.

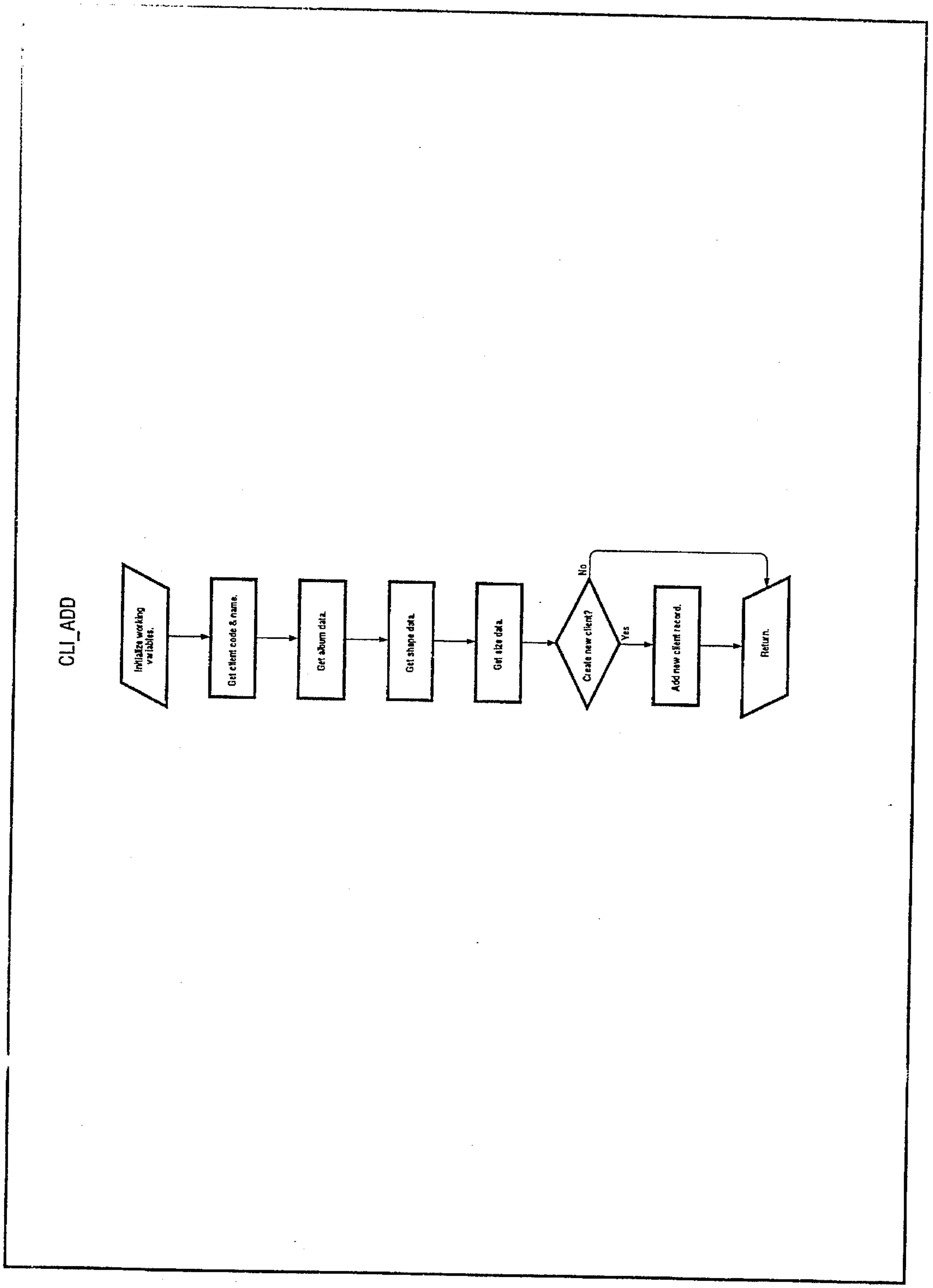
CLI_ADD
Initialize working variables.
Get client code & name.
Get album data.
Get shape data.
Get size data.
Create new client?
No
Yes
Add new client record.
Return.

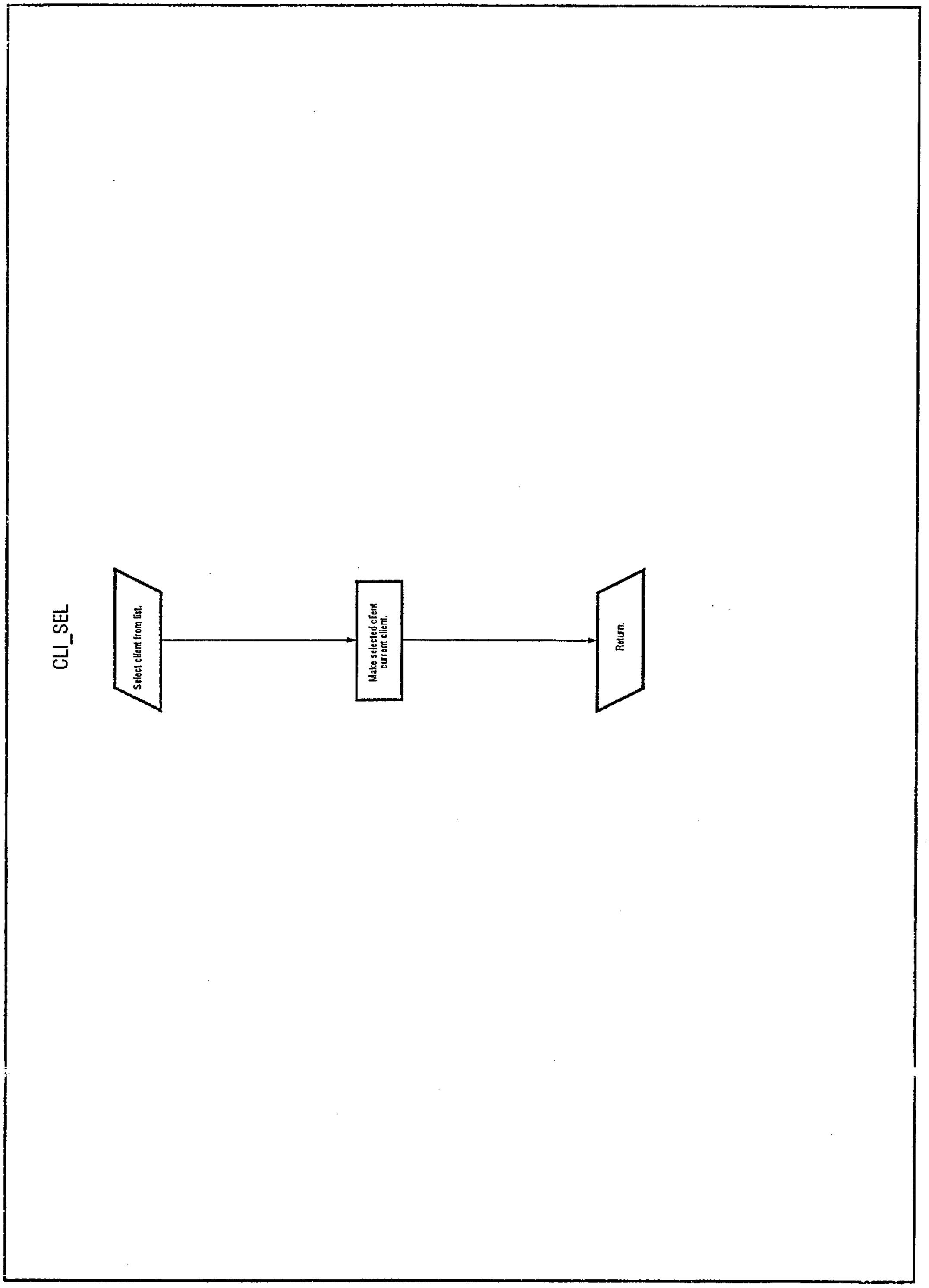
CLI_SEL
Select client from list.
Make selected client current client.
Return.

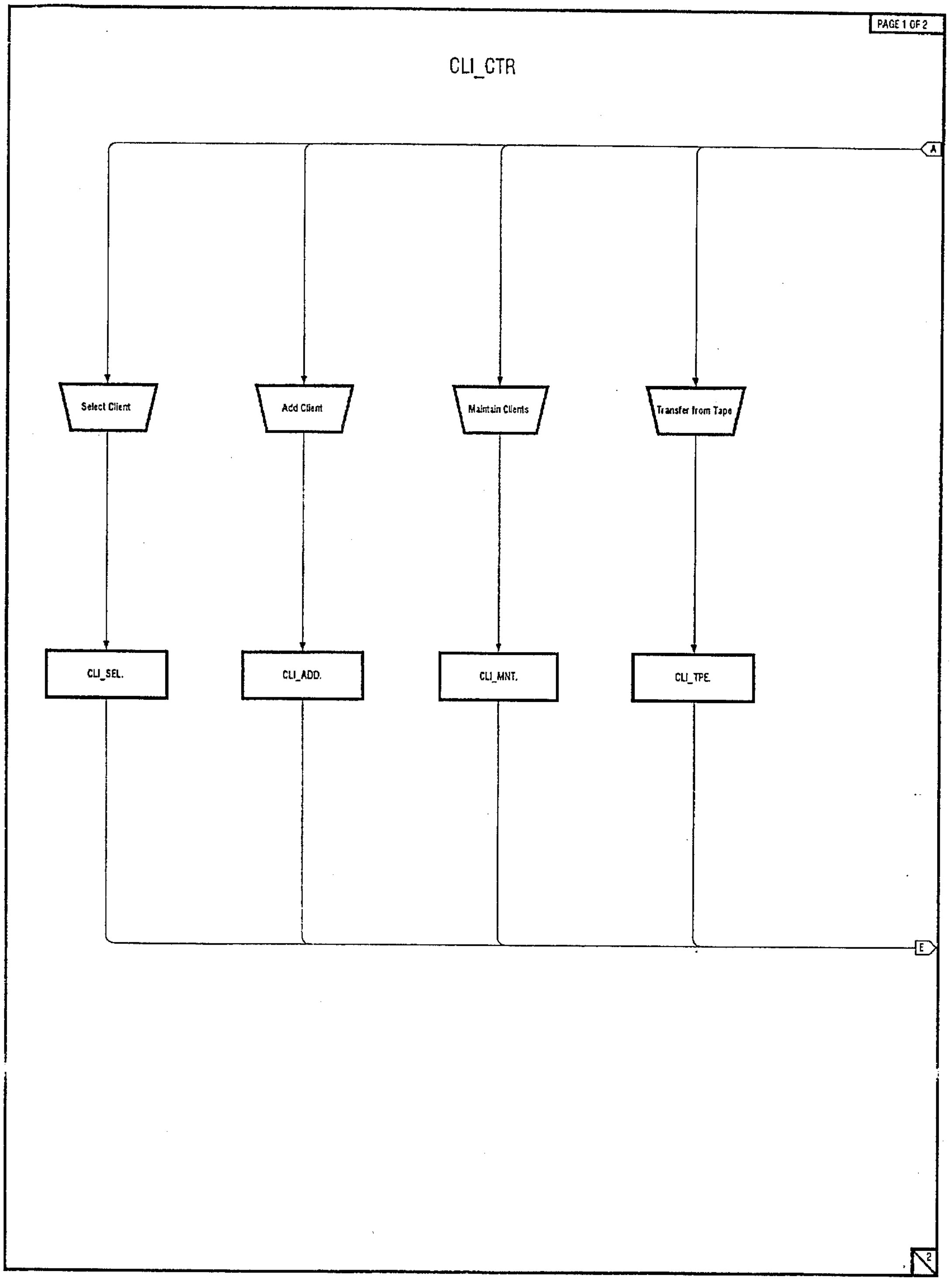
PAGE 1 OF 2
CLI_CTR
A
Select Client
Add Client
Maintain Clients
Transfer from Tape
CLI_SEL.
CLI_ADD.
CLI_MNT.
CLI_TPE.
E
2

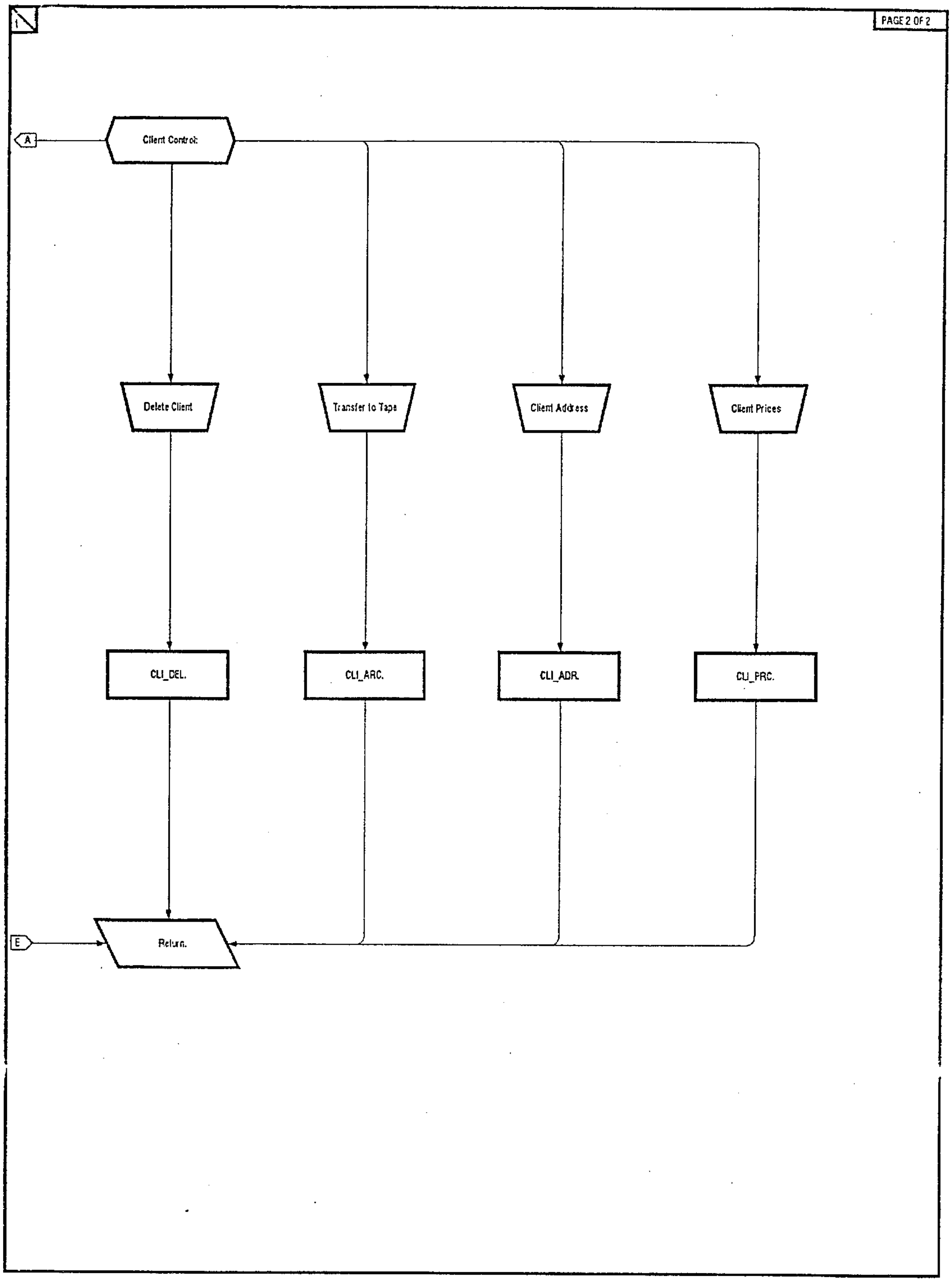
PAGE 2 OF 2
A
Client Control.
Delete Client
Transfer to Tape
Client Address
Client Prices
CLI_DEL.
CLI_ARC.
CLI_ADR.
CLI_PRC.
E
Return.

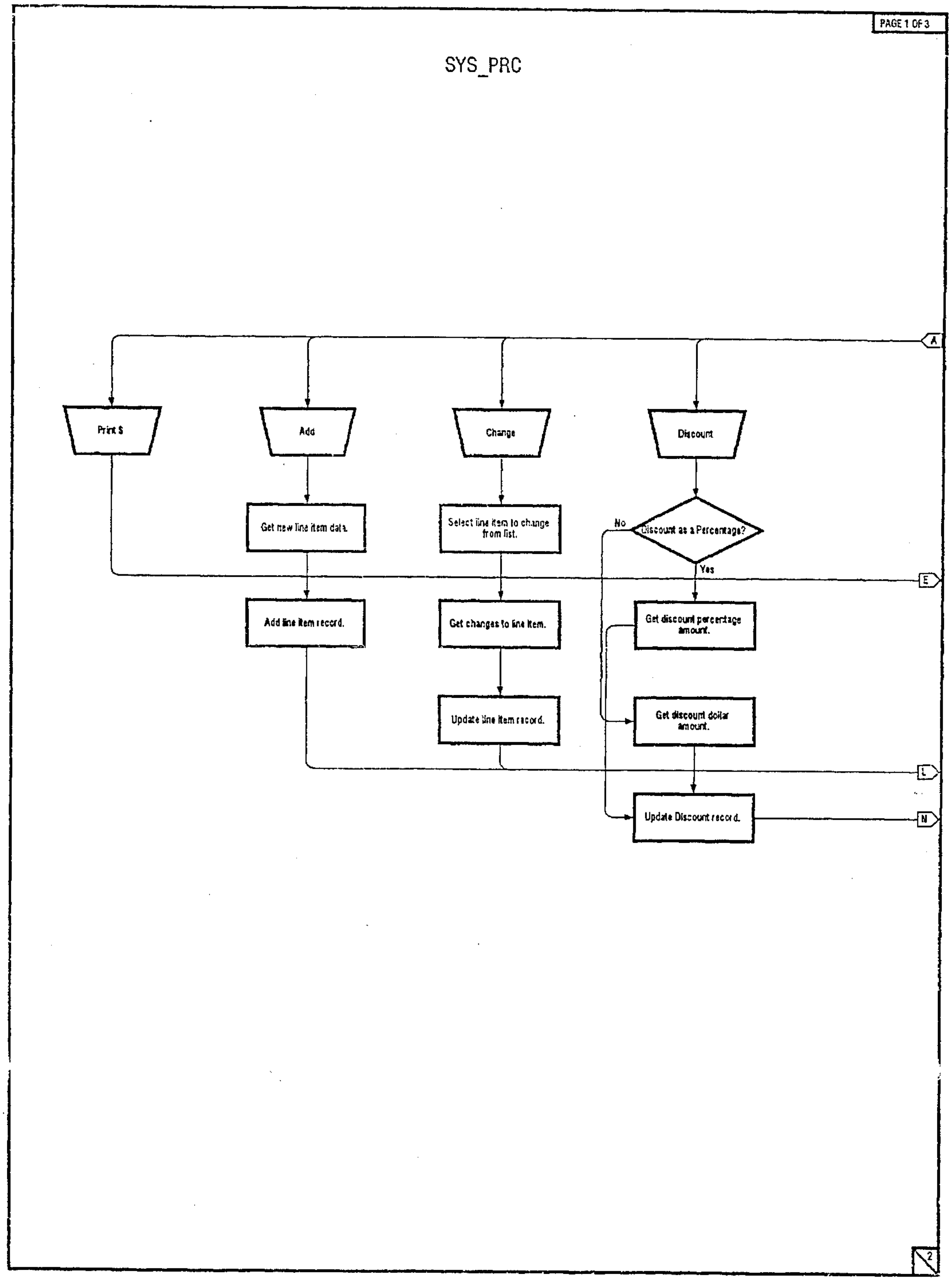
PAGE 1 OF 3
SYS_PRC
Print $
Add
Change
Discount
Get new line item data.
Select line item to change from list.
Discount as a Percentage?
No
Yes
Add line item record.
Get changes to line item.
Get discount percentage amount.
Update line item record.
Get discount dollar amount.
Update Discount record.
A
E
L
N
2

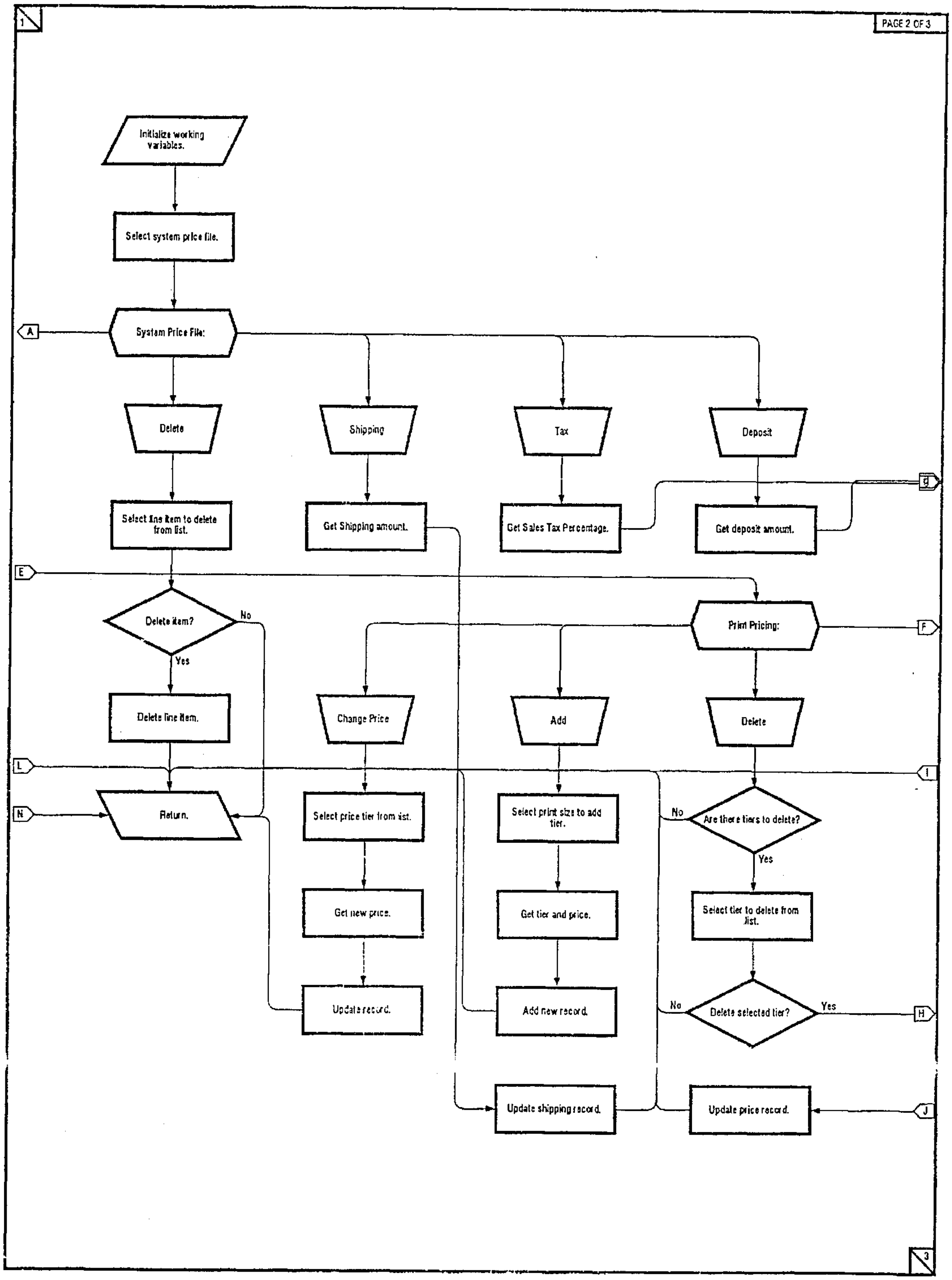
PAGE 2 OF 3
Initialize working variables.
Select system price file.
System Price File:
A
Delete
Shipping
Tax
Deposit
Select line item to delete from list.
Get Shipping amount.
Get Sales Tax Percentage.
Get deposit amount.
G
E
Delete item?
No
Yes
Print Pricing:
F
Delete line item.
Change Price
Add
Delete
L
I
N
Return.
Select price tier from list.
Select print size to add tier.
Are there tiers to delete?
No
Yes
Get new price.
Get tier and price.
Select tier to delete from list.
Update record.
Add new record.
Delete selected tier?
No
Yes
H
Update shipping record.
Update price record.
J
1
3

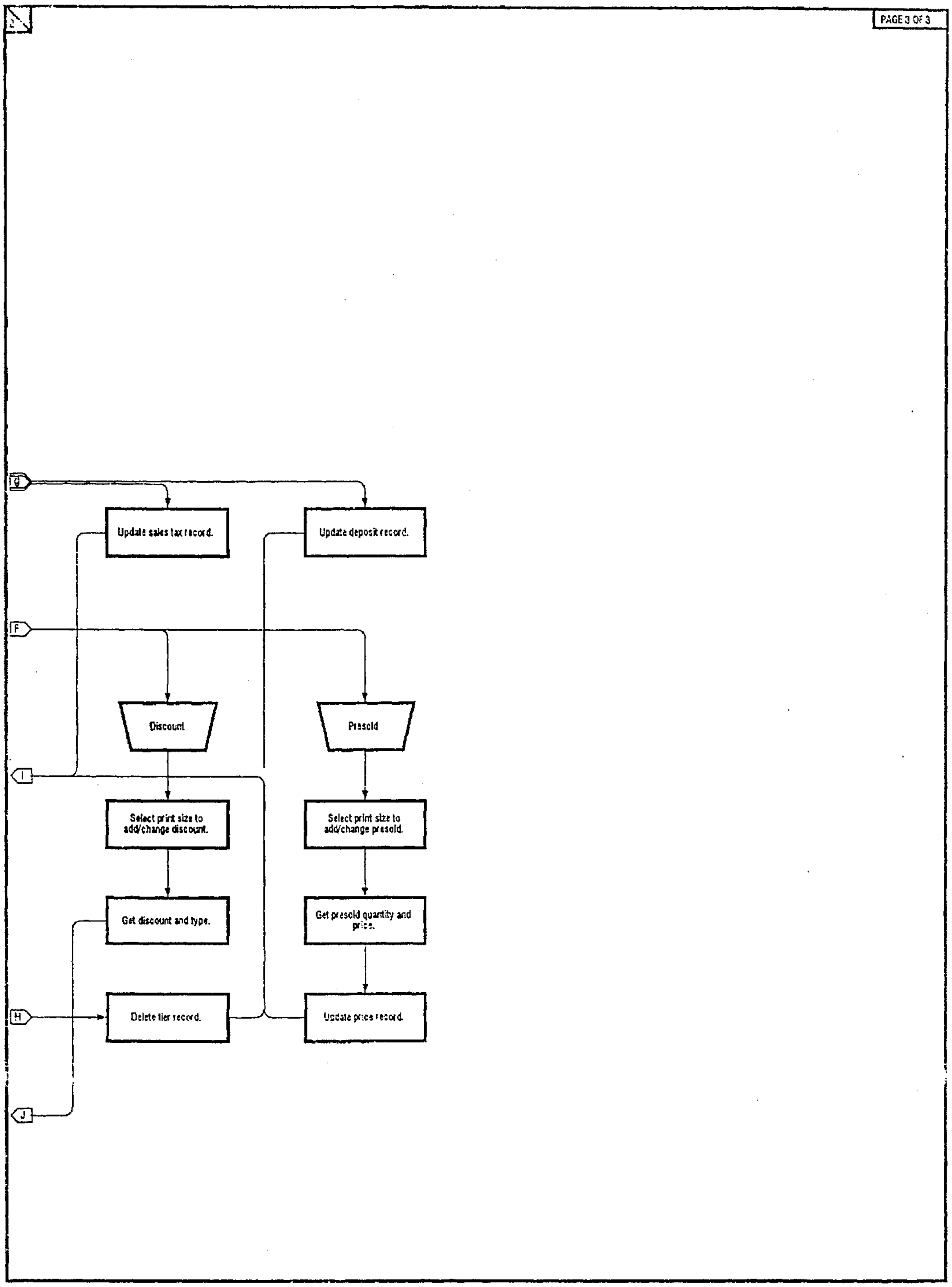
PAGE 3 OF 3
G
Update sales tax record.
Update deposit record.
F
Discount
Presold
I
Select print size to add/change discount.
Select print size to add/change presold.
Get discount and type.
Get presold quantity and price.
H
Delete tier record.
Update price record.
J

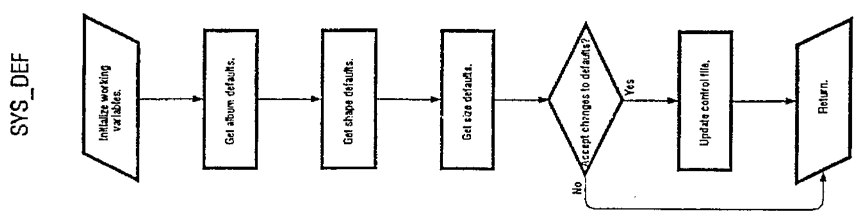
SYS_DEF
Initialize working variables.
Get album defaults.
Get shape defaults.
Get size defaults.
Accept changes to defaults?
Yes
No
Update control file.
Return.

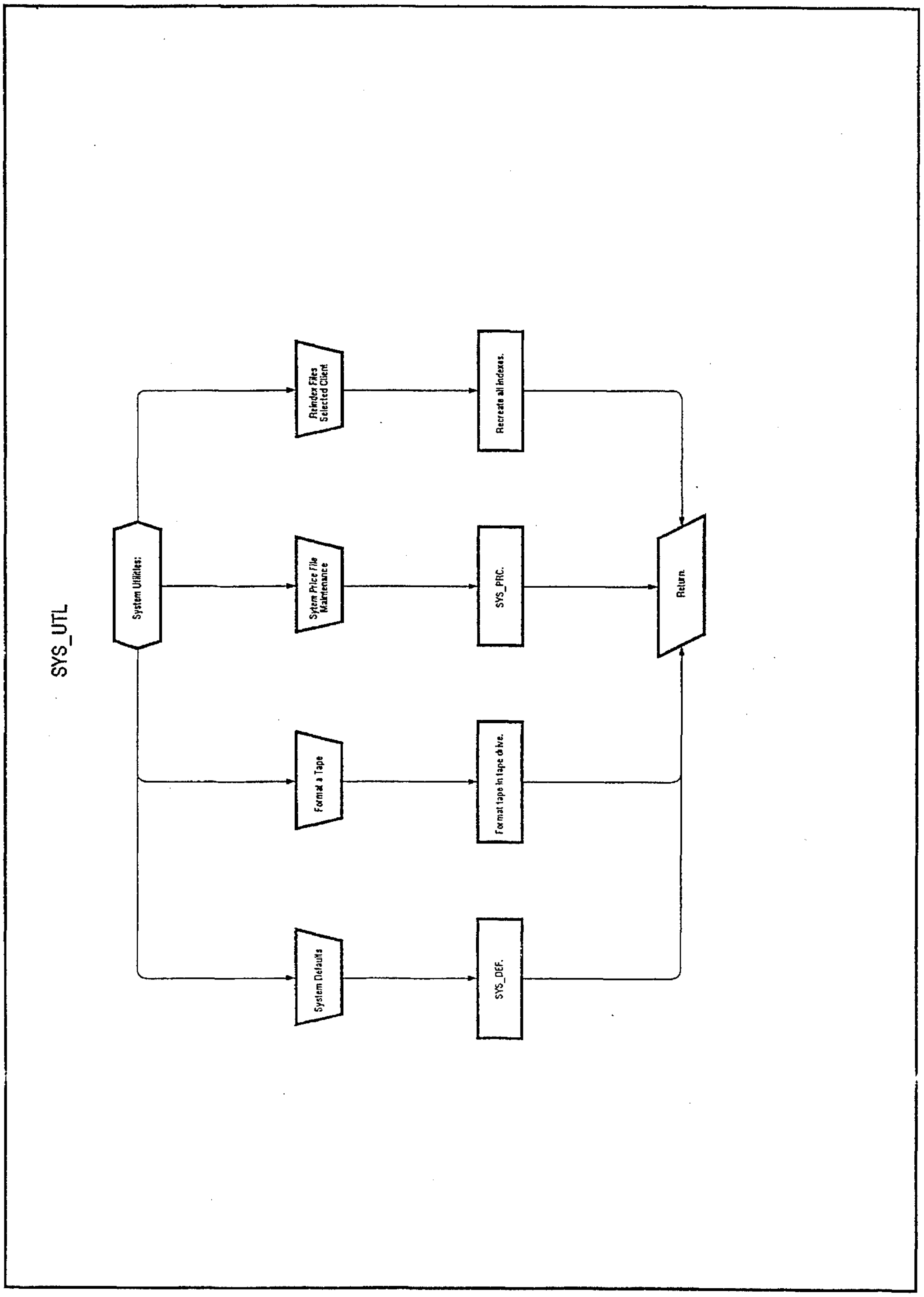
SYS_UTL
System Utilities:
Reindex Files
Selected Client
Recreate all indexes.
Sytem Price File
Maintenance
SYS_PRC.
Format a Tape
Format tape in tape drive.
System Defaults
SYS_DEF.
Return.

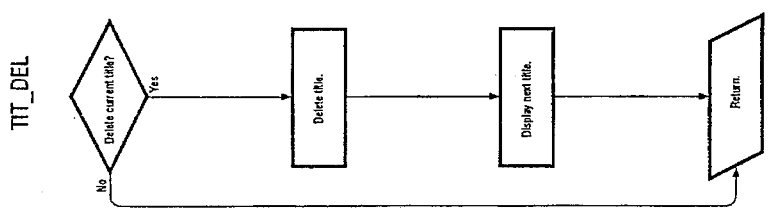
TIT_DEL
Delete current title?
Yes
No
Delete title.
Display next title.
Return.

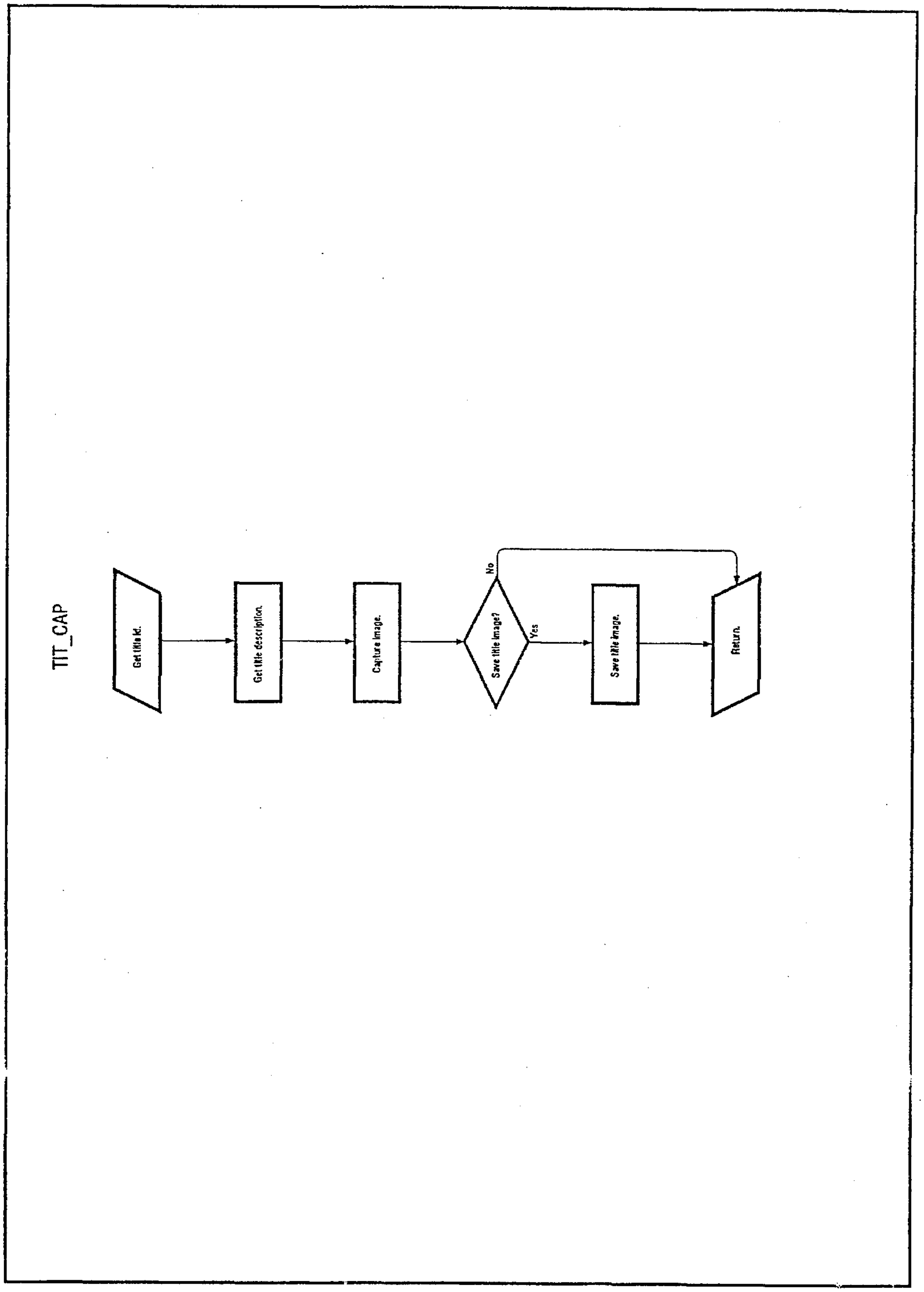
TIT_CAP
Get title id.
Get title description.
Capture image.
Save title image?
No
Yes
Save title image.
Return.

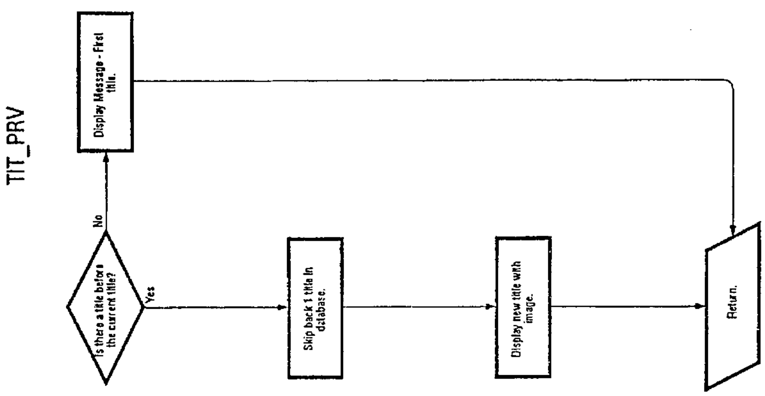
TIT_PRV
Is there a title before the current title?
No
Yes
Display Message - First title.
Skip back 1 title in database.
Display new title with image.
Return.

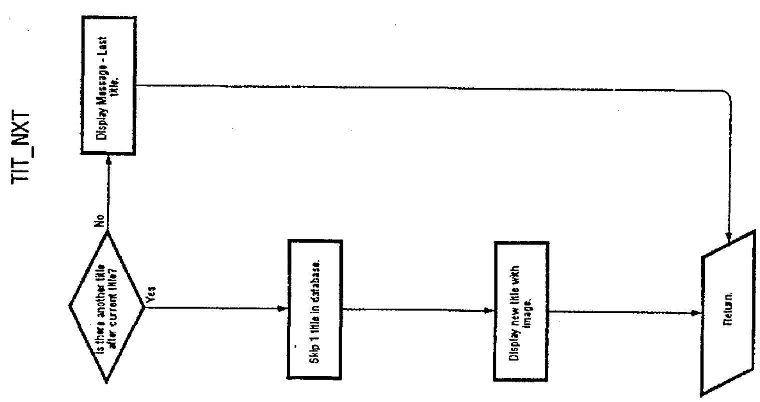
TIT_NXT
Is there another title after current title?
No
Display Message - Last title.
Yes
Skip 1 title in database.
Display new title with image.
Return.

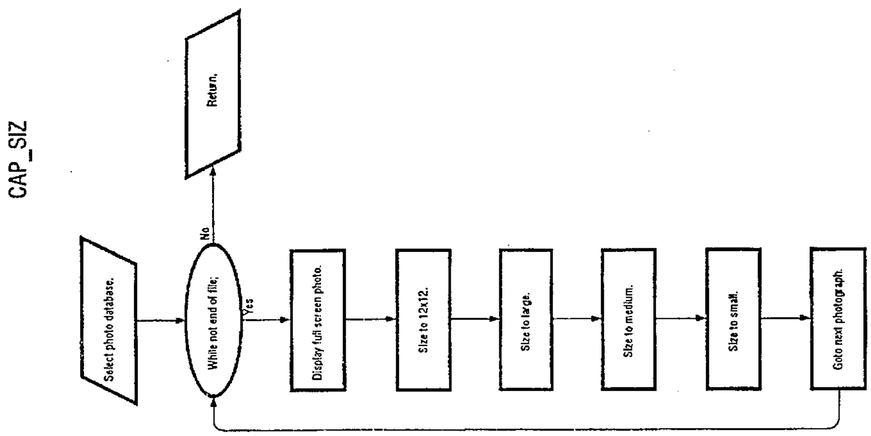
CAP_SIZ
Select photo database.
While not end of file;
No
Return.
Yes
Display full screen photo.
Size to 12x12.
Size to large.
Size to medium.
Size to small.
Goto next photograph.

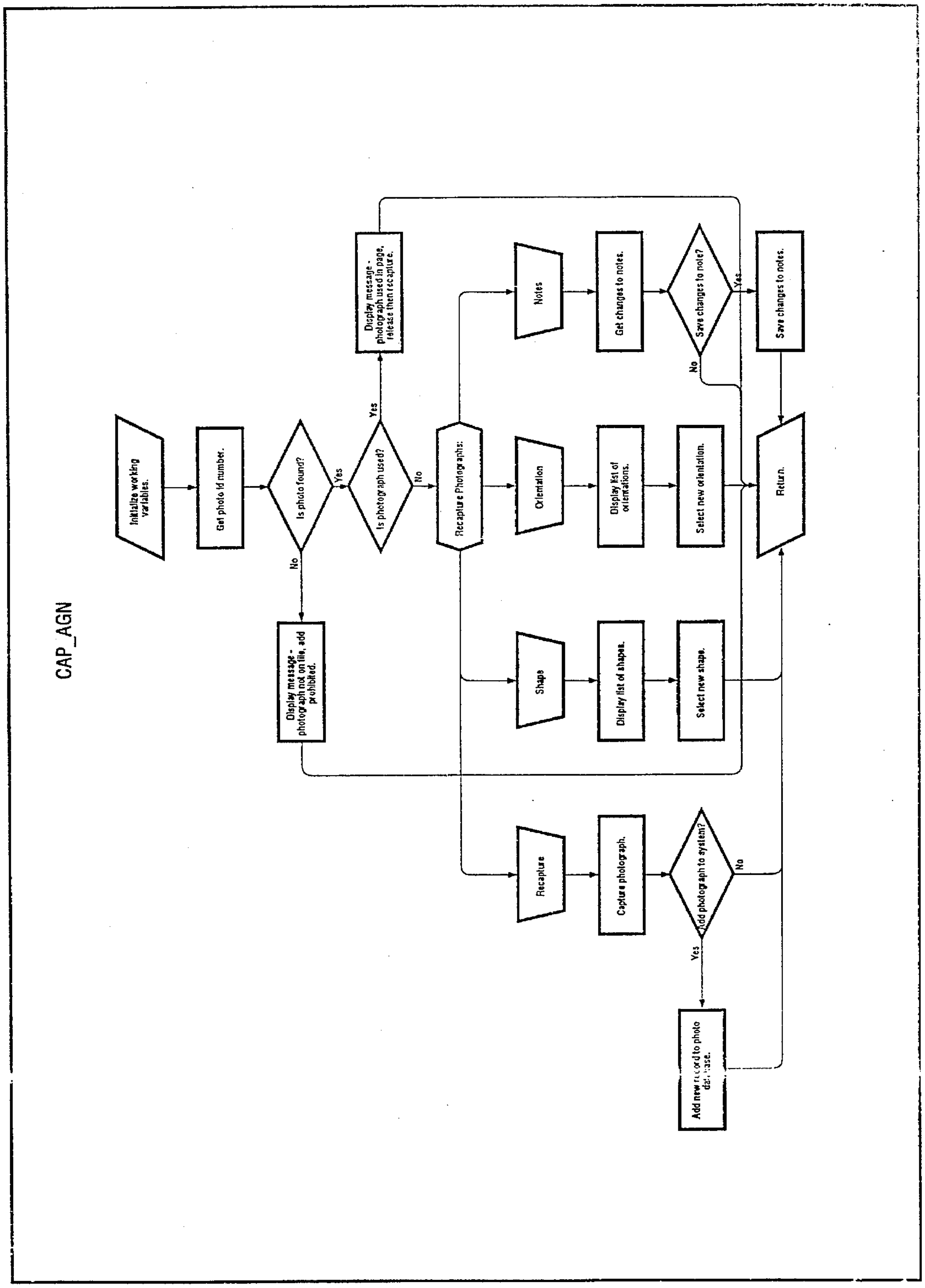
CAP_AGN
Initialize working variables.
Get photo Id number.
Is photo found?
Yes
No
Display message - photograph not on file, add prohibited.
Is photograph used?
Yes
Display message - photograph used in page, release then recapture.
No
Recapture Photographs:
Notes
Get changes to notes.
Save changes to notes?
Yes
No
Save changes to notes.
Orientation
Display list of orientations.
Select new orientation.
Return.
Shape
Display list of shapes.
Select new shape.
Recapture
Capture photograph.
Add photograph to system?
Yes
No

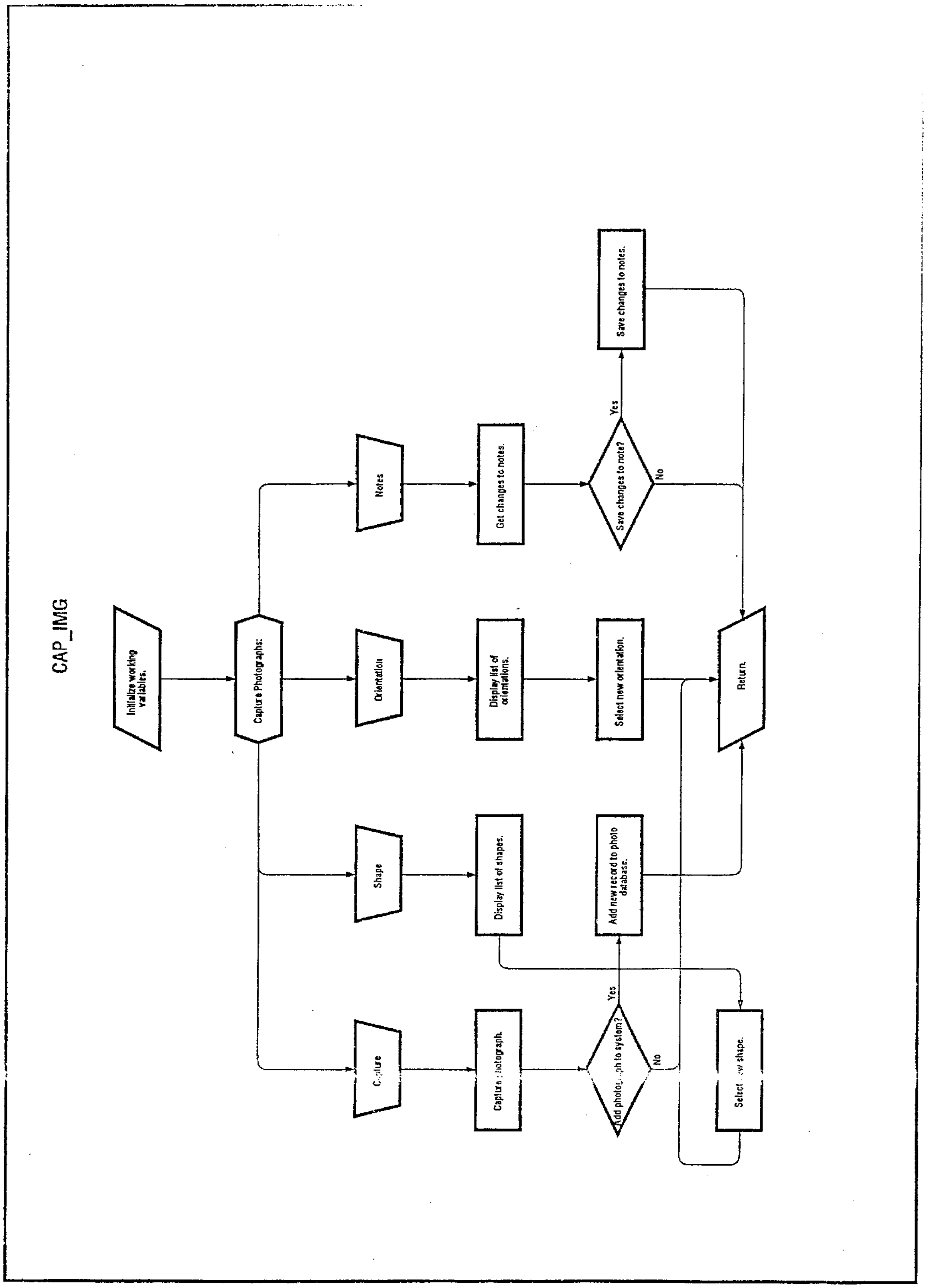
CAP_IMG
Initialize working variables.
Capture Photographs:
Notes
Orientation
Shape
Get changes to notes.
Save changes to note?
Yes
No
Save changes to notes.
Display list of orientations.
Select new orientation.
Return.
Display list of shapes.
Add new record to photo database.
Yes
No

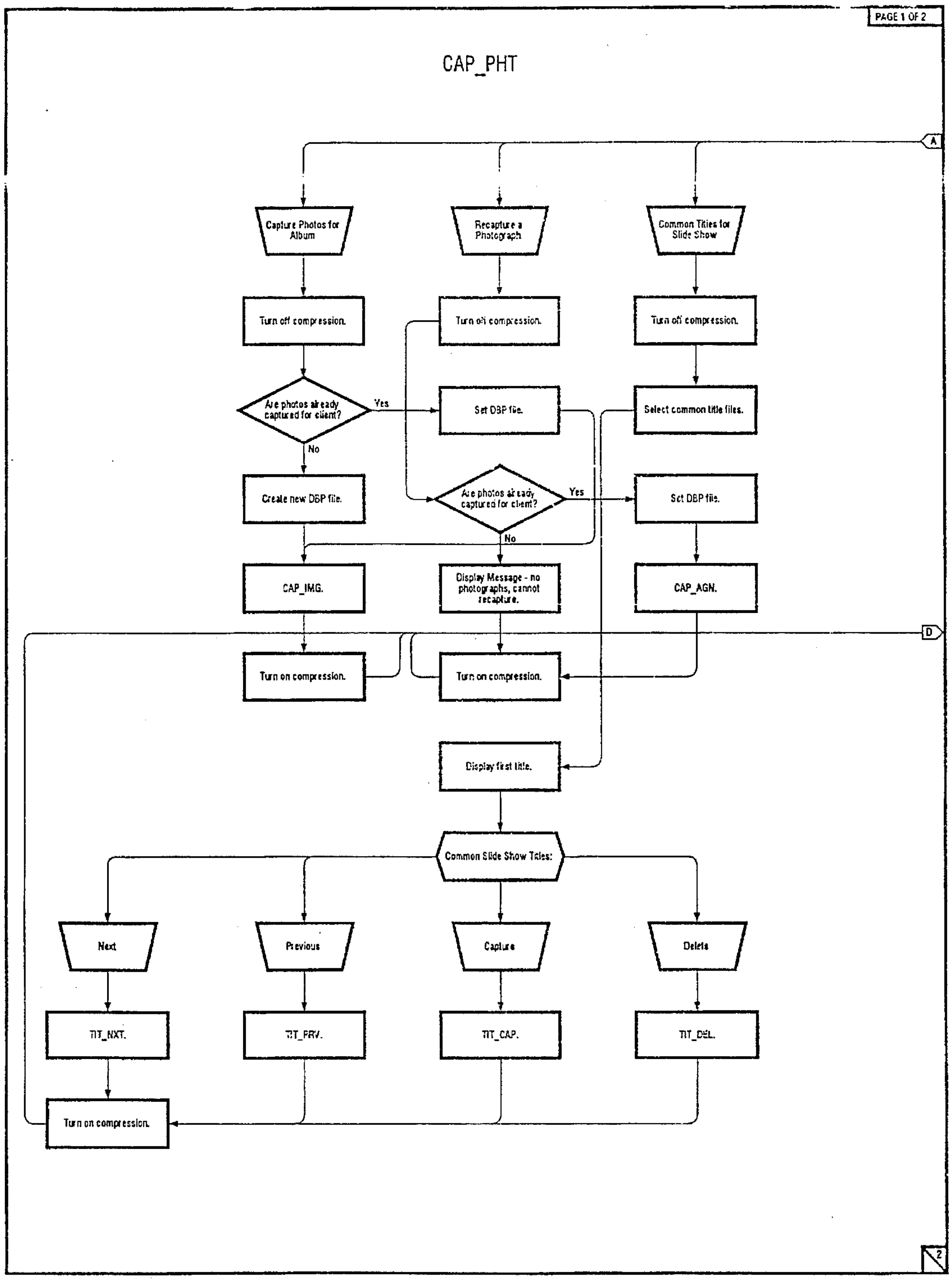
PAGE 1 OF 2
CAP_PHT
A
Capture Photos for Album
Recapture a Photograph
Common Titles for Slide Show
Turn off compression.
Turn off compression.
Turn off compression.
Are photos already captured for client?
Yes
No
Set DBP file.
Select common title files.
Create new DBP file.
Are photos already captured for client?
Yes
No
Set DBP file.
CAP_IMG.
Display Message - no photographs, cannot recapture.
CAP_AGN.
D
Turn on compression.
Turn on compression.
Display first title.
Common Slide Show Titles:
Next
Previous
Capture
Delete
TIT_NXT.
TIT_PRV.
TIT_CAP.
TIT_DEL.
Turn on compression.
2

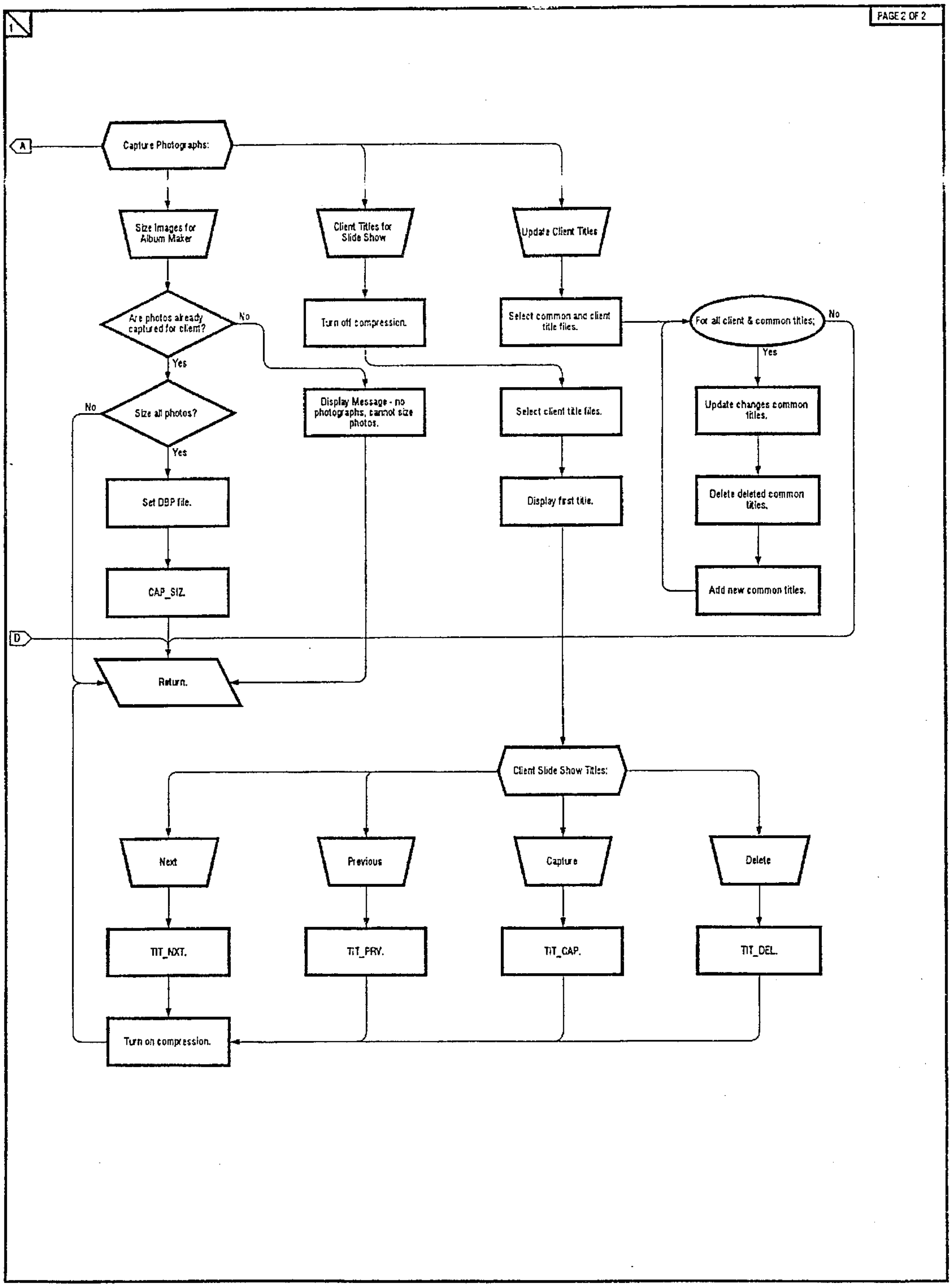
PAGE 2 OF 2
1
A
Capture Photographs:
Size Images for Album Maker
Client Titles for Slide Show
Update Client Titles
Are photos already captured for client?
No
Yes
Turn off compression.
Select common and client title files.
For all client & common titles;
No
Yes
Size all photos?
No
Yes
Display Message - no photographs, cannot size photos.
Select client title files.
Update changes common titles.
Set DBP file.
Display first title.
Delete deleted common titles.
CAP_SIZ.
Add new common titles.
D
Return.
Client Slide Show Titles:
Next
Previous
Capture
Delete
TIT_NXT.
TIT_PRV.
TIT_CAP.
TIT_DEL.
Turn on compression.

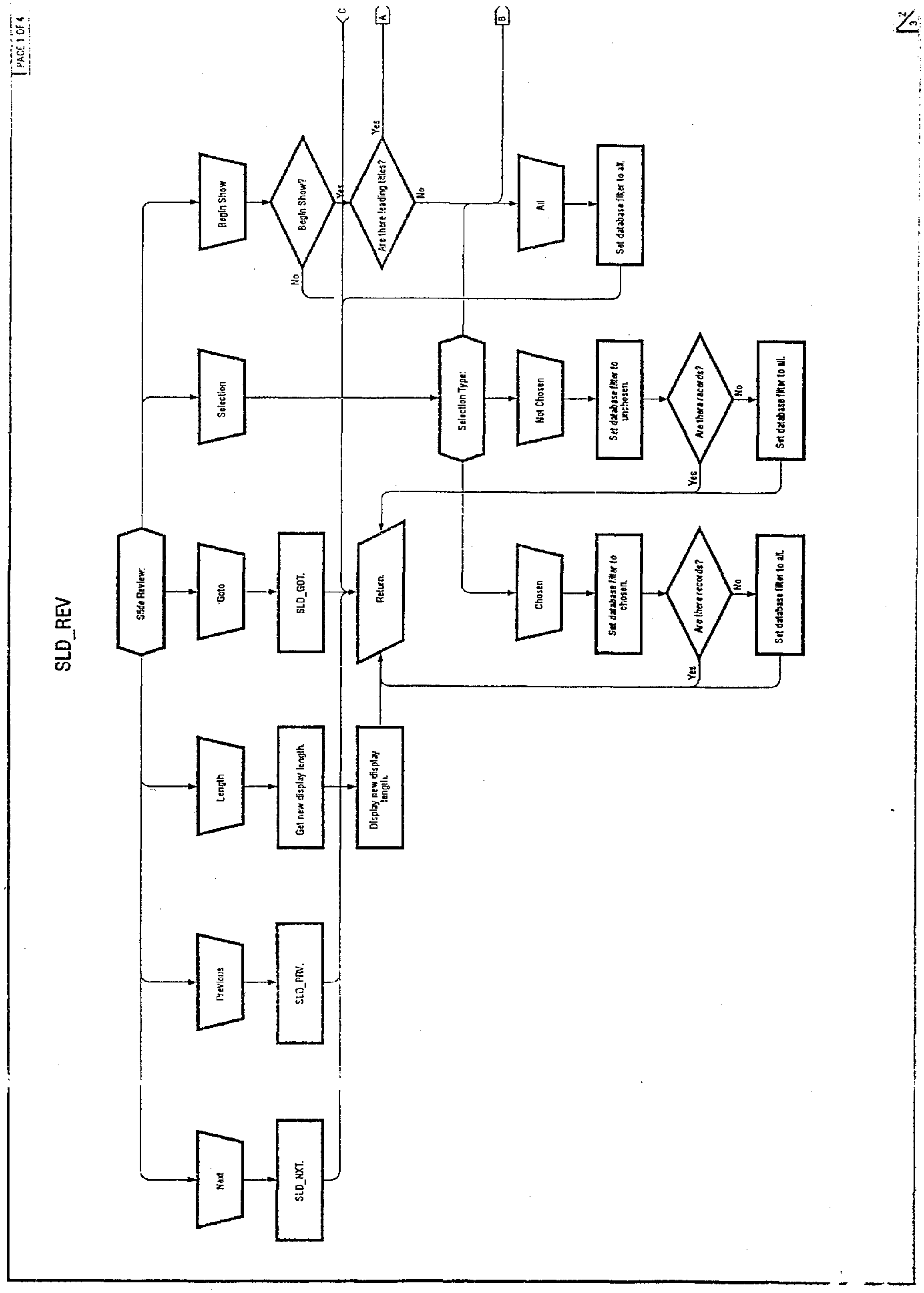
PAGE 1 OF 4
SLD_REV
Slide Review:
Next
SLD_NXT.
Previous
SLD_PRV.
Length
Get new display length.
Display new display length.
Goto
SLD_GOT.
Return.
Selection
Selection Type:
Not Chosen
Set database filter to unchosen.
Are there records?
Yes
No
Set database filter to all.
Chosen
Set database filter to chosen.
Are there records?
Yes
No
Set database filter to all.
Begin Show
Begin Show?
Yes
No
Are there leading titles?
Yes
No
All
Set database filter to all.
A
B
C

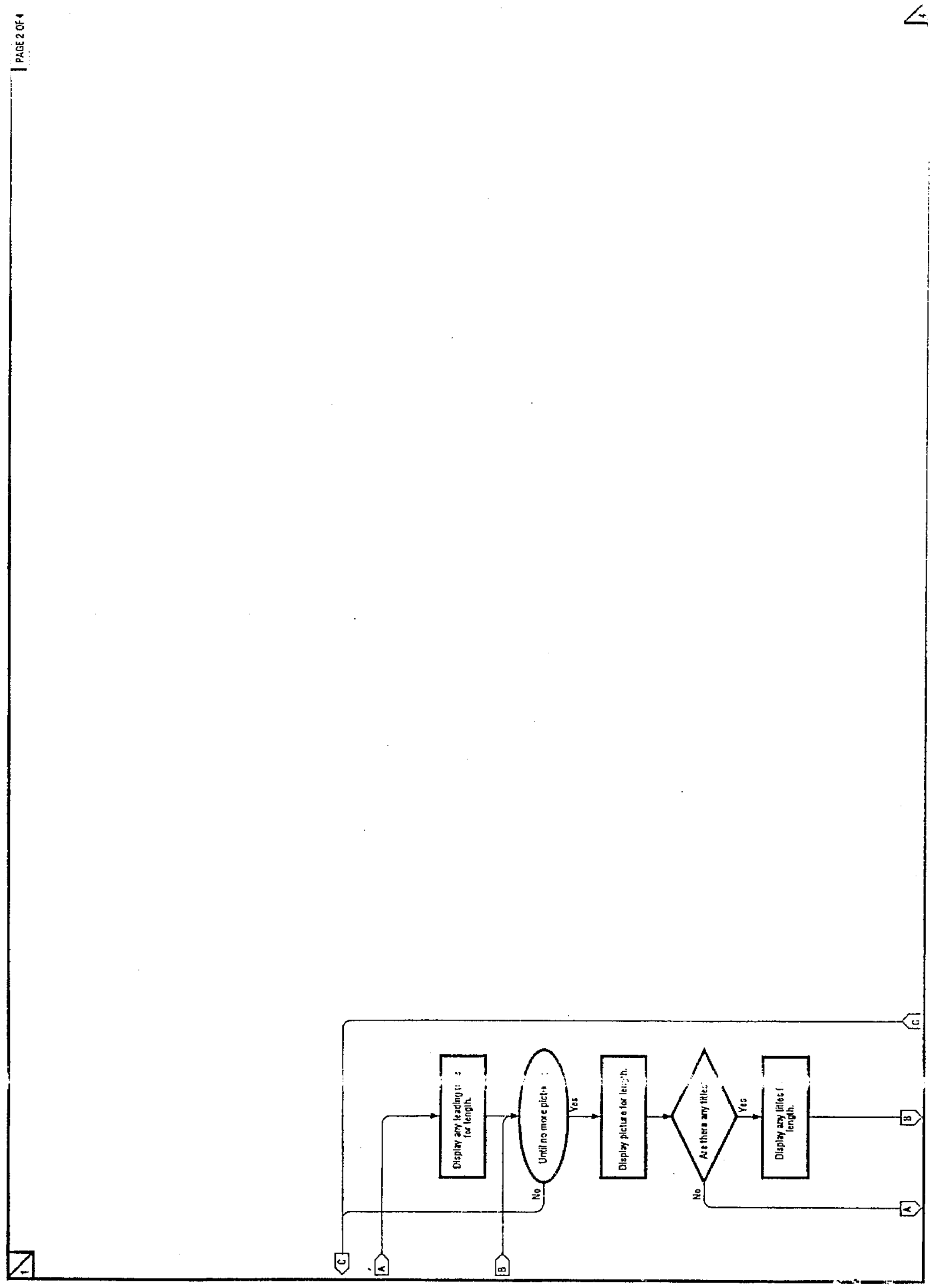
PAGE 2 OF 4
Yes
No
Yes
No
A
B
C

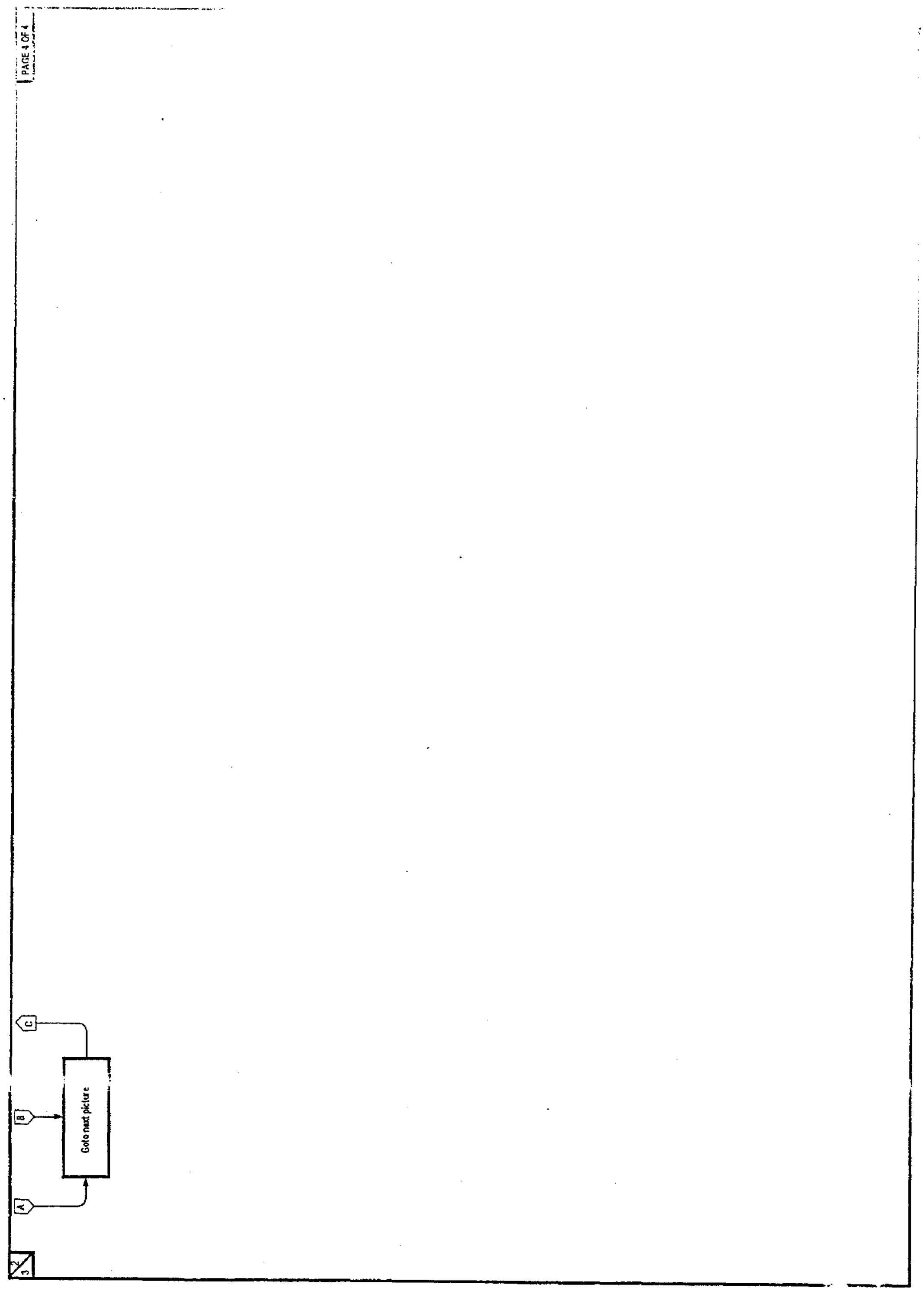
PAGE 4 OF 4
Goto next picture
A
B
C
2
3

SLD_TIT
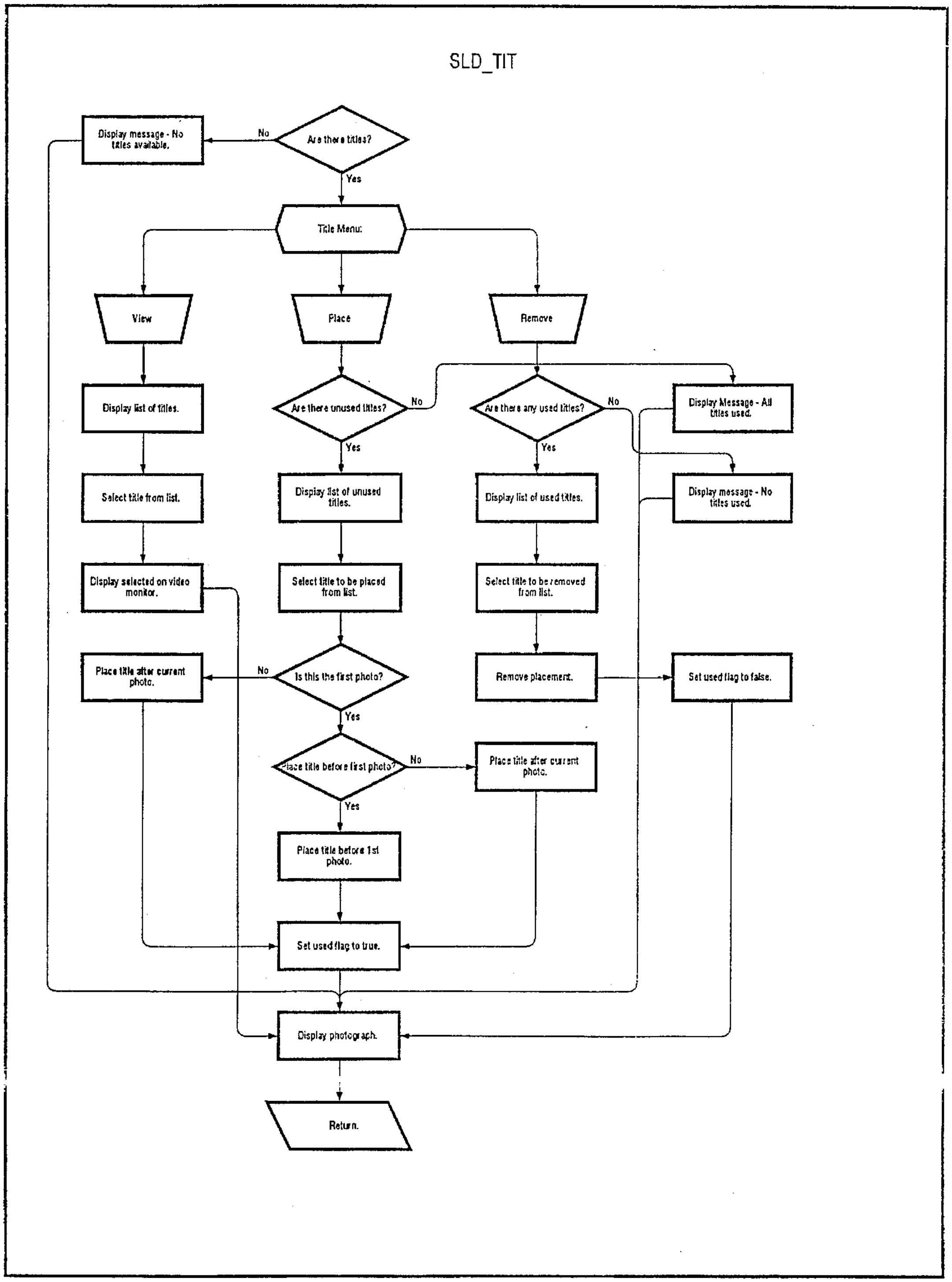

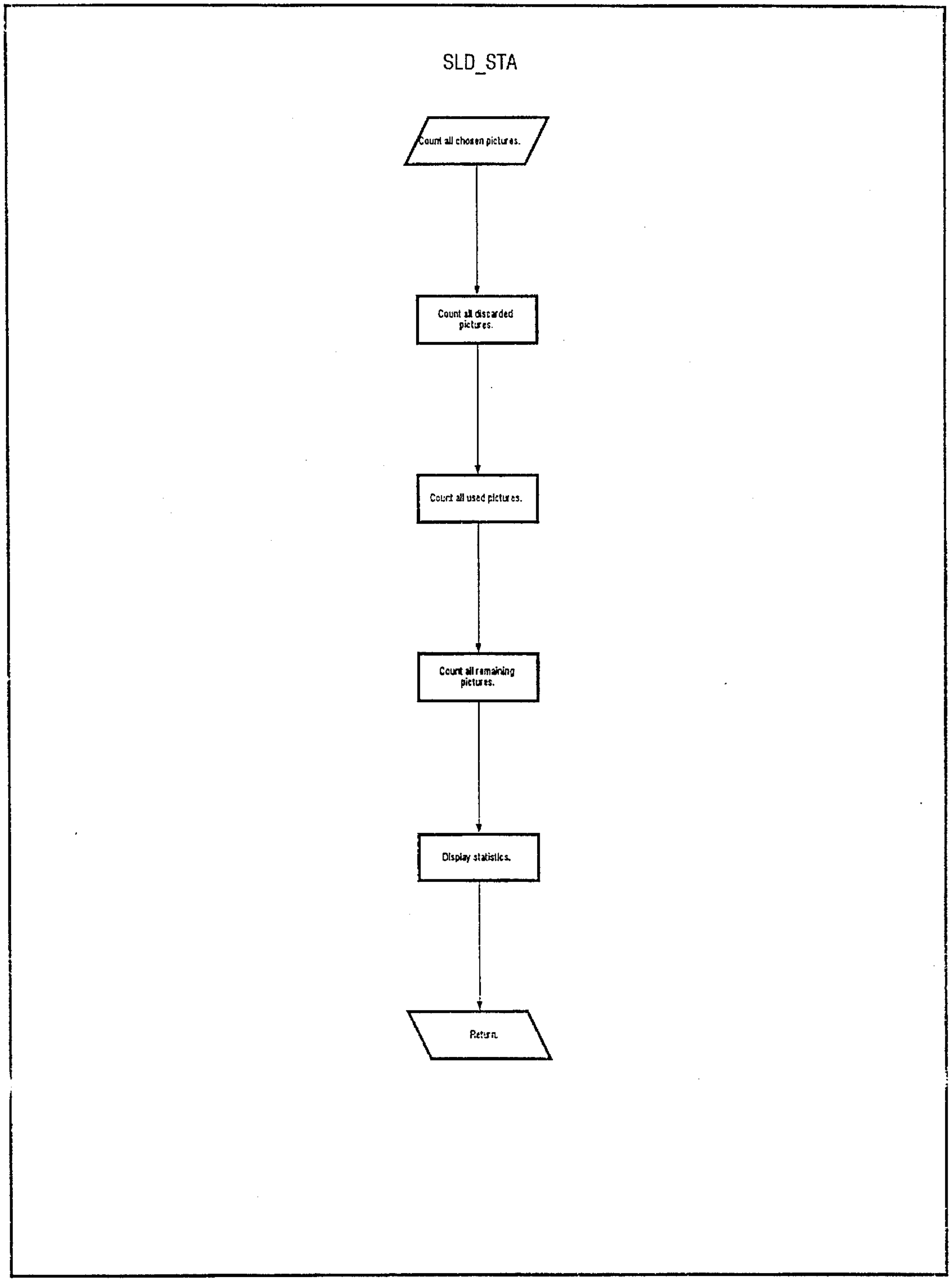
SLD_STA
Count all chosen pictures.
Count all discarded pictures.
Count all used pictures.
Count all remaining pictures.
Display statistics.
Return.

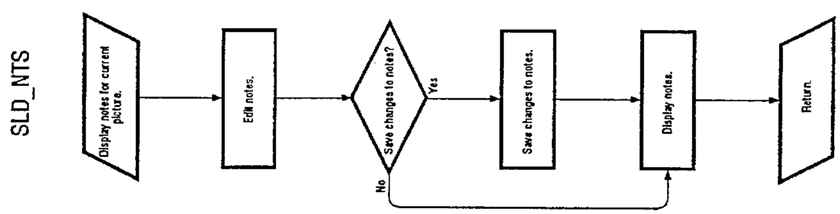
SLD_NTS
Display notes for current picture.
Edit notes.
Save changes to notes?
Yes
No
Save changes to notes.
Display notes.
Return.

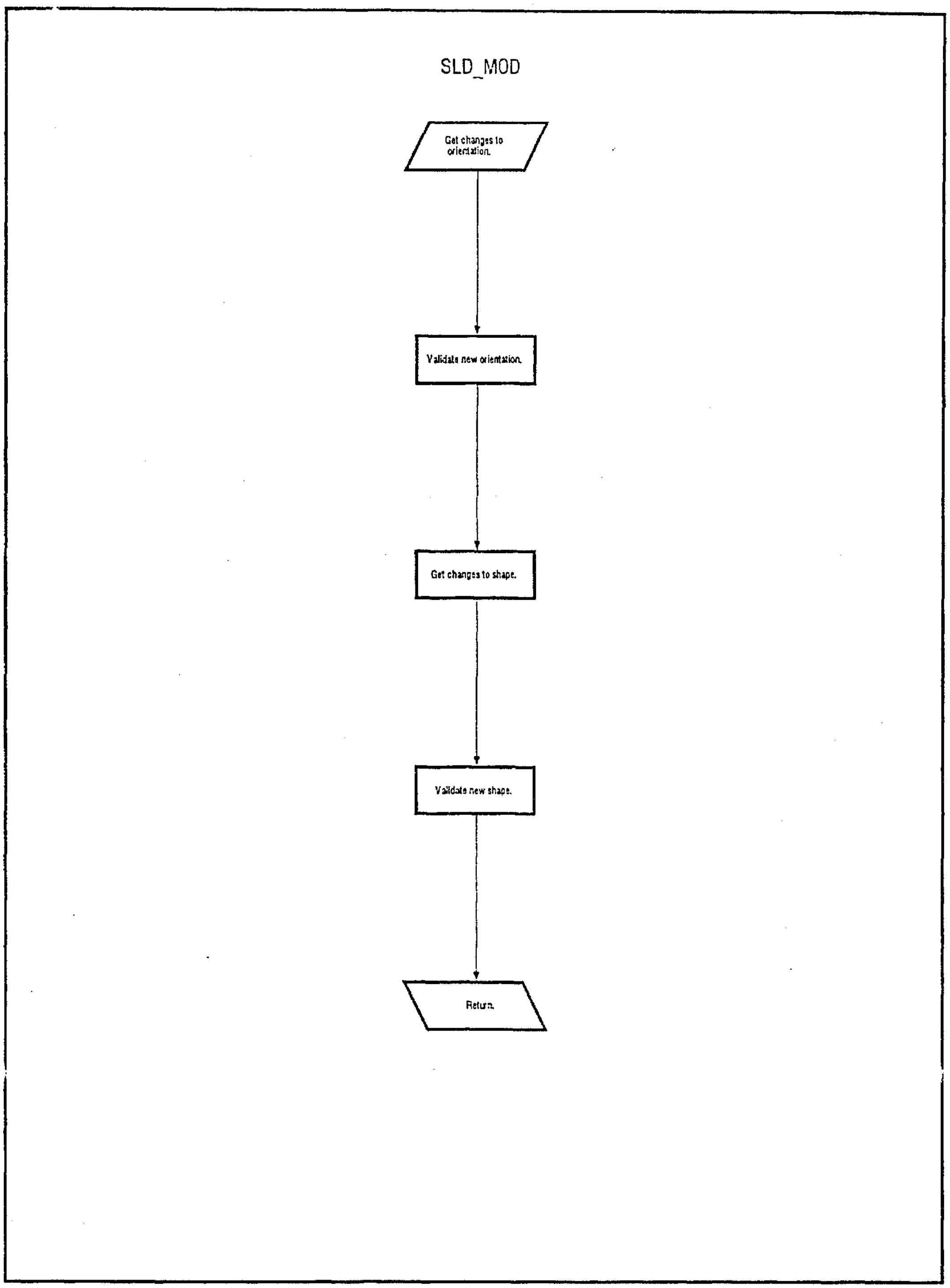
SLD_MOD
Get changes to orientation.
Validate new orientation.
Get changes to shape.
Validate new shape.
Return.

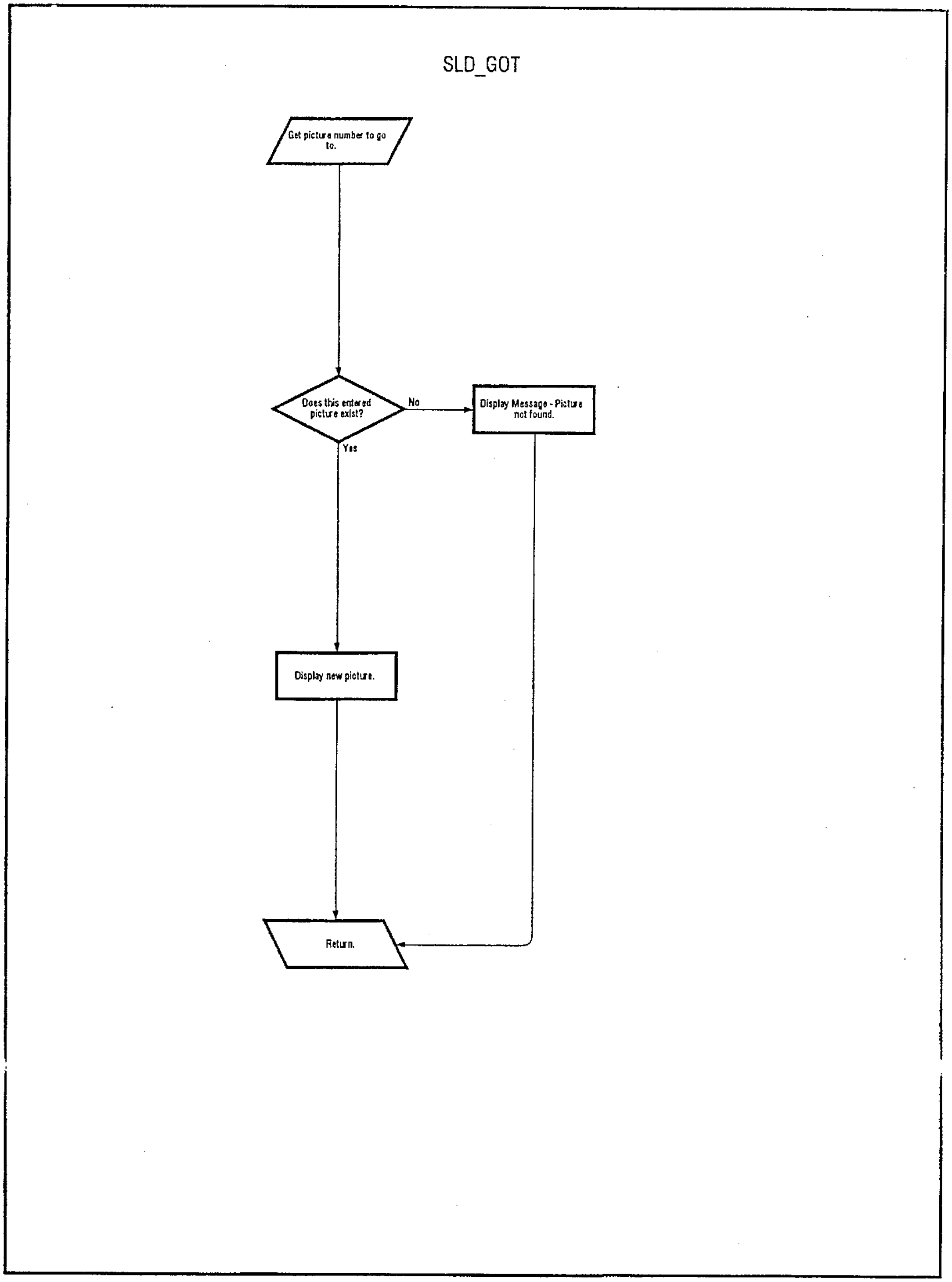
SLD_GOT
Get picture number to go to.
Does this entered picture exist?
No
Display Message - Picture not found.
Yes
Display new picture.
Return.

SLD_NXT
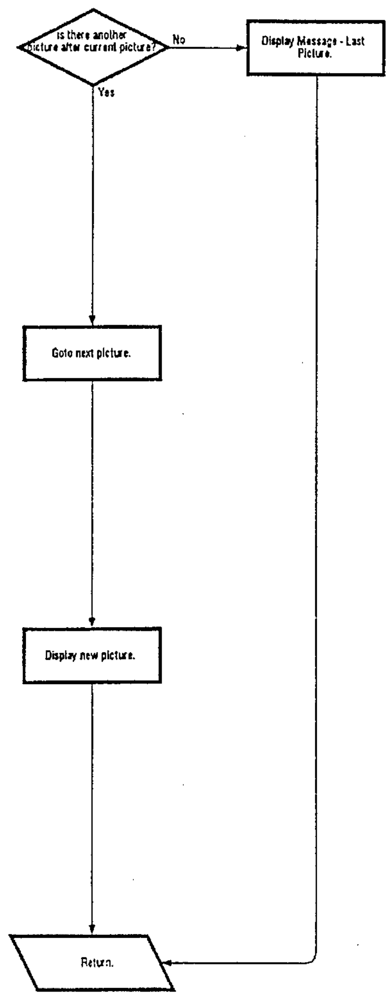

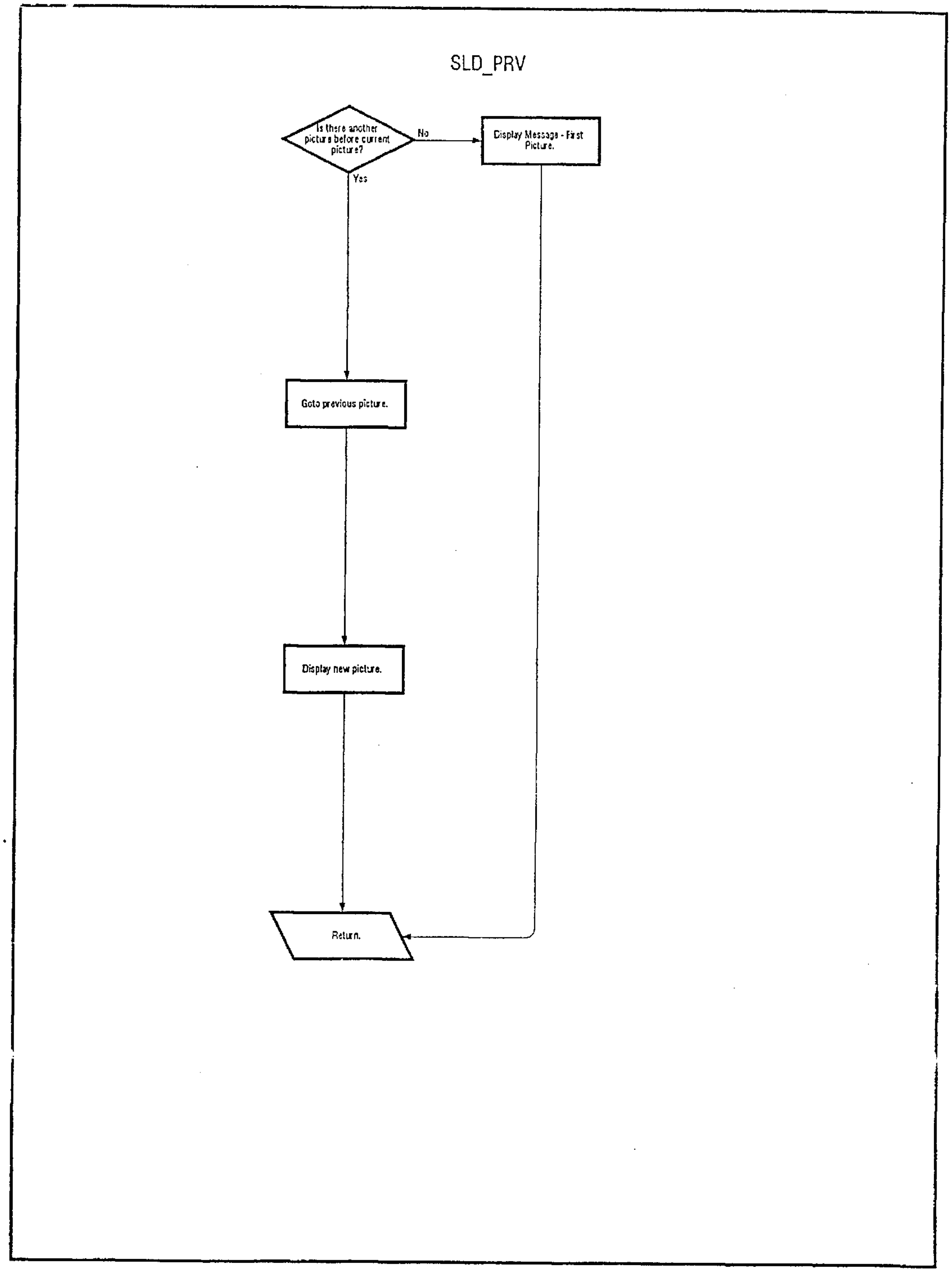
SLD_PRV
Is there another picture before current picture?
No
Yes
Display Message - First Picture.
Goto previous picture.
Display new picture.
Return.

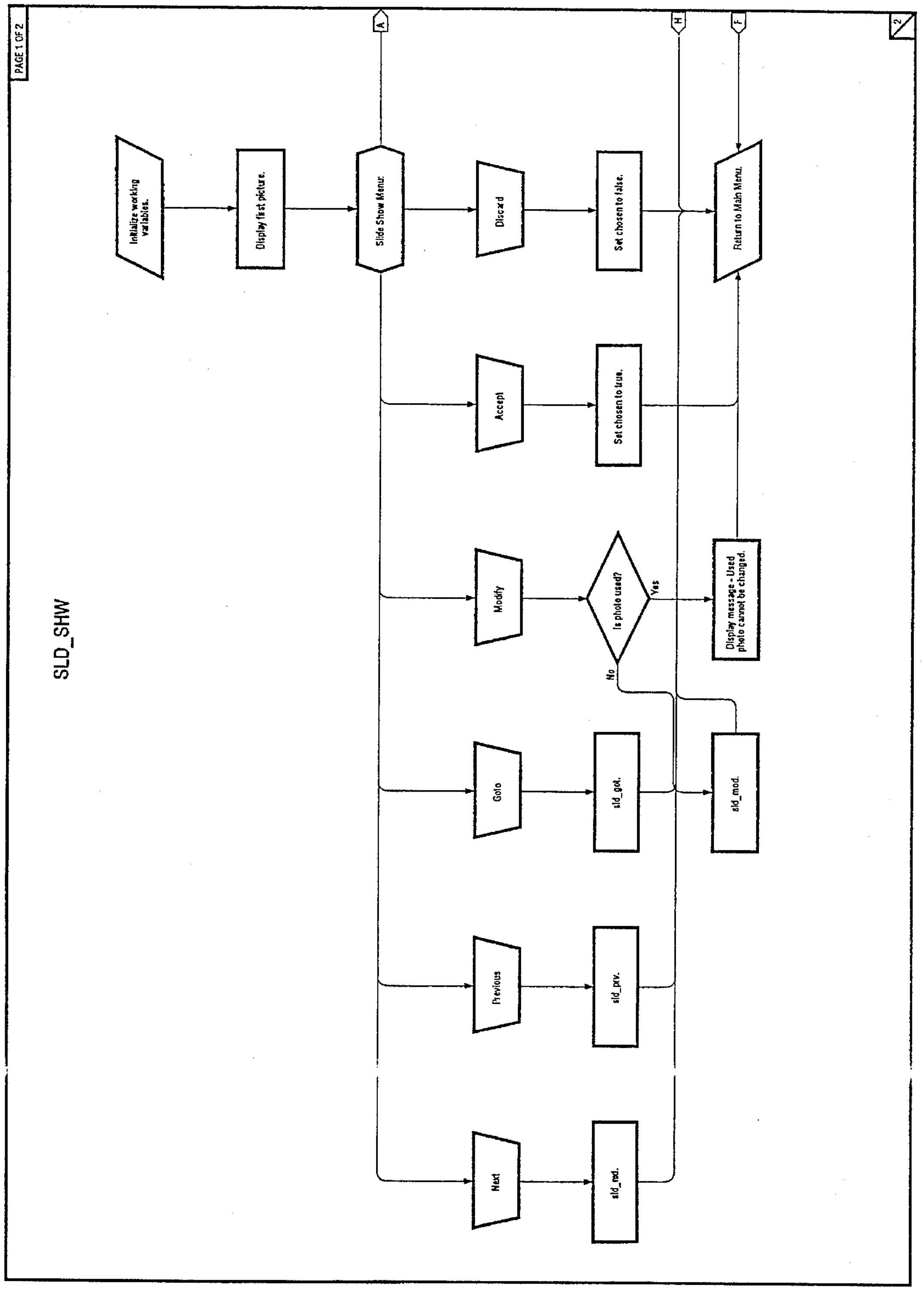
PAGE 1 OF 2
SLD_SHW
A
H
F
2
Initialize working variables.
Display first picture.
Slide Show Menu.
Discard
Set chosen to false.
Return to Main Menu.
Accept
Set chosen to true.
Modify
Is photo used?
Yes
No
Display message - Used photo cannot be changed.
Goto
sld_got.
sld_mod.
Previous
sld_prv.
Next
sld_nxt.

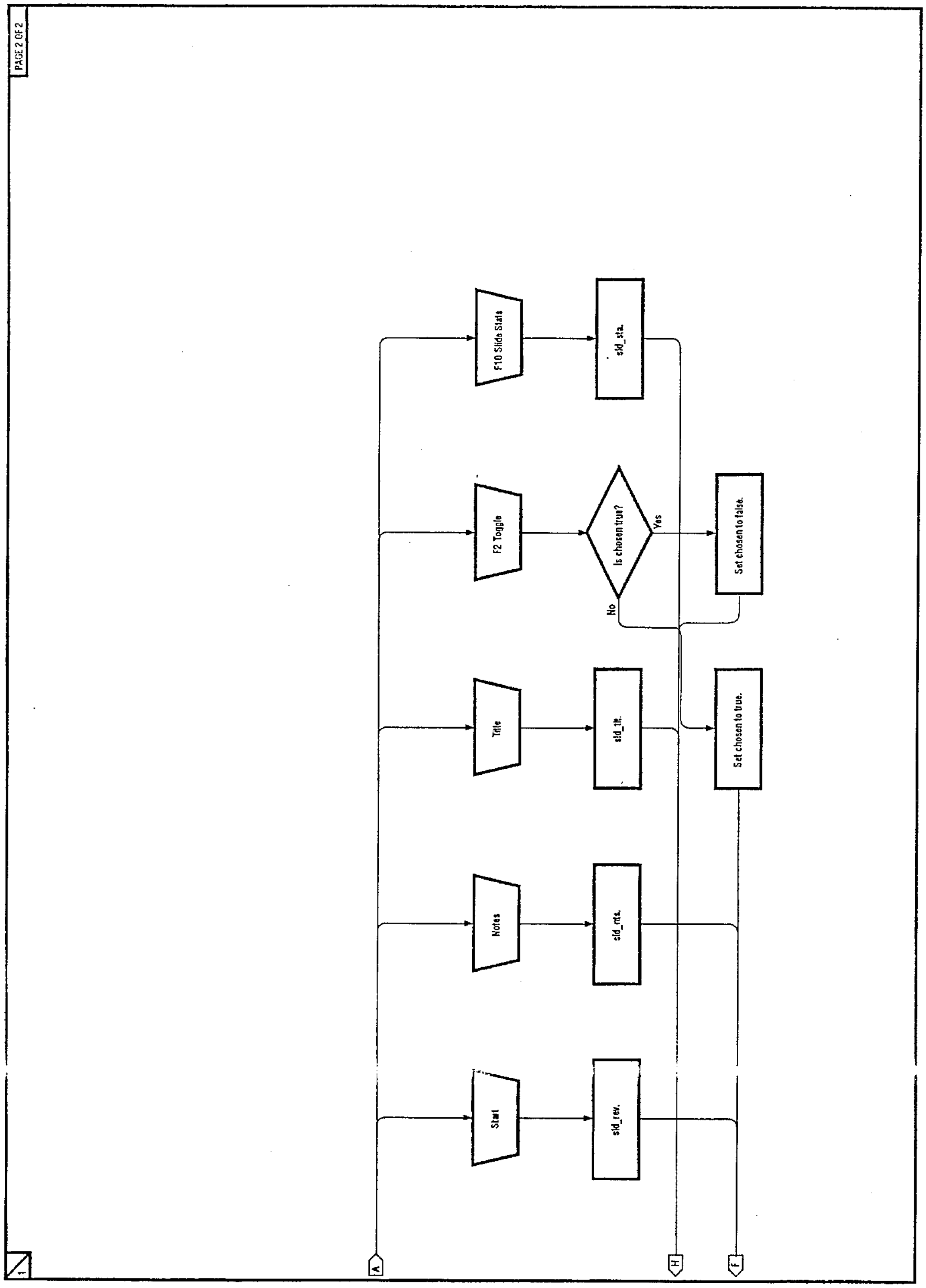
PAGE 2 OF 2
F10 Slide Stats
sld_sta.
F2 Toggle
Is chosen true?
Yes
No
Set chosen to false.
Title
sld_ttl.
Set chosen to true.
Notes
sld_nts.
Start
sld_rev.
A
H
F
1

SPC_DEL
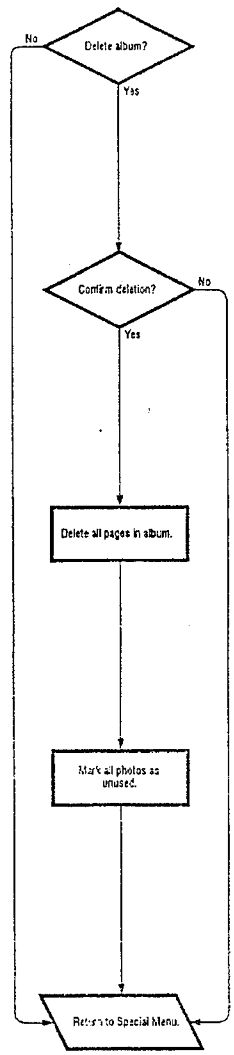

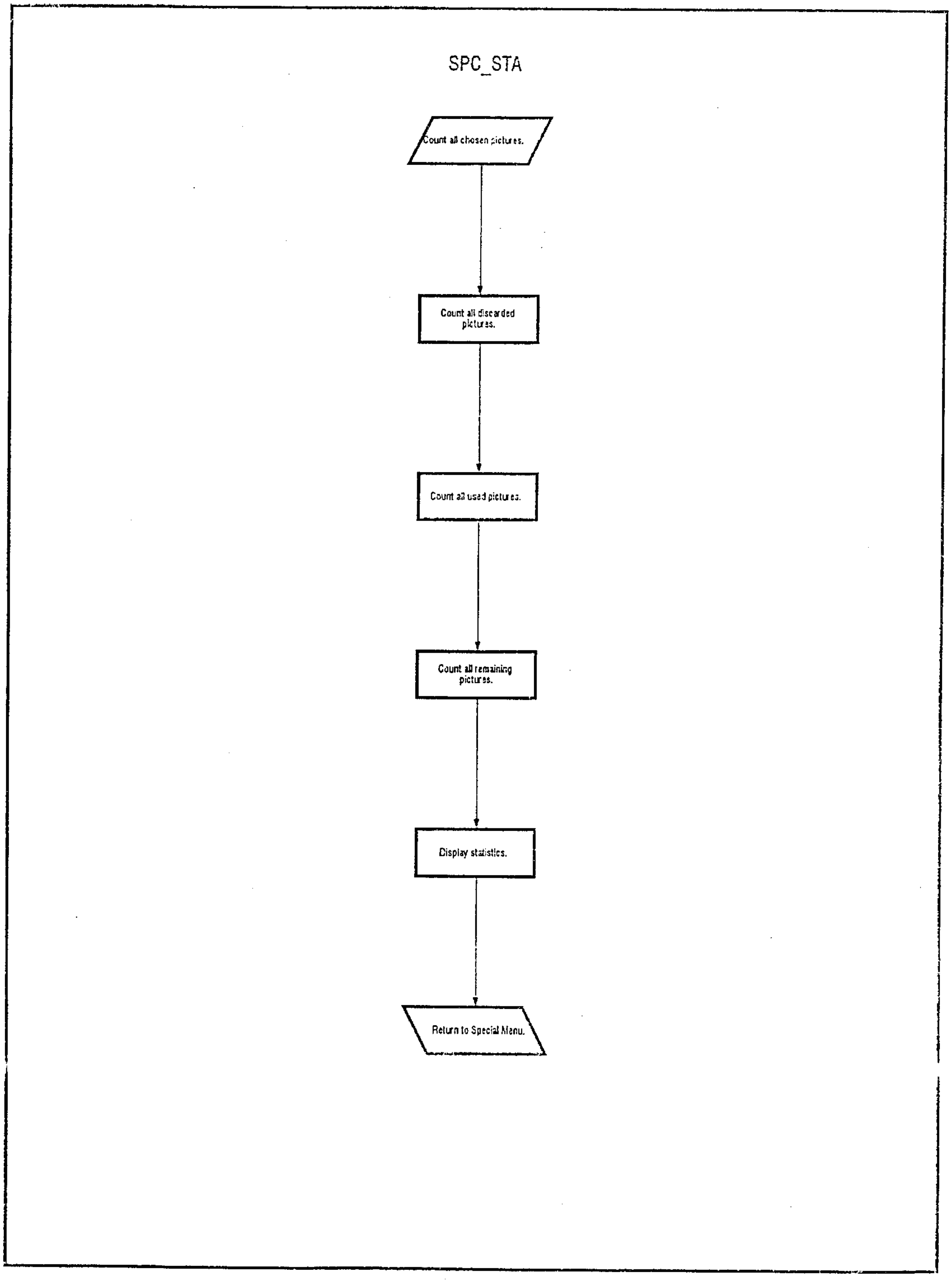
SPC_STA
Count all chosen pictures.
Count all discarded pictures.
Count all used pictures.
Count all remaining pictures.
Display statistics.
Return to Special Menu.

SPC_MFG
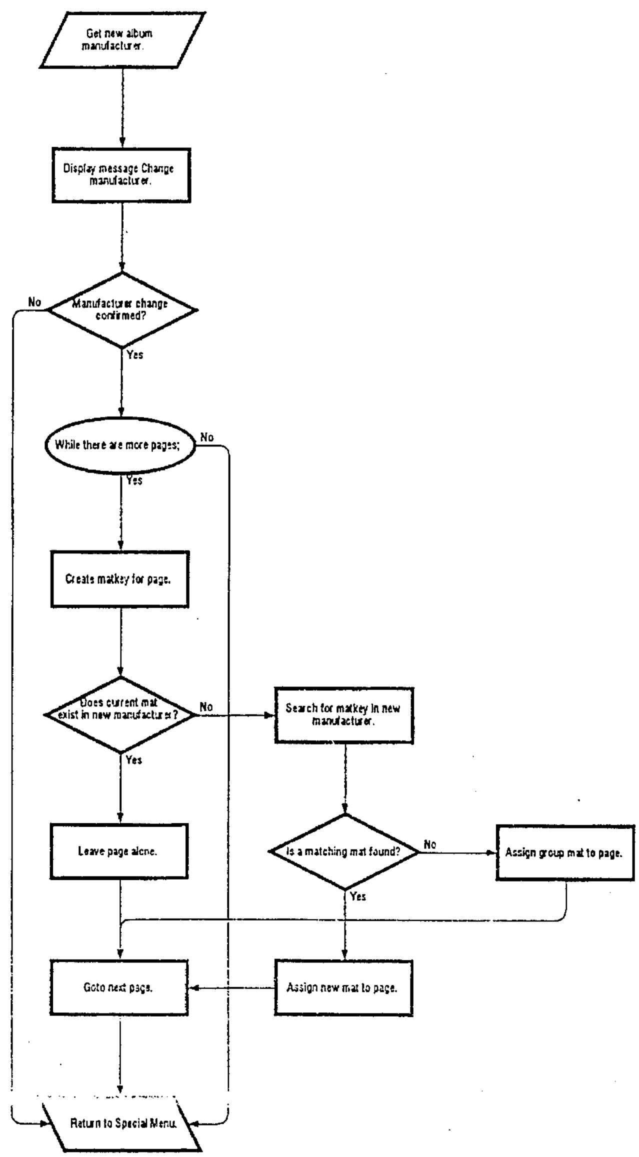

ALB_BEG
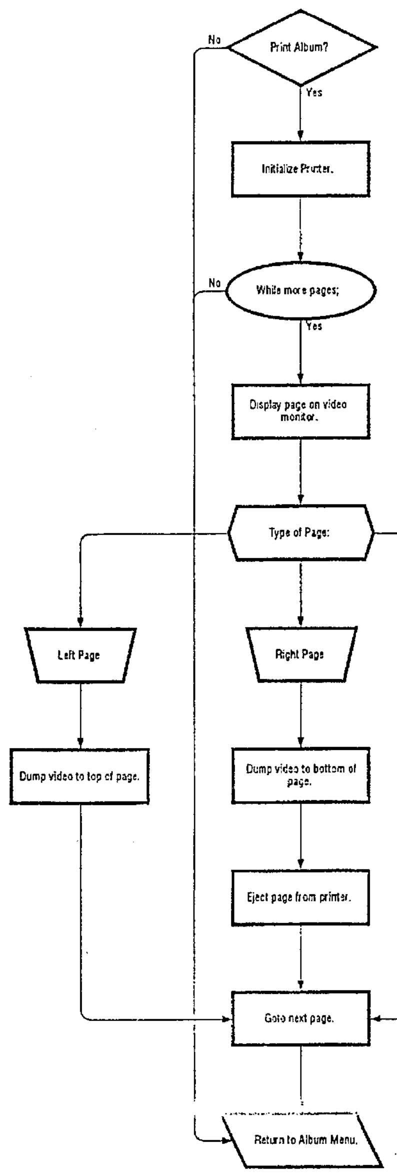

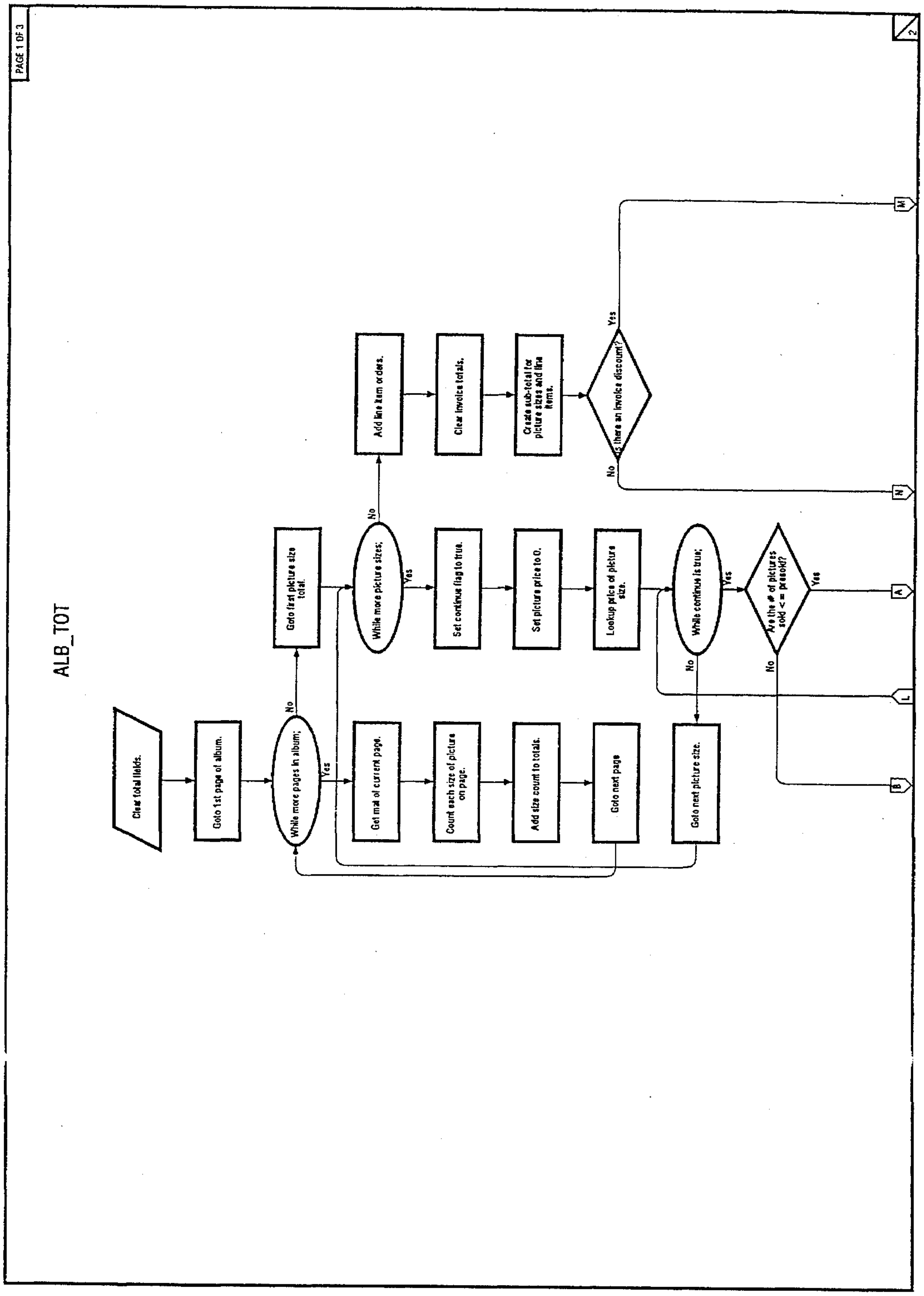
PAGE 1 OF 3
ALB_TOT
Clear total fields.
Goto 1st page of album.
While more pages in album;
Yes
No
Get mat of current page.
Count each size of picture on page.
Add size count to totals.
Goto next page
Goto first picture size total.
While more picture sizes;
Yes
No
Set continue flag to true.
Set picture price to 0.
Lookup price of picture size.
While continue is true;
Yes
No
Goto next picture size.
Are the # of pictures sold <= presold?
Yes
No
Add line item orders.
Clear invoice totals.
Create sub-total for picture sizes and line items.
Is there an invoice discount?
Yes
No
M
N
A
L
B
2

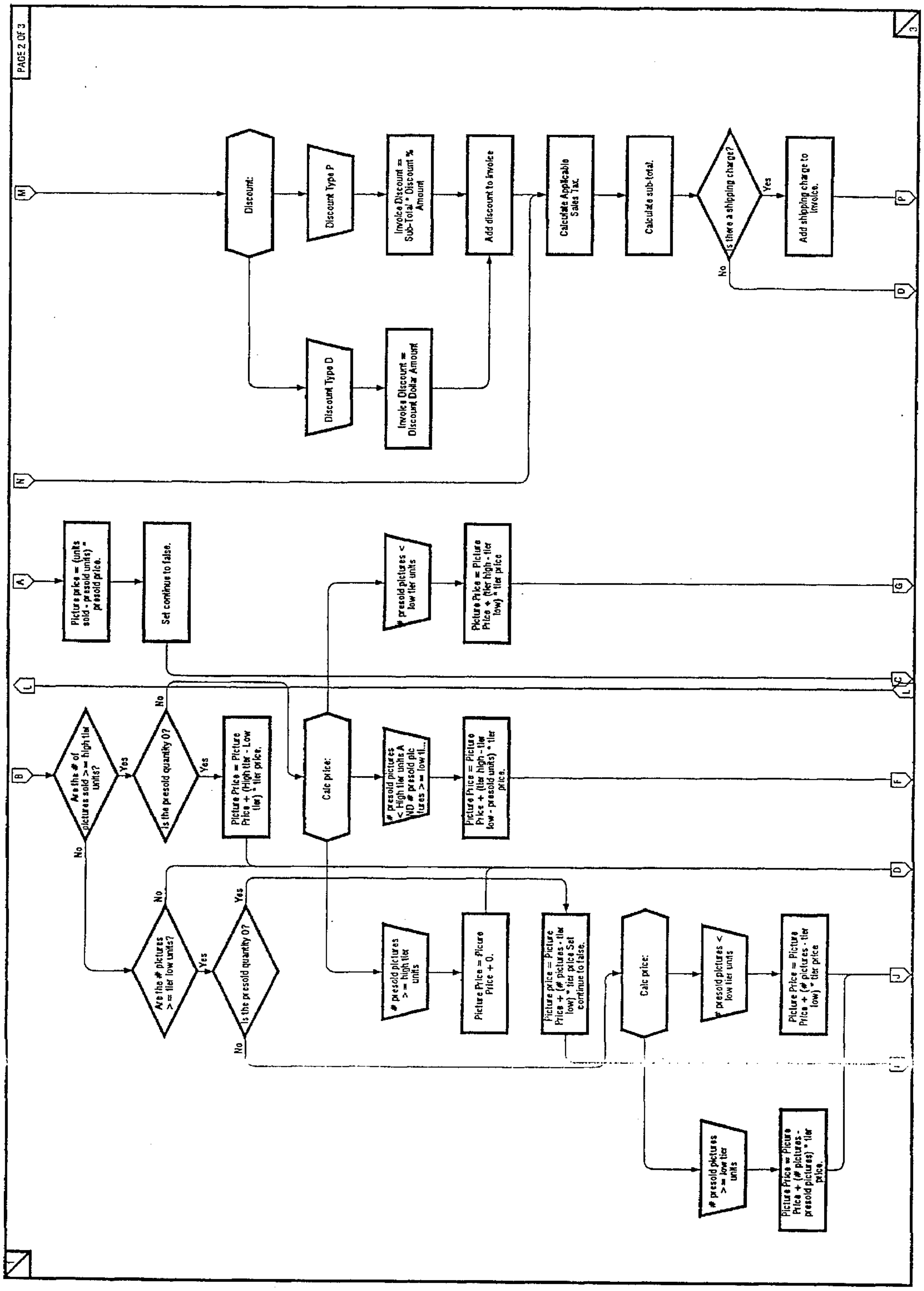
PAGE 2 OF 3
Discount:
Discount Type P
Invoice Discount = Sub-Total * Discount % Amount
Add discount to invoice
Calculate Applicable Sales Tax.
Calculate sub-total.
Is there a shipping charge?
Yes
No
Add shipping charge to invoice.
Discount Type D
Invoice Discount = Discount Dollar Amount
Picture price = (units sold - presold units) * presold price.
Set continue to false.
presold pictures < low tier units
Picture Price = Picture Price + (tier high - tier low) * tier price
Are the # of pictures sold >= high tier units?
Is the presold quantity 0?
Picture Price = Picture Price + (High tier - Low tier) * tier price.
Calc price:
Picture Price = Picture Price + (tier high - tier low - presold units) * tier price.
Are the # pictures >= tier low units?
Is the presold quantity 0?
presold pictures >= high tier units
Picture Price = Picure Price + 0.
Picture price = Picture Price + (# pictures - tier low) * tier price Set continue to false.
Calc price:
presold pictures < low tier units
Picture Price = Picture Price + (# pictures - tier low) * tier price
presold pictures >= low tier units
Picture Price = Picture Price + (# pictures - presold pictures) * tier price.
M
N
A
L
B
P
D
G
C
F
J

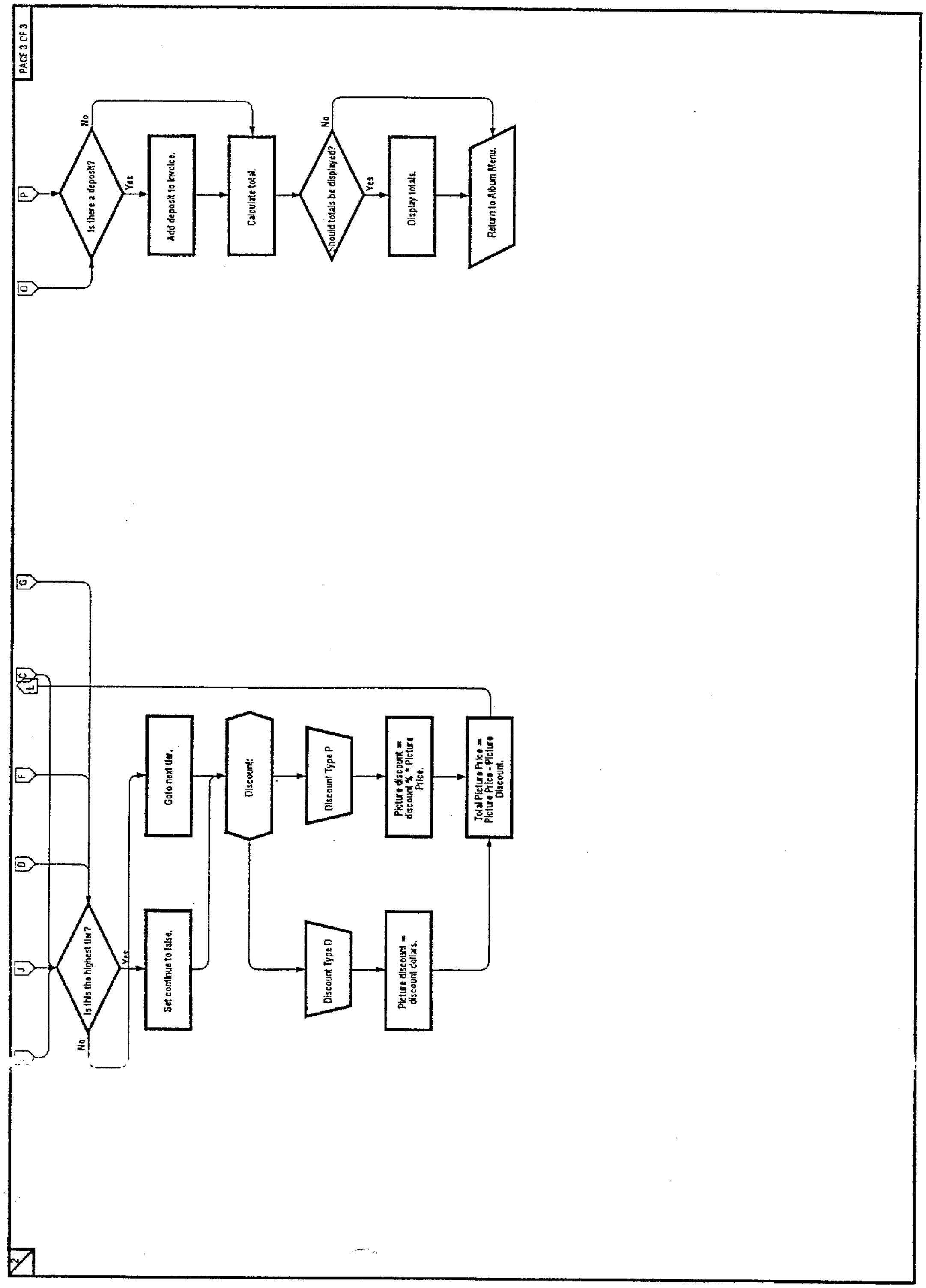
PAGE 3 OF 3
P
O
Is there a deposit?
Yes
No
Add deposit to invoice.
Calculate total.
Should totals be displayed?
Yes
No
Display totals.
Return to Album Menu.
G
C
L
F
D
J
Is this the highest tier?
Yes
No
Set continue to false.
Goto next tier.
Discount:
Discount Type P
Discount Type D
Picture discount = discount % * Picture Price.
Picture discount = discount dollars.
Total Picture Price = Picture Price - Picture Discount.

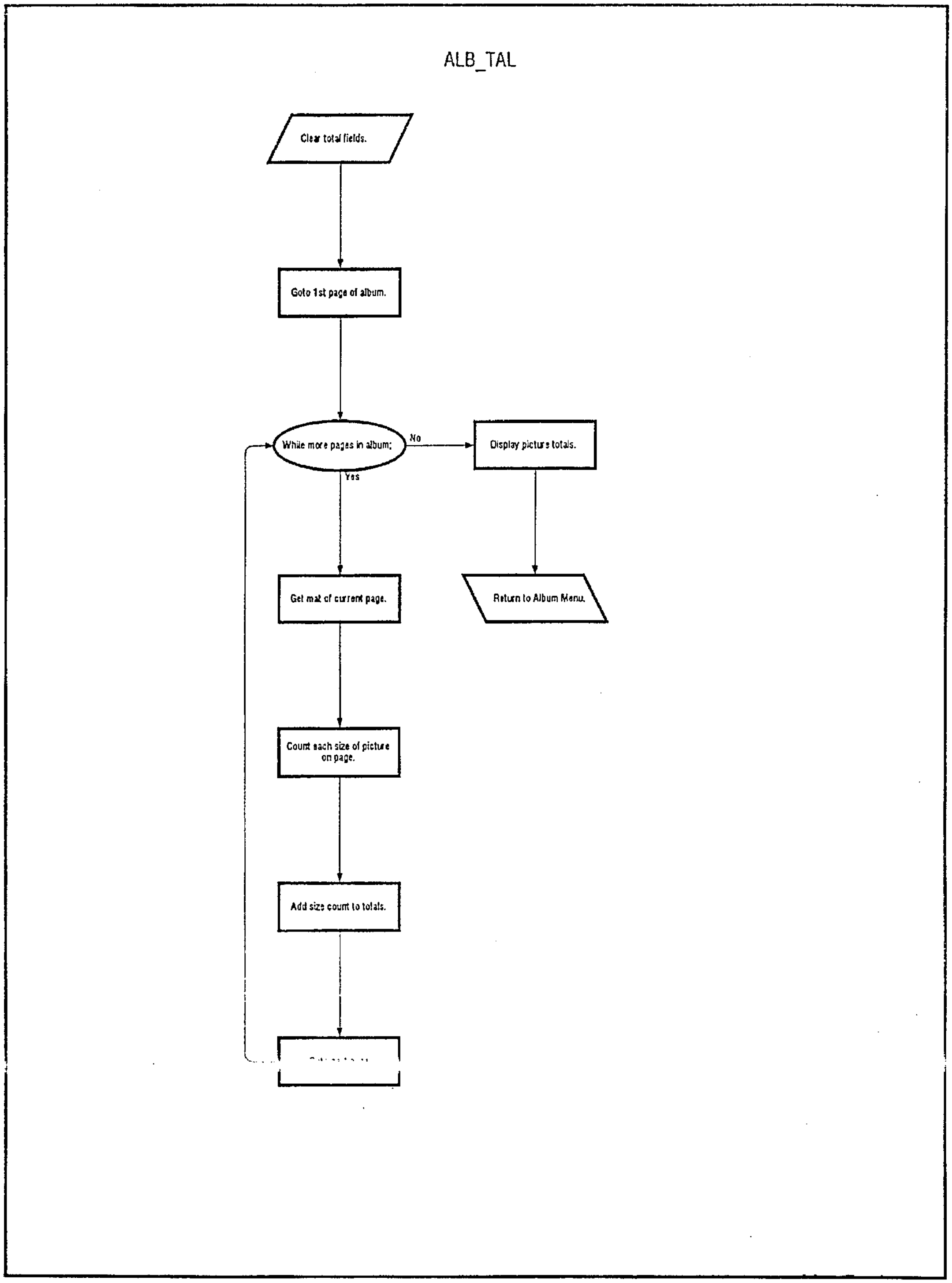
ALB_TAL
Clear total fields.
Goto 1st page of album.
While more pages in album;
No
Yes
Display picture totals.
Return to Album Menu.
Get mat of current page.
Count each size of picture on page.
Add size count to totals.

ALB_BEG
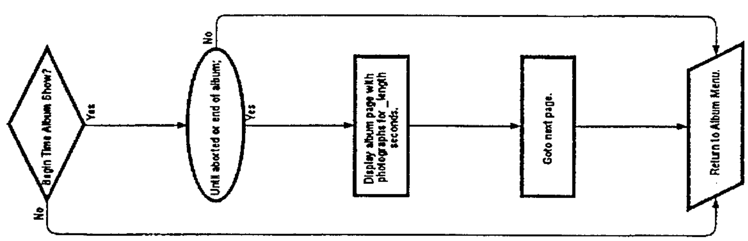

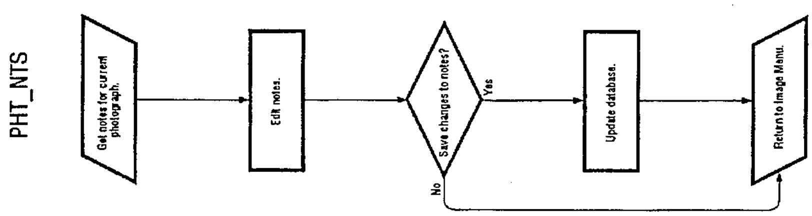
PHT_NTS
Get notes for current photograph.
Edit notes.
Save changes to notes?
Yes
No
Update database.
Return to Image Menu.

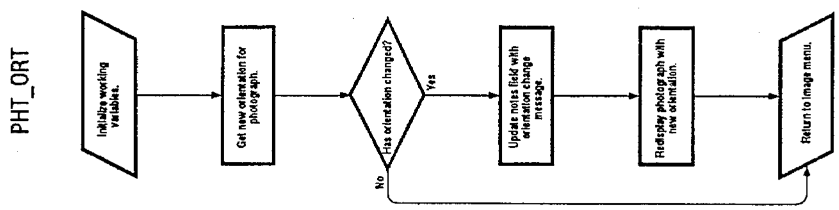
PHT_ORT
Initialize working variables.
Get new orientation for photograph.
Has orientation changed?
Yes
No
Update notes field with orientation change message.
Redisplay photograph with new orientation.
Return to Image menu.

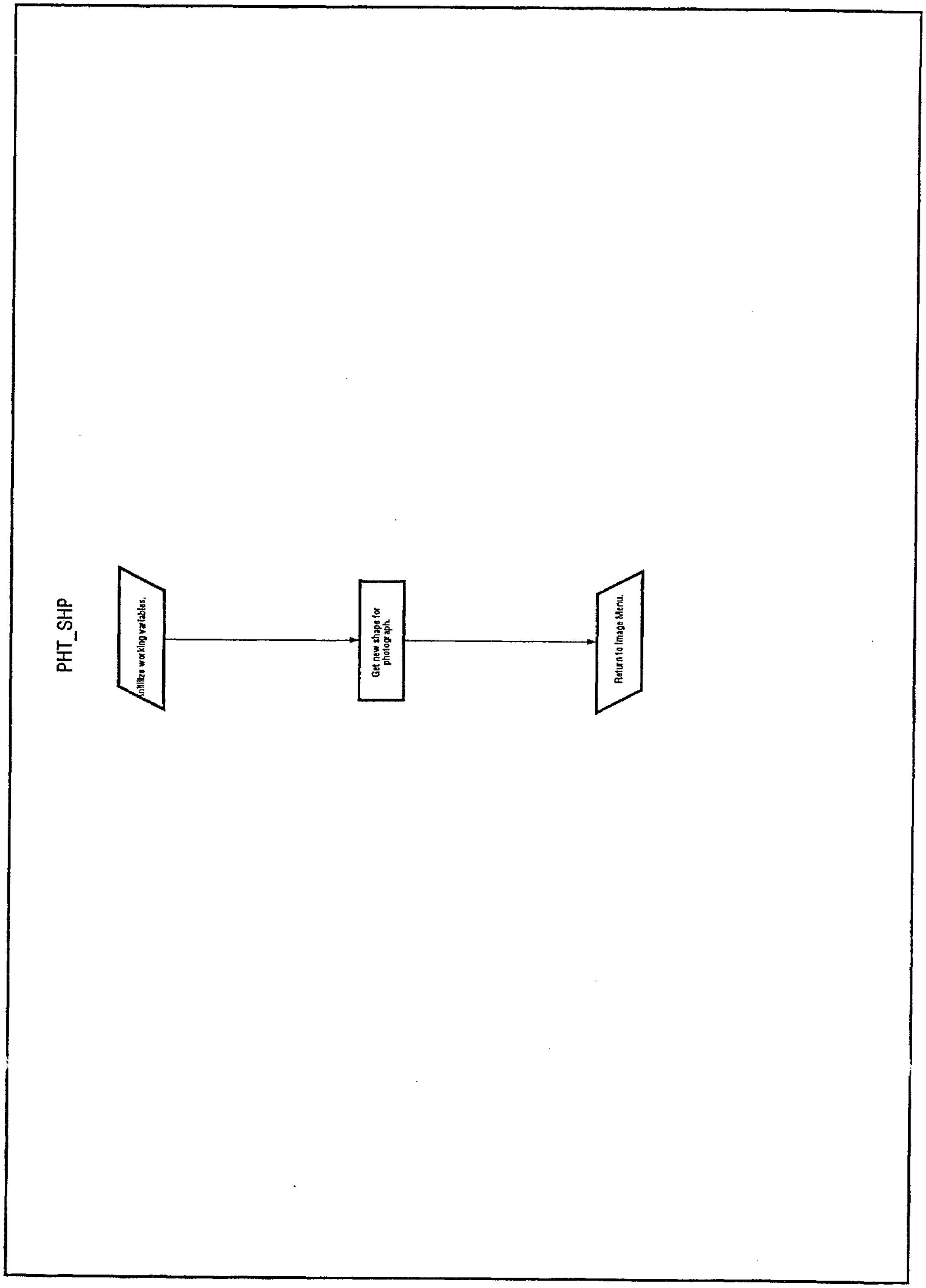
PHT_SHP
Initilize working variables.
Get new shape for photograph.
Return to Image Menu.

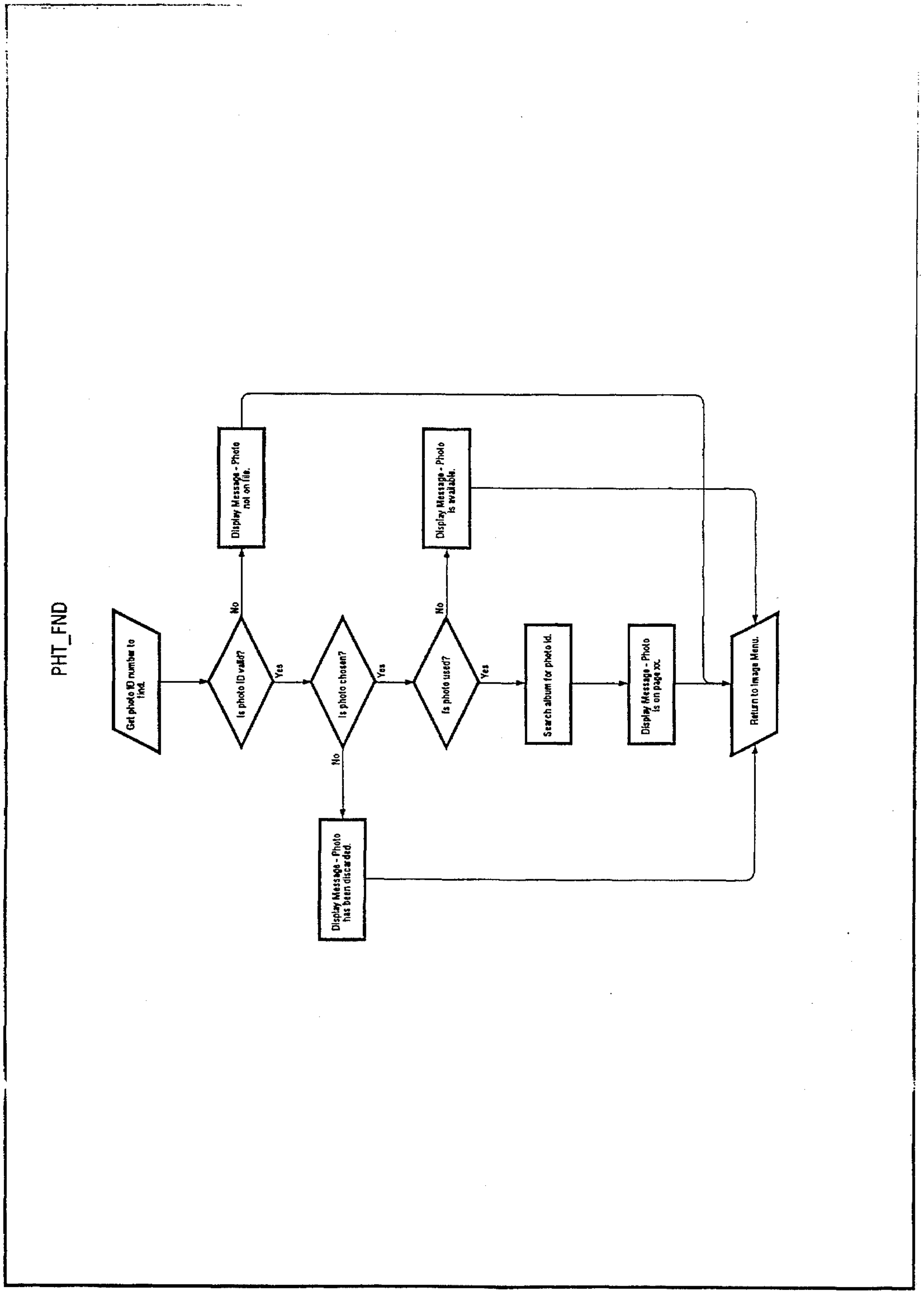
PHT_FND
Get photo ID number to find.
Is photo ID valid?
No
Yes
Display Message - Photo not on file.
Is photo chosen?
No
Yes
Display Message - Photo has been discarded.
Is photo used?
No
Yes
Display Message - Photo is available.
Search album for photo id.
Display Message - Photo is on page xx.
Return to Image Menu.

PHT_NXT
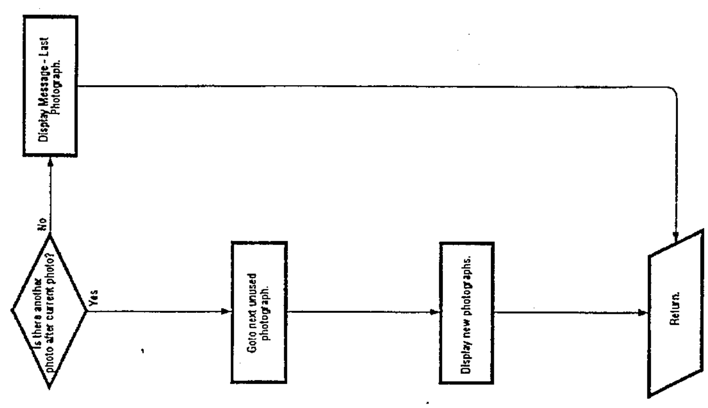

PHT_PRV
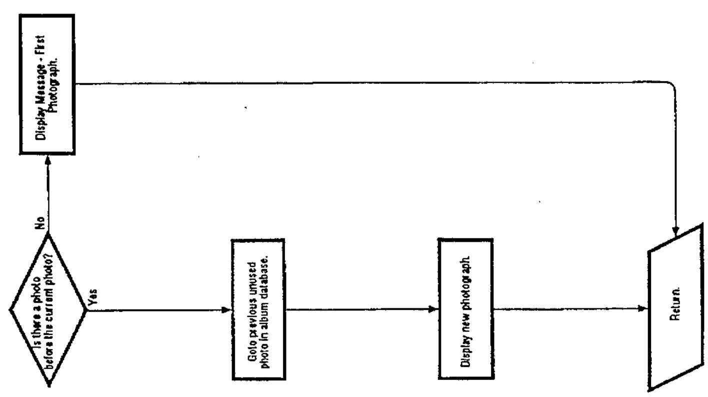

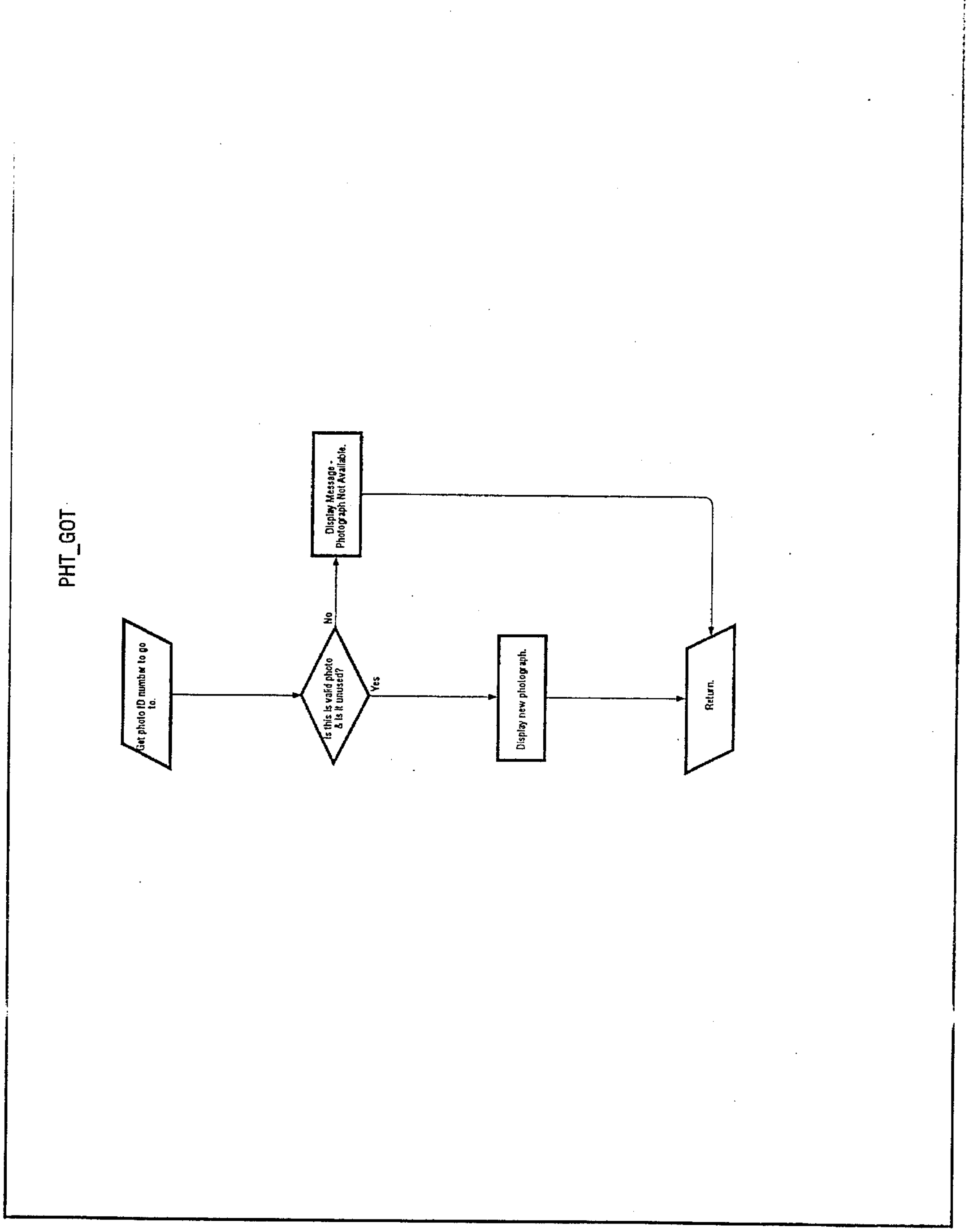
PHT_GOT
Get photo ID number to go to.
Is this is valid photo & Is it unused?
No
Yes
Display Message - Photograph Not Available.
Display new photograph.
Return.

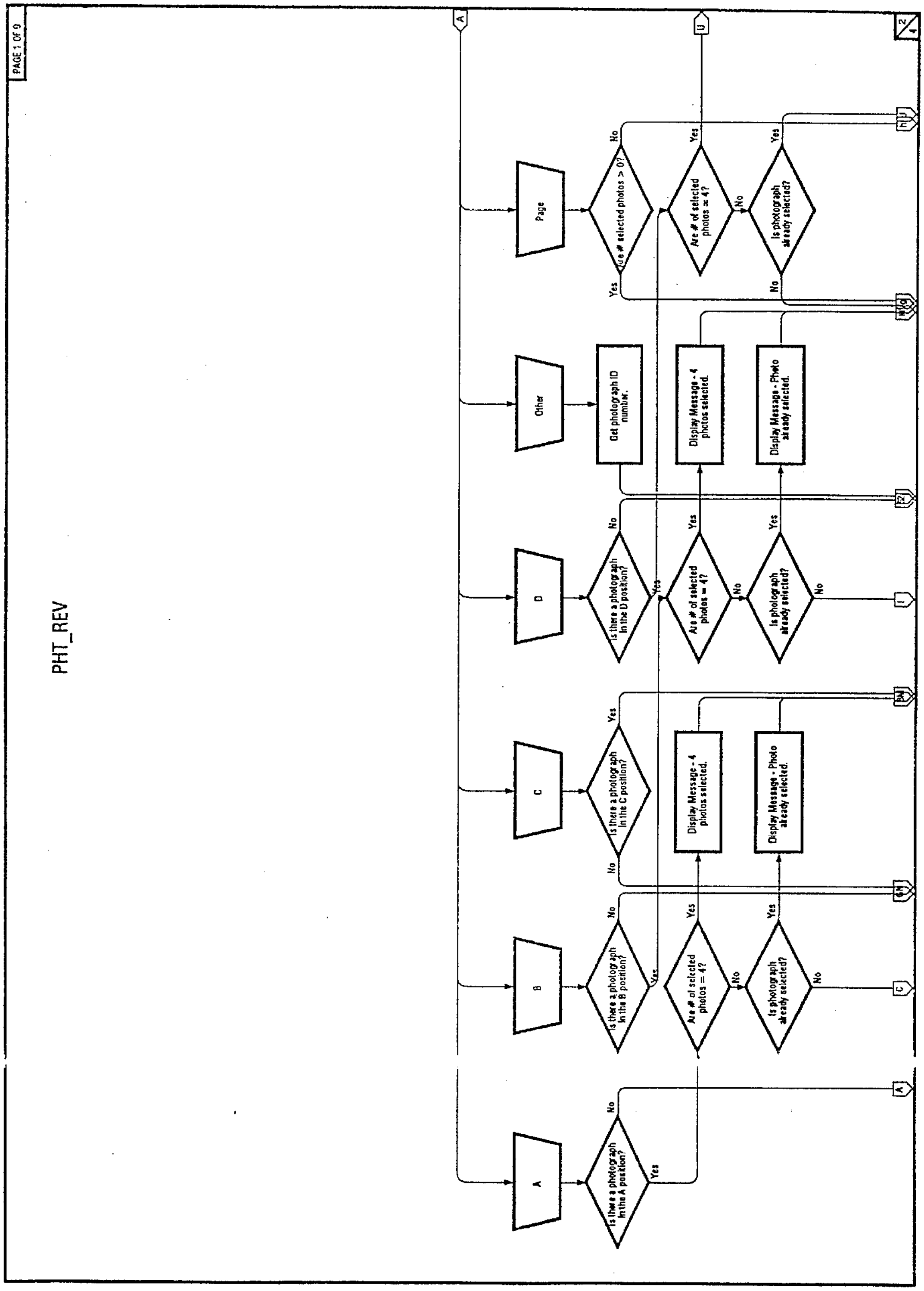
PAGE 1 OF 9
PHT_REV
A
B
C
D
Other
Page
Is there a photograph in the A position?
Is there a photograph in the B position?
Is there a photograph in the C position?
Is there a photograph in the D position?
Are # of selected photos > 0?
Are # of selected photos = 4?
Is photograph already selected?
Display Message - 4 photos selected.
Display Message - Photo already selected.
Get photograph ID number.
Yes
No
U

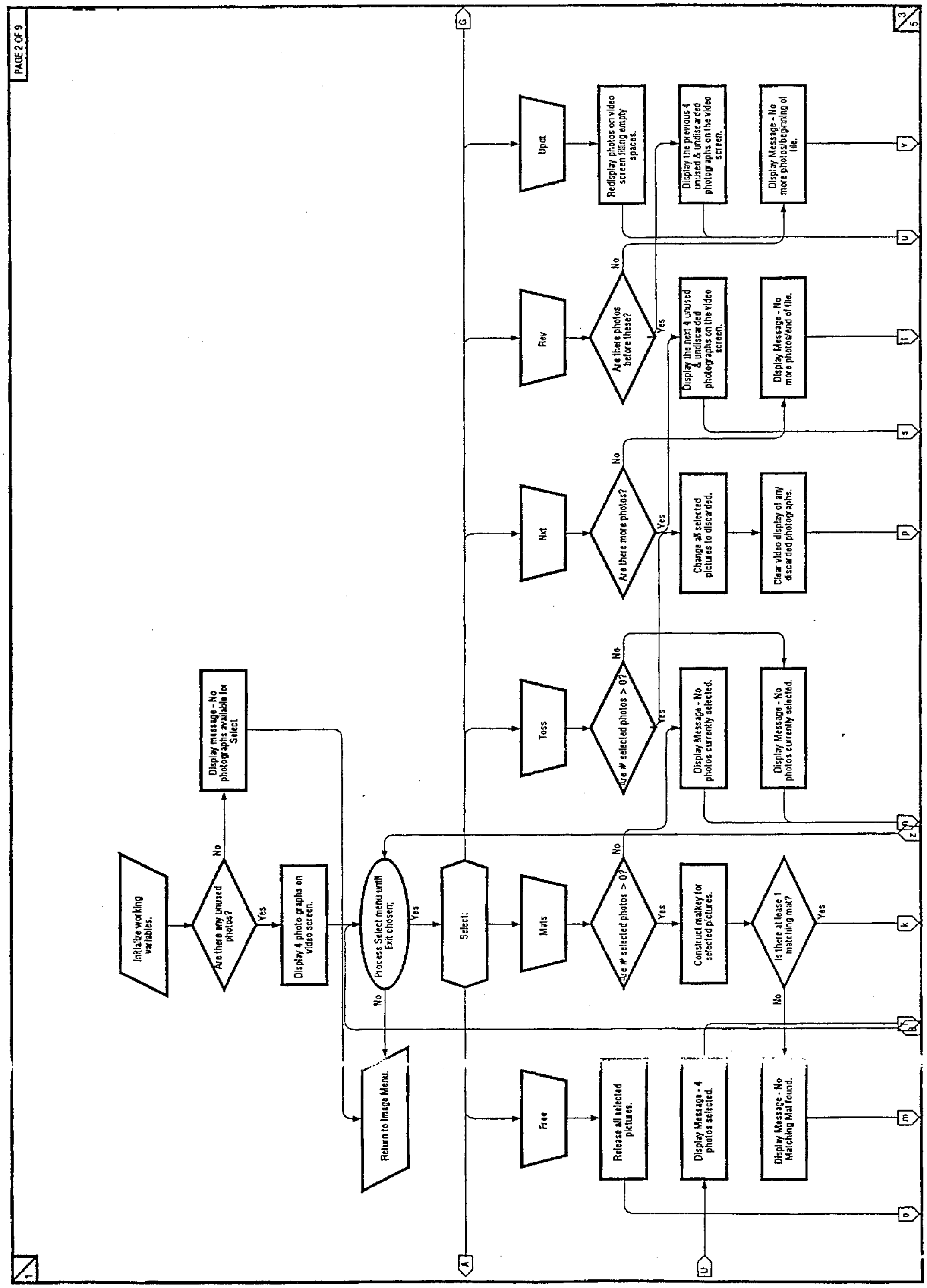
PAGE 2 OF 9
Initialize working variables.
Are there any unused photos?
No
Yes
Display message - No photographs available for Select
Display 4 photo graphs on video screen.
Process Select menu until Exit chosen;
No
Yes
Return to Image Menu.
Select:
Free
Mats
Toss
Nxt
Rev
Updt
Release all selected pictures.
Display Message - 4 photos selected.
Display Message - No Matching Mat found.
Are # selected photos > 0?
Construct matkey for selected pictures.
Is there at lease 1 matching mat?
Display Message - No photos currently selected.
Change all selected pictures to discarded.
Clear video display of any discarded photographs.
Are there more photos?
Display the next 4 unused & undiscarded photographs on the video screen.
Display Message - No more photos/end of file.
Are there photos before these?
Display the previous 4 unused & undiscarded photographs on the video screen.
Display Message - No more photos/beginning of file.
Redisplay photos on video screen filling empty spaces.
G
A
U
V
u
t
s
p
k
m
o
3
5
1

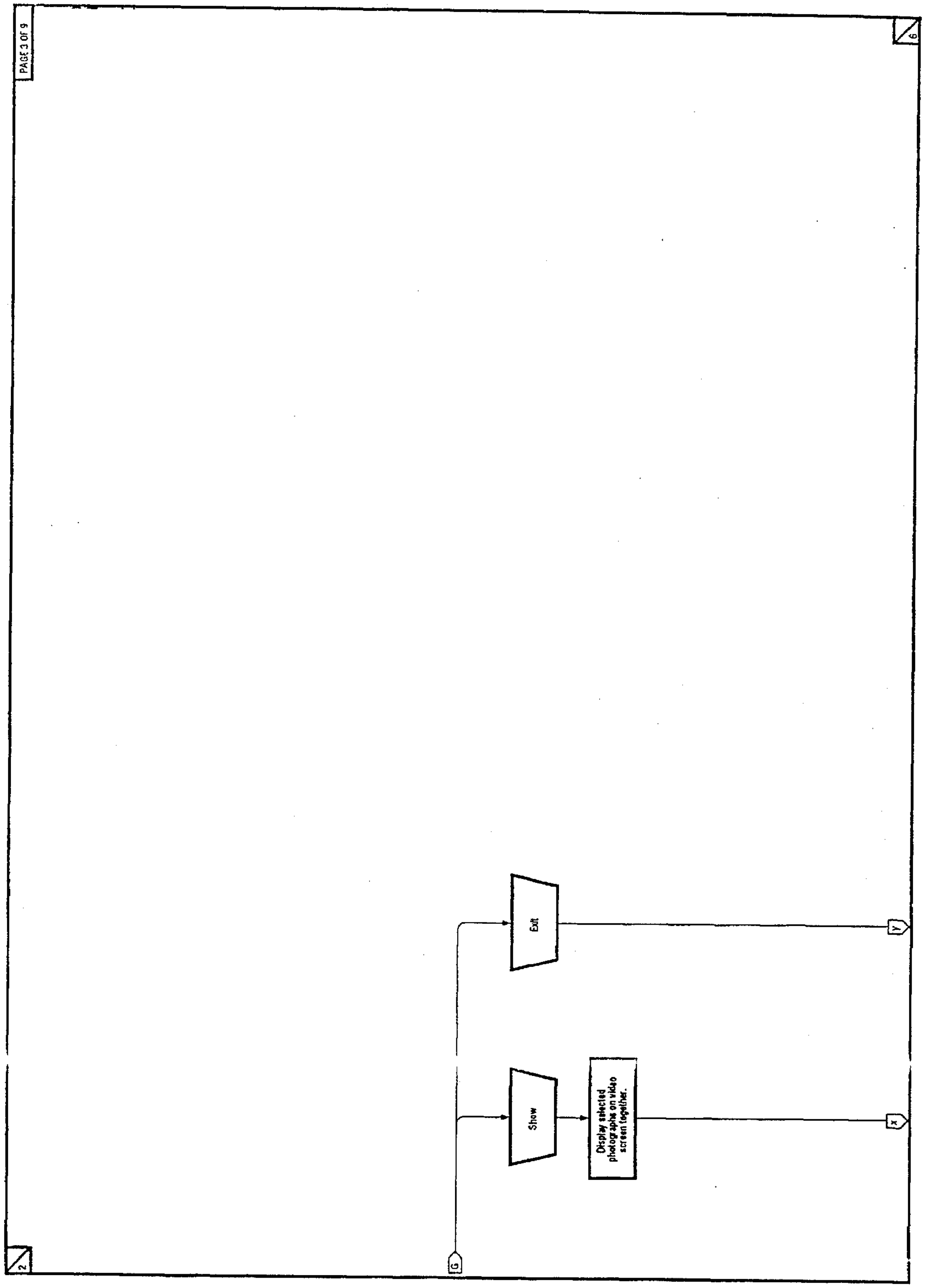
PAGE 3 OF 9
6
Exit
Y
Show
Display selected photographs on video screen together.
X
2
G

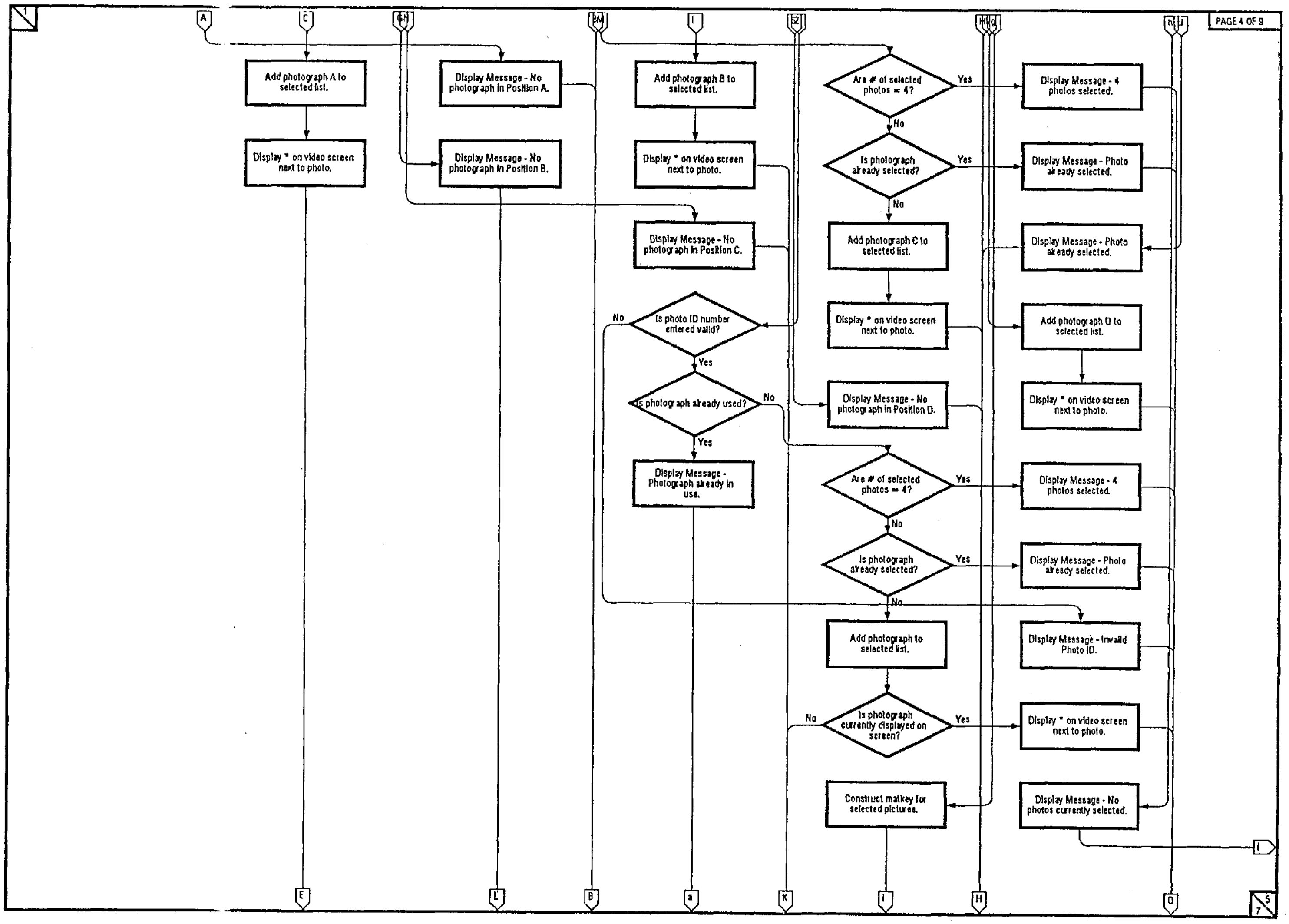
PAGE 4 OF 9
Add photograph A to selected list.
Display * on video screen next to photo.
Display Message - No photograph in Position A.
Display Message - No photograph in Position B.
Add photograph B to selected list.
Display * on video screen next to photo.
Display Message - No photograph in Position C.
Is photo ID number entered valid?
Is photograph already used?
Display Message - Photograph already in use.
Are # of selected photos = 4?
Is photograph already selected?
Add photograph C to selected list.
Display * on video screen next to photo.
Display Message - No photograph in Position D.
Are # of selected photos = 4?
Is photograph already selected?
Add photograph to selected list.
Is photograph currently displayed on screen?
Construct matkey for selected pictures.
Display Message - 4 photos selected.
Display Message - Photo already selected.
Display Message - Photo already selected.
Add photograph D to selected list.
Display * on video screen next to photo.
Display Message - 4 photos selected.
Display Message - Photo already selected.
Display Message - Invalid Photo ID.
Display * on video screen next to photo.
Display Message - No photos currently selected.
Yes
No

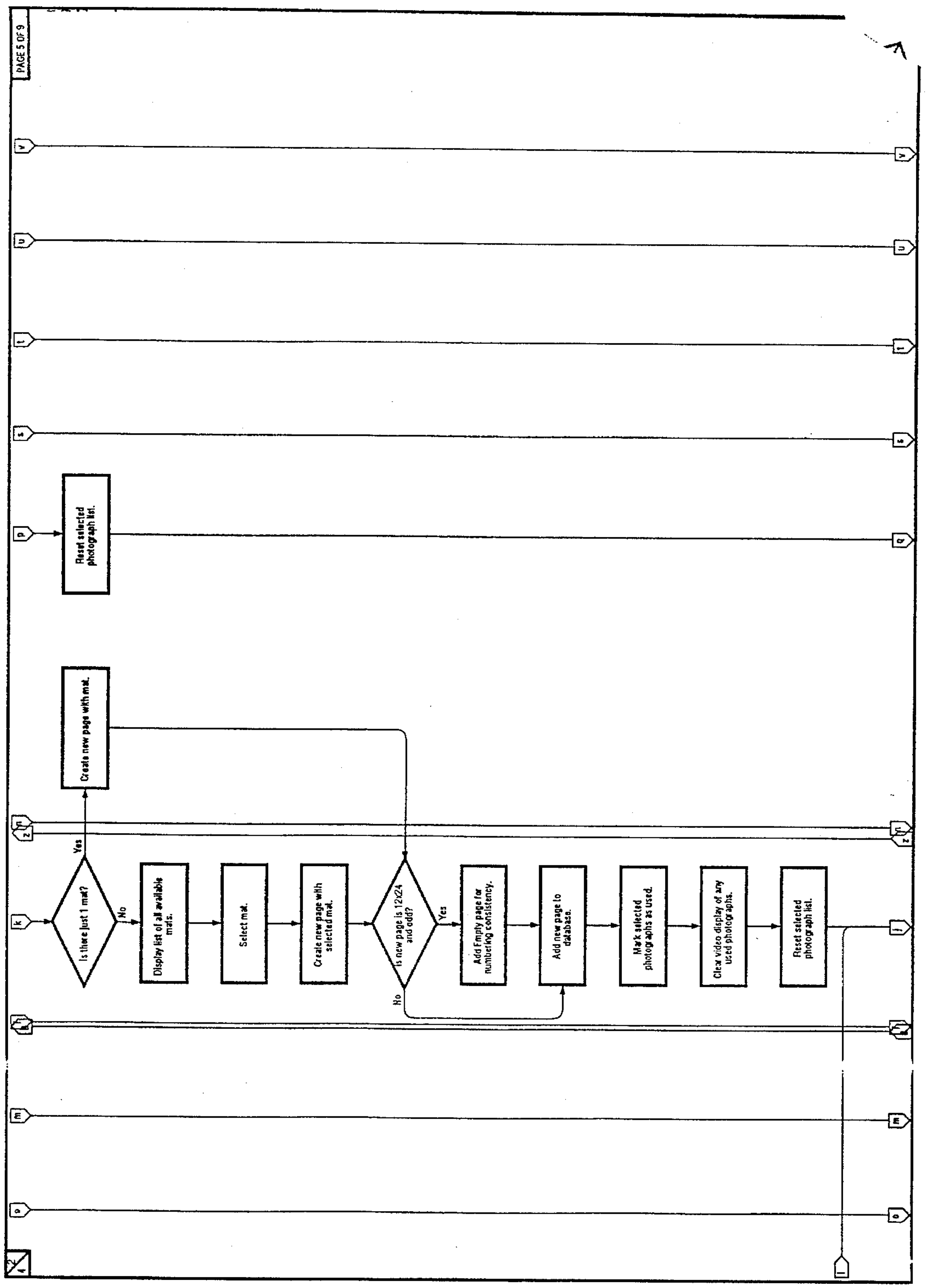
PAGE 5 OF 9
Reset selected photograph list.
Create new page with mat.
Is there just 1 mat?
Yes
No
Display list of all available mats.
Select mat.
Create new page with selected mat.
Is new page is 12x24 and odd?
Yes
No
Add Empty page for numbering consistency.
Add new page to database.
Mark selected photographs as used.
Clear video display of any used photographs.
Reset selected photograph list.

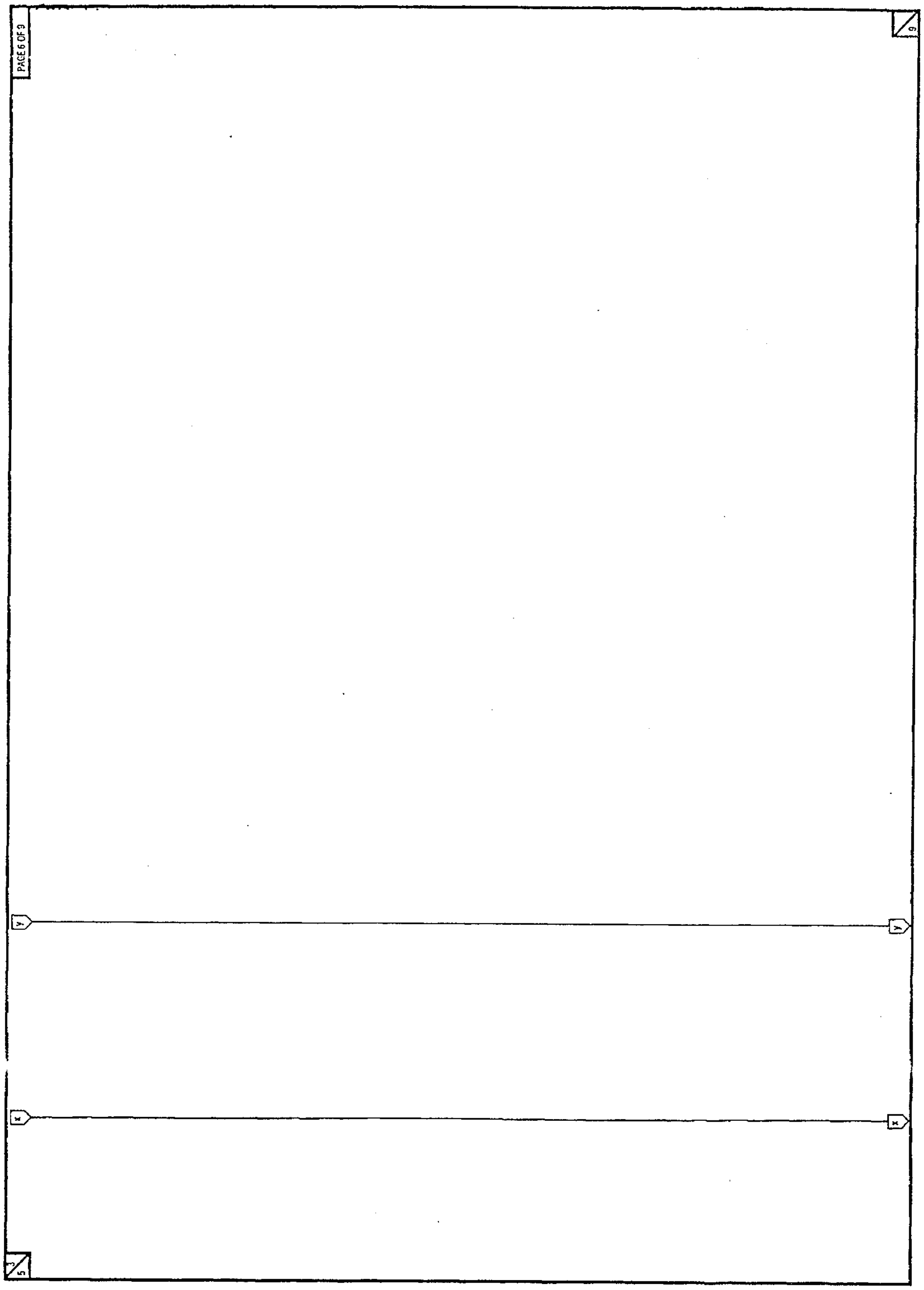
PAGE 6 OF 9

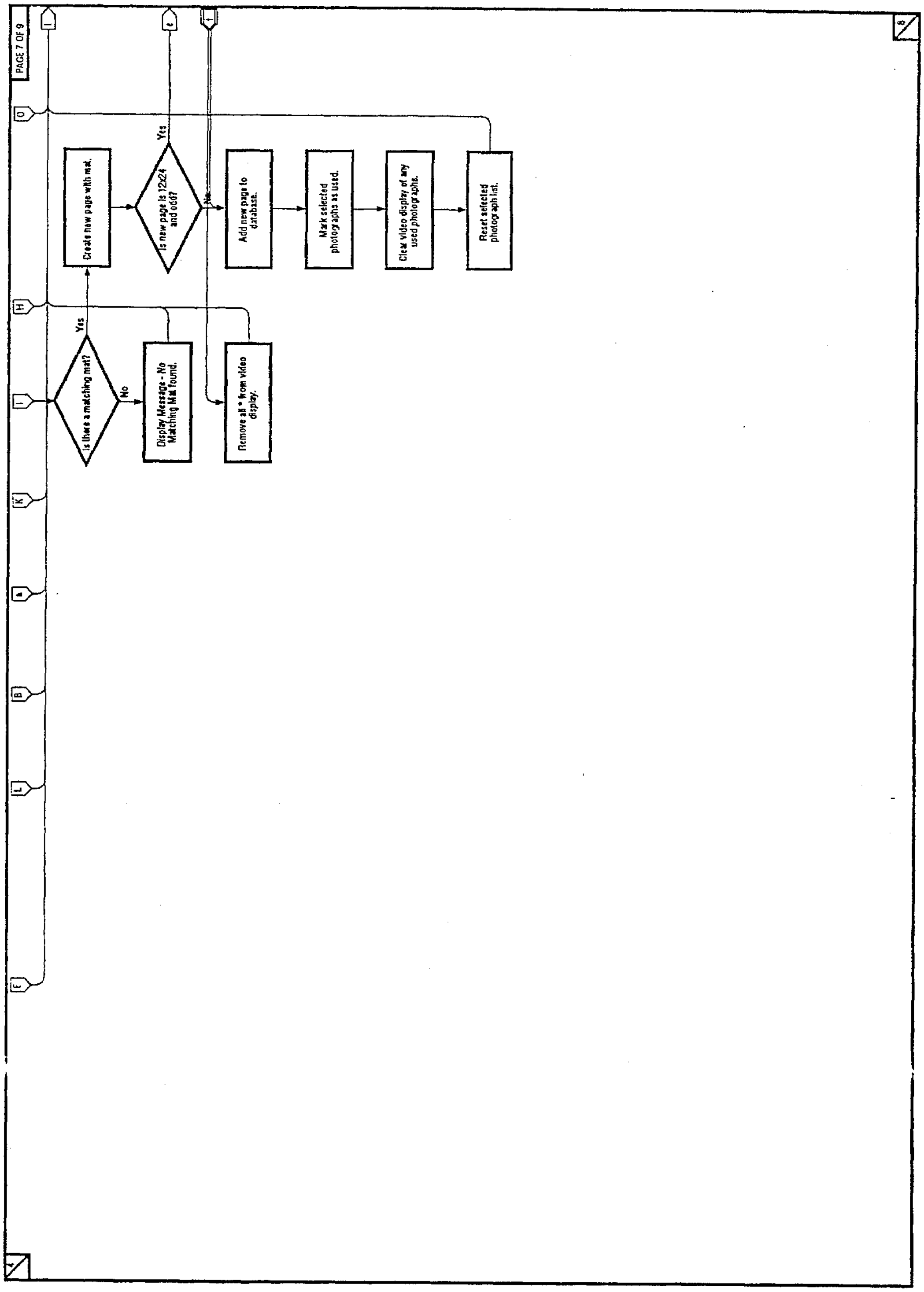
PAGE 7 OF 9
Is there a matching mat?
Yes
No
Display Message - No Matching Mat found.
Remove all * from video display.
Create new page with mat.
Is new page is 12x24 and odd?
Yes
No
Add new page to database.
Mark selected photographs as used.
Clear video display of any used photographs.
Reset selected photograph list.

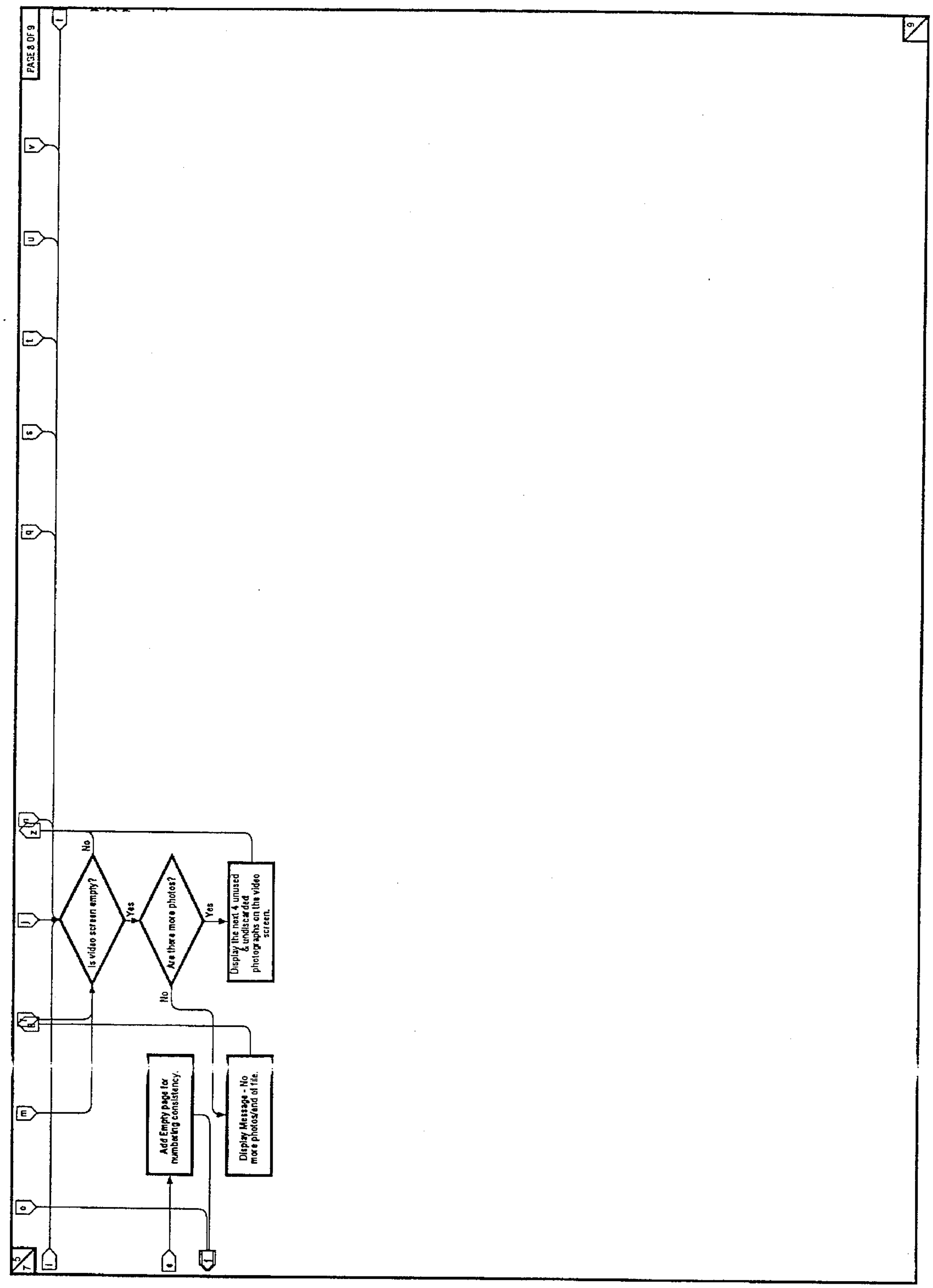
PAGE 8 OF 9
Is video screen empty?
No
Yes
Are there more photos?
Yes
No
Display the next 4 unused & undiscarded photographs on the video screen.
Add Empty page for numbering consistency.
Display Message - No more photos/end of file.

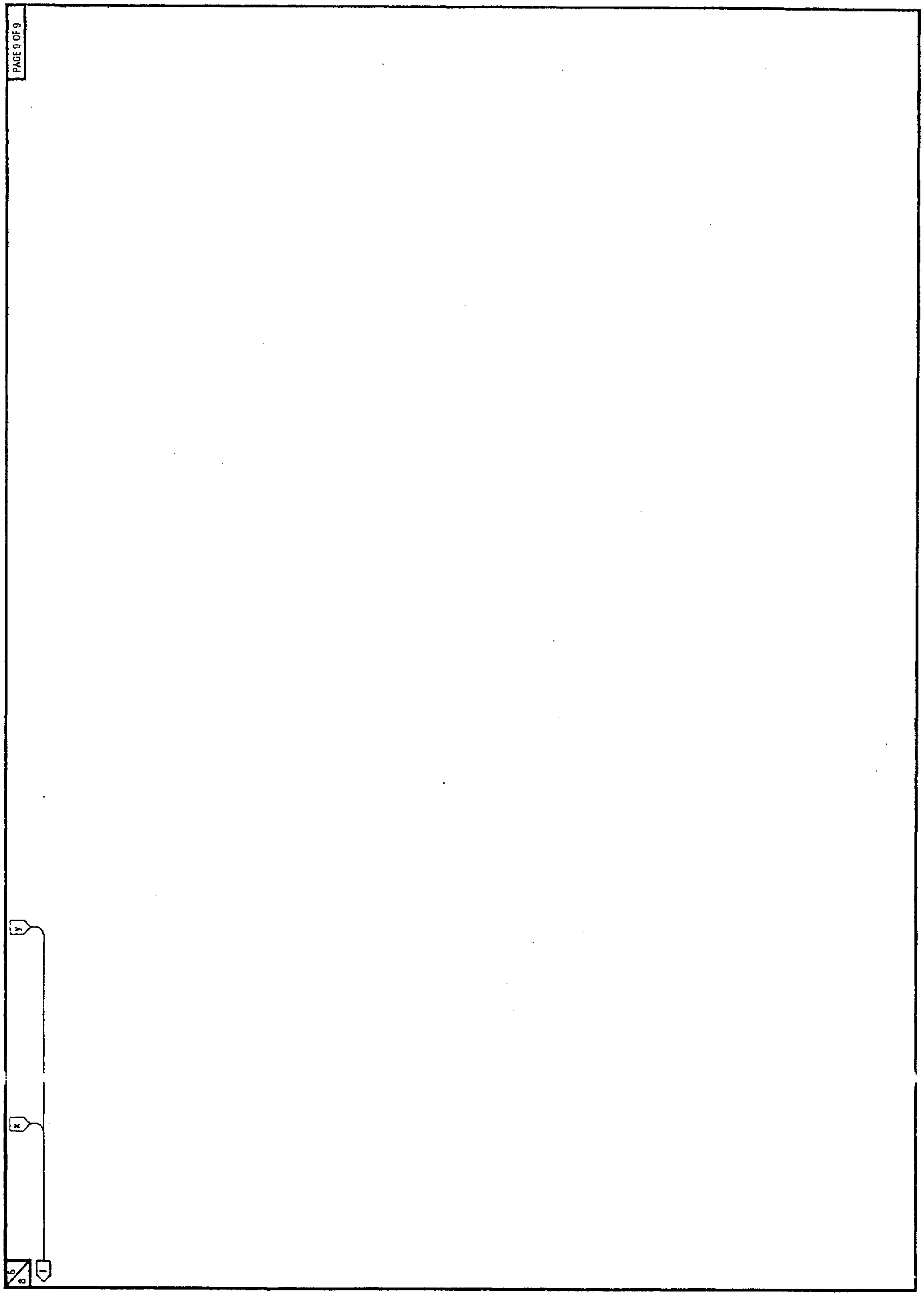
PAGE 9 OF 9

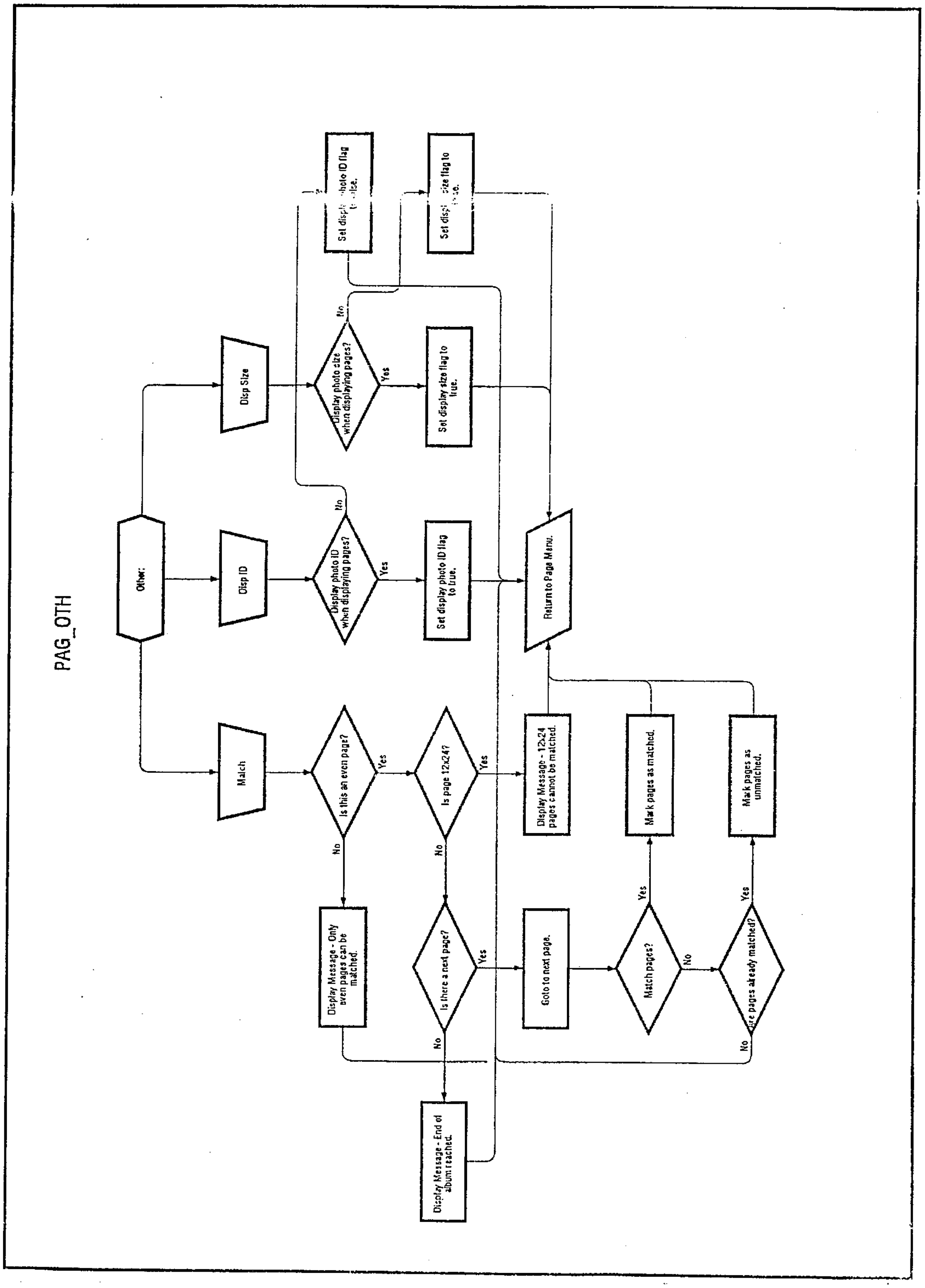
PAG_OTH
Other:
Match
Disp ID
Disp Size
Is this an even page?
No
Yes
Display Message - Only even pages can be matched.
Is page 12x24?
Display Message - 12x24 pages cannot be matched.
Is there a next page?
Display Message - End of album reached.
Goto to next page.
Match pages?
Mark pages as matched.
Mark pages as unmatched.
Display photo ID when displaying pages?
Set display photo ID flag to true.
Display photo size when displaying pages?
Set display size flag to true.
Return to Page Menu.

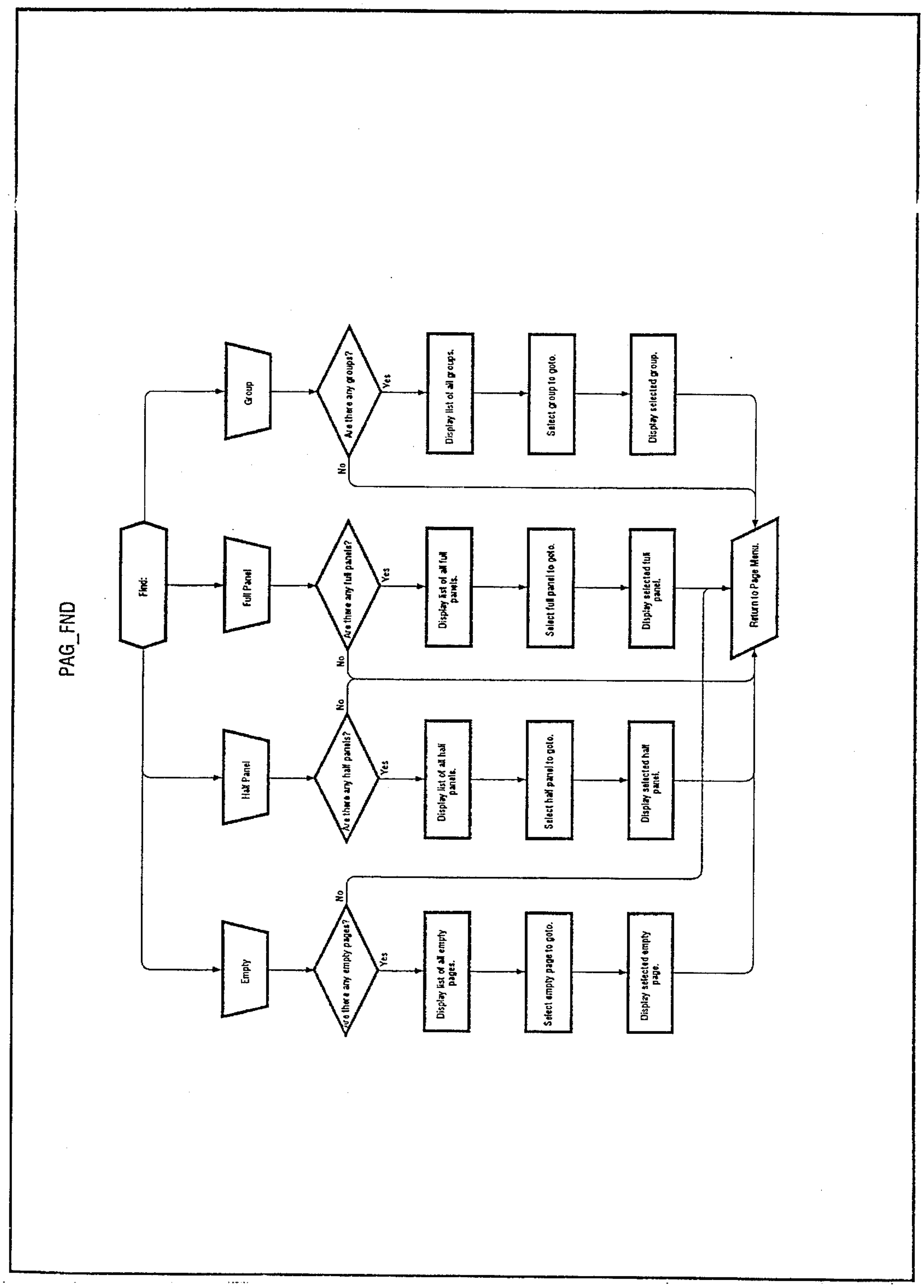
PAG_FND
Find:
Group
Full Panel
Half Panel
Empty
Are there any groups?
Are there any full panels?
Are there any half panels?
Are there any empty pages?
Yes
No
Display list of all groups.
Select group to goto.
Display selected group.
Display list of all full panels.
Select full panel to goto.
Display selected full panel.
Display list of all half panels.
Select half panel to goto.
Display selected half panel.
Display list of all empty pages.
Select empty page to goto.
Display selected empty page.
Return to Page Menu.

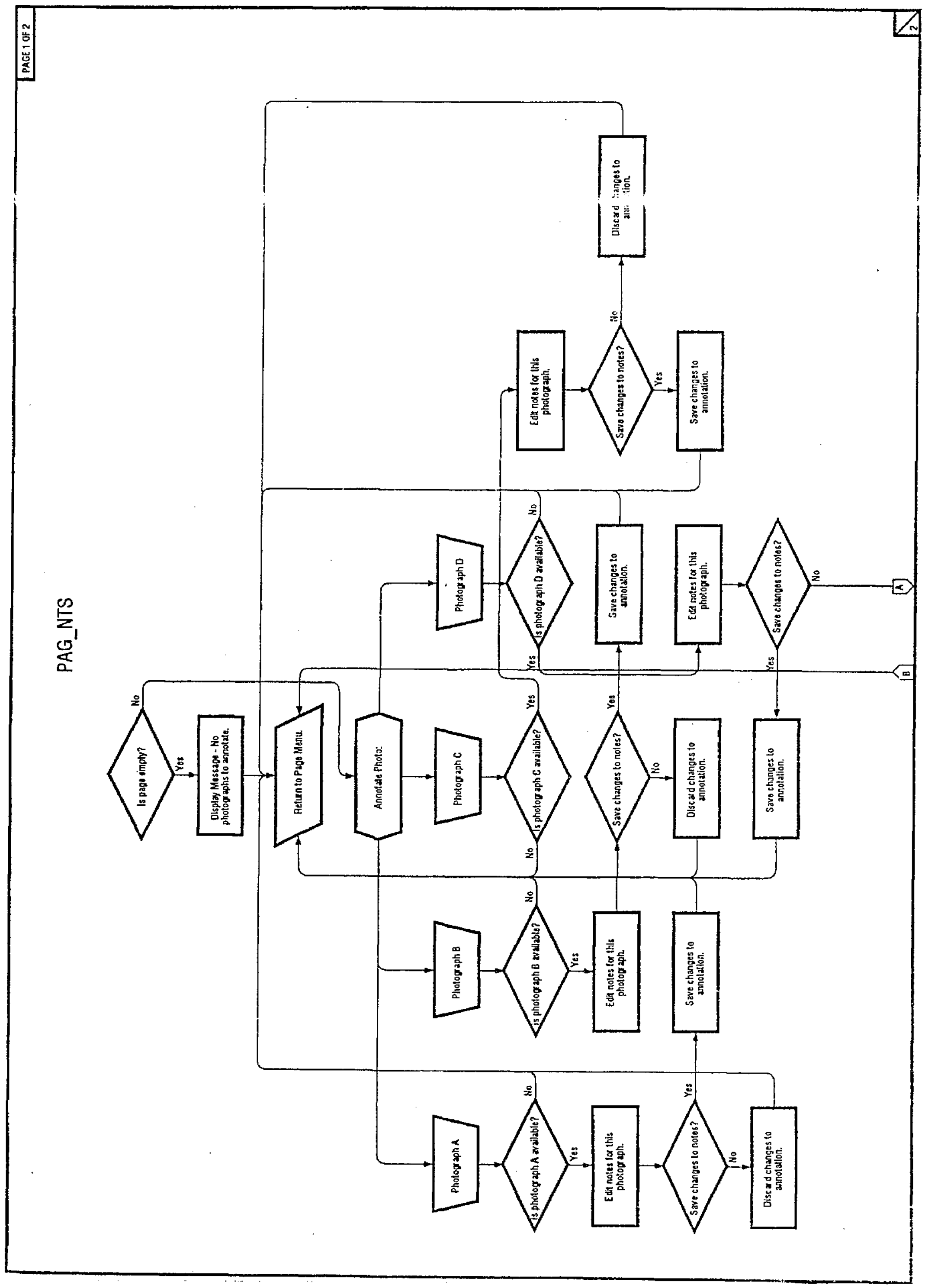
PAGE 1 OF 2
PAG_NTS
Is page empty?
Yes
No
Display Message - No photographs to annotate.
Return to Page Menu.
Annotate Photo:
Photograph A
Photograph B
Photograph C
Photograph D
Is photograph A available?
Is photograph B available?
Is photograph C available?
Is photograph D available?
Edit notes for this photograph.
Save changes to notes?
Save changes to annotation.
Discard changes to annotation.
A
B
2

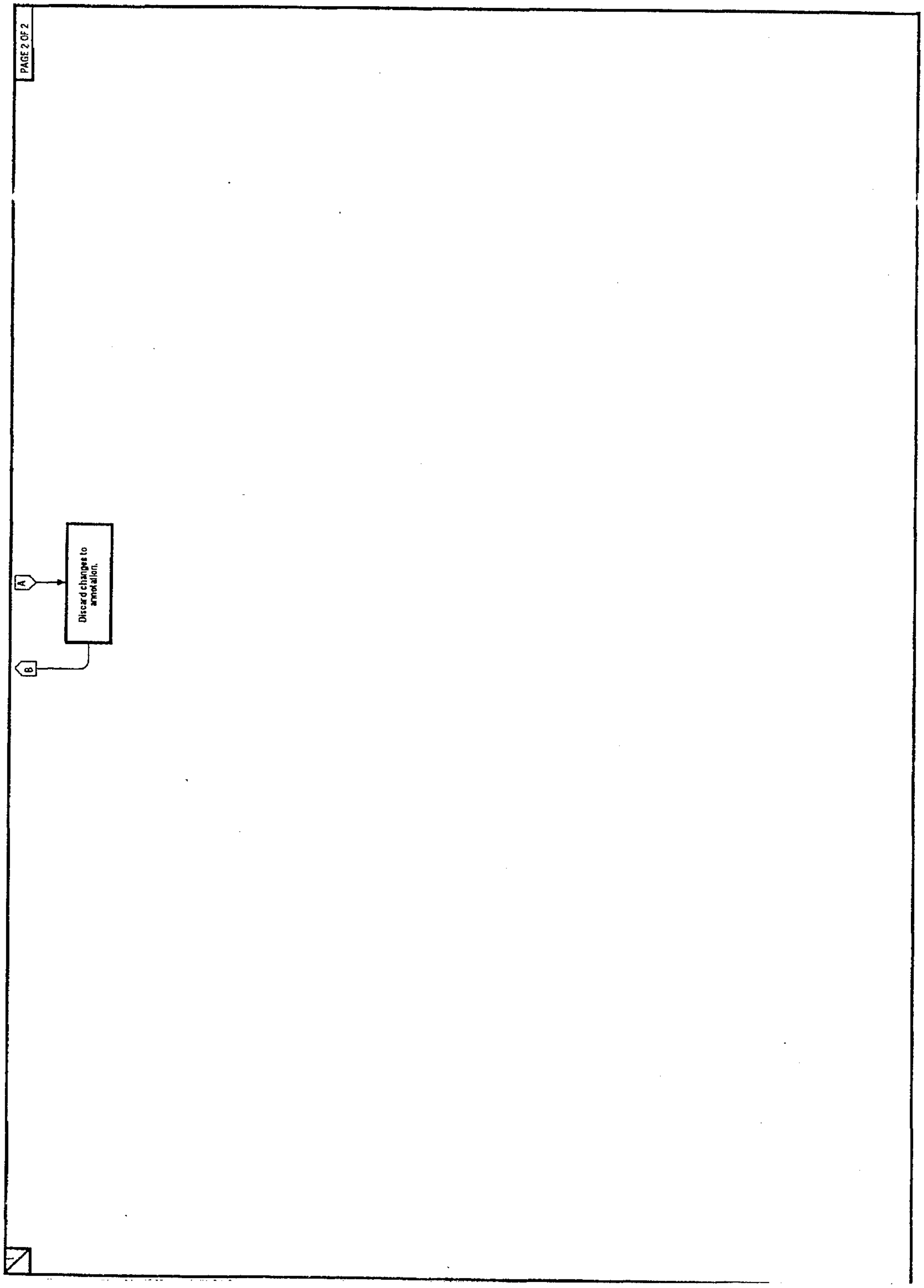
PAGE 2 OF 2
A
Discard changes to annotation.
B

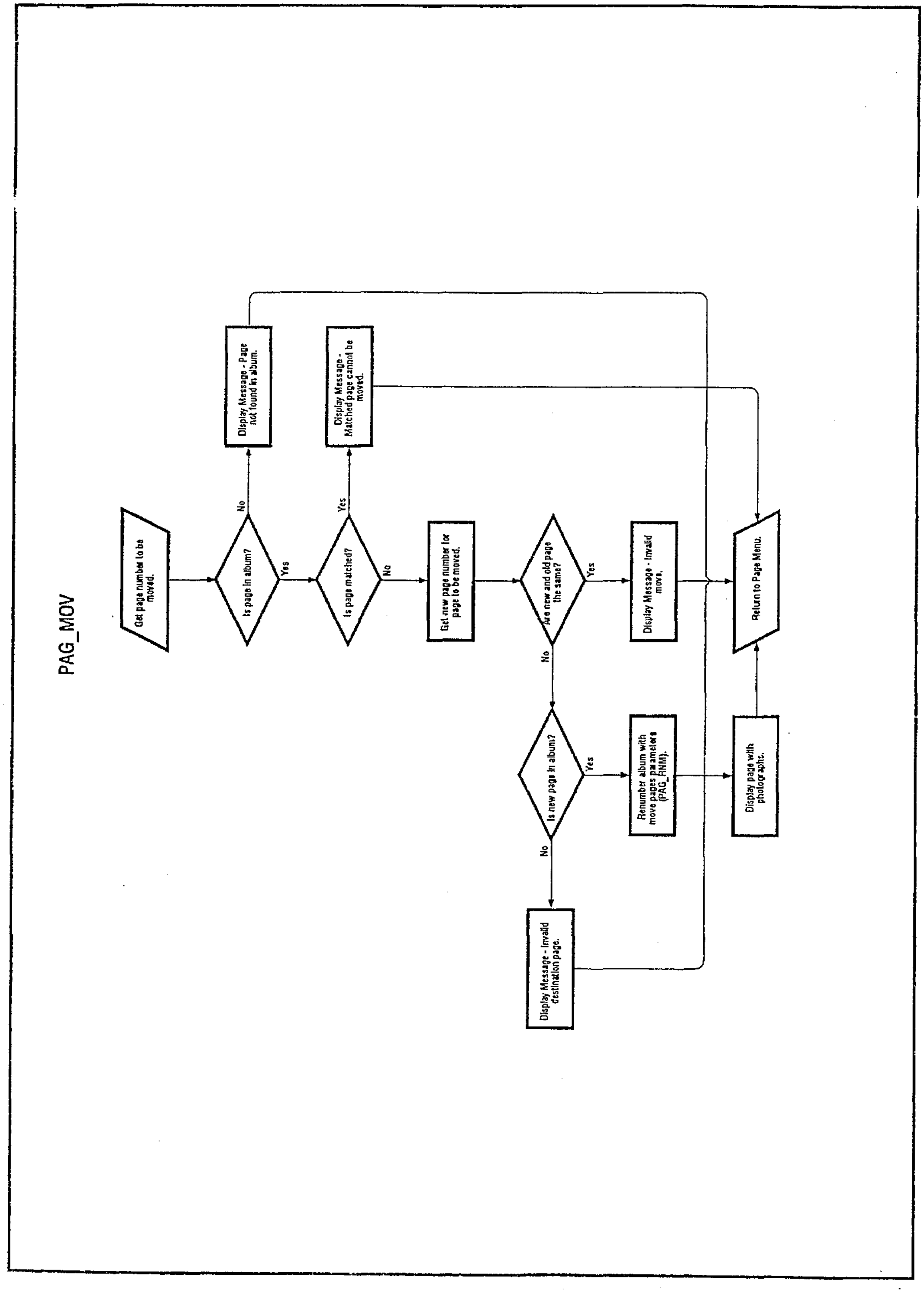
PAG_MOV
Get page number to be moved.
Is page in album?
No
Yes
Display Message - Page not found in album.
Is page matched?
Yes
No
Display Message - Matched page cannot be moved.
Get new page number for page to be moved.
Are new and old page the same?
Yes
No
Display Message - Invalid move.
Return to Page Menu.
Is new page in album?
Yes
No
Renumber album with move pages parameters (PAG_RNM).
Display page with photographs.
Display Message - Invalid destination page.

PAG_DEL
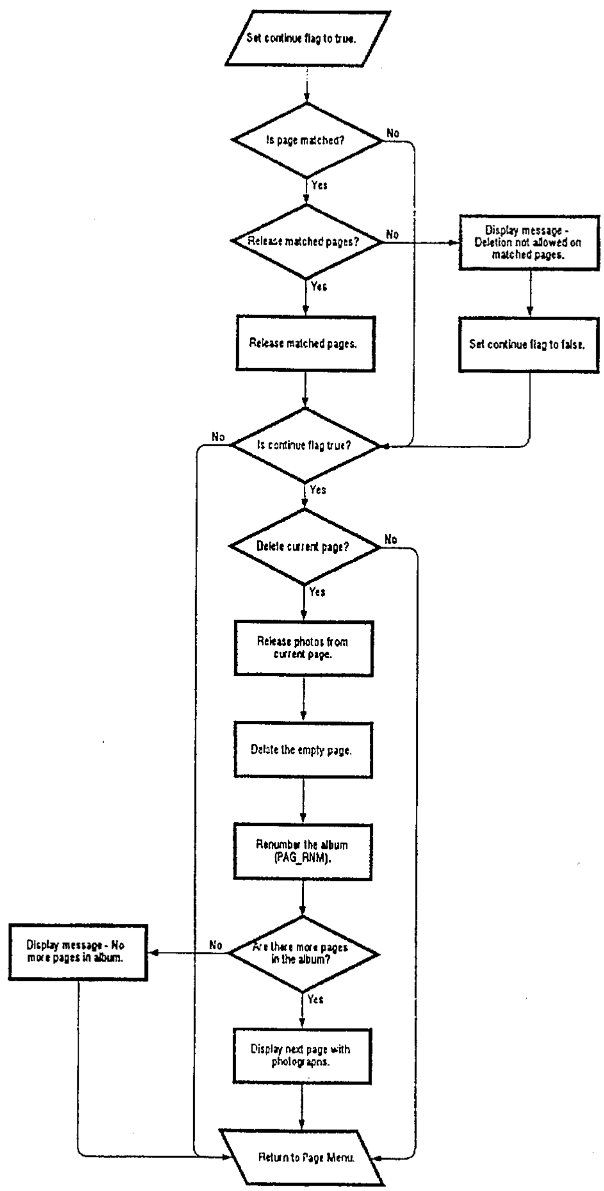

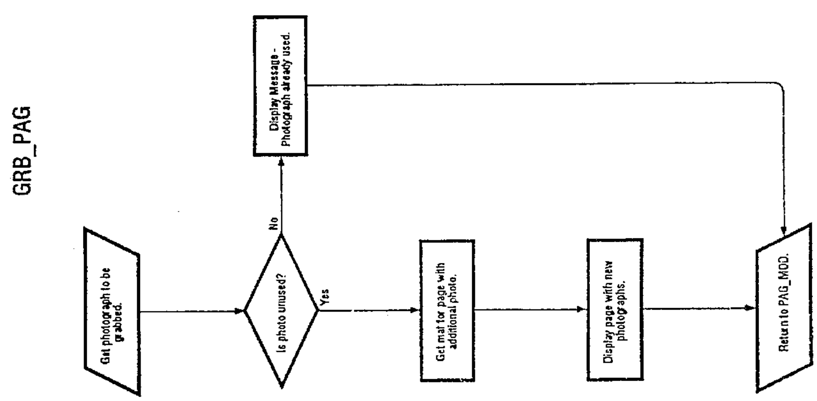
GRB_PAG
Get photograph to be grabbed.
Is photo unused?
No
Yes
Display Message - Photograph already used.
Get mat for page with additional photo.
Display page with new photographs.
Return to PAG_MOD.

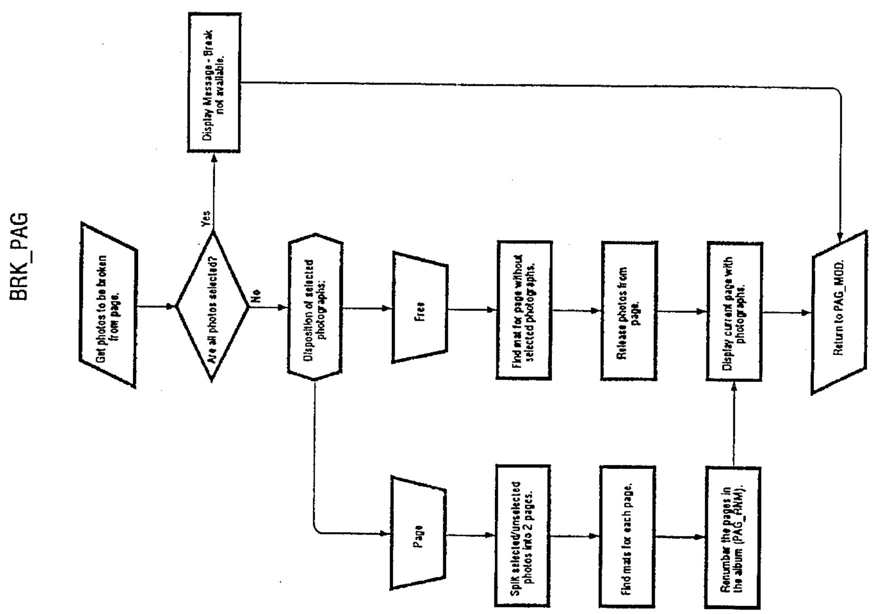
BRK_PAG
Get photos to be broken from page.
Are all photos selected?
Yes
No
Display Message - Break not available.
Disposition of selected photographs:
Free
Page
Find mat for page without selected photographs.
Release photos from page.
Display current page with photographs.
Return to PAG_MOD.
Split selected/unselected photos into 2 pages.
Find mats for each page.
Renumber the pages in the album (PAG_FRM).

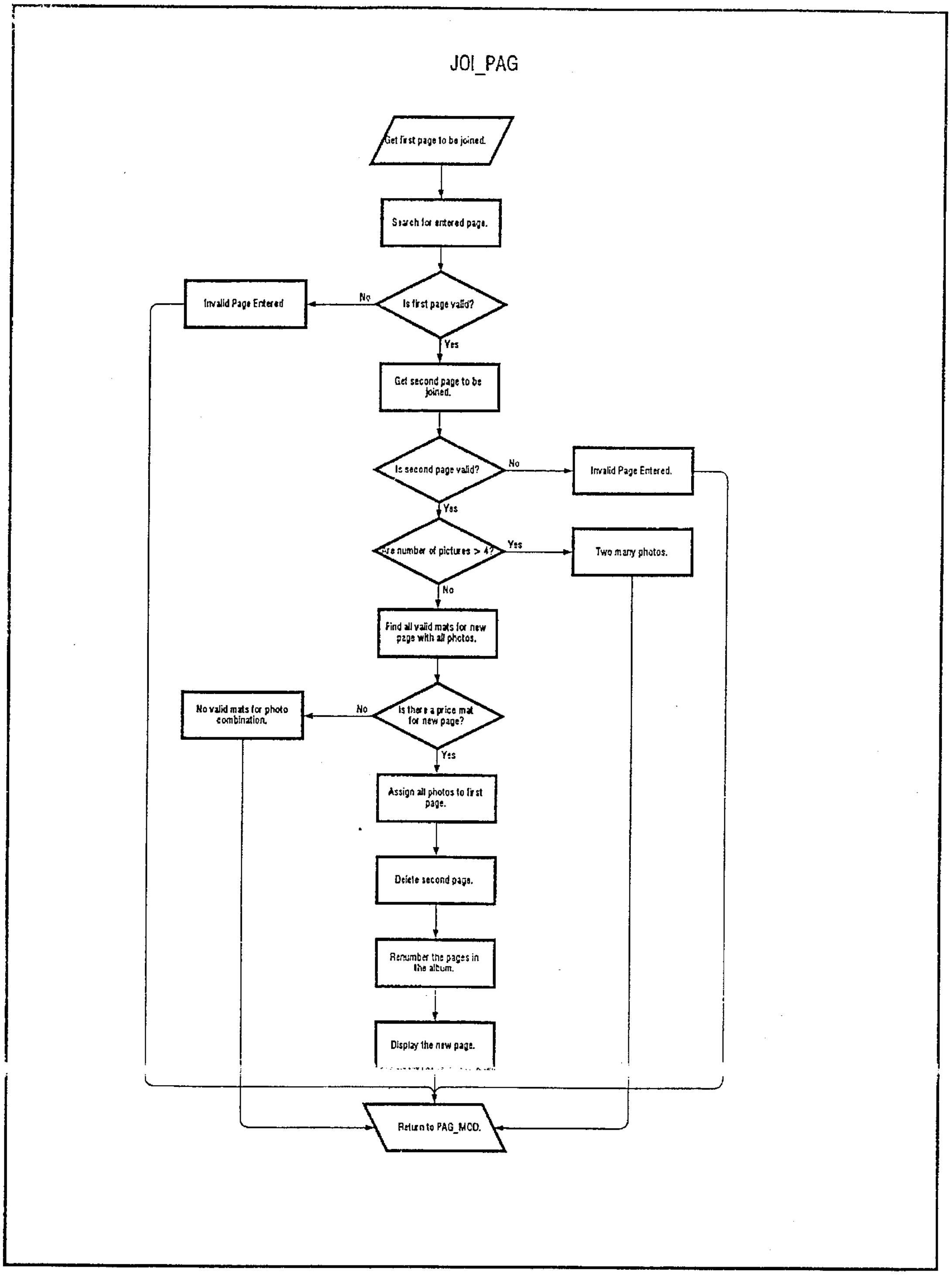
JOI_PAG
Get first page to be joined.
Search for entered page.
Is first page valid?
No
Invalid Page Entered
Yes
Get second page to be joined.
Is second page valid?
No
Invalid Page Entered.
Yes
Are number of pictures > 4?
Yes
Two many photos.
No
Find all valid mats for new page with all photos.
Is there a price mat for new page?
No
No valid mats for photo combination.
Yes
Assign all photos to first page.
Delete second page.
Renumber the pages in the album.
Display the new page.
Return to PAG_MOD.

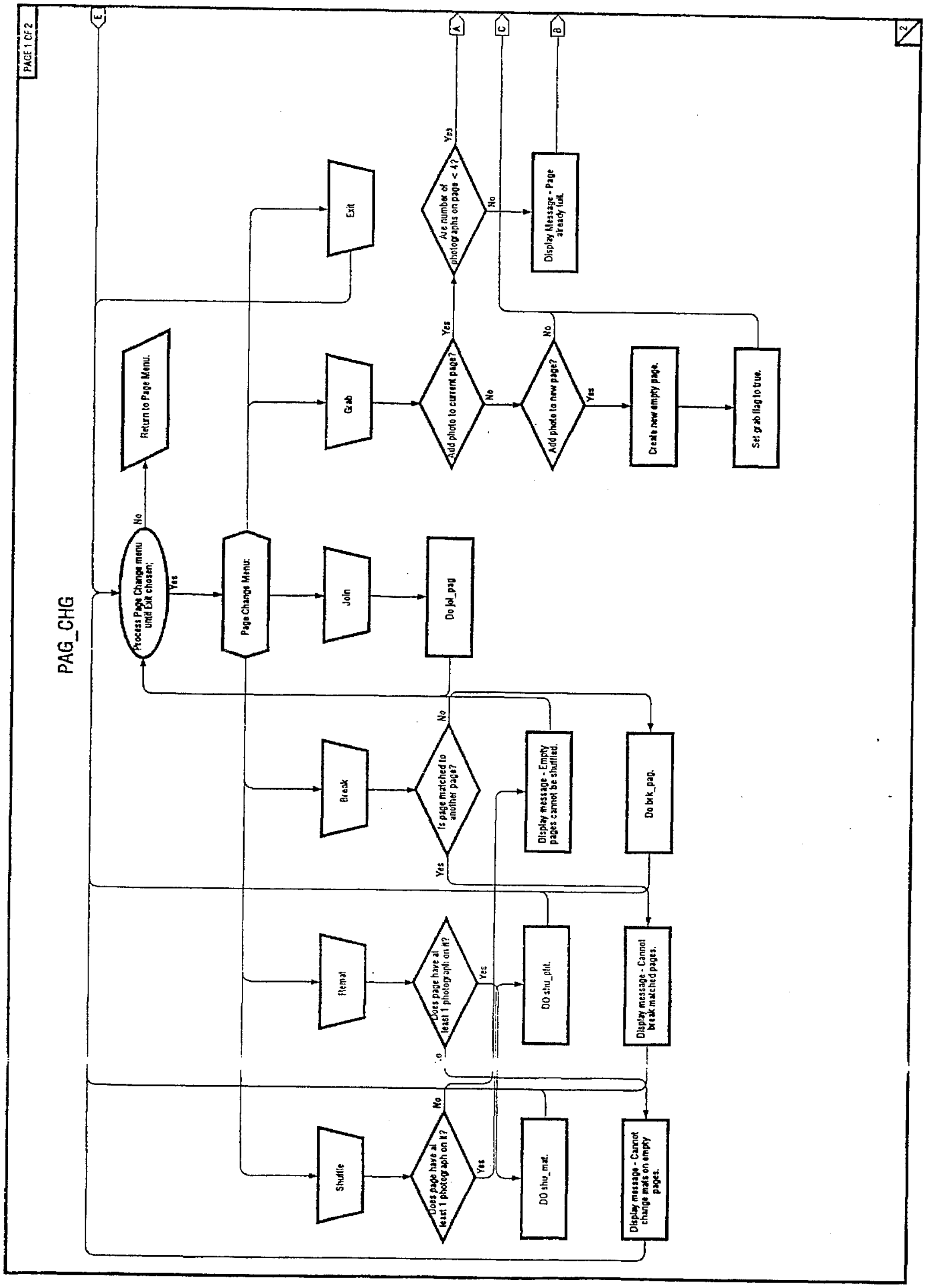
PAGE 1 OF 2
PAG_CHG
E
A
C
B
2
Process Page Change menu until Exit chosen;
Yes
No
Return to Page Menu.
Page Change Menu
Exit
Grab
Join
Break
Remat
Shuffle
Add photo to current page?
Are number of photographs on page < 4?
Display Message - Page already full.
Add photo to new page?
Create new empty page.
Set grab flag to true.
Do joi_pag
Is page matched to another page?
Display message - Empty pages cannot be shuffled.
Do brk_pag.
Does page have at least 1 photograph on it?
DO shu_pht.
Display message - Cannot break matched pages.
DO shu_mat.
Display message - Cannot change mats on empty pages.

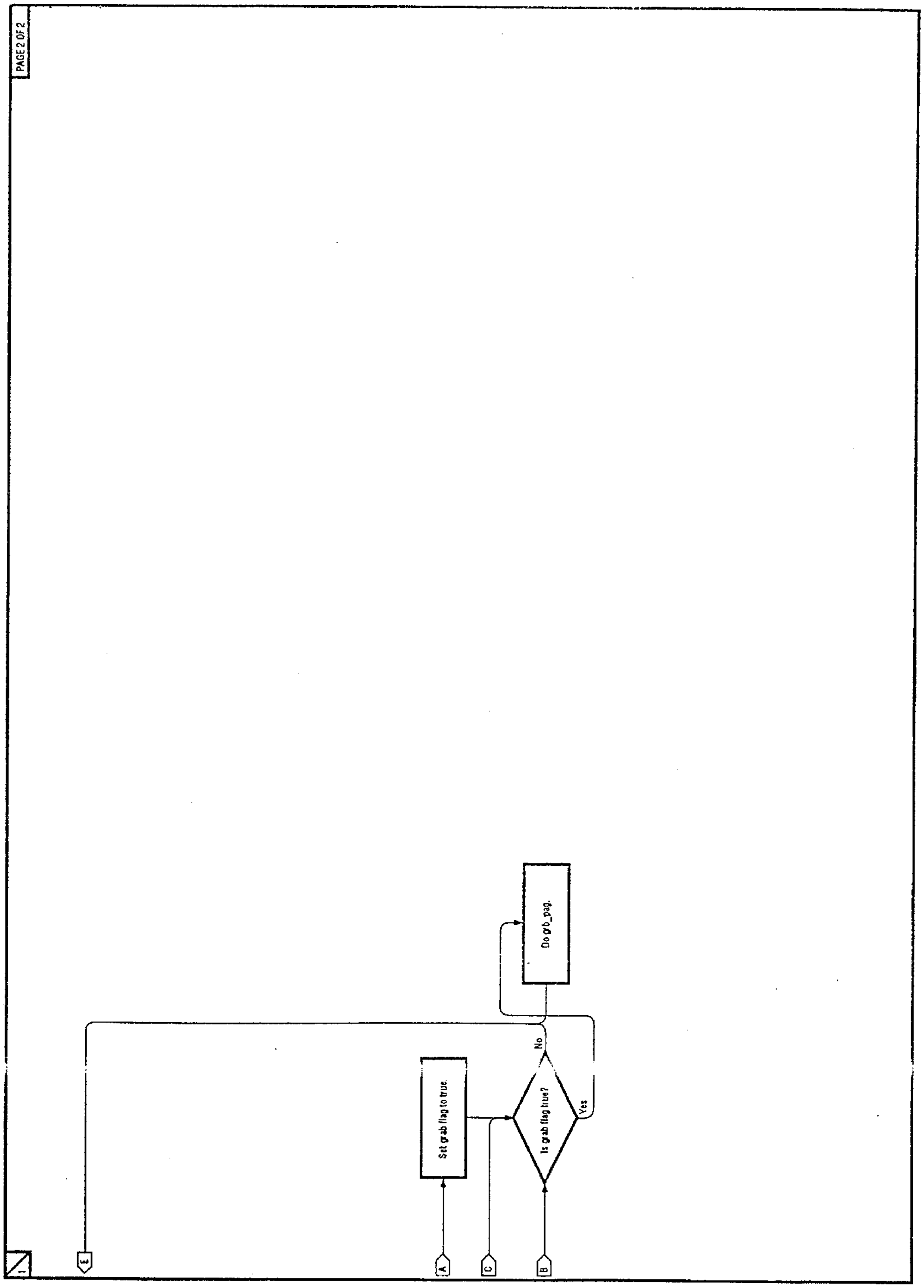
PAGE 2 OF 2
Do grb_pag.
Set grab flag to true.
Is grab flag true?
No
Yes
A
C
B
E

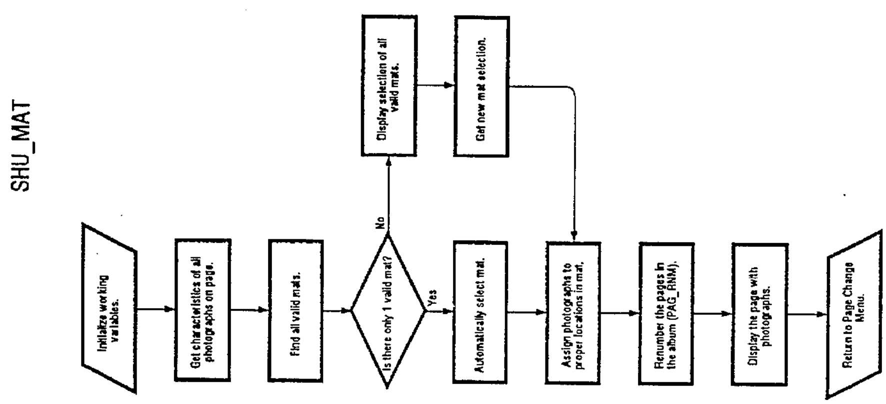
SHU_MAT
Initialize working variables.
Get characteristics of all photographs on page.
Find all valid mats.
Is there only 1 valid mat?
No
Yes
Display selection of all valid mats.
Get new mat selection.
Automatically select mat.
Assign photographs to proper locations in mat.
Renumber the pages in the album (PAG_RNM).
Display the page with photographs.
Return to Page Change Menu.

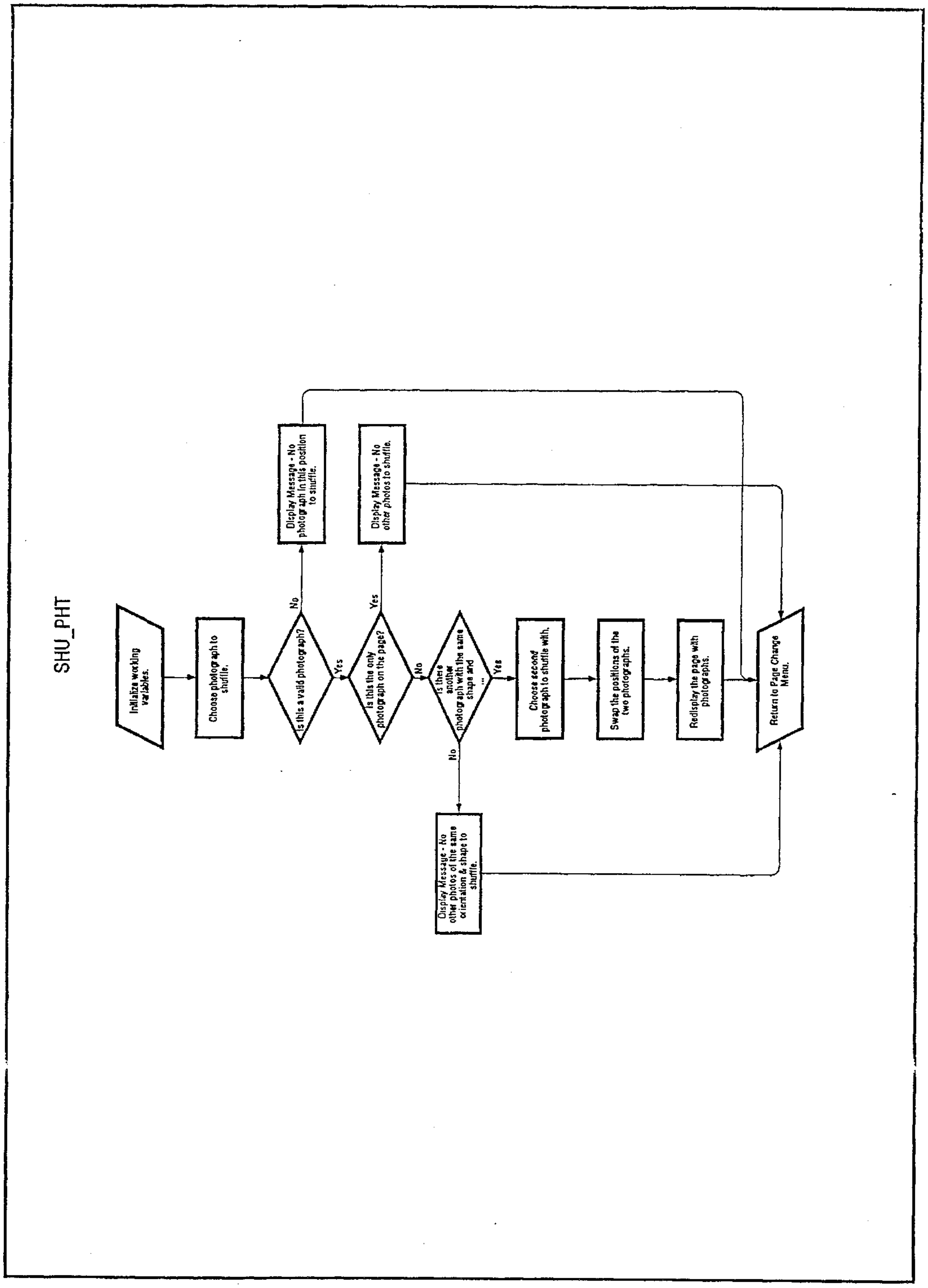
SHU_PHT
Initialize working variables.
Choose photograph to shuffle.
Is this a valid photograph?
No
Yes
Display Message - No photograph in this position to shuffle.
Is this the only photograph on the page?
Yes
No
Display Message - No other photos to shuffle.
Is there another photograph with the same shape and ...
Yes
No
Display Message - No other photos of the same orientation & shape to shuffle.
Choose second photograph to shuffle with.
Swap the positions of the two photographs.
Redisplay the page with photographs.
Return to Page Change Menu.

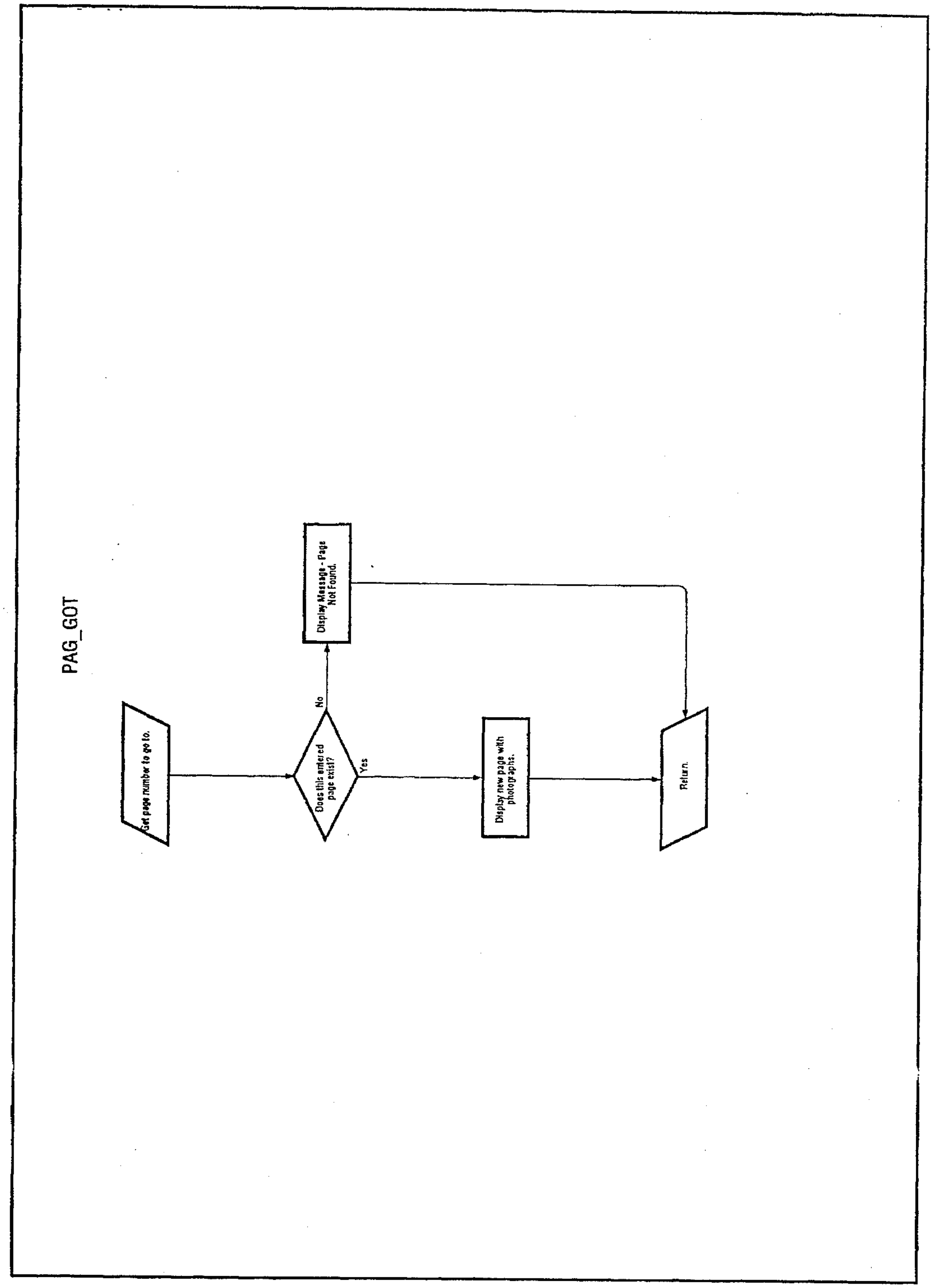
PAG_GOT
Get page number to go to.
Does this entered page exist?
No
Yes
Display Message - Page Not Found.
Display new page with photographs.
Return.

PAG_NXT
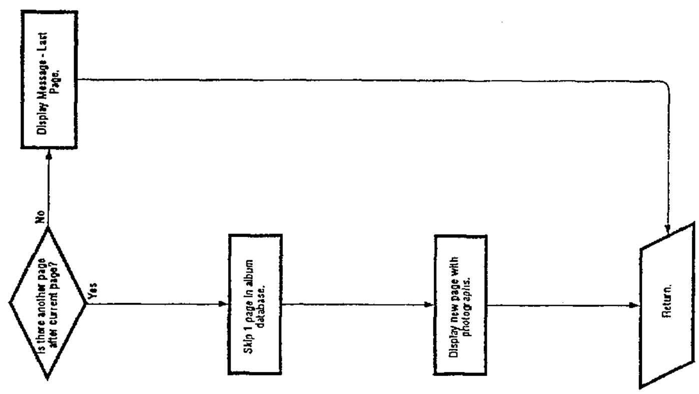

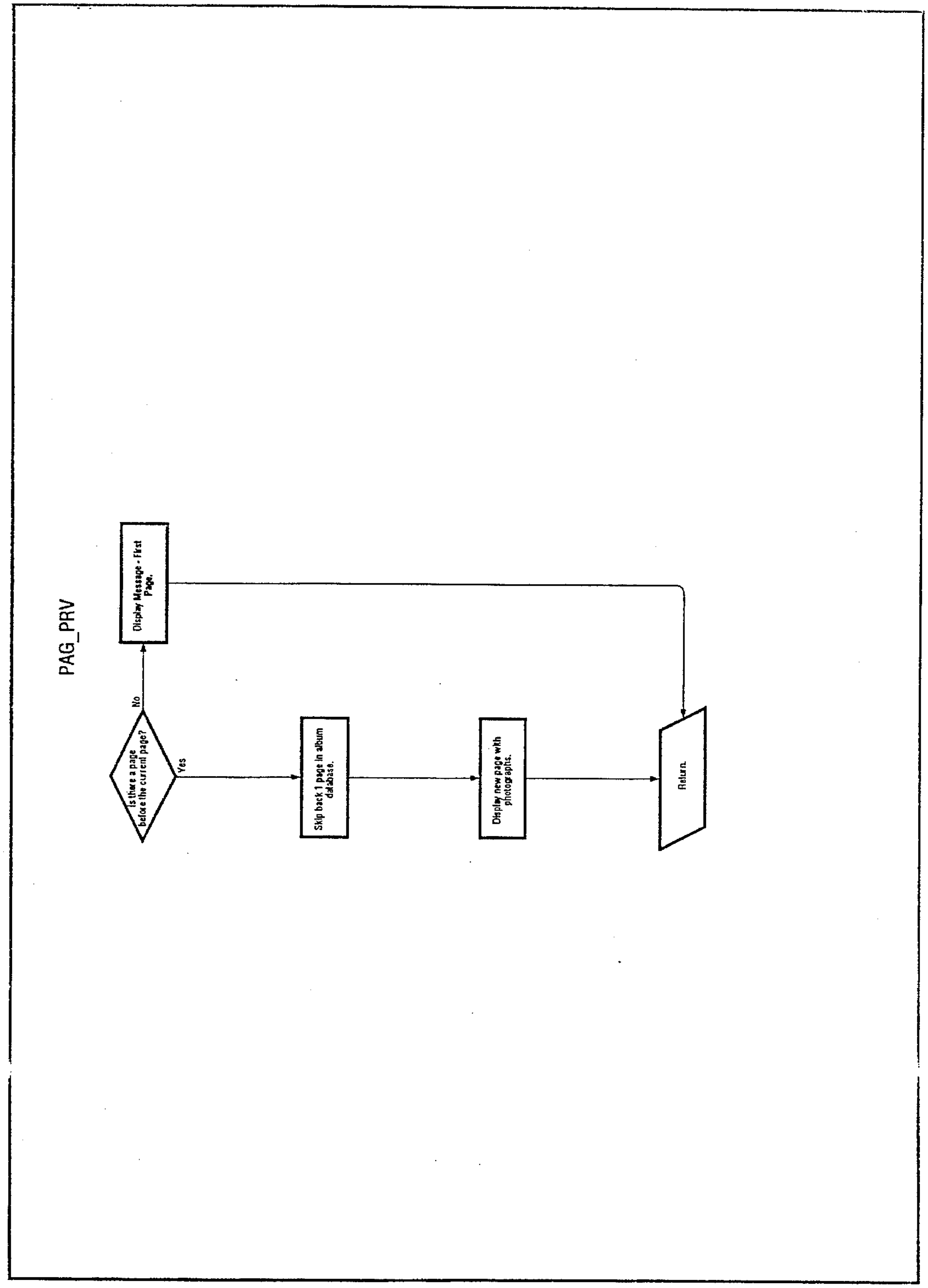
PAG_PRV
Is there a page before the current page?
No
Yes
Display Message - First Page.
Skip back 1 page in album database.
Display new page with photographs.
Return.

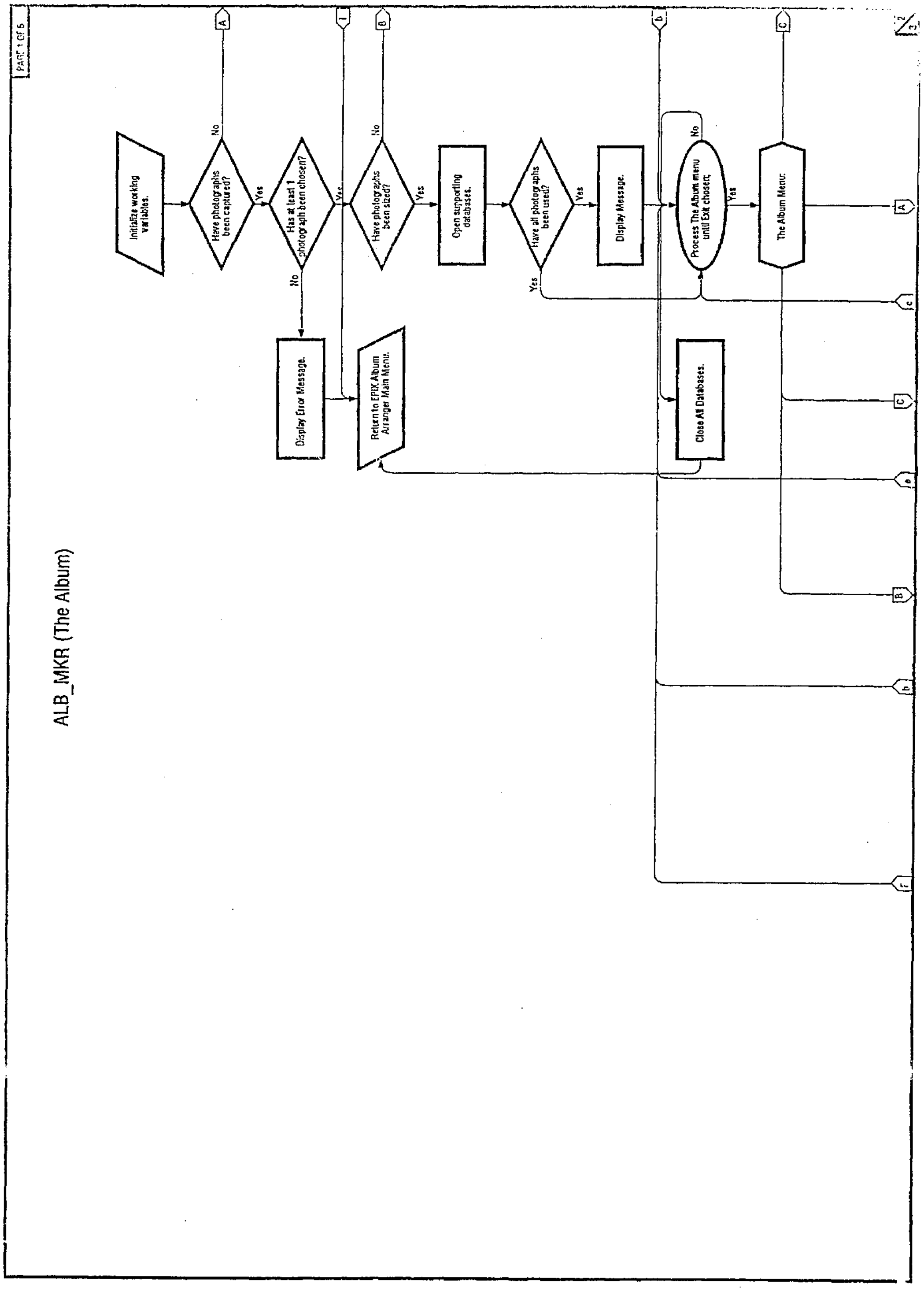
ALB_MKR (The Album)
PART 1 OF 5
Initialize working variables.
Have photographs been captured?
Has at least 1 photograph been chosen?
Have photographs been sized?
Open supporting databases.
Have all photographs been used?
Display Message.
Process The Album menu until Exit chosen.
The Album Menu.
Display Error Message.
Return to EPIX Album Arranger Main Menu.
Close All Databases.
Yes
No

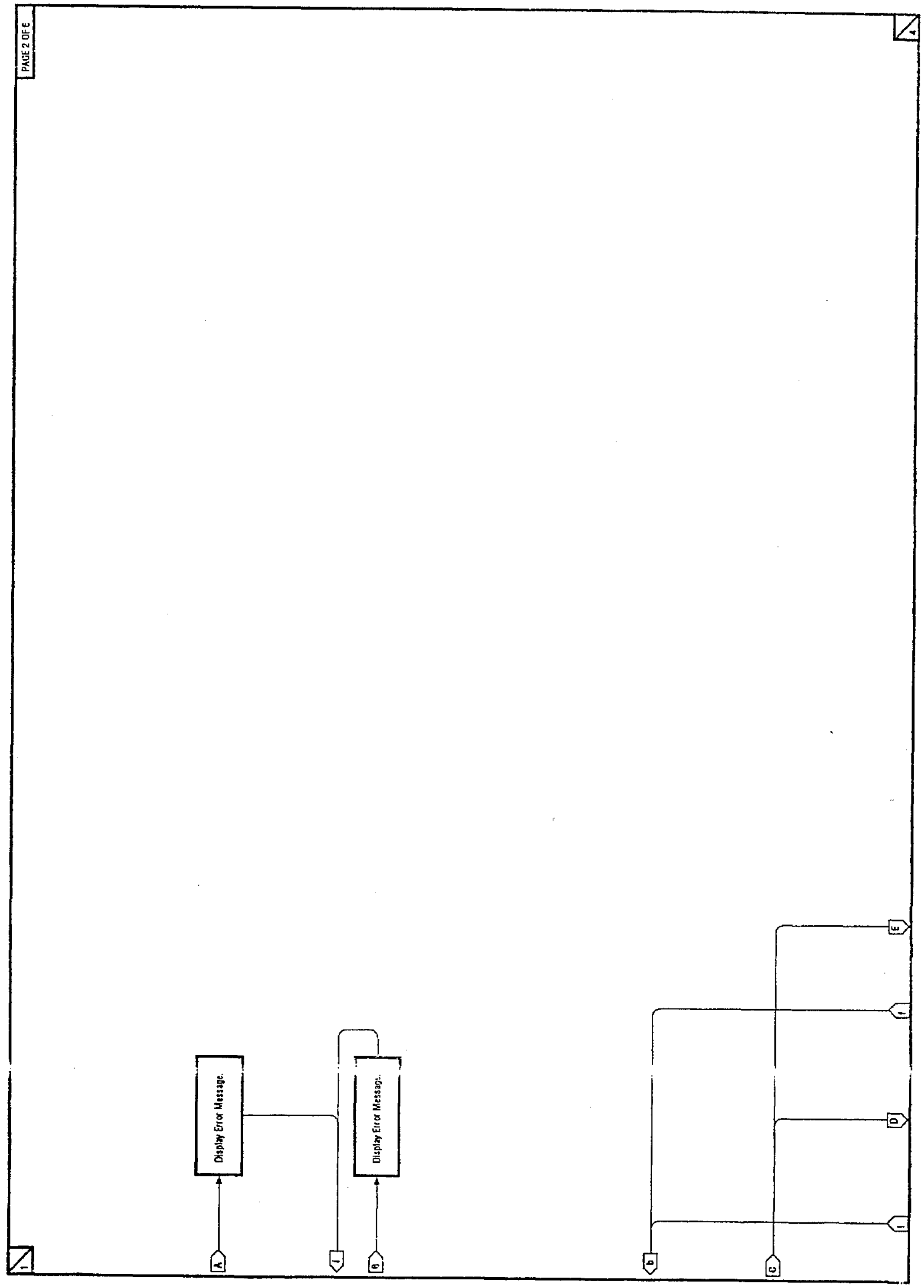
Display Error Message.
Display Error Message.

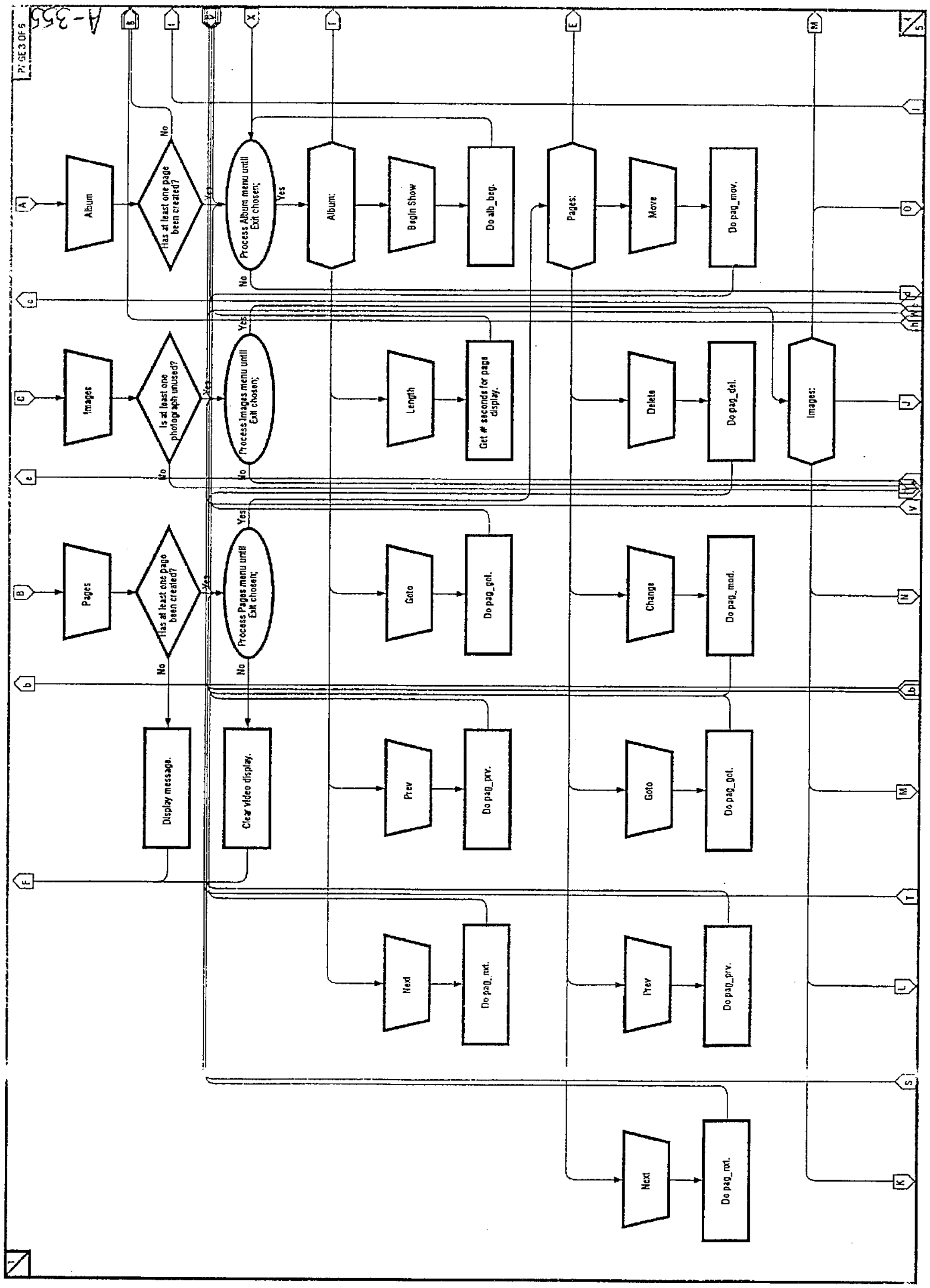
PAGE 3 OF 5
A-355
Album
Has at least one page been created?
Process Album menu until Exit chosen;
Album:
Begin Show
Do alb_beg.
Pages:
Move
Do pag_mov.
Images
Is at least one photograph unused?
Process Images menu until Exit chosen;
Length
Get # seconds for page display.
Delete
Do pag_del.
Images:
Pages
Has at least one page been created?
Process Pages menu until Exit chosen;
Goto
Do pag_got.
Change
Do pag_mod.
Display message.
Clear video display.
Prev
Do pag_prv.
Goto
Do pag_got.
Next
Do pag_nxt.
Prev
Do pag_prv.
Next
Do pag_nxt.

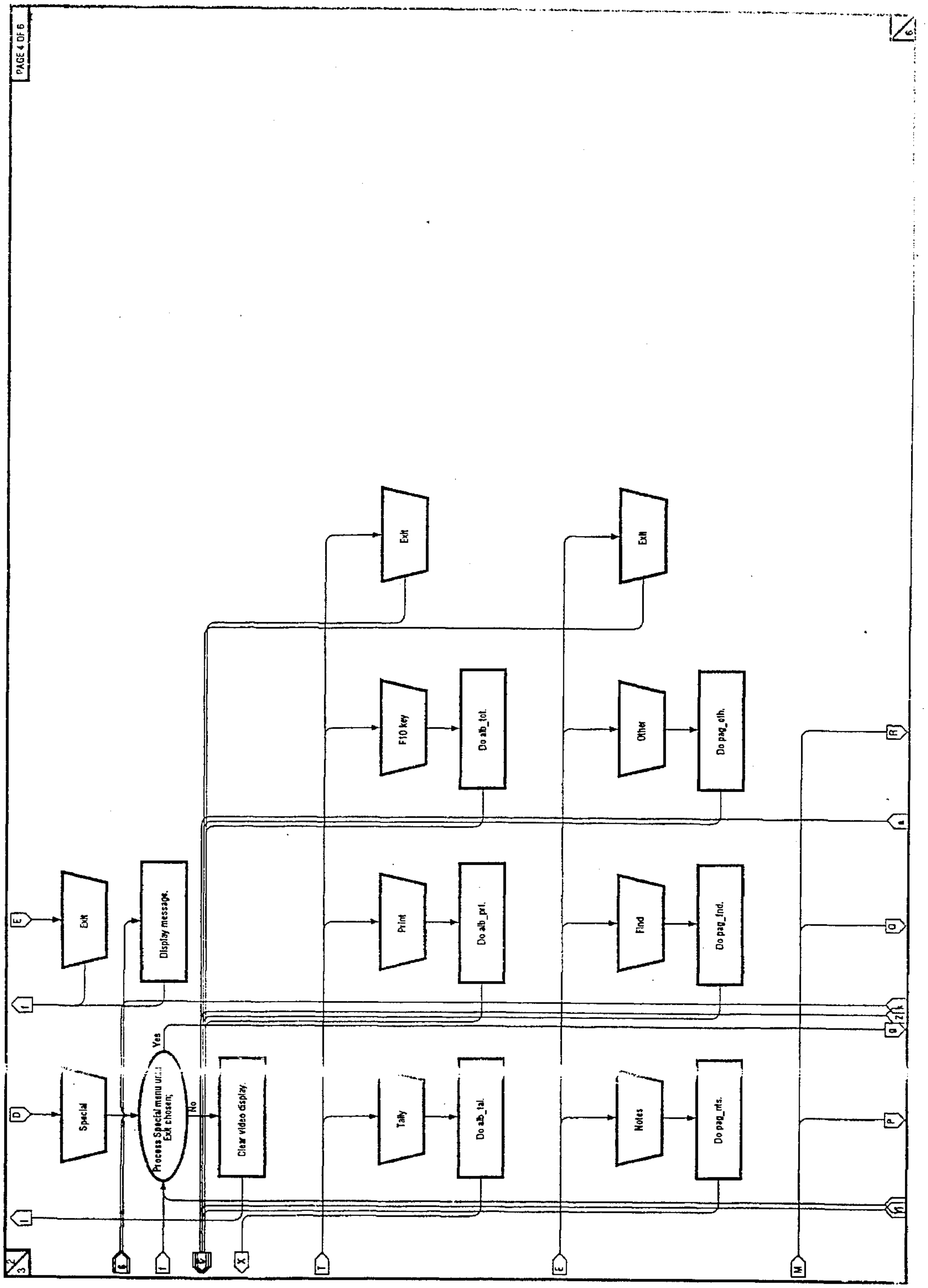
PAGE 4 OF 6
Special
Exit
Process Special menu until Exit chosen;
Yes
No
Display message.
Clear video display.
Tally
Print
F10 key
Exit
Do alb_tal.
Do alb_prt.
Do alb_tot.
Notes
Find
Other
Exit
Do pag_nts.
Do pag_fnd.
Do pag_oth.

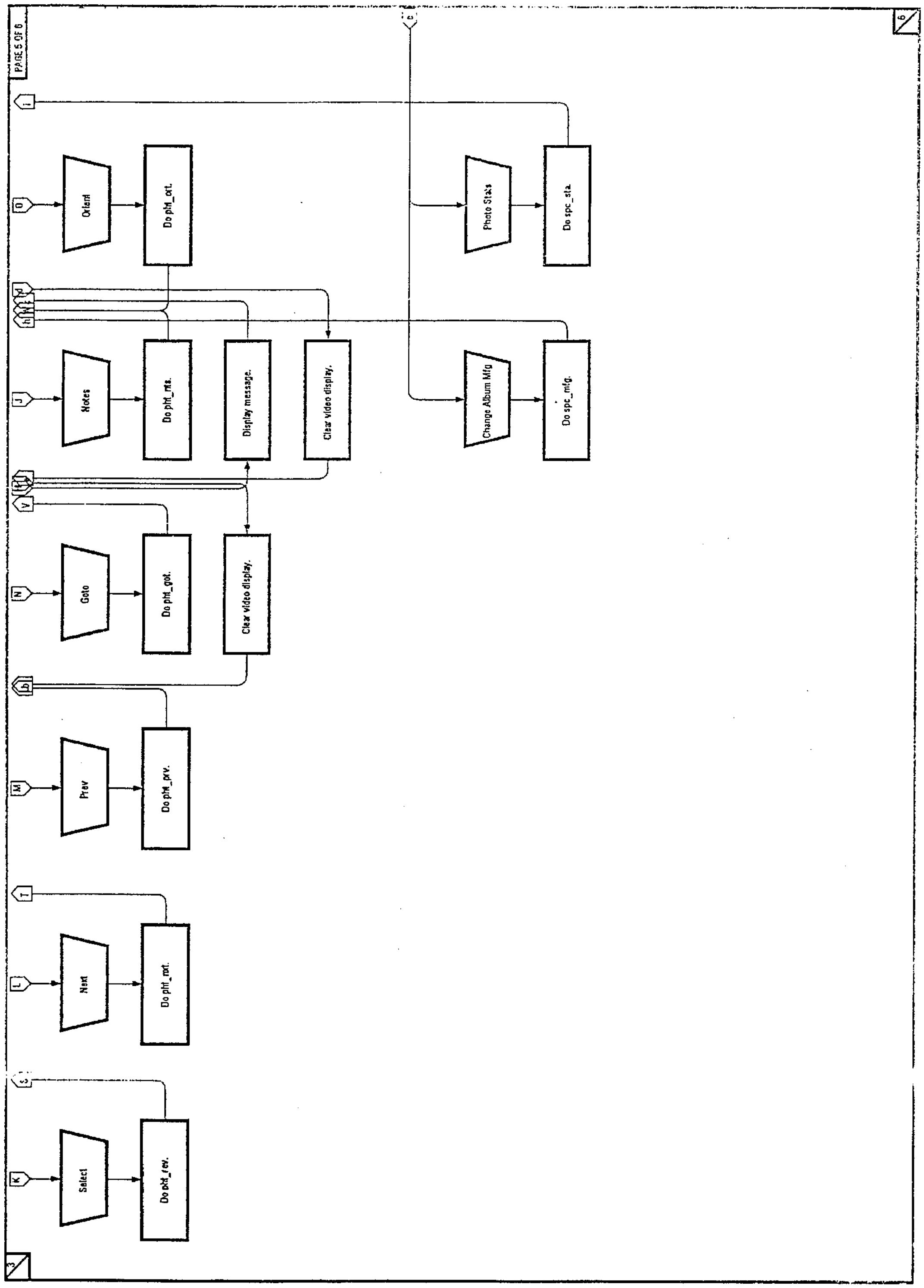
PAGE 5 OF 6
Orient
Do pht_ort.
Photo Stats
Do spc_sta.
Notes
Do pht_nts.
Display message.
Clear video display.
Change Album Mfg
Do spc_mfg.
Goto
Do pht_got.
Clear video display.
Prev
Do pht_prv.
Next
Do pht_nxt.
Select

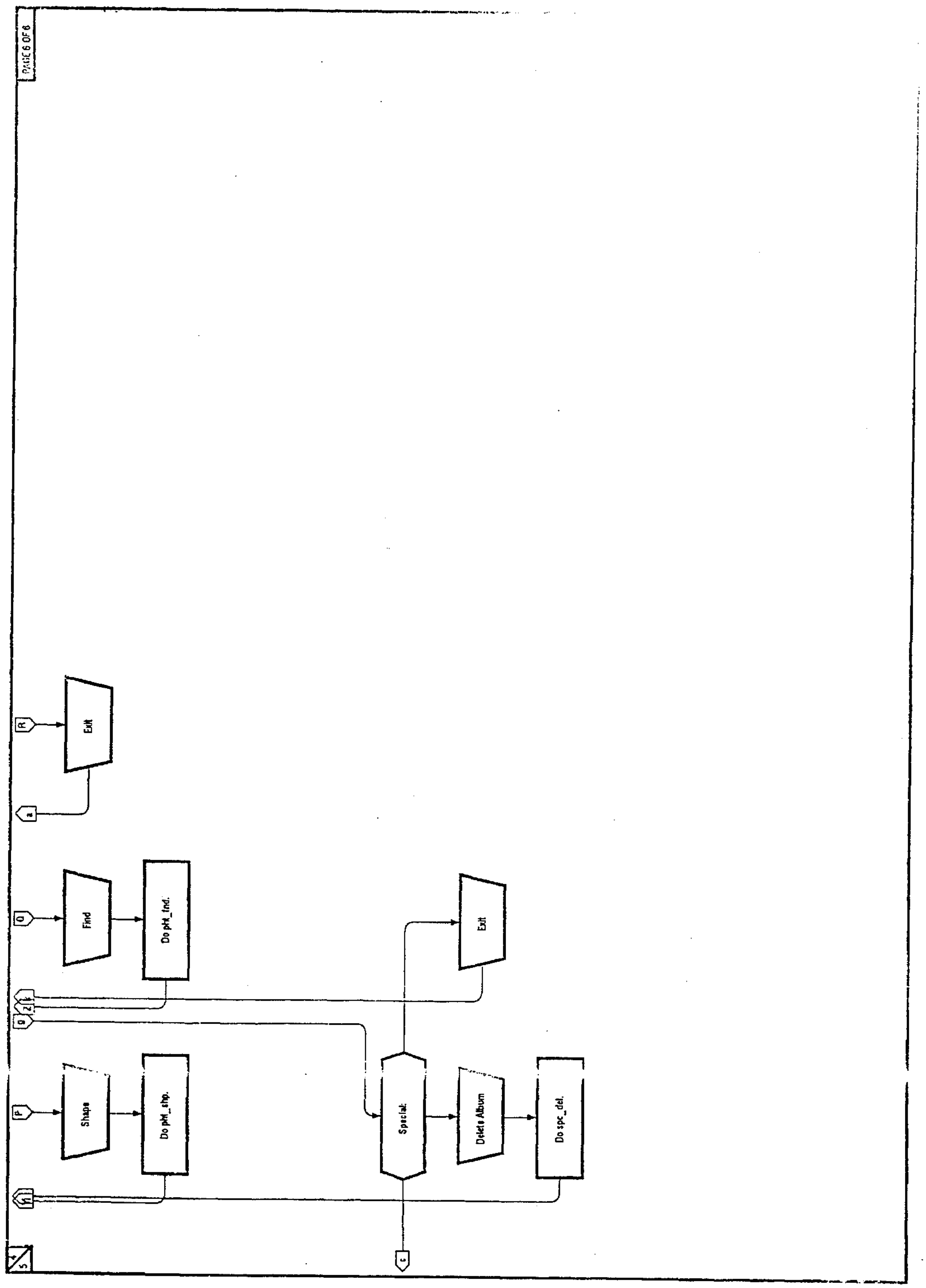
PAGE 6 OF 6
Exit
Find
Do pM_fnd.
Exit
Shape
Do pM_shp.
Special:
Delete Album
Do spc_del.

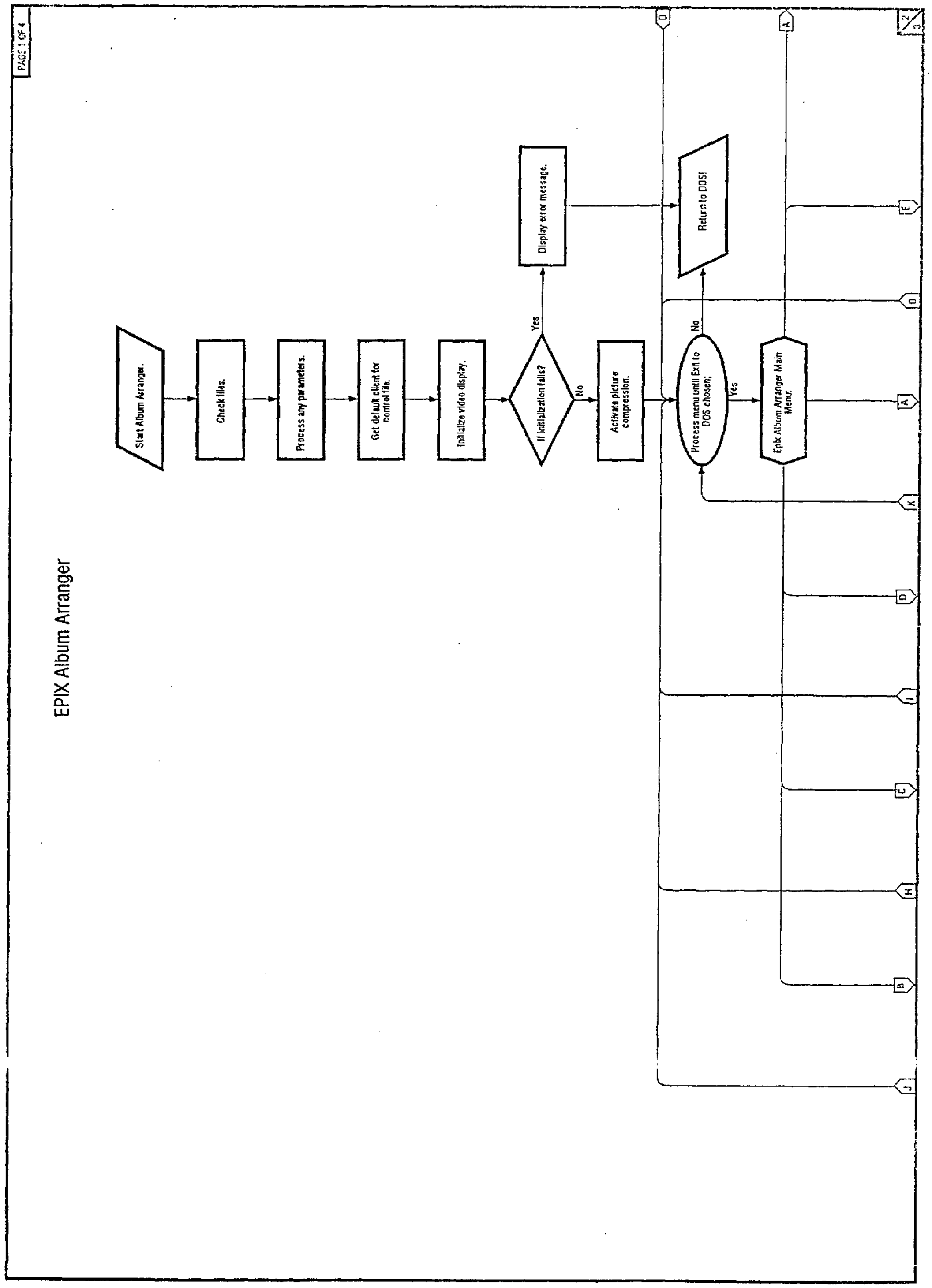
PAGE 1 OF 4
EPIX Album Arranger
Start Album Arranger.
Check files.
Process any parameters.
Get default client for control file.
Initialize video display.
If initialization fails?
Yes
No
Display error message.
Return to DOS!
Activate picture compression.
Process menu until Exit to DOS chosen;
No
Yes
Epix Album Arranger Main Menu.

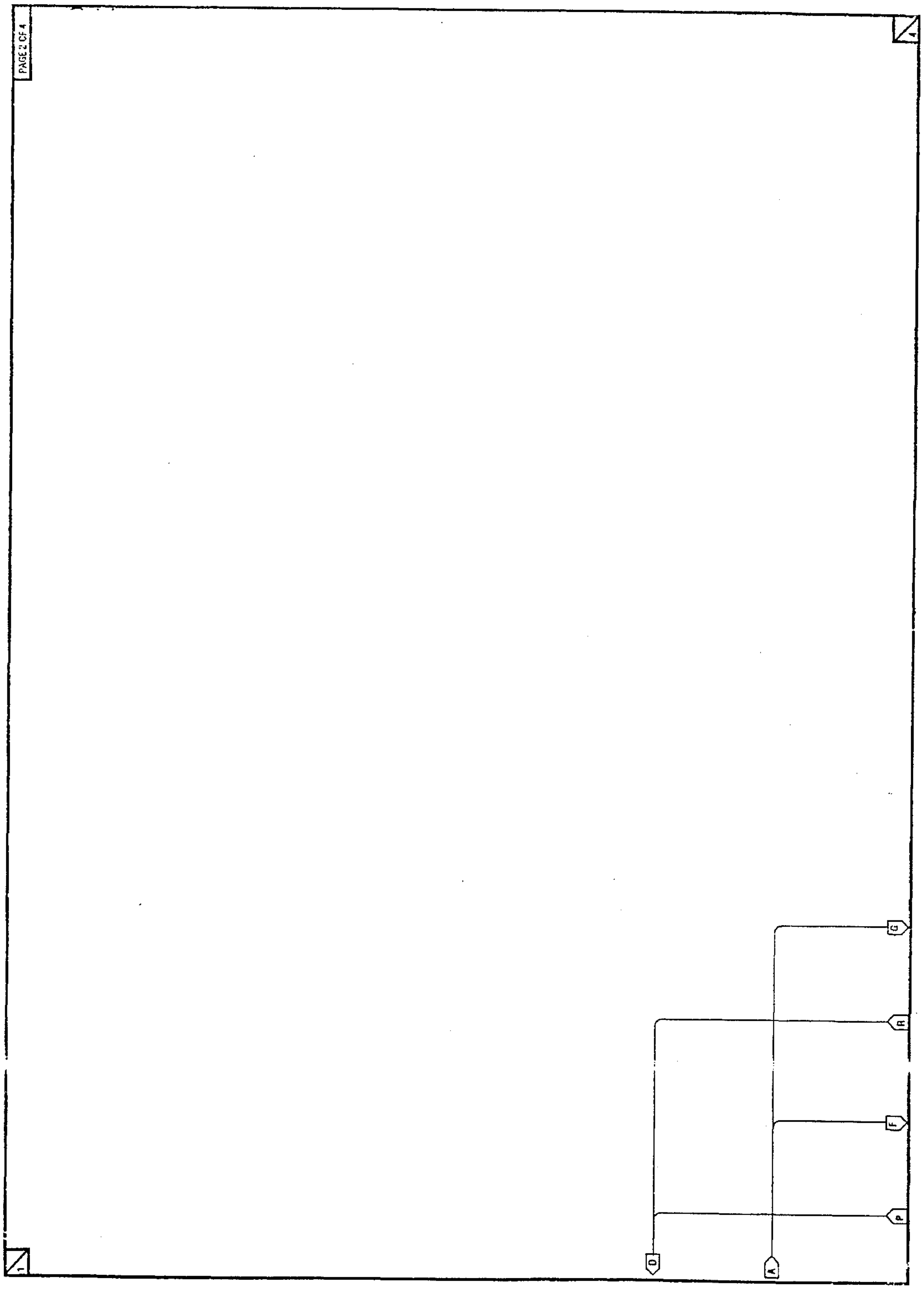

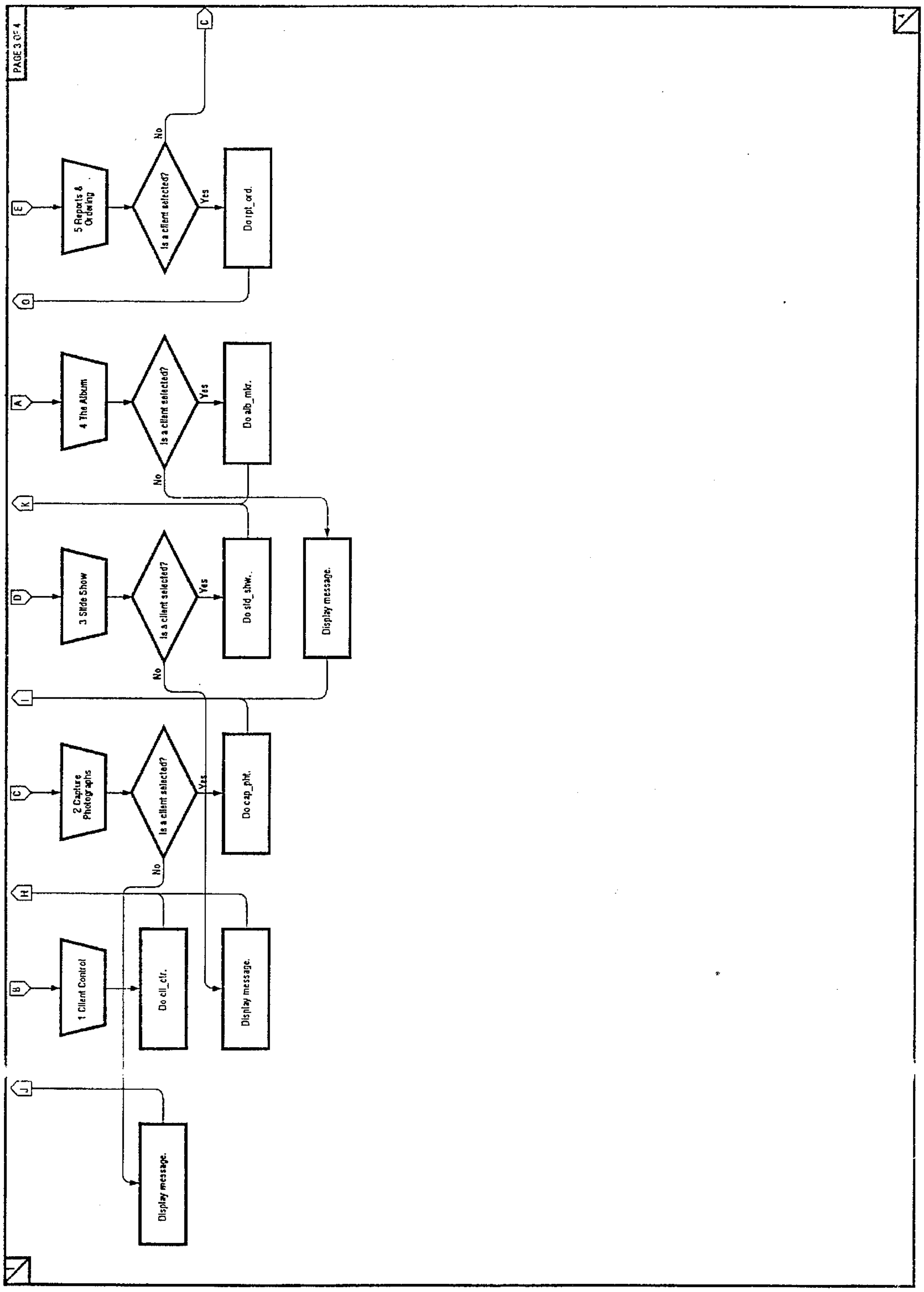
PAGE 3 OF 4
E
5 Reports & Ordering
Is a client selected?
Yes
No
C
Do rpt_ord.
O
A
4 The Album
Is a client selected?
Yes
No
Do alb_mkr.
K
D
3 Slide Show
Is a client selected?
Yes
No
Do sld_shw.
Display message.
I
C
2 Capture Photographs
Is a client selected?
Yes
No
Do cap_pht.
H
B
1 Client Control
Do cli_ctr.
Display message.
J
Display message.

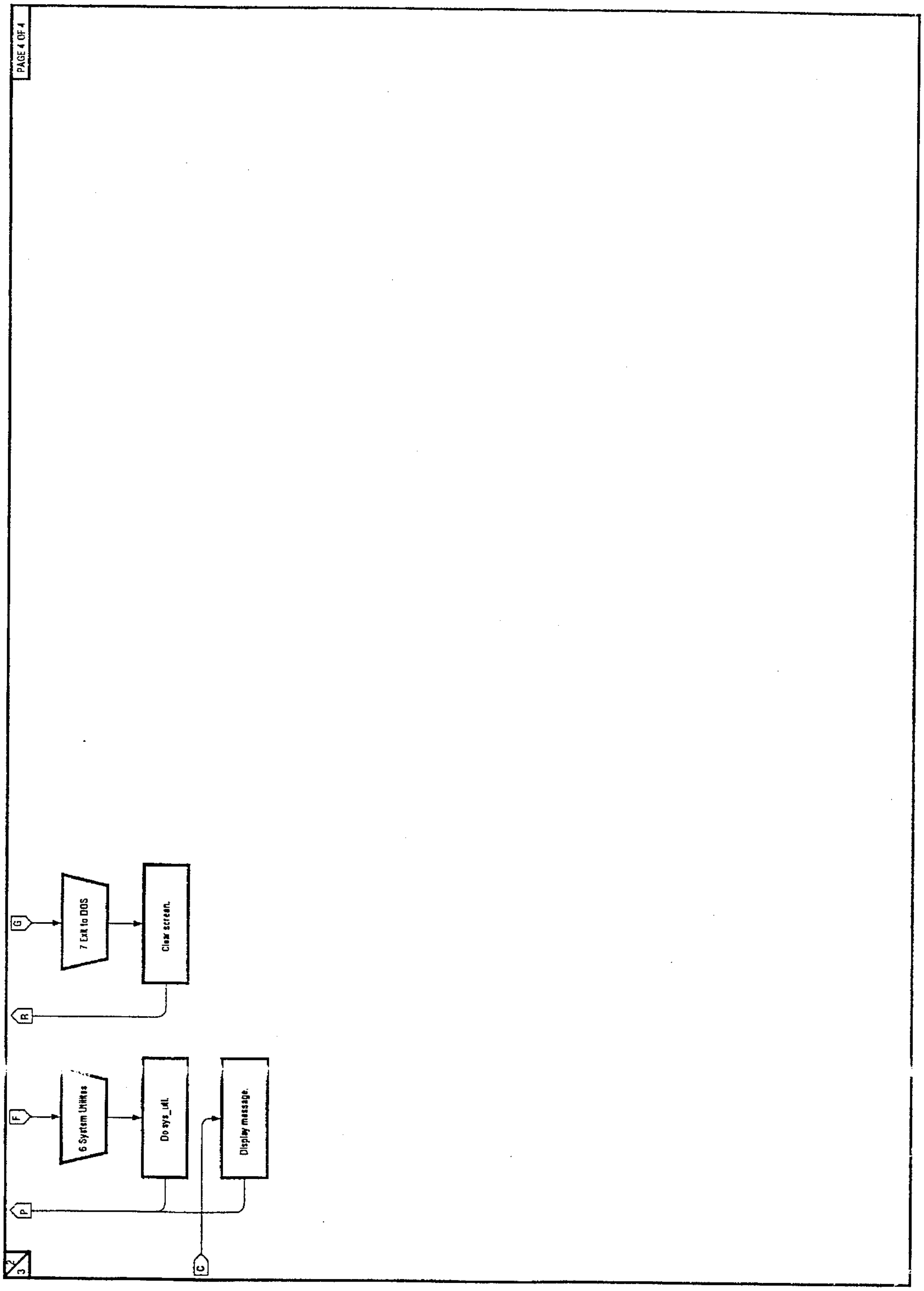
PAGE 4 OF 4
G
7 Exit to DOS
Clear screen.
R
F
6 System Utilities
Do sys_util.
Display message.
P
C
2
3

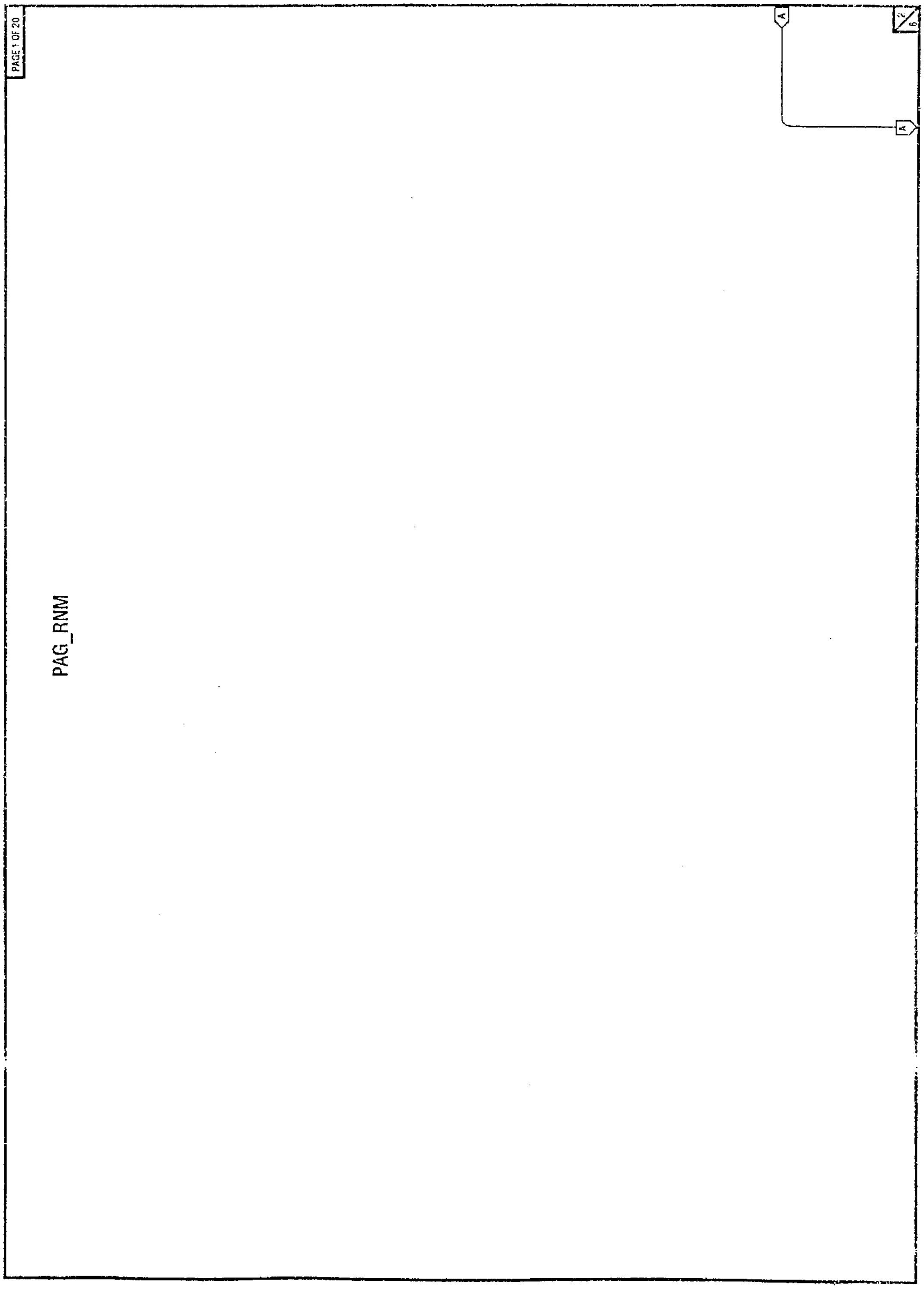
PAGE 1 OF 20
PAG_RNM

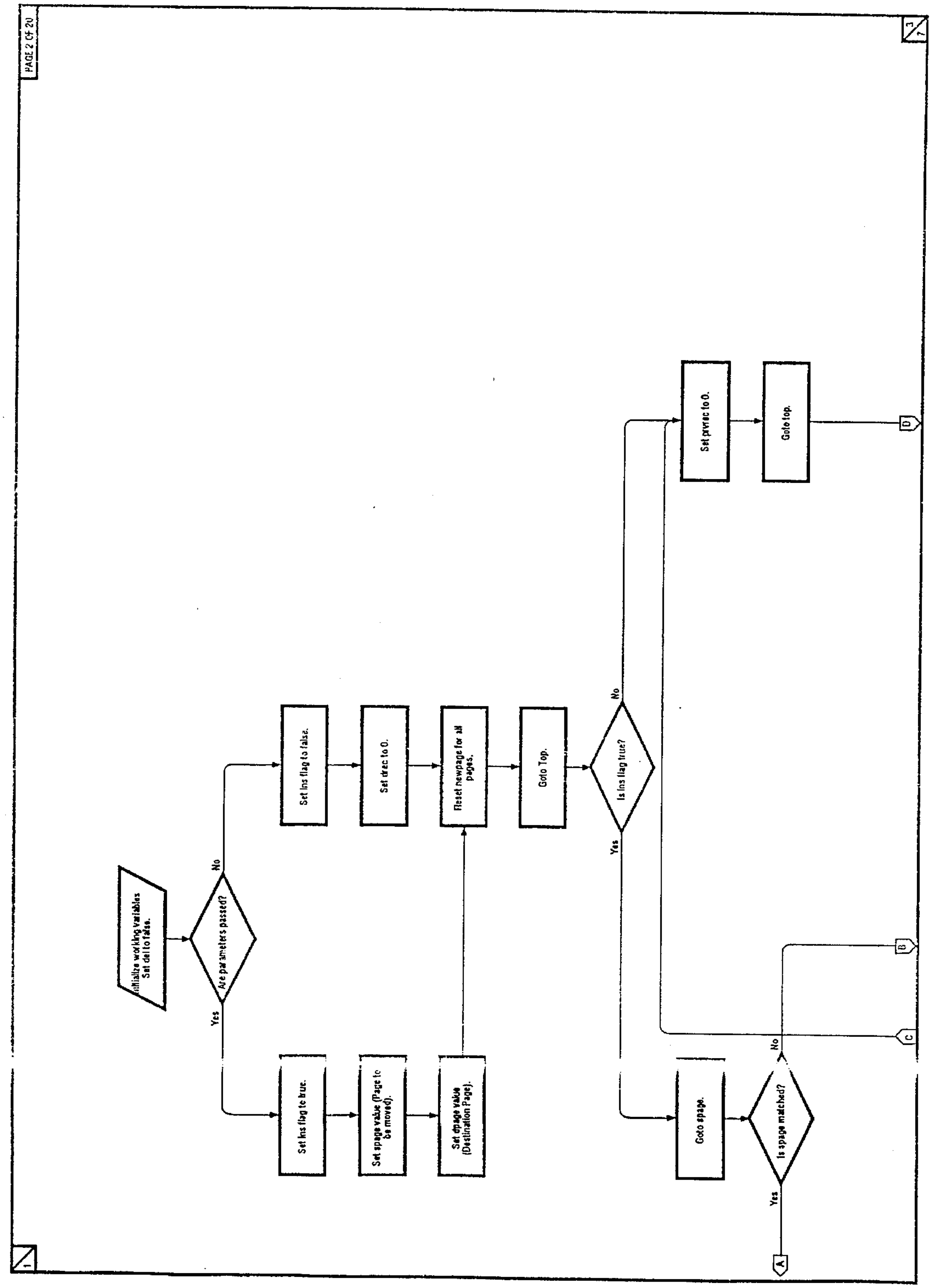
PAGE 2 OF 20
Initialize working variables
Set del to false.
Are parameters passed?
No
Yes
Set ins flag to false.
Set drec to 0.
Reset newpage for all pages.
Goto Top.
Is ins flag true?
No
Yes
Set prvrec to 0.
Goto top.
D
Set ins flag to true.
Set spage value (Page to be moved).
Set dpage value (Destination Page).
Goto spage.
Is spage matched?
No
Yes
A
B
C

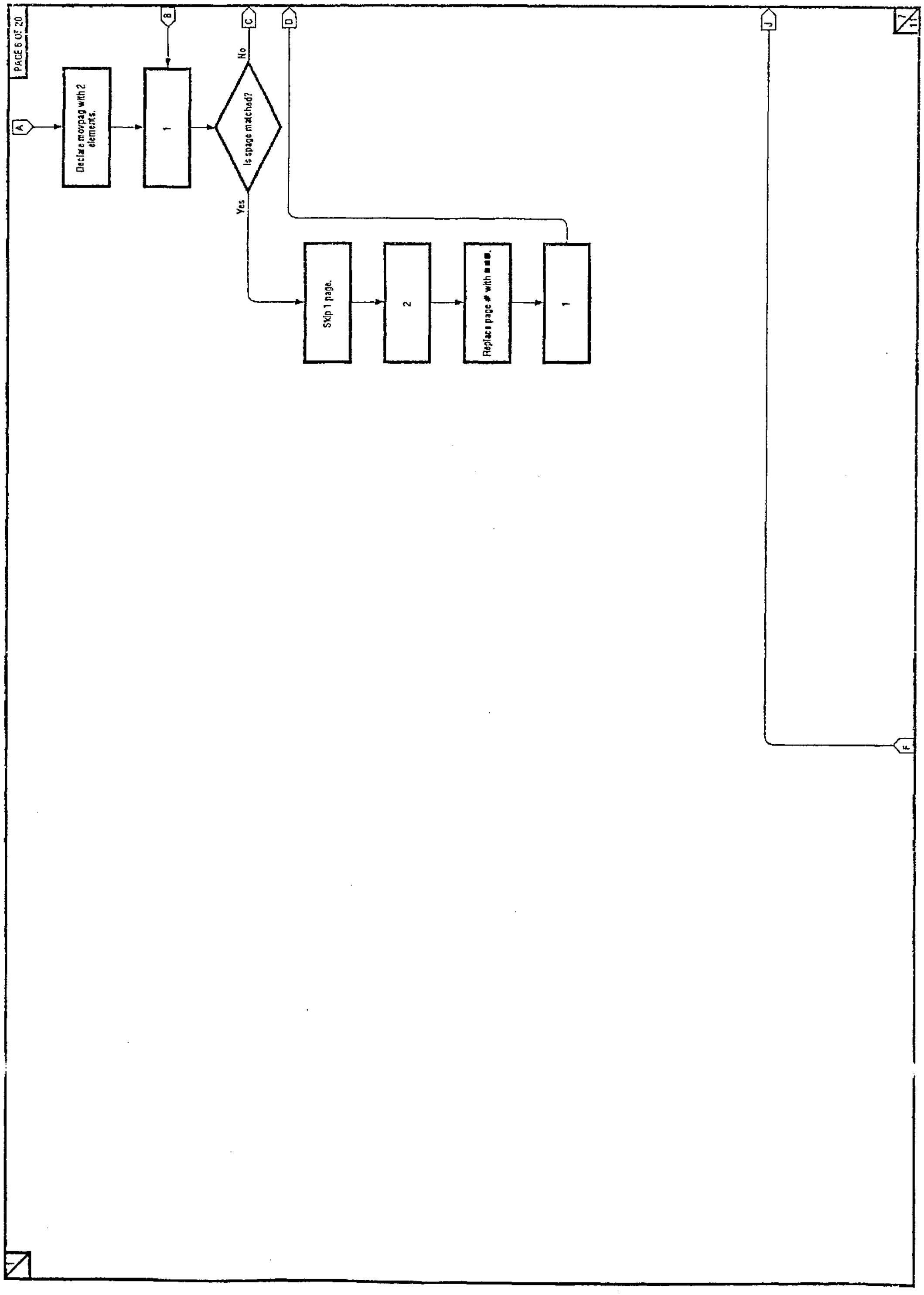
PAGE 6 OF 20
A
B
C
D
J
F
Declare movpag with 2 elements.
1
Is spage matched?
No
Yes
Skip 1 page.
2
Replace page # with ■■■.
1

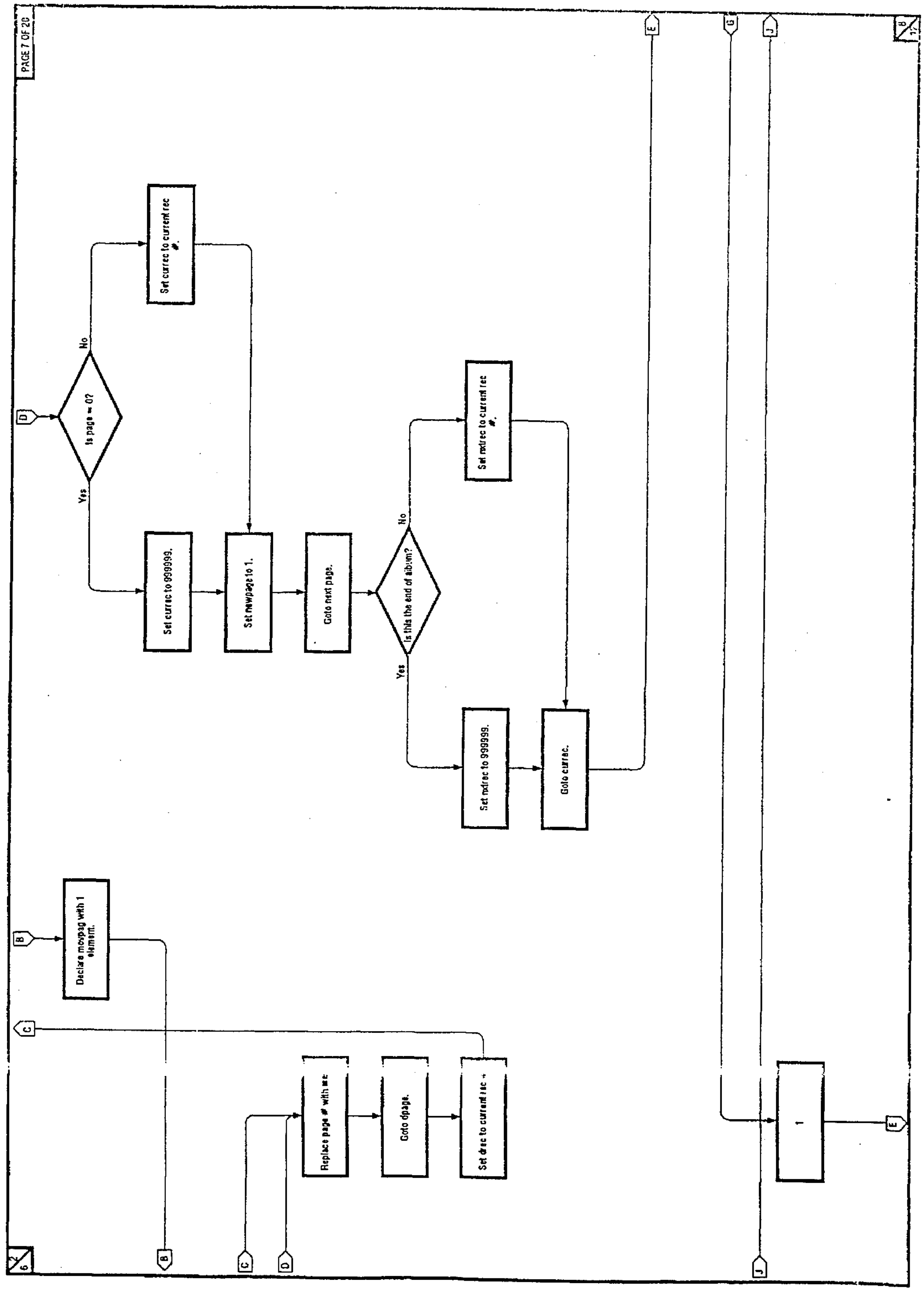
PAGE 7 OF 20
Is page = 0?
No
Yes
Set currec to current rec #.
Set currec to 999999.
Set newpage to 1.
Goto next page.
Is this the end of album?
Set nxtrec to current rec #.
Set nxtrec to 999999.
Goto currec.
Declare movpag with 1 element.
Goto dpage.

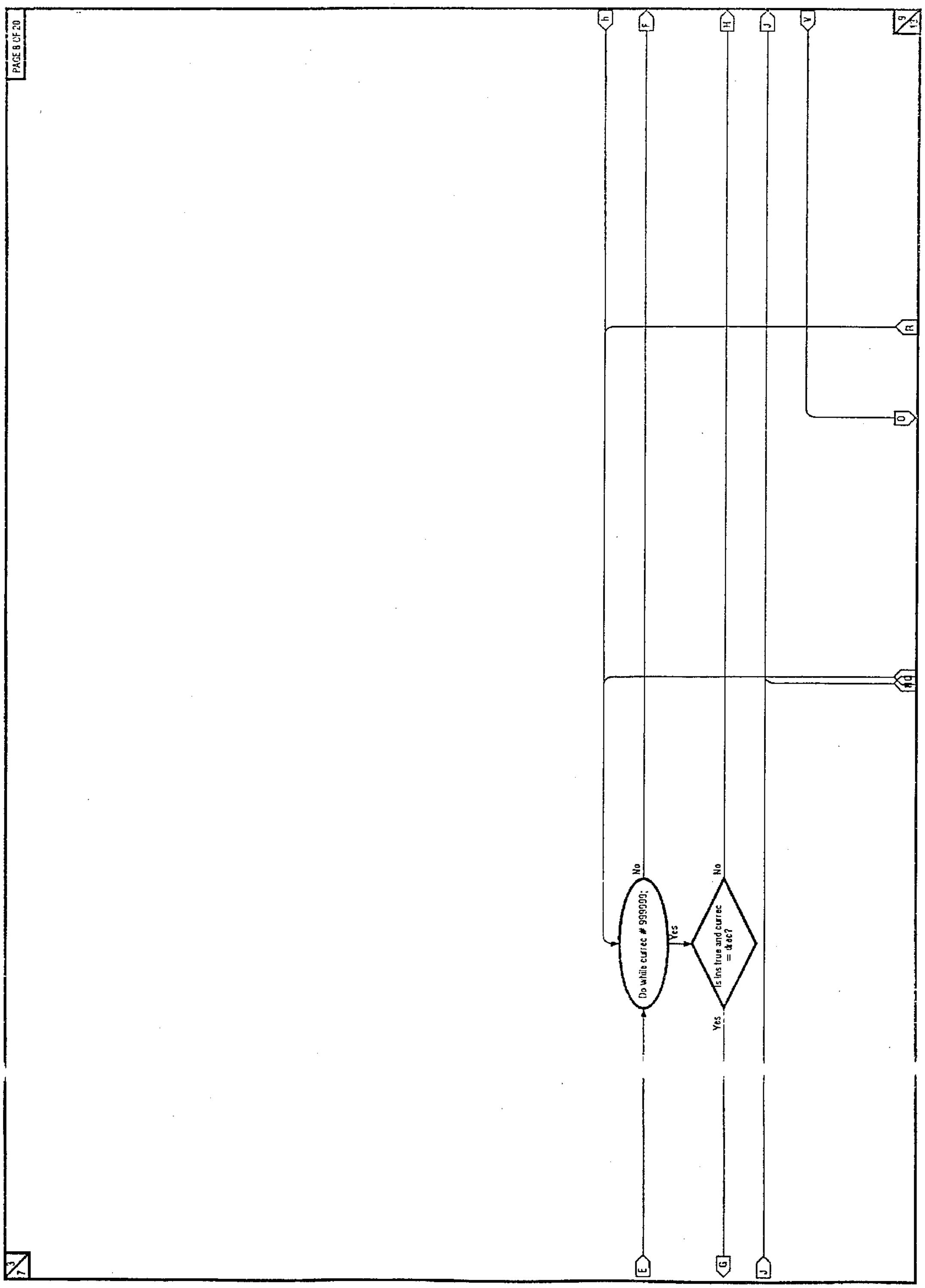
PAGE 8 OF 20
Do while currec ≠ 999999;
Yes
No
Is Ins true and currec = dec?
Yes
No
h
F
H
J
V
R
D
E
G
J

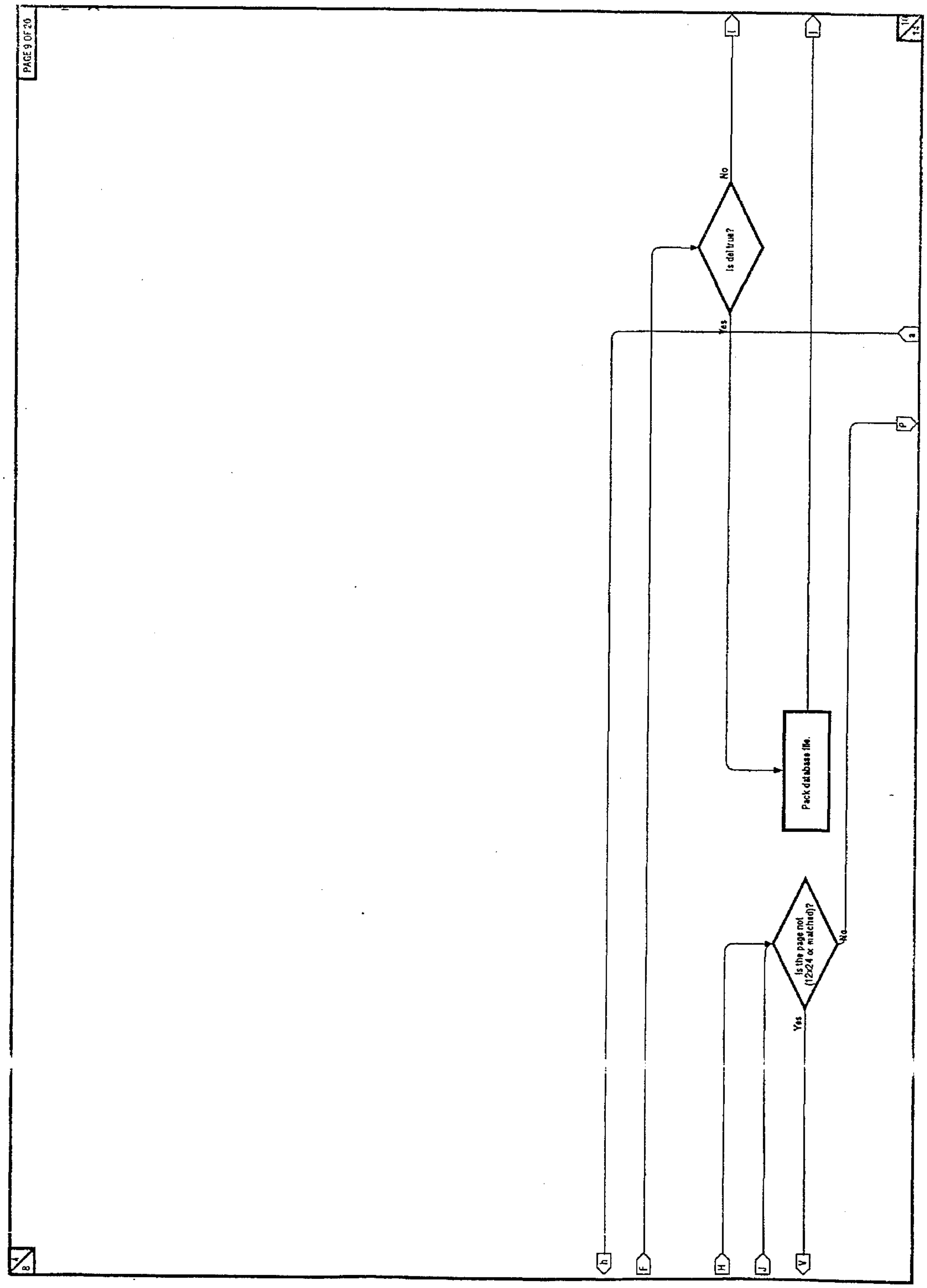
PAGE 9 OF 20
Is del true?
No
Yes
Pack database file.
Is the page not (12x24 or matched)?
No
Yes
a
P
h
F
H
J
V

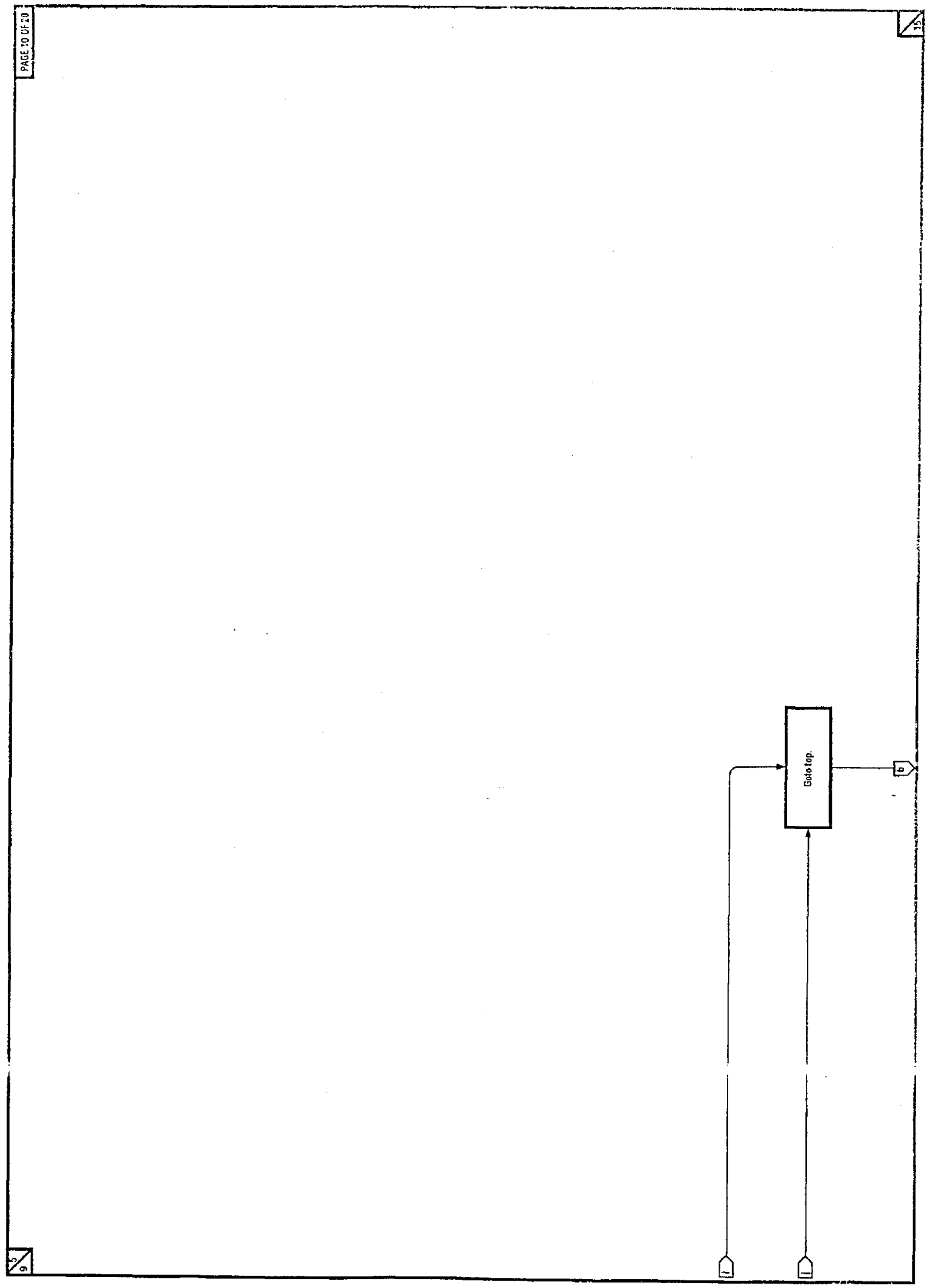
PAGE 10 OF 20
Goto top.

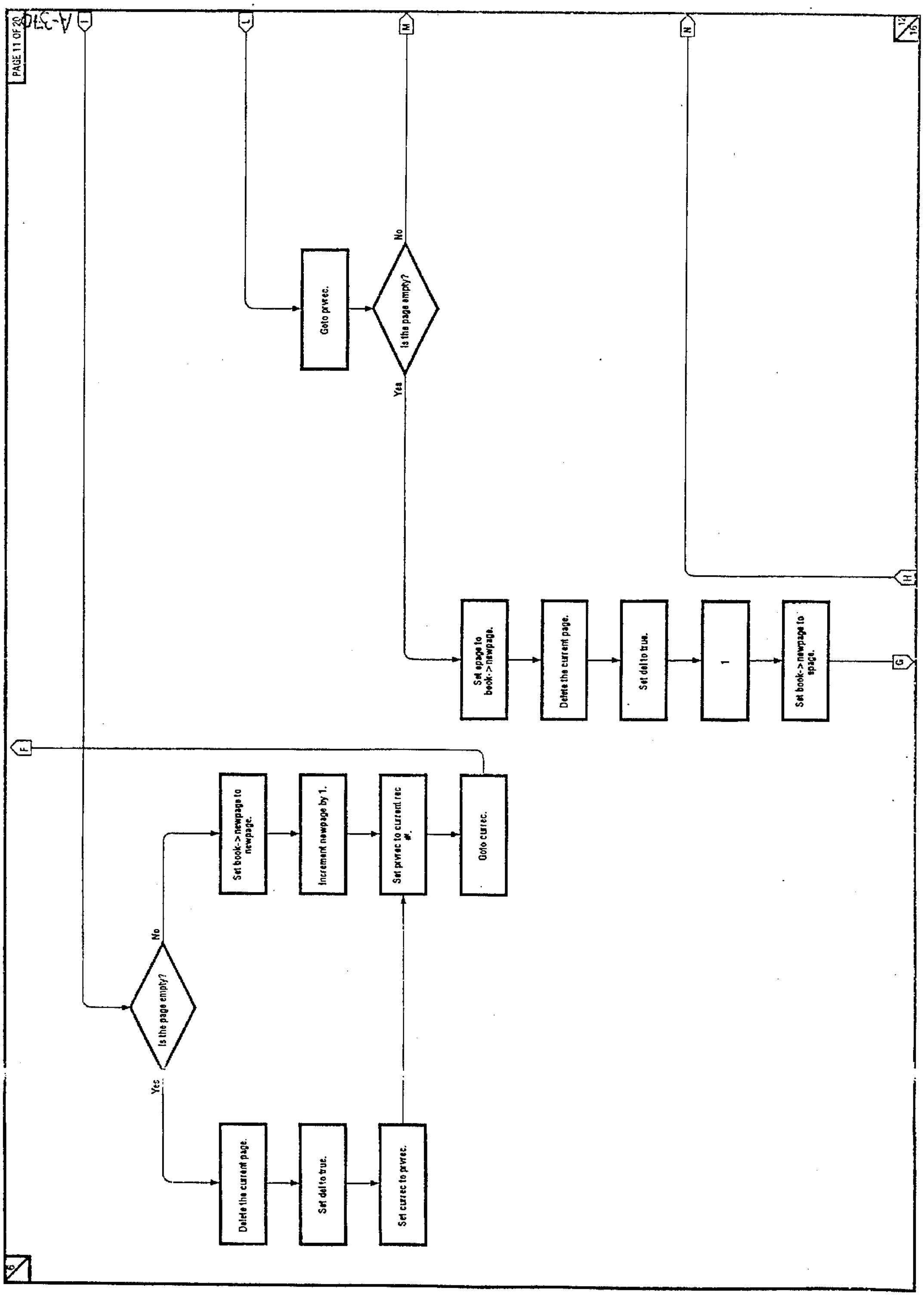
PAGE 11 OF 20
A-370
I
L
M
N
Goto prvrec.
Is the page empty?
No
Yes
Set epage to book->newpage.
Delete the current page.
Set del to true.
1
Set book->newpage to epage.
H
G
F
Is the page empty?
No
Yes
Set book->newpage to newpage.
Increment newpage by 1.
Set prvrec to current rec #.
Goto currec.
Delete the current page.
Set del to true.
Set currec to prvrec.

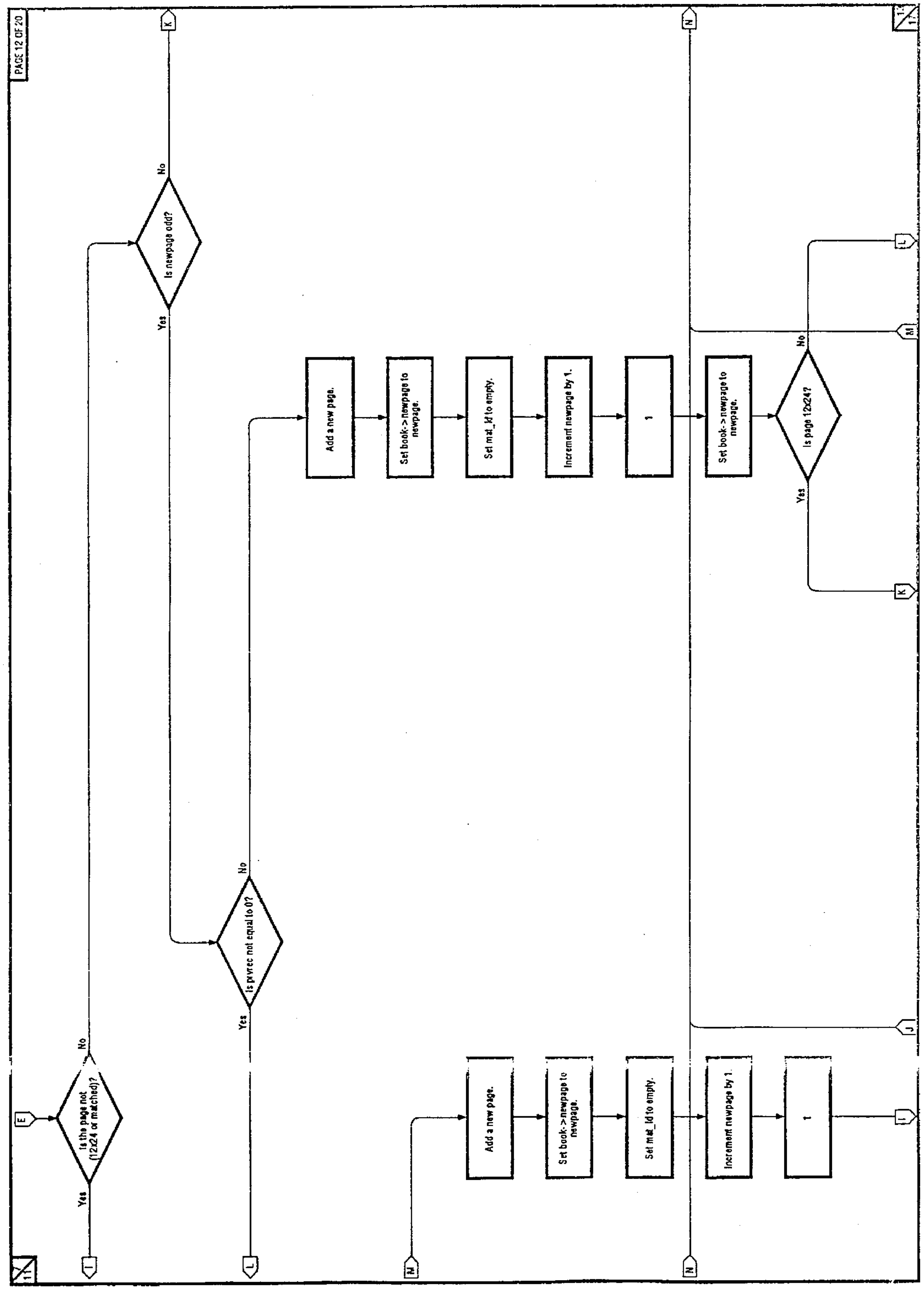
PAGE 12 OF 20
E
Is the page not (12x24 or matched)?
Yes
No
I
Is newpage odd?
Yes
No
K
Is pvrec not equal to 0?
Yes
No
L
Add a new page.
Set book->newpage to newpage.
Set mat_id to empty.
Increment newpage by 1.
1
Set book->newpage to newpage.
Is page 12x24?
Yes
No
K
M
L
J
N
M
Add a new page.
Set book->newpage to newpage.
Set mat_id to empty.
Increment newpage by 1.
1
I
N

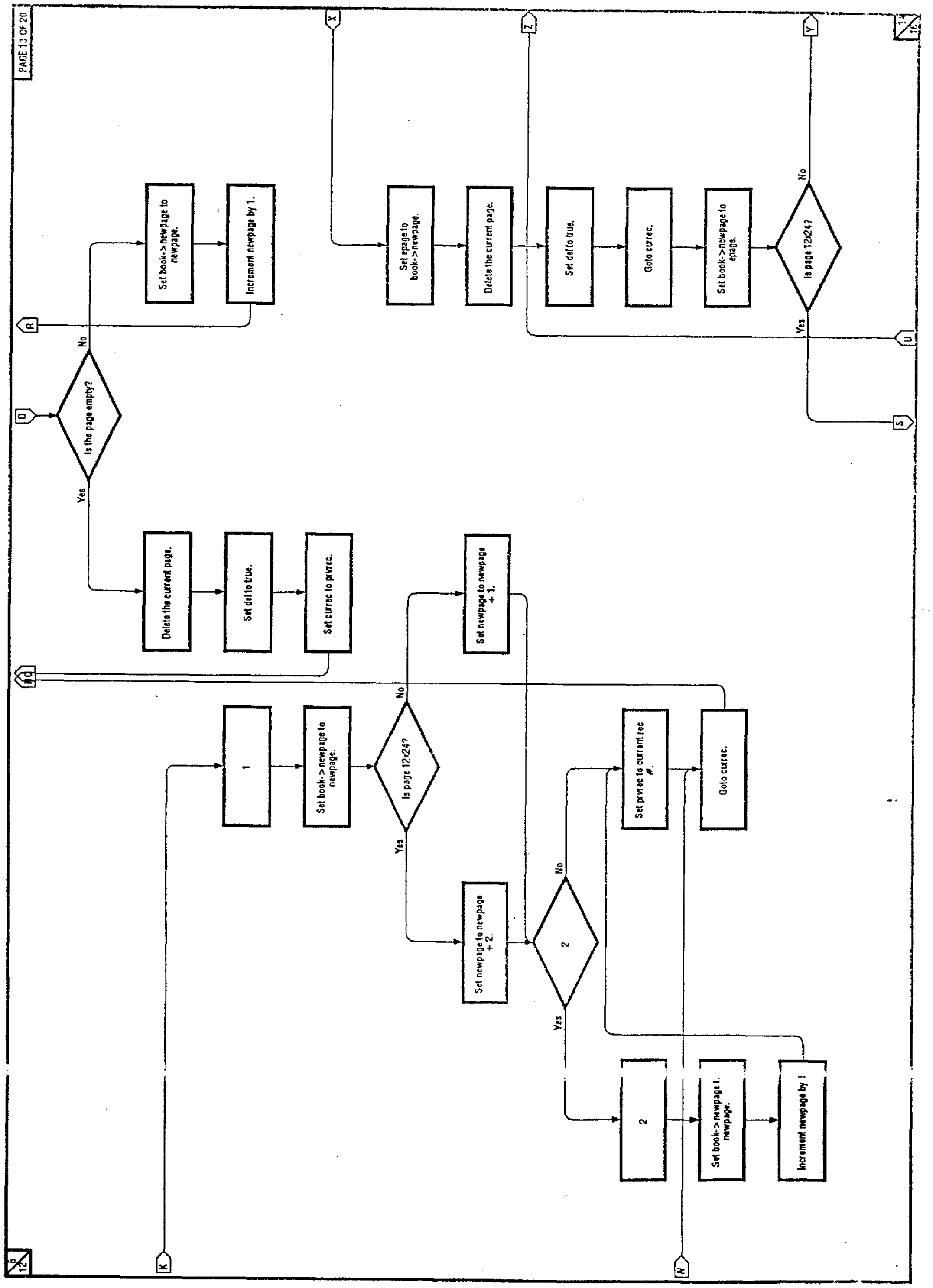
PAGE 13 OF 20
Is the page empty?
Yes
No
Delete the current page.
Set del to true.
Set currec to prvrec.
Set book->newpage to newpage.
Increment newpage by 1.
Set epage to book->newpage.
Delete the current page.
Set del to true.
Goto currec.
Set book->newpage to epage.
Is page 12≤24?
1
Set book->newpage to newpage.
Is page 12≤24?
Set newpage to newpage + 1.
Set newpage to newpage + 2.
2
Set prvrec to current rec #.
Goto currec.
2
Set book->newpage t. newpage.
Increment newpage by 1

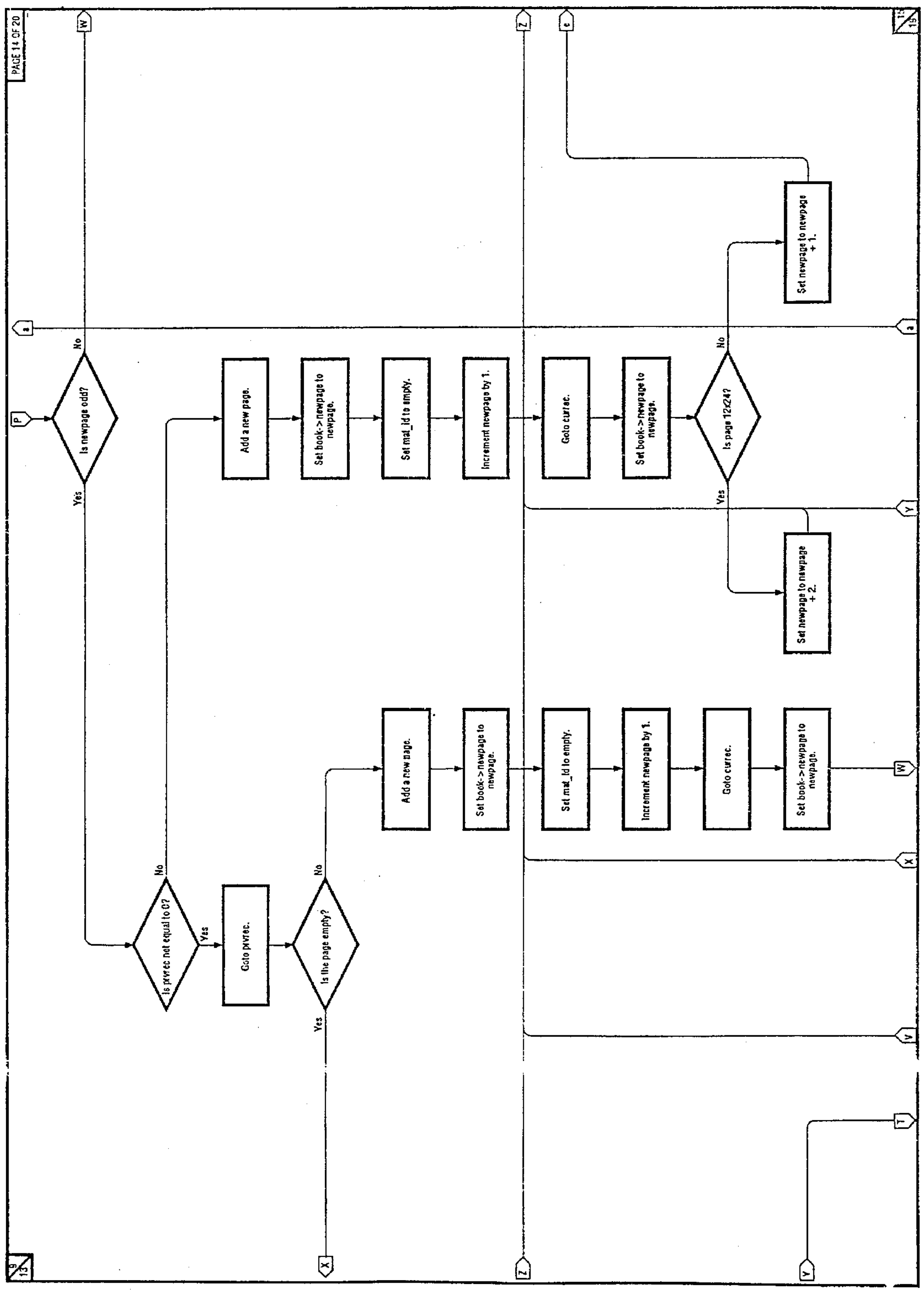
PAGE 14 OF 20
P
Is newpage odd?
Yes
No
W
a
Is prvrec not equal to 0?
Yes
No
Goto prvrec.
Is the page empty?
Yes
No
Add a new page.
Set book->newpage to newpage.
Set mat_id to empty.
Increment newpage by 1.
Goto currec.
Set book->newpage to newpage.
Is page 12x24?
Yes
No
Set newpage to newpage + 1.
Set newpage to newpage + 2.
e
Z
Y
Add a new page.
Set book->newpage to newpage.
Set mat_id to empty.
Increment newpage by 1.
Goto currec.
Set book->newpage to newpage.
W
X
V
T
X
Z
Y

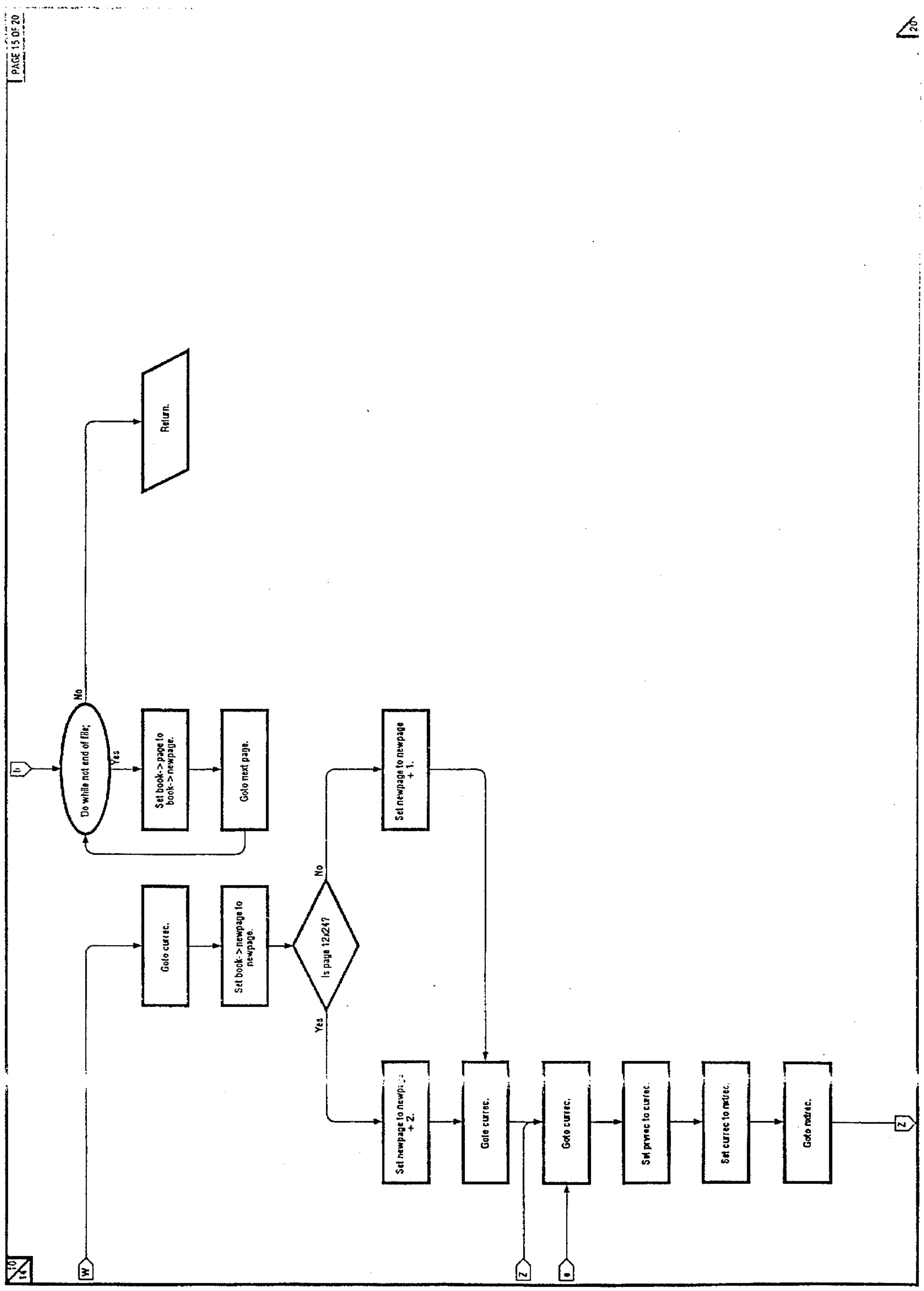
PAGE 15 OF 20
Do while not end of file;
Yes
No
Set book->page to book->newpage.
Goto next page.
Return.
Goto currec.
Set book->newpage to newpage.
Is page 12/24?
Yes
No
Set newpage to newpage + 1.
Goto currec.
Goto currec.
Set prvrec to currec.
Set currec to nxtrec.
Goto nxtrec.
W
Z
Z

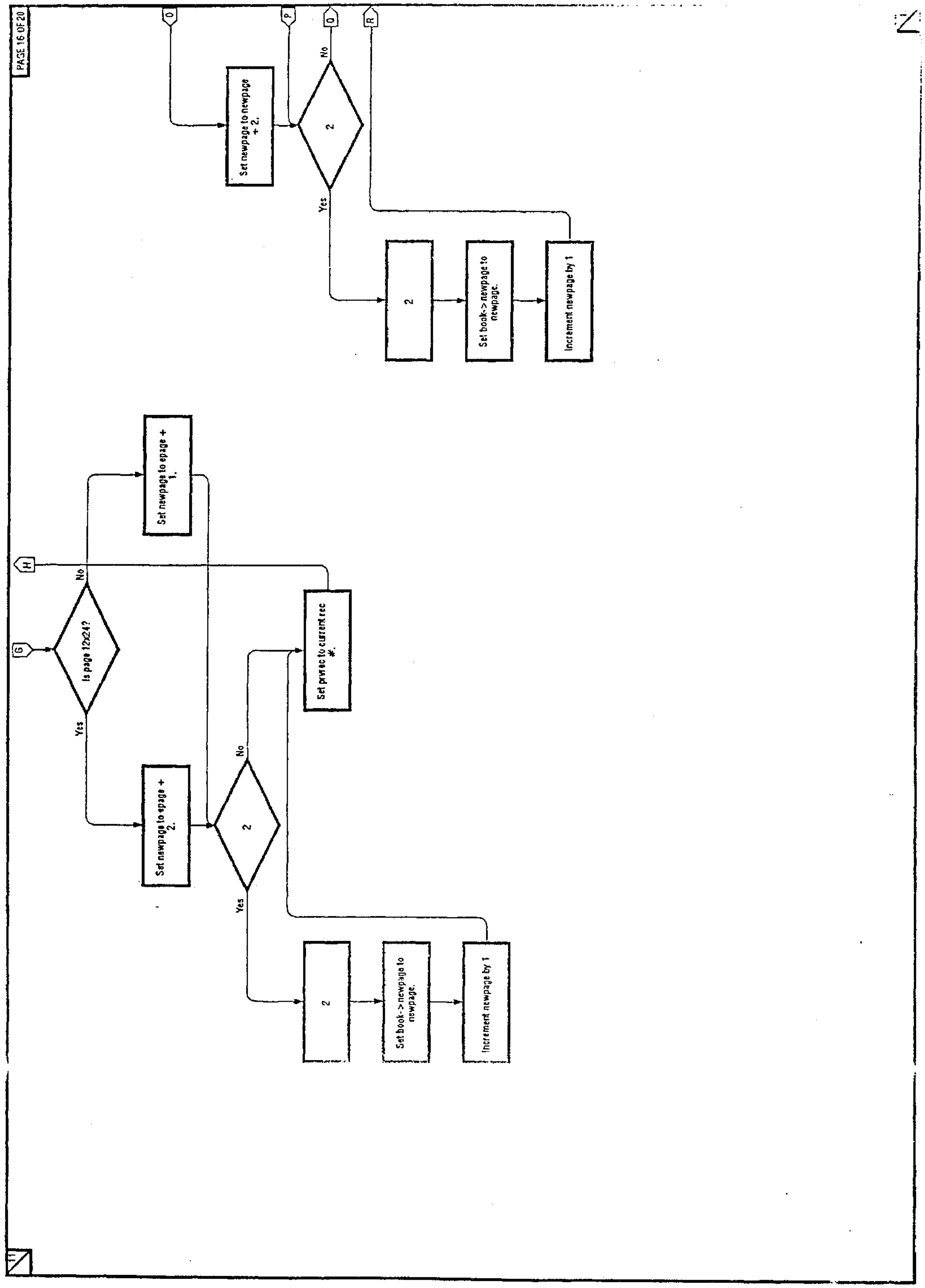
PAGE 16 OF 20
Set newpage to newpage + 2.
2
No
Yes
Set book->newpage to newpage.
Increment newpage by 1
Is page 12x24?
Set newpage to epage + 1.
Set newpage to epage + 2.

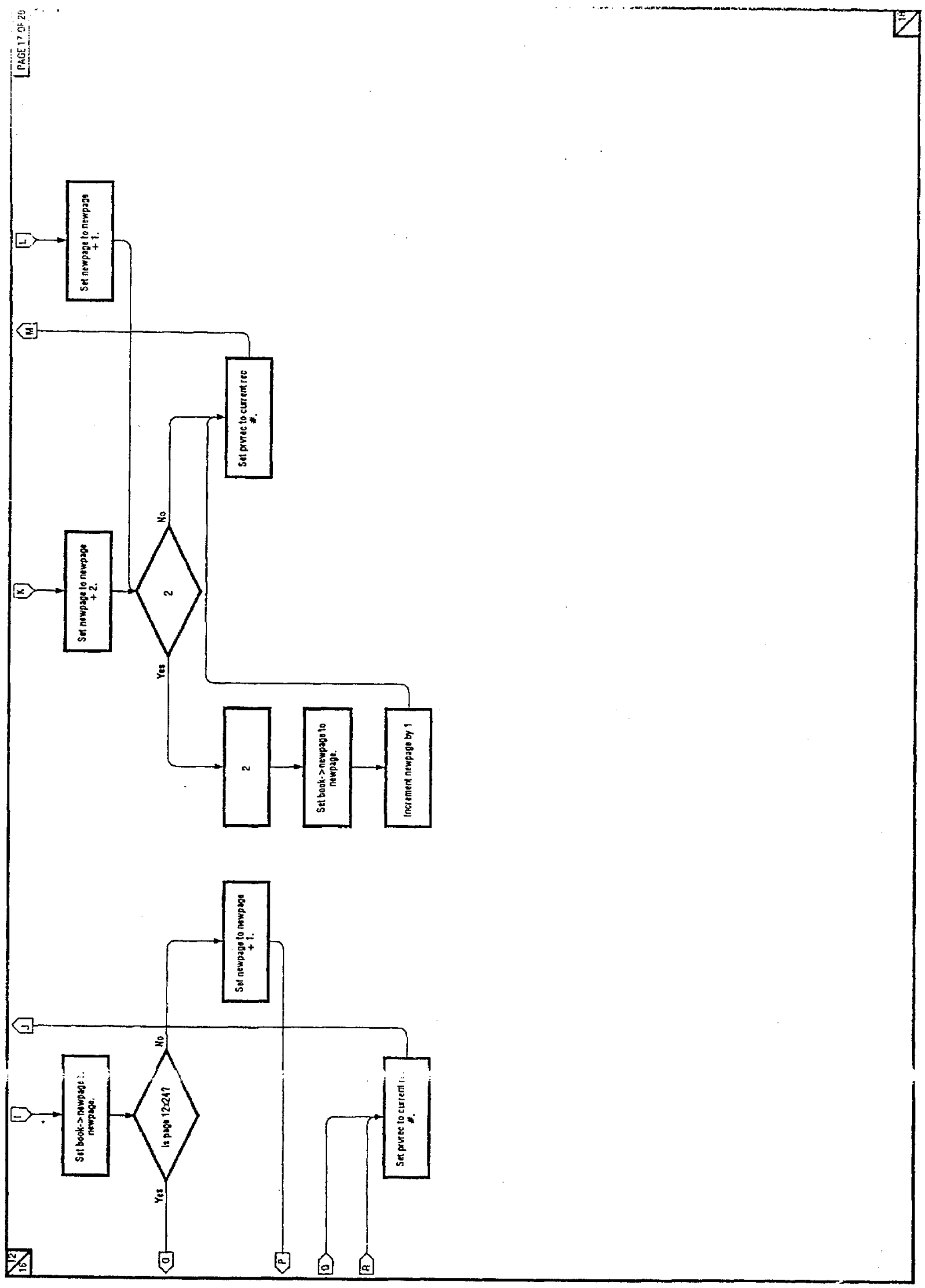
Set newpage to newpage + 1.
Set prvrec to current rec #.
Set newpage to newpage + 2.
2
Yes
No
Set book->newpage to newpage.
Increment newpage by 1
Is page 12x24?

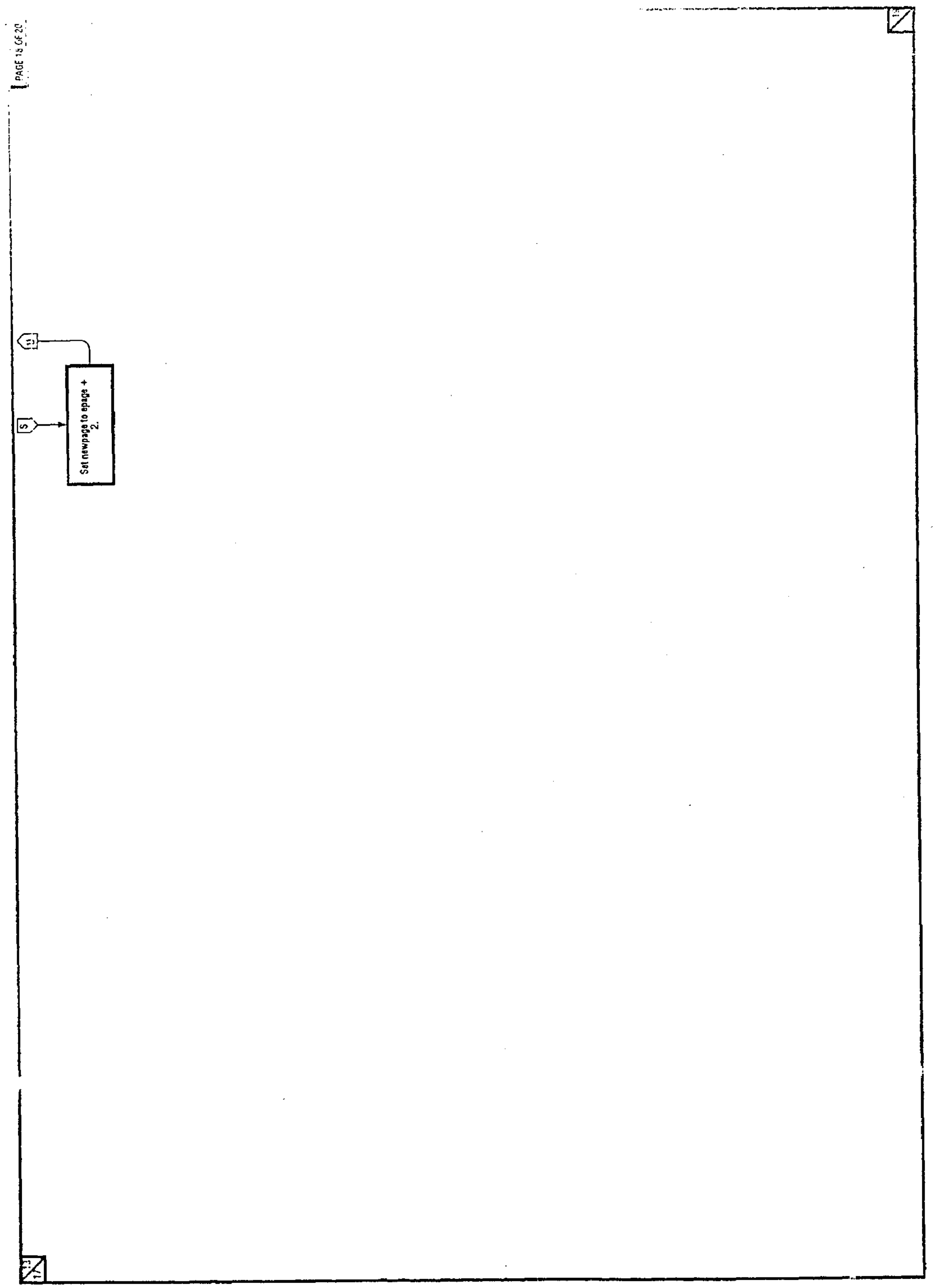
Set newpage to epage + 2.

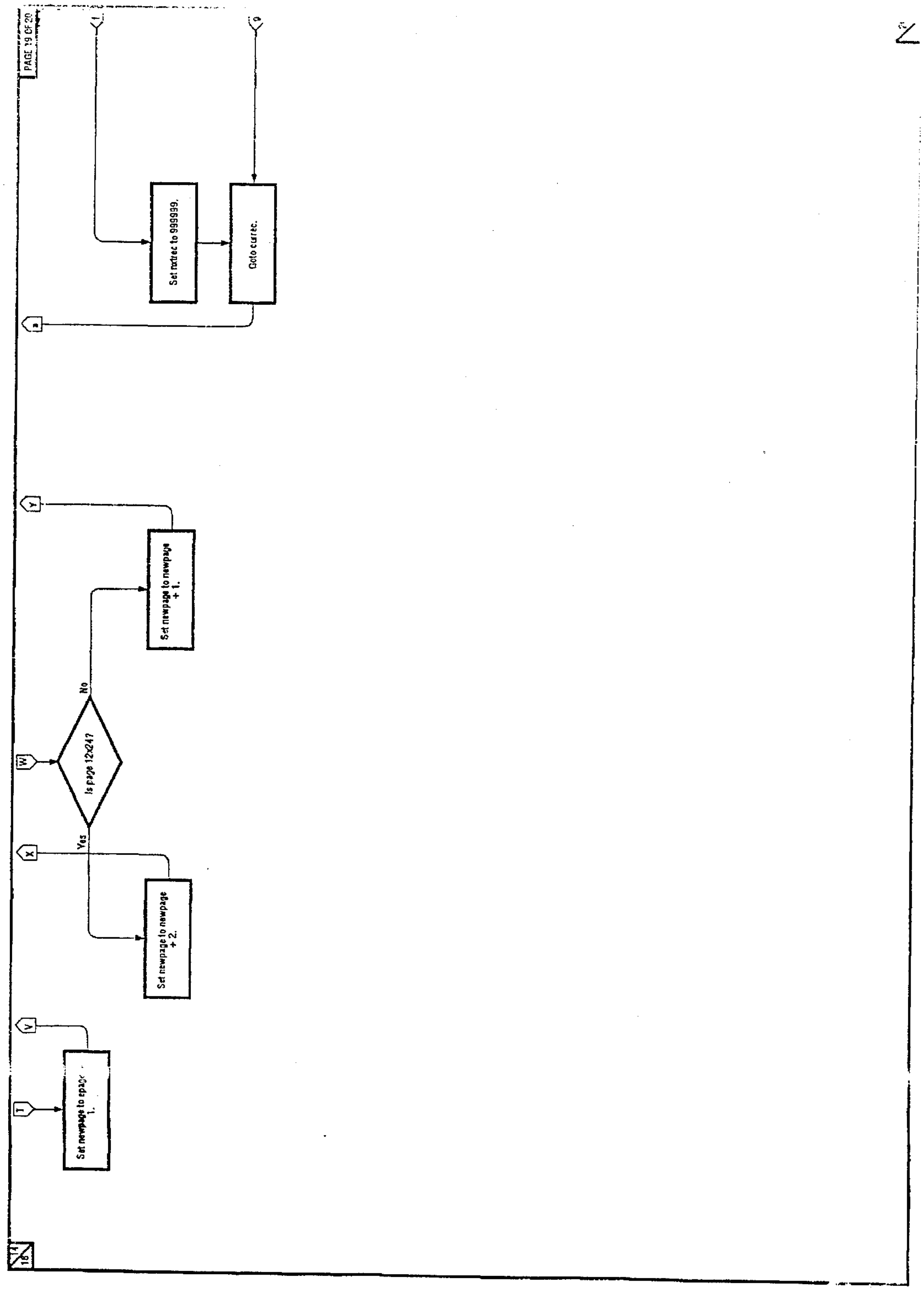
PAGE 19 OF 20
Set nxtrec to 999999.
Goto currec.
Set newpage to newpage + 1.
Is page 12x24?
Yes
No
Set newpage to newpage + 2.

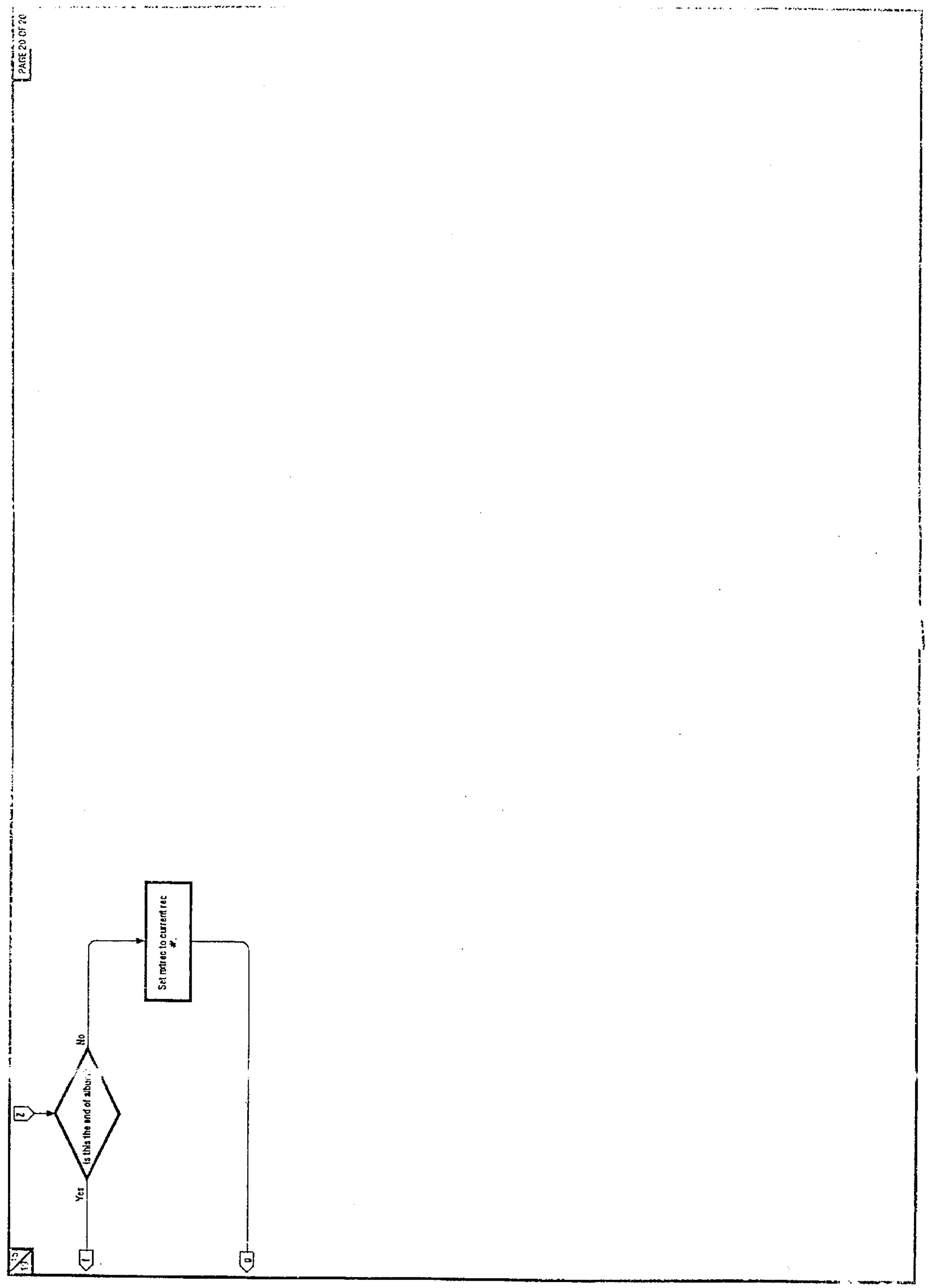
PAGE 20 OF 20
Z
Is this the end of album
No
Yes
Set rstrec to current rec #.
1
Q

What I claim is:

1. A method of assembling a photographic album containing a plurality of photographs, said method comprising the steps of:

creating an electronic database of pictures wherein each picture represents one photograph of the plurality of photographs;

creating an electronic database of available album mats wherein each album mat represents a particular available configuration for a page of the album;

sequentially viewing each picture in the electronic database of pictures;

placing each sequentially viewed picture in an electronic selected file or an electronic discarded file;

sequentially viewing each of the pictures in the electronic selected file;

selecting desired pictures for pages of the album from the electronic selected file;

selecting from the electronic database of album mats the album mats which are to be used for pages in the album to accommodate the selected pictures; and viewing images of the selected pictures with the selected album mats to form representations of pages of the album.

2. A method of assembling a photographic album as defined in claim 1 further including the step of sizing the selected pictures to the selected location on the selected album mat.

3. A method of assembling a photographic album as defined in claim 2 further including the step of calculating an invoice price for the selected pictures at the selected size.

4. A method of assembling a photographic album as defined in claim 3 further including the steps of editing the selected pictures to change pictures from the selected pictures to modify the invoice price for the selected pictures and recalculating the invoice price.

5. A method of assembling a photographic album as defined in claim 3 further including the steps of editing the selected mats to change mats and the pictures selected therewith from the selected mats and pictures to modify the invoice price and recalculating the invoice price.

6. A method of assembling a photographic album as defined in claim 4 further including the step of editing selected mats to change mats and the selected pictures associated therewith from the selected pictures and mats to modify the invoice price and recalculating the invoice price.

7. A method of assembling a photographic album as defined in claim 2 further including the step of sequentially reviewing the photographs in the discarded file.

8. A method of assembling a photographic album as defined in claim 1 further including the step of printing a written order for the selected pictures, the size of each selected picture, and the selected mats.

9. A method of assembling a photographic album as defined in claim 1 further including the step of printing for each album page an image of the selected photographs at their relative size and in their proper mat location.

10. An interactive method of creating pages of a photographic album from an electronic database of images and available album mats, each of the album mats being representative of an available page configuration for the album, including the steps of:

sequentially viewing images in the electronic database;

selecting desired images for the album, as the images are sequentially viewed;

selecting album mats from the electronic database to accommodate the selected desired images with each selected album mat corresponding to a page of the album;

locating the desired images selected from the electronic data base relative to album mats selected from the electronic database to form representations of pages of the album; and viewing images of the selected album mats with the desired images selected from the electronic database located in the images of the selected album mats for pages of the album.

11. An interactive method of creating pages of a photographic album from an electronic database of images as defined in claim 10 further including the step of calculating an invoice price for the selected images.

12. An interactive method of creating pages of a photographic album from an electronic database of images as defined in claim 11 further including the steps of editing the selected mats to change the mats and the images selected therewith from the selected mats and images to modify the invoice price and recalculate the invoice price.

13. An interactive method of creating pages of a photographic album from an electronic database of images as defined in claim 11 further including the steps of editing the selected images to change images from the selected images to modify the invoice price for the selected images and recalculating the invoice price.

14. An interactive method of creating pages of a photographic album from an electronic database of images as defined in claim 13 further including the steps of editing the selected mats to change mats and the images selected therewith from the selected mats and images selected therein to modify the invoice price and recalculating the invoice price.

15. An interactive method of creating pages of a photographic album from an electronic database of images as defined in claim 10 further including the steps of selecting, as each image in said database of images is sequentially viewed, images to be stored in an electronic selected file and images to be stored in an electronic discarded file, and storing said images in said selected file and said discarded file.

16. An interactive method of creating pages of a photographic album from an electronic database of images as defined in claim 15 further including the step of sequentially reviewing the images in said discarded file.

17. An interactive method of creating pages of a photographic album from an electronic database of images as defined in claim 10 further including the steps of printing a written order for the selected images and the selected mats.

18. An interactive method of creating pages of a photographic album from an electronic database of images as defined in claim 10 further including the step of printing for each album page an image of selected images at their relative size and in their proper mat location.

19. An interactive method of creating pages of a photographic album from an electronic database of images as defined in claim 10 further including the step of sizing the selected images to the selected location on the selected album mat.

20. An interactive method of creating pages of a photographic album from pages of an electronic database of images as defined in claim 10 further including storing in an electronic file for pages of the album the desired images to be located on the pages of the album, the placement of the desired images on the selected album mats, and the selected album mats required to accommodate the desired images.

21. An interactive method of creating pages of a photographic album from an electronic database of images as defined in claim 10 wherein said step of sequentially viewing images in the electronic database includes varying the overall size of at least some of the images to accommodate configurations of at least some of the album mats selected from the electronic database.

22. A method of assembling a photographic album having a plurality of pages from a plurality of photographs and a plurality of album mats, said method comprising the steps of:

creating an electronic database of pictures, each of which corresponds to one of the photographs;

creating an electronic database of album mats wherein each album mat represents a particular available configuration for a page of the album;

sequentially viewing each picture in said database of pictures;

placing each sequentially viewed picture in an electronic selected file or an electronic discarded file;

sequentially viewing each of the pictures in the selected file;

selecting desired pictures for pages of the album from the selected file;

selecting from the electronic database of album mats the album mats which are to be used for pages in the album to accommodate the pictures selected for pages of the album;

selecting locations on the selected album mats for the selected pictures;

viewing images of the selected pictures proportioned for the selected locations on the selected album mats with the selected pictures in the selected locations on the selected album mats; and storing in an electronic file the selected pictures, the selected album mats, and the locations on the selected album mats of the selected pictures for pages of the album.

23. A method of assembling a photographic album as defined in claim 22 further including the step of sizing the selected pictures to the selected location on the selected album mats.

24. A method of assembling a photographic album as defined in claim 23 further including the step of calculating an invoice price for the selected pictures at the selected size.

25. A method of assembling a photographic album as defined in claim 24 further including the steps of editing the selected pictures to change pictures from the selected pictures to modify the invoice price for the selected pictures and recalculating the invoice price.

26. A method of assembling a photographic album as defined in claim 24 further including the steps of editing the selected album mats to change album mats and the selected pictures to change pictures and modify the invoice price and recalculating the invoice price.

27. A method of assembling a photographic album as defined in claim 25 further including the step of editing selected album mats to change album mats and the selected pictures to change pictures and modify the invoice price and recalculating the invoice price.

28. A method of assembling a photographic album as defined in claim 22 further including the step of sequentially reviewing the photographs in the electronic discarded file.

29. A method of assembling a photographic album as defined in claim 22 further including the step of printing a written order for the selected pictures, the size of each selected picture, and the selected album mats.

30. An interactive method of creating pages of a photographic album from an electronic database of images and available album mats, each of the album mats in the electronic database being representative of an available page configuration for the album, said method including the steps of:

sequentially viewing the images in said electronic database;

selecting images from the electronic database for pages of the album;

selecting album mats from the electronic database to accommodate the selected images;

locating the selected images on the selected album mats to establish representations of pages of the album;

storing in an electronic file the selected images, the album mats required to accommodate the selected images, and the location of the selected images on the selected album mat for pages of the album, and viewing images which represent pages of the album and which include the selected images proportioned for the selected locations in the selected album mats.

31. An interactive method of creating pages of a photographic album from an electronic database of images and available album mats as defined in claim 30 further including the step of calculating an invoice price for the selected images.

32. An interactive method of creating pages of a photographic album from an electronic database of images and available album mats as defined in claim 31 further including the steps of editing the selected mats to change at least some of the selected mats and at least some of the selected images and recalculating the invoice price.

33. An interactive method of creating pages of a photographic album from an electronic database of images and available album mats as defined in claim 31 further including the steps of editing the selected images to change images from the selected images to modify the invoice price for the selected images and recalculating the invoice price.

34. An interactive method of creating pages of a photographic album from an electronic database of images and available album mats as defined in claim 33 further including the steps of editing the selected mats to change mats and the images from the selected mats and images to modify the invoice price and recalculating the invoice price.

35. An interactive method of creating pages of a photographic album from an electronic database of images and available album mats as defined in claim 30 further including the steps of selecting, as each image in said database of images is viewed, images to be stored in an electronic selected file and images to be stored in an electronic discarded file, and storing said images in said selected file and said discarded file.

36. An interactive method of creating pages of a photographic album from an electronic database of images and available album mats as defined in claim 35 further including the step of sequentially reviewing the images in said discarded file.

37. An interactive method of creating pages of a photographic album from an electronic database of images and available album mats as defined in claim 30 further including the steps of printing a written order for the selected images and the selected mats.

38. An interactive method of creating pages of a photographic album from an electronic database of images and available album mats as defined in claim 30 further including the step of printing an image of each album page including the selected images in their selected mat location.

39. An interactive method of creating pages of a photographic album from an electronic database of images an available album mats as defined in claim 30 further including the step of sizing the selected images to the selected location on the selected album mat.

40. A method of assembling a photographic album having a plurality of photographs associated with album mats, said method comprising the steps of:

creating an electronic database containing data representative of a plurality of album mats having different configurations, each album mat of the plurality of album mats representing an available page configuration for the album;

creating an electronic database containing data representative of pictures with each of the pictures corresponding to one of the photographs;

sequentially viewing images of album mats which represent available configurations for pages of the album from the electronic database of album mats on a display along with images of pictures from the electronic database of pictures with the images of the pictures in relationships with the images of the album mats which are at least partially determined by the configurations of the images of the album mats; and selecting an arrangement of images of pictures from the electronic database of pictures and images of album mats from the electronic database of album mats for pages of the album.

41. A method as set forth in claim 40 further including constructing the photographic album with pages having photographs arranged in a relationship with album mats which corresponds to the selected arrangement of images of pictures from the electronic database of pictures and images of album mats from the electronic database of album mats.

42. A method as set forth in claim 40 further including the steps of calculating an invoice price of the selected arrangement of images of pictures from the electronic database of pictures and images of album mats from the electronic database of album mats, revising the selected arrangement of images of pictures from the electronic database of pictures and images of album mats from the electronic database of album mats to obtain a second selected arrangement of images of pictures from the electronic database of pictures and images of album mats from the electronic database of album mats, and calculating an invoice price for the second selected arrangement of images of pictures from the electronic database of pictures and images of album mats from the electronic database of album mats.

43. A method as set forth in claim 40 further including the step of printing pictorial representations of at least some of the pages of the album with printed images of pictures from the electronic database of pictures arranged relative to printed images of album mats from the electronic database of album mats in accordance with the selected arrangement of images of pictures from the electronic database of pictures and images of album mats from the electronic database of album mats.

44. A method as set forth in claim 40 further including creating a videotape containing images of pictures in the electronic database of pictures.

45. A method as set forth in claim 40 wherein said step of creating an electronic database of pictures includes transferring images from a video camera to the electronic database of pictures.

46. A method as set forth in claim 45 wherein said step of creating an electronic database of pictures includes varying the size of images transferred from the video camera to correspond to sizes of images required by album mats in the electronic database of album mats.

47. A method as set forth in claim 40 wherein said step of creating an electronic database of pictures includes providing titles in the electronic database of pictures.

48. A method as set forth in claim 40 further including the step of sequentially viewing images of pictures from the electronic database of pictures on a display while the display is free of images of album mats, said step of sequentially viewing images of pictures from the electronic database of pictures on a display while the display is free of images of album mats is performed prior to performance of said step of sequentially viewing images of album mats from the electronic database of album mats on a display along with images of pictures from the electronic database of pictures.

49. A method as set forth in claim 48 further including the step of preparing a videotape of images of pictures simultaneously with performance of said step of sequentially viewing images of pictures from the electronic database of pictures on a display while the display is free of images of album mats.

50. A method as set forth in claim 40 wherein said step of sequentially viewing images of album mats from the electronic database of album mats on a display along with images of pictures from the electronic database of pictures includes changing the relationship of the images of pictures relative to an image of an album mat.

51. A method as set forth in claim 40 wherein said step of sequentially viewing images of album mats from the electronic database of album mats on a display along with images of pictures from the electronic database of pictures includes changing the image of an album mat from an image of a first album mat to an image of a second album mat and viewing images of pictures which were previously viewed with the image of the first album mat with the image of the second album mat.

52. A method as set forth in claim 40 wherein said step of sequentially viewing images of album mats from the electronic database of album mats on a display along with images of pictures from an electronic database of pictures includes viewing a first plurality of images of pictures along with an image of a first album mat and then viewing a second plurality of images of pictures along with an image of the first album mat, said step of selecting an arrangement of images of pictures from the electronic database of pictures and images of album mats from the electronic database of album mats for pages of the album including selecting images of pictures from at least one of the first and second pluralities of images of pictures for association with the image of the first album mat.

53. A method as set forth in claim 40 wherein said step of sequentially viewing images of album mats from the electronic database of album mats on a display along with images of pictures from an electronic database of pictures includes viewing an image of a first album mat along with a first plurality of images of pictures and then viewing an image of a second album mat along with at least some of the images of pictures from the first plurality of images of pictures, said step of selecting an arrangement of images of pictures from the electronic database of pictures and images of album mats from the electronic database of album mats for pages of the album including selecting the image of one of the first and second album mats for association with at least some of the images of pictures of the first plurality of images of pictures.

54. A method as set forth in claim 40 wherein said step of sequentially viewing images of album mats from the electronic database of album mats along with images of pictures from the electronic database of pictures includes varying the overall size of at least some of the images of pictures from the electronic database of pictures to accommodate configurations of images of album mats from the electronic database album mats.

55. A method as set forth in claim 40 wherein said step of creating an electronic database containing data representative of album mats having different configurations includes creating an electronic database containing data representative of album mats having representations of defined locations of a plurality of different sizes where photographs of a plurality of different sizes are to be received by the album mats, said step of sequentially viewing images of album mats along with images of pictures includes varying the overall size of at least some of the images of pictures to have sizes which are a function of the sizes of the defined locations where photographs are to be received.

56. A method of assembling a photographic album having a plurality of pages with pictures arranged in a selected relationship with album mats, said method comprising the steps of:

creating an electronic database of album mats having a plurality of locations for pictures, each of the album mats represents an available configuration for a page of the album;

viewing on a display screen images of album mats from the database of album mats;

viewing pictures during performance of said step of viewing images of album mats from the electronic database of album mats;

during performance of said steps of viewing images of album mats from the database of album mats and viewing pictures, selecting an arrangement of pictures and album mats for pages of the album; and thereafter, constructing a photographic album having pages with the selected arrangement of pictures and album mats.

57. A method of assembling a photographic album having a plurality of pages of album mats on which photographs are positioned, said method comprising the steps of:

providing a plurality of album mats with each of the album mats having one of a plurality of different configurations available for pages of the album, the plurality of album mats having defined locations for receiving photographs;

creating an electronic database of representations of album mats with each of the representations of the album mats having a configuration corresponding to one of the plurality of different configurations available for pages of the album so that the database contains at least one representation of each of the plurality of different configurations of album mats available for pages of the album, the representations of album mats having representations of the defined locations where photographs are received by the album mats;

creating an electronic database of representations of photographs; and sequentially viewing the representations of photographs and the representations of the album mats available for pages of the album, said step of sequentially viewing the representations of album mats available for pages of the album includes varying the overall size of at least some of the representations of photographs to correspond to the size of representations of defined locations where photographs are received by the album mats, sequentially positioning the representations of photographs at the representations of defined locations where photographs are received by the album mats while sequentially viewing representations of the album mats to thereby form representations of pages of the album, and selecting photographs to be positioned at the defined locations on the album mats for pages of the album.

58. A method as set forth in claim 57 further including the step of creating pages of the album by positioning selected photographs on the album mats at the defined locations for receiving photographs with each of the selected photographs having an overall size which corresponds to the size of the defined locations where photographs are positioned on the album mats.

59. A method as set forth in claim 57 wherein said step of providing album mats includes providing album mats having a plurality of different size defined locations for receiving photographs, said step of varying the overall size of at least some of the representations of photographs to correspond to the size of representations of defined locations where photographs are received includes varying the overall size of at least some of the representations of photographs to obtain representations of photographs having over all sizes corresponding to the sizes of the plurality of different size defined locations for receiving photographs.

60. A method of assembling a photographic album having a plurality of pages of album mats having openings through which photographs are visible, said method comprising the steps of:

providing a plurality of album mats with each of the album mats having one of a plurality of different configurations available for pages of the album, the plurality of album mats having openings through which photographs are to be viewed;

creating an electronic database of representations of album mats with each of the representations of the album mats having a configuration corresponding to one of the plurality of different configurations available for pages of the album so that the database contains at least one representation of each of the plurality of different configurations of album mats available for pages of the album, the representations of album mats having representations of the openings through which photographs are to be viewed;

creating an electronic database of representations of photographs; and sequentially viewing the representations of photographs and the representations of the album mats available for pages of the album, said step of sequentially viewing the representations of photographs and the representations of album mats available for pages of the album includes varying the overall size of at least some of the representations of photographs to correspond to the size of representations of at least some of the openings through which photographs are to be viewed, sequentially positioning the representations of photographs at the representations of openings through which photographs are to be viewed while sequentially viewing representations of the album mats to thereby form representations of pages of the album, and selecting photographs to be viewed at the openings in the album mats for pages of the album.

61. A method as set forth in claim 60 further including the step of creating pages of the album by mounting selected photographs at the openings in the album mats with each of the selected photographs having an overall size which corresponds to the size of the opening through which the photograph is to be viewed.

62. A method of assembling a photographic album having a plurality of pages of photographs associated with album mats, said method comprising the steps of:

creating an electronic database of album mats having different configurations, each album mat representing an available page configuration for the album;

creating an electronic database of pictures with each of the pictures corresponding to one of the photographs;

sequentially viewing images of album mats from the electronic database of album mats on a display;

sequentially viewing images of pictures from the electronic database of pictures on a display; and selecting an arrangement of images of pictures from the electronic database of pictures and images of album mats from the electronic database of album mats for pages of the album.

63. A method as set forth in claim 62 wherein said step of selecting an arrangement of images of pictures from the electronic database of pictures and images of album mats from the electronic database of album mats includes selecting images of pictures and selecting an image of an album mat for each page of a plurality of pages of the album and selecting locations on the image of the selected album mat for each page of the plurality of pages for images of pictures selected from the electronic database of pictures for each page of the plurality of pages, said method further including printing pictorial representations of a plurality of pages of the album with printed images of pictures selected for each page of the album arranged in selected locations relative to a printed image of the selected album mat for each page of the album.

64. A method as set forth in claim 63 wherein said step of selecting an arrangement of images of pictures from the electronic database of pictures and images of album mats from the electronic database of album mats for pages of the album includes sequentially viewing images of album mats from the electronic database of album mats on a display along with images of pictures from the electronic database of pictures prior to performing said step of printing pictorial representations of a plurality of pages of the album.

* * * * *